US011909860B1

(12) United States Patent
So et al.

(10) Patent No.: US 11,909,860 B1
(45) Date of Patent: *Feb. 20, 2024

(54) SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN

(71) Applicant: Gemini IP, LLC, New York, NY (US)

(72) Inventors: Michael So, Tenafly, NJ (US); Ira Auerbach, Arverne, NY (US); Daniel William Halley James, Brooklyn, NY (US); Cameron Howard Winklevoss, New York, NY (US); Tyler Howard Winklevoss, New York, NY (US); Anas Saidi, Brooklyn, NY (US); Jamie Chapman, New York, NY (US)

(73) Assignee: Gemini IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,371

(22) Filed: Aug. 30, 2021

Related U.S. Application Data

(63) Continuation of application No. 16/280,788, filed on Feb. 20, 2019, now Pat. No. 11,139,955, which is a (Continued)

(51) Int. Cl.

| | |
|---|---|
| ***G06Q 20/38*** | (2012.01) |
| ***H04L 9/06*** | (2006.01) |

(Continued)

(52) U.S. Cl.
CPC ............ *H04L 9/0637* (2013.01); *G06F 21/64* (2013.01); *G06Q 20/065* (2013.01);
(Continued)

(58) Field of Classification Search
CPC .................................................... G06Q 20/401
(Continued)

(56) References Cited

U.S. PATENT DOCUMENTS

| | | | |
|---|---|---|---|
| 4,790,431 | A | 12/1988 | Reel et al. |
| 5,623,547 | A | 4/1997 | Jones |

(Continued)

FOREIGN PATENT DOCUMENTS

| | | | |
|---|---|---|---|
| CA | 2627540 | A1 | 9/2009 |
| CN | 103927656 | A | 7/2014 |

(Continued)

OTHER PUBLICATIONS

Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_IdXuS (last visted May 30, 2014), 3 pages.

(Continued)

*Primary Examiner* — Chinedu C Agwumezie
(74) *Attorney, Agent, or Firm* — Lee & Hayes, P.C.

(57) ABSTRACT

The present invention relates to a method, system, and program product for depositing, holding and/or distributing collateral in the form of a stable value token for a security token, the tokens being on the same underlying blockchain. Furthermore, the present invention relates to methods, systems and program products for lending digital assets, such as crypto currency, and related products.

20 Claims, 165 Drawing Sheets

Related U.S. Application Data continuation-in-part of application No. 15/973,175, filed on May 7, 2018, now abandoned, and a continuation-in-part of application No. 15/973,140, filed on May 7, 2018, now abandoned, and a continuation-in-part of application No. 15/960,040, filed on Apr. 23, 2018, now Pat. No. 10,438,290, said application No. 16/280,788 is a continuation-in-part of application No. 15/920,042, filed on Mar. 13, 2018, now Pat. No. 11,282,139.

(60) Provisional application No. 62/732,347, filed on Sep. 17, 2018, provisional application No. 62/764,978, filed on Aug. 17, 2018, provisional application No. 62/702,265, filed on Jul. 23, 2018, provisional application No. 62/684,023, filed on Jun. 12, 2018, provisional application No. 62/680,775, filed on Jun. 5, 2018, provisional application No. 62/660,655, filed on Apr. 20, 2018, provisional application No. 62/647,353, filed on Mar. 23, 2018, provisional application No. 62/642,946, filed on Mar. 14, 2018, provisional application No. 62/642,931, filed on Mar. 14, 2018, provisional application No. 62/638,679, filed on Mar. 5, 2018, provisional application No. 62/629,417, filed on Feb. 12, 2018.

(51) Int. Cl.

| | |
|---|---|
| ***G06Q 20/40*** | (2012.01) |
| ***G06Q 40/04*** | (2012.01) |
| ***G06Q 20/06*** | (2012.01) |
| ***G06F 21/64*** | (2013.01) |
| ***H04L 9/32*** | (2006.01) |
| *H04L 9/00* | (2022.01) |

(52) U.S. Cl.
CPC ........... *G06Q 20/401* (2013.01); *G06Q 40/04* (2013.01); *H04L 9/3213* (2013.01); *H04L 9/50* (2022.05); *H04L 2209/56* (2013.01)

(58) Field of Classification Search
USPC ........................................................... 705/39
See application file for complete search history.

(56) References Cited

U.S. PATENT DOCUMENTS

| | | | |
|---|---|---|---|
| 5,675,649 | A | 10/1997 | Brennan et al. |
| 5,799,287 | A | 8/1998 | Dembo |
| 5,950,176 | A | 9/1999 | Keiser et al. |
| 6,021,257 | A | 2/2000 | Chikauchi |
| 6,157,920 | A | 12/2000 | Jakobsson et al. |
| 6,505,174 | B1 | 1/2003 | Keiser et al. |
| 6,523,012 | B1 | 2/2003 | Glassman et al. |
| 6,583,712 | B1 | 6/2003 | Reed et al. |
| 7,136,834 | B1 | 11/2006 | Merrin et al. |
| 7,167,565 | B2 | 1/2007 | Rajasekaran |
| 7,308,428 | B1 | 12/2007 | Federspiel et al. |
| 7,330,538 | B2 | 2/2008 | Dunsmuir |
| 7,356,500 | B1 | 4/2008 | Waelbroeck et al. |
| 7,428,506 | B2 | 9/2008 | Waelbroeck et al. |
| 7,487,123 | B1 | 2/2009 | Keiser et al. |
| 7,565,313 | B2 | 7/2009 | Waelbroeck et al. |
| 7,647,264 | B2 | 1/2010 | Hatheway et al. |
| 7,677,974 | B2 | 3/2010 | Van Luchene |
| 7,680,715 | B2 | 3/2010 | Waelbroeck et al. |
| 7,685,052 | B2 | 3/2010 | Waelbroeck et al. |
| 7,693,775 | B2 | 4/2010 | Korhammer et al. |
| 7,716,484 | B1 | 5/2010 | Kaliski, Jr. |
| 7,747,515 | B1 | 6/2010 | Merrin et al. |
| 7,769,678 | B2 | 8/2010 | Toffey |
| 7,778,919 | B2 | 8/2010 | Waelbroeck et al. |
| 7,814,000 | B2 | 10/2010 | Waelbroeck et al. |
| 7,831,507 | B2 | 11/2010 | Merrin et al. |
| 7,848,991 | B1 | 12/2010 | Buck |
| 7,848,993 | B1 | 12/2010 | Buck |
| 7,865,425 | B2 | 1/2011 | Waelbroeck et al. |
| 7,870,058 | B2 | 1/2011 | Maltzman |
| 7,870,059 | B2 | 1/2011 | Shapiro et al. |
| 7,870,062 | B2 | 1/2011 | Waelbroeck et al. |
| 7,873,573 | B2 | 1/2011 | Realini |
| 7,877,318 | B2 | 1/2011 | Waelbroeck et al. |
| 7,882,013 | B2 | 2/2011 | Shapiro et al. |
| 7,882,014 | B2 | 2/2011 | Shapiro et al. |
| 7,882,015 | B2 | 2/2011 | Waelbroeck et al. |
| 7,890,417 | B2 | 2/2011 | Hanson et al. |
| 7,895,112 | B2 | 2/2011 | Richmann et al. |
| 7,899,726 | B2 | 3/2011 | Harris |
| 7,904,376 | B2 | 3/2011 | Shapiro et al. |
| 7,908,203 | B2 | 3/2011 | Shapiro et al. |
| 7,908,205 | B2 | 3/2011 | Waelbroeck et al. |
| 7,908,206 | B2 | 3/2011 | Waelbroeck et al. |
| 7,917,425 | B2 | 3/2011 | Waelbroeck et al. |
| 7,933,827 | B2 | 4/2011 | Richmann et al. |
| 7,996,261 | B1 | 8/2011 | Waelbroeck et al. |
| 7,999,748 | B2 | 8/2011 | Ligtenberg et al. |
| 8,005,743 | B2 | 8/2011 | Tupper et al. |
| 8,010,438 | B2 | 8/2011 | Waelbroeck et al. |
| 8,015,099 | B2 | 9/2011 | Reid |
| 8,019,665 | B2 | 9/2011 | Hausman |
| 8,041,628 | B2 | 10/2011 | Waelbroeck et al. |
| 8,046,290 | B2 | 10/2011 | Fitzpatrick et al. |
| 8,055,576 | B2 | 11/2011 | Merrin et al. |
| 8,065,217 | B2 | 11/2011 | Beddis |
| 8,069,106 | B2 | 11/2011 | Waelbroeck et al. |
| 8,073,763 | B1 | 12/2011 | Merrin et al. |
| 8,082,205 | B2 | 12/2011 | Lutnick et al. |
| 8,095,455 | B2 | 1/2012 | Shapiro et al. |
| 8,095,456 | B2 | 1/2012 | Waelbroeck et al. |
| 8,103,579 | B1 | 1/2012 | Berkeley, III et al. |
| 8,108,278 | B2 | 1/2012 | Tzekin et al. |
| 8,108,283 | B2 | 1/2012 | Dimitri et al. |
| 8,108,299 | B1 | 1/2012 | Waelbroeck et al. |
| 8,117,105 | B2 | 2/2012 | Ford et al. |
| 8,117,609 | B2 | 2/2012 | Lantz et al. |
| 8,139,770 | B2 | 3/2012 | Zheng et al. |
| 8,140,418 | B1 | 3/2012 | Casey |
| 8,156,036 | B1 | 4/2012 | Waelbroeck et al. |
| 8,165,954 | B2 | 4/2012 | Waelbroeck et al. |
| 8,224,702 | B2 | 7/2012 | Mengerink et al. |
| 8,229,855 | B2 | 7/2012 | Huang et al. |
| 8,229,859 | B2 | 7/2012 | Samid |
| 8,239,330 | B2 | 8/2012 | Montero et al. |
| 8,244,622 | B2 | 8/2012 | Hughes, Jr. et al. |
| 8,249,965 | B2 | 8/2012 | Tumminaro |
| 8,255,297 | B2 | 8/2012 | Morgenstern et al. |
| 8,266,045 | B2 | 9/2012 | Waelbroeck et al. |
| 8,271,375 | B2 | 9/2012 | Mahoney et al. |
| 8,275,692 | B2 | 9/2012 | Cartledge et al. |
| 8,280,797 | B2 | 10/2012 | Hatheway et al. |
| 8,285,629 | B2 | 10/2012 | Lutnick et al. |
| 8,301,542 | B2 | 10/2012 | Adcock et al. |
| 8,306,910 | B2 | 11/2012 | Wilkes |
| 8,311,920 | B2 | 11/2012 | Lutnick et al. |
| 8,321,323 | B2 | 11/2012 | Lutnick et al. |
| 8,326,751 | B2 | 12/2012 | Driemeyer et al. |
| 8,346,651 | B2 | 1/2013 | Freitas et al. |
| 8,352,326 | B2 | 1/2013 | Betzler et al. |
| 8,359,253 | B2 | 1/2013 | Waelbroeck et al. |
| 8,359,260 | B2 | 1/2013 | Merrin et al. |
| 8,380,612 | B2 | 2/2013 | Hanson et al. |
| 8,386,362 | B2 | 2/2013 | Failla et al. |
| 8,386,373 | B2 | 2/2013 | Fitzpatrick et al. |
| 8,452,703 | B2 | 5/2013 | O'Leary et al. |
| 8,494,949 | B2 | 7/2013 | Gilbert et al. |
| 8,515,857 | B2 | 8/2013 | Lutnick et al. |
| 8,521,627 | B2 | 8/2013 | Ford et al. |
| 8,548,898 | B2 | 10/2013 | Merrin et al. |
| 8,560,431 | B2 | 10/2013 | Lutnick et al. |
| 8,566,213 | B2 | 10/2013 | Sweeting et al. |
| 8,577,772 | B2 | 11/2013 | Heckman et al. |

(56) References Cited

U.S. PATENT DOCUMENTS

| | | | |
|---|---|---|---|
| 8,583,544 B2 | 11/2013 | Ford et al. | |
| 8,606,685 B2 | 12/2013 | Keiser et al. | |
| 8,620,759 B1 | 12/2013 | Virgilio et al. | |
| 8,630,951 B2 | 1/2014 | Wilkes | |
| 8,635,144 B2 | 1/2014 | Waelbroeck et al. | |
| 8,688,525 B2 | 4/2014 | Minde | |
| 8,688,563 B2 | 4/2014 | Mehew et al. | |
| 8,712,903 B2 | 4/2014 | Lutnick et al. | |
| 8,712,914 B2 | 4/2014 | Lyons et al. | |
| 8,719,131 B1 | 5/2014 | Roth et al. | |
| 8,732,065 B1 | 5/2014 | Hayes, Jr. | |
| 8,738,518 B2 | 5/2014 | Rodin | |
| 8,744,952 B2 | 6/2014 | Mortimer et al. | |
| 8,744,954 B2 | 6/2014 | Buck | |
| 8,751,362 B1 | 6/2014 | Lutnick et al. | |
| 8,768,819 B2 | 7/2014 | Lutnick et al. | |
| 8,775,298 B2 | 7/2014 | Waelbroeck et al. | |
| 8,886,561 B2 | 11/2014 | Gilbert et al. | |
| 8,959,031 B2 | 2/2015 | Merrin et al. | |
| 8,977,565 B2 | 3/2015 | Alderucci et al. | |
| 9,064,256 B2 | 6/2015 | Foley et al. | |
| 9,704,143 B2 | 7/2017 | Walker et al. | |
| 9,727,909 B2 | 8/2017 | Mackay | |
| 9,794,074 B2 | 10/2017 | Toll et al. | |
| 9,811,869 B2 | 11/2017 | Wilson et al. | |
| 9,898,782 B1 | 2/2018 | Winklevoss et al. | |
| 10,026,082 B2 | 7/2018 | Davis | |
| 10,055,715 B1 | 8/2018 | Grassadonia et al. | |
| 10,068,228 B1 | 9/2018 | Winklevoss et al. | |
| 10,084,762 B2 | 9/2018 | Versteeg et al. | |
| 10,146,792 B1 | 12/2018 | Dobrek et al. | |
| 10,269,009 B1 | 4/2019 | Winklevoss et al. | |
| 10,269,084 B2 | 4/2019 | Wilson et al. | |
| 10,354,325 B1 | 7/2019 | Skala et al. | |
| 10,373,158 B1 | 8/2019 | James et al. | |
| 10,540,654 B1 | 1/2020 | James et al. | |
| 10,554,401 B1 | 2/2020 | Lee | |
| 10,650,376 B1 | 5/2020 | Winklevoss et al. | |
| 10,946,283 B1 | 3/2021 | Meilich et al. | |
| 10,999,260 B1 | 5/2021 | Silvestri | |
| 11,139,955 B1 | 10/2021 | So et al. | |
| 11,200,569 B1 | 12/2021 | James et al. | |
| 11,308,487 B1 | 4/2022 | Foster et al. | |
| 11,334,883 B1 * | 5/2022 | Auerbach | G06Q 20/223 |
| 11,443,838 B1 | 9/2022 | Cordonnier | |
| 2002/0129248 A1 | 9/2002 | Wheeler et al. | |
| 2002/0143614 A1 | 10/2002 | MacLean et al. | |
| 2002/0171546 A1 | 11/2002 | Evans et al. | |
| 2003/0009413 A1 | 1/2003 | Furbush et al. | |
| 2003/0014345 A1 | 1/2003 | Lim | |
| 2003/0014749 A1 | 1/2003 | Simons et al. | |
| 2003/0033240 A1 * | 2/2003 | Balson | G06Q 40/06 705/37 |
| 2003/0225672 A1 | 12/2003 | Hughes, Jr. et al. | |
| 2004/0020870 A1 | 2/2004 | Amburgey | |
| 2004/0049464 A1 | 3/2004 | Ohmori et al. | |
| 2004/0143710 A1 | 7/2004 | Walmsley | |
| 2004/0193657 A1 | 9/2004 | Saito et al. | |
| 2004/0223481 A1 | 11/2004 | Juels et al. | |
| 2004/0243488 A1 | 12/2004 | Yamamoto et al. | |
| 2005/0044022 A1 | 2/2005 | Spirgel et al. | |
| 2005/0240510 A1 | 10/2005 | Schweickert | |
| 2006/0254815 A1 | 11/2006 | Humphrey et al. | |
| 2007/0117615 A1 | 5/2007 | Van Luchene | |
| 2007/0146797 A1 | 6/2007 | Sakai et al. | |
| 2007/0219869 A1 | 9/2007 | Haines et al. | |
| 2007/0271455 A1 | 11/2007 | Nakano et al. | |
| 2008/0109280 A1 | 5/2008 | Csoka | |
| 2008/0120221 A1 | 5/2008 | Toneguzzo | |
| 2008/0140578 A1 | 6/2008 | Felt et al. | |
| 2008/0167965 A1 | 7/2008 | Von Nothaus et al. | |
| 2008/0215474 A1 | 9/2008 | Graham | |
| 2008/0243703 A1 | 10/2008 | Al-Herz et al. | |
| 2008/0249957 A1 | 10/2008 | Masuyama et al. | |
| 2008/0281444 A1 | 11/2008 | Krieger et al. | |
| 2009/0089168 A1 | 4/2009 | Schneck | |
| 2009/0094134 A1 | 4/2009 | Toomer et al. | |
| 2009/0098939 A1 | 4/2009 | Hamilton, II et al. | |
| 2009/0119200 A1 | 5/2009 | Riviere | |
| 2009/0132830 A1 | 5/2009 | Haga et al. | |
| 2009/0265268 A1 | 10/2009 | Huang et al. | |
| 2010/0094771 A1 | 4/2010 | Vanderpal | |
| 2010/0174646 A1 | 7/2010 | Cole et al. | |
| 2010/0228674 A1 | 9/2010 | Ogg et al. | |
| 2010/0250360 A1 | 9/2010 | Ball et al. | |
| 2010/0306084 A1 | 12/2010 | Ciptawilangga | |
| 2011/0110516 A1 | 5/2011 | Satoh | |
| 2011/0112662 A1 | 5/2011 | Thompson et al. | |
| 2011/0231913 A1 | 9/2011 | Feng et al. | |
| 2011/0270748 A1 | 11/2011 | Graham, III et al. | |
| 2011/0302412 A1 | 12/2011 | Deng et al. | |
| 2012/0078693 A1 | 3/2012 | Wilkes | |
| 2012/0101886 A1 | 4/2012 | Subramanian et al. | |
| 2012/0123924 A1 | 5/2012 | Rose et al. | |
| 2012/0185395 A1 | 7/2012 | Wilkes | |
| 2012/0233470 A1 | 9/2012 | Everett | |
| 2012/0239543 A1 | 9/2012 | Ryan | |
| 2012/0278200 A1 | 11/2012 | Van Coppenolle et al. | |
| 2013/0036373 A1 | 2/2013 | Alderfer et al. | |
| 2013/0041773 A1 | 2/2013 | Muse | |
| 2013/0054471 A1 | 2/2013 | Samid | |
| 2013/0061049 A1 | 3/2013 | Irvine | |
| 2013/0159699 A1 | 6/2013 | Torkkel | |
| 2013/0166455 A1 | 6/2013 | Feigelson | |
| 2013/0191277 A1 | 7/2013 | O'Leary et al. | |
| 2013/0226827 A1 | 8/2013 | Stevens | |
| 2013/0232023 A2 | 9/2013 | Muse | |
| 2013/0238478 A1 | 9/2013 | Bruno | |
| 2013/0246233 A1 | 9/2013 | Hakim | |
| 2013/0254052 A1 | 9/2013 | Royyuru et al. | |
| 2013/0311266 A1 | 11/2013 | Vichich et al. | |
| 2013/0311348 A1 | 11/2013 | Samid | |
| 2013/0317972 A1 | 11/2013 | Morgenstern et al. | |
| 2013/0317984 A1 | 11/2013 | O'Leary et al. | |
| 2013/0325701 A1 | 12/2013 | Schwartz | |
| 2014/0025473 A1 | 1/2014 | Cohen | |
| 2014/0032267 A1 | 1/2014 | Smith et al. | |
| 2014/0040157 A1 | 2/2014 | Cohen et al. | |
| 2014/0081710 A1 | 3/2014 | Rabie | |
| 2014/0122903 A1 | 5/2014 | Endo et al. | |
| 2014/0141869 A1 | 5/2014 | Shore | |
| 2014/0156497 A1 | 6/2014 | Mehew et al. | |
| 2014/0164251 A1 | 6/2014 | Loh | |
| 2014/0233740 A1 | 8/2014 | Niamut et al. | |
| 2014/0279352 A1 * | 9/2014 | Schaefer | G06Q 40/04 705/37 |
| 2014/0297504 A1 | 10/2014 | Bergenudd et al. | |
| 2014/0297520 A1 | 10/2014 | Levchin et al. | |
| 2014/0310527 A1 | 10/2014 | Veugen et al. | |
| 2014/0344015 A1 | 11/2014 | Puertolas-Montanes et al. | |
| 2014/0359291 A1 | 12/2014 | Wilson et al. | |
| 2015/0032591 A1 | 1/2015 | Jacob | |
| 2015/0033301 A1 | 1/2015 | Pianese et al. | |
| 2015/0120567 A1 | 4/2015 | Van Rooyen et al. | |
| 2015/0120569 A1 | 4/2015 | Belshe et al. | |
| 2015/0170112 A1 | 6/2015 | DeCastro | |
| 2015/0193744 A1 | 7/2015 | Adleman | |
| 2015/0220928 A1 | 8/2015 | Allen | |
| 2015/0227897 A1 | 8/2015 | Loera | |
| 2015/0244690 A1 | 8/2015 | Mossbarger | |
| 2015/0254640 A1 | 9/2015 | Cassano et al. | |
| 2015/0262137 A1 | 9/2015 | Armstrong | |
| 2015/0262138 A1 | 9/2015 | Hudon | |
| 2015/0262139 A1 | 9/2015 | Shtylman | |
| 2015/0262140 A1 | 9/2015 | Armstrong | |
| 2015/0262141 A1 | 9/2015 | Rebernik et al. | |
| 2015/0262168 A1 | 9/2015 | Armstrong | |
| 2015/0262171 A1 | 9/2015 | Langschaedel et al. | |
| 2015/0262172 A1 | 9/2015 | Rebernik | |
| 2015/0262173 A1 | 9/2015 | Durbin et al. | |
| 2015/0262176 A1 | 9/2015 | Langschaedel et al. | |
| 2015/0294308 A1 | 10/2015 | Pauker et al. | |
| 2015/0310424 A1 | 10/2015 | Graham, III | |
| 2015/0324787 A1 | 11/2015 | Schaffner | |

(56) References Cited

U.S. PATENT DOCUMENTS

2015/0332283 A1 11/2015 Witchey
2015/0332395 A1 11/2015 Walker et al.
2015/0341422 A1 11/2015 Farnlof et al.
2015/0348015 A1 12/2015 Ren et al.
2015/0348169 A1 12/2015 Harris et al.
2015/0356523 A1 12/2015 Madden
2015/0356555 A1 12/2015 Pennanen
2015/0363777 A1 12/2015 Ronca et al.
2016/0027229 A1 1/2016 Spanos et al.
2016/0028552 A1 1/2016 Spanos et al.
2016/0078219 A1 3/2016 Hernan
2016/0080156 A1 3/2016 Kaliski, Jr.
2016/0086187 A1 3/2016 Joao
2016/0092988 A1 3/2016 Letourneau
2016/0112200 A1 4/2016 Kheterpal et al.
2016/0125040 A1 5/2016 Kheterpal et al.
2016/0162873 A1 6/2016 Zhou et al.
2016/0203448 A1 7/2016 Metnick et al.
2017/0005804 A1 1/2017 Zinder
2017/0017955 A1 1/2017 Stern et al.
2017/0091750 A1 3/2017 Maim
2017/0124535 A1 5/2017 Juels et al.
2017/0132630 A1 5/2017 Castinado et al.
2017/0154331 A1 6/2017 Voorhees
2017/0236196 A1 8/2017 Isaacson et al.
2017/0293898 A1 10/2017 Rampton
2017/0345011 A1 11/2017 Salami et al.
2017/0352031 A1 12/2017 Collin
2018/0025455 A1 1/2018 Wilson et al.
2018/0068359 A1 3/2018 Preston et al.
2018/0089758 A1 3/2018 Stradling et al.
2018/0089759 A1 3/2018 Stradling et al.
2018/0089760 A1 3/2018 Stradling et al.
2018/0089761 A1 3/2018 Stradling et al.
2018/0091316 A1 3/2018 Stradling et al.
2018/0101906 A1 4/2018 Mcdonald et al.
2018/0121918 A1 5/2018 Higgins
2018/0191503 A1 7/2018 Alwar et al.
2018/0204192 A1 7/2018 Whaley et al.
2018/0218176 A1 8/2018 Voorhees et al.
2018/0367298 A1 12/2018 Wright et al.
2019/0043048 A1 2/2019 Wright et al.
2019/0050541 A1 2/2019 Wright et al.
2019/0050832 A1 2/2019 Wright et al.
2019/0052454 A1 2/2019 Wright et al.
2019/0052458 A1 2/2019 Wright et al.
2019/0057211 A1 2/2019 Wright et al.
2019/0057362 A1 2/2019 Wright et al.
2019/0057382 A1 2/2019 Wright et al.
2019/0058592 A1 2/2019 Wright et al.
2019/0058600 A1 2/2019 Wright et al.
2019/0058733 A1 2/2019 Wright
2019/0066065 A1 2/2019 Wright et al.
2019/0066228 A1 2/2019 Wright
2019/0068365 A1 2/2019 Wright et al.
2019/0073646 A1 3/2019 Wright et al.
2019/0095880 A1 3/2019 Glover et al.
2019/0095909 A1 3/2019 Wright et al.
2019/0102758 A1 4/2019 Wright et al.
2019/0108232 A1 4/2019 Calcaterra et al.
2019/0114706 A1 4/2019 Bell et al.
2019/0116024 A1 4/2019 Wright et al.
2019/0130391 A1 5/2019 Wright et al.
2019/0130399 A1 5/2019 Wright et al.
2019/0180273 A1 6/2019 Cummings et al.
2019/0236564 A1 8/2019 Cantrell et al.
2019/0273725 A1 9/2019 Allen
2019/0340607 A1 11/2019 Lynn et al.
2020/0273048 A1 8/2020 Andon et al.
2020/0274389 A1* 8/2020 Islam .................... G06Q 50/06
2021/0176075 A1 6/2021 Chu et al.
2021/0182272 A1 6/2021 Shpurov et al.
2021/0184841 A1 6/2021 Shpurov et al.
2021/0184843 A1 6/2021 Shpurov et al.
2021/0184850 A1 6/2021 Shpurov et al.
2021/0357914 A1 11/2021 Silvestri et al.
2022/0122062 A1 4/2022 Mayblum et al.
2022/0253842 A1 8/2022 James et al.

FOREIGN PATENT DOCUMENTS

EP 2634738 A1 4/2013
WO WO0026745 A2 5/2000
WO WO0167409 A1 9/2001
WO WO0186373 A2 11/2001
WO WO2008127428 A2 10/2008
WO WO2011008630 A1 1/2011
WO WO2013034278 A2 3/2013
WO WO2015059669 A1 4/2015
WO WO2015085393 A1 6/2015
WO WO2015113519 A1 8/2015
WO WO2015179020 A2 11/2015
WO WO2016008659 A1 1/2016
WO WO2016015041 A1 1/2016
WO WO2016022864 A2 2/2016
WO WO2016029119 A1 2/2016
WO WO2018127923 A1 7/2018
WO WO2019006446 A1 1/2019

OTHER PUBLICATIONS 2-of-3 Paper Wallets, Bitcoin Forum (published Jan. 29, 2013), https://bitcointalk.org/index.php?topic=139625.msg1487254 (last visited Dec. 4, 2013), 13 pages.

A block chain based decentralized exchange, harsh Patel, 9 pages.

A Physical Price Tag For A Digital Currency, Introducing Bittag., BitTag, http://bittag.net/ (last visited Feb. 5, 2014), 7 pages.

A powerful trading platform for Bitcoin traders, BTXTrader.com (Aug. 13, 2013) Internet Archive, https://web.archive.org/web/20130813052513/http:www.btxtrader.com/, 2 pages.

About Bitcoin, Bitcoin.org (May 2, 2013) Internet Archive, http://web.archive.org/web/20130502214154/http://bitcoin.org/en/about, 2 pages.

Sanjay Panikkar et al., ADEPT: An IoT Practitioner Perspective, IBM (2015), 18 pages.

All About Bitcoin, Goldman Sachs, Global Macro Research, Top of Mind, Issue 21 (Mar. 11, 2014), 25 pages.

"AlphaPoint Announces Blockchain Solution Custom-Built for Financial Institututions," AlphaPoint, https://globenewswire.com/news-release/2015/10/26/779929/0/en/AlphaPoint-Announces-blockchain-solution-custom-built-for-financial-institutions.html, Oct. 26, 2015, 3 pages.

"Digital Currency Exhange Goes Live to Publin in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

An Open Source P2P Digital Currency, Bitcoin.org, http://bitcoin.org/en/ (last visited Jul. 22, 2013), 1 page.

Ashlee Vance & Brad Stone, The Bitcoin-Mining Arms Race Heats Up, BloombergBusinessweek, http://www.businessweek.com/articles/2014-01-09/bitcoin-minig-chips-gear-computing-groups-competition-heats-up (last visited Jan. 9, 2014), 10 pages.

Jon Southurst, ATM Industry Association Publishes Report on Bitcoin ATMs, CoinDesk (Published Mar. 20, 2014), http://www.coindesk.com/atm-industry-association-publishes-report-bitcoin-atms/ (last visited Mar. 21, 2014), 8 pages.

ATMIA ATM Industry Association Position Paper, www.atmia.com , Internet, 3 pages.

BANKEX Proof-of-Asset Protocol—The Smart White Paper, version 0.3.1 beta (Oct. 19, 2017) 36 pgs.

Durnford, Barter netwrok aims to help Mile End's cash-strapped live well, The Gazette [Montreal, Que] (Jan. 23, 1996), 5 pages.

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html, 4 pages.

David Andolfatto, Bitcoin and Beyond: The Possibilities and Pitfalls of Virtual Currencies, Federal Reserve Bank of St. Louis, Dialouge with the Fed, Beyond Today's Financial headlines (Mar. 31, 2014), 36 pages.

(56) References Cited

OTHER PUBLICATIONS

Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true, 3 pages.
Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013), 2 pages.
Bitcoin Fund Exclusively Available on EXANTE's Platform, EXANTE, https://exante.eu/press/news/266/ (last visited Oct. 10, 2013), 3 pages.
Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015), 4 pages.
Bitcoin Now on Bloomberg, Bloomberg Now (Apr. 30, 2014) Internet Archive, https://web.archive.org/web/20140430184511/http://www.bloomberg.com/now/2014-04-30/bitcoin-now-bloomberg/, 4 pages.
Bitcoin Theft Insurance, Ecoin Club (published Dec. 3, 2013), http://ecoinclub.com/bitcoin-insurance/ (Last visited Dec. 5, 2013), 3 pages.
Bitcoin's First Kiosk, Robocoin (Jul. 2, 2013) Internet Archive, https://web.archive.org/web/20130702171110/https://robocoinkiosk.com/, 4 pages.
Bitcoin's First Real ATM, Robocoin Blog, http://blog.robocoinkiosk.com/ (last visited Nov. 11, 2013), 11 pages.
Bitcoin, Wikipedia (Jun. 24, 2013), Internet Archieve http://web.archieve.org/web/20130624030646/http://en.wikipedia.org/wiki/Bitcoin, 15 pages.
Bitcoin: a first assessment, FX and Rates | Global, Bank of America Merrill Lynch (Dec. 5, 2013), 14 pages.
Nakamoto, S., "Bitcoin: A Peer-to-Peer Electronic Cash System," www.bitcoin.org. 9 pages.
Francois R. Velde, Bitcoin: A primer, The Federal Reserve Bank of Chicago, Chicago Fed Letter (Dec. 2013), 4 pages.
John Heggestuen, Bitcoin: How It Works, And How It Could Fundamentally Change How Companies and Individuals Handle Payments, BI Intelligence (Jan. 30, 2014), 22 pages.
Bitcoin: Intrinsic Value as Conduit for Disruptive Payment Network Technology, Wedbush, Computer Services: Financial Technology (Dec. 1, 2014), 7 pages.
Bitcoin: Questions, Answers, and Analysis of Legal Issues, Congressional Research Service (Dec. 20, 2013), 20 pages.
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014), 39 Pages.
Julieta Duek and Demian Brener, Bitcoin: Understanding and Assesing potential Opportunities, Quasar Ventures (Jan. 2014), 35 pages.
Bitcoin: Watch the Innovation, Not the Price, Wedbush, Computer Services: Financial Technology (Feb. 14, 2014), 16 pages.
BitcoinAverage.com—independent bitcoin price, Bitcoin Forum, https://bitcointalk.org/index.php?topic=270190.0 (last visited Feb. 24, 2014), 7 pages.
BitcoinAverage.com, Reddit, http://www.reddit.com/r/rBitcoin/comments/1jl9c2/ (last visited Feb. 24, 2014), 6 pages.
Bitcoinaverage code respository, GitHub, https://github.com/bitcoinaverage/bitcoinaverage/commits/master?page=134 (last visited Feb. 24, 2014), 2 pages.
Bitcoins and Banks: Problematic currency, interesting paymetn system, UBS, Global research (Mar. 28, 2014), 36 pages.
Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins-hard-way-using-raw-bitcoin.html, 17 pages.
Bitflash Weekly Review (Apr. 14, 2014), Pantera, https://panteracapital.com/bitflash/ (last visited Apr. 15, 2014), 16 pages.
"Blockchain Technologies Corp Makes History, 2016 Iowa Caucus Results Forever Documented on Blockchain", https://globenewswire.com/news-release/2016/02/06/808320/1059855/en/Blockchain-technologies-corp-makes-history-2016-iowa-caucus-results-forever-documented-on-blockchain.html, Feb. 5, 2016, 2 pages.
Blockchain: Bitcoin Wallet Cryptography Security, Challenges and Countermeasures. Journal of Internet Banking and Finance. www.investopedia.com/university/exchange-traded-funds/. May 15, 2012. (visited on Oct. 15, 2020) (Year: 2012), 17 pages.
Blocktrail | Bitcoin Block, Explorer, Blocktrail (Aug. 18, 2014), https://www.blocktrail.com/, 3 pages.
BTC, Google Finance, https://www.google.com/finance?q=CURRENCY%3ABTC&ei=T-euU7jVFZOUwQPNkIHYCQ (last visited Jul. 11, 2014), 1 page.
Burnable Token, OpenZeppelin.org (accessed Jun. 18, 2018) https://openseppelin.org/api/docs/tokenERC20BurnableToken.html, 2 pages.
Buying and Selling Linden Dollars, Second Life, http://community.secondlife.com/t5/English-Knowledge-Base/Buying-and-selling-Linden-dollars/ta-p/700107 (last visited Dec. 9, 2013), 5 pages.
Charts, Bitcoin Charts (May 10, 2013) Internet Archive, https://web.archive.org/web/20130510172057/http://bitcoincharts.com/charts, 1 page.
Choose Your Wallet, Bitcoin.org (May 30, 2013) Internet ARchieve, http://web.archive.org/web/20130530072551/http://bitcoin.org/en/choose-your-wallet, 4 pages.
Circle (May 19, 2014) Internet Archive, https://web.archive.org/web/20140519175717/https://www.circle.com/, 3 pages.
Jonathan Shieber, Circle Emerges From Stealth To Bring Bitcoin To The Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/, 6 pages.
Coinbase Custody—coinbase.com (retrieved Jul. 9, 2018) https://custody.coinbase.com/ , 3 pages.
Coinbase Custody is Officially Open For Business, The Coinbase Blog, Sam McIngvale (Jul. 2) https://blog.coinbase.com/coinbase-custody-is-officially-open-for-business-182c297d65d9, 4 pages.
Coinbase, Bitcoin Wallet, https://coinbase.com/ (last visited Aug. 15, 2013), 3 pages.
Coinbase, Bitcoin Wallet, Bitcoin made simple, https://coinbase.com/ (last visited Aug. 15, 2013), 5 pages.
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013), 6 pages.
CoinDesk, Bitcoin Price Index, http://www.coindesk.com/price/ (last visited Oct. 28, 2013), 5 pages.
CoinDesk, This week we released the first version of our mobile app on iPhone, Twitter (published May 2, 2014), https://twitter.com/coindesk/status/462255287177453568?refsrc=email (last visited May 5, 2014), 2 pages.
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014), 8 pages.
Coinsetter Launches Out of Beta, Platform Now a Full U.S. Bitcoin Exchange, Coinsetter blog (Jul. 24, 2014), http://www.coinsetter.com/blog/2014/07/24/coinsetter-launches-beta-platform-now-full-us-bitcoin-exchange/ (last visited Jul. 24, 2014), 2 pages.
Compound: The Money Market Protocol—Version 0.2 (Feb. 2018) Robert Leshner, Geoffrey Hayes, 10 pgs., https:compound.finance, Internet.
GitHub—ConsenSys/MultiSigWallet—Ethereum MultiSigWallet (Accessed Jun. 21, 2018) 1 pg., 3. https://github.com/ConsenSys/MultiSigWallet , Internet.
Cosmos, A Network Distributed Ledgers, Jae Kwon and Ethan Buchman, https://cosmos.network/resources/whitepaper, (accessed May 29, 2018) Whitepaper—Resources—Cosmos Network, Internet, 63 pages.
Daniel Roberts, On Winklevoss Bitcoin index, it's open season for developers, Fortune, (Jul. 22, 2014), 3 pages.
Digitizing Trust: Leveraging the Bitcoin Protocol Beyond the "Coin", Wedbush, Computer Services: Financial Technology (Jan. 2, 2014), 7 pages.

(56) References Cited

OTHER PUBLICATIONS

Ina Steiner, eBay Mulls New Feature to Eliminate Deadbeat Bidders, EcommerceBytes Blog (published May 12, 2012) http://www.ecommercebytes.com/C/blog.pl?/pl/2012/5/1336831866.html (last visited May 30, 2014), 2 pages.
Electrum, Bitcoin wiki, https://en.bitcoin.it/wiki/Electrum (last visited Jul. 22, 2013), 5 pages.
Elliptic Vault: Secure, Worry-free Storage For Your Bitcoins, Elliptic.co (Jan. 12, 2014) Internet Archive, https://web.archive.org/web/20140112043128/https://www.elliptic.co/vault, 4 pages.
Daniel Cawrey, Eschewing Price, Pantera Launches BitIndex to Track Bitcoin, CoinDesk (Jul. 10, 2014), http://www.coindesk.com/eschewing-price-pantera-launches-bitindex-track-bitcoin/ (last visited Jul. 11, 2014), 8 pages.
Dapp-bin/wallet.sol at master—ethereum/dapp-bin—GitHub (retrieved Jun. 21, 2018) https:github.com/ethereum/dapp-bin/blob/master/wallet/wallet.sol, 7 pages.
David Harper, Exploring the Exponentially Weighted Moving Average, Investopedia (Mar. 18, 2007) Internet Archive, https://web.archive.org/web/20070318160651/http://www.investopedia.com/articles/07/EWMA.asp, 3 pages.
Facebook announces Libra Cryptocurrency: All you need to know, Josh Constine, techcrunch.com (Jun. 18, 2019), https://techcrunch.com/2019/06/18/facebook-libra/ , internet, 16 pages.
Facebook's Libra Vs. Bitcoin: 5 Key Differences, Daniel Amerman, CFA, seekingalpha.com (Dated Jun. 20, 2019), https://seekingalpha.com/article/4271247-facebooks-libra-vs-bitcoin-5-key-differences?ifp=0 , internet, 10 pages.
FAQ: What's The Difference Between PPCoin and Bitcoin?, GitHub, https://github.com/ppcoin,ppcoin/wiki/FAQ (last visited Jul. 22, 2013), 2 pages.
Ferrara, "'Token Burning' And Other Crypto Jargon Simplified", Nov. 2017, 4 pgs.
First Bitcoin Capital Corp.(otc markets:BITCF) Launches Digital Currency Exchange, CoinQX.com in Beta, The Wall Street Journal MarketWatch, http://www.marketwatch.com/stroy/first-bitcoin-capital-corpotc-markets-bitcf-launches-digital-currency-exchange-coinqxcom-in-beta-2014-05-21 (last visited May 21, 2014), 3 pages.
Mike Calvanese, Flexible Upgradability for Smart Contracts—Level K—Medium (Mar. 10) 15 pgs., https://medium.com/level-k/flexible-upgradibility-for-smart-contracts-9778d80d1638.
Fundamentals, FAQ (Accessed Jun. 26, 2018) 10 pgs. https://faq.rsk.com/en/main/ , INternet.
GutHub—gnosis/MultiSigWallet: allows multiple parties to agree on transactions before execution, (Accessed Jun. 21, 2018) 3 pgs., https://github.com/Gnosis/MultiSigWallet , Internet.
Goldman Sachs Group, Goldman Sachs files patent for virtual settlement currency, Financial Times, https://www.ft.com/contentb0d81614-997c-11e5-9228-87e603d47bdc (last visited Oct. 3, 2018), 4 pages.
Home—OmniLayer/omnicore Wiki—GitHub—Welcome to the Omni Core wiki! (Accessed Jun. 26, 2018) 1 pg., https://github.com/OmniLayer/omnicore/wiki , Internet, 4 pages.
How Bitcoin is Driving Digital Innovation in Entertainment, Mediaand Communications (EMC), PwC Consumer Intelligence Series, Digital Disruptor, (Jan. 27, 2014), 19 pages.
How Bitcoin Works Under The Hood, Imponderable Things (Scott Driscoll's Blog) (published Jul. 14, 2013), http://www.imponderablethings.com/2013/07/how-bitcoin-works-under-hood.html (last visited Oct. 10, 2013), 16 pages.
How DigiCash Blew Everything, Next (published Jan. 1999), http://cryptome.org/jya/digicrash.htm (last visited Jan. 9, 2014), 6 pages.
How Does Bitcoin Work? , Bitcoin.org, (May 1, 2013) Internet Archive, http://web.archive.org/web/20130501092121/http://bitcoin.org/en/how-it-works, 2 pages.
How is Mt. Gox weighted average calculated?, Bitcoin Forum (Mar. 18, 2013), https://bitcointalk.org/index.php?topic=154548.0 (last visted Jul. 25, 2013), 2 pages.
Co/MintableToken.sol at master—TokenMarketNet/ico—GitHub (Accessed Jun. 21, 2018), 2 pgs., https://github.com/TokenMarketNet/ico/blob/master/contracts/MintableToken.sol , internet.
Co/Upgradeable Token.sol at master—TokenMarketNet/ico—GitHub (Accessed Jun. 8, 2018 3 pgs., https://github.com/TokenMarketNet/ico/blob/master/contracts/UpgradeableToken.sol , Internet.
Independent Bitcoin Price, BitcoinAverage, https://bitcoinaverage.com/explain.htm (last visited Mar. 4, 2014), 2 pages.
Interledger Architecture | Interledger (Accessed May 29, 2018), 11 pgs. https://interledger.org/rfcs/0001-interledger-architecture/draft-2.html, Internet.
Introducing BDIC: Bitcoin's decentralized, privately-funded version of the FDIC, Reddit (Published Dec. 4, 2013), http://www.reddit.com/r/Bitcoin/comments/1s365o/introducing_bdic_bitcoins_decentralized/ (last visited Dec. 5, 2013), 4 pages.
Introducing Compound, the Money Market Protocol, Robert Leshner, medium.com (Jan. 30, 2018) https://medium.com/compound-finance/introducing-compound-the-money-market-protocol-4b9546bac87 , Internet, 4 pages.
TrustToken, Introducing Crunchbase Pro, https://www.crunchbase.com/organization/trusttoken#section-overview, accessed Apr. 16, 2018, 1 pg., TrustToken | Crunchbase, Internet.
Jerry Brito, et al., Bitcoin, A Primer for Policymakers (2013), 48 pages.
JP Morgan Has Big Plans for Blockchain by Rakesh Sharma, May 10, 2018, Investopedia, 6 pgs., https://www.investopedia.com/news/jpmorgan-has-big-plans-blockchain/ , Internet.
The audacity of bitcoin, Risks and opportunites for corporates and investors, Global rates & FX Research, J.P. Morgan (Feb. 11, 2014), http://www.jpmorganmarkets.com/GlobalFXStrategy, 8 pages.
Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013), 6 pages.
JPMorgan Trial Puts Debt Issuance on a Blockchain, Sujha Sundararajan, CoinDesk, (Apr. 10, 2018) 8 pgs., https://www.coindesk.com/jpmorgan-trial-puts-debt-issuance-on-a-blockchain/ , INternet.
Ken Hawkins, Exchange-Traded Funds (EFTs), Investopedia (May 12, 2013) Internet Archive, https://web.archive.org/web/20130512125447/http://www.investopedia.com/university/exhnage-traded-fund/, 3 pages.
Leviar—An Anonymous, Secure, and Private Cryptocurency, Leviar Coin 16 pages.
LeviarCoin, "LeviarCoin Announces Crowdsale for Its Revolutionary Blockchain-Based In-App Purchases and Software Protection Platform" https://leviarcoin.org , published Jun. 2, 2017, 4 pages.
Lisa Fleisher, London's New Bitcoin Exchange Hopes to Avoid Mt. Gox Fate, The Wall Street Journal (published Apr. 30, 2014), http://blogs. wsj.com/digits/2014/04/30/londs-new-bitcoin-exchange-hopes-to-avoid-mt-gox-fate/ (last visited May 1, 2014), 3 pages.
[ANN] M-of-N "Fragmented Backups" now in Aromory (command-line only), Bitcoin Forum (Mar. 6, 2013), https://bitcointalk.org/index.php?topic=149820.0 (last visited Dec. 4, 2013), 13 pages.
Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014), 7 pages.
Marketplace—Gemini, web.archive.org (Last modified Jan. 8, 2018) http://web.archive.org/web/20180125115941/https://gemini.com/marketplace/ , Internet, 10 pages.
Marketplace—Gemini, web.archive.org (Last modified Nov. 25, 2017) http:web.archive.org/web/20171211092415/https://gemini.com/marketplace/ , Internet, 7 pages.
Marketplace, gemini.com (Last modified Sep. 20, 2018) https://gemini.com/marketplace/ , Internet, 14 pages.
Markets API, Bitcoin Charts (Jun. 3, 2013) INternet Archive, https://web.archive.org/web/20130603091557/http://bitcoincharts.com/about/markets-api, 2 pages.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013), 5 pages.

(56) References Cited

OTHER PUBLICATIONS

James Ball, Meet the seven people who hold the keys to worldwide internet security, The Guardian, http://www.theguardian.com/technology/2014/feb/28/seven-people-keys-worldwide-internet-security-web (last visited Mar. 7, 2014), 8 pages.
MintableToken contract MintableToken is StandardToken—OpenZeppelin 1.8.0, OpenZeppelin.org (Accessed Jun. 18, 2018) 3 pgs., https://openseppelin.org/api/docs/token_ERC20_MintableToken.html , Internet.
Move: A Language With Programmable Resources, Sam Blackshear et al., Libra Association, (2019) 26 pages.
Moving Towards Permissionless Consensus, libra.org (Accessed Jun. 20, 2019), 12 pages, internet.
GitHub—BitGo/eth-multisig-v2: Multi-Sig Wallet v2, supporting original Wallet.sol methods with additional confirmAndExecute improvements to allow for single-transaction signing by multiple owners (retrieved Jun. 21, 2018) https://github.com/BitGo/eth-multisig-v2 , 2 pages.
"Nasdaq Launches Enterprise-Wide Blockchain Technology Initiative", Nasdaq, https://globenewswire.com/news-release/2015/05/11/734456/10133665/en/nasdaq-launches-enterprise-wide-blockchain-technology-initiative.html, May 11, 2015, 3 pages.
Nasdaq Linq Enables First-Ever Private Securites Issuance Documented with Blockchain Technology, Nasdaq, https://globenewswire.com/news-release/2015/12/20/798660/0/en/Nasdaq-Linq-enables-first-ever-private-securities-issuance-documented-with-blockchain-technology.html, Dec. 30, 2015, 3 pages.
New batchOverflow Bug in Multiple ERC20 Smart Contracts (CVE-2018-10299) A Blockchain Security Company—Peckshield (Apr. 22, 2018) medium.com/@peckshield/alert-new-batchoverflow-bug-in-multiple-erc20-smart-contracts-cve-2018-10299-511067db6536 , Internet, 3 pages.
Notice of References Cited, U.S. Appl. No. 12/192,809 (Oct. 10, 2012), 1 page.
NYC Bitcoin Exchange Coinsetter Launches Out of Beta With Institutional and Consumer Trading, MarketWatch (published Jul. 24, 2014), http://www.marketwatch.com/stroy/nyc-bitcoin-exchange-coinsetter-launches-out-of-beta-with-institutional-and-consumer-trading-2014-07-24 (last visited Jul. 24, 2014), 3 pages.
Office Action for U.S. Appl. No. 15/920,042 dated Oct. 1, 2020, Cameron Winklevoss, "Systems, Methods, and Program Products for Verifying Digital Assets Held in a Custodial Digital Asset Wallet", 8 pages.
Office Action for U.S. Appl. No. 17/238,500, dated Oct. 12, 2022, Winklevoss, "Systems, Methods, and Program Products for a Digital Math-Based Asset Exchange" 9 pages.
Office Action for U.S. Appl. No. 17/201,223, dated Oct. 6, 2022, Winklevoss, "Systems for Redeeming Shares in an Entity Holding Digital Math-Based Assets", 9 pages.
Office Action for U.S. Appl. No. 17/248,592, dated May 11, 2022, Winklevoss, "Systems for Purchasing Shares in an Entity Holding Digital Math-Based Assets", 11 pages.
Office Action for U.S. Appl. No. 17/201,223, dated May 26, 2022, Winklevoss, "Systems for Redeeming Shares in an Entity Holding Digital Math-Based Assets", 7 pages.
Office Action for U.S. Appl. No. 16/911,121, dated Sep. 21, 2022, Auerbach, "Systems, Methods, and Program Products for Exchanging Digital Assets for Fiat and/or Other Digital Assets", 14 Pages.
Online auctions: An in-depth look, National Consumers League, http://www.nclnet.org/personal-finance/121-online-auctions/279online-auctions-an-in-depth-look (last visted May 30, 2014), 7 pages.
Openzeppelin-solidity/BurnableToken.sol at master—OpenZeppelin/openzeppelin-solidity—GitHub, Internet, https://github.com/OpenZeppelin/openzeppelin-solidity/blob/master/contracts/token/ERC20/BurmableToken.sol , 1 pg, accessed Jun. 18, 2018.
OpenZeppelin/openzeppelin-solidity (Accessed Jun. 21, 2018) 3 pgs., https://github.com/OpenZeppelin/openzeppelin-solidity/blob/master/contracts/token/ERC20/StandardToken.sol , Internet.
Polkadot paper, Dr. Gavin Wood, Version: 1 (Sep. 20, 2017), 20 pages.
PPCoin Proof of Stake Minting Setup Guide, Bitcoin Forum (Apr. 25, 2013) https://bitcointalk.org/index.php?topic=1877714.0 (last visited Jul. 22, 2013), 10 pages.
PPCoin, Wikipedia, http://en.wikpedia.org/wiki/PPCoin (last visited Jul. 22, 2013), 4 pages.
Sunny King & Scott Nadal, PPCoin: Peer-to-Peer Crypto-Currency with Proof-of-Stake, (Aug. 19, 2012), 6 pages.
Private Bitcoin Insurance, Inscrypto, http://go.inscrypto.com (last visited Jan. 24, 2014), 1 page.
Proof of stake instead of proof of work, Bitcoin Forum, https://bitcointalk.org/index.php?topic=27787 (last visited Nov. 6, 2015), 9 pages.
Larry Ren, Proof of Stake Velocity: Building the Social Currency of the Digital Age, www.redcoin.com (Apr. 2014), 13 pages.
Proof-of-stake, Wikipedia, http://en.wikipedia.org/wiki/Proof-of-stake (last visited Jul. 22, 2013), 10 pages.
Proof-of-work System, Wikipedia, http://en.wikipedia.org/wiki/Proof-of-work (last visited Jul. 22, 2013), 4 pages.
Protocol of Bitcoin, Wikipedia, http://en.wikipedia.org/wiki/Bitcoin_mining (last visited Jul. 22, 2013), 5 pages.
Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014), 3 pages.
Rafael Cosman, https://www.facebook.com/rafaelCosman, Internet, accessed Apr. 16, 2018, 14 pgs., Facebook, Internet.
Rafael Cosman, RafaelCosman (Rafael Cosman)• GitHub, https:/lgithub.com/RafaelCosman, accessed Apr. 16, 2018, 1 pg., Internet.
Rafael Cosman, RafaelCosman (Rafael Cosman) | Repositories • GitHub, https://github.com/RafaelCosman?page=2&tab=repositories, accessed Apr. 16, 2018, 3 pgs., Internet.
Rafael Cosman, Rafael Cosman (@RafaelCosman) | Twitter, https://twitter.com/rafaelcosman?lang=en, accessed Apr. 16, 2018, 23 pgs, Internet.
Evan L. Greebel et al., Recent Key Bitcoin and Virtual Currency Regulatroy and Law Enforecment Developments, Virtual Currency Advisory, Katten Muchin Rosenman LLP (Nov. 13, 2014), 4 pages.
Request for Administrative Ruling on the Application of FinCEN's Regulations to a Virtual Currency Payment System, United States Department of the Treasury, FinCEN, (Oct. 27, 2014). FIN-2014-R011, 7 pages.
Ronald A. Glantz, Pantera Primer, (Mar. 11, 2014), 16 pages.
"RR Donnelley to Pursue New Blockchain-Eneabled Capabilities for Publishing Industry," https://globenewswire.com/news-release/2016/03/14/819355/0/en/pr-donnelley-to-pursue-new-blockchain-enabled-capabilities-for-publishing-industry.html, Mar. 14, 2016, 3 pages.
Secuirty for Your Peace of Mind, Coinbase, https://coinbase.com/security (last visited Oct. 28, 2013), 6 pages.
Securing Your Wallet, Bitcoin.org (Jul. 21, 2013) Internet Archive, http:/web.archive.org/web/20130721194621/http://bitcoin.org/en/secure-your-wallet, 4 pages.
Shamir's Secret Sharing, Wikipedia, http://en.wikipedia.org/wiki/Shamir's_Secret_Sharing (last visited Jul. 22, 2013), 5 pages.
Rob Wile, Shares Of No-Name Tech Company Go Crazy After It Announces It's Getting Into The Bitcoin Game, business Insider, http://www.businessinsider.com/wcps-bitcoin-2013-12?hr_email_referer=1&utm_source=Triggermail&utm_medium=email&utm_content=emailshare (last visited Dec. 30, 2013), 11 pages.
Smart Contract Upgradeability using Eternal Storage (Accessed Jun. 8, 2018) 6 pgs., 3. https://blog.zeppelinos.org/smart-contract-upgradeability-using-eternal-storage/ , Internet.
Some Things You Need To Know, Bitcoin.org (May 2, 2013) Internet Archive, http://web.archive.org/web/20130502051011/http://bitcoin.org/en/you-need-to-know, 2 pages.
State Machine Replication in the Libra Blockchain, Mathieu Baudet et al., Libra Association, (2019) 41 pages.
State of Bitcoin 2014, CoinDesk (Feb. 26, 2014), 91 pages.
Superbitcoin—Supersmartbitcoin.com (Accessed Jun. 26, 2018) 8 pgs., http://supersmartbitcoin.com/ , Internet.
Tether : Fiat currencies on the Bitcoin blockchain (20 pgs.).
The Ambitious Plan Behind Facebook's Cryptocurrency, Libra, Steven Levy and Gregory Barber, Wired.com (Jun. 18, 2019),

(56) References Cited

OTHER PUBLICATIONS https://www.wired.com/story/ambitious-plan-behind-facebooks-cryptocurrency-libra/ , internet, 16 pages.
Jeremy Allaire, What We Have Been Up to at Circle, The Circle Blog (May 19, 2014) Internet Archive, https://web.archive.org/web/20140519162958/https://www.circle.com/2014/05/15/circle-update/, 6 pages.
The Libra Blockchain, Amsden et al., Libra Association Members (2019), 29 pages.
The Libra Reserve, Libra.org, https://libra.org/en-US/about-currency-reserve/#the_reserve , (2019) 10 pages, internet.
The Ripple Network Review—What is Ripple?, Donald McIntyre—Etherplan (Aug. 1, 2013) https://etherplan.com/2013/08/01/the-ripple-network-what-is-ripple/4103/ , Internet, 4 pages.
The Security Token Thesis—Hacker Noon, Stephen McKeon, https://hackernoon.com/the-security-token-thesis-4c5904761063, (accessed May 29, 2018), Hackernoon.com, Internet, 21 pages.
TigerDirect.com Now Accepts Bitcoin Payments!, TigerDirect, http://www.tigerdirect.com/bitcoin/ (last visited Feb. 6, 2014), 4 pages.
Timing and Sizing the Era of Bitcoin, Wedbush, Computer Services: Financial Technology (May 27, 2014), 14 pages.
Token Standard Extension for Increasing & Decreasing Supply, Alex Miller—ethereum/EIPs—GitHub (retrieved Jun. 21, 2018), https://github.com/ethereum/EIPs/pull/621 , 21 pages.
ERC 644: Token Standard for Modular and Upgradeable Tokens—Issue #644—ethereum/EIPs—GitHub, (opened by chrisfranko—Jun. 16, 2017) https://github.com/ethereum/EIPs/issues/644 , 9 pages.
Trading Namecoins for Bitcoins, Bitcoin Forum, https://bitcointalk.org/index.php?topic=6289.0 (last visited Nov. 6, 2015), 5 pages.
Stephen Kade, TrueUSD: A Stablecoin That You Can Redeem 1-for-1 for US Dollars, https://blog.trusttoken.com/trueusd-a-backed-stablecoin-you-can-trust-9688796cfd0d, Jan. 23, 2018—accessed Apr. 16, 2018, 9 pages., Internet.
TrustProtocol, Commits• trusttoken/TrustProtocol • GitHub, https://github.com/trusttoken/TrustProtocol/commits/master?after=54f8673366f8dc79cbf4f2aa3e9416bb7c18150d+34, 1 pg_, accessed Apr. 16, 2018, Internet, 1 page.
TrustToken, Executive Summary, https://docsend.com/view/ws6tkvs, Feb. 14, 2018 (accessed Apr. 16, 2018) 7 pgs., Version 0.61, TrustToken, Internet, 7 pages.
TrustToken Team, TrustToken Launches TrueUSD Stablecoin on Bittrex Exchange, https://blog.trusttoken.com/trusttoken-pre-sale-and-main-sale-faq-f7914f74fb6d, Feb. 15, 2018 (accessed Apr. 16, 2018) 5 pgs., TrustToken, Internet, 4 pages.
Teachrecaps, TrustToken Private and Public Pre-Sale FAQ, https://hackemoon.com/trusttoken-launches-trueusd-stablecoin-on-bittrex-exchange-f506ac5cf6fc, Mar. 8, 2018 (accessed Apr. 16, 2018) 4 pgs., TrustToken, Internet, 5 pages.
TrustToken Team: TrueUSD, the world's first legally-backed stable cryptocurrency , is now trading on Bittrex, (pub. Mar. 5, 2018), https://blog.trusttoken.com/trueusd-the-worlds-first-legally-backed-stable-cryptocurrency-is-now-trading-on-bittrex-6a49b621f058 (last visited Apr. 16, 2018), 6 pages.
TrustToken, Tokenization you can Trust, https://github.com/trusttoken, accessed Apr. 16, 2018, 2 pgs., TrustToken | GitHub, Internet, 2 pages.
U.S. Appl. No. 60/884,172, filed Jan. 9, 2007, 50 pages.
John Mccrank—UK-based Coinfloor to launch physically settled bitcoin futures—Reuters (Accessed Jun. 18, 2018) 2 pgs., https://uk.reuters.com/article/uk-crypto-currencies-coinfloor/uk-based-coinfloor-to-launch-physically-settled-bitcoin-futures-idUKKCHGQ2DF , Internet.
Upgradeable Solidity Contract Design—Rocket Pool—Medium, David Rugendyke (Nov. 21, 2017) 21 pgs., https://medium.com/rocket-pool/upgradeable-solidity-contract-design-54789205276d , Internet.
USD Average Price History, BitcoinAverage, https://bitcoinaverage.com/chart.hmt@USD-averages-all (last visited Feb. 24, 2014), 6 pages.
Using Offline Wallets in Armory, Armory (May 20, 2013) Internet Archive, http://web.archive.org/20130520100213/https://bitcoinarmory.com/using-offline-wallets-in-armory/, 5 pages.
Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014), 7 pages.
We make it easy to build secure, high level services on top of the Bitcoin protocol, Trusted Coin (Dec. 26, 2013) Internet Archive, https://web.archive.org/web/20131226232433/https://api.trustedcoin.com/f, 2 pages.
"What is Blockchain Technology?" Quora. N.p. 15, Jan. 2009. Jun. 9, 2017. <https://www.quora.com/What-is-blockchain-technology-1>, 4 pages.
"What Is Blockchain Technology?" Quora. N.p. Jan. 15, 2009. Web. Jun. 9, 2017. <https://www.quora.com/What-is-)lockchain-technology-1 >. (Year: 2009), 4 pages.
Why Bitcoin Is Changing The World, Bitcoin.org (Jun. 20, 2013) Internet Archive, http://web.archive.org/web/20130620062218/http://bitcoin.org/en/innovation, 2 pages.
WINKBTCO Index, Bloomberg Finance L.P. (Jun. 16, 2014), 4 pages.
Winklevoss Bitcoin Trust Amendment No. 3 to Form S-1 Registration Statement, SEC (May 8, 2014), available at http://www.sec.gov/Archives/edgar/data/1579346/000119312514190365/d721187ds1a.htm, 78 pages.
Winklevosses' Gemini to Offer Cryptocurrency Block Trading, Olga Kharis and Matthew Leising, Bloomberg.com (Apr. 9, 2018) https://www.bloomberg.com/news/articles/2018-04-09/winklevoss-s-gemini-to-offter-cryptocurrency-block-trading , Internet, 3 pages.
World Bank taps Australia's CBA for blockchain bond, Reuters (Aug. 9, 2018) https://www.reuters.com/article/us-worldbank-cba-blockchain/world-bank-taps-austrailas-cba-for-blockchain-bond-idUSKBN1KV02D , Internet, 3 pages.
World Gold Council, How SPDR Gold Shares (2840 HK) are Created and Redeemed (Mar. 2013), 2 pages.
Writing upgradeable ontracts in Solidity—Colony, Elena Dimitrova (Jun. 8, 2016) 18 pgs., https://blog.colony.io/writing-upgradeable-contracts-in-solidity-6743f0eecc88 , Internet.
John Biggs, Xapo Raises $20 Million TO Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/, 4 pages.
Yacine Ghalim and Max Nieferhofer, bitcoin: Primer, State of Play, Discussion. Courmayeur, Sunstone Capital (Jan. 24, 2014), 22 pages.
Office Action for U.S. Appl. No. 17/248,592, dated Aug. 18, 2023, Winklevoss, "Systems for Purchasing Shares in an Entity Holding Digital Math-Based Assets", 8 pages.
Office Action for U.S. Appl. No. 17/248,592, dated Mar. 17, 2023, Cameron Winklevoss, "Systems for Purchasing Shares in an Entity Holding Digital Math-Based Assets", 11 pages.
Office Action for U.S. Appl. No. 17/201,223, dated Feb. 15, 2023, Winklevoss, "Systems for Redeeming Shares in an Entity Holding Digital Math-Based Assets", 9 pages.
Office Action for U.S. Appl. No. 16/911,121, dated Mar. 2, 2023, Auerbach,"Systems, Methods, and Program Products for Exchanging Digital Assets for Fiat and/or Other Digital Assets",19 Pages.
Office Action for U.S. Appl. No. 17/966,221, dated Jun. 21, 2023, Inventor #1 Michael So, "Systems, Methods, and Program Products for Loaning Digital Assets and for Depositing, Holding and/or Distributing Collateral as a Token in the Form of Digital Assets on an Underlying Blockchain," 16 pages.
Office Action for U.S. Appl. No. 17/966,221, dated Oct. 5, 2023, Michael So, "Systems, Methods, and Program Products for Loaning Digital Assets and for Depositing, Holding and/or Distributing Collateral as a Token in the Form of Digital Assets on an Underlying Blockchain", 20 pages.

* cited by examiner

Transaction Ledger 115

| Transaction ID | Date | Fee | Origin Identifiers | Amount from Origin | Destination Identifiers | Destination Amount |
|---|---|---|---|---|---|---|
| f06dbf23bc69b7fc155f337<br>3aa6e41cdc1c75da613685<br>95c017b13d7b7c16552 | 2014-06-24<br>20:41:32 | 0 | 19ZmwSkMbkTjA7qRUdUEiwLqgRaMRRLDkh<br>19ZmwSkMbkTjA7qRUdUEiwLqgRaMRRLDkh | 500<br>500 | 122BNoyhmuUt9G9mdEm3mN4nb73c1UgNKt | 1000 |
| 9cd9cef3b96936c8c3a1b7c<br>1f6a0de17a3cfcf94c575b7<br>92638bef85c069de58 | 2014-06-24<br>20:41:32 | 0.0001 | 1EvwbspD9jYbH2ZSq6TFbPxftkM8ej5YqP | 45.9983 | 1PXdpLs2k3ETn9vcL4SRp3UiHxHiiMJzXb<br>18S6KTQKH2uUS1GG965Rncn8YmS6jhtkGC | 42.1724747<br>3.8257253 |
| 5f3fb8557633e61e9ab20e<br>b461552a97423c7b3a38b7<br>414e7c672d41efd9c830 | 2014-06-24<br>20:41:32 | 0 | 15u7FXhfiaW7EYWwiv2ayA9duahXb858nv | 303.92706127 | 17ZQyJ7KtgfNhGVWVLc8gdDi6ByyRUqZ8G<br>12eqJZbQpRoYqa68xGtWq8p8d5UpwZqCek | 154.77363532<br>149.15342595 |
| 535936b199bb3fcbc8d15e<br>e38bb735c6929dd360ea05<br>e27a19514bc4be82d69f | 2014-06-24<br>20:41:32 | 0.00005 | 1JW8RphYjfsnTyV4W62GHpm9QhA2wVPvap | 18.0475292 | 1Bv9zL95kSWp3pgVDtrVtTNQafFaukXoUk<br>1GnhQNChqguuqgGAtVuijmqxPtk8PZy4EV | 17.2974792<br>0.75 |
| 4616da18de8943f33da984<br>12a6fc8f70c5c0843637d7f<br>b28b9ea9986f31b55ef | 2014-06-24<br>20:41:32 | 0.0001 | 1GD64WARGDLYG71WTTgCpRMpePr1BnmGij | 5 | 1Hrj1qUAer7yUNP8pPxSmhQoifGqW3NfFA<br>1NRNnusa3D4sxxzig5fvwmX1thDnR9w3ZJ<br>1GD64WARGDLYG71WTTgCpRMpePr1BnmGij | 3.45703682<br>0.01388369<br>1.52897749 |

FIG. 2

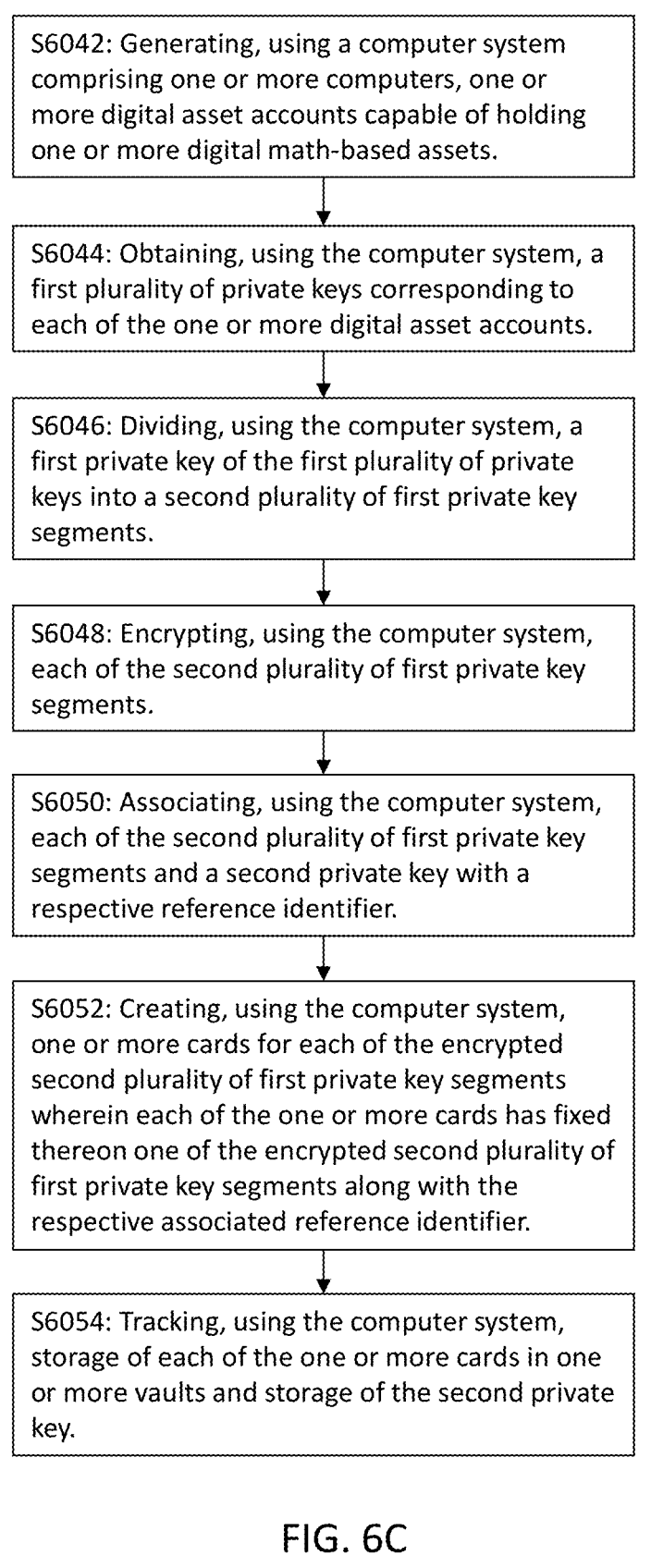

S6042: Generating, using a computer system comprising one or more computers, one or more digital asset accounts capable of holding one or more digital math-based assets.

↓

S6044: Obtaining, using the computer system, a first plurality of private keys corresponding to each of the one or more digital asset accounts.

↓

S6046: Dividing, using the computer system, a first private key of the first plurality of private keys into a second plurality of first private key segments.

↓

S6048: Encrypting, using the computer system, each of the second plurality of first private key segments.

↓

S6050: Associating, using the computer system, each of the second plurality of first private key segments and a second private key with a respective reference identifier.

↓

S6052: Creating, using the computer system, one or more cards for each of the encrypted second plurality of first private key segments wherein each of the one or more cards has fixed thereon one of the encrypted second plurality of first private key segments along with the respective associated reference identifier.

↓

S6054: Tracking, using the computer system, storage of each of the one or more cards in one or more vaults and storage of the second private key.

FIG. 6C

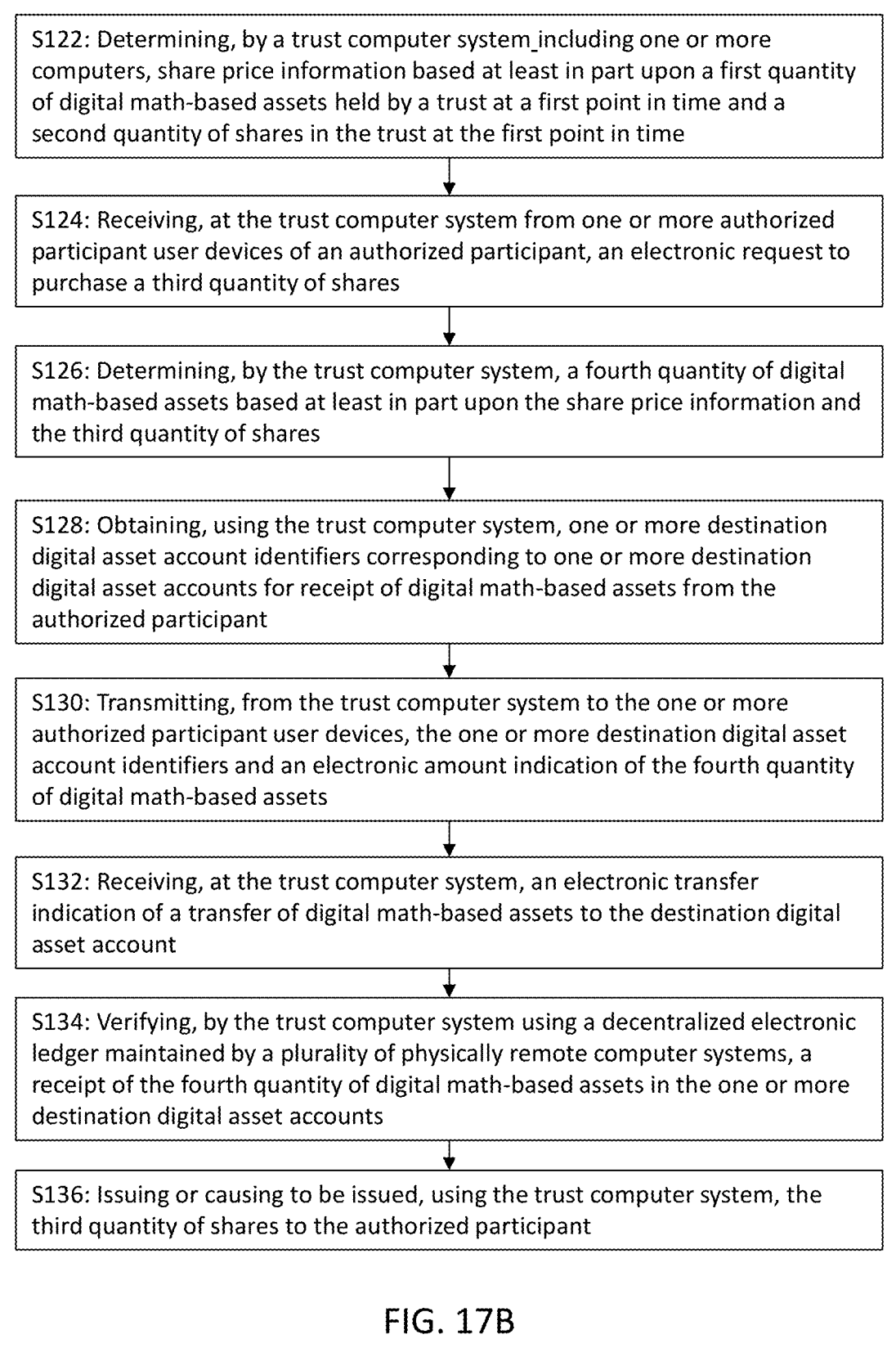

S122: Determining, by a trust computer system_including one or more computers, share price information based at least in part upon a first quantity of digital math-based assets held by a trust at a first point in time and a second quantity of shares in the trust at the first point in time

↓

S124: Receiving, at the trust computer system from one or more authorized participant user devices of an authorized participant, an electronic request to purchase a third quantity of shares

↓

S126: Determining, by the trust computer system, a fourth quantity of digital math-based assets based at least in part upon the share price information and the third quantity of shares

↓

S128: Obtaining, using the trust computer system, one or more destination digital asset account identifiers corresponding to one or more destination digital asset accounts for receipt of digital math-based assets from the authorized participant

↓

S130: Transmitting, from the trust computer system to the one or more authorized participant user devices, the one or more destination digital asset account identifiers and an electronic amount indication of the fourth quantity of digital math-based assets

↓

S132: Receiving, at the trust computer system, an electronic transfer indication of a transfer of digital math-based assets to the destination digital asset account

↓

S134: Verifying, by the trust computer system using a decentralized electronic ledger maintained by a plurality of physically remote computer systems, a receipt of the fourth quantity of digital math-based assets in the one or more destination digital asset accounts

↓

S136: Issuing or causing to be issued, using the trust computer system, the third quantity of shares to the authorized participant

FIG. 17B

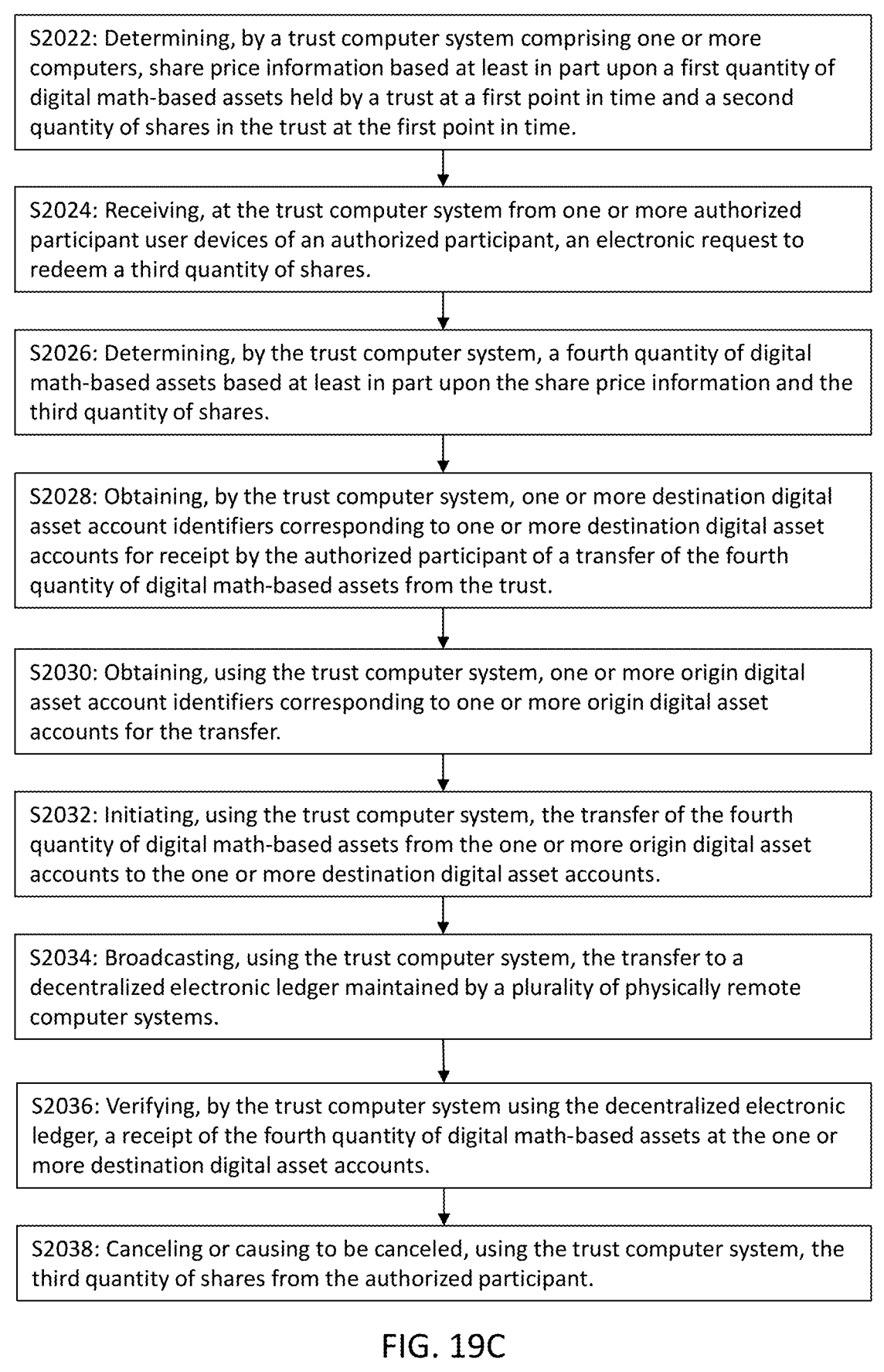

S2022: Determining, by a trust computer system comprising one or more computers, share price information based at least in part upon a first quantity of digital math-based assets held by a trust at a first point in time and a second quantity of shares in the trust at the first point in time.

↓

S2024: Receiving, at the trust computer system from one or more authorized participant user devices of an authorized participant, an electronic request to redeem a third quantity of shares.

↓

S2026: Determining, by the trust computer system, a fourth quantity of digital math-based assets based at least in part upon the share price information and the third quantity of shares.

↓

S2028: Obtaining, by the trust computer system, one or more destination digital asset account identifiers corresponding to one or more destination digital asset accounts for receipt by the authorized participant of a transfer of the fourth quantity of digital math-based assets from the trust.

↓

S2030: Obtaining, using the trust computer system, one or more origin digital asset account identifiers corresponding to one or more origin digital asset accounts for the transfer.

↓

S2032: Initiating, using the trust computer system, the transfer of the fourth quantity of digital math-based assets from the one or more origin digital asset accounts to the one or more destination digital asset accounts.

↓

S2034: Broadcasting, using the trust computer system, the transfer to a decentralized electronic ledger maintained by a plurality of physically remote computer systems.

↓

S2036: Verifying, by the trust computer system using the decentralized electronic ledger, a receipt of the fourth quantity of digital math-based assets at the one or more destination digital asset accounts.

↓

S2038: Canceling or causing to be canceled, using the trust computer system, the third quantity of shares from the authorized participant.

FIG. 19C

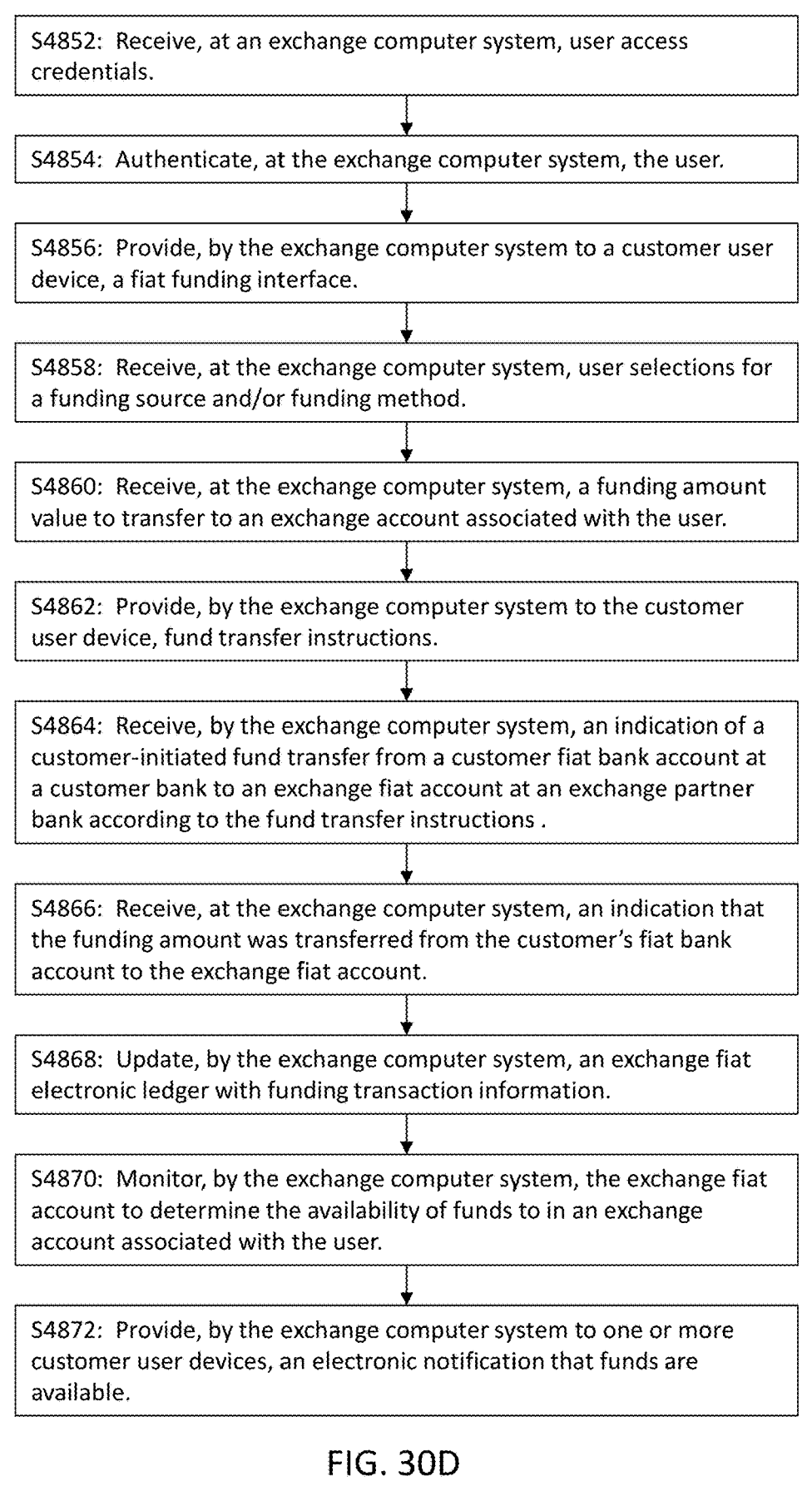

S4852: Receive, at an exchange computer system, user access credentials.

↓

S4854: Authenticate, at the exchange computer system, the user.

↓

S4856: Provide, by the exchange computer system to a customer user device, a fiat funding interface.

↓

S4858: Receive, at the exchange computer system, user selections for a funding source and/or funding method.

↓

S4860: Receive, at the exchange computer system, a funding amount value to transfer to an exchange account associated with the user.

↓

S4862: Provide, by the exchange computer system to the customer user device, fund transfer instructions.

↓

S4864: Receive, by the exchange computer system, an indication of a customer-initiated fund transfer from a customer fiat bank account at a customer bank to an exchange fiat account at an exchange partner bank according to the fund transfer instructions .

↓

S4866: Receive, at the exchange computer system, an indication that the funding amount was transferred from the customer's fiat bank account to the exchange fiat account.

↓

S4868: Update, by the exchange computer system, an exchange fiat electronic ledger with funding transaction information.

↓

S4870: Monitor, by the exchange computer system, the exchange fiat account to determine the availability of funds to in an exchange account associated with the user.

↓

S4872: Provide, by the exchange computer system to one or more customer user devices, an electronic notification that funds are available.

FIG. 30D

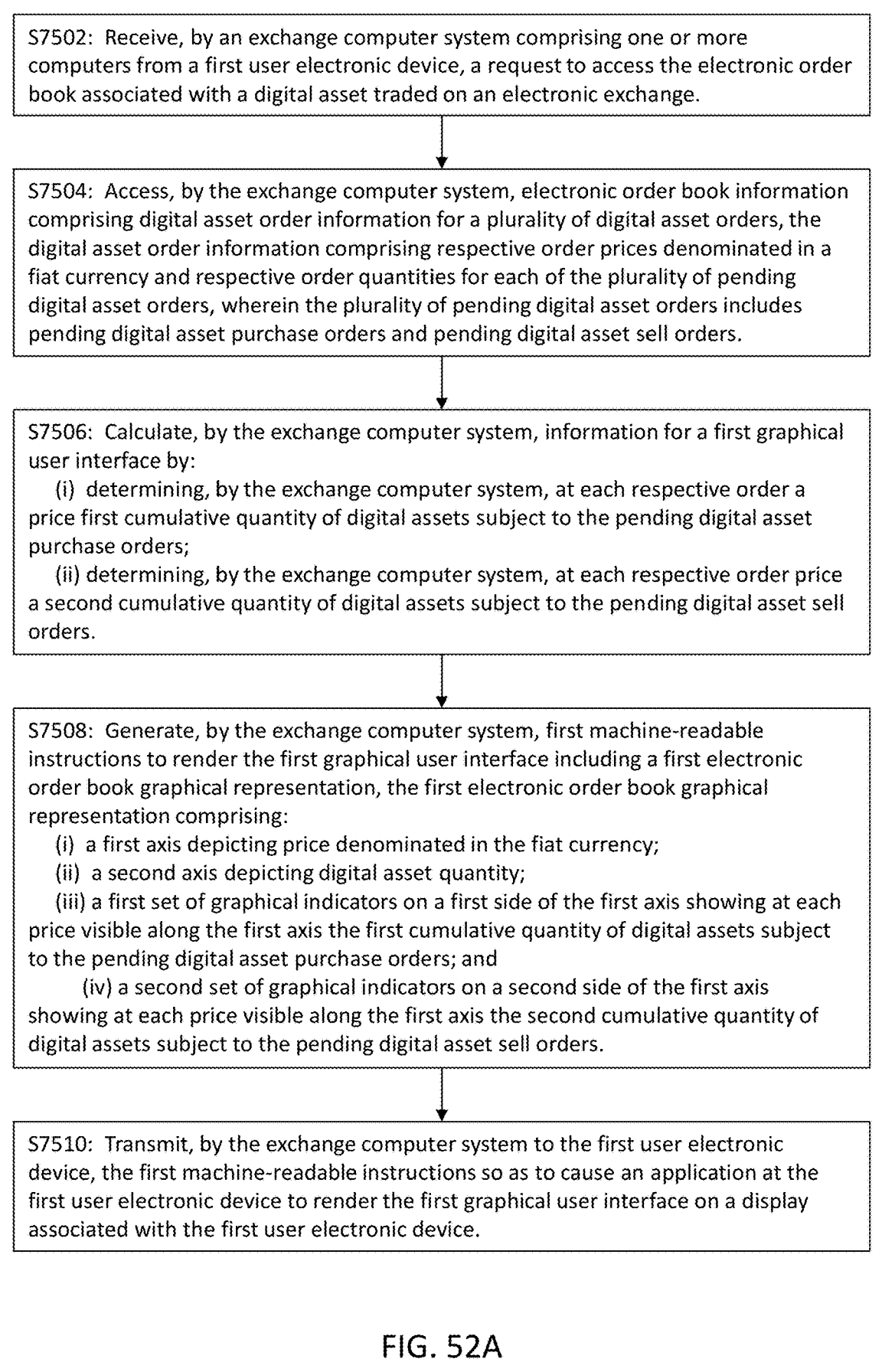

S7502: Receive, by an exchange computer system comprising one or more computers from a first user electronic device, a request to access the electronic order book associated with a digital asset traded on an electronic exchange.

↓

S7504: Access, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders.

↓

S7506: Calculate, by the exchange computer system, information for a first graphical user interface by:
(i) determining, by the exchange computer system, at each respective order a price first cumulative quantity of digital assets subject to the pending digital asset purchase orders;
(ii) determining, by the exchange computer system, at each respective order price a second cumulative quantity of digital assets subject to the pending digital asset sell orders.

↓

S7508: Generate, by the exchange computer system, first machine-readable instructions to render the first graphical user interface including a first electronic order book graphical representation, the first electronic order book graphical representation comprising:
(i) a first axis depicting price denominated in the fiat currency;
(ii) a second axis depicting digital asset quantity;
(iii) a first set of graphical indicators on a first side of the first axis showing at each price visible along the first axis the first cumulative quantity of digital assets subject to the pending digital asset purchase orders; and
(iv) a second set of graphical indicators on a second side of the first axis showing at each price visible along the first axis the second cumulative quantity of digital assets subject to the pending digital asset sell orders.

↓

S7510: Transmit, by the exchange computer system to the first user electronic device, the first machine-readable instructions so as to cause an application at the first user electronic device to render the first graphical user interface on a display associated with the first user electronic device.

FIG. 52A

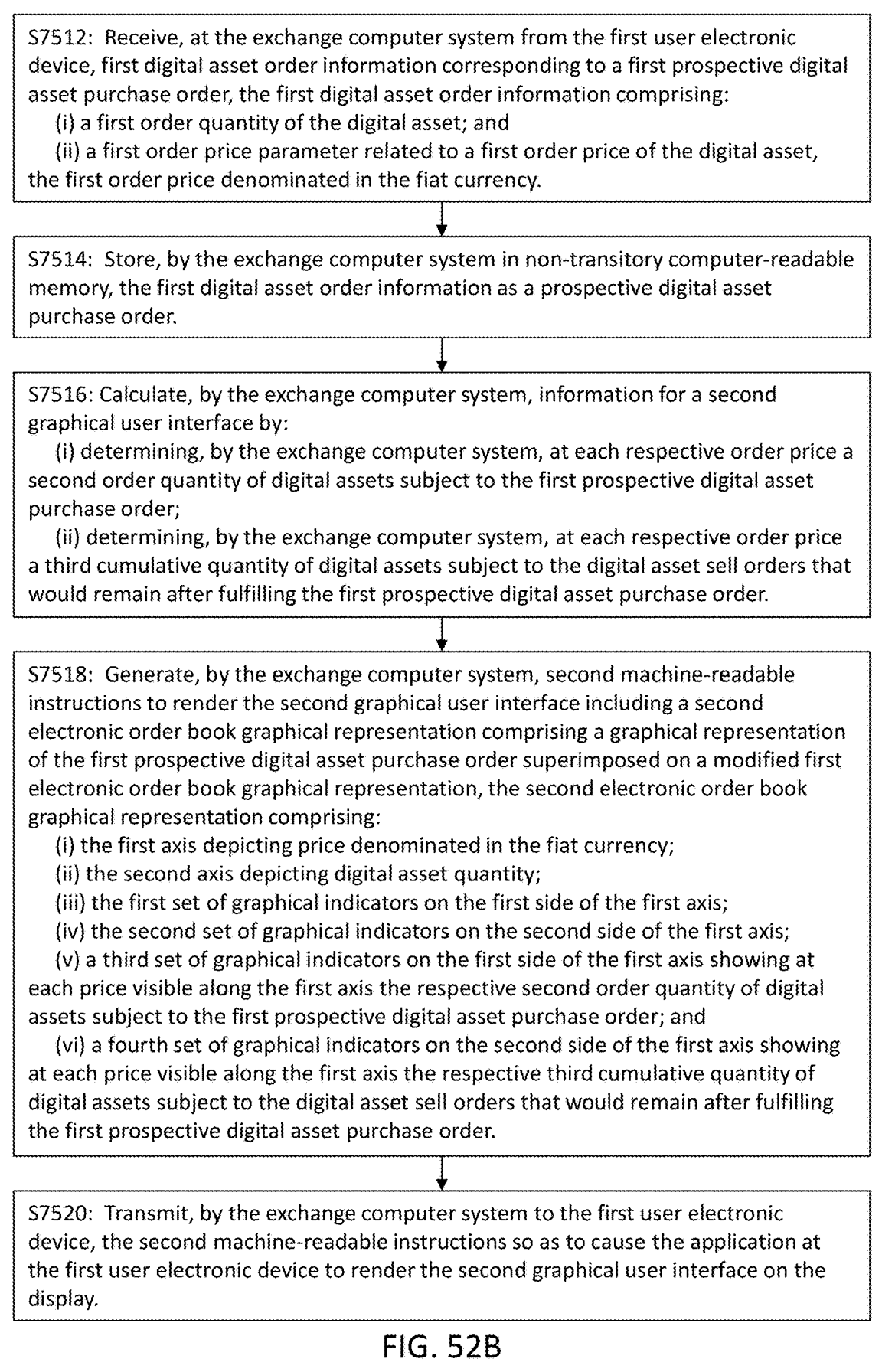

S7512: Receive, at the exchange computer system from the first user electronic device, first digital asset order information corresponding to a first prospective digital asset purchase order, the first digital asset order information comprising:
(i) a first order quantity of the digital asset; and
(ii) a first order price parameter related to a first order price of the digital asset, the first order price denominated in the fiat currency.

↓

S7514: Store, by the exchange computer system in non-transitory computer-readable memory, the first digital asset order information as a prospective digital asset purchase order.

↓

S7516: Calculate, by the exchange computer system, information for a second graphical user interface by:
(i) determining, by the exchange computer system, at each respective order price a second order quantity of digital assets subject to the first prospective digital asset purchase order;
(ii) determining, by the exchange computer system, at each respective order price a third cumulative quantity of digital assets subject to the digital asset sell orders that would remain after fulfilling the first prospective digital asset purchase order.

↓

S7518: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising:
(i) the first axis depicting price denominated in the fiat currency;
(ii) the second axis depicting digital asset quantity;
(iii) the first set of graphical indicators on the first side of the first axis;
(iv) the second set of graphical indicators on the second side of the first axis;
(v) a third set of graphical indicators on the first side of the first axis showing at each price visible along the first axis the respective second order quantity of digital assets subject to the first prospective digital asset purchase order; and
(vi) a fourth set of graphical indicators on the second side of the first axis showing at each price visible along the first axis the respective third cumulative quantity of digital assets subject to the digital asset sell orders that would remain after fulfilling the first prospective digital asset purchase order.

↓

S7520: Transmit, by the exchange computer system to the first user electronic device, the second machine-readable instructions so as to cause the application at the first user electronic device to render the second graphical user interface on the display.

FIG. 52B

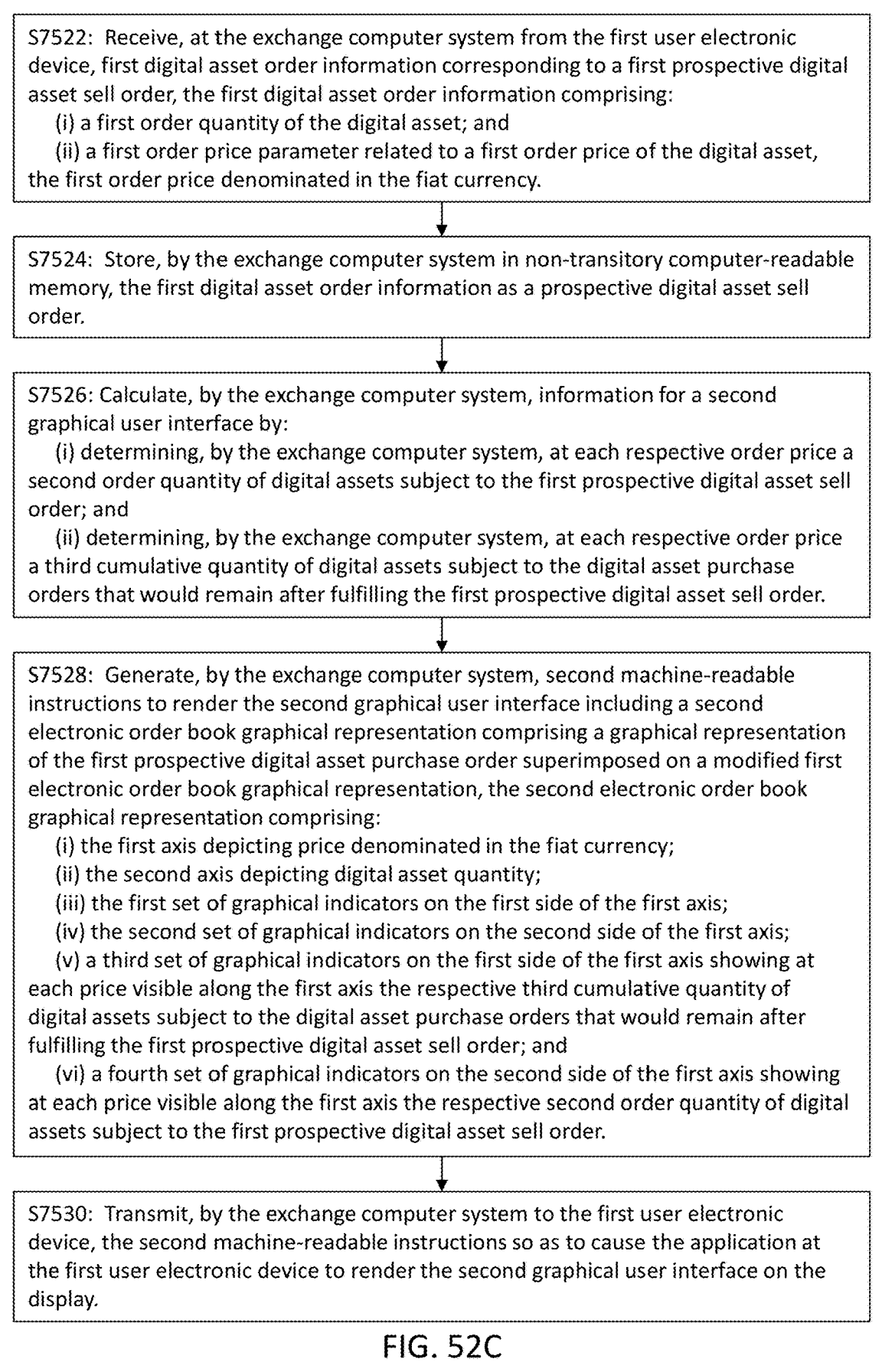

S7522: Receive, at the exchange computer system from the first user electronic device, first digital asset order information corresponding to a first prospective digital asset sell order, the first digital asset order information comprising:
(i) a first order quantity of the digital asset; and
(ii) a first order price parameter related to a first order price of the digital asset, the first order price denominated in the fiat currency.

↓

S7524: Store, by the exchange computer system in non-transitory computer-readable memory, the first digital asset order information as a prospective digital asset sell order.

↓

S7526: Calculate, by the exchange computer system, information for a second graphical user interface by:
(i) determining, by the exchange computer system, at each respective order price a second order quantity of digital assets subject to the first prospective digital asset sell order; and
(ii) determining, by the exchange computer system, at each respective order price a third cumulative quantity of digital assets subject to the digital asset purchase orders that would remain after fulfilling the first prospective digital asset sell order.

↓

S7528: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising:
(i) the first axis depicting price denominated in the fiat currency;
(ii) the second axis depicting digital asset quantity;
(iii) the first set of graphical indicators on the first side of the first axis;
(iv) the second set of graphical indicators on the second side of the first axis;
(v) a third set of graphical indicators on the first side of the first axis showing at each price visible along the first axis the respective third cumulative quantity of digital assets subject to the digital asset purchase orders that would remain after fulfilling the first prospective digital asset sell order; and
(vi) a fourth set of graphical indicators on the second side of the first axis showing at each price visible along the first axis the respective second order quantity of digital assets subject to the first prospective digital asset sell order.

↓

S7530: Transmit, by the exchange computer system to the first user electronic device, the second machine-readable instructions so as to cause the application at the first user electronic device to render the second graphical user interface on the display.

FIG. 52C

Time Until Auction Close

00:00:28

Current Auction Data (10/02/2016)

| Time (ET) | Highest Bid ($)* | Lowest Ask ($)* | Indicative Price ($) | Auction Qty (BTC) | Diff ($) | Diff (%) |
|---|---|---|---|---|---|---|
| ○ 15:59:30 | 604.98 | 605.45 | 604.25 | 1600.00 | -0.97 | -0.16 |
| ○ 15:59:15 | 604.98 | 605.45 | 604.25 | 1600.00 | -0.97 | -0.16 |
| ○ 15:59:00 | 604.98 | 605.44 | 604.48 | 1149.70 | -0.73 | -0.12 |
| ○ 15:58:00 | 605.47 | 605.48 | 604.48 | 1155.26 | -1.00 | -0.16 |
| ○ 15:57:00 | 605.47 | 605.48 | 604.49 | 1100.00 | -0.99 | -0.16 |
| ○ 15:56:00 | 605.47 | 605.48 | 604.90 | 1103.11 | -0.58 | -0.09 |
| ○ 15:55:00 | 605.47 | 605.48 | 604.25 | 1141.90 | -1.23 | -0.20 |

*Highest Bid ($) and Lowest Ask ($) are from the continuous trading order book at the time of the indicative or final auction event.

T1 - Taker Request

5902
From: FundX
To: Digital Asset Exchange
Request:
Side: Buy
Digital Asset: BTC
Amount: 1,000 [BTC]
Max Price: $10,100

Bid/Ask Spread from continuous book at T1 is $9,999/$10,001

T2 - IOIs to Market Makers 1... n

5904
To: Market Maker [1...n]
From: Digital Asset Exchange
IOI:
Digital Asset: BTC
Amount: 1,000 [BTC]
Collar : $9,500/10,500
Time Max: 1 Min Market Makers 1, 2 and 3 responses T3' 5906a'
From: Market Maker 1
From: Digital Asset Exchange
Response:
Buy: 300 BTC@9,950
Sell: 300 BTC@10,050

T4' 5906b'
From: Market Maker 2
From: Digital Asset Exchange
Response:
Buy: 200 BTC@9,900
Sell: 200 BTC@10,150

T5' 5906c'
From: Market Maker 3
From: Digital Asset Exchange
Response:
Buy: 100 BTC@9,950
Sell: 100 BTC @10,050

T6' 5906d'
From: Market Maker 1
From: Digital Asset Exchange
Response:
Buy: 300 BTC@9,970
Sell: 300 BTC@10,020

T7' 5906e'
From: Market Maker 2
From: Digital Asset Exchange
Response:
Buy: 200 BTC@9,950
Sell: 200 BTC@10,200

T8' 5906f'
From: Market Maker 3
From: Digital Asset Exchange
Response:
Buy: 500 BTC@9,975
Sell: 500 BTC @10,250

T9' = T2 + 1 min.

5908b'
From: Digital Asset Exchange
To: Market Maker 1
Your order to sell 300 BTC at $10,020 is filled and your order to sell 300 BTC at $10,050 is filled.
Would you like to sell an additional 300 BTC at $10,050?

5908a'
From: Digital Asset Exchange
To: Target
Your order to buy 300 BTC at $10,020 is filled.
Your order to buy 400 BTC at $10,050 is filled.

5908c'
From: Digital Asset Exchange
To: Market Maker 3
Your order to sell 100 BTC at $10,050 is filled.

FIG. 59A

Figure 61A:
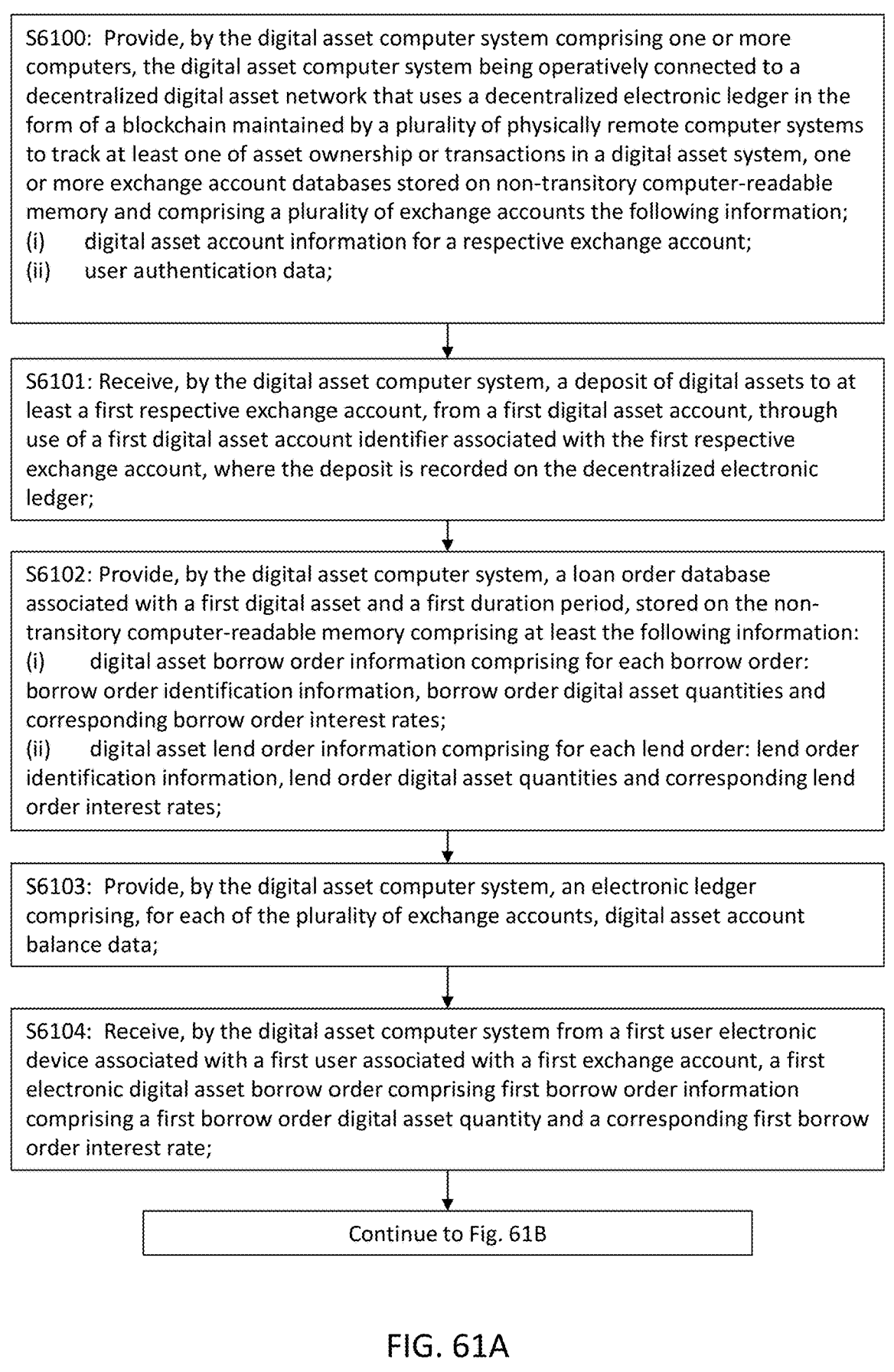

S6100: Provide, by the digital asset computer system comprising one or more computers, the digital asset computer system being operatively connected to a decentralized digital asset network that uses a decentralized electronic ledger in the form of a blockchain maintained by a plurality of physically remote computer systems to track at least one of asset ownership or transactions in a digital asset system, one or more exchange account databases stored on non-transitory computer-readable memory and comprising a plurality of exchange accounts the following information;
(i) digital asset account information for a respective exchange account;
(ii) user authentication data;

↓

S6101: Receive, by the digital asset computer system, a deposit of digital assets to at least a first respective exchange account, from a first digital asset account, through use of a first digital asset account identifier associated with the first respective exchange account, where the deposit is recorded on the decentralized electronic ledger;

↓

S6102: Provide, by the digital asset computer system, a loan order database associated with a first digital asset and a first duration period, stored on the non-transitory computer-readable memory comprising at least the following information:
(i) digital asset borrow order information comprising for each borrow order: borrow order identification information, borrow order digital asset quantities and corresponding borrow order interest rates;
(ii) digital asset lend order information comprising for each lend order: lend order identification information, lend order digital asset quantities and corresponding lend order interest rates;

↓

S6103: Provide, by the digital asset computer system, an electronic ledger comprising, for each of the plurality of exchange accounts, digital asset account balance data;

↓

S6104: Receive, by the digital asset computer system from a first user electronic device associated with a first user associated with a first exchange account, a first electronic digital asset borrow order comprising first borrow order information comprising a first borrow order digital asset quantity and a corresponding first borrow order interest rate;

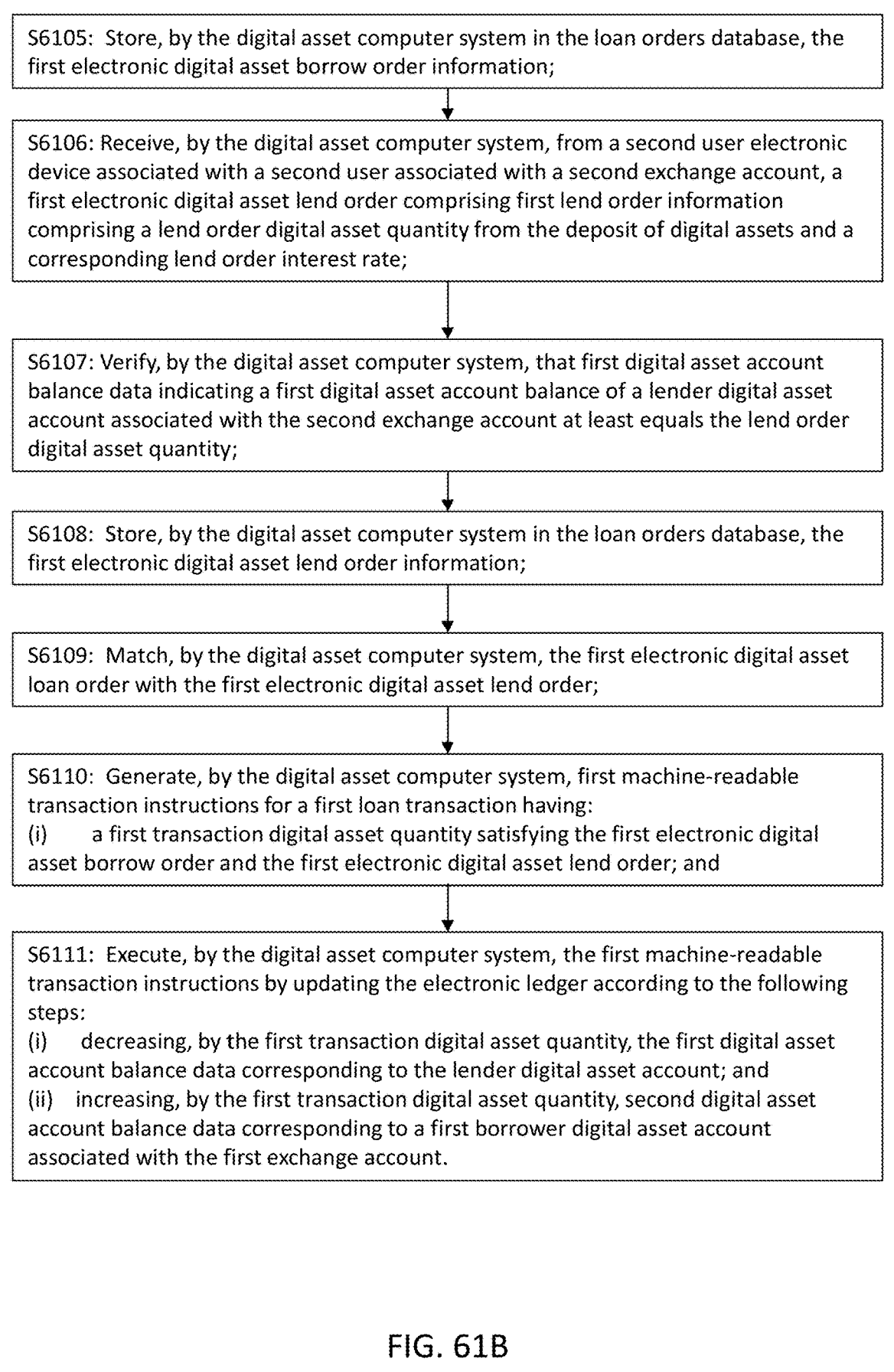

S6105: Store, by the digital asset computer system in the loan orders database, the first electronic digital asset borrow order information;

↓

S6106: Receive, by the digital asset computer system, from a second user electronic device associated with a second user associated with a second exchange account, a first electronic digital asset lend order comprising first lend order information comprising a lend order digital asset quantity from the deposit of digital assets and a corresponding lend order interest rate;

↓

S6107: Verify, by the digital asset computer system, that first digital asset account balance data indicating a first digital asset account balance of a lender digital asset account associated with the second exchange account at least equals the lend order digital asset quantity;

↓

S6108: Store, by the digital asset computer system in the loan orders database, the first electronic digital asset lend order information;

↓

S6109: Match, by the digital asset computer system, the first electronic digital asset loan order with the first electronic digital asset lend order;

↓

S6110: Generate, by the digital asset computer system, first machine-readable transaction instructions for a first loan transaction having:
(i) a first transaction digital asset quantity satisfying the first electronic digital asset borrow order and the first electronic digital asset lend order; and

↓

S6111: Execute, by the digital asset computer system, the first machine-readable transaction instructions by updating the electronic ledger according to the following steps:
(i) decreasing, by the first transaction digital asset quantity, the first digital asset account balance data corresponding to the lender digital asset account; and
(ii) increasing, by the first transaction digital asset quantity, second digital asset account balance data corresponding to a first borrower digital asset account associated with the first exchange account.

FIG. 61B

Figure 62A:
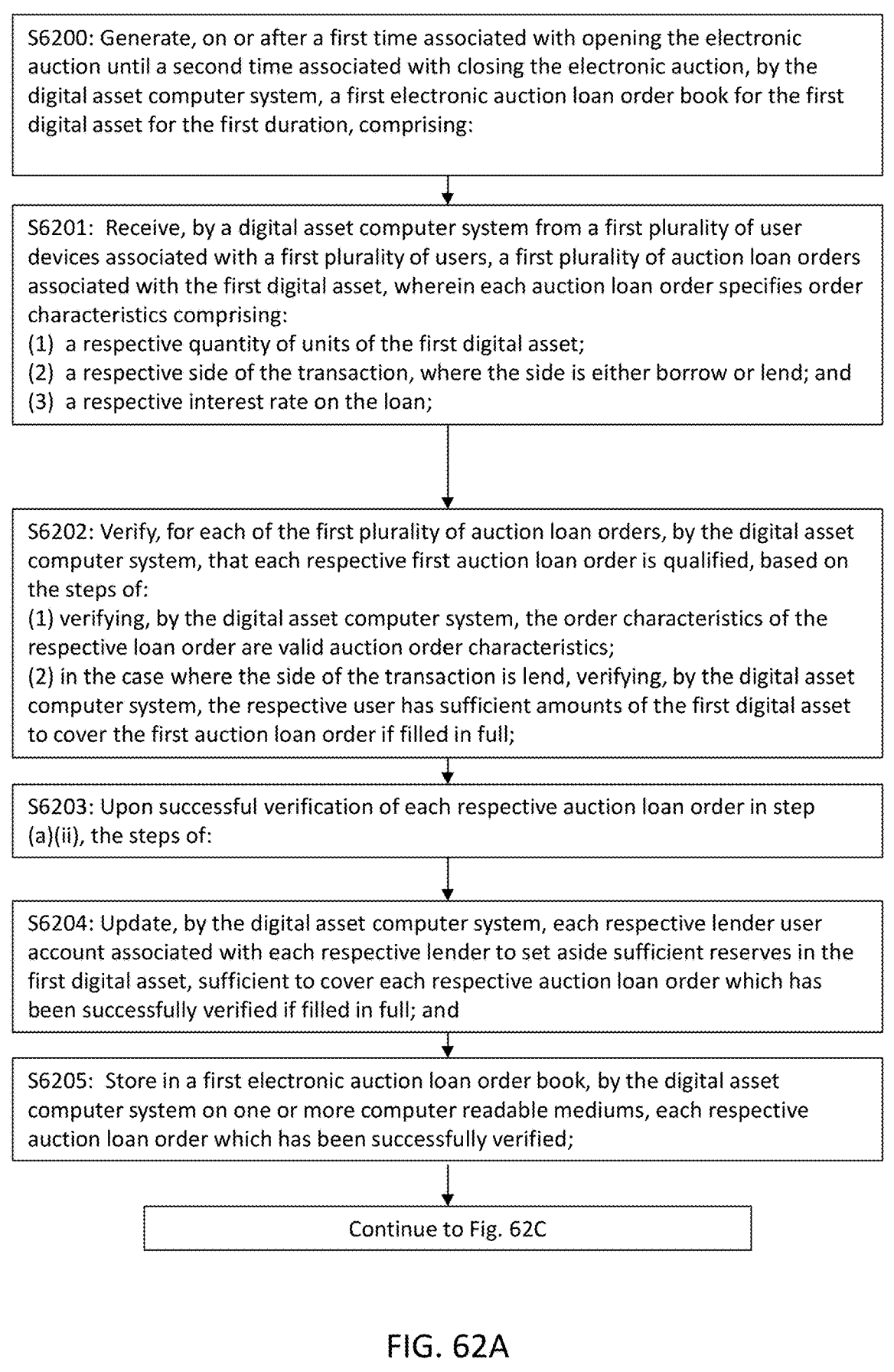

S6200: Generate, on or after a first time associated with opening the electronic auction until a second time associated with closing the electronic auction, by the digital asset computer system, a first electronic auction loan order book for the first digital asset for the first duration, comprising:

↓

S6201: Receive, by a digital asset computer system from a first plurality of user devices associated with a first plurality of users, a first plurality of auction loan orders associated with the first digital asset, wherein each auction loan order specifies order characteristics comprising:
(1) a respective quantity of units of the first digital asset;
(2) a respective side of the transaction, where the side is either borrow or lend; and
(3) a respective interest rate on the loan;

↓

S6202: Verify, for each of the first plurality of auction loan orders, by the digital asset computer system, that each respective first auction loan order is qualified, based on the steps of:
(1) verifying, by the digital asset computer system, the order characteristics of the respective loan order are valid auction order characteristics;
(2) in the case where the side of the transaction is lend, verifying, by the digital asset computer system, the respective user has sufficient amounts of the first digital asset to cover the first auction loan order if filled in full;

↓

S6203: Upon successful verification of each respective auction loan order in step (a)(ii), the steps of:

↓

S6204: Update, by the digital asset computer system, each respective lender user account associated with each respective lender to set aside sufficient reserves in the first digital asset, sufficient to cover each respective auction loan order which has been successfully verified if filled in full; and

↓

S6205: Store in a first electronic auction loan order book, by the digital asset computer system on one or more computer readable mediums, each respective auction loan order which has been successfully verified;

FIG. 62A (Optional) S6206: Electronically publish, starting with a third time and continuing until the second time, by the digital asset computer system, at set time intervals between the third time and the second time, respective indicative results of the first auction loan order book if the auction were to close at the end of each respective time interval, wherein the respective indicative results comprise:

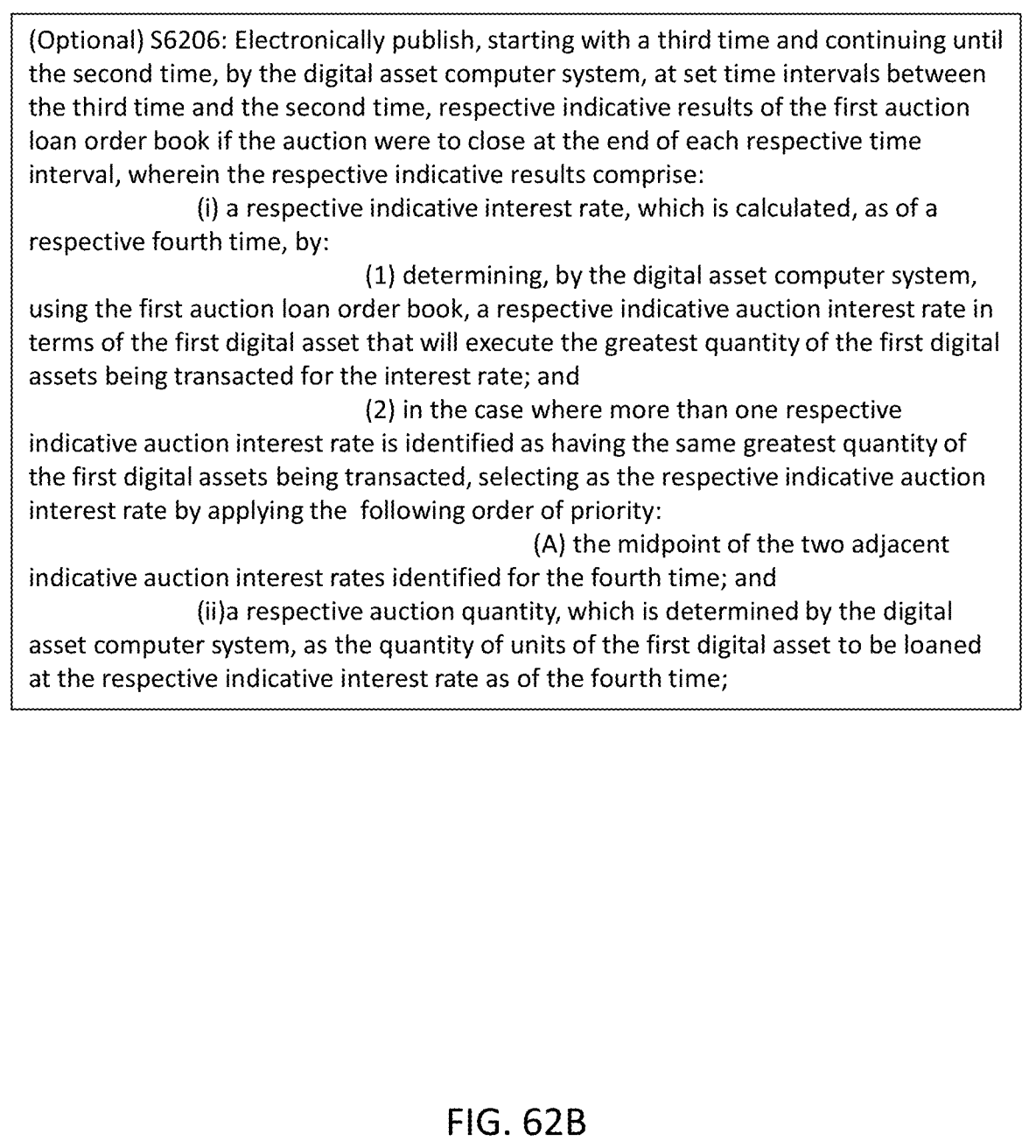

(i) a respective indicative interest rate, which is calculated, as of a respective fourth time, by:

(1) determining, by the digital asset computer system, using the first auction loan order book, a respective indicative auction interest rate in terms of the first digital asset that will execute the greatest quantity of the first digital assets being transacted for the interest rate; and (2) in the case where more than one respective indicative auction interest rate is identified as having the same greatest quantity of the first digital assets being transacted, selecting as the respective indicative auction interest rate by applying the following order of priority:

(A) the midpoint of the two adjacent indicative auction interest rates identified for the fourth time; and (ii)a respective auction quantity, which is determined by the digital asset computer system, as the quantity of units of the first digital asset to be loaned at the respective indicative interest rate as of the fourth time;

FIG. 62B

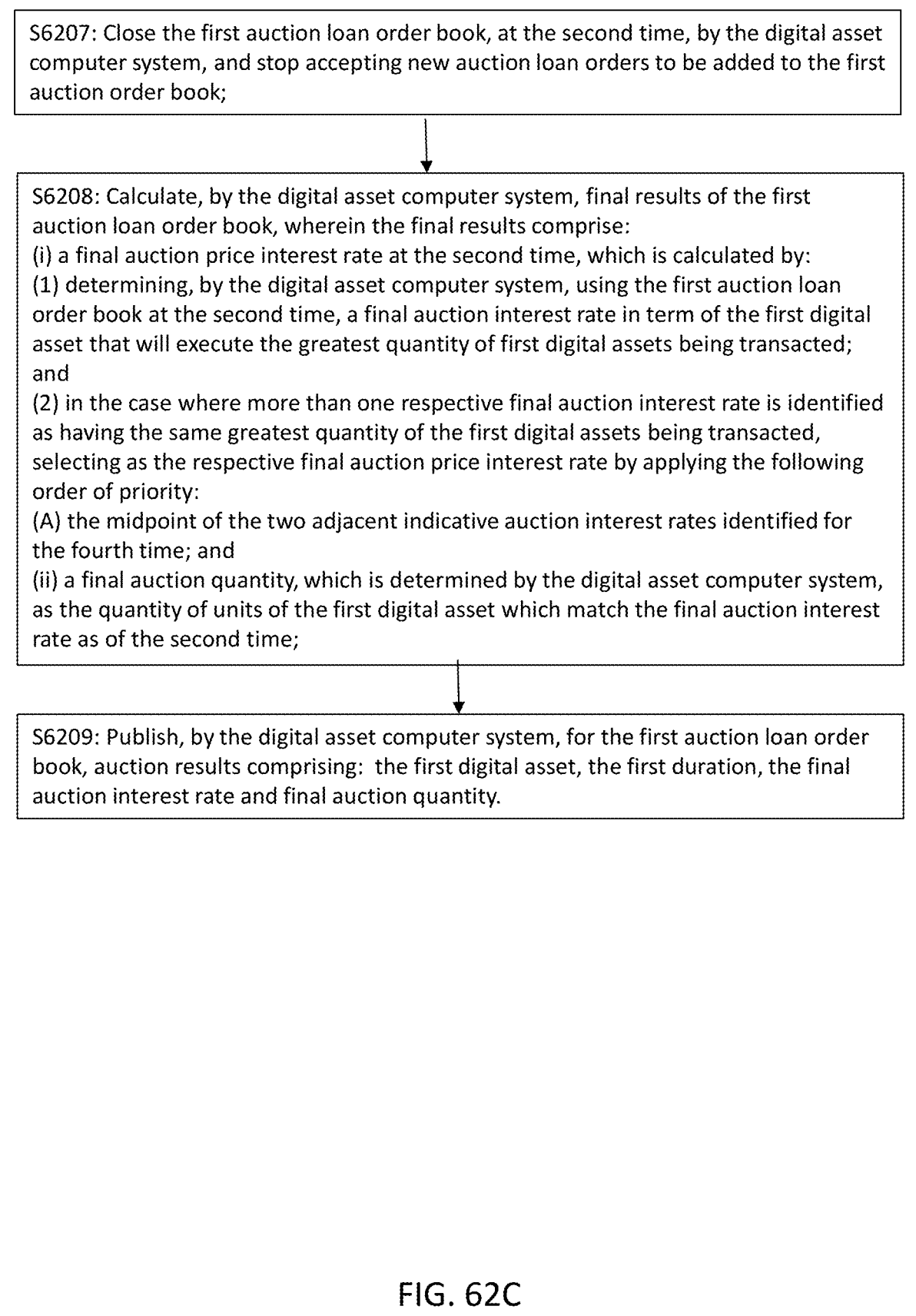

S6207: Close the first auction loan order book, at the second time, by the digital asset computer system, and stop accepting new auction loan orders to be added to the first auction order book;

↓

S6208: Calculate, by the digital asset computer system, final results of the first auction loan order book, wherein the final results comprise:
(i) a final auction price interest rate at the second time, which is calculated by:
(1) determining, by the digital asset computer system, using the first auction loan order book at the second time, a final auction interest rate in term of the first digital asset that will execute the greatest quantity of first digital assets being transacted; and
(2) in the case where more than one respective final auction interest rate is identified as having the same greatest quantity of the first digital assets being transacted, selecting as the respective final auction price interest rate by applying the following order of priority:
(A) the midpoint of the two adjacent indicative auction interest rates identified for the fourth time; and
(ii) a final auction quantity, which is determined by the digital asset computer system, as the quantity of units of the first digital asset which match the final auction interest rate as of the second time;

↓

S6209: Publish, by the digital asset computer system, for the first auction loan order book, auction results comprising: the first digital asset, the first duration, the final auction interest rate and final auction quantity.

FIG. 62C

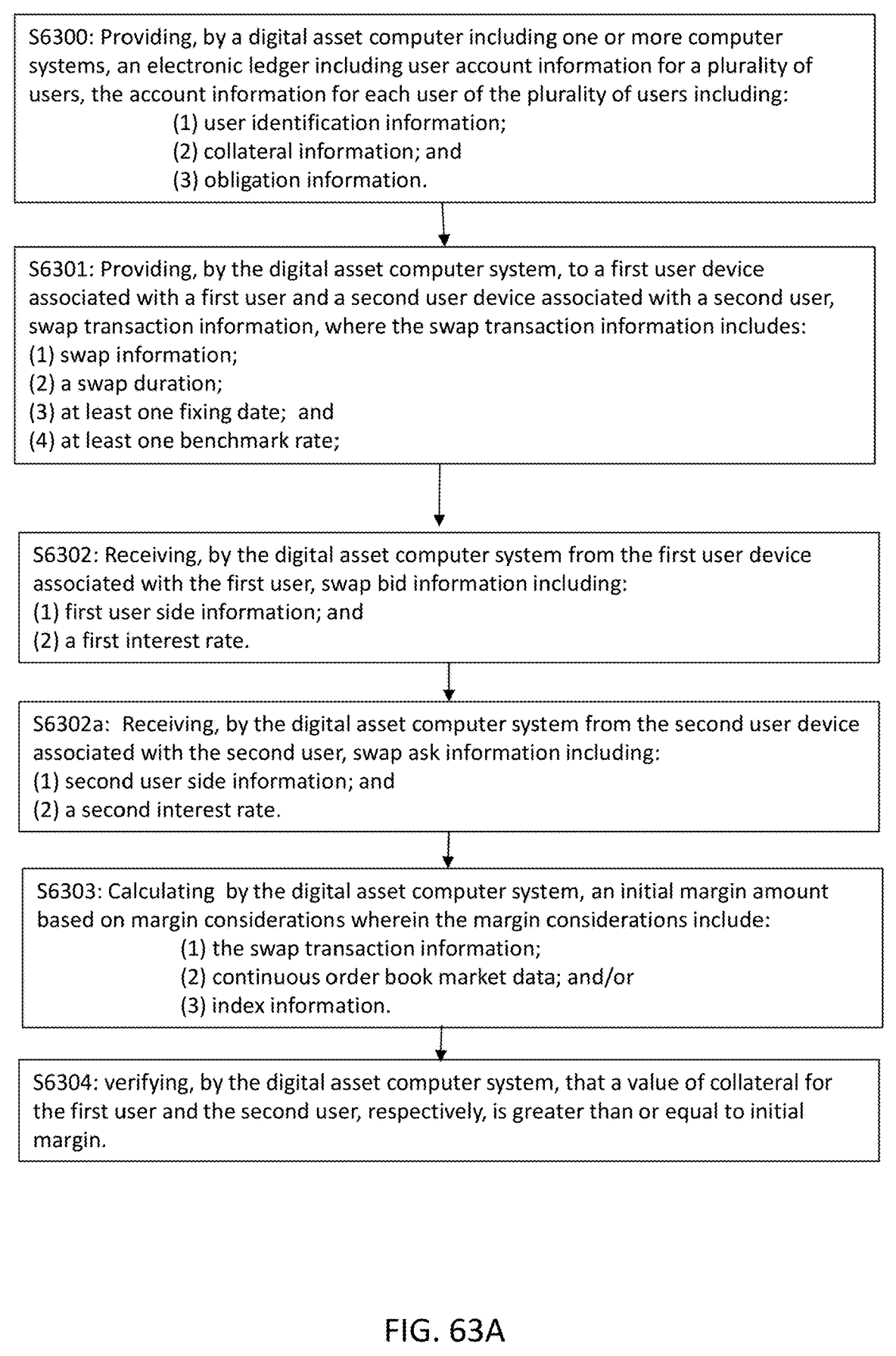

S6300: Providing, by a digital asset computer including one or more computer systems, an electronic ledger including user account information for a plurality of users, the account information for each user of the plurality of users including:
(1) user identification information;
(2) collateral information; and
(3) obligation information.

↓

S6301: Providing, by the digital asset computer system, to a first user device associated with a first user and a second user device associated with a second user, swap transaction information, where the swap transaction information includes:
(1) swap information;
(2) a swap duration;
(3) at least one fixing date; and
(4) at least one benchmark rate;

↓

S6302: Receiving, by the digital asset computer system from the first user device associated with the first user, swap bid information including:
(1) first user side information; and
(2) a first interest rate.

↓

S6302a: Receiving, by the digital asset computer system from the second user device associated with the second user, swap ask information including:
(1) second user side information; and
(2) a second interest rate.

↓

S6303: Calculating by the digital asset computer system, an initial margin amount based on margin considerations wherein the margin considerations include:
(1) the swap transaction information;
(2) continuous order book market data; and/or
(3) index information.

↓

S6304: verifying, by the digital asset computer system, that a value of collateral for the first user and the second user, respectively, is greater than or equal to initial margin.

FIG. 63A

Figure 63B:
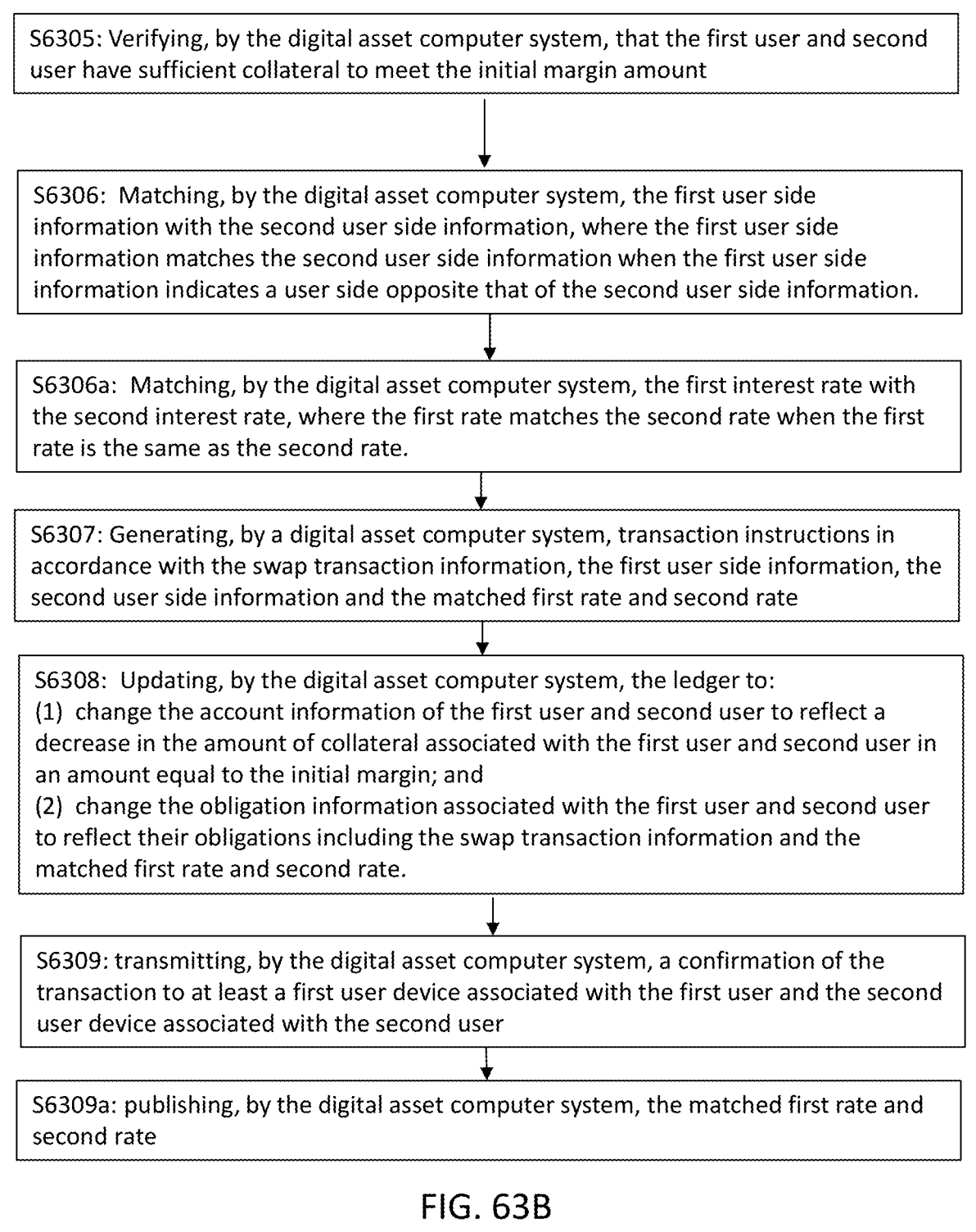

S6305: Verifying, by the digital asset computer system, that the first user and second user have sufficient collateral to meet the initial margin amount

↓

S6306: Matching, by the digital asset computer system, the first user side information with the second user side information, where the first user side information matches the second user side information when the first user side information indicates a user side opposite that of the second user side information.

↓

S6306a: Matching, by the digital asset computer system, the first interest rate with the second interest rate, where the first rate matches the second rate when the first rate is the same as the second rate.

↓

S6307: Generating, by a digital asset computer system, transaction instructions in accordance with the swap transaction information, the first user side information, the second user side information and the matched first rate and second rate

↓

S6308: Updating, by the digital asset computer system, the ledger to:
(1) change the account information of the first user and second user to reflect a decrease in the amount of collateral associated with the first user and second user in an amount equal to the initial margin; and
(2) change the obligation information associated with the first user and second user to reflect their obligations including the swap transaction information and the matched first rate and second rate.

↓

S6309: transmitting, by the digital asset computer system, a confirmation of the transaction to at least a first user device associated with the first user and the second user device associated with the second user

↓

S6309a: publishing, by the digital asset computer system, the matched first rate and second rate

FIG. 63B (Optional) S6310: recalculating, by the digital asset computer system, the margin to provide a variation margin.

↓

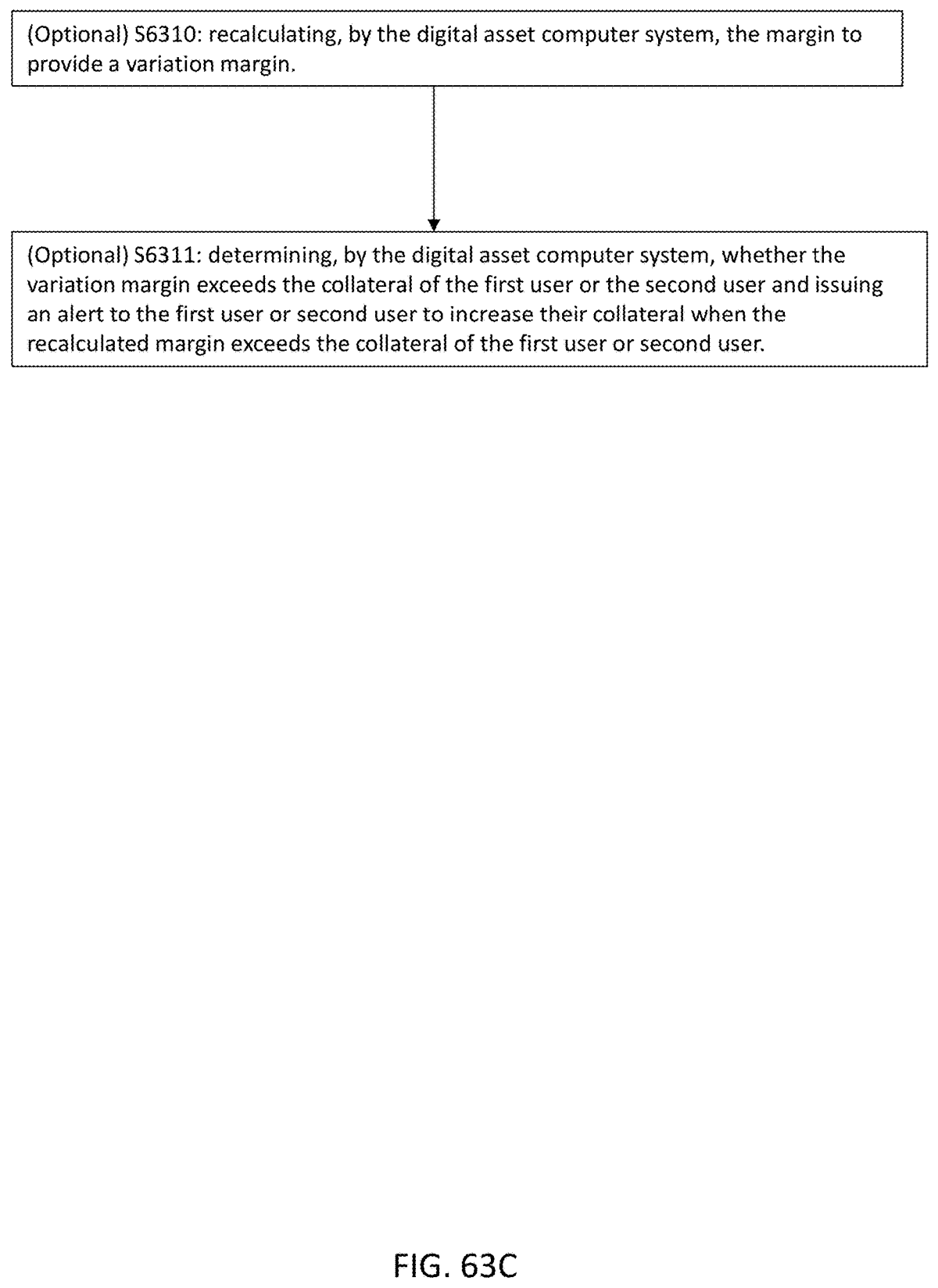

(Optional) S6311: determining, by the digital asset computer system, whether the variation margin exceeds the collateral of the first user or the second user and issuing an alert to the first user or second user to increase their collateral when the recalculated margin exceeds the collateral of the first user or second user.

FIG. 63C

DASHBOARD FIAT INTERFACE

DASHBOARD FIAT INTERFACE

DASHBOARD FIAT INTERFACE

DASHBOARD FIAT INTERFACE

DASHBOARD DIGITAL ASSET INTERFACE

DASHBOARD DIGITAL ASSET INTERFACE

DASHBOARD DIGITAL ASSET INTERFACE

DASHBOARD DIGITAL ASSET INTERFACE

DASHBOARD SVCoin INTERFACE

DASHBOARD SVCoin INTERFACE

DASHBOARD SECURITY TOKEN INTERFACE

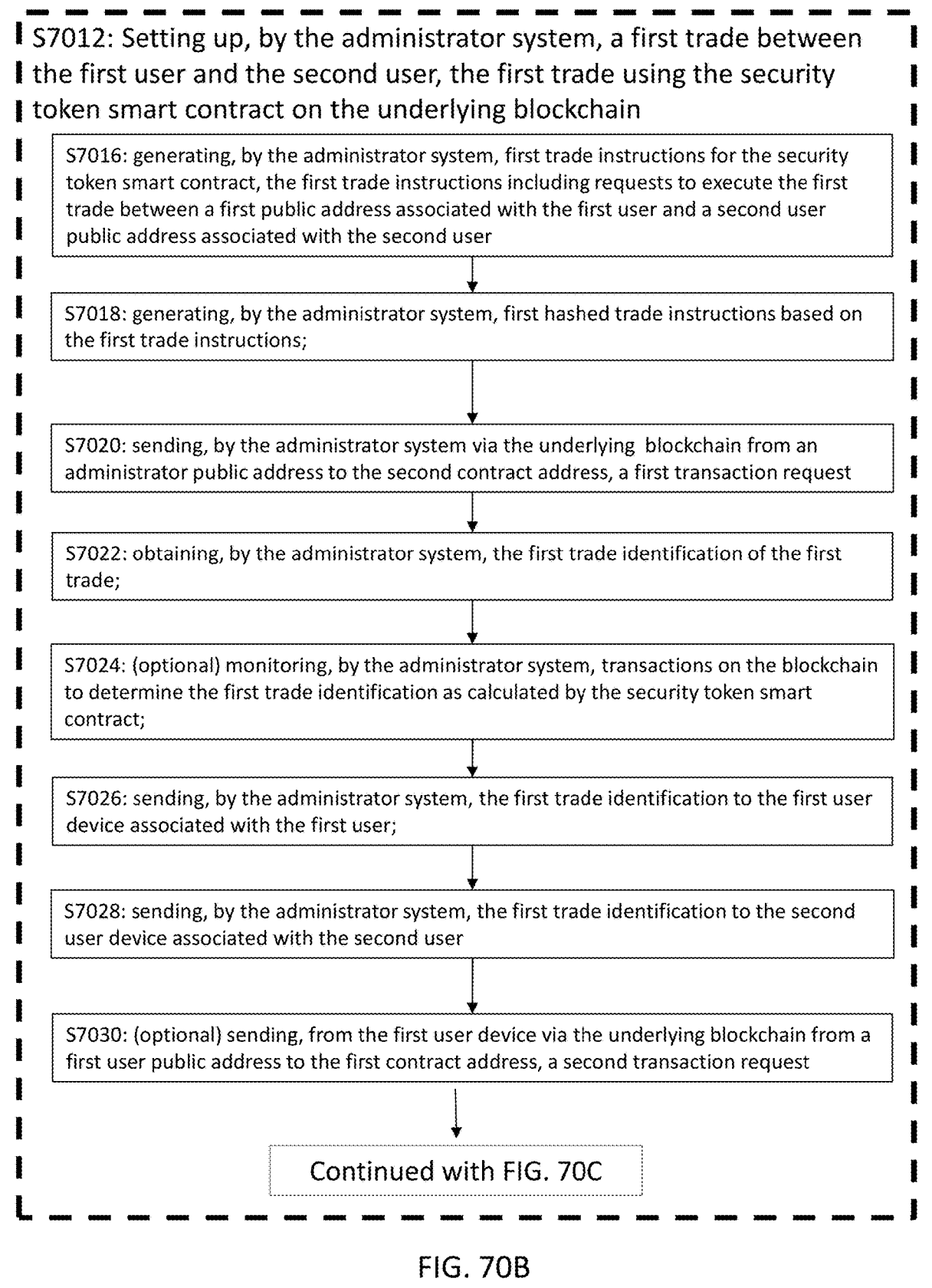

S7012: Setting up, by the administrator system, a first trade between the first user and the second user, the first trade using the security token smart contract on the underlying blockchain S7016: generating, by the administrator system, first trade instructions for the security token smart contract, the first trade instructions including requests to execute the first trade between a first public address associated with the first user and a second user public address associated with the second user

↓

S7018: generating, by the administrator system, first hashed trade instructions based on the first trade instructions;

↓

S7020: sending, by the administrator system via the underlying blockchain from an administrator public address to the second contract address, a first transaction request

↓

S7022: obtaining, by the administrator system, the first trade identification of the first trade;

↓

S7024: (optional) monitoring, by the administrator system, transactions on the blockchain to determine the first trade identification as calculated by the security token smart contract;

↓

S7026: sending, by the administrator system, the first trade identification to the first user device associated with the first user;

↓

S7028: sending, by the administrator system, the first trade identification to the second user device associated with the second user

↓

S7030: (optional) sending, from the first user device via the underlying blockchain from a first user public address to the first contract address, a second transaction request

↓

Continued with FIG. 70C

FIG. 70B

Published Contract 7102

| | |
|---|---|
| Inception Date 7104: | July 19, 2018 |
| Inception Value 7106: | $10,000 |
| Benchmark Data 7108: | S&P 500 |
| Contract Duration Data 7110: | 5 days |
| Collateral Requirement 7112: | 100 SV Coins |
| Notional Value 7114: | $10,000 |

FIG. 71A

Published Contract 7116

| | |
|---|---|
| Inception Date 7118: | July 20, 2018 |
| Inception Value 7120: | $1,000 |
| Benchmark Data 7122: | S&P 500 |
| Contract Duration Data 7124: | 2 Days |
| Collateral Requirement 7126: | 10 SV Coins |
| Notional Value 7128: | $1,000 |
| Early Termination Rules 7130: | None |
| Second Benchmark Data 7132: | Winkdex |

FIG. 71B

First Indication of Interest 7134

From: Alice
To: Gemini

ID No. 12345 (7136)
Buy (7138)

FIG. 71C

First Indication of Interest 7140

From: Alice
To: Gemini

ID No. 12345 (7142)
Buy (7144)
Alice Public Address (7146)
100 Stable Value Coins (7148)

FIG. 71D

Second Indication of Interest 7150

From: Bob
To: Gemini

ID No. 54321 (7152)
Sell (7154)

FIG. 71E

Second Indication of Interest 7156

From: Bob
To: Gemini

ID No. 54321 (7158)
Sell (7160)
Bob Public Address (7162)
100 Stable Value Coins (7164)

FIG. 71F

DASHBOARD SECURITY TOKEN INTERFACE

SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN

RELATED APPLICATIONS

This application is a continuation of U.S. patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN, which in turn claims priority to U.S. Provisional Application No. 62/684,023 filed on Jun. 12, 2018 and entitled SYSTEMS, METHODS, AND PROGRAM PRODUCTS FOR LOANING DIGITAL ASSETS; U.S. Provisional Application No. 62/680,775, filed on Jun. 5, 2018 entitled SYSTEMS, METHODS, AND PROGRAM PRODUCTS FOR LOANING DIGITAL ASSETS; U.S. Provisional Application No. 62/702,265, filed on Jul. 23, 2018 entitled SYSTEMS, METHODS, AND PROGRAM PRODUCTS FOR LOANING DIGITAL ASSETS AND FOR DEPOSITING, HOLDING, AND/OR DISTRIBUTING COLLATERAL AS A TOKEN ON AN UNDERLYING BLOCKCHAIN; U.S. Provisional Patent Application No. 62/764,978, filed on Aug. 17, 2018 entitled SYSTEM, METHOD, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN and U.S. Provisional Patent Application No. 62/732,347, filed on Sep. 17, 2018 entitled SYSTEMS, METHODS, AND PROGRAM PRODUCTS FOR GENERATING USER DEFINED SMART CONTRACTS AND DEPOSITING, HOLDING AND/OR DISTRIBUTING COLLATERAL AS A TOKEN IN THE FORM OF DIGITAL ASSETS ON AN UNDERLYING BLOCKCHAIN, the entire content of each of each of which is hereby incorporated by reference herein.

U.S. patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN also claims priority as a continuation-in-part to U.S. Non-Provisional patent application Ser. No. 15/973,140, filed May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application Ser. No. 62/660,655, filed Apr. 20, 2018 entitled SYSTEM, METHOD AND PROGRAM PRODUCT FOR GENERATING AND UTILIZING STABLE VALUE DIGITAL ASSETS, U.S. Provisional Patent Application Ser. No. 62/642,946, filed Mar. 14, 2018 entitled SYSTEMS, METHODS, AND PROGRAM PRODUCTS FOR EXCHANGING DIGITAL ASSETS FOR FIAT AND/OR OTHER DIGITAL ASSETS, U.S. Provisional Patent Application Ser. No. 62/642,931, filed Mar. 14, 2018 entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein.

U.S. patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN also claims priority as a continuation-in-part to U.S. Non-Provisional patent application Ser. No. 15/960,040, filed Apr. 23, 2018 and entitled SYSTEM, METHOD AND PROGRAM PRODUCT FOR GENERATING AND UTILIZING STABLE VALUE DIGITAL ASSETS, which in turn claims priority to U.S. Provisional Patent Application Ser. No. 62/660,655 filed Apr. 20, 2018 entitled SYSTEM, METHOD AND PROGRAM PRODUCT FOR GENERATING AND UTILIZING STABLE VALUE DIGITAL ASSETS, and U.S. Provisional Patent Application Ser. No. 62/647,353, filed Mar. 23, 2018 entitled SYSTEM, METHOD AND PROGRAM PRODUCT FOR GENERATING AND UTILIZING STABLE VALUE DIGITAL ASSETS and U.S. Provisional Patent Application Ser. No. 62/638,679, filed Mar. 5, 2018 entitled SYSTEM, METHOD AND PROGRAM PRODUCT FOR GENERATING AND UTILIZING STABLE VALUE DIGITAL ASSETS, the entire content of each of which is hereby incorporated by reference herein.

U.S. patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN also claims priority as a continuation-in-part to U.S. Non-Provisional patent application Ser. No. 15/973,175, filed May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which in turn claims priority to U.S. Provisional Patent Application Ser. No. 62/642,946, filed Mar. 14, 2018 entitled SYSTEMS, METHODS, AND PROGRAM PRODUCTS FOR EXCHANGING DIGITAL ASSETS FOR FIAT AND/OR OTHER DIGITAL ASSETS, U.S. Provisional Patent Application Ser. No. 62/642,931 filed Mar. 14, 2018 entitled SYSTEMS, METHODS, AND PROGRAM PRODUCTS FOR EXCHANGING DIGITAL ASSETS FOR FIAT AND/OR OTHER DIGITAL ASSETS, and U.S. Provisional Patent Application Ser. No. 62/629,417, filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein.

U.S. patent application Ser. No. 16/280,788, filed Feb. 20, 2019 and entitled SYSTEMS, METHODS, AND PROGRAM PRODUCTS FOR LOANING DIGITAL ASSETS AND FOR DEPOSITING, HOLDING AND/OR DISTRIBUTING COLLATERAL AS A TOKEN IN THE FORM OF DIGITAL ASSETS ON AN UNDERLYING BLOCKCHAIN also claims priority as a continuation-in-part to U.S. Non-Provisional patent application Ser. No. 15/920,042, filed Mar. 13, 2018 and entitled SYSTEMS, METHODS, AND PROGRAM PRODUCTS FOR VERIFYING DIGITAL ASSETS HELD IN A CUSTODIAL DIGITAL ASSET WALLET, which in turn claims priority to U.S. Provisional Patent Application Ser. No. 62/629,417 filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of each of which is hereby incorporated by reference herein.

FIELD

The present invention relates to methods, systems and program products for lending digital assets, such as crypto currency, and related products.

The present invention also relates to a method, system, and program product for depositing, holding and/or distributing collateral in the form of a stable value token for a security token, the tokens being on the same underlying blockchain.

BACKGROUND

There is no technological solution for depositing, holding, and/or distributing collateral in the form of a stable value token for a security token, the tokens being on the same underlying blockchain.

Traditionally, capital markets work by channeling savings typically held in banks into investments in exchange for interest on the use of such capital over a defined period of time in exchange for a defined interest rates. With government backed currencies (or fiat) like the U.S. dollar, central authorities, like the Federal Reserve in the U.S. for U.S. Dollars, are involved in established bench mark rates at which banks may lend or borrow funds. These rates may vary on the length of time at which such funds are to be lent or borrowed.

With the advent of digital assets and crypto-currencies, traditional banks are no longer involved with storage of such digital assets. Thus, in the new paradigm, digital assets are stored by holders in digital wallets are tracked and maintained on a peer-to-peer blockchain, with no central authority or bank involved. As a result, once value is stored in a digital asset, that value is taken out of the economy and remains idle. In other words, it is no longer available to loan or invest, and/or earn interest, while it is being securely stored in a digital wallet.

Thus, digital assets and the new blockchain technology create a technological challenge of how to continue to take advantage of the security and independence offered by peer-to-peer blockchain technologies, but still allow stored value in digital asset wallets to be invested so as to earn interest and support investment through capital markets.

Another technical problem arises in that current blockchain technology does not provide for a mechanism to deposit, hold and/or distribute collateral in the form of stable value digital assets for a security token on the same underlying blockchain.

SUMMARY

The present invention relates to methods, systems and program products for lending digital assets, such as crypto currency, and related products.

Systems, methods, and program products for use with custodial electronics wallets for ETPs holding digital assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestdcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, LxCoin, Devcoin, Freicoin, I0coin, Terracoin, Liquidcoin, BBQcoin, BitBars, Gas, Tether and PhenixCoin to name a few, and other financial products or services based on the same, are disclosed.

In embodiments, a method for lending digital assets by a digital asset computer system includes: (a) providing, by the digital asset computer system comprising one or more computers, the digital asset computer system being operatively connected to a decentralized digital asset network that uses a decentralized electronic ledger in the form of a blockchain maintained by a plurality of physically remote computer systems to track at least one of asset ownership or transactions in a digital asset system, one or more exchange account databases stored on non-transitory computer-readable memory and comprising for a plurality of exchange accounts the following information: (i) digital asset account information for a respective exchange account; (ii) user authentication data; (b) receiving, by the digital asset computer system, a deposit of digital assets to at least a first respective exchange account, from a first digital asset account, through use of a first digital asset account identifier associated with the first respective exchange account, where the deposit is recorded on the decentralized electronic ledger; (c) providing, by the digital asset computer system, a loan order database associated with a first digital asset and a first duration period, stored on the non-transitory computer-readable memory comprising at least the following information: (i) digital asset borrow order information comprising for each borrow order: borrow order identification information, borrow order digital asset quantities and corresponding borrow order interest rates; (ii) digital asset lend order information comprising for each lend order: lend order identification information, lend order digital asset quantities and corresponding lend order interest rates; (d) providing, by the digital asset computer system, an electronic ledger comprising, for each of the plurality of exchange accounts, digital asset account balance data; (e) receiving, by the digital asset computer system from a first user electronic device associated with a first user associated with a first exchange account, a first electronic digital asset borrow order comprising first borrow order information comprising a first borrow order digital asset quantity and a corresponding first borrow order interest rate; (f) storing, by the digital asset computer system in the loan orders database, the first electronic digital asset borrow order information; (g) receiving, by the digital asset computer system, from a second user electronic device associated with a second user associated with a second exchange account, a first electronic digital asset lend order comprising first lend order information comprising a lend order digital asset quantity from the deposit of digital assets and a corresponding lend order interest rate; (h) verifying, by the digital asset computer system, that first digital asset account balance data indicating a first digital asset account balance of a lender digital asset account associated with the second exchange account at least equals the lend order digital asset quantity; (i) storing, by the digital asset computer system in the loan orders database, the first electronic digital asset lend order information; (j) matching, by the digital asset computer system, the first electronic digital asset loan order with the first electronic digital asset lend order; (k) generating, by the digital asset computer system, first machine-readable transaction instructions for a first loan transaction having: (i) a first transaction digital asset quantity satisfying the first electronic digital asset borrow order and the first electronic digital asset lend order; and (l) executing, by the digital asset computer system, the first machine-readable transaction instructions by updating the electronic ledger according to the following steps: (i) decreasing, by the first transaction digital asset quantity, the first digital asset account balance data corresponding to the lender digital asset account; and (ii) increasing, by the first transaction digital asset quantity, second digital asset account balance data corresponding to a first borrower digital asset account associated with the first exchange account. The method of claim 1, wherein the first digital asset is a digital math-based asset.

In embodiments, the first digital asset is Bitcoin.

In embodiments, the first digital asset is Ether.

In embodiments, wherein the first digital asset is Litecoin.

In embodiments, the first digital asset is Bitcoin Cash.

In embodiments, the first digital asset is Zcash.

In embodiments, the first digital asset is a token.

In embodiments, a method for conducting an electronic auction to loan a first digital asset for a first duration, on a digital asset computer system, includes: (a) on or after a first time associated with opening the electronic auction until a second time associated with closing the electronic auction, generating, by the digital asset computer system, a first electronic auction loan order book for the first digital asset for the first duration, comprising: (i) receiving, by a digital asset computer system from a first plurality of user devices associated with a first plurality of users, a first plurality of auction loan orders associated with the first digital asset, wherein each auction loan order specifies order characteristics comprising: (1) the first digital asset as digital asset type; (2) a respective quantity of units of the first digital asset; (3) a respective side of the transaction, where the side is either borrow or lend; (4) the first duration as the duration for the loan; and (5) a respective interest rate on the loan; (ii) for each of the first plurality of auction loan orders, verifying, by the digital asset computer system, each respective first auction loan order is qualified, based on the steps of: (1) verifying, by the digital asset computer system, the order characteristics of the respective loan order are valid auction order characteristics; (2) in the case where the side of the transaction is lend, verifying, by the digital asset computer system, the respective user has sufficient amounts of the first digital asset to cover the first auction loan order if filled in full; (iii) upon successful verification of each respective auction loan order in step (a)(ii), the steps of: (1) updating, by the digital asset computer system, each respective lender user account associated with each respective lender to set aside sufficient reserves in the first digital asset, sufficient to cover each respective auction loan order which has been successfully verified if filled in full; and (2) storing in first electronic auction loan order book, by the digital asset computer system on one or more computer readable mediums, each respective auction loan order which has been successfully verified; (b) starting with a third time and continuing until the second time, electronically publishing, by the digital asset computer system, at set time intervals between the third time and the second time, respective indicative results of the first auction loan order book if the auction were to close at the end of each respective time interval, wherein the respective indicative results comprise: (i) a respective indicative interest rate, which is calculated, as of a respective fourth time, by: (1) determining, by the digital asset computer system, using the first auction loan order book, a respective indicative auction interest rate in terms of the first digital asset that will execute the greatest quantity of the first digital assets being transacted for the interest rate; and (2) in the case where more than one respective indicative auction interest rate is identified as having the same greatest quantity of the first digital assets being transacted, selecting as the respective indicative auction interest rate by applying the following order of priority: (A) the midpoint of the two adjacent indicative auction interest rates identified for the fourth time; and (ii) a respective auction quantity, which is determined by the digital asset computer system, as the quantity of units of the first digital asset to be loaned at the respective indicative price interest rate as of the fourth time; (c) at the second time, closing the first auction loan order book, by the digital asset computer system, and stop accepting new auction loan orders to be added to the first auction order book; (d) after step (c), calculating, by the digital asset computer system, final results of the first auction loan order book, wherein the final results comprise: (i) a final auction price interest rate at the second time, which is calculated by: (1) determining, by the digital asset computer system, using the first auction loan order book at the second time, a final auction interest rate in term of the first digital asset that will execute the greatest quantity of first digital assets being transacted; and (2) in the case where more than one respective final auction interest rate is identified as having the same greatest quantity of the first digital assets being transacted, selecting as the respective final auction price interest rate by applying the following order of priority: (A) the midpoint of the two adjacent indicative auction interest rates identified for the fourth time; and (ii) a final auction quantity, which is determined by the digital asset computer system, as the quantity of units of the first digital asset which match the final auction interest rate as of the second time; and (e) publishing, by the digital asset computer system, for the first auction loan order book, auction results comprising: the first digital asset, the first duration, the final auction interest rate and final auction quantity.

In embodiments, the first digital asset is a digital math-based asset.

In embodiments, the first digital asset is Bitcoin.

In embodiments, the first digital asset is Ether.

In embodiments, the first digital asset is Litecoin.

In embodiments, the first digital asset is Bitcoin Cash.

In embodiments, the first digital asset is a token.

In embodiments, the first digital asset is Zcash.

In embodiments, the third time is 10 minutes prior to the second time.

In embodiments, the plurality of fourth times are one minute apart from each other.

In embodiments, a method for performing a return swap using a digital asset includes: (a) providing, by the digital asset computer system comprising one or more computers, an electronic ledger including user account information for a plurality of users, the user account information for each user of the plurality of users including: 1. user identification information; 2. collateral information; and 3. obligation information; (b) providing, from the digital asset computer system to a first user device associated with a first user and a second user device associated with a second user, swap transaction information including: 1. swap information; 2. a swap duration; 3. at least one fixing date; and 4. at least one benchmark rate; (c) receiving, by the digital asset computer system from the first user device associated with the first user, a swap bid request, the swap bid request including: 1. first user side information; and 2. a first interest rate; (d) receiving, by the digital asset computer system from the second user device associated with the second user, a swap ask request, the swap ask request including: 1. second user side information; and 2. a second interest rate; (e) calculating, by the digital asset computer system, an initial margin amount based on margin consideration wherein the margin considerations include: 1. the swap information; 2. continuous order book market data; and 3. index information; (f) verifying, by the digital asset computer system, that an amount of collateral for the first user and for the second is greater than or equal to the sum of the initial margin; (g) where the digital asset computer system verifies that an amount of collateral for the first user and the second user is greater than or equal to the initial margin, storing the swap bid request and the swap ask request; (h) matching, by the digital asset computer system, the first user side swap information with the second user side swap information, where a match is achieved where the first user side information identifies a side opposite that identified by the second user side information; (i) matching, by the digital asset computer system, the first interest rate with the second interest rate, where a match is achieved where the first interest rate is the same as the second interest rate; (j) generating, by the digital asset computer system, transaction instructions in accordance with the swap transaction information, the first user side information, the second user side information and the matched first interest rate and second interest rate; (k) updating, by the digital asset computer system, the electronic ledger to: 1. change the account information of the first user and the second user to decrease the amount of collateral associated with the first user and second user in an amount equal to the initial margin; and 2. change the obligation information associated with the first use and second user to reflect their obligations including the swap transaction information and the matched first rate and second rate; (l) transmitting, by the digital asset computer system, a confirmation of the transaction to at least the first user device and the second user device, and (m) publishing, by the digital asset computer system, the matched first interest rate and second interest rate.

In embodiments, the method further includes: (n) recalculating, by the digital asset computer system, the margin; and (o) determining, by the digital asset computer system, whether the recalculated margin exceeds the collateral of the first user and the second user and issuing an alert to the first user and the second user to increase their collateral when the recalculated margin exceeds the collateral of the first user and the second user.

The present invention also relates to methods, systems and program products for depositing, holding and/or distributing collateral in the form of a stable value token for a security token, the tokens being on the same underlying blockchain.

Systems, methods, and program products for use with custodial electronics wallets for ETPs holding digital assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin to name a few, and other financial products or services based on the same, are disclosed.

In embodiments, a method for holding collateral in a smart contract on an underlying blockchain includes: (a) publishing, by an administrator system associated with an administrator, contract information comprising at least the following contract terms: (1) an inception date; (2) an inception value; (3) at least one benchmark; (4) a contract duration; (5) at least one collateral requirement; and (6) a notional value of the contract; (b) receiving, by the administrator system, a plurality of indications of interests, wherein the plurality of indications of interests include at least: (1) a first user response, from a first user device associated with a first user, the first user response including: (i) first user identification information associated with the first user; and (ii) first side information comprising identification of a first leg of the contract; and (2) a second user response, from a second user device associated with a second user, the second user response including: (i) second user identification information associated with the second user; and (ii) second side information comprising identification of a second leg of the contract wherein the second leg is different than the first leg; (c) matching, by the administrator system, the first user response with the second user response; (d) providing, on the underlying blockchain, a stable value token smart contract having a first contract address on the underlying blockchain for a stable value digital asset token comprising instructions to: (1) create stable value tokens; (2) transfer stable value tokens; (3) destroy stable value tokens; and (4) authorization instructions; (e) providing, on the underlying blockchain, a security token smart contract having a second contract address on the underlying blockchain comprising instructions to: (1) create security tokens; (2) transfer security tokens; (3) destroy security tokens; (4) access data supplied by a first authorized third party database; (5) authorize instructions to transfer of stable value token to the second contract address; (6) authorize instructions to transfer of stable value token from the second contract address; and (7) calculate excess collateral; (f) setting up, by the administrator system, a first trade between the first user and the second user, the first trade using the security token smart contract on the underlying blockchain with collateral in the form of stable value digital asset tokens, the step of setting up further comprising: (1) generating, by the administrator system, first trade instructions for the security token smart contract, the first trade instructions including instructions to execute the first trade between a first user public address on the underlying blockchain associated with the first user and a second user public address on the underlying blockchain associated with the second user, wherein the first trade is based at least on: (i) the contract terms; (ii) the first user response; and (iii) the second user response; (2) generating, by the administrator system, hashed trade instructions by applying a hash algorithm to the first trade instructions; (3) sending, by the administrator system via the underlying blockchain, a first transaction request, from an administrator public address on the underlying blockchain to the second contract address on the underlying blockchain, wherein the first transaction request includes a first message including: (i) the hashed trade instructions; and (ii) request to assign a first trade identification to a first trade associated with the hashed trade instructions, wherein the administrator public address on the underlying blockchain has a corresponding administrator private key, wherein the administrator private key being mathematically related to the administrator public address, and wherein the first transaction request is signed by the administrator private key; (4) obtaining, by the administrator system, the first trade identification of the first trade; (5) sending, by the administrator system, the first trade identification to the first user device associated with the first user; (6) sending, by the administrator system, the first trade identification to the second user device associated with the second user; (7) monitoring, by the system administrator, transactions of stable value digital asset tokens on the underlying blockchain to determine that the second contract address has received at least the following: (i) a first amount of collateral in stable value digital asset tokens from the first user; and (ii) a second amount of collateral in stable value digital asset tokens from the second user; (8) sending, by the administrator system via the underlying blockchain, a second transaction request, from the administrator public address on the underlying blockchain to the second contract address on the underlying blockchain, wherein the second transaction request includes a second message including: (i) the first trade instructions; and (ii) the first trade identification; and wherein the second transaction is signed by the administrator private key; and (g) collecting, by the administrator system from the security token smart contract, excess collateral from the first trade, wherein collecting comprises: (1) sending, by the administrator system via the underlying blockchain, a third transaction request from the administrator public address on the underlying blockchain to the second contract address on the underlying blockchain, the third transaction request including a third message comprising requests for the security token smart contract to: (i) determine excess collateral for the first trade in accordance with the security token smart contract and the first trade instructions; and (ii) distribute excess collateral for the first trade in accordance with the security token smart contract and the first trade instructions, and wherein the third transaction is signed by the administrator private key; (2) sending, by the security token smart contract via the underlying blockchain in response to the instructions contained in the third message, a fourth transaction request from the second contract address on the underlying blockchain to an oracle address on the underlying blockchain, wherein the oracle address is associated with an oracle interface, and wherein the fourth transaction request includes a sixth message to obtain first benchmark data; (3) receiving, by the security token smart contract from the oracle interface, a callback message; (4) executing, by the security token smart contract in response to receiving the callback message, instructions to: (i) store the first benchmark information; and (ii) calculate the first excess collateral for the first user and second excess collateral for the second user by using the first trade instructions and the first benchmark information; and (5) in the cases where at least one of the first excess collateral is greater than zero or the second excess collateral is greater than zero, sending, by the security token smart contract via the underlying blockchain, a fifth transaction request, from the second contract address on the underlying blockchain to the first contract address on the underlying blockchain, wherein the fifth transaction request including a fifth message requesting the stable value token smart contract to transfer: (i) the first excess collateral in stable value tokens from the second contract address on the underlying blockchain to the first user public address on the underlying blockchain, if the first excess collateral is greater than zero; and (ii) the second excess collateral in stable value tokens from the second contract address on the underlying blockchain to the second user public address on the underlying blockchain, if the second excess collateral is greater than zero.

In embodiments, the contract further includes: (7) early termination rules; and (8) a second benchmark.

In embodiments the first user response further includes: (iii) a first user public address on the underlying blockchain; and (iv) first collateral information in stable value tokens.

In embodiments, the second user response further comprises: (iii) a second user public address on the underlying blockchain; and (iv) second collateral information in stable value token.

In embodiments the first transaction request further includes first transaction fee information. In embodiments the second transaction request further includes second transaction fee information.

In embodiments, the first trade identification further includes: (i) monitoring, by the administrator system, transactions on the underlying blockchain to determine the first trade identification as calculated by the security token smart contract.

In embodiments, the step of monitoring transactions of the stable value digital asset token on the underlying blockchain further includes monitoring, by the administrator system, the first contract address on the underlying blockchain to determine: (i) the first amount of collateral is received at the second contract address on the underlying blockchain; and (ii) the second amount of collateral is received at the second contract address on the underlying blockchain.

In embodiments the step of monitoring transactions of the stable value digital asset token on the underlying blockchain further includes monitoring, by the administrator system, the first contract address on the underlying blockchain to determine: (i) the first amount of collateral is received at the second contract address on the underlying blockchain; and (ii) the second amount of collateral is received at the second contract address on the underlying blockchain. In embodiments, the second contract address further includes instructions to: (8) generate a collateral confirmation message to the administrator system confirming receipt of at least one of the first amount of collateral and the second amount of collateral when at least one of the first amount of collateral and the second amount of collateral is received; and (9) send the collateral confirmation message to the administrator system confirming receipt of at least one of the first amount of collateral and the second amount of collateral when at least one of the first amount of collateral and the second amount of collateral is received.

In embodiments the first excess collateral is the first amount of collateral less the difference between the first benchmark information and the inception value.

In embodiments the second excess collateral is the second amount of collateral less the difference between the inception value and the first benchmark information.

In embodiments the first user public address has a corresponding first user private key which is mathematically related to the first user public address.

In embodiments, the second user public address has a corresponding second user private key which is mathematically related to the second user public address.

In embodiments, prior to the step of monitoring transactions of the stable value digital asset token on the underlying blockchain, a sixth transaction is sent by the first user device via the underlying blockchain, from the first user public address on the underlying blockchain to the first contact address on the underlying blockchain, wherein the sixth transaction request comprises a sixth message including requests to the stable value token smart contract regarding a first transfer of the first amount of collateral, wherein the first user public address has a corresponding first user private key which is mathematically related to the first user public address; and wherein the sixth transaction request is signed by the first user private key.

In embodiments, the sixth transaction request further includes third transaction fee information.

In embodiments, the requests to the stable value token smart contact regarding the first transfer of the first amount of collateral include requests to the stable value smart contract to transfer the first amount of collateral in the form of stable value digital asset tokens from the first user public address on the underlying blockchain to the second contract address on the underlying blockchain.

In embodiments, the requests to the stable value smart contract to transfer the first amount of collateral in the form of stable value digital asset tokens from the first user public address on the underlying blockchain to the second user public address on the underlying blockchain are executed upon receipt of a first collateral request from the second contract address.

In embodiments, the requests to the stable value smart contract to transfer the first amount of collateral in the form of stable value digital asset tokens from the first user public address on the underlying blockchain to the second user public address on the underlying blockchain are executed upon receipt of a first collateral request from the administrator system.

In embodiments, prior to the step of monitoring transactions of the stable value digital asset token on the underlying blockchain, a seventh transaction is sent by the second user device via the underlying blockchain, from the second user public address on the underlying blockchain to the second contract address on the underlying blockchain, wherein the seventh transaction request comprises a seventh message including requests to the stable value token smart contract regarding a second transfer of the second amount of collateral, wherein the second user public address has a corresponding second user private key which is mathematically related to the second user public address, and wherein the seventh transaction request is signed by the second user private key.

In embodiments, the seventh transaction request includes fourth transaction fee information.

In embodiments, the requests regarding transfer of the second amount of collateral include requests to the stable value smart contract to transfer the second amount of collateral in the form of stable value digital asset tokens from the second user public address on the underlying blockchain to the second contract address on the underlying blockchain.

In embodiments, the requests to the stable value smart contract to transfer the second amount of collateral in the form of stable value digital asset tokens from the second user public address on the underlying blockchain to the second contract address are executed upon receipt of a second collateral request from the second contract address on the underlying blockchain.

In embodiments, the requests to the stable value smart contract to transfer the second amount of collateral in the form of stable value digital asset tokens from the second user public address on the underlying blockchain to the second contract address on the underlying blockchain are executed upon receipt of a second collateral request from the second administrator system.

In embodiments, the step of collecting the excess collateral occurs in response to the security token smart contract verifying the first trade instructions against the hashed instructions.

In embodiments, a method for holding collateral in a smart contract on an underlying blockchain, the method includes: (a) publishing, by an administrator system associated with an administrator, contract information comprising at least the following contract terms: (1) an inception date; (2) an inception value; (3) at least one benchmark; (4) a contract duration; (5) at least one collateral requirement; and (6) a notional value of the contract; (b) receiving, by the administrator system, a plurality of indications of interests, wherein the plurality of indications of interests include at least: (1) a first user response, from a first user device associated with a first user, the first user response comprising: (i) first user identification information associated with the first user; and (ii) first side information comprising identification of a first leg of the contract; and (2) a second user response, from a second user device associated with a second user, the second user response including: (i) second user identification information associated with the second user; and (ii) second side information comprising identification of a second leg of the contract wherein the second leg is different than the first leg; (c) matching, by the administrator system, the first user response with the second user response; (d) providing, on the underlying blockchain, a stable value token smart contract having a first contract address on the underlying blockchain for a stable value digital asset token including instructions to: (1) create stable value tokens; (2) transfer stable value tokens; (3) destroy stable value tokens; and (4) authorization instructions; (e) providing, on the underlying blockchain, a security token smart contract having a second contract address on the underlying blockchain including instructions to: (1) create security tokens; (2) transfer security tokens; (3) destroy security tokens; (4) access data supplied by a first authorized third party database; (5) authorize instructions to transfer stable value tokens to the second contract address; (6) authorize instructions to transfer stable value tokens from the second contract address; and (7) calculate excess collateral; (f) setting up, by the administrator system, a first trade between the first user and the second user using the security token smart contract, the step of setting up further comprising: (1) sending, by the administrator system via the underlying blockchain a first transaction request, from an administrator public address on the underlying blockchain to the second contract address on the underlying blockchain, wherein the first transaction request comprises a first message including requests to create a first trade between a first user public address on the underlying blockchain associated with the first user device and a second user public address on the underlying blockchain associated with the second user device in accordance with the security token smart contract, wherein the administrator public address has a corresponding administrator private key which is mathematically related to the administrator public address, and wherein the first transaction request is signed by the administrator private key; (2) sending, by the administrator system via the underlying blockchain a second transaction request from the administrator public address on the underlying blockchain to the first contract address on the underlying blockchain, the second transaction request comprising a second message including requests to: (i) transfer of a first amount of collateral of stable value digital asset tokens from the first user public address to the second contract address; and (ii) transfer of a second amount of collateral of stable value digital asset tokens from the second user public address to the second contract address; wherein the second transaction request is signed by the administrator private key; and (g) collecting, by the administrator system from the security token smart contract, excess collateral from the first trade, wherein collecting comprises: (1) sending, by the administrator system via the underlying blockchain, a third transaction request from the administrator public address on the underlying blockchain to the second contract address on the underlying blockchain, the third transaction request including a third message comprising requests for the security token smart contract to: (i) determine excess collateral for the first trade in accordance with the security token smart contract and the first trade instructions; and (ii) distribute excess collateral for the first trade in accordance with the security token smart contract and the first trade instructions; and wherein the third transaction request is signed by the administrator private key; (2) sending, by the security token smart contract via the underlying blockchain in response to the requests contained in the third message, a fourth transaction request from the second contract address on the underlying blockchain to an oracle address on the underlying blockchain, wherein the oracle address is associated with an oracle interface, and wherein the fourth transaction request includes a fourth message to obtain first benchmark data; (3) receiving, by the security token smart contract from the oracle interface, a callback message; (4) executing, by the security token smart contract in response to receiving the callback message, instructions to: (i) store the first benchmark information; and (ii) calculate the first excess collateral for the first user and second excess collateral for the second user by using the first trade instructions and the first benchmark information; and (5) in the cases where at least one of the first excess collateral is greater than zero or the second excess collateral is greater than zero, sending, by the security token smart contract, via the underlying blockchain, a fifth transaction request, from the second contract address on the underlying blockchain to the first contract address on the underlying blockchain, wherein the fifth transaction request including a fifth message requesting the stable value token smart contract to transfer: (i) the first excess collateral in stable value tokens from the second contract address on the underlying blockchain to the first user public address on the underlying blockchain, if the first excess collateral is greater than zero; and (ii) the second excess collateral in stable value tokens from the second contract address on the underlying blockchain to the second user public address on the underlying blockchain, if the second excess collateral is greater than zero.

In embodiments, a method for holding collateral in a smart contract on an underlying blockchain, the method including: (a) publishing, by an administrator system associated with an administrator, contract information including at least the following contract terms: (1) an inception date; (2) an inception value; (3) at least one benchmark; (4) a contract duration; (5) at least one collateral requirement; and (6) a notional value of the contract; (b) receiving, by the administrator system, a plurality of indications of interests, wherein the plurality of indications of interests include at least: (1) a first user response, from a first user device associated with a first user, the first user response comprising: (i) first user identification information associated with the first user; and (ii) first side information comprising identification of a first leg of the contract; and (2) a second user response, from a second user device associated with a second user, the second user response comprising: (i) second user identification information associated with the second user; and (ii) second side information comprising identification of a second leg of the contract wherein the second leg is different than the first leg; (c) matching, by the administrator system, the first user response with the second user response; (d) providing, on the underlying blockchain, a stable value token smart contract having a first contract address on the underlying blockchain for a stable value digital asset token comprising instructions to: (1) create stable value tokens; (2) transfer stable value tokens; (3) destroy stable value token; and (4) authorization instructions; (e) providing, on the underlying blockchain, a security token smart contract having a second contract address on the underlying blockchain comprising instructions to: (1) create security tokens; (2) transfer security tokens; (3) destroy security tokens; (4) access data supplied by a first authorized third party database; (5) authorize instructions to transfer stable value tokens to the second contract address; (6) authorize instructions to transfer stable value tokens from the second contract address; and (7) calculate excess collateral; (f) setting up, by the administrator system, a first trade between the first user and the second user, the first trade using the security token smart contract on the underlying blockchain with collateral in the form of stable value digital asset tokens, the step of setting up further comprising: (1) generating, by the administrator system, first trade instructions for the security token smart contract, the first trade instructions including instructions to execute the first trade between a first user public address on the underlying blockchain associated with the first user and a second user public address on the underlying blockchain associated with the second user, wherein the first trade is based at least on: (i) the contract terms; (ii) the first user response; and (iii) the second user response; (2) generating, by the administrator system, hashed trade instructions by applying a hash algorithm to the first trade instructions; (3) sending, by the administrator system via the underlying blockchain, a first transaction request, from an administrator public address on the underlying blockchain to the second contract address on the underlying blockchain, wherein the first transaction request includes a first message comprising: (i) the hashed trade instructions; and (ii) instructions to assign a first trade identification to a first trade associated with the hashed trade instructions, wherein the administrator public address on the underlying blockchain has a corresponding administrator private key, wherein the administrator private key being mathematically related to the administrator public address, and wherein the first transaction request is signed by the administrator private key; (4) obtaining, by the administrator system, the first trade identification of the first trade; (5)

sending, by the administrator system, the first trade identification to the first user device associated with the first user; (6) sending, by the administrator system, the first trade identification to the second user device associated with the second user; (7) monitoring, by the system administrator, transactions of stable value digital asset tokens on the underlying blockchain to determine that the second contract address has received at least the following: (i) a first amount of collateral in stable value digital asset tokens from the first user; and (ii) a second amount of collateral in stable value digital asset tokens from the second user; (8) sending, by the administrator system via the underlying blockchain, a second transaction request, from the administrator public address on the underlying blockchain to the second contract address on the underlying blockchain, wherein the second transaction request includes a second message including: (i) the first trade instructions; and (ii) the first trade identification; and wherein the second transaction request is signed by the administrator private key; and (g) collecting, from the security token contract, first trade excess collateral, wherein collecting comprises: (1) sending, by the administrator system via the underlying blockchain a third transaction request from the administrator public address on the underlying blockchain to the second contract address on the underlying blockchain, wherein the third transaction request includes a third message comprising requests for the security token smart contract to: (i) determine excess collateral for the first trade in accordance with security token smart contract and the first trade instructions; and (ii) distribute excess collateral for the first trade in accordance with security token smart contract and the first trade instructions; wherein the third transaction request is signed by the administrator private key; (2) executing, by the security token smart contract in response to receiving the requests contained in the third message, instructions to calculate first excess collateral for the first user and second excess collateral for the second user by using the first trade instructions and the first benchmark information; and (3) in the cases where at least one of the first excess collateral is greater than zero or the second excess collateral is greater than zero, sending, by the security token smart contract via the underlying blockchain a fourth transaction request from the second contract address on the underlying blockchain to the first contract address on the underlying blockchain, the fourth transaction request comprising a fourth message including requests for the stable value token smart contract to transfer: (i) the first excess collateral, if the first excess collateral is greater than zero, in stable value token from the second contract address on the underlying blockchain to the first user public address on the underlying blockchain; and (ii) the second excess collateral, if the second excess collateral is greater than zero, in stable value token from the second contract address on the underlying blockchain to the second user public address on the underlying blockchain.

In embodiments, obtaining the first trade identification further includes (i) monitoring, by the administrator system, transactions on the underlying blockchain to determine the first trade identification as calculated by the security token smart contract.

In embodiments, a method for holding collateral in a smart contract on an underlying blockchain, the method including: (a) publishing, by an administrator system associated with an administrator, contract information comprising at least the following contract terms: (1) an inception date; (2) an inception value; (3) at least one benchmark; (4) a contract duration; (5) at least one collateral requirement; and (6) a notional value of the contract; (b) receiving, by the administrator system, a plurality of indications of interests, wherein the plurality of indications of interests include at least: (1) a first user response, from a first user device associated with a first user, the first user response comprising: (i) first user identification information associated with the first user; and (ii) first side information comprising identification of a first leg of the contract; and (2) a second user response, from a second user device associated with a second user, the second user response comprising: (i) second user identification information associated with the second user; and (ii) second side information comprising identification of a second leg of the contract wherein the second leg is different than the first leg; (c) matching, by the administrator system, the first user response with the second user response; (d) providing, on the underlying blockchain, a stable value token smart contract having a first contract address on the underlying blockchain for a stable value digital asset token comprising instructions to: (1) create stable value tokens; (2) transfer stable value tokens; (3) destroy stable value tokens; and (4) authorization instructions; (e) providing, on the underlying blockchain, a security token smart contract having a second contract address on the underlying blockchain comprising instructions to: (1) create security tokens; (2) transfer security tokens; (3) destroy security token; (4) access data supplied by a first authorized third party database; (5) authorize instructions to transfer stable value tokens to the second contract address on the underlying blockchain; (6) authorize instructions to transfer stable value tokens from the second contract address on the underlying blockchain; and (7) calculate excess collateral; (f) setting up, by the administrator system, a first trade between the first user and the second user using the security token smart contract, the step of setting up further comprising: (1) sending, by the administrator system via the underlying blockchain a first transaction request, from an administrator public address on the underlying blockchain to the second contract address on the underlying blockchain, wherein the first transaction request comprises a first message including requests to create a first trade between a first user public address on the underlying blockchain associated with the first user device and a second user public address on the underlying blockchain associated with the second user device in accordance with the security token smart contract; wherein the administrator public address has a corresponding administrator private key which is mathematically related to the administrator public address on the underlying blockchain; and wherein the first transaction request is signed by the administrator private key; (2) sending, by the administrator system via the underlying blockchain a second transaction request from the administrator public address on the underlying blockchain to the first contract address on the underlying blockchain, the second transaction request comprising a second message including requests to: (i) transfer of a first amount of collateral of stable value digital asset tokens from the first user public address to the second contract address on the underlying blockchain; and (ii) transfer of a second amount of collateral of stable value digital asset tokens from the second user public address to the second contract address on the underlying blockchain; wherein the second transaction request is signed by the administrator private key; and (g) collecting, from the security token contract, first trade excess collateral, wherein collecting comprises: (1) sending, by the administrator system via the underlying blockchain a third transaction request from the administrator public address on the underlying blockchain to the second contract address on the underlying blockchain, wherein the third transaction request includes a third message comprising requests to the security token smart contract to: (i) determine excess collateral for the first trade in accordance with security token smart contract and the first trade instructions; and (ii) distribute excess collateral for the first trade in accordance with security token smart contract and the first trade instructions; wherein the third transaction request is signed by the administrator private key; (2) executing, by the security token smart contract in response to receiving the requests contained in the third message, instructions to calculate first excess collateral for the first user and second excess collateral for the second user by using the first trade instructions and the first benchmark information; and (3) in the cases where at least one of the first excess collateral is greater than zero or the second excess collateral is greater than zero, sending, by the security token smart contract via the underlying blockchain a fourth transaction request from the second contract address on the underlying blockchain to the first contract address on the underlying blockchain, the fourth transaction request comprising a fourth message including requests for the stable value token smart contract to transfer: (i) the first excess collateral, if the first excess collateral is greater than zero, in stable value token from the second contract address on the underlying blockchain to the first user public address on the underlying blockchain; and (ii) the second excess collateral, if the second excess collateral is greater than zero, in stable value token from the second contract address on the underlying blockchain to the second user public address on the underlying blockchain.

BRIEF DESCRIPTION OF THE DRAWINGS

Exemplary embodiments of the present invention will be described with references to the accompanying figures, wherein:

FIG. 2 is an exemplary screen shot of an excerpt of an exemplary bitcoin transaction log showing addresses in accordance with exemplary embodiments of the present invention;

FIGS. 6A-6D are flow charts of exemplary processes for generating digital asset accounts and securely storing the keys corresponding to each account in accordance with exemplary embodiments of the present invention;

FIGS. 17A and 17B are flow charts of processes for investing in the trust in accordance with exemplary embodiments of the present invention;

FIG. 19C is a flow chart of an exemplary process for redemption of shares in an exchange traded product holding digital math-based assets in accordance with exemplary embodiments of the present invention;

FIGS. 30C-E are an exemplary schematic diagram and corresponding flow chart of a process for digital asset exchange customer account fiat funding via a customer-initiated request in accordance with exemplary embodiments of the present invention;

FIGS. 52A-C are flow charts of exemplary processes for generating graphical user interfaces representing an electronic order book in accordance with exemplary embodiments of the present invention;

FIGS. 59 and 59A are schematic diagrams of exemplary messages of various exemplary block trades in accordance with exemplary embodiments of the present invention;

FIGS. 61A-B are exemplary flow charts illustrating an exemplary process for loaning digital assets on a digital asset computer system using a continuous book;

FIGS. 62A-C are exemplary flow charts illustrating an exemplary process for loaning digital assets on a digital asset computer system by conducting an electronic auction;

FIGS. 63A-C are exemplary flow charts illustrating an exemplary process for performing a return swap on a digital asset computer system in accordance with exemplary embodiments of the present invention;

FIGS. 65A-1-4 illustrate an exemplary embodiment of a dashboard fiat interface which allows registered users to deposit and/or withdraw fiat with the digital asset exchange in accordance with exemplary embodiments of the present invention;

FIGS. 65B-1-4 illustrate an exemplary dashboard digital asset interface which allows registered users to deposit and/or withdrawal digital assets with the digital asset exchange system in accordance with exemplary embodiments of the present invention;

FIGS. 65C-1-2 illustrate an exemplary dashboard SVCoin interface which allows registered users to purchase and/or redeem SVCoins for fiat or digital with the digital asset exchange system in accordance with exemplary embodiments of the present invention;

FIGS. 70B-C are flowcharts of an exemplary sub-process of setting up a trade between a first user and a second user in accordance with exemplary embodiments of the present invention;

FIGS. 71A-B are exemplary graphical user interfaces (GUIs) showing exemplary published contracts in accordance with exemplary embodiments;

FIGS. 71C-D are exemplary GUIs showing exemplary first indications of interest from user Alice in accordance with exemplary embodiments;

FIGS. 71E-F are exemplary GUIs showing exemplary second indications of interest from user Bob in accordance with exemplary embodiments;

DETAILED DESCRIPTION

Digital Math-Based Assets and Bitcoin

Figure 1:
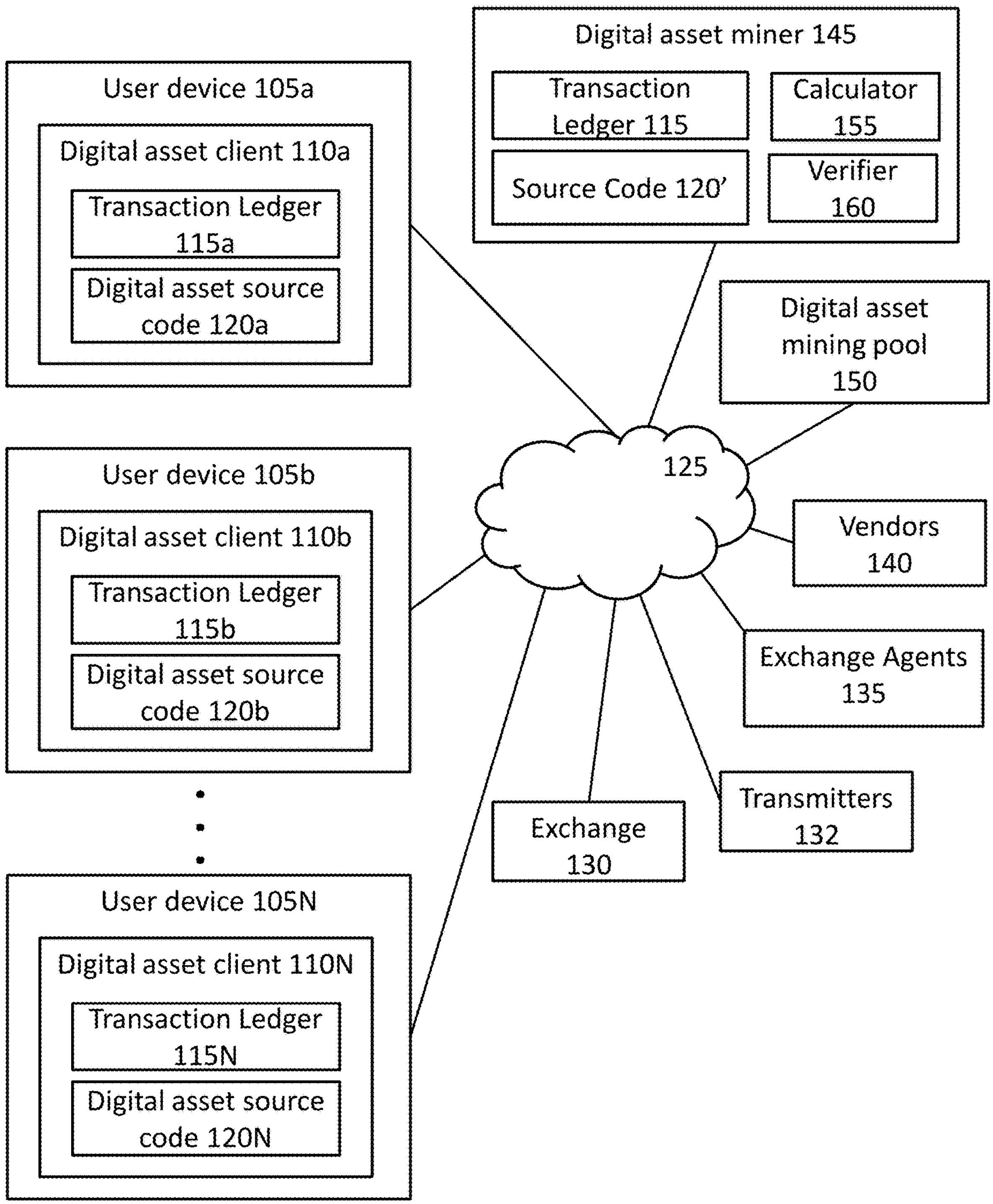
FIG. 1 is a schematic diagram of a digital asset network in accordance with exemplary embodiments of the present invention.

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset. The Ethereum system represents another form of digital math-based asset, which allows for smart contracts, as discussed below.

A bitcoin may be a unit of the Bitcoin digital math-based asset. An ether may be a unit of the Ethereum digital math-based asset. Other examples of digital math-based assets include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. In embodiments, digital math-based assets, such as bitcoin, may be accepted in trade by merchants, other businesses, and/or individuals in many parts of the world.

Digital assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, to name a few). As such, it is a set of code with an associated database. In embodiments, the database may be maintained by an issuer. The code describes the behavior of the token, and the database is basically a table with rows and columns tracking who owns how many tokens.

In embodiments, a smart contract may be a computer protocol intended to digitally facilitate, verify, or enforce the negotiation or performance of credible transactions without third parties. In embodiments, smart contracts may also allow for the creation of tokens.

In embodiments, a digital math-based asset may be based on an open source mathematical and/or cryptographic protocol, which may exist on a digital asset network, such as a Bitcoin network or an Ethereum network. The network may be centralized, (e.g., run by one or more central servers) or decentralized (e.g., run through a peer-to-peer network). Digital math-based assets may be maintained, tracked, and/or administered by the network.

A digital math-based asset system may use a decentralized electronic ledger system, which may be maintained by a plurality of physically remote computer systems. Such a ledger may be a public transaction ledger, which may track asset ownership and/or transactions in a digital math-based asset system. The ledger may be a decentralized public transaction ledger, which can be distributed to users in the network (e.g., via a peer-to-peer sharing). Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without identifying the assets themselves.

In embodiments, a digital asset ledger, such as the Bitcoin blockchain or the Ethereum blockchain, can be used to achieve consensus and to solve double-spending problems where users attempt to spend the same digital assets in more than one transaction. In embodiments, before a transaction may be cleared, the transaction participants may need to wait for some period of time, e.g., a six-confirmation wait (typically one hour in the context of the Bitcoin network, 15 minutes in the context of the Litecoin network, to name a few), before feeling confident that the transaction is valid (e.g., not a double count). Each update to the decentralized electronic ledger (e.g., each addition of a block to the Bitcoin blockchain or the Ethereum blockchain) following execution of a transaction may provide a transaction confirmation. After a plurality of updates to the ledger (e.g., 6 updates), the transaction may be confirmed with certainty or high certainty.

In embodiments, a blockchain can be a public transaction ledger of the digital math-based asset that is maintained by a distributed network, such as the Bitcoin network or the Ethereum network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of digital math-based assets) and/or a payment of transaction fees (e.g., a fixed amount or set percentage of the transaction) from users whose transactions are recorded in the block being added. In embodiments, digital assets in the form of a digital asset token, such as Gas, may be used to pay such fees.

The digital asset network (e.g., Bitcoin network or Ethereum network) may timestamp transactions by including them in blocks that form an ongoing chain called a blockchain. In embodiments, the addition of a block may occur periodically, e.g., approximately every 15 seconds, every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power, or some other consensus mechanism will become the accepted blockchain for the network. In embodiments, confirmation of a transaction may be attained with a high degree of accuracy following the addition of a fixed number of blocks to the blockchain (e.g., six blocks) after a transaction was performed and first recorded on the blockchain. As long as a majority of computing power (or some other consensus mechanism) is controlled by nodes that are not cooperating to attack the network, they will generate the longest blockchain of records and outpace attackers.

There are a variety of consensus mechanisms (or protocols) that may be used to verify transactions recorded in a blockchain. A few non-limiting examples of these mechanisms are discussed below, however, other protocols may be used in accordance with exemplary embodiments of the present invention.

For example, the proof of control protocol is one example of a consensus mechanism and is used, for example, in the Bitcoin blockchain. A more detailed discussion of proof of control protocols can be found in co-pending U.S. patent application Ser. No. 15/920,042, filed Mar. 13, 2018 and entitled SYSTEMS, METHODS, AND PROGRAM PRODUCTS FOR VERIFYING DIGITAL ASSETS HELD IN A CUSTODIAL DIGITAL ASSET WALLET, the entire content of which is hereby incorporated herein by reference.

The proof of stake protocol is another optional protocol that may be implemented by blockchains. In this type of protocol, the validator's stake is represented by the amount of digital assets held. Validators accept, reject or otherwise validate a block to be added to the blockchain based on the amount of digital assets held by the Validator on the blockchain. If the Validators are successful in validating and adding the block, such a protocol, in embodiments, will award successful Validators are a fee in proportion to their stake.

The delegated proof of stake protocol is another protocol that is available and is, for example, used by the EOS blockchain. In this protocol, blocks are produced in a fixed number in rounds (e.g., 21 for EOS). At the start of every such round, block producers are chosen. A number less than all of the producers (e.g., 20 in EOS) are automatically chosen while a corresponding number are chosen proportional to the number of their votes relative to other producers. In embodiments, the remaining producers may be shuffled using a pseudorandom number derived from the block time, for example. In embodiments, other forms of randomized selection may be used. To ensure that regular block production is maintained, in embodiments, block time is kept short (e.g., 3 seconds for EOS) and producers may be punished for not participating by being removed from consideration. In embodiments, a producer has to produce a minimal number of block, e.g., at least one block every 24 hours to be in consideration. All of the nodes will, by default, not switch to a fork which does not include any blocks not finalized by a sufficient majority (e.g., 15 of the 21 producers) regardless of chain length. Thus, in EOS, each block must gain 15 of 21 votes for approval to be considered a part of the chain.

In embodiments, a delegated byzantine fault tolerance protocol may be used as a consensus mechanism. For example, NEO uses this type of protocol. In this protocol, one of the bookkeeping nodes is randomly chosen as a "speaker." The speaker then looks at all the demands of the "citizens," (e.g., all of the holders of the digital asset), and creates a "law" (e.g., a rule governing the protocol). The speaker then calculates a "happiness factor" of these laws to see if the number is enough to satisfy the citizen's needs or not. The speaker then passes the happiness factor down to the delegates (e.g., the other bookkeeping nodes). The delegates may then individually check the speaker's calculations. If the speaker's number matches the delegate's number, then the delegates give their approval, and if not, then they give their disapproval. In embodiments, a sufficient majority (e.g., 66% in NEO) of the delegates need to give their approval for the law to pass, i.e. for the block to be added. If a sufficient majority is not obtained (e.g., less than 66% approval), then a new speaker is chosen and the process starts again.

Ripple uses an algorithm in which each server gathers all valid transactions that have not yet been applied and makes them public. Each server then amalgamates these transactions and votes on the veracity of each. Transactions that receive at least a minimum number of yes votes will move into another round of voting. A minimum of 80% approval is required before a transaction is applied.

These and other protocols may be used to generate a blockchain in accordance with exemplary embodiments of the present invention.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally-signed transactions that began with its creation as a block reward through bitcoin mining. Each owner transfers bitcoin to the next by digitally signing them over to the next owner in a bitcoin transaction, which is published to and added onto a block on the blockchain. A payee can then verify each previous transaction, e.g., by analyzing the blockchain, to verify the chain of ownership.

Other examples of different types of blockchains noted above that are consistent with embodiments of present invention pose unique problems. Certain currencies present unique challenges in that transactions and/or wallets or digital asset addresses associated therewith may be shielded (e.g., not viewable by the public on the ledger). For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In embodiments, "proof of brain" may be a type of token reward algorithm used in social media blockchain systems that encourages people to create and curate content. In embodiments, proof of brain may enable token distribution by upvote and like-based algorithms, which may be integrated with websites to align incentives between application owners and community members to spur growth.

In particular, in Monero, ring signatures mix spender's address with a group of others, making it more difficult to establish a link between each subsequent transaction. In addition, Monero provides "stealth addresses" generated for each transaction which make it difficult, if not impossible to discover the actual destination address of a transaction by anyone else other than the sender and the receiver. Further, the "ring confidential transactions" protocol may hide the transferred amount as well. Monero is designed to be resistant to application-specific integrated circuit mining, which is commonly used to mine other cryptocurrencies such as Bitcoin, however, it can be mined somewhat efficiently on consumer grade hardware such as x86, x86-64, ARM and GPUs, to name a few.

Another example of a modified blockchain consistent with exemplary embodiments of the present invention discussed above is Darkcoin. Darkcoin adds an extra layer of privacy by automatically combining any transaction its users make with those of two other users—a feature it calls Darksend—so that it will be more difficult to analyze the blockchain to determine where a particular user's money ended up.

Yet another example of a modified blockchain consistent with embodiments of the present invention discussed above is Zcash. The Zcash network supports different types of transactions including: "transparent" transactions and "shielded" transactions. Transparent transactions use a transparent address (e.g., "t-address"). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., "z-address"). In embodiments, the "z-address" provides privacy via zero-knowledge succinct noninteractive arguments of knowledge (e.g., "zk-SNARKS" or "zero-knowledge proofs"). The balance of a z-address is not publicly visible on the Zcash blockchain—the amount transferred into and out of a z-address is private if between two z-addresses—but may be public if between a z-address and a t-address.

In embodiments, a digital asset based on a blockchain, may, in turn, include special programming, often referred to as "smart contracts", which allow for the creation of "tokens", which in turn are digital assets based on digital assets. In embodiments, tokens may be ERC-20 tokens, and used in conjunction with ERC-20 token standard as a programming language. In embodiments, other protocols may be used including but not limited to ERC-223 and ERC-721, to name a few. In embodiments, smart contracts may be written on other smart contracts to provide for increased functionality. One non-limiting example of this type of structure is the open source Cryptokittens game in which digital kittens are provided as ERC-721 tokens with a series of smart contracts provided to define how the kittens will interact with each other and with users. In embodiments, programming modules may be added to and/or transferred with programming modules associated with specific tokens. By way of illustration, a first token, e.g., a Cryptokitten Tiger, may purchase a second token, e.g., a digital "hat," that will then become associated with the first token to be a Tiger with a hat, and remain with the first token when transferred. Thus, by way of illustration, in the context of example embodiments of the present invention, the first token could be, e.g., a security token, and the second token could be, e.g., an account holding tokens, or a right to request tokens from another account as discussed below. If the first token is transferred, the second token would transfer with the ownership of the first token.

For example, digital assets can include tokens, which like other digital assets that can represent anything from loyalty points to vouchers and IOUs to actual objects in the physical world. Tokens can also be tools, such as in-game items, for interacting with other smart contracts. A token is a smart contract running on top of a blockchain network (such as the Ethereum Blockchain, the Bitcoin Blockchain, to name a few). As such, it is a set of code with an associated database. In embodiments, the database may be maintained by an issuer. In embodiments, the database may be included as part of the blockchain. In embodiments, the ledger may be maintained in the first instance as a database in a sidechain by the issuer or agent of the issuer and subsequently published and stored as part of a blockchain. The code describes the behavior of the token, and the database may be a table with rows and columns tracking who owns how many tokens.

If a user or another smart contract within the blockchain network (such as the Ethereum Network) sends a message to that token's contract in the form of a "transaction," the code updates its database.

In embodiments, an underlying blockchain, like the Bitcoin Block chain, may have limited or no smart contract capabilities.

In such embodiments, an overlying protocol, such as Omni Layer (https://www.omnilayer.org/) may also be used to create custom digital assets on such an underlying blockchain, like the Bitcoin blockchain, as described in https://github.com/OmniLayer/spec. In embodiments, a smart contract may be used for transactions involving Bitcoin through the use of a two way peg with side chain. The side chain can share miners with the Bitcoin blockchain and allows smart contracts to be run, such as contracts using the Ethereum virtual machine. When Bitcoin is to be used in the smart contract side chain, the Bitcoin is locked and an equal amount of side chain currency, an example of which is Super Bitcoin (SBTC), is assigned to the corresponding address. After the smart contract transaction is completed, the side chain currency is locked and the Bitcoin is unlocked. An example of such a side chain is Rootstock.

In embodiments, where the blockchain is the Bitcoin blockchain, and another protocol is used as a layer over the Bitcoin blockchain to provide for smart contract functionality. For example, the other protocol may be a two-way peg of stable value digital asset tokens to bitcoin and a sidechain that shares miners with the Bitcoin blockchain. In embodiments, the other protocol is an omni layer protocol.

Figure 60:
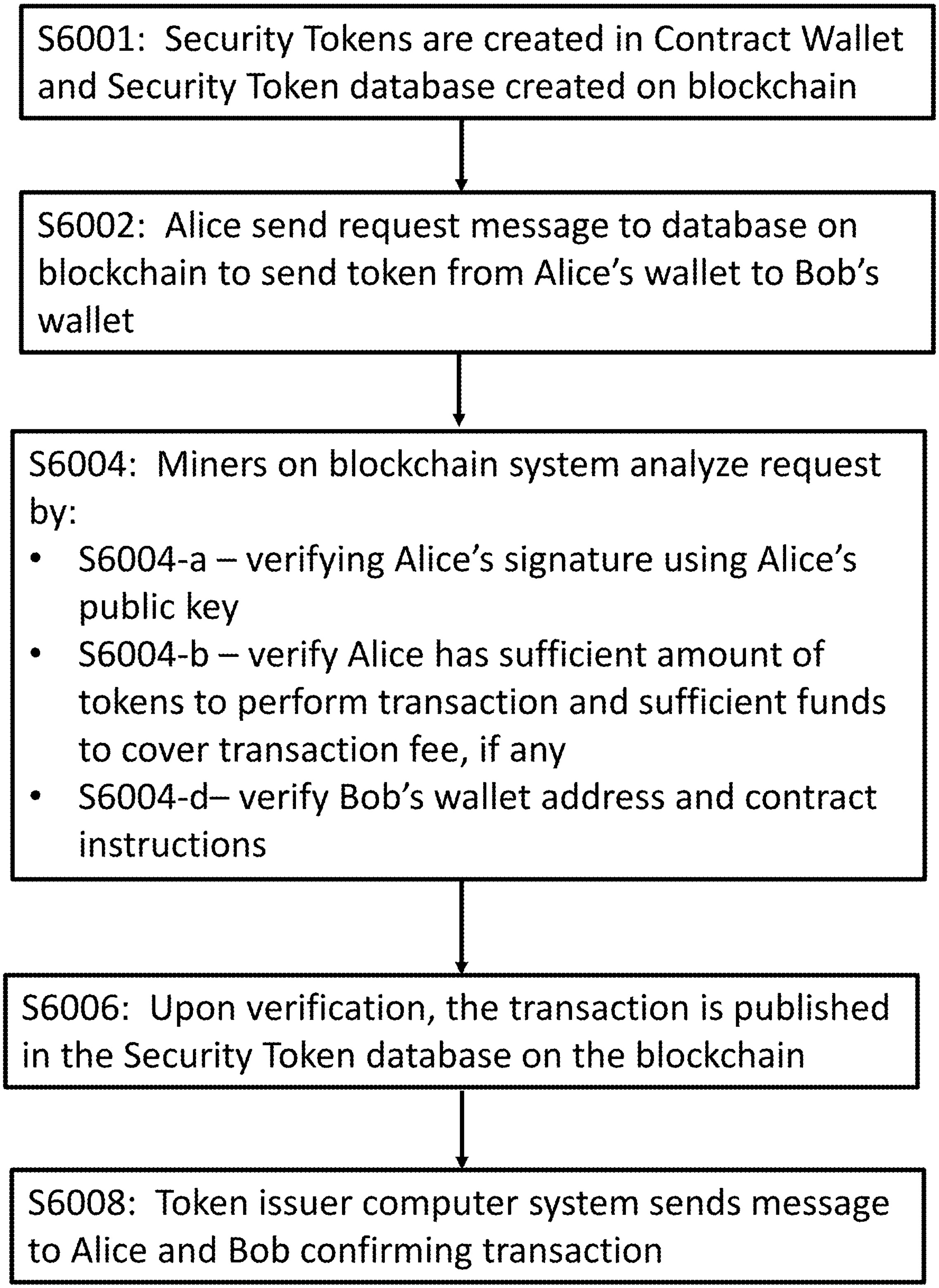
FIG. 60 is an exemplary flow chart of the process of sending tokens from Alice to Bob on the Ethereum blockchain in accordance with exemplary embodiments of the present invention.

So, for instance, as illustrated in FIG. 60, using a token based on the Ethereum Network for illustration purposes, when a wallet app sends a message to a token's contract address to transfer funds from Alice to Bob, the following process occurs.

In step S6001, at the token issuer computer system, Security Tokens are created. In embodiments, each Stable Value Token may have a "ERC-20 Contract Wallet Address" ("Contract Address") which is an address on the blockchain at which the code for the smart contract is stored. In embodiments, the smart contract may include instructions to perform at least: (1) token creation, (2) token transfer, (3) token destruction: and (4) updating smart contract coding.

In embodiments of the present invention, the minimal specification for a Token, such as a Stable Value Token, may include instructions to perform at least: (1) a "totalSupply" function, which when called, will respond with a count of the number of tokens in existence; (2) a "balanceOf" function, which when called with a specific account (address) as a parameter, responds with the count of the number of tokens owned by that account; and (3) a "transfer" function, which is an example of a state modifying function, that, when called, given one or more target accounts and corresponding transferred amounts as parameters, the transfer function will decrease the balance of the caller account by the corresponding transfer amounts, and increase the target accounts by the target amounts (or fail if the caller account has insufficient amounts or if there are other errors in the parameters).

In embodiments, a Stable Value Token may be created with a fixed supply of tokens at the time of its creation. For example, a Stable Value Token may be created with a supply of 21 million tokens and set Address 1 (mathematically associated with a private key 1) as the owner of all 21 million tokens. Thereafter, private key 1 will be required to generate a call to the transfer function in order to assign some portion of the 21 million tokens with a second Address 2 (mathematically associated with a private key 2) or any other Address (also mathematically associated with a corresponding private key).

In embodiments, a Stable Value Token may be created with a variable supply of tokens which can be set to increase or decrease after original creation. In such embodiments, the minimum functions required will also include: (4) a "print" function, which is another example of a state modifying function, that when called allows for the creation of additional Stable Value Tokens into the totalSupply of Stable Value Tokens; and (5) a "burn" function, which is also another example of a state modifying function, that when called allows for the destruction of previously created Stable Value Token from the total Supply of the Stable Value Tokens. As discussed below in greater detail, in embodiments, the print and burn function may include limits on the Addresses that are allowed to call those functions.

Currently, due to the immutable nature of the Ethereum blockchain, once a smart contract is written to a specific Contract Address it cannot be changed. However, in embodiments, the various functions called for in the Contract Address may be associated with specific authorized key pairs of public keys (or "addresses") and corresponding private keys (which are mathematically associated with public keys). In embodiments, one or more private keys may be stored off-line in, what is sometimes referred to as, a designated cold storage wallet associated with the token issuer. In embodiments, one or more private keys may be stored on-line in, what is sometimes referred to as a designated hot storage wallet associated with the token issuer. In embodiments, the Contract Address may include instructions which are associated with authorizing one or more designated key pairs stored off-line in, e g., one or more cold storage wallets on one or more air-gapped computer systems associated with the token issuer, but may also give at least some permission to perform operations by one or more designated key pairs stored on-line, in, e.g., one or more hot wallets associated with the token issuer and/or a token administrator on behalf of the token issuer on one or more computer systems connected to the digital asset computer system. In embodiments, the on-line computer systems would be co-located with the digital asset computer systems. In embodiments, the Stable Value Tokens may be created in batches (for example, 100,000 SVCoins worth $100,000 U.S. dollars) by a designated key pair (such as an off-line designated key pair) authorized by smart contract and assigned by such a key pair to a designated address associated with on on-line public key for transactions as necessary.

In embodiments, a Stable Value Token database is maintained in a blockchain, such as the Ethereum blockchain, for example. In embodiments, the ledger may be maintained, in the first instance, as a database in a sidechain by the issuer or agent and subsequently published and stored as part of a blockchain.

In embodiments, a Stable Value Token database is maintained in a blockchain, such as the Ethereum blockchain, for example. In embodiments, the ledger may be maintained in the first instance as a database in a sidechain by the issuer or agent and subsequently published and stored as part of a blockchain.

In embodiments, Stable Value Tokens may be generated on the fly, however, in this case, the contract code, which is the executable code that is stored at the Contract Address location on the blockchain, may designate one or more public addresses corresponding to one or more on-line private keys held in, e.g., a hot wallet(s), or one or more public addresses corresponding on one or more off-line public keys held in, e.g., a cold wallet(s), or some combination thereof, as the authorized caller of some functionality. A more detailed discussion of hot wallets and cold wallets is presented in U.S. Pat. No. 9,892,460 issued Feb. 13, 2018 entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein by reference.

In embodiments, Contract Wallets may be maintained by the token issuer and which would hold the private key associated with the token on an associated device. In embodiments, Contract Wallets may be provided on a user computer device and hold the private key associated with the token. In such embodiments, a user computer device may include a software application to provide secure access to the token issuer such that the user can engage in transactions.

By way of illustration, an ERC-20 Contract can include the following representative type of functions as shown in Table 1 in its programming of a Smart Contract associated with a particular token, such as a security token:

TABLE 1

```
// ----------------------------------------------------------------------------
// ERC Token Standard #20 Interface
// https://github.com/ethereum/EIPs/blob/master/EIPS/eip-20-token-standard.md
// ----------------------------------------------------------------------------
contract ERC20Interface {
function totalSupply( ) public constant returns (uint);
function balanceOf(address tokenOwner) public constant returns (uint balance);
function allowance(address tokenOwner, address spender) public constant returns
(uint remaining);
function transfer(address to, uint tokens) public returns (bool success);
function approve(address spender, uint tokens) public returns (bool success);
function transferFrom(address from, address to, uint tokens) public returns (bool
success);

event Transfer(address indexed from, address indexed to, uint tokens);
event Approval(address indexed tokenOwner, address indexed spender, uint tokens);
```

Some of the tokens may include further information describing the token contract such as shown in Table 2:

TABLE 2

```
string public constant name = "Token Name";
sting public constant symbol = "SYM";
uint8 public constant decimals = 18; // 18 is
the most common number of decimal places
```

In embodiments, a more elaborate smart contract can be set up to allow token issuers to have hybrid control over which key pairs have authority to affect the token supply and distribution. In embodiments, a hybrid combination of on-line and off-line key pairs can be used to control the supply and distribution of tokens.

For example, in embodiments, a smart contract may include a state-changing function such as limitedPrint, where the authorized caller of such function would be authorized only to print (or issue) a specific limited amount of tokens. In embodiments, the limitedPrint function may be used with an on-line key pair (e.g., hot wallet), to allow for fast and efficient token creation, but limit risk of unauthorized takeover of the on-line key pair to the set limit.

In conjunction with a limitedPrint command, a separate state-changing function of raiseCeiling can be used to increase the authority for the on-line key pair using a different key pair, such as an off-line key pair (e.g., cold wallet), which is considered to be more secure.

In embodiments, using a limitedPrint function with a set limit that can be implemented by one or more designated on-line key pairs (e.g., hot wallets), and a raiseCeiling function which may change that limit under the authority of a different set of one or more designated off-line key pairs (e.g., cold wallets), the automated increases in the token supply through on-line control will only continue up until the ceiling is reached, at which point further intervention through off-line control is required.

One should consider the difference between the current token supply and the supply ceiling as part of the tokens at risk. If the current token supply has decreased through the use of burn, then the effective funds at risk could have increased without a corresponding decrease in the supply ceiling. The ceiling can be lowered by on-line control, through a function called lowerCeiling. This allows for relinquishing some portion of what has been granted through off-line control to limit the effective funds at risk through compromise of on-line key management systems. In embodiments, a limit on number of tokens that can be burned may also be included.

Figure 64A:
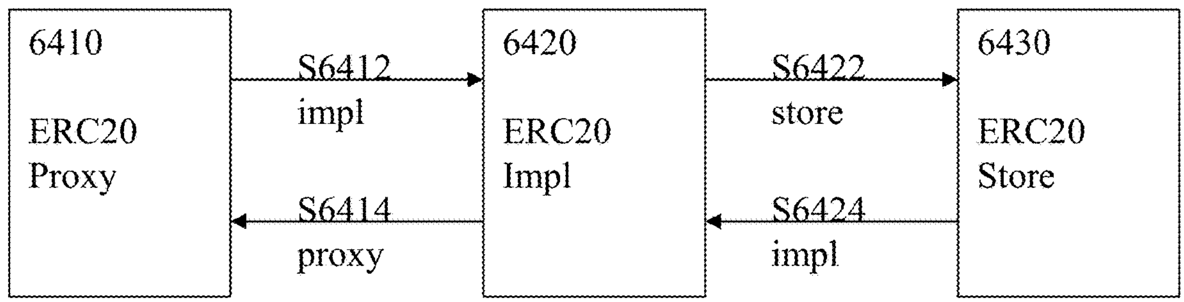
FIGS. 64A-H illustrate exemplary embodiments of a token that utilizes smart contracts in accordance with an embodiment of the present invention.

In embodiments, as illustrated in FIG. 64A, the token may be set up using at least three core smart contracts, e.g., ERC20Proxy 6410, ERC20Impl 6420, and ERC20Store 6430 that cooperatively implement an ERC20 compliant token.

In the context of a ERC20 compliant token on the Ethereum blockchain, there is one, and will only ever be one instance of ERC20Proxy 6410. This is the smart contract that users of the token treat as the token contract. Thus, ERC20Proxy 6410 can be considered the permanent face of interacting with the token on the Ethereum blockchain.

However, in embodiments, ERC20Proxy 6410 may have almost no code and does not keep any state information itself. Instead, in embodiments, ERC20Proxy 6410 has one or more implementations (e.g., ERC20 Impl 6420, ERC20 Impl (1) 6440, ERC20 Impl (2), to name a few) that executes the logic of the token. S6412 impl represents a delegation from ERC20 Proxy 6410 to ERC20Impl 6420. Thus, the instance of ERC20Impl 6420 executes the specific delegated functions. ERC20Impl 6420 may further limit the authority to implement to the specific delegated functions to only specified trusted callers (e.g., as shown in FIGS. 64C, 64G and 64H, one or more off-line key set 6462, one or more on-line key set 6464, to name a few). S6414 proxy illustrates the authorization of ERC20Impl 6420 executing logic on behalf of ERC20Proxy 6410, through call functions from one or more authorized addresses.

In embodiments, state information, such as token balances, may be maintained in a. separate instance, e.g., ERC20Store 6430, a "backing store." In such embodiments, ERC20Store 6430 would own the delegated state of the token. S6422 store illustrates the delegation of state information from ERC20Impl 6420 to ERC20Store 6430. In embodiments, the instance of ERC20Store 6430 may execute updates to the state of the token, such as updates to token balances that occur during a token transfer to one or more designated key sets. S6424 impl represents the address that the ERC20Store 6430 will permit to invoke the update functions. In embodiments, that address is the "Contract Address" of the active version of ERC20Impl 6420.

This separation of duties—public face, logic, and storage, for ERC20Proxy 6410, ERC20Impl 6420, and ERC20Store 6430, respectively—provides the ability for token issuer to replace the logic of the system at a later date. In embodiments, the logic may be replaced by changing the impl arrows (e.g., S6412 impl and S6424 impl).

Figure 64B:
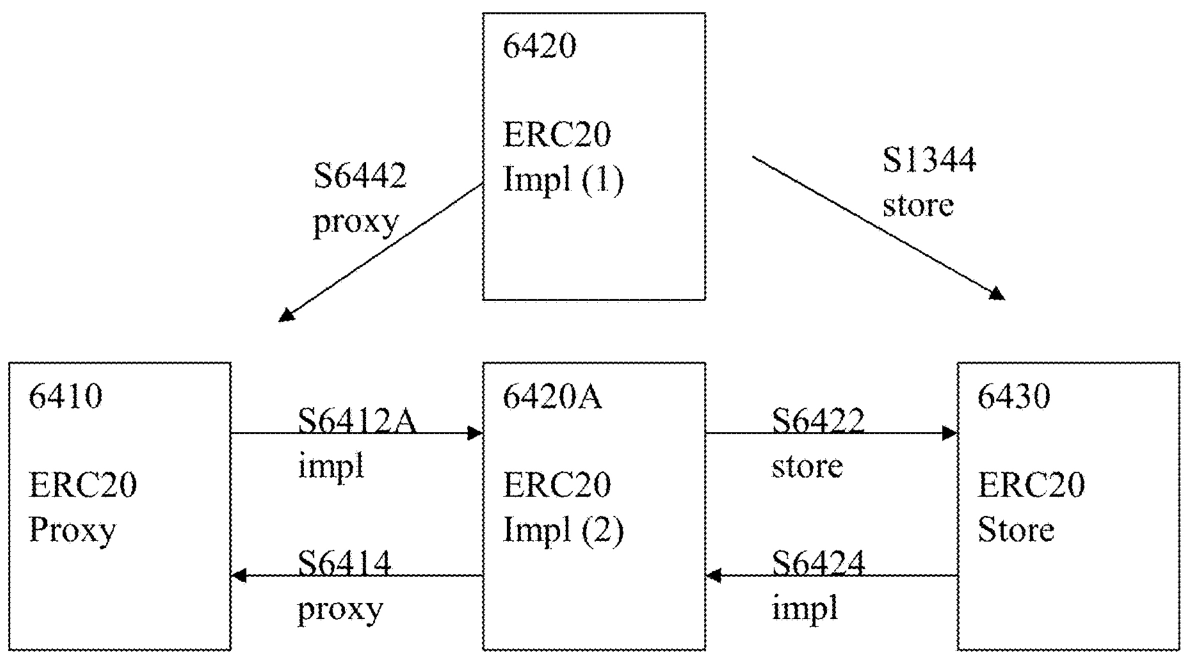
Figure 64C:
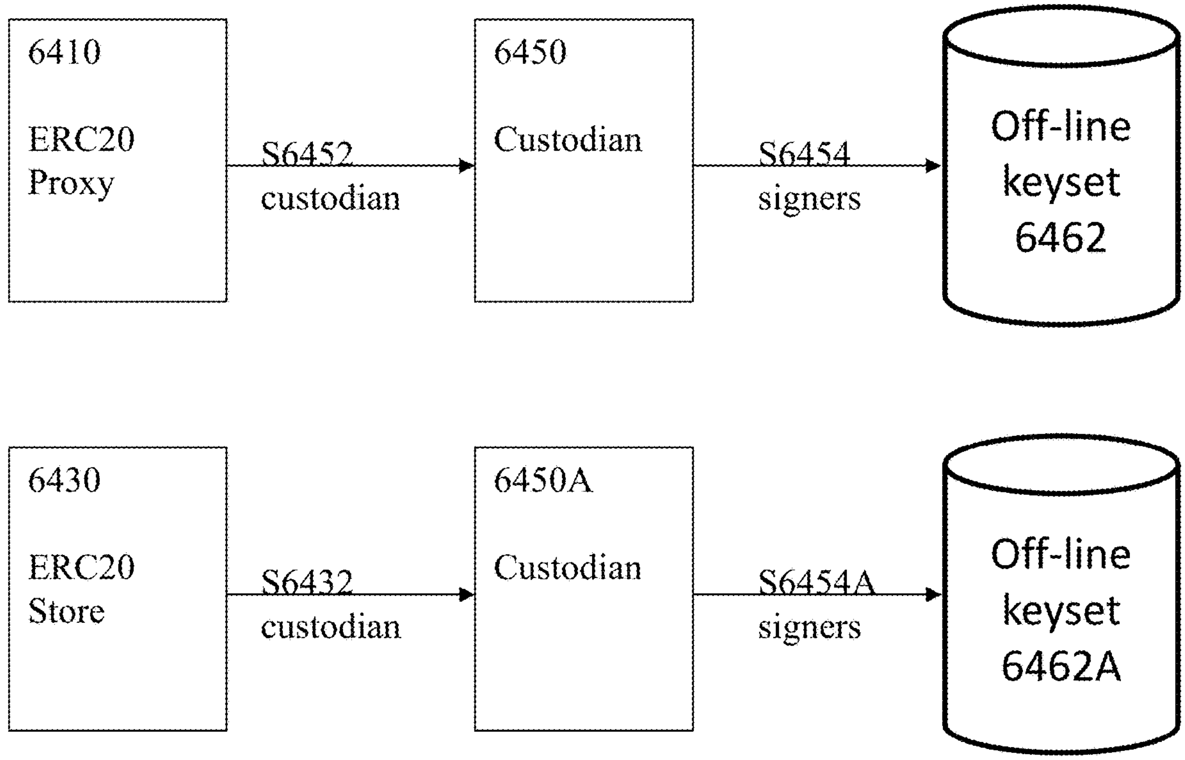

FIG. 64B illustrates an embodiment where a token has been upgraded, by creating a new instance of ERC20Impl (ERC20Impl (2) 6420A) with a second version of the code previously implemented through ERC20Impl 6420. The instance of ERC20Proxy 6410 now delegates its implementation in S6412A impl to ERC20Impl (2) 6420A (version 2 of the code) instead of the previous ERC20Impl 6420 (version 1), and the instance of ERC20Store 6430 will now only accept calls from ERC20Impl 6420A (version 2). The original ERC20Impl 6420 (version 1) remains, but has become inert as it is unlinked from the system.

Turning to FIGS. 64C-64F, custodianship will be discussed.

In embodiments, a fourth type of contract, Custodian 6450, may also be implemented. A Custodian 6450 is logic which designates which key pair (e.g., an Off-Line Keyset 6462), is authorized to control other contracts in the system (e.g., ERC20Proxy 6410). Contracts cooperate with Custodian 6450 by awaiting an approval from Custodian 6450 before executing certain actions. In turn, such approval will require a message from an authorized key pair (e.g., Off-Line Keyset 6462) authorizing the action (e.g., print tokens, limit tokens, transfer tokens, to name a few).

In embodiments, Custodian 6450 may include a range of control coding. In embodiments, control coding may include the requirement that at least two designated keysets authorize a specific action (e.g., print token). In embodiments, at the least two keysets may be a subset of a larger group of keysets (e.g., two of three designated keysets, or two of six designated keysets, or three of five designated keysets, to name a few). In embodiments, when a higher degree of security is desired, the keysets may be maintained off-line. In embodiments, when a high degree of automation or speed to access is required, the keysets may be maintained on-line, such as in a co-located, but separate computer system that is operatively connected to a customer facing digital asset system.

In embodiments, Custodian 6450 may also exercise control over various security operations of ERC20Proxy 6410 (e.g., time locking and revocation, to name a few).

In embodiments, Custodian 6450 may have custodianship of the proxy which grants exclusive power to replace the implementation for ERC20Proxy 6410 from its current implementation (e.g., ERC20Impl 6420 (version 1)) to a new implementation (e.g., ERC20Impl 6420A (version 2)), as illustrated in FIG. 64B, discussed above. As discussed, in embodiments, only authorized and designated key sets (e.g., off-line key set 6462) will have the authority in step S6454 signers to authorize the Custodian 6450 to modify an implementation of ERC20Proxy 6410.

In embodiments, Custodian contracts with their own respective authorized designated keysets can be set up for other contracts, such as ERC20Store 6430 as also shown in FIG. 64C. Thus, by way of example, ERC20Store 6430 may designate in S6432 Custodian 6450A as a custodian for certain operations of ERC20Store. Those operations will only be executed by ERC20Store 6430 when designated keyset (such as Off-Line keyset 6462A) sends a message through the blockchain to Custodian 6450A authorizing the Custodian 6450A to authorize the ERC20Store 6430 to perform the designated function. In embodiments, the off-line keyset 6462A may be the same as, overlap with, or be different from the Off-Line Key Set 6462A which may authorize Custodian 6450 with respect to ERC20Proxy 6410.

In embodiments, custodianship of the proxy and store also grants exclusive power to pass custodianship to a new instance of Custodian. Thus, one of the technical computer problems associated with the immutability of ERC20 smart contracts on the Ethereum blockchain has been solved, thus allowing for a self-upgrade of custodianship. In embodiments, since a set of signers for a given instance of a Custodian is fixed, a change to the off-line keyset may be implemented instead having a current Custodian authorize itself to be replaced by a new instance of Custodian with a new set of signers.

Figure 64D:
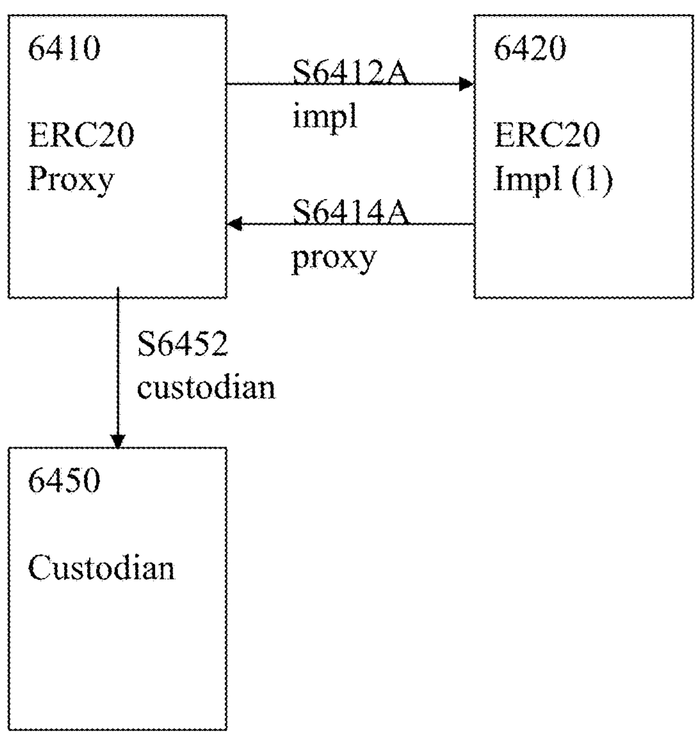
Figure 64E:
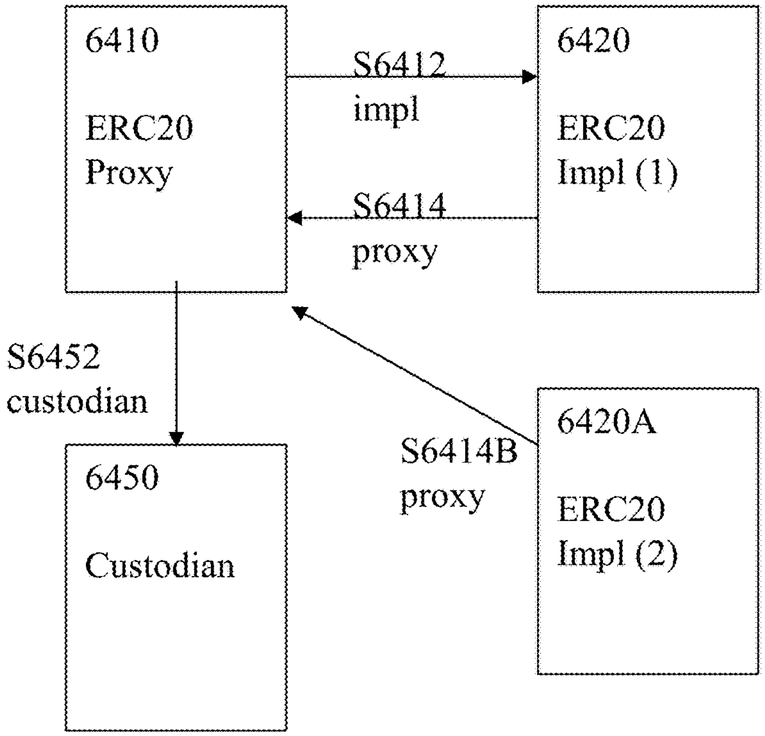
Figure 64F:
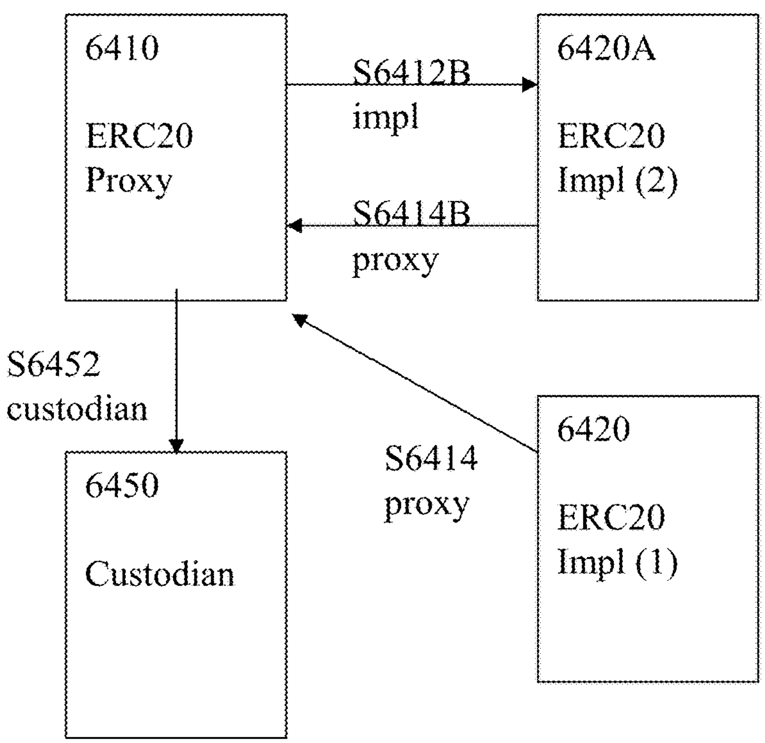
Figure 64G:
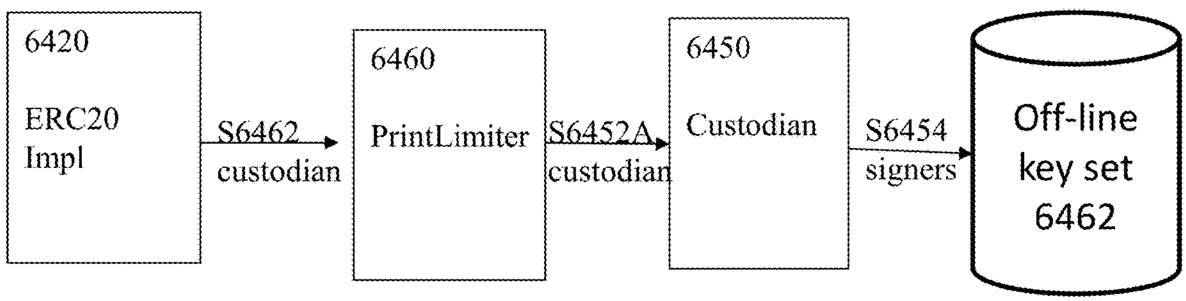
Figure 64H:
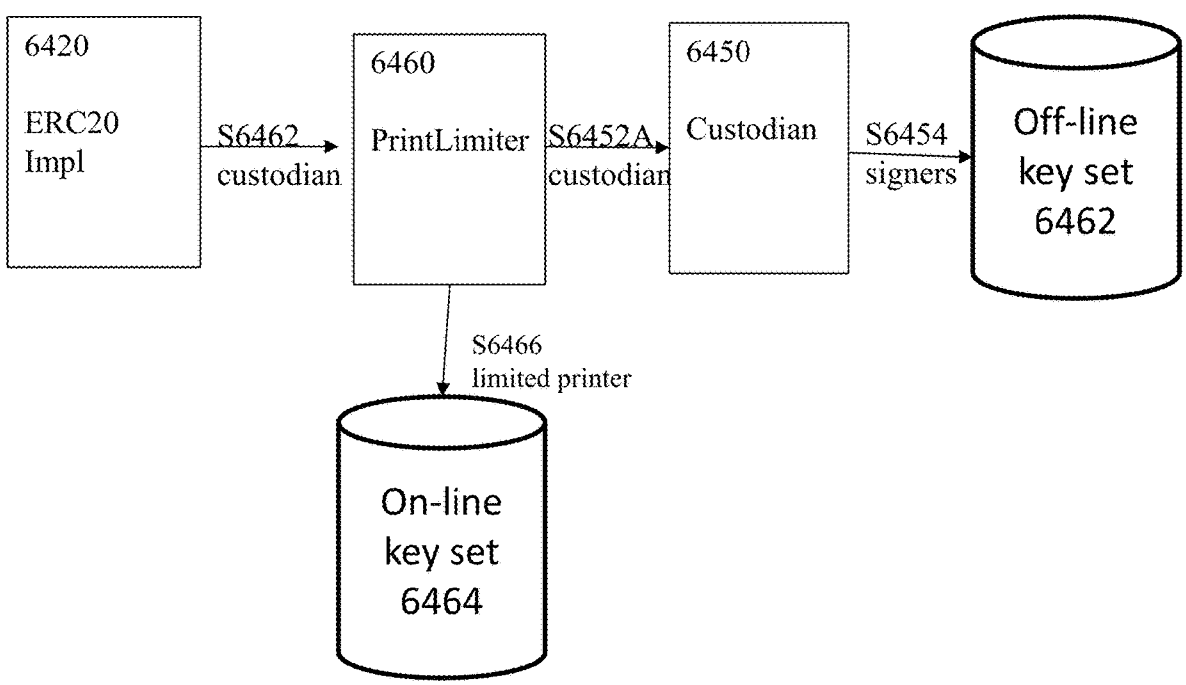

Referring now to FIGS. 64D-64F, the process of upgrading active implementation of the pointer relationship of ERCProxy 6410 from ERC20Impl 6420 (version 1) to ERC20Impl 6420A (version 2) will now be discussed.

FIG. 64D reflects the initial state in which ERC20Proxy 6410 has Custodian 6450 and in S6412A implemented ERC20 Impl 6420 (version 1) to act as a proxy in S6414A for certain functions of ERC20Proxy 6410.

To swap out the current ERC20Impl 6420 (version 1) with an updated ERC20Impl 6420 (version 2), as shown in FIG. 64E, the coding for ERC20 Impl 6420 (version 2) needs to be deployed on the blockchain and set its proxy point (S6414B proxy) to the same ERC20Proxy 6410.

Next, the implementation pointer from ERC20Proxy 6410 which is currently set at S6412 (impl) to point to ERC20Impl 6420 (Version 1), needs to be reset to be S6412B impl to point to ERC20Impl 6420A (version 2) instead. This change requires the authorization of Custodian 6450, which in turn requires two signatures from keys in its designated keyset (e.g., Off-Line Keyset 6462) sent to it on the blockchain.

Table 3 represents an exemplary embodiment of the steps used to implement this process:

TABLE 3

| | |
|---|---|
| 1. | lockID = proxy.requestImplChange(imp_2) |
| 2. | request= custodian.requestUnlock(lockId,proxy.confirmImpl.Change) |
| 3. | Off-line signing of request |
| 4. | custodian.completeUnlock (request, signature_1, signature 2) |
| | a. proxy.confirmImplChange(lockID) |

Referring to Table 3, in step 1, a request must be made to ERC20Proxy to change its instance of ERC20Impl. This request may come from any address, and when the request is made, the function returns a unique lockId that anyone can use to look up that request.

Next, in step 2, to confirm the pending request, the Custodian contract 6450 for ERC20 Proxy 6410 calls requestUnlock and passes as arguments the lockId generated for the change request, and the function in ERC20Proxy 6410 the Custodian 6450 needs to call to confirm the change request. This generates a request, which is a unique identifier for this unlock request.

In step 3, to complete the unlocking of Custodian and therefore propagate the change to ERC20Proxy 6410, the digital asset system operated by the token issuer uses its off-line key storage infrastructure to sign the request with the previously approved designated key sets. In this example, two signatures are required (signature 1 and signature 2), but other combinations of signatures may be used consistent with embodiments of the present invention.

In step 4, those signatures are passed into the Custodian's completeUnlock function along with the initial request. Once the request is validated against the signatures, completeUnlock parses the content of the request and issues the command. In this case, it calls ERC20Proxy's confirmImplChange using the lockId generated in the initial ERC20Impl change request.

As shown in FIG. 64F, ERC20Proxy 6410 now points with S6412B to the updated ERC20Impl 6420A (version 2) contract, thus delegating all future calls from ERC20Proxy 6410 to the updated contract ERC20 Impl (version 2) 6420A. This process can be repeated in the future to upgrade the ERC20 Impl (version 2) 6420A to new versions as authorized by the Custodian 6450.

In embodiments, a similar process may also be used to upgrade the active Custodian 6450. Instead of the pair of functions requestImplChange and confirmImplChange, the pair of functions requestCustodianChange and confirmCustodianChange are used instead.

Referring to FIGS. 64G and 64H, a PrinterLimiter 6460 contract may also be used as an upgradeable limit on the token supply available.

In the context of FIG. 64G, ERC20Impl 6420 allows printing an unbounded amount of tokens to any arbitrary address. This printing can only be done by PrintLimiter 6460 contract, which serves as ERC20Impl's custodian. However, PrintLimiter 6460 can only call this unbounded printing if it receives a call from its custodian, a separate contract named Custodian 6450, which is in turned controlled by signatures from designated keysets (e.g., Off-Line Key Set 6462).

Thus, to print an unbounded amount of tokens, signatures from keys in Off-Line Key Set 6462 need to be sent through the blockchain, to Custodian 6450, which, in turn, then calls through the blockchain, PrintLimiter 6460, which then, in turn, calls through the blockchain ERC20Impl 6420 to confirm the print request.

Referring to FIG. 64H, a limited printing option may also be implemented. Thus, in embodiments consistent with FIG. 64H, ERC20Impl 6420 allows either printing an unbounded amount (which originates from Off-Line Key Set 6462 as described earlier), or a limited amount which does not require the off-line key set to enact. Within PrintLimiter 6460 is a "total supply ceiling" variable: a maximum total supply of tokens that any "limited print" operation cannot exceed. This value is set by Off-Line Key Set 6462. PrintLimiter 6460 allows printing new tokens while remaining under that ceiling from a special hot wallet address. That hot wallet address can call PrintLimiter 6460 directly, which then calls ERC20Impl 6420 to confirm the "limited" print operation. In embodiments, limits may also be expressed in or related to time periods.

The total supply ceiling can only be raised by Off-Line Key Set 6462. In embodiments, it can be lowered, however, by that On-Line Key Set 6464 or Off-Line Key Set 6462.

Table 4 illustrates exemplary embodiments of code used in smart contracts on the Ethereum blockchain which implement a cooperative relationship with an external account or contract that exerts custodianship over the contract following the pattern.

A contract following the pattern is capable of carrying out some action—a portion of the desired operations; however, rather than executing the action directly, the action is first requested, with a unique 'lock identifier' returned as the result of the request. The pending action is stored in the contract state, storing the data necessary to execute the action in the future, and with the lock identifier as the lookup key to retrieve the pending action. If the contract is called by its custodian, receiving a lock identifier as an argument, then the associated pending action, if any, is retrieved and executed.

In embodiments, as illustrated in Table 4, the contracts may include multiple inheritances, so for the purposes of code reuse, a function for generating unique lock identifiers is implemented in the contract LockRequestable.

TABLE 4

```
contract LockRequestable {
  uint256 public lockRequestCount;
  function LockRequestable( ) public {
    lockRequestCount = 0;
  }
  function generateLockId( ) internal returns (bytes32 lockId) {
    return keccak256(block.blockhash(block.number - 1), address(this), ++lockRequestCount);
  }
}
```

In embodiments, the function generateLockId returns a 32-byte value to be used as a lock identifier, which is a hash of the following three components: (1) The blockhash of the Ethereum block prior to the block that included the Ethereum transaction that executed this function; (2) The deployed address of the instance of the contract that inherits from LockRequestable; and (3) The current value of the count of all invocations of generateLockId (within 'this' contract).

Component three plays the role of a nonce (in cryptography, a nonce is an arbitrary number that can be used just once) ensuring that a unique lock identifier is generating no matter how many invocations of generateLockId there are within a single Ethereum transaction or a single Ethereum block.

Component two ensures that the lock identifier is unique among the set of cooperating contracts that use this identifier generation scheme. A noncooperative contract authored by a third party may choose to generate identifiers that overlap, but that is expected not to impact operation.

Finally, component three uses the relative previous blockhash to make future lock identifiers unpredictable.

Table 5 illustrates embodiments of code which uses LockRequestable in a template consistent with embodiments of the present invention.

TABLE 5

```
contract Cis ..., LockRequestable {
  struct PendingAction {
    t v;
    ...
  }
  address public custodian;
  mapping (bytes32 => PendingAction) public pendingActionMap;
  function C(address _custodian, ...) public {
    custodian = _custodian;
    ...
  }
  modifier onlyCustodian {
    require(msg.sender == custodian);
    _;
  }
  function requestAction(t _v, ...) public returns (bytes32 lockId) {
    require(_v != 0);
    lockId = generateLockId( );
    pendingActionMap[lockId] = PendingAction({
      v: _v,
      ...
    });
    emit ActionLocked(lockId, _v, ...);
  }
  function confirmAction(bytes32 _lockId) public onlyCustodian {
    PendingAction storage pendingAction = pendingActionMap[_lockId];
    tv = pendingAction.v;
    require(v != 0);
    ... // copy any other data from pendingAction
    delete pendingActionMap[_lockId];
    ... // execute the action
    emit ActionConfirmed(_lockId, v, ...);
  }
```

TABLE 5-continued

```
  event ActionLocked(bytes32 _lockId, t _v, ... );
  event ActionConfirmed(bytes32 _lockId, t _v, ...);
}
```

The function requestAction generates a fresh lock identifier and captures the request parameters as a pending action, storing it in a mapping associated with the lock identifier.

The function confirmAction is callable only by the designated custodian. The given lock identifier is used to retrieve the associated pending action from the contract storage, if it exists, otherwise the function reverts. The pending action is deleted from storage, which ensures that the action will be executed at most once. Finally the logic of the action is executed.

In embodiments, there are two requirements to the confirmAction callback function: (1) The function does not have a return value; and (2) The function must only revert if there is no pending action associated with the lock identifier.

In these embodiments, the custodian receives a failure signal only when it called with an invalid lock identifier. Any failure cases that may occur in the execution of the action logic must be signaled by means other than return values or reversions (including abortive statements such as throw).

Programming consistent with Tables 4 and 5 may be used to implement a wide variety of functions in the context of a token including, by way of example:

- Contracts that inherit from the ERC20ImplUpgradeable contract (e.g., ERC20Proxy and ERC20Store) control updates to the address that references an instance of the ERC20Impl contract;
- The ERC20Impl contract to control increases to the token supply;
- The ERC20Holder contract to control 'withdrawal' transfers out of its balance;
- The PrintLimiter contract to control increases to its token supply ceiling state; and
- Contracts that inherit from the CustodianUpgradeable contract (e.g., ERC20Proxy, ERC20Impl, and ERC20Store) to control the passing of custodianship itself from the current custodian to a new custodian, to name a few.

In embodiments, other limits or controls may also be built into the smart contract functionality of the token. For example, in embodiments, it may be necessary for the token issuer to adjust the token ledger to account for regulatory activity. For example, there may be a court order seizure of funds, or a security issue that may require reversing transactions during a compromised period, to name a few In embodiments, the administrator may send instructions to modify the token supply for one or more particular accounts. For example, the smart contract may include instructions to pause a transfer. The pause function may be a permanent pause, e.g., for a compromised account, a time limited pause, e.g., for 24 hours or 2 days, or a temporary pause which requires another instruction to reactivate the account, to name a few. Such a function could be included as an upgrade feature in a new Impl contract, or built into the smart contract to be activated when an authorized account, e.g., one or more off-line keys call upon the smart contract to implement the pause functionality, with appropriate parameters.

In embodiments, the administrator may send instructions to rebalance the token supply of one or more particular accounts. For example, the smart contract may include instructions to adjust a token balance in a designated account, e.g., by raising the balance in the designated account, lowering the balance in the designated account, or transferring some or all of the tokens in one designated account to one or more other designated accounts. Such a function could be included as an upgrade feature in a new Impl contract, or built into the smart contract to be activated when an authorized account, e.g., one or more off-line keys, call upon the smart contract to implement the pause functionality, with appropriate parameters.

Figure 72A:
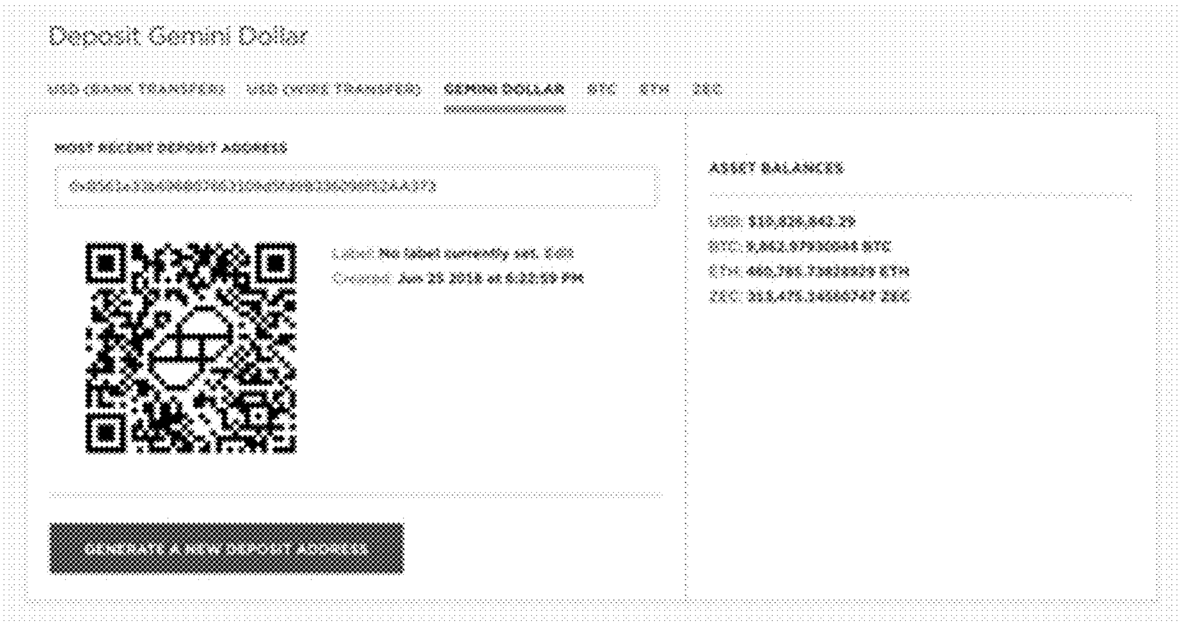
FIGS. 72A-72C illustrate an exemplary dashboard of a user interface which allows registered users of a digital asset exchange to deposit and/or withdraw SVCoins (referred to as Gemini Dollars) with the digital asset exchange system in accordance with exemplary embodiments of the present invention.
Figure 72B:
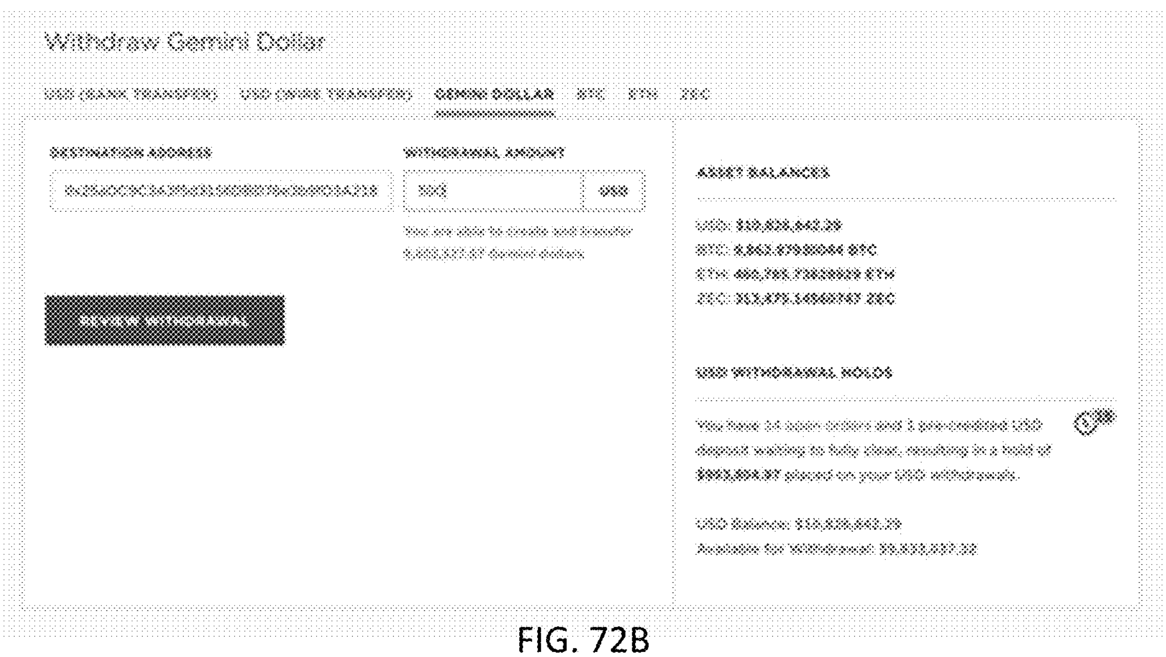
Figure 72C:
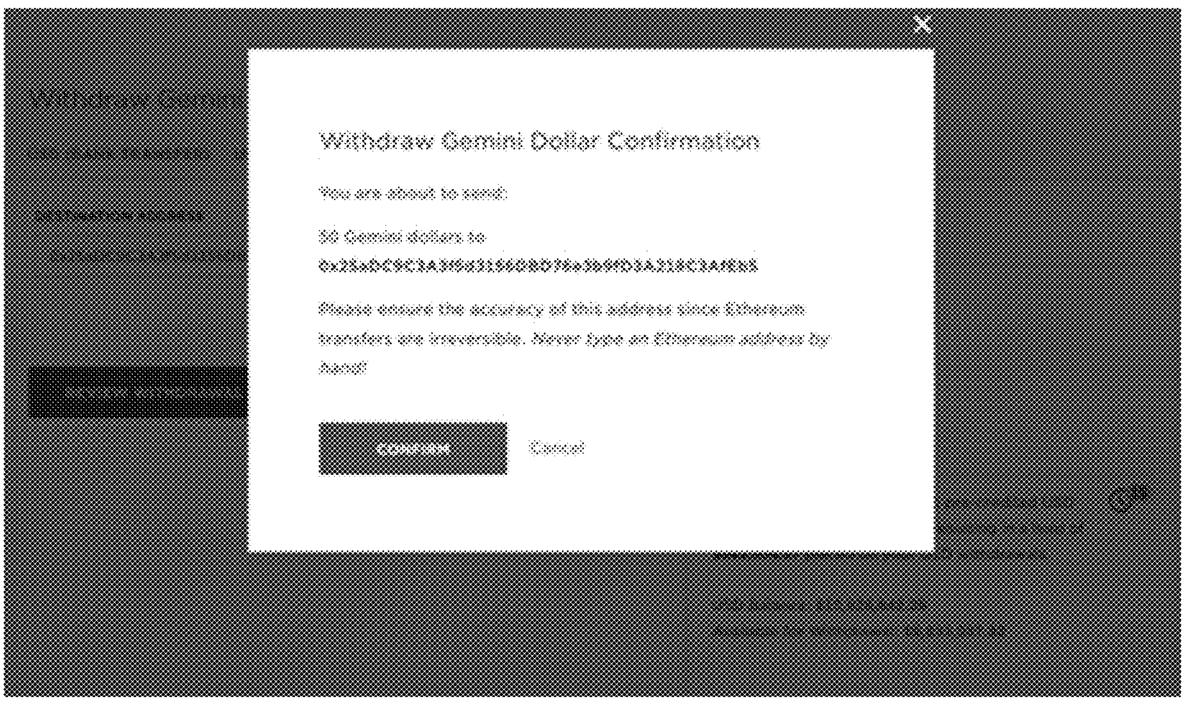

In embodiments, the Stable Value Token may be embodied in the form of a token on the Ethereum Blockchain, referred to as a Gemini Dollar token, as illustrated in the exemplary dashboard of FIGS. 72A-72C.

FIG. 72A illustrates an exemplary GUI for an interface with the digital asset exchange in which a user can deposit/redeem Gemini Dollar tokens into a public address associated with the digital asset exchange, in exchange for an corresponding amount of fiat in the user's account at the digital asset exchange. In embodiments, after the registered user of the exchange deposits the stable value token into the exchange's public address, the exchange will transfer from the bank account or other account associated with the stable value token, a corresponding amount of fiat, to the bank account associated with the flat holdings of the user. In embodiments, the deposited token will then be burnt from circulation. In embodiments, the deposited token may instead of being burnt be redistributed to another customer, but in such case, an appropriate amount of fiat will need to be redeposited into the bank account or other stable investment vehicle associated with the stable value token.

In embodiments, creation and redemption of the Gemini Dollar tokens may be made simple to promote usability and encourage adoption. In embodiments, Gemini Dollar tokens are redeemed or "destroyed" at the time of deposit into a digital asset exchange. Exchange customers may exchange Gemini Dollar tokens for U.S. dollars at a 1:1 exchange rate by depositing Gemini Dollar tokens into their exchange account. The U.S. dollar amount of Gemini Dollar tokens will be credited to the customer's exchange account balance at the time of deposit.

Figure 72D:
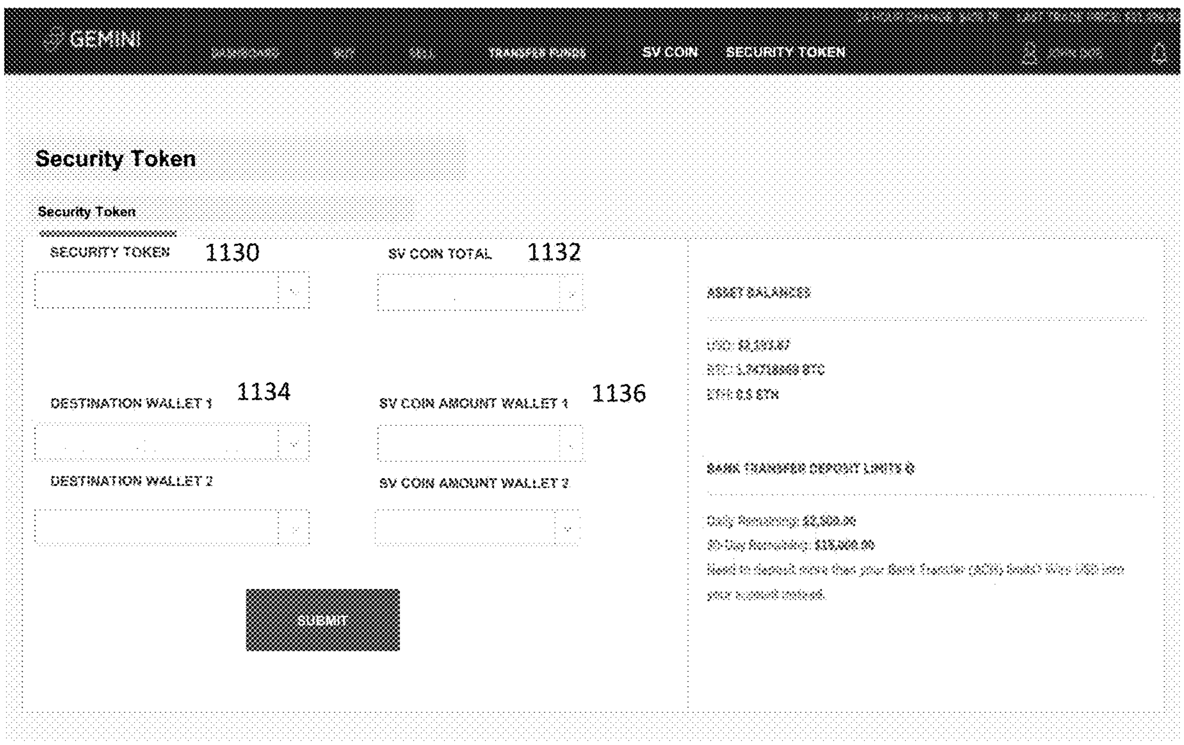
FIG. 72D illustrates an exemplary dashboard Security Token interface which allows Security Token issuers to provide instructions to transfer SVCoins to Security Token holders in accordance with exemplary embodiments of the present invention.

FIG. 72D illustrates an exemplary embodiment of a dashboard Security Token interface which allow Security Token issuers to provide instructions to transfer SVCoins to Security Token holders.

Referring back to FIG. 60, in Step S6002, Alice's wallet, or associated digital asset address, may send a request message to the database maintained by the blockchain including: (a) Alice's ethereum digital asset address, which is typically associated with a digital wallet (Source Address); (b) token identification information; (c) amount of token to be transferred; and (d) Bob's ethereum digital asset address (Destination Address). In embodiments, if a fee is charged for the transaction, fee payment information may also be required and provided. For example, on the Ethereum network, an amount of Gas tokens may be required from the sender to pay for processing of the transaction into a block on the blockchain. In embodiments, the message may include a proposed fee amount and/or fee proposal including a limit in e.g., Gas. The request message will also be digitally signed by Alice's private key.

In Step S6004, when miners on the blockchain network receive the transaction request directed to the contract wallet or associated digital asset address, with the request message, miners on the blockchain network will confirm the transaction, including verifying that the message was properly signed by Alice. In Step S1004-*b*, the miners may verify that Alice has sufficient amount of tokens to perform the requested transaction, for example, by comparing Alice's balance against Alice's token balance as indicated on the blockchain. In Step S1004-*c*, the validity of Bob's digital asset address (the Destination Address) may also be confirmed by the miners. The miners may also compare the request with smart contract coding and instructions included in the Contract Address. The transaction fee discussed above is paid to the miners for confirming the transaction as noted above.

In Step S6006, if the request is verified the transaction is published in the Security Token database of the blockchain reflecting a debit against Alice's token holdings and a corresponding credit to Bob's token holdings (less any applicable fees).

In Step S6008, response messages to the digital asset addresses of both Alice and Bob may be sent to reflect that the transaction was successfully processed. In embodiments, such messages may include information including: (i) the source digital asset address; (ii) the destination digital asset address; (iii) the amount of tokens transferred; and/or (iv) the new balances for each digital asset address or associated digital wallet. In embodiments, the message may include a proposed fee amount and/or fee proposal including a limit in e.g., Gas. In embodiments, Alice, Bob, and/or third parties may view the balances and transaction information based on the information stored in the blockchain, by, e.g., viewing token balances at websites like etherscan.io, to name a few.

In contrast to tokens, a blockchain based digital asset (such as ether) is hard coded into the blockchain (e.g., the Ethereum Blockchain) itself. It is sold and traded as a cryptocurrency, and it also powers the network (e.g., the Ethereum Network) by allowing users to pay for smart contract transaction fees. (In some networks, transactions fees may be paid for in digital assets, such as tokens (e.g., Gas) or blockchain based digital assets (e.g., bitcoin). In the Ethereum Network, all computations typically have a cost based on other digital assets, such as Gas.

In embodiments, when tokens are sent to or from a Contract Address, for example, a fee may be charged for that transaction (in this case, a request to the token's contract to update its database) in, e.g., some form of digital asset, such as ether, bitcoin, Gas, to name a few. In embodiments, the message may include a proposed fee amount and/or fee proposal including a limit in digital asset, e.g., ether, bitcoin or Gas. This payment is then collected by a miner who confirms the transaction in a block, which then gets added to the blockchain.

Figures 1, 65A:
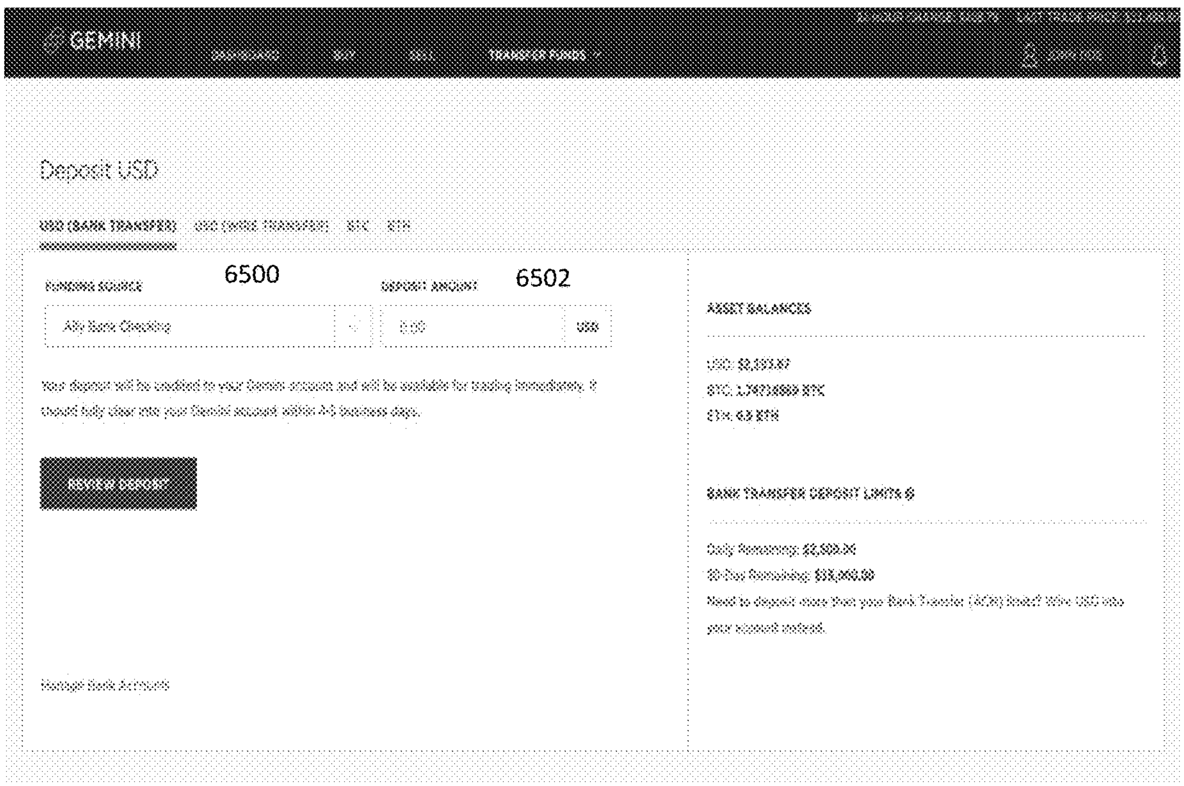
Figures 2, 65A:
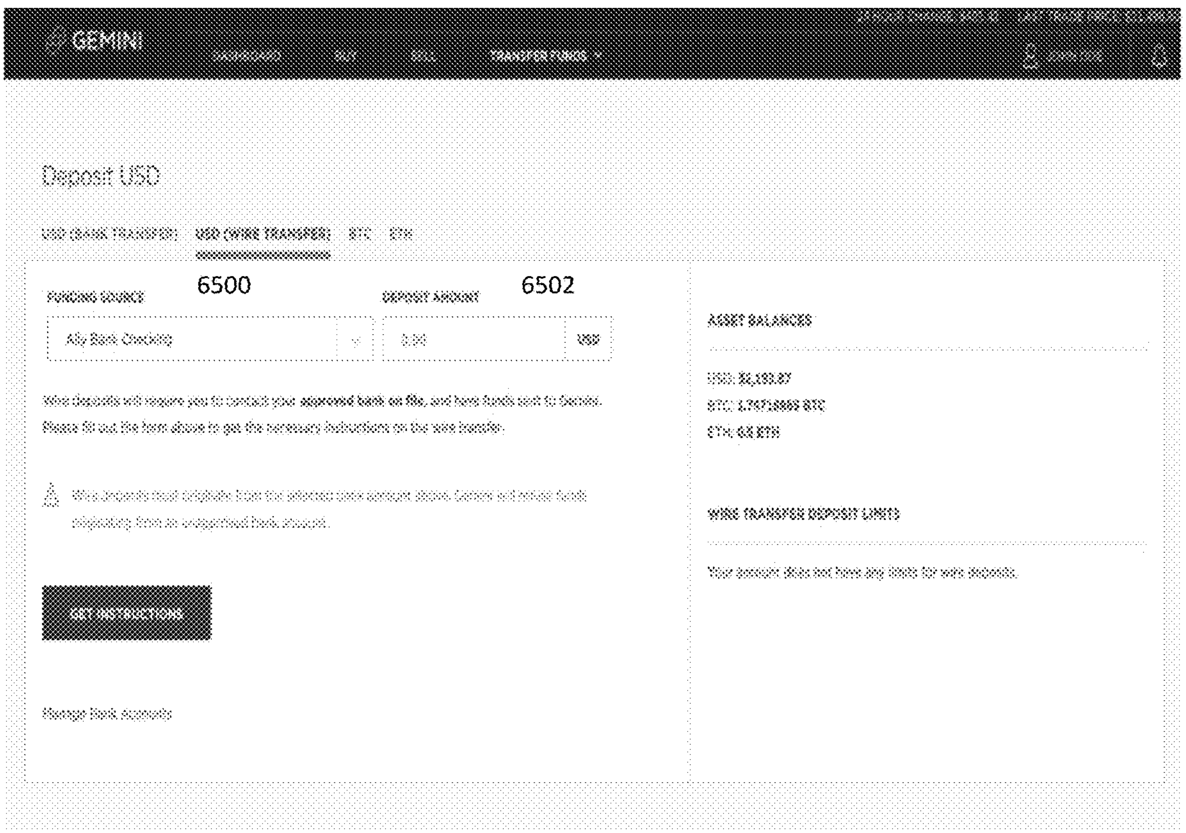
Figures 3, 65A:
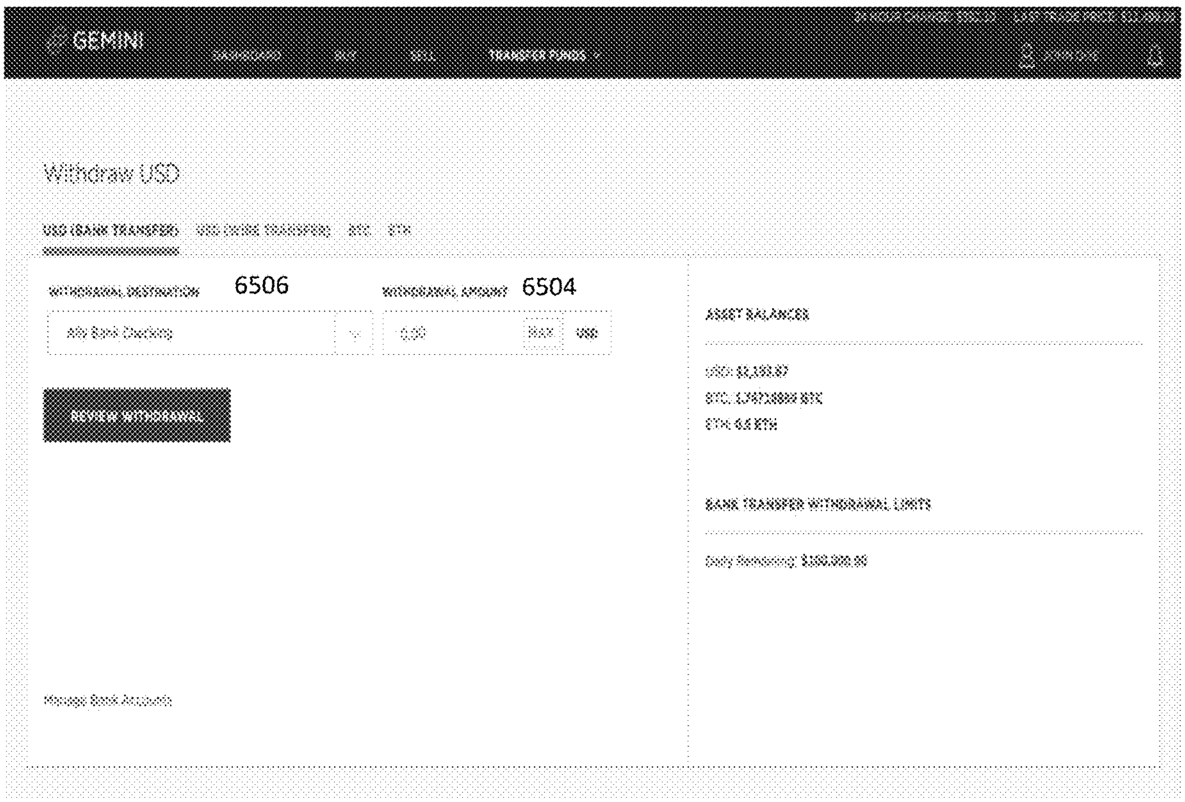

FIG. 2 is an exemplary screen shot of an excerpt of a bitcoin transaction log or transaction ledger 115 showing digital asset account identifiers (e.g., addresses) corresponding to origin and destination accounts for each transaction and amount information for each transaction in accordance with exemplary embodiments of the present invention. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information, to name a few. Other forms of transaction logs can be used consistent with exemplary embodiments of the present invention. In an exemplary embodiment the description information may be included as a message in a request for a transaction, as is discussed in detail with respect to FIGS. 53 and 54 and discussed below. The description information discussed above thus may also be used to confirm control of over a particular account.

As can be seen in FIG. 2, digital asset transfers may begin from a single origin and be sent to a single destination or multiple destinations. Similarly, digital assets may be transferred from multiple origins to one or more destinations.

Figure 2A:
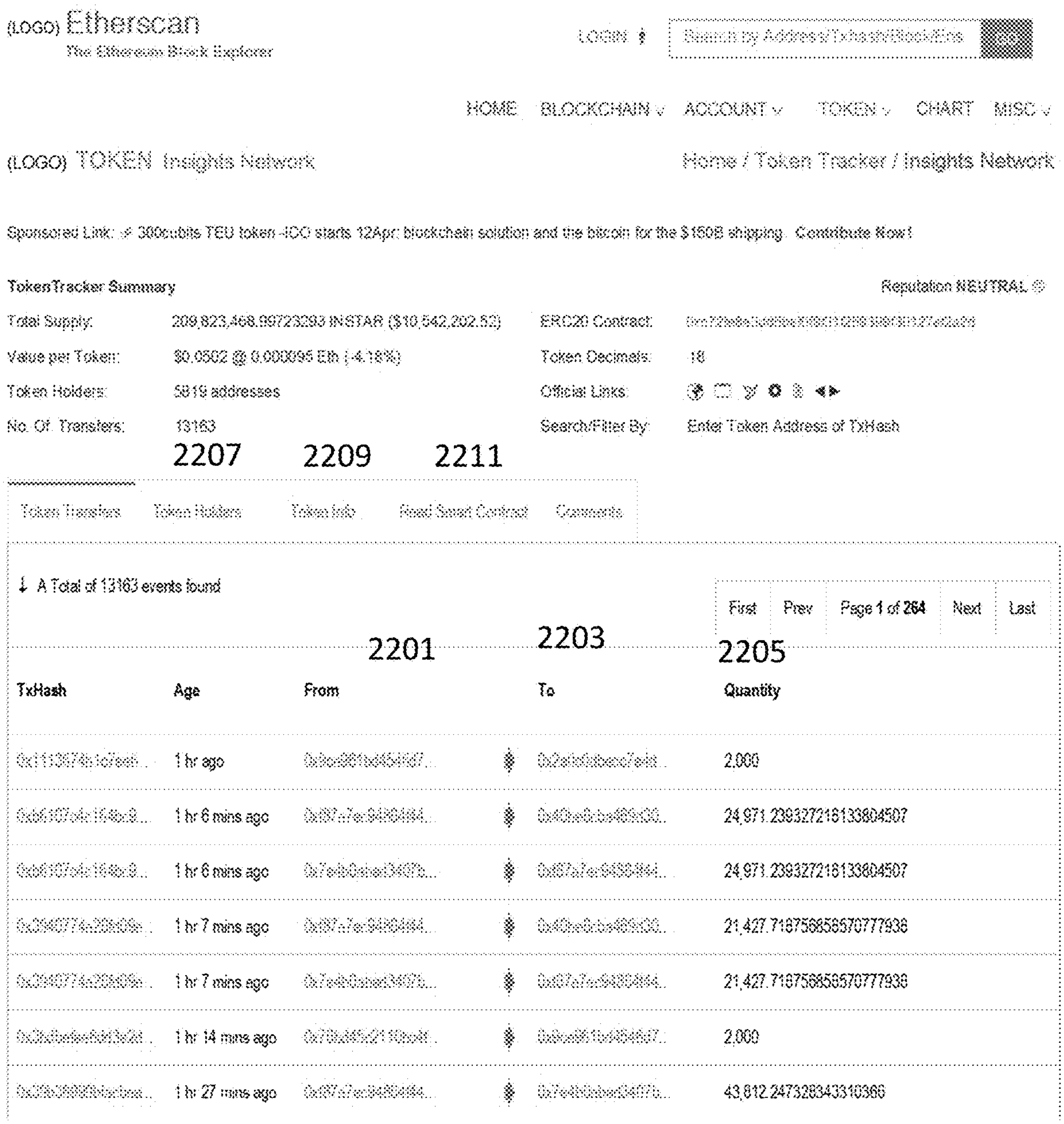
FIG. 2A is an exemplary screen shot of a Security Token ledger in accordance with exemplary embodiments of the present invention.

FIG. 2A illustrates a screenshot showing an exemplary embodiment of a token ledger for a Gas token. This particular screenshot shows a specific example the token ledger for the Gas token provided by etherscan.io. As illustrated the ledger illustrates, in chronological order, a series of transactions identifying the source address 2201 and destination address 2203 along with the quantity of tokens 2205 transferred in each transaction. In embodiments, the Security Token ledger of the present application may appear in a similar manner to that illustrated in FIG. 2A. In embodiments, as illustrated in FIG. 2A, the Security Token ledger may also include the option to identify all Token holders 2207 as well as options to view token details 2209 and to view the contract details 2211. Similarly, in embodiments, a token ledger of the present application may be similar to that illustrated in FIG. 2A. Digital asset ledgers may be maintained in the form of a database. Such a database may be maintained on a blockchain or off a blockchain as a sidechain which may later be published to the blockchain.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. Of course, other digital asset networks, such as the Ethereum network, can be used with embodiments of the present invention. A digital math-based asset network, such as a Bitcoin network, may be an on-line, end-user to end-user network hosting a public transaction ledger 115 and governed by source code 120 comprising cryptologic and/or algorithmic protocols. A digital asset network can comprise a plurality of end users, a . . . N, each of which may access the network using one or more corresponding user device 105*a*, 105*b*, . . . 105N. In embodiments, user devices 105*a*, 105*b*, . . . 105N may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, user devices 105*a*, 105*b*1 . . . 105N can each run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115*a* (contained on a user device 105*a*) should correspond with the electronic transaction ledgers 115*b* . . . 115N (contained on user devices 105*b* . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few. In embodiments, some of the transactions on the public ledger may be encrypted or otherwise shielded so that only authorized users may access ledger information about such transactions or wallets.

In addition, a digital asset network, such as a Bitcoin network, may include one or more digital asset exchange 130, such as Bitcoin exchanges (e.g., BitFinex, BTC-e). Digital asset exchanges may enable or otherwise facilitate the transfer of digital assets, such as bitcoin, and/or conversions involving digital assets, such as between different digital assets and/or between a digital asset and non-digital assets, currencies, to name a few. The digital asset network may also include one or more digital asset exchange agents 135, e.g., a Bitcoin exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for bitcoin, subunits, such as a Satoshi, as discussed herein, or larger units, such as blocks of bitcoin, may be used in exemplary embodiments. Each digital asset, e.g., bitcoin, may be sub-divided, such as down to eight decimal places, forming 100 million smaller units. For at least bitcoin, such a smaller unit may be called a Satoshi. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as Bitcoin, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as Bitcoin, digital inputs and outputs cannot be subdivided. For example, if a first digital asset account is initially empty and receives a transaction output of 20 BTC (a bitcoin unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., bitcoin transactions, can be performed by one or more computers over a distributed network, such as digital asset miners 145, e.g., bitcoin miners, and/or digital asset mining pools 150, e.g., bitcoin mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., bitcoin, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the Bitcoin network, and an arbitrary number, such as a nonce) to a desired output data set of predetermined length, such as a hash value. In embodiments, mapping may be required to use one or more particular cryptographic algorithms, such as the SHA-256 cryptographic hash algorithm or scrypt, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., bitcoin) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like scrypt, which may be used for Litecoin. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for Litecoin, approximately 10 minutes for Bitcoin, to name a few.

In addition to archiving transactions, a new addition to a ledger can create or reflect creation of one or more newly minted digital assets, such as bitcoin. In embodiments, new digital math-based assets may be created through a mining process, as described herein. In embodiments, the number of new digital assets created can be limited. For example, in embodiments, the number of digital assets (e.g., bitcoin) minted each year is halved every four years until a specified year, e.g., 2140, when this number will round down to zero. At that time no more digital assets will be added into circulation. In the exemplary embodiment of bitcoin, the total number of digital assets will have reached a maximum of 21 million assets in denomination of bitcoin. Other algorithms for limiting the total number of units of a digital math-based asset can be used consistent with exemplary embodiments of the present invention. For example, the Litecoin network is anticipated to produce 84 million Litecoin. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In embodiments, a hybrid of proof of work and proof of stake systems may be employed. For example, a proof of work system may be employed initially, but as the system becomes too energy intensive, it may transition to a proof of stake system.

Proof or work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets unspendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities, can include mining, proof of work, proof of stake protocols, to name a few.

Stable Value Digital Asset Token

In embodiments, a stable value digital asset token, or Stable Value Token ("SVCoin") may operate on a blockchain based network, such as the Ethereum network, a decentralized virtual currency and blockchain network with a programming language that can automatically facilitate, verify, and enforce the terms of a digital contract entered into by human or computer counterparties. In embodiments, the SVCoin may conform with the ERC-223 token standard, making it available for a variety of uses within the Ethereum Network. In embodiments, the SVCoin may conform to the ERC-721 token standard. However, unlike other types of cryptocurrencies currently available on the Ethereum Network or the virtual currency ecosystem generally, the SVCoin will be strictly pegged to a fiat currency, such as the U.S. Dollar, and a custodian, such as a trusted entity like a digital asset exchange or bank, to name a few, will hold an equal value in fiat (e.g., one (1) SVCoin is pegged to be equal to one (1) USD or one hundred (199(SVCoin is pegged to equal one (1) USD, to name a few).

In embodiments, a digital asset exchange, such as a regulated digital asset exchange, like Gemini, may be the sole issuer of the SVCoin. In embodiments, especially in the context of a regulated digital asset exchange, in order to obtain freshly minted SVCoin, customers must first register with the digital asset exchange and create an exchange account to allow access to the digital asset exchange platform. Customers may deposit fiat (e.g., USD) with the digital asset exchange, via, e.g., Fedwire, ACH, Swift, to name a few, into the customers respective exchange account, or convert into fiat some or all of existing digital assets held at the digital asset exchange. SVCoin may be held in the customer's exchange account or may be transferred via the blockchain, such as via the Ethereum Network. In embodiments, the SVCoin issuer may be a digital asset exchange, a bank, a trust or some other trusted entity, to name a few.

In embodiments, regardless of whether the SVCoin is stored in the customer's exchange account or transferred via the blockchain such as the Ethereum Network, the digital exchange will continue to hold sufficient fiat to maintain the total value of SVCoin based on a notional pegged rate (e.g., one USD for every one SVCoin issued). In embodiments, the value of the SVCoin is pegged to the fiat in a fixed proportion, for example 1:1. In embodiments, fiat will be held in a segregated, omnibus bank account at one or more federally insured depository institution. In embodiments, the fiat may be held in other secure and non-volatile financial instruments, such as invested in treasury bills or other liquid, interest bearing financial instruments.

In embodiments, customers wishing to redeem their SVCoin for fiat may do so through the digital asset platform. Customers that have transferred their SVCoin to the blockchain will be able to transfer their SVCoin back to their exchange account, and subsequently redeem them for fiat through the digital exchange platform, such as via Fedwire, ACH or SWIFT to the customer's registered bank account, to name a few. For each fiat redeemed with the digital exchange, a corresponding SVCoin will be removed from circulation. As mentioned above, exemplary embodiments of such transactions are discussed below in connection with the descriptions of FIGS. 65A-1-4, 65B-1-4, and 65C-1-2.

In embodiments, the Stable Value Token may be implemented as a token on the Ethereum blockchain, following the open standard known as ERC20 adopted by the Ethereum community. In embodiments, the Stable Value Token may be a system of smart contracts. In embodiments, the Stable Value Token may be a triplet of smart contracts on the Ethereum blockchain, which may be referred to as 'Proxy', 'Impl', and 'Store'.

In embodiments, the smart contract known as 'Proxy' is the permanent and public face of the Stable Value Token and provides the interface to interact with the token to allow token holders transfer their tokens and view token balances. In embodiments, however, this contract contains neither the code nor the data that comprises the behavior and state of the Stable Value Token.

In embodiments, the 'Proxy' contract delegates to the contract known as 'Impl' authority to execute the logic that governs token transfers, issuance, and other core features. In embodiments, 'Impl' does not directly own the data that is the ledger of the Stable Value Token, the mapping of token holders to their balances, but instead delegates this to the smart contract known as 'Store'.

In embodiments, the arrangement of 'Proxy', 'Impl', and 'Store' provides for future change and flexibility. While 'Proxy' may be the permanent address of the Stable Value Token on the Ethereum blockchain, and 'Store' is the external storage of the token ledger, the 'Impl' contract is designed to be replaced, if need be. Utilizing this architecture to implement the Stable Value Token provides for the following advantages:

1. allows for responding to security incidents and resolving vulnerabilities;
2. allows for extending the system with new features;
3. allows for adding later optimizations to improve the operational efficiency of the token; and
4. In extreme cases and when compelled to do so, allows for pause, block, or reverse token transfers.

In embodiments, each of these three contracts has a custodian: an actor in the system that has the sole authority to authorize important actions. In embodiments, the custodianship role varies for each of 'Proxy', 'Impl', and 'Store'. In embodiments, the custodian of 'Proxy' can redirect the delegation to the active token implementation, the specific 'Impl' contract. In embodiments, matching this arrangement, the 'Store' contract may only accept updates to its ledger from a single trusted source, the active token implementation, the specific 'Impl' contract. In embodiments, these two custodial actions on 'Proxy' and 'Store' provide the upgrade feature where a new 'Impl' displaces the prior version by the custodian of 'Proxy' redirecting the delegation in 'Proxy'; and a new 'Impl' displaces the prior version by the custodian of 'Store' updating the trusted caller of 'Store'. In embodiments, the custodians of 'Proxy' and 'Store' can also pass custodianship to new custodians.

In embodiments, the primary custodial action on the 'Impl' contract is different. In embodiments, an important aspect of the Stable Value Tokens is governing the increase to the token supply since at all times the system must ensure that there are at least as many U.S. Dollars as there are Stable Value Tokens in circulation. In embodiments, the 'Impl' contract contains the logic to increase the token supply, and the custodian of 'Impl' has the sole authority to invoke it. In embodiments, custodianship can also be passed.

In embodiments, an auxiliary contract is a contract to fulfil the custodian role, which we will refer to here as 'Custodian'. In embodiments, this contract is designed around several security principles:

1. Dual Control: actions by the 'Custodian' contract are initially locked, and pending actions will only proceed once two out of a set of designated signers approve the action. (Approval is a digital signature linked to the action instructions, e.g. the amount and destination of new tokens.)
2. Offline Control: the 'Custodian' contract is designed with the expectation that the set of designated signers are keys managed by offline ("air gapped") computer systems.
3. Time Locks: actions by the 'Custodian' contract are locked not only pending approval from two signers, but also require the passage of a minimum period of time before they can be executed. This enables the effective use of intrusion detection systems and a window of opportunity to respond to security breaches.
4. Revocation: pending actions can be revoked, thus erroneous or malicious actions can be nullified while they are still pending.

This provides strong security control on custodianship, which is appropriate for the critical and infrequent system actions of replacing the 'Impl' contract ("the upgrade feature") and passing custodianship. In embodiments, however, for the action of increasing the token supply, an action expected to occur frequently, using 'Custodian' as the custodian of 'Impl' introduces an undue operational burden.

In embodiments, a second auxiliary contract, is referred to as 'PrintLimiter'. In embodiments, the purpose of the 'PrintLimiter' smart contract is to govern the increases to the supply of Stable Value Tokens, specifically by a hybrid of online and offline control. While 'Custodian' is the custodian of the contracts 'Proxy' and 'Store', the 'PrintLimiter' contract is the custodian of 'Impl', and in turn, 'Custodian' is the custodian of 'PrintLimiter'. In embodiments, this doubly-layered custodianship relationship still reserves ultimate control to 'Custodian', however, the 'PrintLimiter' contract grants limited permission to increase the token supply ("print" new tokens) to a key in online control (an automated, networked computer system), which we will refer to as 'printer'. In embodiments, the 'printer' key can increase the token supply in response to user demand to withdraw U.S. dollars as Stable Value Tokens, but only up until a ceiling. In embodiments, further expansion of the supply is disallowed by 'PrintLimiter' once the ceiling is reached. In embodiments, increasing the ceiling is an action reserved for the custodian, and the custodian of 'PrintLimiter' is 'Custodian.' In embodiments, the 'printer' can reduce the ceiling thus reducing its own grant. In embodiments, offline control can increase the grant to online control; online control can decrease its own grant. In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without backing U.S. Dollars is bounded.

In embodiments, as noted above, multiple signatures may be required for certain transactions such as those requiring intervention of the Custodian 1350. In embodiments, as noted above, changing the implementation pointer from ERC20Proxy 1310 which is currently set at S1312 (impl) to point to ERC20Impl 1320 (Version 1), requires resetting S1312B "impl" to point to ERC20Impl 1320A (version 2). In embodiments, a request is made to ERC20Proxy to change its instance of ERC20Impl. When the request is made, a unique lockId is generated. In embodiments, the Custodian contract 1350 for ERC20 Proxy 1310 calls requestUnlock and passes as arguments the lockId generated for the change request, and the function in ERC20Proxy 1310 the Custodian 1350 needs to call to confirm the change request. This generates a request, which is a unique identifier for this unlock request.

In embodiments, to complete the unlocking of Custodian and therefore propagate the change to ERC20Proxy 1310, the digital asset system operated by the token issuer uses its off-line key storage infrastructure to sign the request with the previously approved designated key sets. This may require the use of two or more key sets.

In embodiments, those signatures are passed into the Custodian's completeUnlock function along with the initial request. Once the request is validated against the signatures, completeUnlock parses the content of the request and issues the command. In this exemplary case, it calls ERC20Proxy's confirmImplChange using the lockId generated in the initial ERC20Impl change request.

In embodiments, the arrangement discussed herein achieves a hybrid of online and offline control over the supply of Stable Value Tokens. In embodiments, tokens can be issued in an efficient and timely manner, while the risk of inflation of the supply of Stable Value Tokens without backing U.S. Dollars is bounded. In embodiments, pending actions may be revoked, allowing for the nullification of erroneous or malicious actions before being executed.

Blockchain Based Financial Instrument

In embodiments, a digital asset in the form of a token ("Security Token") may be issued to represent inventory, equity interests in a venture, real estate, rights in intellectual property such music, videos, pictures, to name a few. When used as a security, appropriate filings with a regulatory authority may be necessary to comply with local law. In the case of a security, investors may exchange fiat or other digital assets (such as bitcoin or ether, to name a few) in exchange for Security Tokens. Typically, Security Tokens may issue using a smart contract written on another digital asset (such as ether or bitcoin, to name a few), and tracked in a separate database stored in a distributed peer to peer network in the form of a blockchain. In an example, the blockchain is the Ethereum Blockchain and includes all Security Tokens, the respective address associated therewith, wherein maintenance of the blockchain is controlled by contract instructions stored in the form of a smart contract at the Contract Address. In embodiments, the Secure Token database maintained on the blockchain may be viewed via etherscan.io. In embodiments, the Security Token ledger may be maintained as a sidechain in a separate database off chain and published periodically or aperiodically to the blockchain. Each Security Token may also be associated with a specific digital asset address on the network associated with the underlying digital asset (e.g., the Ethereum Network when ether is the underlying digital asset, or the Bitcoin Network, when bitcoin is the digital asset, to name a few). Generally, the same blockchain will be used for the SVCoin and the Security Token.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset. A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using bitcoin, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K1S7NmH4Zx6rewF9WQrcZv245W. The matching private key may be stored in a digital wallet or mobile device and protected by a password or other techniques and/or devices for providing authentication.

In embodiments, other cryptographic algorithms may be used such as:

(1) The elliptic curve Diffie-Hellman (ECDH) key agreement scheme;

(2) The Elliptic Curve Integrated Encryption Scheme (ECIES), also known as Elliptic Curve Augmented Encryption Scheme or simply the Elliptic Curve Encryption Scheme;

(3) The Elliptic Curve Digital Signature Algorithm (ECDSA) which is based on the Digital Signature Algorithm;

(4) The deformation scheme using Harrison's p-adic Manhattan metric;

(5) The Edwards-curve Digital Signature Algorithm (EdDSA) which is based on Schnorr signature and uses twisted Edwards curves;

(6) The ECMQV key agreement scheme which is based on the MQV key agreement scheme; and (7) The ECQV implicit certificate scheme.

In other digital asset networks, other nomenclature mechanisms may be used, such as a human-readable string of numbers and letters around 34 characters in length, beginning with the letter L for Litecoin or M or N for Namecoin or around 44 characters in length, beginning with the letter P for PPCoin, to name a few.

Private Keys

A private key in the context of a digital math-based asset, such as bitcoin, may be a sequence such as a number that allows the digital math-based asset, e.g., bitcoin, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments related to the Bitcoin system, every Bitcoin public address has a matching private key, which can be saved in the digital wallet file of the account holder. The private key can be mathematically related to the Bitcoin public address and can be designed so that the Bitcoin public address can be calculated from the private key, but importantly, the same cannot be done in reverse.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as bitcoin, security of the private key can be important. Private keys can be stored via electronic computer files, but they may also be short enough that they can be printed or otherwise written on paper or other media. An example of a utility that allows extraction of private keys from an electronic wallet file for printing purposes is Pywallet. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using Bitcoin clients, such as BlockChain.info's My Wallet service and Bitcoin-QT, a private key may be imported without creating a sweep transaction.

In embodiments, a private key, such as for a Bitcoin account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:

E9 87 3D 79 C6 D8 7D C0 FB 6A 57 78 63 33 89 F4 45 32 13 30 3D A6 1F 20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256k1 ECDSA standard used by Bitcoin. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format.

5Kb8kLf9zgWQnogidDA76MzPL6TsZZY36hWXM-ssSzNydYXYB9KF

In embodiments, private keys associated with compressed public keys may be 52 characters and start with a capital L or K.

In embodiments when a private key is imported, each private key may always correspond to exactly one Bitcoin public address. In embodiments, a utility that performs the conversion can display the matching Bitcoin public address.

The Bitcoin public address corresponding to the sample above is:

1CC3X2gu58d6wXUWMffpuzN9JAfTUWu4Kj

In embodiments, a mini private key format can be used. Not every private key or Bitcoin public address has a corresponding mini private key; they have to be generated a certain way in order to ensure a mini private key exists for an address. The mini private key is used for applications where space is critical, such as in QR codes and in physical bitcoin. The above example has a mini key, which is:

SzavMBLoXU6kDrqtUVmffv

In embodiments, any bitcoin sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes bitcoin presently at the address, as well as any bitcoin that are ever sent to it in the future. The private key is only needed to transfer or spend the balance, not necessarily to see it. In embodiments, the bitcoin balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

In embodiments, a digital wallet may be a custodial digital wallet. Further, the custodial digital wallet may be a segregated custodial wallet or a commingled custodial wallet. Segregated custodial digital wallets hold digital assets for the benefit of a single customer or entity. Commingled custodial accounts hold digital assets for multiple users or customers of the custodian. Segregated custodial wallets are useful for institutional clients, mutual funds and hedge funds, for example.

While many digital asset holders may hold their digital assets in their own wallets, various custodial services, like Gemini custodial services exist. In embodiments, the present invention may be used with custodial wallets. In embodiments, custodial wallets may be commingled custodial wallets which commingle digital assets from more than one client. In embodiments, custodial wallets may be segregated custodial wallets, in which digital assets for a specific client is held using one or more unique digital asset addresses maintained by the custodial service. For segregated custodial wallets, the amount of digital assets held in such wallet(s) may be verified and audited on their respective blockchain. In embodiments, segregated custodial accounts may be used for digital asset holders such as hedge funds, mutual funds, exchange traded funds, to name a few. Proof of control as described herein may be implemented to verify the amount of assets held in custodial wallets, including both segregated custodial wallets and commingled custodial wallets.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two numbers such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., bitcoin transactions) can only be initiated from the digital wallet holding the digital assets (e.g., bitcoin). Alternatively or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost. As noted above, there are a variety of cryptographic algorithms that may be used.

Market Places

Figure 3:
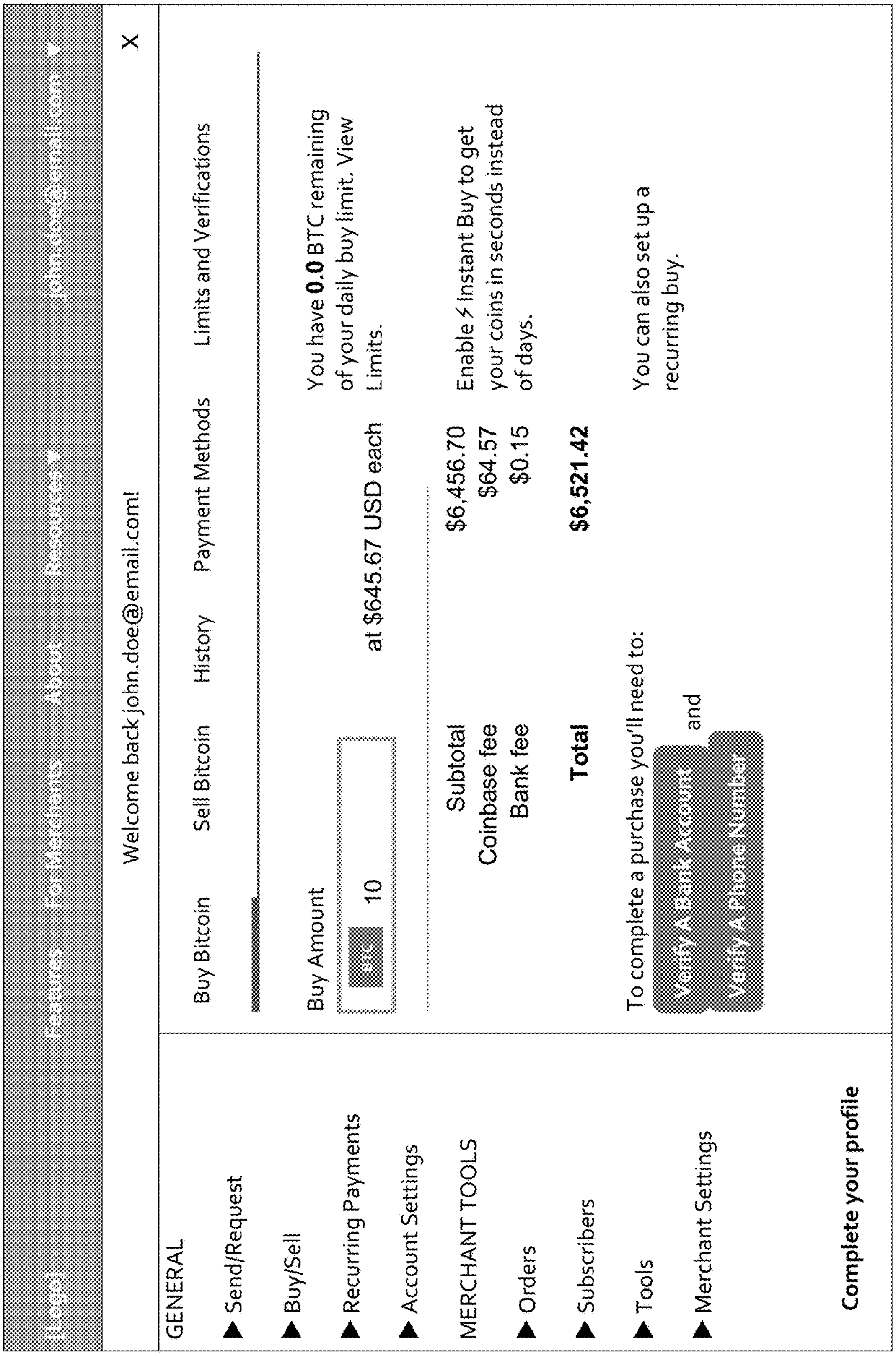
FIG. 3 is an exemplary exchange agent interface in accordance with exemplary embodiments of the present invention.

A digital asset market place, such as a Bitcoin market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., bitcoin) and currency, legal tender, and/or traditional money (e.g., cash). In embodiments, a digital asset exchange market can include a global exchange market for the trading of digital assets, which may contain transactions on electronic exchange markets. In embodiments, a digital asset exchange market can also include regional exchange markets for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Gemini Trust Company LLC ("Gemini") at (www.gemini.com) is an example of a digital asset exchange 130. By example, registered users of Gemini may buy and sell digital assets such as Bitcoin and Ether in exchange for fiat such as U.S. dollars or other digital assets, such as Ether and Bitcoin, respectively. A Bitcoin exchange agent 135 can be a service that acts as an agent for exchanges, accelerating the buying and selling of bitcoin as well as the transfer of funds to be used in the buying and/or selling of bitcoin. Coinbase is an example of a company that performs the role of a Bitcoin exchange agent 135. Coinbase engages in the retail sale of bitcoin, which it obtains, at least in part, from one or more exchanges. FIG. 3 illustrates an exemplary Coinbase website interface for buying bitcoin. Other Coinbase options include "Sell Bitcoin," "Send Money," "Request Money," and "Recurring Payments." Other options could also be made available consistent with exemplary embodiments of the present invention.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor may use a custodial wallet. In embodiments, a vendor 140 may be a larger institution with an infrastructure arranged to accept and/or transact in digital assets. Various vendors 140 can offer banknotes and coins denominated in bitcoin; what is sold is really a Bitcoin private key as part of the coin or banknote. Usually, a seal has to be broken to access the Bitcoin private key, while the receiving address remains visible on the outside so that the bitcoin balance can be verified. In embodiments, a debit card can be tied to a Bitcoin wallet to process transactions.

Digital Asset Exchange

In embodiments, one form of trusted entity that may be an issuer of tokens or an agent of the issuer is a digital asset exchange or bank. In embodiments, the trusted entity may maintain a token database on a blockchain. In embodiments, the trusted entity may maintain the token database off chain as a sidechain which may be periodically or aperiodically published to a blockchain as discussed elsewhere.

In some embodiments, the trusted entity may be a digital asset exchange. A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

In embodiments, the issuer of the SVCoin may be a digital asset exchange, a bank, a trust, or other trusted entity. In the context where a digital asset exchange may act as an issuer for token, or as an agent of the issuer, a digital asset exchange computer system may maintain a ledger as one or more databases associated with the token. Such a database may include an electronic log of all transactions, including the source wallet, the destination wallet, the timestamp of the transaction, the amount of the transaction (e.g., the number of tokens), and/or the balance in each wallet before and/or after the transaction. In embodiments, the database may include a list of wallet addresses and balances in each wallet of the token. In embodiments, the issuer may maintain the database by using a smart contract in association with a Contract Digital Address as part of a blockchain network, such as the Ethereum Network. In embodiments, the ledger may be maintained in a database as a sidechain which is periodically, or aperiodically, published to a blockchain such as the Ethereum blockchain. In embodiments, the ledger may be maintained directly on the blockchain.

Figure 26:
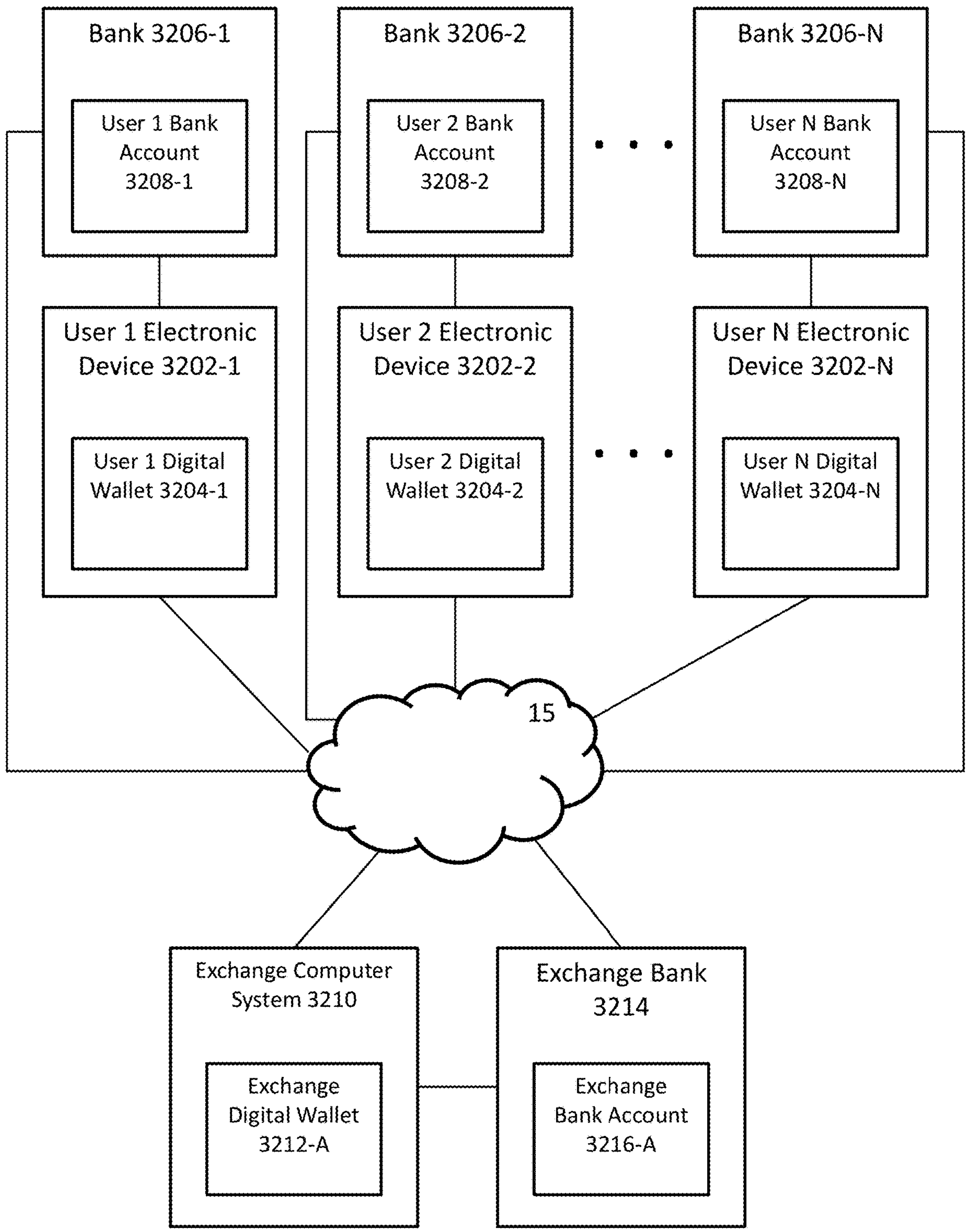
FIG. 26 is an exemplary exchange agent interface in accordance with exemplary embodiments of the present invention.

FIG. 26 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., U.S. Dollars, Euros, Yen, to name a few) in exchange for digital assets (e.g., bitcoin, ether, litecoin, dogecoin, to name a few). Digital asset sellers may exchange digital assets (e.g., bitcoin, ether, litecoin, dogecoin, to name a few) for fiat (e.g., U.S. Dollars, Euro, Yen, to name a few). In embodiments, instead of fiat, other forms of digital assets may also be used.

In embodiments, users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, or digital asset address associated with a digital wallet, or electronic account. In embodiments, a digital wallet may be stored on a user electronic device, such as a mobile electronic device, or other computing device.

Users may also have user bank accounts 3208 (e.g., 3208-1, 3208-2, . . . , 3208-N) held at one or more banks 3206 (e.g., 3206-1, 3206-2, . . . , 3206-N). In embodiments, users may be able to access their bank accounts from a user electronic device 3202 and/or from a digital wallet 3204 or digital address associated therewith.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third party. Upon receipt by the appropriate recipient of the requisite amount of digital assets, the exchange may authorize the release of the fiat currency to the digital asset seller. In embodiments, an exchange may hold, e.g., as custodian, fiat in bank accounts and digital assets in digital wallets at associated digital asset addresses. In embodiments, instead of using bank accounts, other stable investment instruments such as money market mutual funds, treasury bills, certificates of deposits, low risk bonds, to name a few, may be used.

Figure 27A:
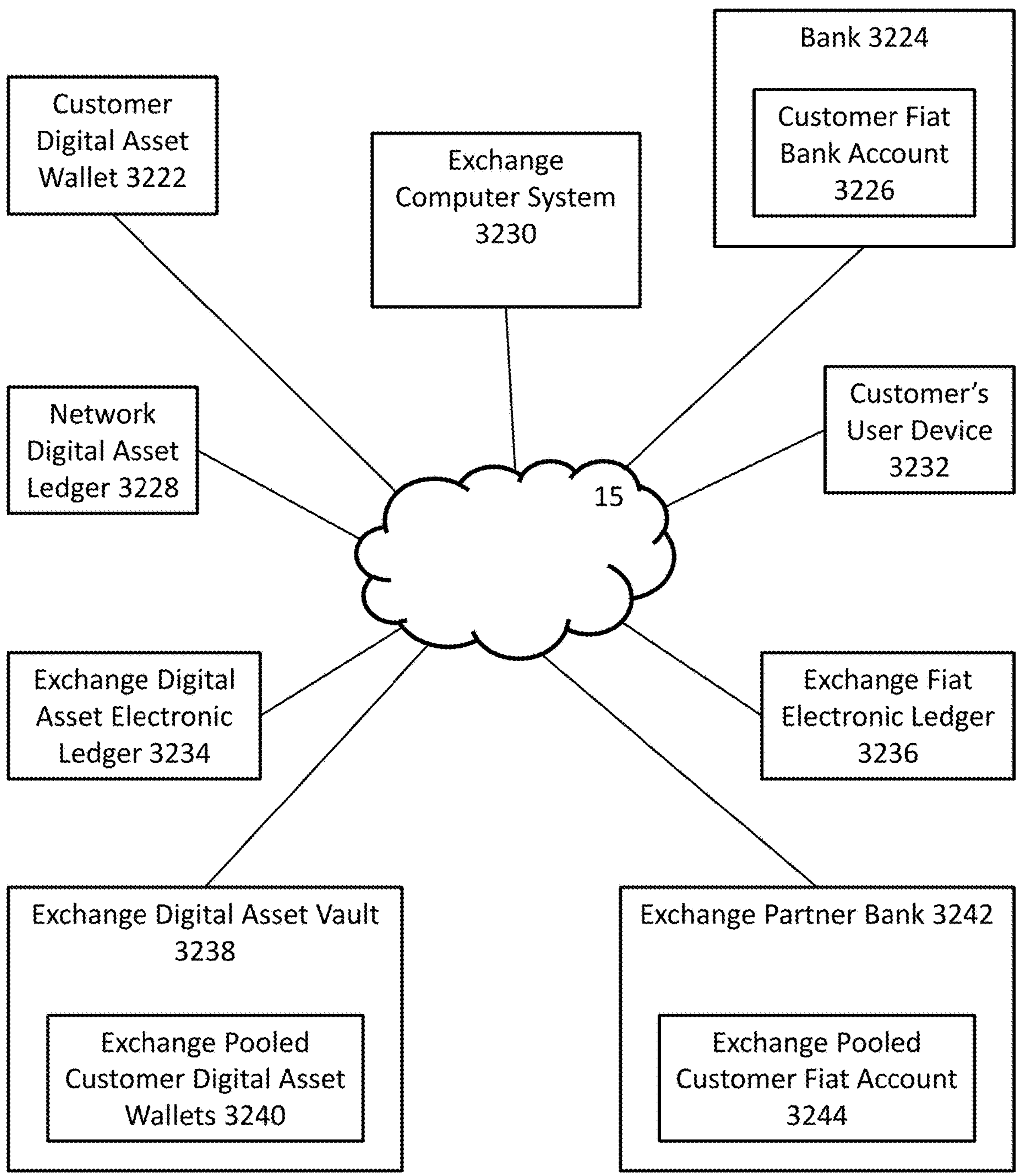
FIGS. 27A-B are schematic diagrams illustrating participants in a digital asset exchange in accordance with exemplary embodiments of the present invention.

FIG. 27A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets at associated digital asset addresses 3222 (e.g., bitcoin wallets, ether wallets, to name a few), customer bank(s) 3224 having a customer fiat bank account(s) 3226, a digital asset network ledger 3228 (e.g., the Bitcoin blockchain, the Ethereum blockchain, to name a few), a digital asset network (e.g., the Bitcoin network), one or more exchange customers using one or more customer user devices 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240 with associated digital asset addresses. In embodiments, the exchange may have a single partner bank 3242 with a pooled exchange customer fiat account 3244. Such an account may be associated with insurance protection.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin or ether) can be electronically credited and/or electronically debited from respective (e.g., fiat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known. Accordingly, the exchange may require new exchange customers to provide valid (e.g., complying with certain types, such as a driver's license or passport, or complying with certain characteristics) photo identification, a current address, a current bill, such as a utility bill, biometric information (e.g., a fingerprint or hand scan), and/or bank account information. A user on-boarding module can include back-end computer processes to verify and store user data as well as a front-end user interface by which a user can provide information to the exchange, select options, and/or receive information (e.g., through a display). The user on-boarding module can provide the front-end interface to one or more user devices and/or platforms, such as a computer, mobile phone (e.g., running an exchange-related mobile application), and/or digital asset kiosk, to name a few.

Figure 27B:
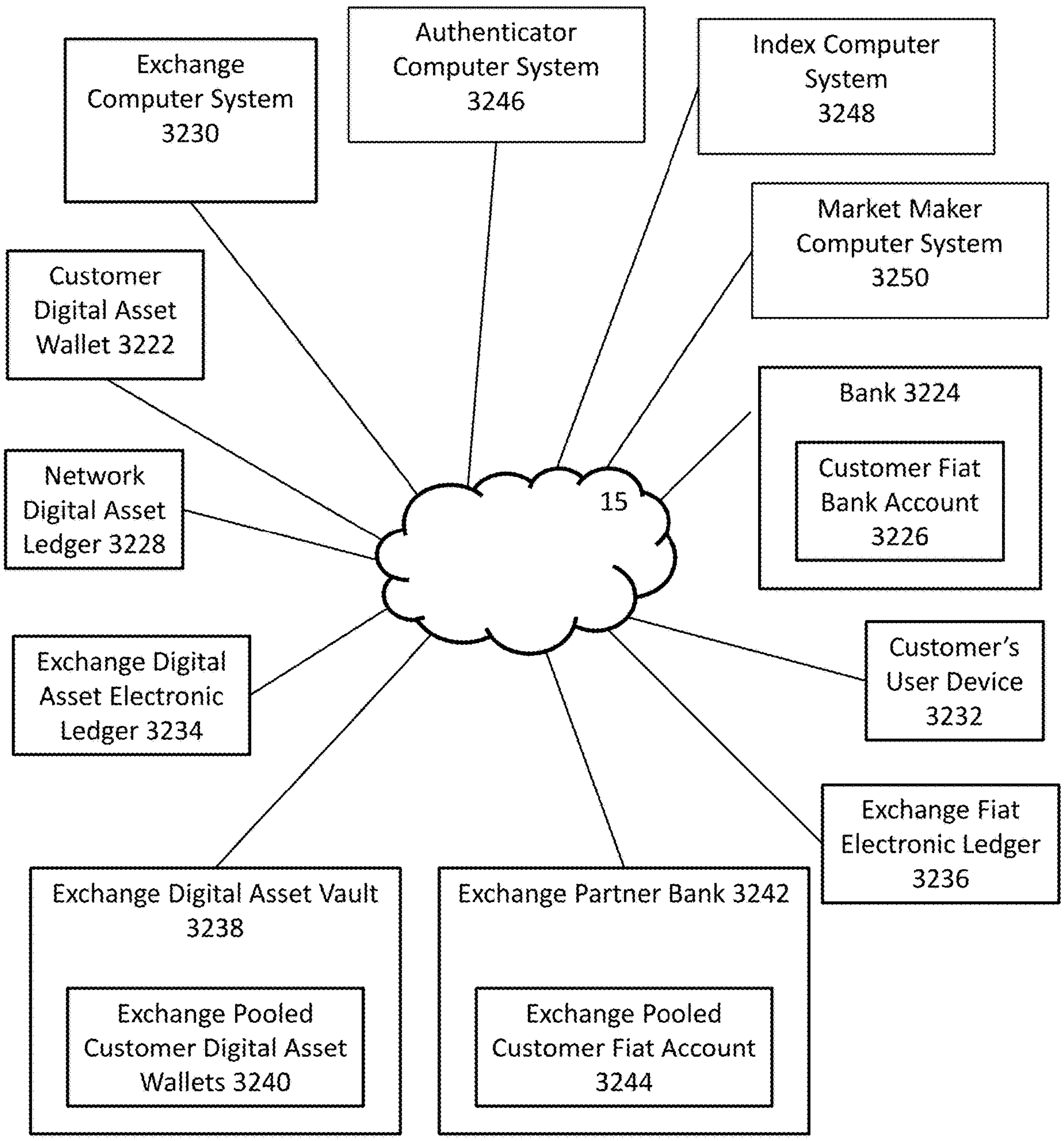

FIG. 27B shows another schematic diagram illustrating entities associated with a digital asset exchange in an exemplary embodiment of the present invention. In addition to the participants described with respect to FIG. 27A, a digital asset exchange may communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250. A market maker may be an exchange user that provides liquidity for the exchange, by purchasing or selling digital assets.

In embodiments, an exchange computer system may calculate different fees for a market maker. The fee calculation may vary with market conditions, such as price, digital asset supply (e.g., sell orders), and digital asset demand (e.g., buy orders). In embodiments, transaction fees charged by an exchange may be different for purchase and sale transactions. Fees may be based upon a user's identity, a user's transaction history, the quantity of digital assets and/or fiat currency associated with a user account, a rate schedule associated with a particular account or account type (e.g., there could be different rates for institutional or foreign users), time of day, and/or whether the user is operating as a market maker or a market taker for a given transaction, to name a few.

Figure 28A:
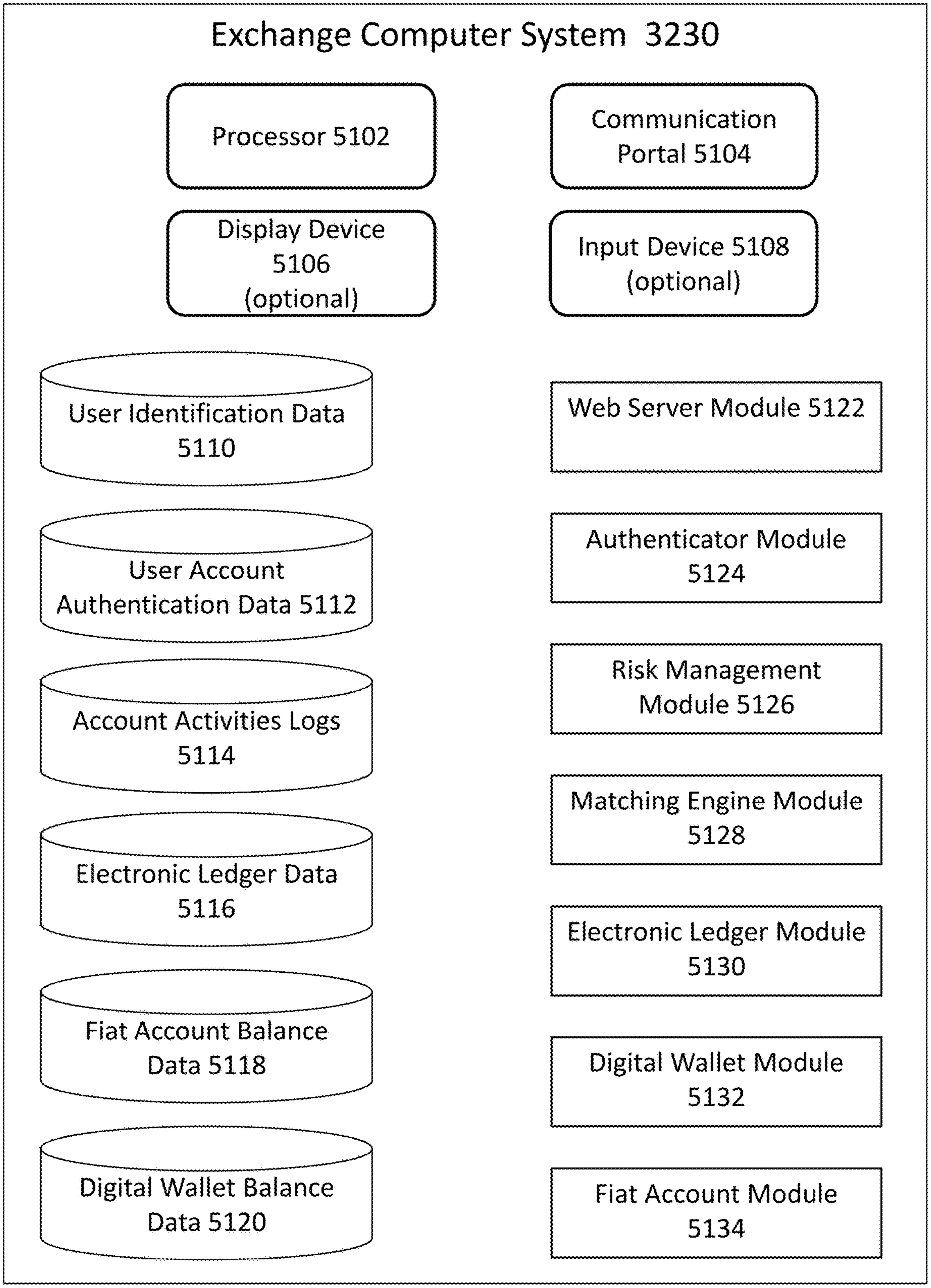
FIGS. 28A-B are schematic diagrams of exemplary exchange computer systems in accordance with exemplary embodiments of the present invention.
Figure 28B:
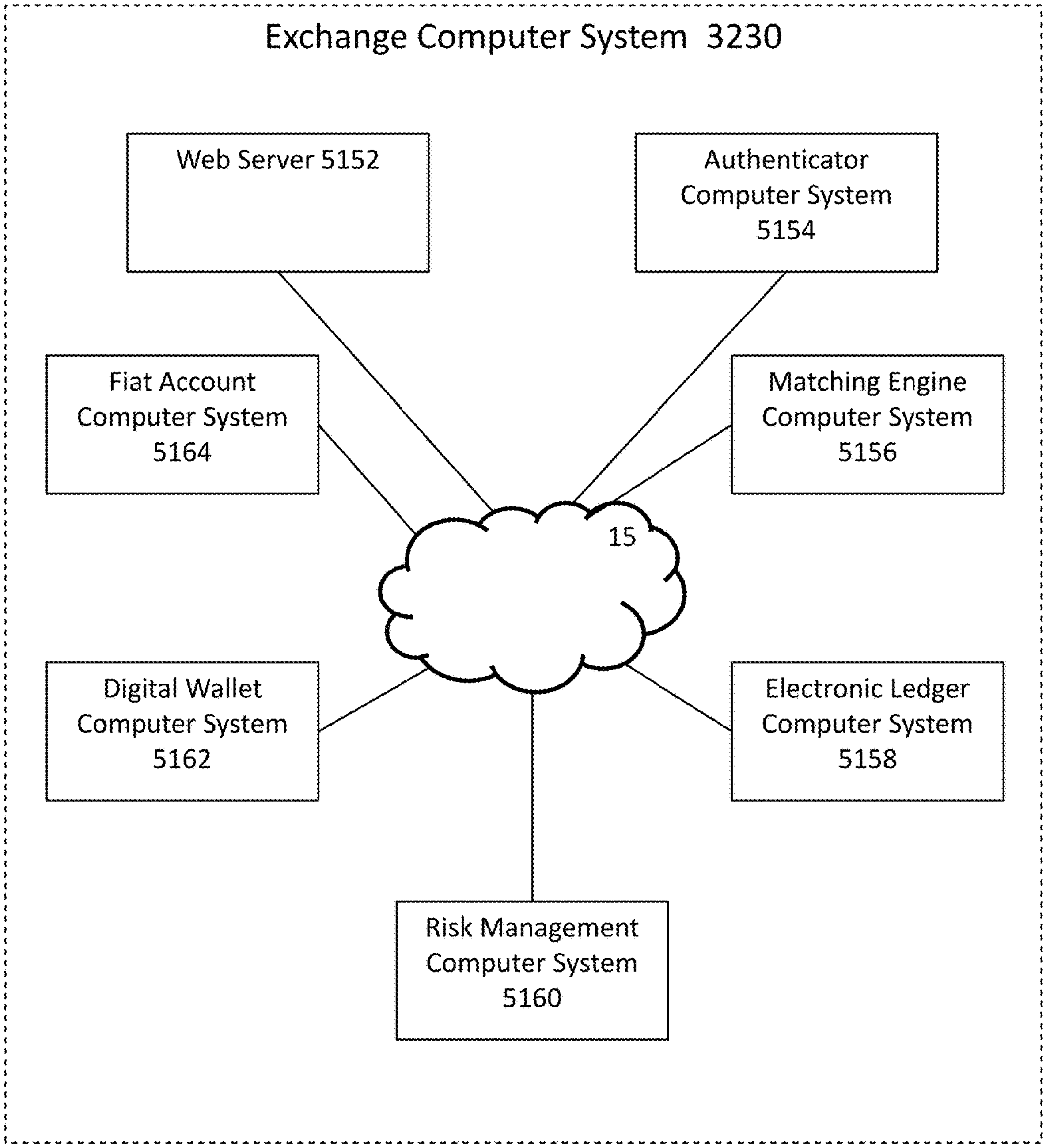

FIGS. 28A-B are schematic diagrams of exemplary exchange computer systems in accordance with exemplary embodiments of the present invention. FIG. 28A shows hardware, data, and software modules, which may run on one or more computers. FIG. 28B shows an exemplary distributed architecture for the exchange computer system.

As shown in FIG. 28A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, and/or digital wallet balance data 5120. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, and/or fiat account module 5134. The processes performed by such modules, the data produced thereby and/or the data accessed thereby are described herein.

An account activities log 5114 may track all user requests received by the exchange computer system. The computer system may generate usage statistics and/or analyze user activity for patterns, e.g., to detect fraudulent behavior.

In embodiments, the risk management module 5126 may analyze user activity logs (e.g., access logs, transaction logs, user electronic requests, website navigation logs, mobile application usage logs, to name a few) to identify behavioral patterns, anomalies, and/or potential fraudulent activity (such as fraudulent electronic requests).

In embodiments, an exchange may conduct user or account verification procedures. In embodiments, these user or account verification procedures may comprise participating with third-party vendors in connection with certain Know Your Customer services. In embodiments, an exchange may implement alternative anti-money laundering (AML) measures. In embodiments, AML measures may include monitoring each transaction on the digital asset exchange for particular factors (e.g., amounts of transaction, location of transaction, volume of activity, to name a few). In the United States, the exchange may provide a user on-boarding mechanism that receives a user registration request, receives a user domicile (e.g., a state of domicile), and/or directs the user to an anti-money laundering user interface based upon the domicile. In embodiments, this interface may be generated at a user device using display data transmitted from the exchange computer system.

A matching engine 5128 may apply a continuous order book price time priority matching algorithm. In embodiments, matching engine 5128 may apply option points at low and/or high frequencies.

As shown in FIG. 28B an exchange computer system can include a web server 5152, an authenticator computer system 5154, a matching engine computer system 5156, an electronic ledger computer system 5158, a risk management computer system 5160, a digital wallet computer system 5162, a fiat account computer system 5164, and/or a SV Coin Computer System 5166. The exchange computer system 3230 may communicate with one or more external computer systems, such as bank computer systems, index computer systems, user computer system (e.g., institutional or individual users), and/or user electronic devices. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination.

An authenticator computer system 5154 may perform authentication of user login credentials, multi-factor authentication, and/or compare users against databases, such as government databases, for compliance with anti-money laundering laws and/or regulations.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets with associated digital asset addresses, generate instructions for digital wallet key storage and/or retrieval, allocate digital assets among digital wallets, track digital assets, store digital asset, and/or transfer digital assets, to name a few.

The digital wallets may include both hot wallets and cold wallets. In embodiments, sufficient digital assets will be stored in one or more hot wallets to allow for liquidity. The amount of digital assets stored in the one or more hot wallets may be determined based on historical averages of trading on the exchange. In embodiments, remaining digital assets will preferably be held in cold wallets. A more detailed discussion of hot wallets and cold wallets is presented in U.S. Pat. No. 9,892,460, issued Feb. 13, 2018 and entitled SYSTEMS, METHODS, AND PROGRAM PRODUCTS FOR OPERATING EXCHANGE TRADED PRODUCTS HOLDING DIGITAL MATH-BASED ASSETS, the entire content of which is incorporated herein by reference.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals. In embodiments, the omnibus or pooled accounts for holding fiat are maintained in a bank or other institution such that these accounts are eligible for insurance under the Federal Deposit Insurance Corporation (FDIC). In order to qualify for FDIC insurance, an account must typically be associated with specific user identification information, e.g., a user name, address and social security number, by way of example, to name a few. Accordingly, in embodiments, fiat accounts may be associated with individuals who are positively identified.

Figure 29:
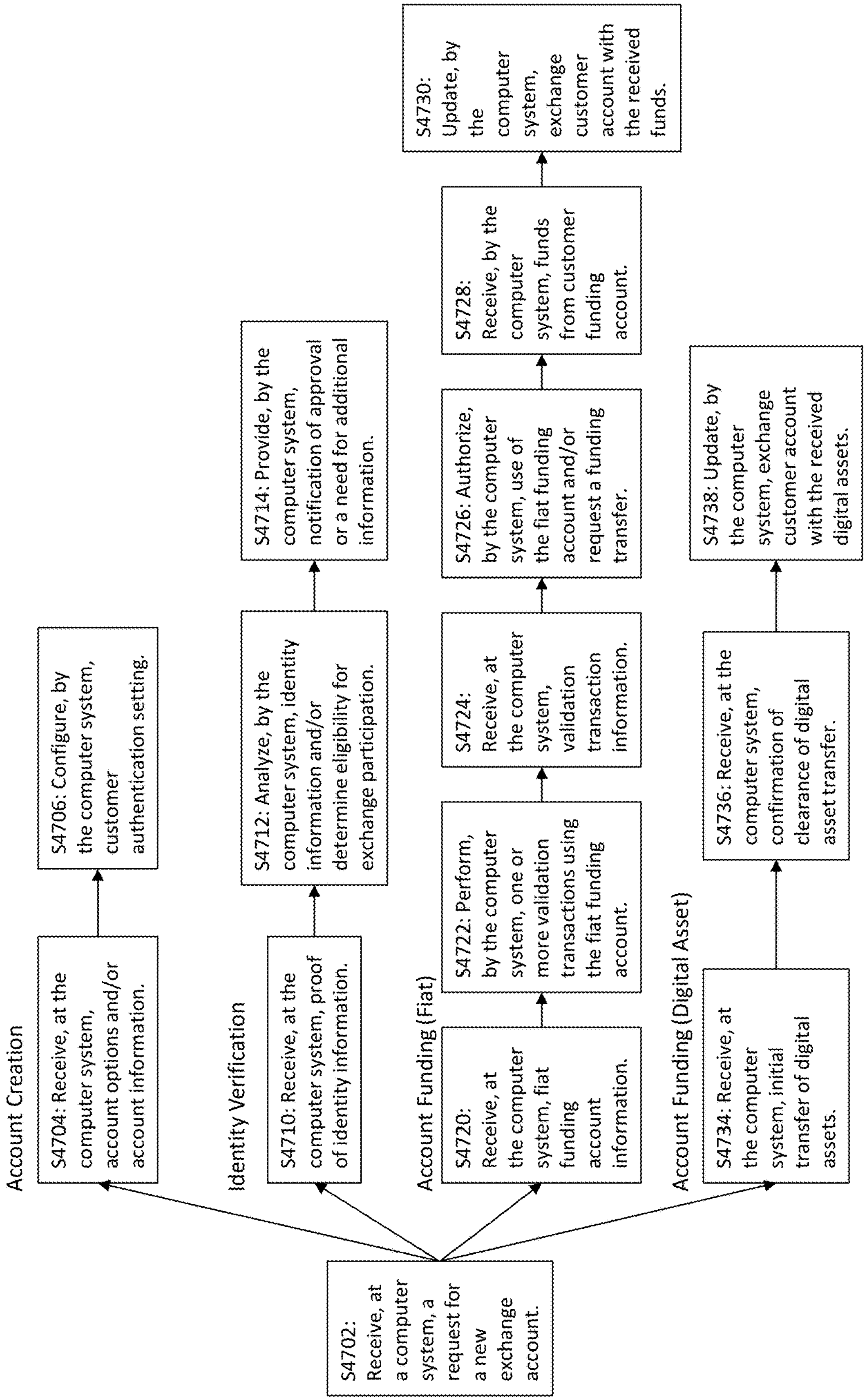
FIG. 29 is an exemplary flow chart for processes for digital asset exchange account creation and account funding in accordance with exemplary embodiments of the present invention.

FIG. 29 is an exemplary flow chart for processes for digital asset exchange account creation and account funding in accordance with exemplary embodiments of the present invention. The processes may be performed by an exchange computer system, which may comprise one or more computers. In embodiments, any steps in the processes may be performed by third-party computer systems, which may be operatively connected to the exchange computer system, e.g., through the Internet. The processes may be performed in conjunction with a user interface, such as a website or mobile application on a smart phone, which can receive user inputs and/or display content to the user. In a step S4702, an exchange computer system may receive an electronic request for a new exchange account. Upon receiving such a request, the exchange computer system may perform account creation, identity verification, fiat account funding, and/or digital asset account funding processes.

Referring to the account creation process shown in FIG. 29, in a step S4704 the exchange computer system may receive account options and/or account information. Account options can include an account type (e.g., individual, business, investor, to name a few), which may correspond to different features, fees, limits, and/or services, such as the ability to transact once a day or multiple times a day, the ability to withdraw funds immediately or once a day, and/or access to a trading API, to name a few. Account information can include a username, password, contact information, actual name of user, location or domicile of user, to name a few. In a step S4706 the exchange computer system may configure customer authentication settings, which may involve setting up two-factor authentication for the user on one or more user devices.

Referring to the identity verification process shown in FIG. 29, in a step S4710 the exchange computer system may receive proof of identity information, which can include a scan of a government-issued identification document (e.g., a driver's license, a passport, a social security card), a copy of a utility bill, a photograph, biometric information (e.g., a fingerprint, palm scan, eye scan, to name a few), and/or identifying information such as a social security number or other government issued identification number, to name a few. In a step S4712 the exchange computer system may analyze the identity information, which may include verifying the information against one or more databases of identity information. Analyzing identity information may comprise verifying the accuracy of the information and/or determining eligibility for participation in the exchange (e.g., based on domicile and/or minimum age, to name a few). In a step S4714 the exchange computer system may provide to a user device a notification of approval, a notification of rejection, or a notification that additional information is required.

Referring to the fiat account funding process shown in FIG. 29, in a step S4720 the exchange computer system may receive fiat funding account information. Such information can include a bank account number (e.g., a routing number), a bank name, an account type, and/or an account holder's name, to name a few. In a step S4722, the exchange computer system may perform one or more validation transactions using the fiat funding account. Such transaction may comprise small deposits into the fiat funding account. In a step S4724, the exchange computer system may receive validation transaction information, which may include a transaction amount, date, and/or time. In a step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange, to transfer funds to the exchange. In a step S4728, the exchange computer system may receive an electronic notification indicating that funds were received, e.g., in an exchange bank account at a partner bank, from the customer fiat funding account. In a step S4730, the exchange computer system can update an exchange customer account with the received funds. Updating an exchange customer account can comprise electronically updating a flat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 29, in a step S4734, the exchange computer system can receive an initial transfer of digital assets. In a step S4736, the exchange computer system can receive a confirmation of clearance of the digital asset transfer. In a step S4738, the exchange computer system can update an exchange customer account with the received digital assets. Updating an exchange customer account can include making an electronic entry in an exchange digital asset electronic ledger and/or providing a notification that the digital assets are received.

Figure 30A:
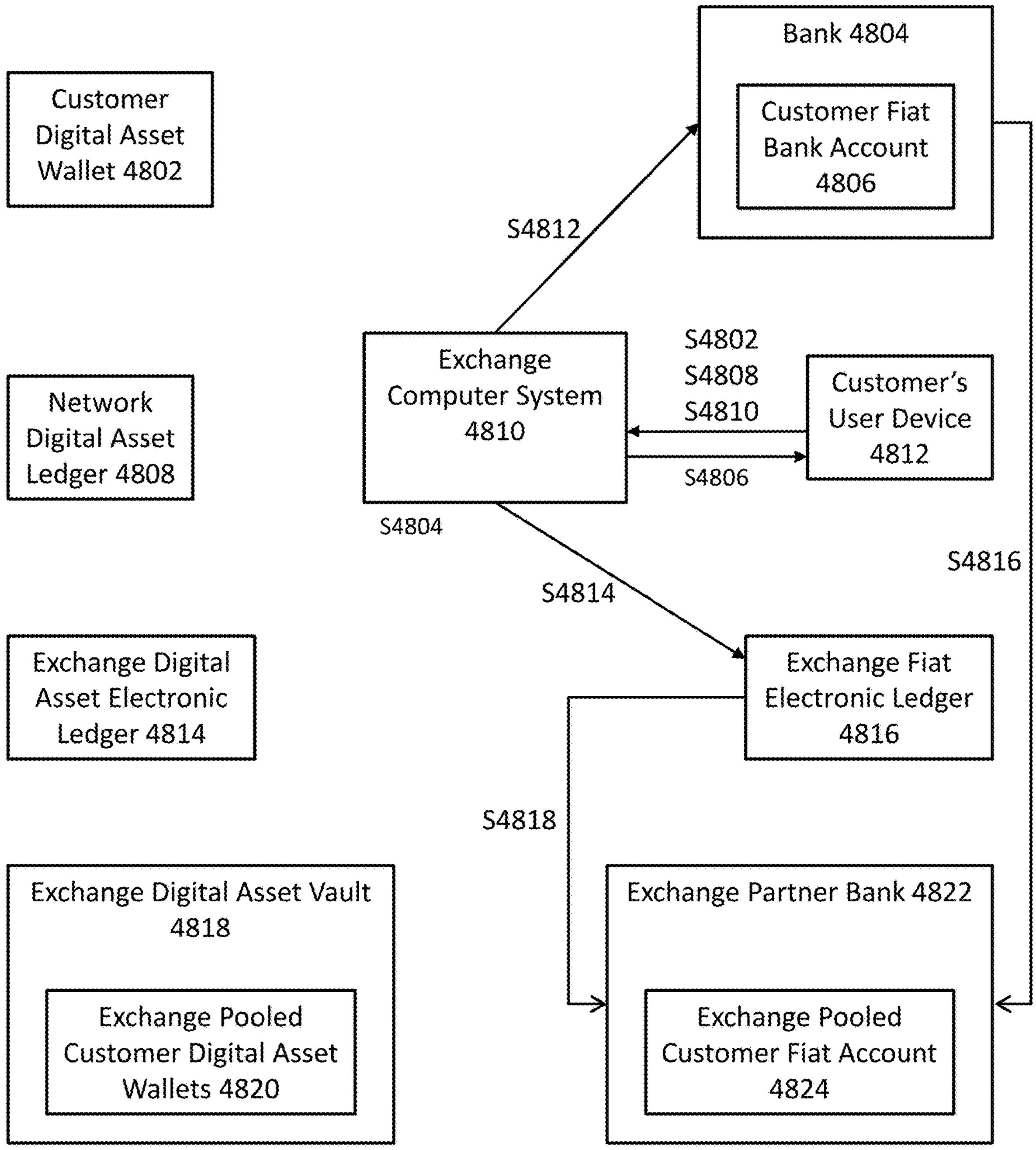
FIGS. 30A-B are an exemplary schematic diagram and corresponding flow chart of a process for digital asset exchange customer account fiat funding via an exchange-initiated request in accordance with exemplary embodiments of the present invention.
Figure 30B:
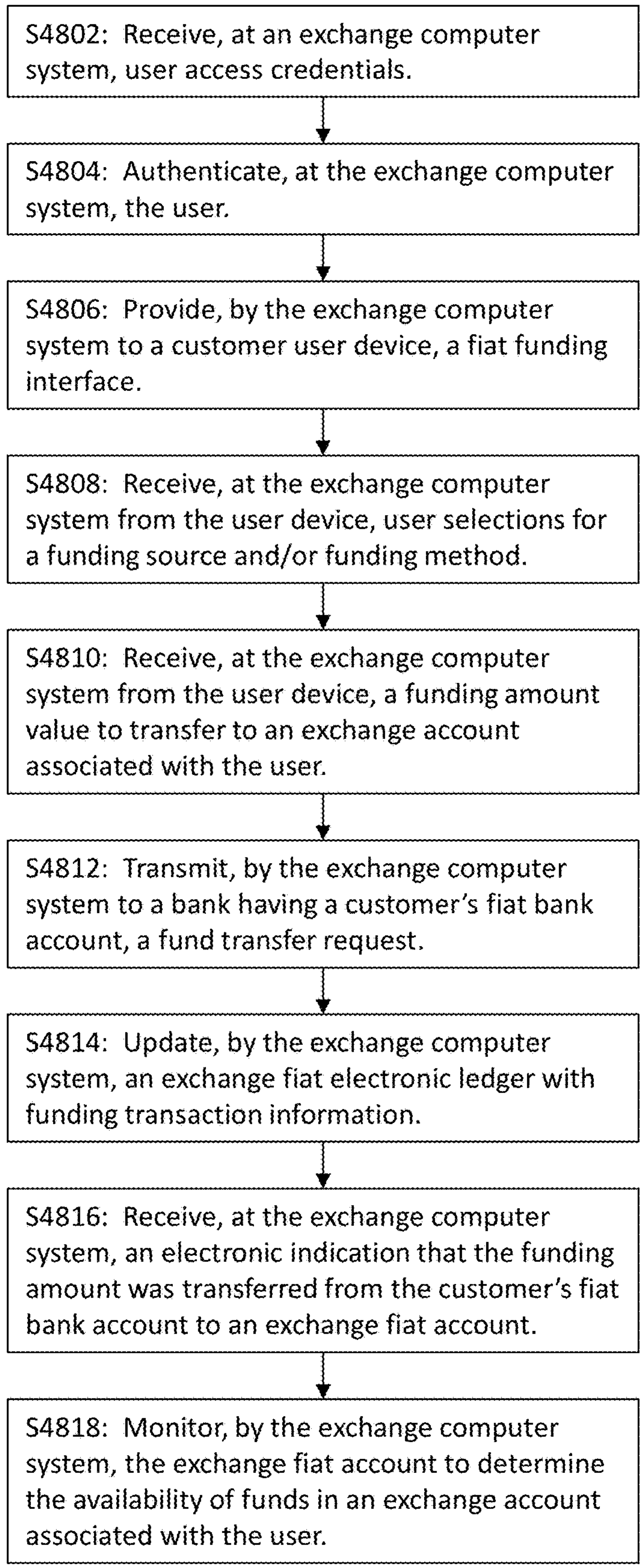

FIG. 30A is an exemplary schematic diagram of an exchange, and FIG. 30B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820 with associated digital asset addresses. Any of these entities or components may communicate directly and/or indirectly, e.g., through a data network, such as the Internet. In embodiments, encryption and/or other security protocols may be used. These entities and components are further described with respect to FIG. 27A.

Referring to FIG. 30B, in a step S4802 the exchange computer system can receive user access credentials, e.g., from a user device. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, step S4808 and step S4810 may be a single step or may occur substantially simultaneously. Accordingly, the exchange computer system may receive from a user electronic device a user electronic request comprising a funding amount and a funding method, wherein the funding method is an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 30C:
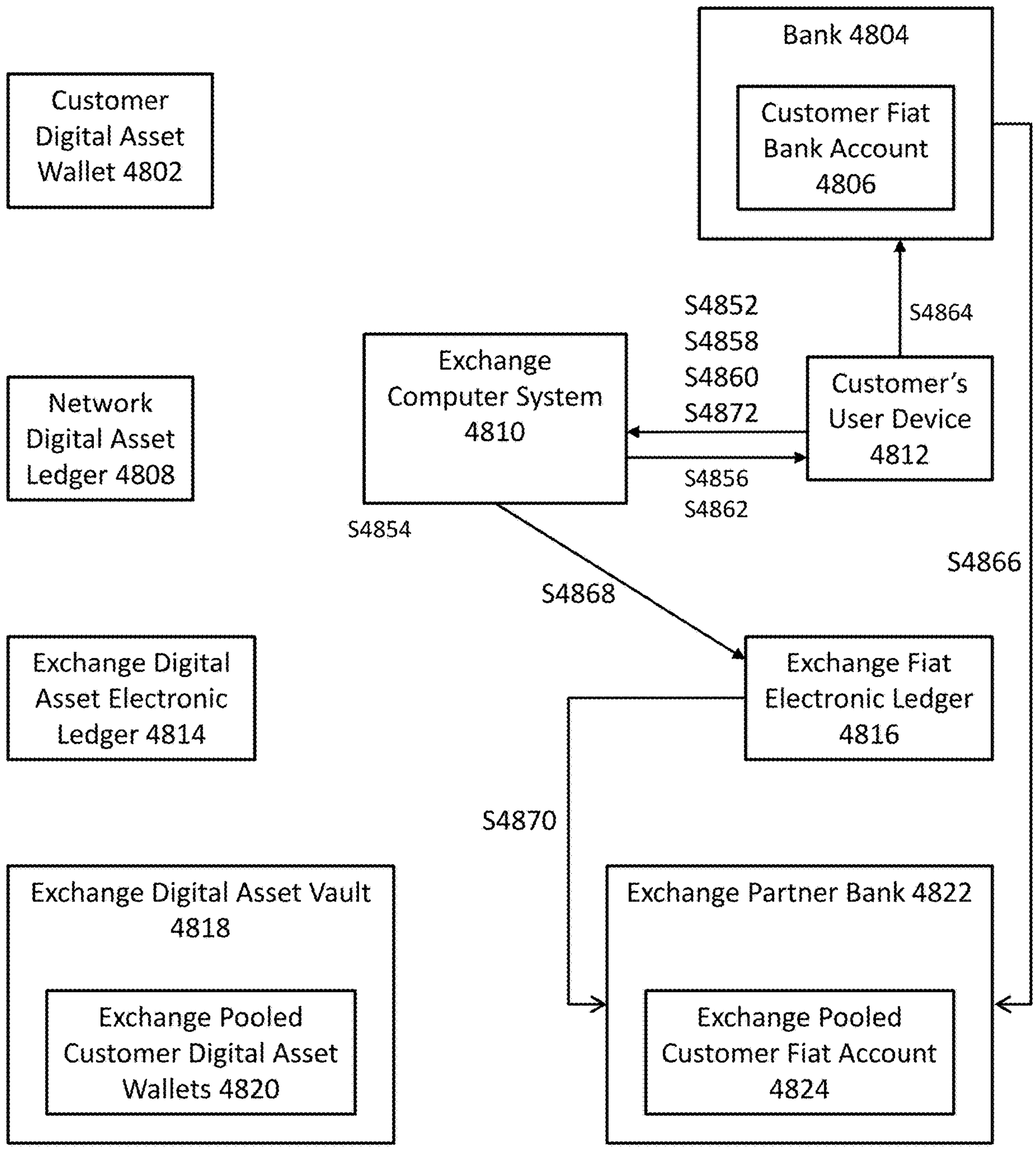

FIG. 30C is an exemplary schematic diagram of an exchange, and FIG. 30D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 30C are described with respect to FIG. 27A.

FIG. 30D is a flow chart showing an exemplary process for digital asset exchange customer account fiat funding. In a step S4852, an exchange computer system can receive user access credentials. In a step S4854, the exchange computer system can authenticate the user by verifying the received access credentials. Verifying the access credentials can comprise comparing the credentials to a secure credentials database. In a step S4856, the exchange computer system can provide to a customer user device a fiat funding interface. In a step S4858, the exchange computer system can receive from the customer user device, user selections for a funding source and/or funding method. The funding method may be a customer-initiated method, such as a wire transfer. In a step S4860, the exchange computer system can receive a funding amount value to transfer to an exchange account associated with the user. In a step S4862, the exchange computer system can provide to the customer user device fund transfer instruction, e.g., wire instructions. In a step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In a step S4866, the exchange computer system may receive an indication that the funding amount was transferred from the customer's fiat bank account to the exchange fiat account. In a step S4868, the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872, the exchange computer system can provide an electronic notification to one or more customer user devices that funds are available for use on the exchange.

Figure 30E:
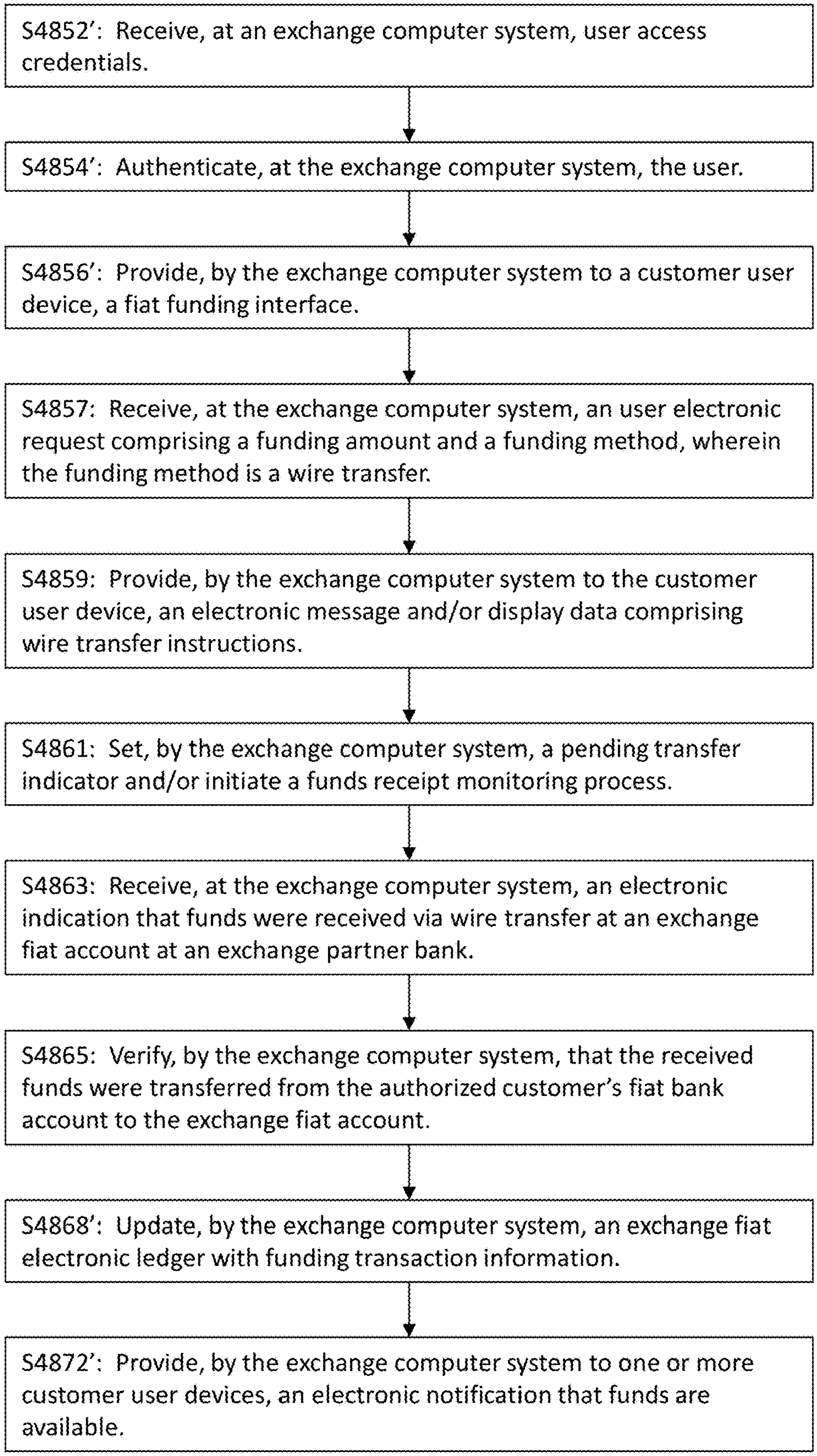

FIG. 30E is a flow chart showing another exemplary process for digital asset exchange customer account fiat funding. In a step S4852', an exchange computer system can receive user access credentials. In a step S4854', the exchange computer system can authenticate the user by verifying the received access credentials. Verifying the access credentials can comprise comparing the credentials to a secure credentials database. In a step S4856', the exchange computer system can provide to a customer user device a fiat funding interface. In a step S4857, the exchange computer system can receive a user electronic request comprising a funding amount and a funding method (e.g., a wire transfer). In a step S4859, the exchange computer system can provide to the customer user device, an electronic message and/or display data comprising wire transfer instructions. In a step S4861, the exchange computer system can set a pending transfer indicator and/or initiate a funds receipt monitoring process. In a step S4863, the exchange computer system can receive an electronic indication that funds were received via wire transfer at an exchange fiat account at an exchange partner bank. In a step S4865, the exchange computer system can verify that the received funds were transferred from the authorized customer's fiat bank account to the exchange fiat account. In a step S4868' the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872', the exchange computer system can provide an electronic notification to one or more customer user devices that funds are available for use on the exchange.

Figure 31A:
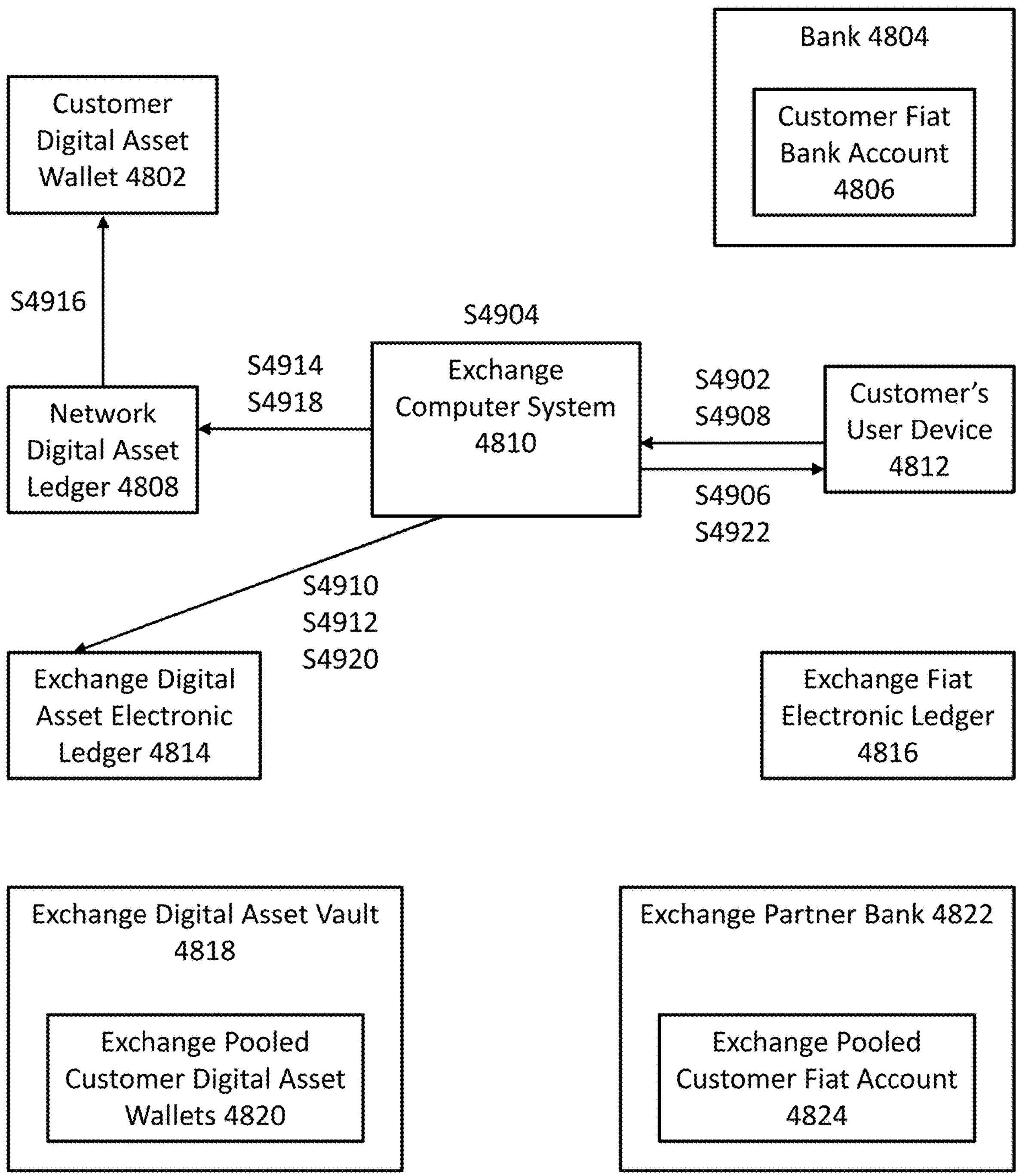
FIGS. 31A-B are a schematic diagram and corresponding flow chart of a process for digital asset exchange account digital asset withdrawal in accordance with exemplary embodiments of the present invention.
Figure 31B:
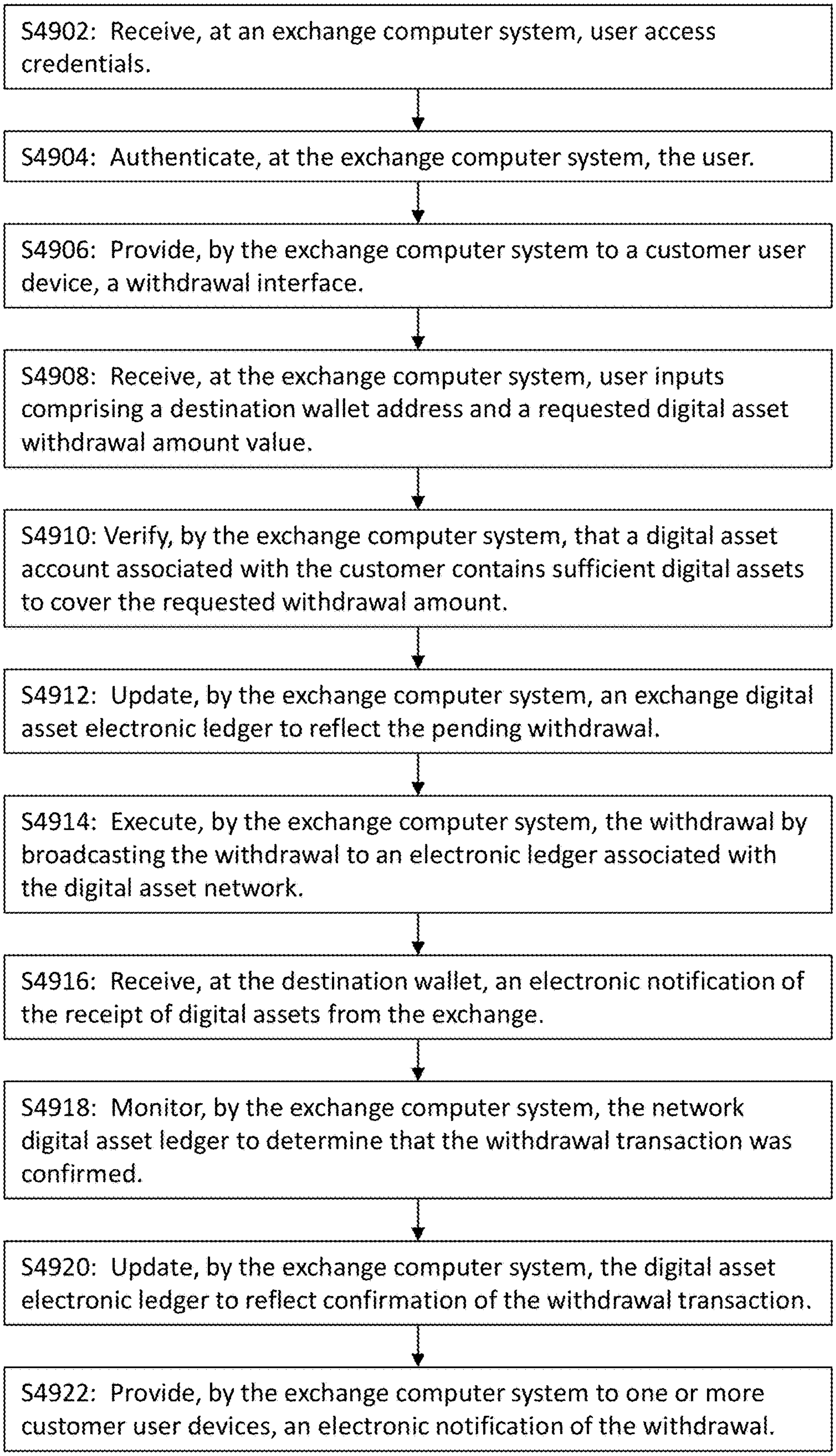

FIG. 31A is an exemplary schematic diagram of an exchange, and FIG. 31B is a corresponding flow chart of a process for digital asset exchange account digital asset withdrawal in accordance with exemplary embodiments of the present invention. The components and entities associated with an exchange that are shown in FIG. 31A are described herein with respect to FIG. 27A.

Referring to FIG. 31B, in a step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In a step S4904, the exchange computer system can authenticate the user based upon the received user access credentials. In a step S4906, the exchange computer system may provide to a customer user device a withdrawal interface. In a step S4908, the exchange computer system may receive from the customer user device user inputs comprising at least a destination digital asset address, typically associated with a destination digital wallet and a requested digital asset withdrawal amount value. In a step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In a step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In a step S4914, the exchange computer system may execute the withdrawal, e.g., by broadcasting the withdrawal to a digital asset network electronic ledger, e.g., the Bitcoin Blockchain, the Ethereum Blockchain, to name a few. In a step S4916, the destination wallet may receive an electronic notification of the receipt of digital assets from the exchange. In a step S4918, the exchange computer system may monitor the network digital asset ledger to determine whether and/or when the withdrawal transaction is confirmed. In a step S4920, the exchange computer system may update the digital asset electronic ledger, e.g., by debiting the withdrawal amount from the customer's exchange account, to reflect confirmation of the withdrawal transaction. In a step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain an loss reporting system and a transaction history system. A fraud analysis system can monitor transactions to detect fraudulent and/or unauthorized transactions.

Exchange Digital Asset Storage Structure

Deposited customer fiat may be held in a pooled fiat account maintained in a partner bank. Meanwhile, digital assets held by the exchange may be maintained in pooled digital addresses associated with pooled digital wallets, such as aggregated custodial wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated off-line with transactions generated off-line, e.g., on an isolated computer, and transferred to a networked computer via a temporary physical connection or manual transfer. Isolated computer systems are physically and operationally isolated from other computer systems. For example, an isolated computer system may be an air gapped computer system. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. These exchange operated wallets may be maintained in trust by the exchange for each customer as associated digital asset addresses. Transactions may be processed by the digital asset network, e.g., the Bitcoin network. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets with associated digital asset addresses. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. As discussed herein, the exchange may maintain an electronic ledger to record transactions among users of the exchange. Separate electronic fiat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counter-party to the transaction. Transaction amount limits may be place on such transactions and/or additional fees may be charged.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and flat account.

In embodiments, a digital asset exchange may accept payment methods (e.g., credit card transactions; Automated Clearing House (ACH) debits, wire transfers, digital asset transactions, to name a few) for purchases of digital assets.

In embodiments, users may utilize sub-accounts subordinate to the master account. In embodiments, sub-accounts can be used as entities for traders, or can be used by machines associated with an owner, as discussed in U.S. patent application Ser. No. 15/071,902, filed Mar. 16, 2016 and entitled AUTONOMOUS DEVICES, which is expressly incorporated herein by reference.

In embodiments, a digital asset exchange may hold digital math-based assets and/or fiat currency in trust for users before, during and after a trade. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, flat currency may be transmitted to a digital asset exchange's omnibus account. In embodiments, the exchange may transmit flat currency back to a user upon receiving a request from a user.

In embodiments, a digital asset exchange may comply with relevant laws and regulations whereby the exchange may operate in a highly regulated banking environment and permit necessary supervision by relevant legal authorities.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences a an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

In embodiments, the exchange may permit trading twenty-four hours a day, seven days a week. In embodiments, the exchange may shut down for scheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for flat currency or buy digital math-based assets with fiat currency if the user holds sufficient fiat currency in its associated account prior to initiating the transaction.

In embodiments, as discussed herein, exchange customers looking to buy digital assets may be matched to customers looking to sell digital assets, which matching may be performed by an exchange trading engine. Transaction volumes and prices may be based at least in part upon bids and asks that are received by the trading engine from the customers.

Exchange-Based Stable Value Coin to Fiat Portal

In embodiments, a digital asset exchange (such as a regulated exchange) can be used to exchange SVCoin for fiat and fiat for SVCoin. Since SVCoin is a stable value token, each token will be pegged to a stable value of fiat (e.g., 1 SVCoin=1 USD or 1 SVCoin=1 EUR, to name a few). In embodiments, when fiat is provided to a digital asset exchange to purchase SVCoin, a sufficient amount of fiat to cover the notional value of the SVCoin will be set aside and held until the SVCoin is redeemed. Similarly, when SVCoin is redeemed the corresponding amount of fiat associated with the notional value of the SVCoin will be taken from such reserves to cover the redemption. In embodiments, each time SVCoins are purchased, redeemed and/or traded, transaction fees may be charged by the SVCoin issuer, and/or others involved in the transaction, such as miners on the digital asset network. Such transaction fees may be charged in fiat, SVCoin and/or other digital assets (e.g, Gas, bitcoin, ether, to name a few).

In embodiments, when a user (such as a registered user of a regulated digital asset exchange) commences a purchase order to acquire SVCoin for fiat, the user may have fiat currency in an associated user account. Alternatively, the user may send fiat currency to the exchange's account, such as an omnibus account, at the applicable bank. In embodiments, when a seller sells SVCoin, the seller may have the SVCoin in an associated user account or may send SVCoin to a digital asset account. Specifically, the seller may send SVCoin to one or more of digital asset addressed, typically associated with digital wallets held by the exchange. In embodiments, exchange transactions may only be completed after the verification that the digital asset accounts and fiat accounts associated with the users involved in the transaction at least equal the quantities of each required by the transaction.

In embodiments, registered users of a digital asset exchange system, such as Gemini, may purchase and/or redeem SVCoins for fiat and/or other digital assets though one or more digital asset dashboard interfaces. In embodiments, the one or more digital asset dashboard interfaces may include: (i) a dashboard fiat interface which allows registered users to deposit and/or withdrawal fiat with the digital asset exchange; (ii) a dashboard digital asset interface which allows registered users to deposit and/or withdrawal digital assets with the digital asset exchange system; (iii) a dashboard SVCoin interface which allows registered users to purchase and/or redeem SVCoins with the digital asset exchange system; and (iv) a dashboard Security Token interface which allow Security Token issuers to provide instructions to transfer SVCoins to Security Token holders. Each of these dashboard interfaces will now be described in turn.

Figures 4, 65A:
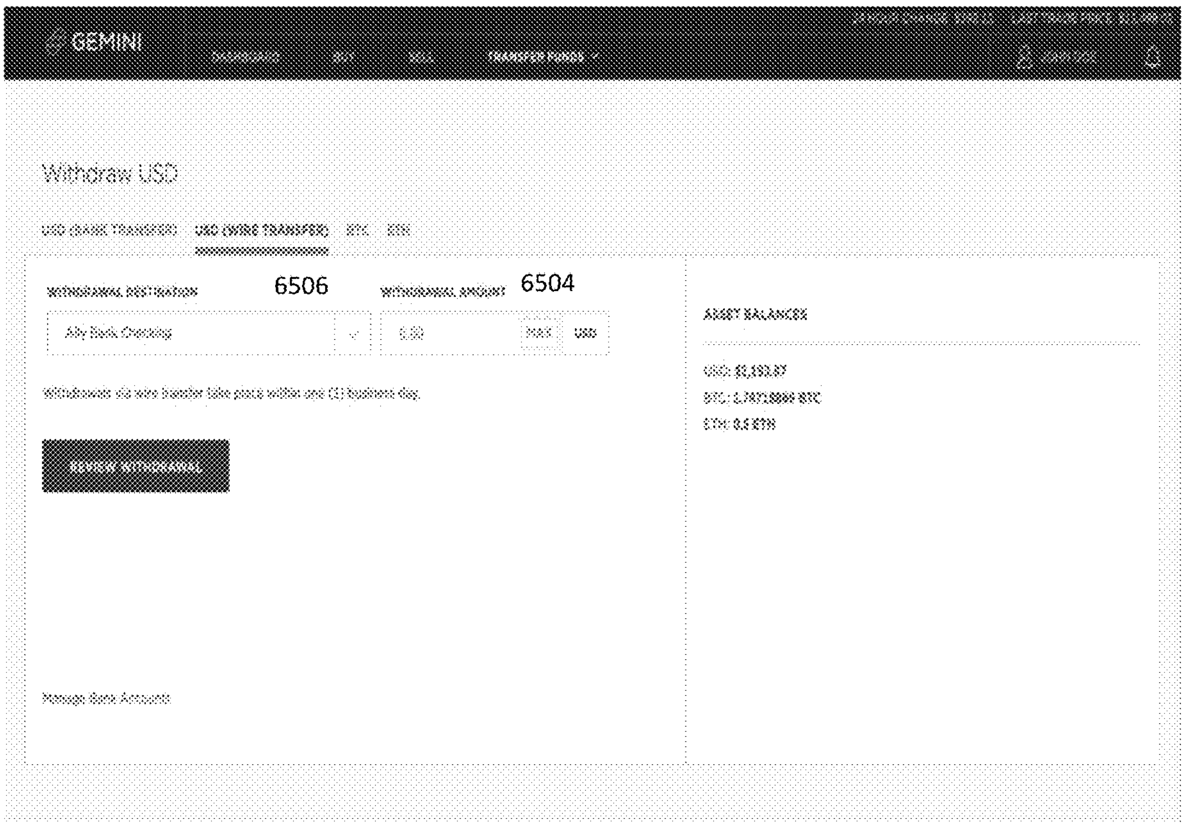

FIGS. 65A-1-4 illustrates an exemplary embodiment of a dashboard fiat interface which allows registered users to deposit and/or withdraw fiat with the digital asset exchange.

FIG. 65A-1 illustrates an exemplary embodiment of the dashboard fiat interface as used for deposit of fiat. As illustrated, the user has the option to make a transfer from a bank to the exchange by indicating an amount of fiat 6502 (e.g., US dollars) to be transferred from a funding source 6500 (e.g., a bank account).

FIG. 65A-2 illustrates an exemplary embodiment of the dashboard fiat interface providing an option of a wire transfer. As in FIG. 65A-1, the user indicates an amount of fiat 6502 to be transferred from a funding source 6500, such as a bank, to be wired to the exchange.

FIG. 65A-3 illustrates the dashboard fiat interface as used to withdraw fiat from the exchange and deposit it into a destination (e.g., a bank). In this case, the user provides a withdrawal amount of fiat 6504 and a destination 1106, such as a bank account, for the specific fiat.

Similarly, FIG. 65A-4 illustrates the dashboard fiat interface as used to withdraw fiat via a wire transfer where the user enters the withdrawal amount of fiat 6504 and a destination 1106, such as a bank account.

Figures 1, 65B:
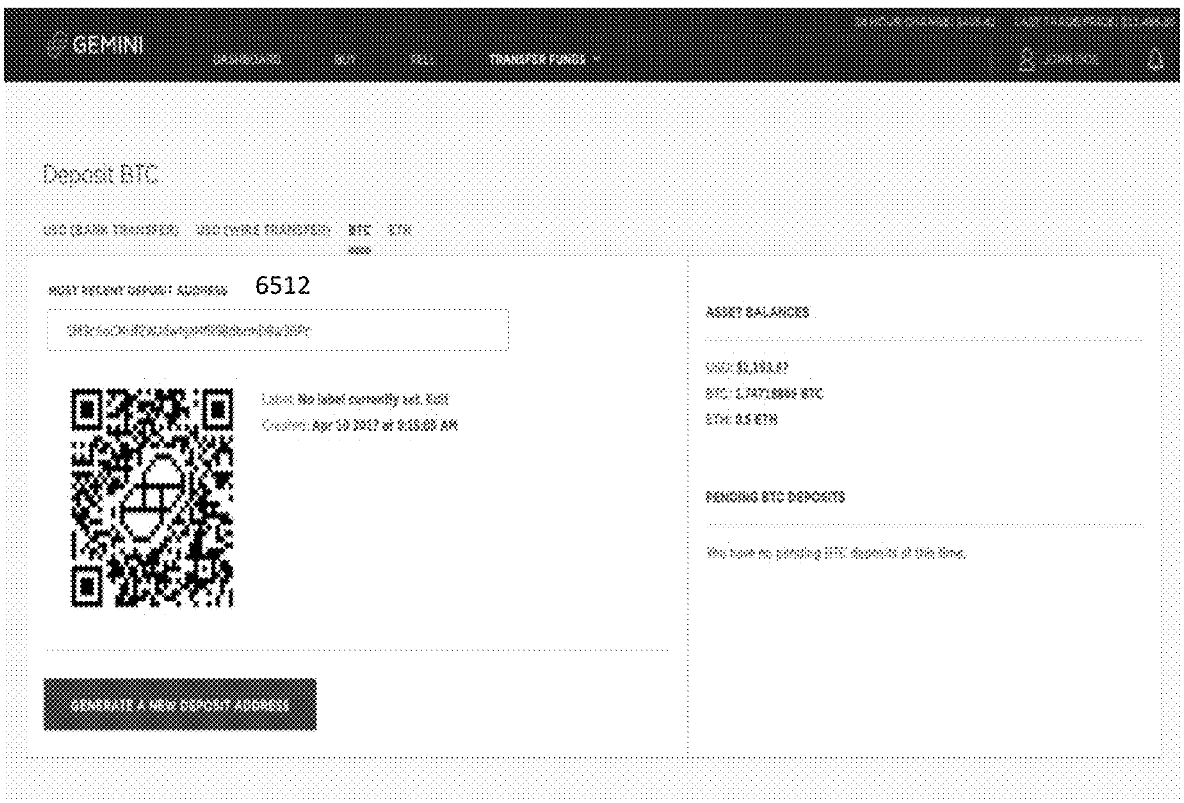
Figures 2, 65B:
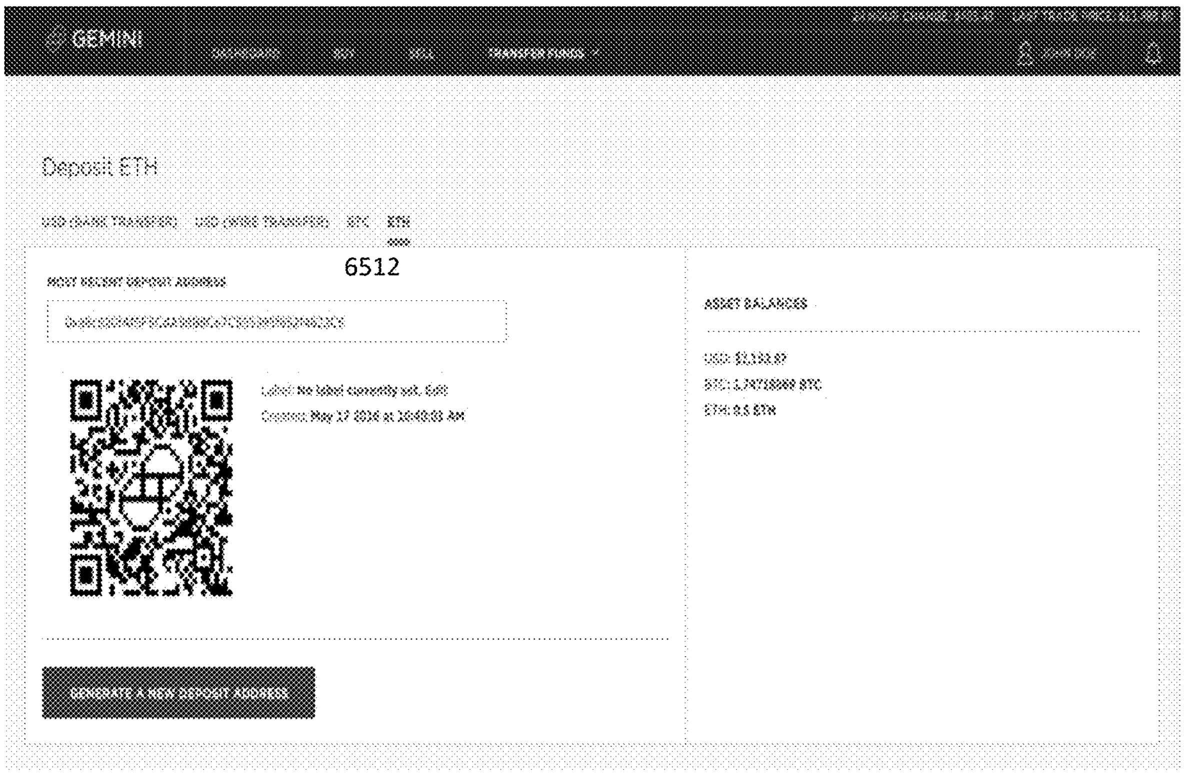
Figures 3, 65B:
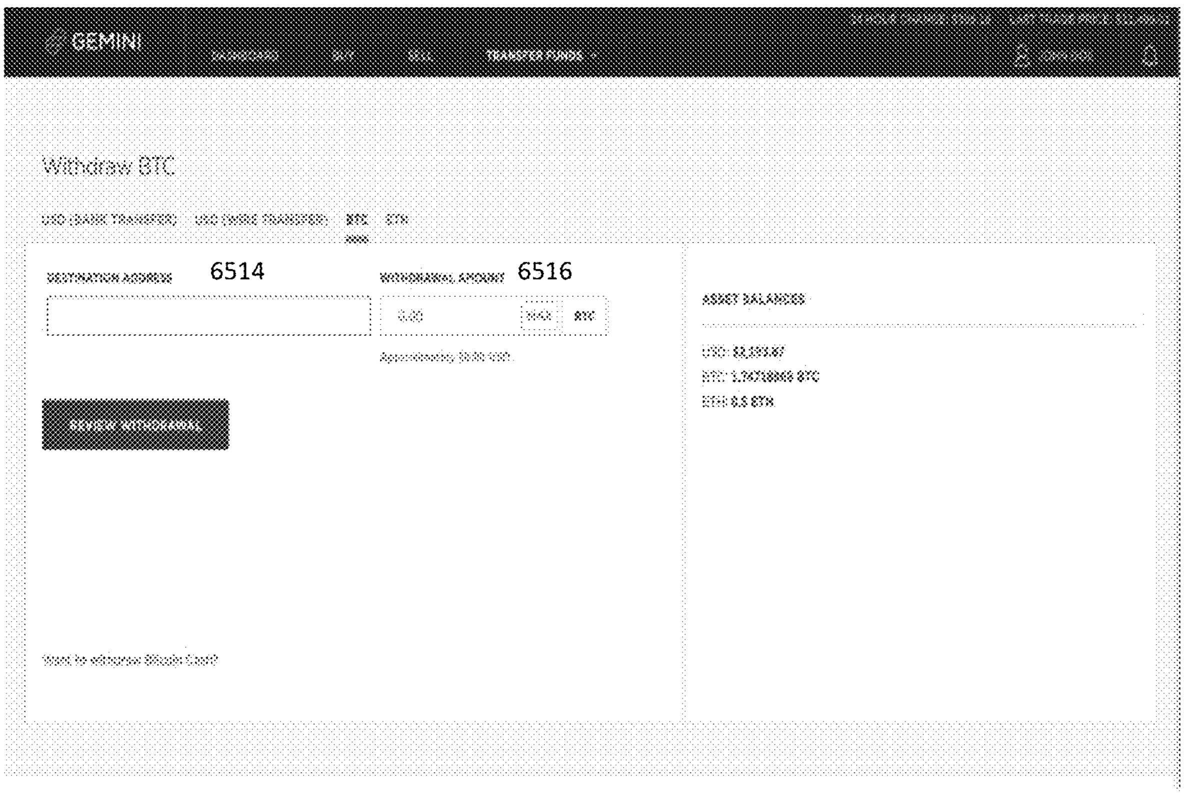
Figures 4, 65B:
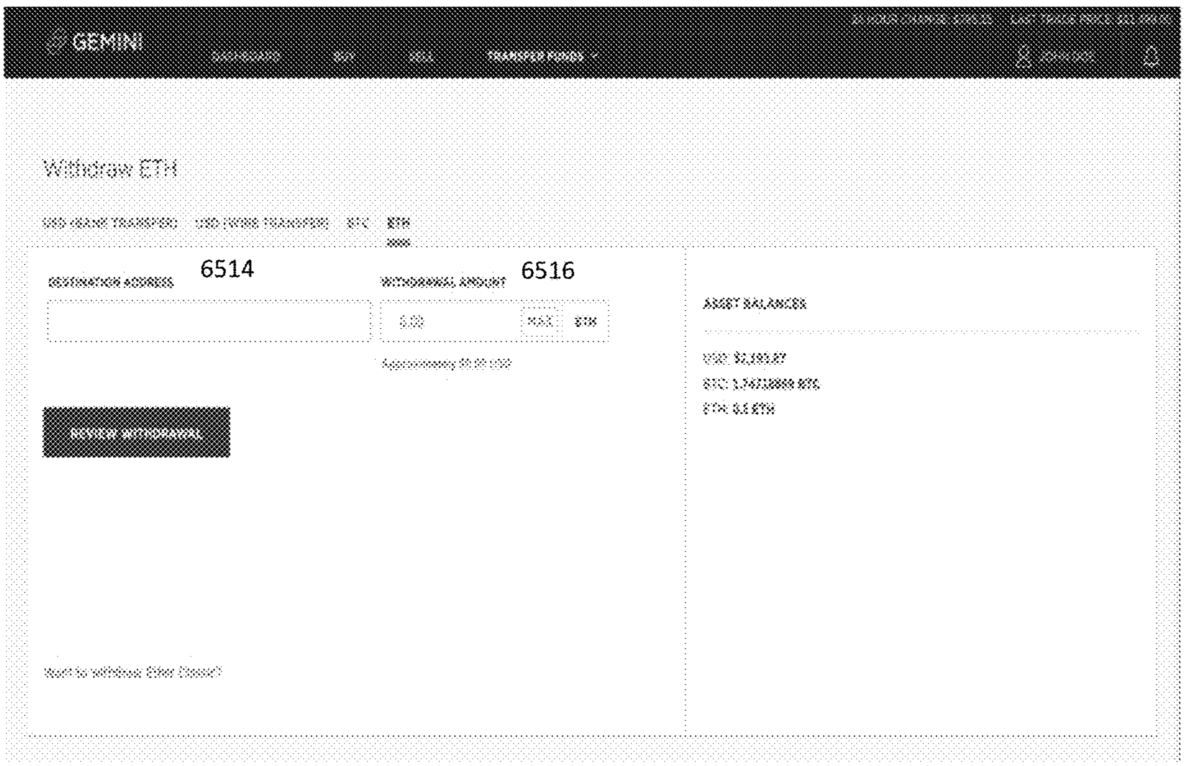

FIGS. 65B-1-4 illustrates an exemplary embodiment of a dashboard digital asset interface which allows registered users to deposit and/or withdrawal digital assets with the digital asset exchange system.

FIG. 65B-1 illustrates an exemplary embodiment of the dashboard fiat interface as used for deposit of digital assets, specifically bitcoin in this nonlimiting example. As illustrated, the user enters the current address 6512 of the digital asset (e.g., bitcoin, ether, etc.).

FIG. 65B-2 illustrates another exemplary embodiment of the dashboard fiat interface as used for deposit of digital assets, specifically ether this nonlimiting example. As illustrated, the user enters the current address 6512 of the digital asset (ether in this example.

FIG. 65B-3 illustrates an exemplary embodiment of the dashboard fiat interface as used for withdrawal of digital assets, specifically bitcoin in this nonlimiting example. As illustrated, the user enters the destination address 6514 for the digital asset (bitcoin) as well as amount of digital assets 6516 to be withdrawn.

FIG. 65B-4 illustrates an exemplary embodiment of the dashboard fiat interface as used for withdrawal of digital assets, specifically ether this example. As illustrated, the user enters the destination address 6514 of the digital asset (ether) as well as amount of digital assets 1116 to be withdrawn.

Figures 1, 65C:
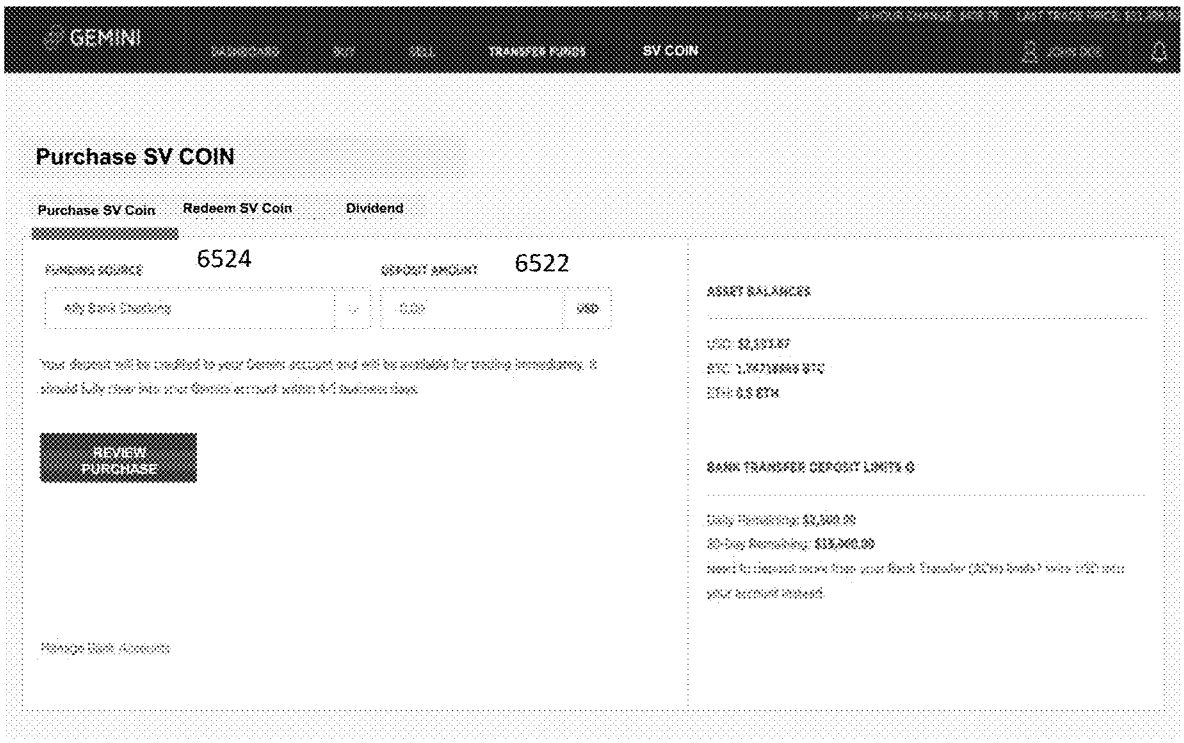
Figures 2, 65C:
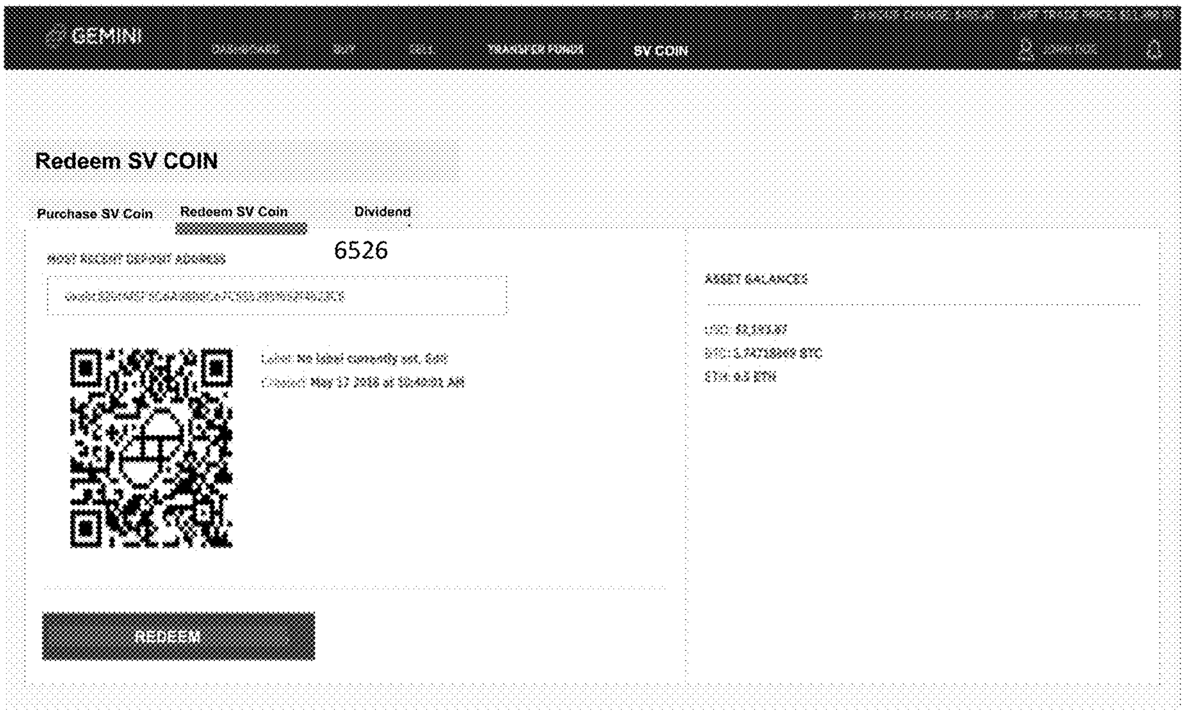
Figure 65D:
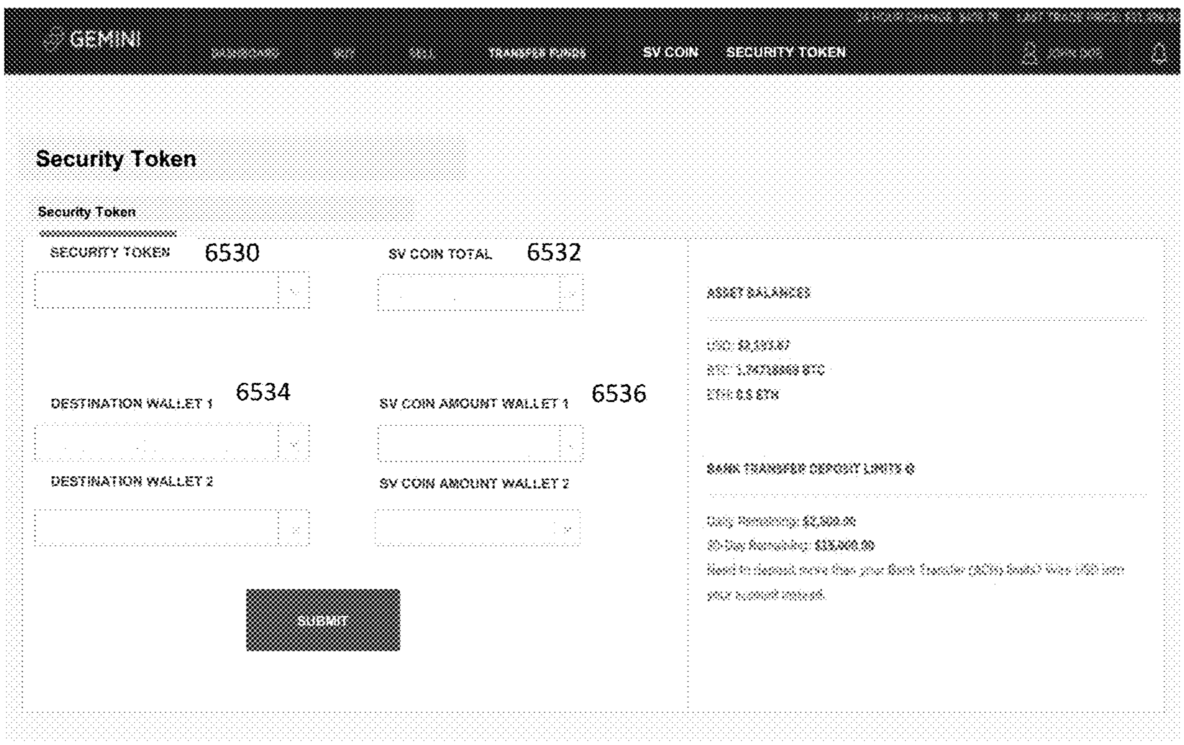
FIG. 65D illustrates an exemplary dashboard Security Token interface which allow Security Token issuers to provide instructions to transfer SVCoins to Security Token holders in accordance with exemplary embodiments of the present invention.

FIGS. 65C-1-2 illustrates an exemplary embodiment of a dashboard SVCoin interface which allows registered users to purchase and/or redeem SVCoins with the digital asset exchange system.

FIG. 65C-1 illustrates an exemplary embodiment of the dashboard fiat interface as used to purchase SVCoins using fiat. As illustrated, the user may enter an amount of fiat (U.S. dollars, in this example) 6522 to be provided from a source 6524 (e.g., a bank account) to purchase the SVCoins.

FIG. 65C-2 illustrates an exemplary embodiment of the dashboard fiat interface as used to purchase SVCoins using digital assets (bitcoin in this example). As illustrated, the user may enter the current address of the digital asset 6526.

Figure 6A:
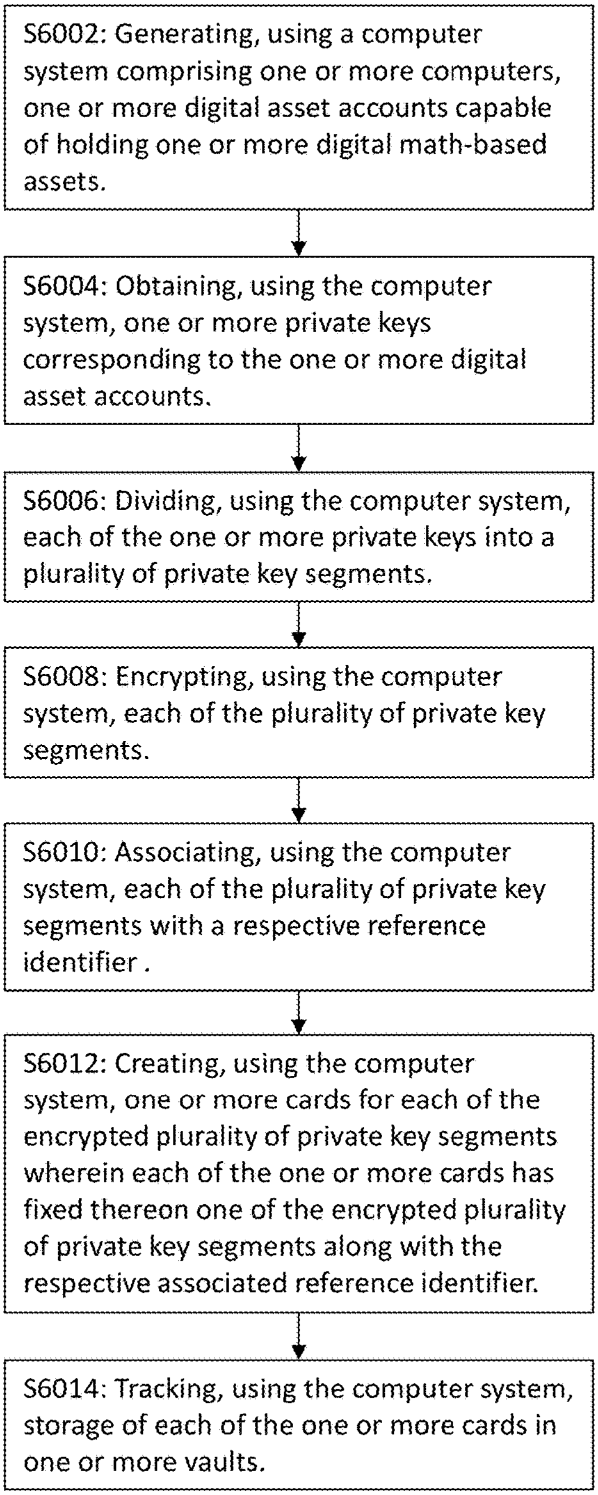

In embodiments, a registered user may purchase SVCoins in exchange for fiat. Referring to FIG. 6A, in S6602, a registered user may log in to the dashboard SVCoin interface, such as illustrated in FIGS. 65C-1-2.

In S6604, the user selects the purchase SVCoin option, and specifies the amount of SVCoins the user seeks to obtain. In embodiments, the user may be requested to provide a digital asset address, typically associated with a digital wallet, such as a digital asset address associated with a blockchain digital asset, like ether. In embodiments, the amount of SVCoins to be purchased may be specified by number of SVCoins, or by an amount of fiat. Since the SVCoins are pegged to the fiat in a stable amount (e.g., 1 SVCoin=1 USD), the system can automatically convert and display the requested amount of SVCoin into fiat, or requested amount of fiat into SVCoin.

In S6606, the digital asset exchange system will analyze and verify that the request can be properly processed. In step S6606-*a*, the digital asset exchange system, as the SVCoin issuer, may verify that the user has sufficient fiat currency maintained at the digital asset exchange to cover the transaction, including a sufficient amount of fiat to cover the amount of SVCoin being acquired, as well as any transaction fees that may be charged. If the user does not have sufficient fiat in the system, the transaction may be terminated for insufficient funds. In embodiments, the user may be provided an opportunity to obtain sufficient funds, by, e.g., selling digital assets maintained by the user on the digital asset exchange or by making a deposit of additional fiat. In step S6606-*b*, the digital asset exchange system, may also verify that the digital asset address provided is a valid digital asset address. In step S6608-*c*, the digital asset exchange system, may also publish transactions to blockchain.

In S6608, after the digital asset exchange system has confirmed that the user has sufficient fiat to cover the transaction, the digital asset exchange system may initiate the process of generating the requested SVCoin. In embodiments, where SVCoins were previously generated, then S6608 may be replaced with an alternative process S9908' as discussed below.

Returning to S6608, in S6608-*a*, the digital asset exchange system may debit the designated fiat funds from a fiat ledger associated with the user account, and credit a corresponding amount of fiat to the SVCoin fiat ledger to be held in trust by the Exchange.

In S6608-*b*, the digital asset exchange system shall generate the requested SVCoin tokens. As part of this step, or as an additional step, the digital asset exchange system will update the SVCoin ledger to reflect the creation of the newly generated SVCoins and to indicate the digital asset address associated with these newly generated SVCoins.

In S6608-*c*, the digital asset exchange system shall publish to the blockchain network (e.g., the Ethereum Network) the transaction to be recorded by the blockchain network. In embodiments, a transaction fee may be required by, e.g., a miner, to process and add the requested transaction on the blockchain.

As noted, when a reserve of SVCoin had been previously created but not yet distributed by the digital asset exchange system, S6608' may be implemented instead of S6608. At step S6608-*a*', digital asset exchange computer system may debit the designated fiat funds from a fiat ledger associated with the user account, and credit a corresponding amount of fiat to the SVCoin fiat ledger to be held in trust by the Exchange.

In step S6608-*b*', the digital asset exchange computer system may determines an appropriate amount of SVCoin from the reserve to satisfy the request.

In step S6608-*c*', the digital asset exchange computer system updates the SVCoin ledger to change the address associated with the portion of the reserve determined in step S6608*b*' to the address associated with the user.

In S6610, the digital asset exchange computer system may send a message to the registered user, and/or the designated digital asset address to reflect that the transaction was successfully processed. In embodiments, such messages may include information including: (i) digital asset address; (ii) the amount of tokens generated; and/or (iii) the new balances for the digital asset address.

Figure 66A:
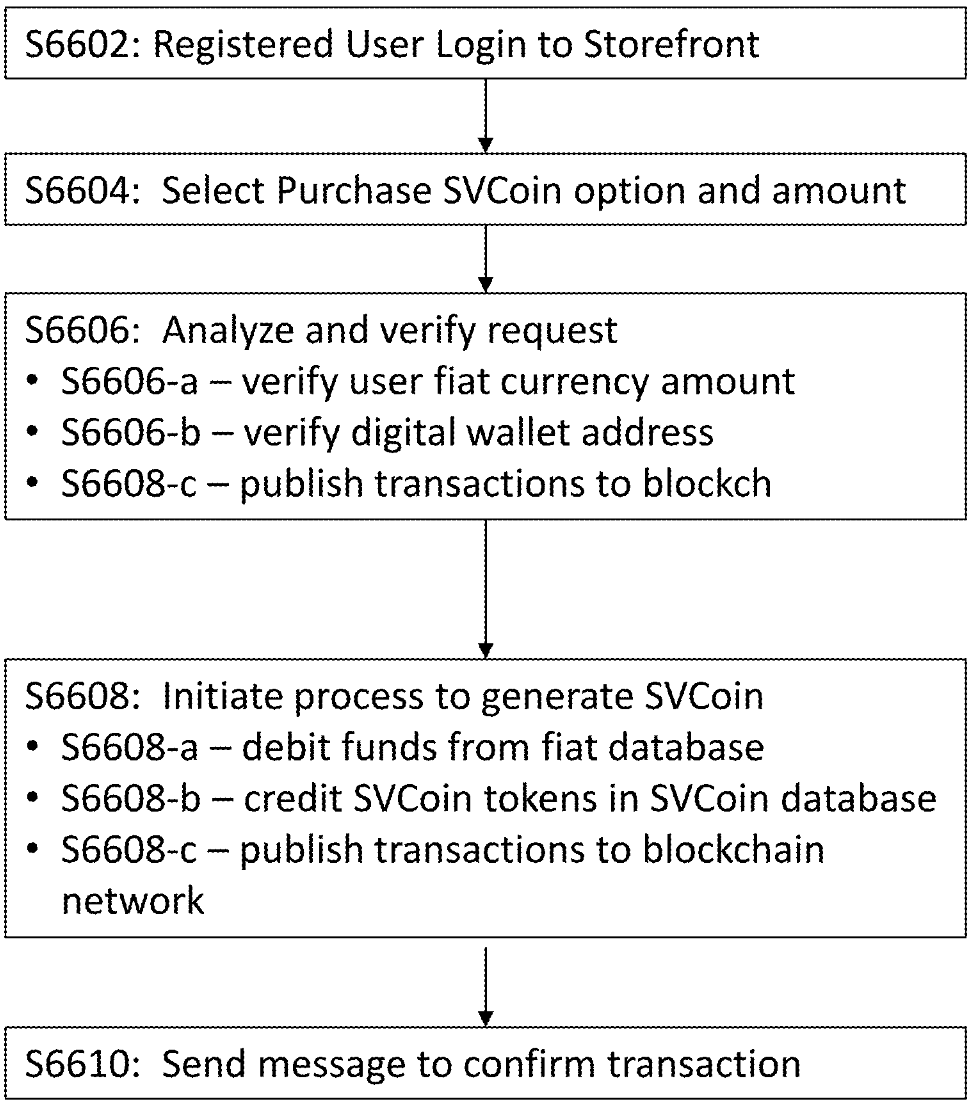
FIG. 66A is an exemplary flow chart of the process for purchasing SVCoin for fiat on a digital asset exchange in accordance with exemplary embodiments of the present invention.
Figure 66B:
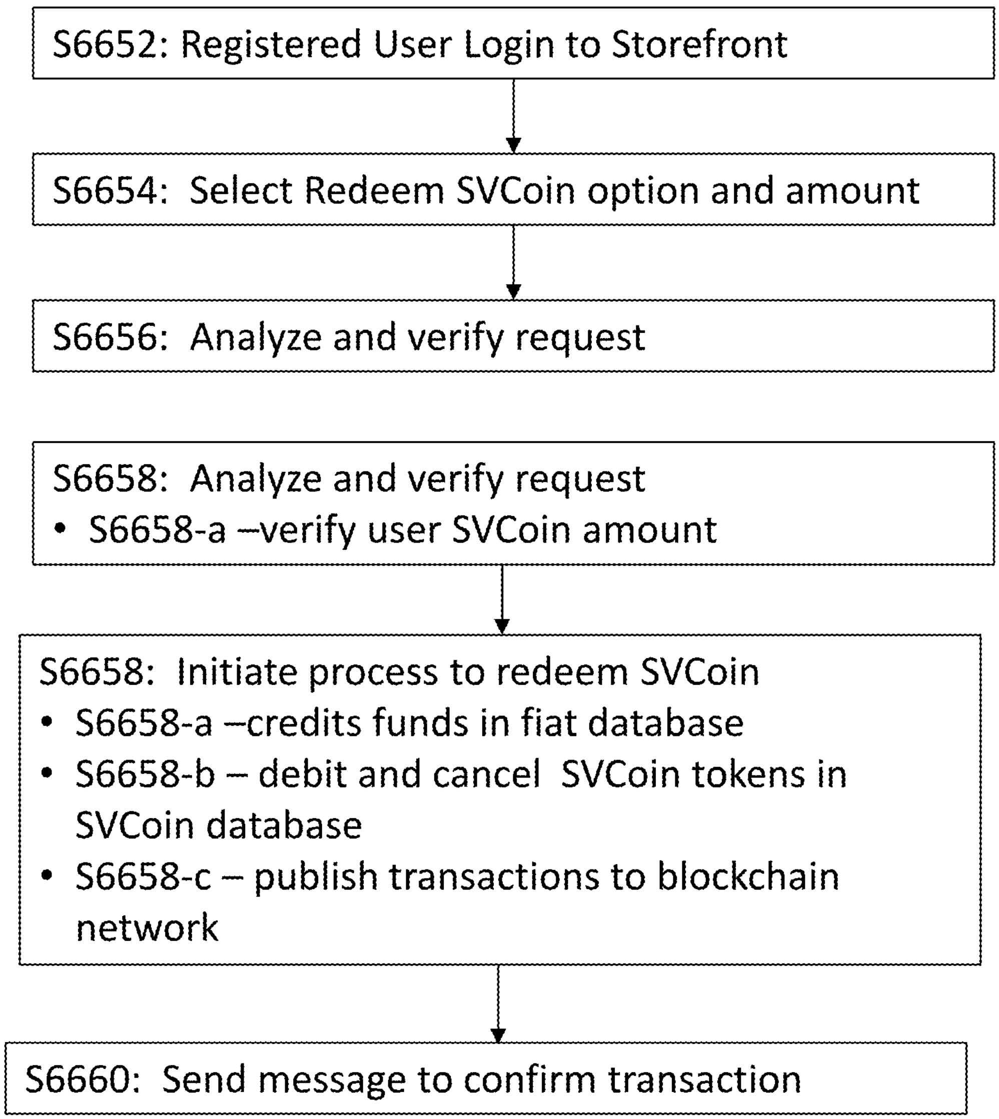
FIG. 66B is an exemplary flow chart of the process for redeeming SVCoin for fiat on a digital asset exchange in accordance with exemplary embodiments of the present invention.

In embodiments, a registered user may redeem SVCoins in exchange for fiat. Referring to FIG. 66B, in S6652, a registered user may log in to the dashboard SVCoin interface, such as illustrated in FIG. 65C-1 and FIG. 65C-2.

In S6654, the user selects the redeem SVCoin option, and specifies the amount of SVCoins the user seeks to redeem. In embodiments, the user may be requested to provide a digital wallet address, such as a digital wallet address associated with a blockchain digital asset, like ether. In embodiments, the amount of SVCoins may be specified by number of SVCoins, or by an amount of fiat. Since the SVCoins are pegged to the fiat in a stable amount (e.g., 1 SVCoin=1 USD, or 100 SVCoin=1 USD, to name a few), the system can automatically convert the requested amount of SVCoin to flat, or requested amount of fiat into SVCoin.

In S6656, the digital asset exchange system will analyze and verify that the request can be properly processed. In step S6656-*a*, the digital asset exchange system, as the SVCoin issuer, may verify that the user has sufficient SVCoin to cover the transaction as well as any transaction fees that may be charged. In embodiments, the digital asset exchange system may perform verification of the SVCoin balance by checking the token balance of the digital asset address against the SVCoin Token ledger as maintained by the digital asset blockchain. For example, a balance for a token issued based on the Ethereum Network may be checked at www.etherscan.io. If the user does not have sufficient SVCoin and/or an insufficient amount for transaction fees and/or provided an invalid digital asset address, to name a few, the transaction may be terminated.

In embodiments, SVCoin transactions may be published and recorded in a SVCoin token side ledger that is separate from an underlying blockchain (e.g., the Ethereum Blockchain). Such a side ledger may be provided using a sidechain, for example, a plasma chain, which is separate from the underlying digital asset blockchain that is maintained on the distributed network. In embodiments, this sidechain is used to record all transactions involving the SVCoin token and is maintained by the token issuer or another trusted entity on behalf of the token issuer. These transactions may then be subsequently published to the underlying digital asset blockchain periodically or aperiodically such that all transactions are publicly viewable and confirmable. In embodiments, with a blockchain supporting shielded transactions, the transactions in the SVCoin token may potentially be shielded and only viewable by authorized token holders. In embodiments, transactions on the sidechain may be consolidated prior to publication on the digital asset blockchain to increase speed of processing and reduce transaction costs.

The use of a sidechain in conjunction with a blockchain can provide certain technical advantages not otherwise available by either alone. For example, since all transactions on the sidechain are inevitably published to the digital asset blockchain, these transaction records enjoy the same benefit of immutability provided to all other transactions on the digital asset blockchain. However, use of a sidechain reduces both transaction costs and transaction times overall. Recording the transactions on the sidechain first can be accomplished more rapidly than transactions that are published directly to the digital asset blockchain, which must be confirmed prior to being added to the digital asset blockchain. In embodiments, the sidechain may simply be a database that records all transactions such that there is no need for miners to verify each transaction, and thus, no need to pay miners for this service. In this case, transaction costs are only incurred for the periodic or aperiodic publication of transfers from the sidechain to the underlying digital asset blockchain.

In embodiments, the database for the SVCoin tokens may be maintained as a separate side chain from the database for each Security token. In embodiments, one or more security tokens may be maintained in the same side chain as the SVCoin tokens, and/or by the same trusted entity system as used to maintain the SVCoin token database.

In S6658, after the digital asset exchange system may confirm that the user has sufficient SVCoin to cover the transaction, as well as any other designated criteria, the digital asset exchange system may initiate the process of redeeming the designated SVCoin.

In S6658-*a*, the digital asset exchange system redeems the designated SVCoin tokens, including updating the SVCoin token ledger database to reflect the debiting and cancelling of the designated tokens and debiting the corresponding digital wallet address associated with such redeemed SVCoin tokens. In embodiments, this process may be performed by generating a transaction on the digital asset exchange network from a contract digital wallet address or other authorized digital wallet address under the relevant SVCoin smart contract programming, to be sent in S6658-*c*, discussed below.

In S6658-*b*, the digital asset exchange system credits the designated fiat funds to a fiat ledger associated with the user account, and debit a corresponding amount of fiat from the SVCoin fiat ledger being held in trust by the exchange.

In S6658-*c*, the digital assert exchange system publishes to the blockchain network (e.g., the Ethereum Network) the transaction to be recorded by the blockchain network. In embodiments, a transaction fee (such as Gas) may be required by, e.g., a miner, to process and add the requested transaction on the blockchain. In embodiments, the transaction fee may be specified as an amount and/or an amount limit to facilitate the transaction being processed by a miner.

In S6660, the digital asset exchange computer system may send a message to the registered user, and/or the designated digital asset addresses to reflect that the transaction was successfully processed. In embodiments, such messages may include information including: (i) digital asset address; (ii) the amount of tokens redeemed; and/or (iii) the new balances for the digital asset address or digital wallet associated therewith.

Figure 32:
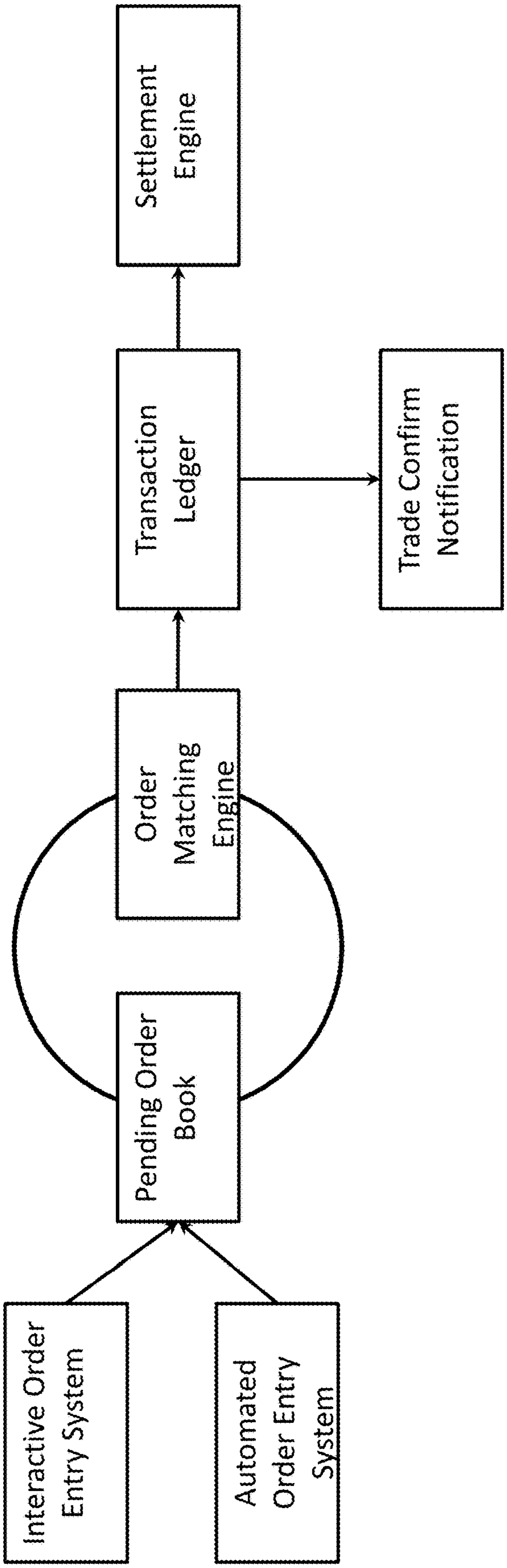
FIG. 32 is an exemplary schematic diagram of a digital asset exchange transaction system in accordance with exemplary embodiments of the present invention.
Figure 33:
FIG. 33 is an exemplary flow chart of operational transaction processes of a digital math-based asset electronic exchange in accordance with exemplary embodiments of the present invention.

FIG. 32 illustrates an exemplary embodiment of an exchange trading system in accordance with embodiments of the present invention. An interactive order entry system may provide one or more interfaces through which exchange customers may initiate exchange transactions. An automated order entry system may comprise one or more trading APIs that allow customer computer-initiated transactions. Orders may be electronically stored in an electronic pending order book. An exchange order matching engine, which can comprise a computer system, may match bids and asks or otherwise match buyers and sellers of pending transactions. A transaction ledger may track transactions. A settlement engine may process the transactions, which may include providing trade confirmations or otherwise carrying out the transactions.

In embodiments, a digital asset exchange may employ systems and methods to manage and/or reduce digital asset transaction change. Digital asset transaction change refers to leftover digital asset amounts from transactions in digital asset systems, such as Bitcoin, where the transactions are comprised of one or more digital inputs and outputs. A wallet stores unspent transaction outputs, which it can use as digital inputs for future transactions. In embodiments, a wallet or third-party system may store an electronic log of digital outputs to track the outputs associated with the assets contained in each wallet. In digital asset systems such as Bitcoin, digital inputs and outputs cannot be subdivided. For example, if a first wallet is initially empty and receives a transaction output of 20 BTC from a second wallet, the first wallet then stores that 20 BTC output for future use as a transaction input. To send 15 BTC, the first wallet must use the 20 BTC as an input, 15 BTC of which will be a spent output that is sent to the desired destination and 5 BTC of which will be an unspent output, which is transaction change that returns to the first wallet. A wallet with digital assets stored as multiple digital outputs can select any combination of those outputs for use as digital inputs in a spending transaction.

For transactions involving sending digital assets from exchange wallets to non-exchange wallets (e.g., when a user requests a withdrawal of digital assets from the user's exchange account), a digital asset exchange may employ systems and methods to reduce transaction change, e.g., to avoid a temporary decrease in liquidity due to the unavailability of funds during a transaction confirmation period, to which the change in systems such as Bitcoin is subject.

To manage and/or reduce transaction change, in embodiments, an exchange may maintain wallets containing varying sized digital outputs so that an output or combination of outputs can be selected as digital input for a transaction, where the total input amount can have a size either equal to or greater than but close to the transaction amount. Accordingly, the exchange may employ a wallet balancing module running one or more balancing algorithms on one or more processors to distribute digital assets to wallets in digital outputs of various sizes and various quantities of each size. These output sizes and quantities thereof may be predetermined and programmed into the wallet balancing module and/or may be adjusted algorithmically to better reduce transaction change in light of actual current or historical exchange transaction activity. Wallet balancing operations may be performed continuously, periodically throughout a day, once a day (e.g., at midnight), once a week, at some other interval, as balancing is required for one or more transactions, and/or as the wallet balancing module determines a wallet imbalance that exceeds a threshold tolerable imbalance. In embodiments, an exchange wallet balancing module may perform balancing operations after receiving a digital asset withdrawal request from a user and before transferring the digital assets to the user.

An exchange may also reduce transaction change by programming multiple outputs for a single transaction. In embodiments, digital asset withdrawals may be processed only at specified times or periodically, e.g., in the morning and in the evening. Such a system may facilitate batch processing of withdrawals using multiple digital transaction outputs. In embodiments, digital asset storage or protection services, such as insurance or storage warranties, may be offered through a digital asset exchange. Transaction insurance or warranties may also be offered, e.g., to guarantee an exchange transaction for a particular volume at a particular price.

Order Book Types

In embodiments of a digital asset exchange in accordance with the present invention, one or more types of order books may be used. For example, in embodiments, a digital asset exchange may feature central limit order books that follow a price-time priority model.

In embodiments, a continuous order book and/or auction order book may be used with any pair of digital assets and/or digital asset and fiat currency. For example, in embodiments the following trading pairs and order books may be available:

| | Continuous Order Book | Auction Order Book |
|---|---|---|
| BTC/USD | Yes | Yes |
| ETH/USD | Yes | Yes |
| ZEC/USD | Yes | Yes |
| ETH/BTC | Yes | No |
| ZEC/BTC | Yes | No |
| ZEC/ETH | Yes | No |

In the above example, BTC/USD is a pairing of Bitcoin with U.S. dollars, ETH/USD is a pairing of Ethers and U.S. Dollars and ETH/BTC is a pairing of Ethers and Bitcoin.

In embodiments, both a continuous order book and an auction order book may not be available, for example, an auction order book may not be available for an ETH/BTC pairing. In embodiments, however, an auction could be provided based on digital currency to digital currency pairings, such as ETH/BTC. In embodiments, other pairings may also be available such as other digital assets with other fiat currencies, or other digital asset pairs.

In embodiments, a digital asset exchange may operate during limited hours, or may operate 24 hours a day, seven days a week, except for brief maintenance periods.

In embodiments, clients may submit as many orders as desired with any of the execution options described below. Alternatively, in embodiments, the number of orders may be restricted.

In embodiments, a digital asset exchange may be a full reserve exchange in which all orders are fully funded. In full reserve exchange embodiments, a client's outstanding interest on orders books of the digital asset exchange cannot exceed their account balance at any time and all open orders reduce a client's available balance until such orders are fulfilled or canceled. In other embodiments, a digital set exchange may offer margin trading.

Order Types

In embodiments, a digital asset exchange may support the following order types and execution options:

| | Description | Specifies Price | Can Trade Against Resting Orders | Can Rest on Continuous Order Book | Can Trade in Auction |
|---|---|---|---|---|---|
| Market | Filled immediately against resting orders at the current best available price. | No | Yes | No | No |
| Limit | Filled at or better than a specified price. Any quantity that is not filled rests on the continuous order book until it is filled or canceled. | Yes | Yes | Yes | Yes |
| Limit: Immediate-or-Cancel (IOC) | Filled immediately at or better than a specified price. Any quantity that is not filled immediately is canceled and does not rest on the continuous order book. | Yes | Yes | No | No |
| Limit: Maker-or-Cancel (MOC) | Rests on the continuous order book at a specified price. If any quantity can be filled immediately, the entire order is canceled. | Yes | No | Yes | Yes |

-continued

| | Description | Specifies Price | Can Trade Against Resting Orders | Can Rest on Continuous Order Book | Can Trade in Auction |
|---|---|---|---|---|---|
| Limit: Auction-Only (AO) Limit | Rests on the auction order book and is filled at or better than a specified price at the conclusion of an auction. Any quantity that is not filled is canceled. | Yes | No | No | Yes |

In embodiments, the digital asset exchange may also support an order type that initiates a block trading workflow to source liquidity for large block quantities.

It will be appreciated that in embodiments, different combinations of order types may be available and in embodiments, additional order types may be available and some order types may not be available. In embodiments, order types may differ for pairings of digital assets and/or fiat currencies.

Continuous Order Book

In embodiments, a digital asset exchange may have a continuous book. The continuous book may support market orders and/or limit orders.

In embodiments, a continuous order book may be implemented, by way of example, in accordance with the following:

1. Alice places a limit order to buy 16.65 BTC at a price of 5885.65 USD.
2. Bob places a limit order to sell 21.84 BTC at a price of 5924.85 USD.
3. Both orders rest on continuous order book.

Limit Orders

In embodiments, limit orders have a side, a limit price in fiat (e.g. USD) and a quantity in digital asset (e.g., Bitcoin or Ether).

Execution Options

In embodiments, continuous book limit orders support the following execution options:

Option 1: Standard (Good Until Canceled)

The order may be filled in part or fully before being booked. The order will rest on the book until complete filled or cancelled.

Option 2: Immediate or Cancel

The order never rests on the book. The order is filled to the extent possible based on existing orders on the order book, and any remainder is cancelled.

Option 3. Market or Cancel

The order rests on the book to add liquidity. The order will be cancelled if any part of it would be filled immediately.

Market Buys in the Continuous Book

In embodiments, a continuous book may offer market buys. Market buys may be placed with a gross notional value in fiat (e.g., USD). A fee may be deducted from the gross amount. Market buys are filled against resting orders on the book. Any remainder to the order is cancelled when filled. As a circuit breaker, in embodiments, a threshold may be applied to a market buy, e.g., filling up a market buy up to a fixed percentage (e.g., 20%) or an aggregate amount (e.g., x digital assets or y fiat) against the market at time of order, with the remainder of the order being cancelled.

In embodiments, market buys in the continuous book may be implemented, by way of example, in accordance with the following:

1. Charlie wants to buy 5000 USD worth of bitcoin. He places a market buy order that is immediately filled against Bob's resting limit order to sell 21.849 BTC at a price of 5924.98 USD.
2. Charlie receives 0.84177499 BTC which his 4987.50 USD worth of BTC at the current market price of 5924.98 USD. 4968.50 USD is the net notional value of Charlie's market buy, which is the 5000 USD gross notional value of the market buy less his 12.50 USD fee.
3. Bob's limit sell continues to rest on the books with a remaining quantity of 21.007225 BTC.

Market Sells in the Continuous Book

In embodiments, a continuous book may offer market sells. Market sells are placed with a quantity in digital assets. As a circuit breaker, in embodiments, a threshold may be applied to a market sell, e.g., filing up a market sell up to a fixed percentage (e.g., 20%) or an aggregate amount (e.g., x digital assets or y fiat) against the market at time of order, with the remainder of the order being cancelled.

In embodiments, market sells in the continuous book may be implemented, by way of example, in accordance with the following:

1. David wants to sell 3 BTC at whatever the market price is. He places a market sell order that immediately crosses with Alice's resting limit order to buy 16.65 BTC at a price of 5885.65 USD.
2. David nets 17,612.81 USD form his market sell. 17,656.95 USD less his 44.14 USD fee.
3. Alice's limit buy continues to rest on the books with a remainder quantity of 13.65 BTC.

Priority of Matching on Continuous Book

In embodiments, the priority of matching orders resting on the books may be filled in using price time priority.

In embodiments, priority of matching orders resting on the books filled in using price time priority may be implemented, by way of example, in accordance with the following:

At T1: Alice places a limit order to buy 2 BTC at 5788.52 USD.

At T2: Charlie places a limit order to buy 0.5 BTC at 5788.58 USD

At T3: Bob places a limit order to buy 3 BTC at 5788.52 USD

At T4: David places a limit order to sell 5.25 BTC at 5788.50 USD

David's order then completely fills, crossing first with Charlie then Alice and then partially filling Bob's order, which was placed last time at an acceptable price. Because of price improvement, David's order fills at a higher price than his limit price.

TABLE 1

| PARTICIPANT | ORDER TIME | ORDER PRICE | FILLED QUANTITY | FILLED PRICE | RESTING QUANTITY |
|---|---|---|---|---|---|
| ∨ David | X + 3 | 5788.50 USD | 0.5 BTC | 5788.55 USD | 4.75 BTC |
| ∧ Charlie | X + 1 | 5788.55 USD | 0.5 BTC | 5788.55 USD | 0 BTC |
| ∧ Alice | X | 5788.52 USD | 0 BTC | 5788.52 USD | 2 BTC |
| ∧ Bob | X + 2 | 5788.52 USD | 0 BTC | 5788.52 USD | 3 BTC |

TABLE 2

| PARTICIPANT | ORDER TIME | ORDER PRICE | FILLED QUANTITY | FILLED PRICE | RESTING QUANTITY |
|---|---|---|---|---|---|
| ∨ David | X + 3 | 5788.50 USD | 2 BTC | 5788.52 USD | 2.75 BTC |
| ∧ Alice | X | 5788.52 USD | 2 BTC | 5788.52 USD | 0 BTC |
| ∧ Bob | X + 2 | 5788.52 USD | 0 BTC | 5788.52 USD | 3 BTC |

TABLE 3

| PARTICIPANT | ORDER TIME | ORDER PRICE | FILLED QUANTITY | FILLED PRICE | RESTING QUANTITY |
|---|---|---|---|---|---|
| ∨ David | X + 3 | 5788.50 USD | 2.75 BTC | 5788.52 USD | 0 BTC |
| ∧ Bob | X + 2 | 5788.52 USD | 2.75 BTC | 5788.52 USD | 0.25 BTC |

TABLE 4

| PARTICIPANT | ORDER TIME | ORDER PRICE | RESTING QUANTITY |
|---|---|---|---|
| ∧ Bob | X + 2 | 5788.52 USD | 0.25 BTC |

In embodiments, resting limit order could also be filled on a continuous book in price-time priority.

In embodiments, resting limit order filled on a continuous book in price-time priority may be implemented, by way of example, in accordance with the following:

1. At time X+1, Charlie's resting limit buy order for 0.5 BTC at $5,786.55 is filled.
2. At time X, Alice's resting limit buy order for 2 BTC at 5788.52 USD is completely filed.
3. At time X+2, Bob's resting limit buy order for 3 BTC at 5788.52 US is partially filed for 2.75 BTC, 0.25 BTC remains resting on the book.

Auctions

Auction Order Book

In embodiments, a digital asset exchange may have an auction order book. In embodiments, the auction order book is blind but the public auction events contain information that allows market participants to understand when there is an imbalance of buy or sell interest. In embodiments, the auction order book supports auction-only (AO) market and limit orders. These orders rest until the auction runs, at which time the orders will be either filled or cancelled. In general, self-trading should not be not allowed. An incoming order that would cross with a resting order on the auction book from the same account is cancelled.

In embodiments, a digital asset exchange in accordance with the present invention may conduct auctions for certain trading pairs periodically (e.g., every day (including weekends and holidays)) and/or aperiodically (e.g., specific announced times, which may be irregular). Such auctions offer a technical advantage of fostering moments of elevated liquidity and price discovery.

In embodiments, auctions may be implemented, by way of example, in accordance with the following representative schedules:

BTC/USD AUCTION SCHEDULE

| New York | 8 am | 3:50 pm | 3:51-3:59 pm | 3:59 pm | 3:59:15-3:59:45 pm | 4 pm |
|---|---|---|---|---|---|---|
| UTC (EDT) | 12:00 | 19:50 | 19:51-19:59 | 19:59 | 19:59:15-19:59:45 | 20:00 |
| UTC (EST) | 13:00 | 20:50 | 20:51-20:59 | 20:59 | 20:51:15-20:59:45 | 21:00 |

-continued

| BTC/USD AUCTION SCHEDULE | | | | | | |
|---|---|---|---|---|---|---|
| SGT/HKT | 11 am | 6:50 pm | 6:59 pm | 6:59 pm | 6:59:45 pm | 7 pm |
| JST | 12:00 | 19:50 | 6:51- 19:50- 19:59 | 19:59 | 6:59:15- 19:50:15- 19:59:45 | 20:00 |
| UTC | 03:00 | 10:50 | 10:51- 10:59 | 10:59 | 10:59:15- 10:59:45 | 11:00 |
| | Begin accepting orders for auction. | First auction simulation runs. First indicative price is published via API and website UI. | The auction simulation is repeated and the indicative price is published every minute. | Auction-Only (AO) Limit orders may no longer be canceled but may still be placed. | The auction simulation is repeated and the indicative price is published every 15 seconds. | Auction runs. Auction-Only (AO) Limit orders are filled or cancelled. If successful, auction results are published as a bulk trade via API and website UI.5 |

| ETH/USD AUCTION SCHEDULE | | | | | | |
|---|---|---|---|---|---|---|
| New York | 8 am | 3:50 pm | 3:51- 3:59 pm | 3:59 pm | 3:59:15- 3:59:45 pm | 4 pm |
| UTC (EDT) | 12:00 | 19:50 | 19:51- 19:59 | 19:59 | 19:59:15- 19:59:45 | 20:00 |
| UTC (EST) | 13:00 | 20:50 | 20:51- 20:59 | 20:59 | 20:51:15- 20:59:45 | 21:00 |
| | Begin accepting orders for auction. | First auction simulation runs. First indicative price is published via API and website UI. | The auction simulation is repeated and the indicative price is published every minute. | Auction-Only (AO) Limit orders may no longer be canceled but may still be placed. | The auction simulation is repeated and the indicative price is published every 15 seconds. | Auction runs. Auction-Only (AO) Limit orders are filled or cancelled. If successful, auction results are published as a bulk trade via API and website UI. |

| ZEC/USD AUCTION SCHEDULE | | | | | | |
|---|---|---|---|---|---|---|
| New York | 8 am | 3:50 pm | 3:51- 3:59 pm | 3:59 pm | 3:59:15- 3:59:45 pm | 4 pm |
| UTC (EDT) | 12:00 | 19:50 | 19:51- 19:59 | 19:59 | 19:59:15- 19:59:45 | 20:00 |
| UTC (EST) | 13:00 | 20:50 | 20:51- 20:59 | 20:59 | 20:51:15- 20:59:45 | 21:00 |
| | Begin accepting orders for auction. | First auction simulation runs. First indicative price is published via API and website UI. | The auction simulation is repeated and the indicative price is published every minute. | Auction-Only (AO) Limit orders may no longer be canceled but may still be placed. | The auction simulation is repeated and the indicative price is published every 15 seconds. | Auction runs. Auction-Only (AO) Limit orders are filled or canceled. If successful, auction results are published as a bulk trade via API and website UI. |

In embodiments, the auction order book may have time constraints, so that auction order windows may only be placed within a specified time window. Thus, the auction order book for a given auction may open a set time period in advance of the auction (e.g., 8 hours before the auction begins), as the opening of the auction order window. For example, if an auction is set to begin at 4:00 p.m. Eastern Standard Time, the Auction could begin at 8:00 a.m. Eastern Standard Time, as illustrated above.

In embodiments, once an auction window opens, auction-only order may not be cancelled after the final indicated price has been published, e.g., one minute before the auction runs. In the above example, that would be 3:59 p.m.

In embodiments, auction-only orders may be accepted up until the auction runs.

In embodiments, auction only orders placed outside of the auction order window may be rejected.

Auction Event

In embodiments, at a set time period before the auction begins, e.g., 10 minutes, an indicative auction event window may be opened. An indicative auction event is a simulation of what would happen if the auction ran at that point in time. In embodiments, an indicative auction uses the same pricing algorithm as the final auction price determination. In embodiments, although the auction order book is blind, indicative auction events show when there is a buy/sell interest imbalance so participants may adjust their orders.

During an indicative auction window, indicative results may be published at set time intervals, such as once a minute, twice a minute, four times a minute, to name a few, and will continue to be published until the indicative auction window closes. In embodiments, the indicative auction window will not close until the auction is run.

In the example above, for an auction beginning at 4:00 p.m. Eastern Standard Time, an indicative auction window may be opened 10 minutes prior at 3:50 p.m. Eastern Standard Time. Indicate results are published once a minute starting at the opening of the indicative auction window at 3:50 p.m. Eastern Standard Time, 10 minutes before the 4:00 p.m. auction. Starting at one minute before the auction window, 3:59 p.m. Eastern Standard Time, the indicative price may be published every 15 seconds. An indicative auction window will close when the auction window opens at 4:00 p.m., with the last indicative price published at 3:59:45 p.m. Eastern Time. Of course, other time periods can be used to set the opening and closing of the indicative auction windows and one or more intervals of publication can be used in that windows.

Figure 55:
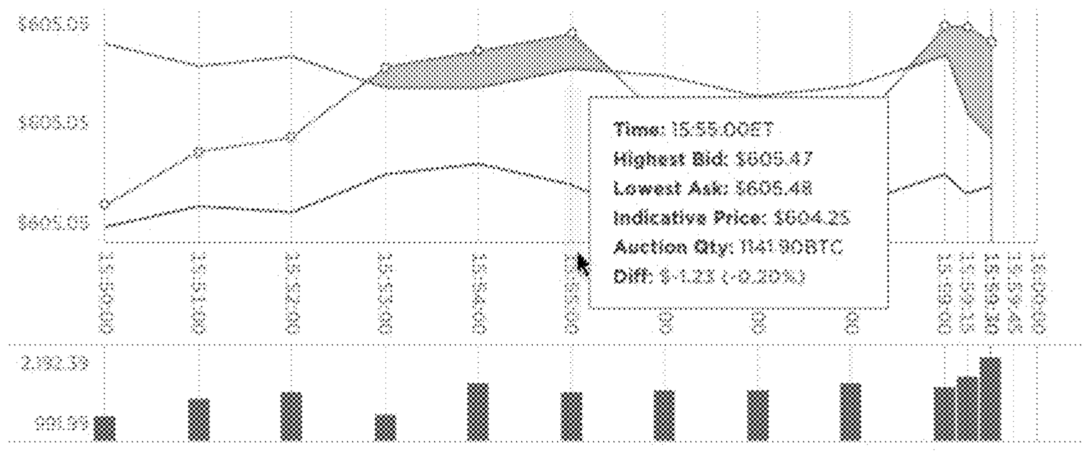
FIG. 55 illustrates an example of indicative auction results as may be published during an indicative auction window.

FIG. 55 illustrates an example of indicative auction results as may be published during an indicative auction window.

In embodiments, the final auction run at a final auction run time, e.g., 4:00 p.m. Eastern Standard Time in the above examples. In embodiments, at the final auction run time, no more orders on the continuous or auction order books are accepted. In embodiments, the midpoint of the best bid and best ask from the auction price will be taken as the auction collar price. In embodiments, an index value may be taken as the auction collar price.

The final auction price for every auction is established as the price that executes the greatest aggregate quantity and minimizes the imbalance between buy and sell orders across both the auction and continuous order books. The imbalance is defined as the absolute value of the difference between total buy orders and total sell orders at a given price across both the auction and continuous order books. Other pairings and timings may be used in accordance with the embodiments of the present invention.

Within this auction design, the market is open to accepting orders until the time the auction algorithm runs.

Limit Orders for Auctions

In embodiments, limits order may be placed in auctions. Typically, limit orders have a side (e.g., buy or sell), a limit price in fiat (e.g., USD), and a quantity in digital asset (e.g., BTC).

In embodiments, once a limit order is placed for an auction, the order will rest until the auction runs and the auction window closes.

In embodiments, if the auction succeeds, limit orders will be filled based on:

1. Price-time priority; and
2. If the auction price is equal to the limit price or a price improvement (auction price is lower than the limit buy order or higher than the limit sell order).

Market Orders for Auctions

In embodiments, auction-only market buys and sells are like their continuous book counterparts except that they will rest on the book until they are cancelled or the auction runs. If the auction succeeds, auction-only market orders may be filled according to time priority, unlike in the continuous book where market orders are filled immediately. Although uncommon, auction-only market orders may be partially filled or even unfilled. This can happen when the auction has an unusually large buy-sell interest imbalance.

Auction Example

In the example below, there are two prices, $99 and $100, that will execute the greatest aggregate quantity across both the auction and continuous order books, which is 30. However, at the $99 price, the imbalance between buy and sell orders is greater than it is at the $100 price. As a result, the final auction price will be $100 because this price executes the greatest aggregate quantity and minimizes the imbalance between buy and sell orders across both the auction and continuous order books.

Priority Of Limit Orders

| Price | Total Buy Interest | Total Sell Interest | Auction Quantity | Imbalance |
|---|---|---|---|---|
| $98 | 100 | 10 | 10 | 90 |
| $99 | 60 | 30 | 30 | 30 |
| $100 | 30 | 30 | 30 | 0 |
| $101 | 10 | 60 | 10 | 50 |
| $102 | 0 | 100 | 0 | 100 |

In embodiments, all limit orders at the same specified price are treated equally and executed in the order in which they were received. Partially filled resting limit orders retain their priority until canceled.

Auction Methodology

In embodiments, a Walrasian auction that seeks to identify the price with the greatest aggregate quantity may be employed. In such embodiments, each possible price is tested summing up buy and sell quantities. The price that would execute the greatest possible "wins" may be selected. In embodiments, in the event of a tie between two or more prices that would execute the same quantity, the exchange may select the price that minimizes the imbalance between the buy and sell orders across the auction order book and/or the auction and continuous order books. In embodiments, in the event of a tie between two or more adjacent prices that would execute the same quantity, the auction price may be the midpoint of the two adjacent prices. In embodiments, in the event of a tie between two or more adjacent prices that would execute the same quantity, the auction price may be the price that is closest to the collar price. In the event that the two prices are equally close to the collar price, the auction price may be the midpoint of the two prices.

In embodiments, the auction price is established as the price that executes the greatest aggregate quantity (i.e. auction quantity) across both the auction-only and continuous order books. It is possible that there is not an exact match between buy and sell interest at this price, and so some orders will partially filled or not be filled at all. Auction-only market orders may be filled by time priority. To avoid time conflicts, the market may be paused for a brief period (e.g., milliseconds) while the final price, quantity, and controls are calculated.

In embodiments, in order to provide the most liquidity to the marketplace, resting limit orders on the continuous order book may be used in the auction price and quantity calculations. In embodiments, for a resting limit order to be eligible for inclusion, the auction price must be equal to or better than the resting limit price (less than or equal to for bids, or greater than or equal to for asks). Resting limit orders on the continuous order book may be filled according to time priority and are subject to improvements in price.

In embodiments, the auction may fail if an equilibrium cannot be achieved, for example, if the auction quantity is zero. A zero auction quantity could occur when no auction orders are received, or if only one-way auction orders are received (e.g., buy only or sell only orders). In embodiments, a collar may also be placed on the auction. For example, a collar may be placed on the auction price, by using fixed percentage (e.g., 1 percent, 5 percent, 10 percent) of a benchmark against the continuous book price at given time period or set of time period. In embodiments, the benchmark could be a midpoint of the spot price of the continuous book price at the given time period—e.g., auction price. In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, digital asset exchange computer system 3230 may set a collar for the auction trade, including a collar minimum and a collar maximum. First, the digital asset exchange computer system 3230 may access, from at least a first database stored on a computer readable medium operatively connected to the digital asset computer system, pricing data associated with the first pair at a predefined time associated with a time of the auction trade order. In embodiments, pricing data can include a spot price. In embodiments, a pricing data may be based on the last transaction immediately prior to the auction. In embodiments, a pricing data may be based on an average of the most recent bid/ask price for the digital asset. In embodiments, the pricing data may be set based on a blended digital asset price as discussed elsewhere herein. For example, a single exchange digital asset price could be determined based on a volume weighted average and/or time weighted average of recent digital asset pricing. In embodiments, a blended digital asset price may be based on a pricing from digital assets taken from a plurality of exchanges (such as qualified exchanges). In embodiments, pricing data may be a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed. The digital asset exchange computer system 3230 may calculate a collar minimum for the auction based on the pricing data less an amount equal to a first percentage of the pricing data, and a collar maximum for the auction based on the pricing data plus an amount equal to the first percentage of the pricing data. Thus, a collar may be based on a spot price at the time for the auction, plus or minus a defined range, such as a percentage of the spot price or other pricing data. In embodiments, the collar could be set using percentages such as 1%, 2%, 3%, 5%, 10/o of the spot price or other pricing data, to name a few. By way of illustration, if a 5% collar is used with a spot price of 1 BTC=USD$10,000, the collar would be set at between USD$9,500 and USD$10,500.

Accordingly, in embodiments, in substep S5604*a*, the digital asset exchange computer system 3230 may retrieve a current pricing information (e.g., bid/ask price) from continuous trading order book 5702*a* associated with a first digital asset pairing and establish a spot price for the first digital asset pairing. As noted above, in embodiments, the spot price may be the average of the current bid/ask price or may be the price used in the last transaction in the continuous trading book, to name a few. In embodiments, the spot price may be a blended digital asset price, in which one or more different order books from one or more digital asset exchanges or index databases may be required to be access to obtain such price. In embodiments, the blended digital asset price may be obtained by being calculated and/or by accessing a blended digital asset price database (not shown). In substep S5604*b*, the digital asset exchange computer system may establish the collar, for example, based on adding/subtracting a fixed percentage of the spot price to the spot price as discussed above, for example.

In embodiments, the collar may be a blended digital asset price consisting of 4 digital asset exchanges' executed trade data for a 10 minute period volume weighted with 5% of the highest priced trades and 5% of the lowest priced trades removed.

In embodiments, the digital asset exchange computer system 3230 may determine whether the price in the auction is within the limits of the collar determined above (e.g., at or above the collar minimum and at or below the collar maximum).

In embodiments, if the final auction price falls outside the collar, the auction may also fail.

In embodiments, in the event auction fails, the exchange may cancel all the auction-only orders unfilled, close the auction and/or publish as market data for the auction that it failed, either with or without a reason for such failure. In embodiments, where the auction fails because the final auction price falls outside the collar, the price and quantity of the auction that would have otherwise been executed may be published as part of the market data, with an indication that the auction failed.

In embodiments, if the event auction succeeds, the digital asset exchange may fill all eligible auction only and/or continuous book order by strict time priority. In embodiments, continuous book orders may not be filled. The digital asset exchange may also notify the market participants whose orders were filled, such as through the alert system discussed herein. In embodiments, the digital asset exchange may also notify the market participants whose orders were not filled, such as through the alert system discussed herein. The digital asset exchange may also cancel all remaining unfilled and partially filled auction-only orders to the extent such partially filled auction-only orders remain unfiled. The digital asset exchange may then close the auction order book for this auction window. In embodiments, the digital asset exchange may published a market data auction event showing the outcome of the auction, through, e.g., an API or other electronic publication. In embodiments, historical trades may show a bulk trade event for the auction volume. In embodiment, normal operations, such as continuous order book trading, may resume once the auction process is completed.

In embodiments, in addition to publishing the final auction price and whether or not it failed, the collar price may also be published as part of an API or other electronic publication.

Market Place Controls

In embodiments, marketplace controls may be put in place in an effort to foster a fair and orderly market. Examples of marketplace controls can include one or more of the following:

- Orders: Automatic cancellation of any order, or the remaining portion of any order, on a continuous order book that would move the market price by more than a defined percentage (e.g., 20%) in either direction, as compared to the prior prevailing market price;
- Auctions: Automatic cancellation of an auction if the final auction price deviates from the collar price by more than five percent in either direction at the time the auction runs, and
- Self-trade prevention: a digital asset exchange may prohibit a client from crossing with itself on a continuous order book or with itself on an auction order book.

In embodiments, other controls may be put in place consistent with the present invention.

Clearly Erroneous Transaction Policy

A digital asset exchange may, in embodiments, declare a transaction null and void when it is determined to be clearly erroneous.

Marketplace Disruptions

Errors or disruptions may occur on an exchange during the order entry, order matching, or trading process. In embodiments, if any such errors or disruptions occur, the digital asset exchange may cancel any order and/or reverse any trade, in whole or in part.

Market Data

In embodiments, the results of each auction may be made available as pricing data for a digital asset though, e.g., an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage.

In embodiments, auction order book data may not be publically available. In embodiments, auction order book data may be available with a time delay after each auction completes through, e.g., an API. In embodiments, auction data, like other digital asset pricing data, may be used an input to a blended digital asset price, or other index or benchmark.

In embodiments, a digital asset exchange may publish market data using APIs, such as public REST APIs and private REST APIs. Public REST APIs may provide market data such as: current order book, recent trading activity and/or trade history, to name a few. Private REST APIs allows participants to manage both orders and funds, by for example, placing and/or cancelling orders, viewing active orders, viewing trading history and/or trade volume, retrieving available balances, to name a few.

Notifications

In embodiments, individual auction-only and continuous order book market participants may be notified their order has been filled via an email, sms, push notification, or other message and/or a status update on their activity feed. In embodiments, the same alerting system may be used for continuous order book execution.

Decentralized Digital Asset Exchange

Figure 34A:
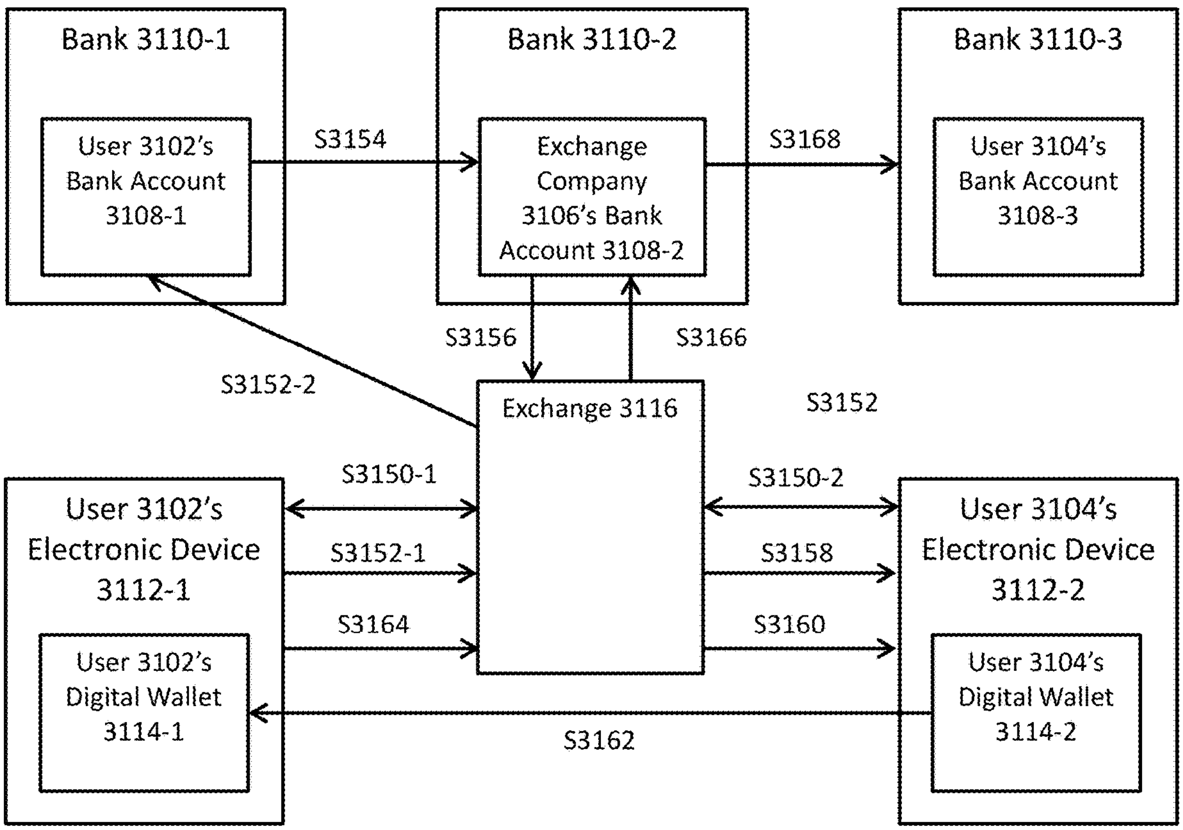
FIGS. 34A-B are a schematic diagram and corresponding flow chart showing participants in and processes for a digital asset exchange system in accordance with exemplary embodiments of the present invention.
Figure 34B:
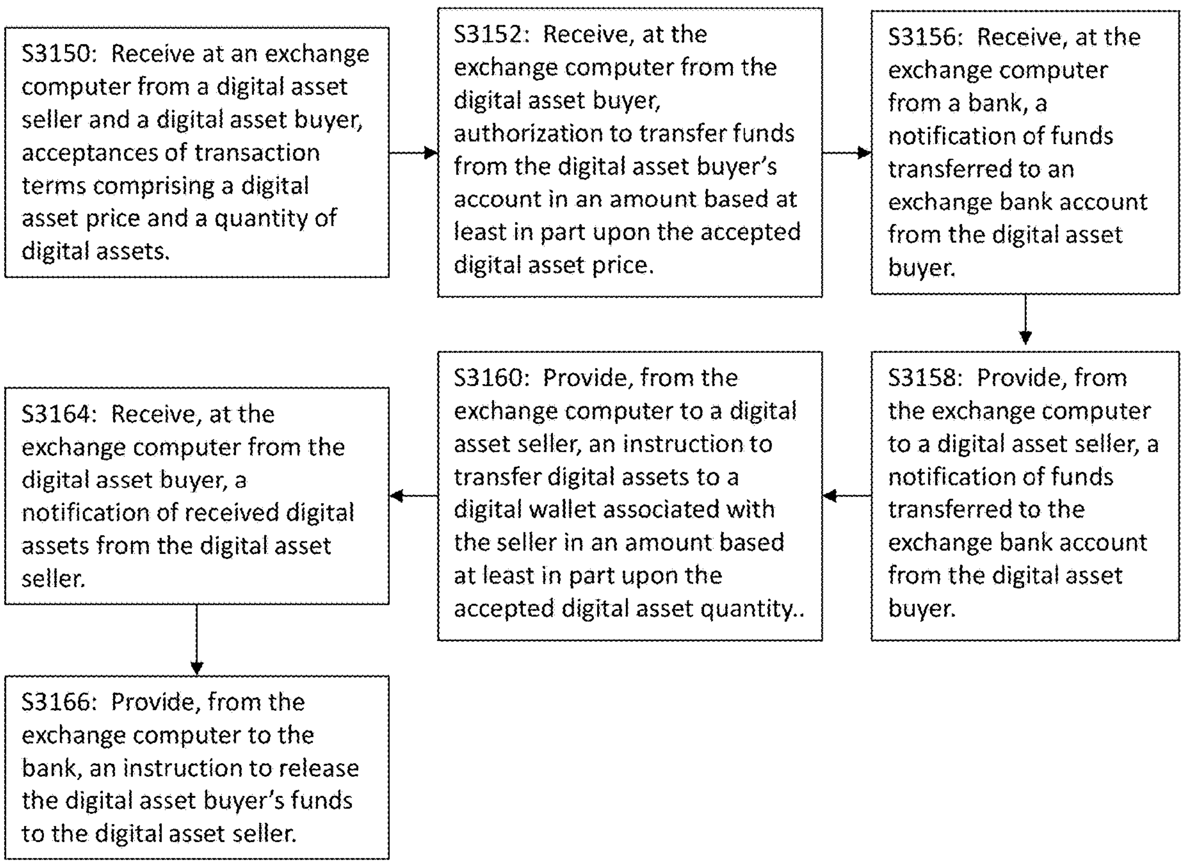

FIGS. 34A-B are a schematic diagram and corresponding flow chart showing participants in and processes for a digital asset exchange system in accordance with exemplary embodiments of the present invention. A digital asset exchange may provide conversions among digital math-based assets and fiat currencies. In embodiments, conversions may be performed between differently denominated digital math-based assets. In embodiments, a digital asset exchange may facilitate the buying and selling of digital assets in exchange for other digital assets, non-digital assets, fiat currencies, or other financial instruments. The parties to such a transaction may be individuals, organizations, and or institutions. In embodiments, the exchange itself or its operator or owner may be the counter-party to an exchange transaction.

FIG. 34B is a flow chart corresponding to the digital asset exchange system illustrated in FIG. 34A. In a step S3150, one or more exchange computers comprising an exchange computer system may receive from a digital asset buyer acceptances of transaction terms comprising a digital asset price and a quantity of digital assets.

In a step S3152, the exchange computer system may receive from the digital asset buyer authorization to transfer funds from the digital asset buyer's account in an amount based at least in part upon the accepted digital asset price.

In a step S3156, the exchange computer system may receive from a bank, a notification of funds transferred to an exchange bank account from the digital asset buyer.

In a step S3158, the exchange computer system may provide to a digital asset seller a notification of funds transferred to the exchange bank account from the digital asset buyer.

In a step S3160, the exchange computer system may provide to a digital asset seller, an instruction to transfer digital assets to a digital wallet associated with the seller in an amount based at least in part upon the accepted digital asset quantity. In embodiments, the digital asset seller may transfer digital assets to a digital wallet associated with (e.g., owned by and/or operated by) the exchange. The exchange may hold such funds in escrow until the buyer's payment is received, e.g. into a bank account (for fiat currencies) or into a digital wallet (for other digital assets).

In a step S3164, the exchange computer system may receive from the digital asset buyer a notification of received digital assets from the digital asset seller.

In a step S3166, the exchange computer system may provide to the bank, an instruction to release the digital asset buyer's funds to the digital asset seller.

In another embodiment, the exchange can act as a counter-party to transactions where digital assets are bought and/or sold for a differently denominated digital asset or a fiat currency. In embodiments, the system illustrated in FIG. 34A can be used to perform exchange transactions with multiple counter-parties. An exchange computer system may identify a digital asset seller and a plurality of buyers. The exchange computer system may determine, obtain, or receive (e.g., from computers, digital asset kiosks, or user electronic devices associated with the buyers) public addresses of digital asset wallets associated with the buyers. The exchange computer system may also determine, obtain, or receive digital wallet information (e.g., public address, public key, and/or private key) associated with the seller. In embodiments, wallet information of any exchange participant may be stored by the exchange computer system in one or more databases, which may be accessed as part of a transaction. A participant in an exchange transaction may also input (e.g., via downloadable software or a website associated with the exchange) and/or otherwise transmit to the exchange required digital wallet information from which to send or in which to receive digital assets. The exchange computer system may use the digital wallet information of the exchange transaction participants to generate transaction instructions. For example, the exchange computer system may pre-program instructions to transfer a certain amount of digital assets from the seller wallet to each buyer wallet. The exchange computer system may also input the digital wallet access credentials (e.g., a public and private key) so that the transaction may proceed.

Lending of Digital Assets

The present invention relates to methods, systems and program products for lending digital assets, such as crypto currency, and related products.

The present invention creates a process where digital assets may be lent for a set period of time ("loan duration" or "duration") based on an agreed interest rate ("interest rate") through a competitive bidding process. In embodiments, rather than using an agreed interest rate, an agreed payment amount for the loan may be used. In embodiments, examples of loan duration may include, e.g., 1 day, 1 week, 2 weeks, 1 month, 3 month, 6 month, 12 month, periods to name a few. Other loan durations may also be selected consistent with exemplary embodiments of the present invention.

In order to define a market for loaning of digital assets, one or more order books may be set up on a digital asset exchange, such as Gemini, Coinbase, to name a few. In embodiments, a regulated digital asset exchange may be preferred. In embodiments, the digital asset exchange, or other platform, may be maintained by as a trust company, a regulated trust company, a bank, a broker dealer, or some other form of entity, to name a few. In embodiments, the computer systems operated by entities involved in the process may be provided at the same data center and/or may have fast interconnections to provide for more efficient and timely transactions. In embodiments, a FIX order message system, cross connect message system and/or a third party order management system provider, to name a few, may be used to send and enter orders.

In embodiments, the use of surveillance technologies, such as NASDAQ Smart surveillance technologies, such as used by Gemini, is also preferred.

In embodiments, order books may take various forms, such as continuous order books, auction order books, block trading order books, to name a few. For a detailed description of such order books, please see U.S. patent application Ser. No. 15/920,042, filed Mar. 13, 2018 and entitled SYSTEMS, METHODS, AND PROGRAM PRODUCTS FOR VERIFYING DIGITAL ASSETS HELD IN A CUSTODIAL DIGITAL ASSET WALLET, U.S. patent application Ser. No. 15/973,175, filed May 7, 2018 and entitled SYSTEMS, METHODS, AND PROGRAM PRODUCTS FOR EXCHANGING DIGITAL ASSETS FOR FIAT AND/OR OTHER DIGITAL ASSETS and U.S. patent application Ser. No. 15/973,140, filed May 7, 2018 and entitled SYSTEMS, METHODS, AND PROGRAM PRODUCTS FOR EXCHANGING DIGITAL ASSETS FOR FIAT AND/OR OTHER DIGITAL ASSETS, which are hereby incorporated by reference as if fully set forth herein.

In embodiments, a digital asset computer system may be used to lend digital assets. In embodiments, digital assets may be lent via a digital asset computer system using a continuous order book. In other embodiments, digital assets may be lent via a digital asset computer system using an electronic auction. In alternate embodiments, digital assets may be lent via a digital asset computer system using a block trade order book. In embodiments an over the counter (OTC) order book may be used.

Lending of Digital Assets Using a Continuous Order Book

In embodiments, digital assets may be lent via a digital asset computer system using a continuous order book. FIGS. 61A-B shows an exemplary process for the loaning of digital assets by a digital computer system. In a step S6100, a digital asset computer system comprising one or more computers, the digital asset computer system being operatively connected to a decentralized digital asset network that uses a decentralized ledger in the form of a blockchain maintained by a plurality of physically remote computer systems to track at least one of asset ownership or transactions in a digital asset system, one or more exchange account databases stored on non-transitory computer-readable memory and comprising a plurality of exchange accounts, provides digital asset account information for a respective exchange account and user authentication data.

In a step S6101, the digital asset computer system receives, a deposit of digital assets to at least a first respective exchange account, from a first digital asset account, through use of a first digital asset account identifier associated with the first respective exchange account, where the deposit is recorded on the decentralized electronic ledger.

In a step S6102, the digital asset computer system provides a loan order database associated with a first digital asset and a first duration period, stored on the non-transitory computer-readable memory comprising at least a digital asset borrow order information comprising for each borrow order: borrow order identification information, borrow order digital asset quantities and corresponding borrow order interest rates and digital asset lend order information comprising for each lend order: lend order identification information, lend order digital asset quantities and corresponding lend order interest rates. In embodiments, the borrow order information and/or lend order information may include user identifications information, a time stamp, a credit score associated with the borrower or lender, margin information related to the borrower or lender and account balance information, to name a few.

In a step S6103, the digital asset computer system provides an electronic ledger comprising digital asset account balance data for each of the exchange accounts.

In a step S6104, the digital asset computer system receives, from a first user electronic device associated with a first user associated with a first exchange account, a first electronic digital asset borrow order comprising first borrow order information comprising a first borrow order digital asset quantity and a corresponding first borrow order interest rate.

As shown in FIG. 61B, in a step S6105, the digital asset computer system stores the first electronic digital asset borrow order information in the loan orders database.

In a step 6106, the digital asset computer system receives, from a second user electronic device associated with a second user associated with a second exchange account, a first electronic digital asset lend order comprising first lend order information comprising a lend order digital asset quantity from the deposit of digital assets and a corresponding lend order interest rate. In embodiments, step S6106 may occur either before or after step S6104. Thus, by way of example, in embodiments, a lend order may be received before a borrow order or a borrow order may be received before a lend order. Similarly, in embodiments, more than one lend order may be received before more than one borrow order, and vis-versa. Further, in embodiments, more than one lend order and/or more than one borrow order may be received in any order prior to matching in Step S6109, as discussed below. Thus, in embodiments, the digital asset system may store the first electronic asset lend order in the loan order database in step S6105.

In a step S6107, the digital asset computer system verifies that the first digital asset account balance data indicating a first digital asset account balance of a lender digital asset account associated with the second exchange account at least equals the lend order digital asset quantity.

In embodiments, the digital asset computer system may allow lenders to lend assets on margin. For example, the lender may be permitted to lend digital assets that are not already included in its account on the lender. In such case, the digital asset computer system may verify that the lender has sufficient assets to cover the value of the digital assets to be lent, wherein the assets may include fiat, digital assets or any other asset. In embodiments, the digital asset computer system, may verify the lender has sufficient credit, even without holding sufficient assets in the digital asset computer system, to go forward with the transaction.

In a step S6108, the digital asset computer system stores the first electronic digital asset lend order information in the loan orders database. In the case where the lend order is received before the borrow order, the first electronic digital asset borrow order may be stored in the loan order database at step S6108.

In embodiments, the digital asset computer system may receive a plurality of electronic digital asset lend orders and a plurality of electronic digital asset borrow orders. In embodiments the electronic digital asset lend order information and the electronic digital asset borrow order information from the plurality of borrow orders and lend orders is stored in the loan order database.

In a step S6109, the digital asset computer system matches the first electronic digital asset loan order with the first electronic digital asset lend order. In embodiments, where digital asset computer system may receive a plurality of electronic digital asset lend orders and a plurality of electronic digital asset borrow orders, a borrow order may be matched with one or more lend order and/or a lend order may be matched with one or more borrow orders.

In a step S6110, the digital asset computer system generates first machine-readable transaction instructions for a first loan transaction having a first transaction digital asset quantity satisfying the first electronic digital asset borrow order and the first electronic digital asset lend order.

In a step S6111, the digital asset computer system executes the first machine-readable transaction instructions by updating the electronic ledger by decreasing, by the first transaction digital asset quantity, the first digital asset account balance data corresponding to the lender digital asset account and increasing, by the first transaction digital asset quantity, second digital asset account balance data corresponding to a first borrower digital asset account associated with the first exchange account.

In embodiments, the digital asset computer system may send electronic transfer confirmations to one or both of the first and second user electronic devices at the completion of the transaction. The digital asset computer system may also send electronic transaction confirmations to a computer system associated with an institution associated with the exchange institutional account.

In embodiments the interest rate or lending rate may be used as a benchmark for a financial instrument. In embodiments, the financial instrument may be an exchange traded product. In embodiments the digital asset may be a derivative product of a type selected from the group consisting of: an exchange traded derivative product, a fund, a company, an exchange traded fund, a note, an exchange traded note, a security, a debt instrument, a convertible security, an instrument comprising a basket of assets including one or more digital math-based assets and an over-the-counter product, to name a few.

In embodiments, the first digital asset may be a digital math-based asset. In embodiments the digital asset may be Bitcoin, Ether, Litecoin, Bitcoin Cash or Zcash, to name a few. In embodiments, the digital asset may be a token, such as a stable value token.

In embodiments, the user authentication data may comprise a username and password. The user authentication data may also comprise multi-factor authentication data.

Lending of Digital Assets Using an Auction

In embodiments, digital assets may be lent via a digital asset computer system using an auction. FIGS. 62A-C shows an exemplary process for the loaning of a first digital asset for a first duration by a digital computer system.

In a step S6200, a digital asset computer system generates a first electronic auction loan order book for the first digital asset for the first duration, on or after a first time associated with opening the electronic auction until a second time associated with closing the electronic auction. Part of this step includes a step S6201, of a digital asset computer system receiving a first plurality of auction loan orders associated with the first digital asset from a first plurality of user devices associated with a first plurality of users wherein each auction loan order may include characteristics representing the asset type of the first digital asset, the respective quantity of units of the first digital asset, a respective side of the transaction (borrow or lend), the duration of the loan and a respective interest rate on the loan. Another part of this step includes a step S6202, of a digital asset computer system verifying that each of the first plurality of auction loan orders is qualified based on the steps of the digital asset computer system verifying that the order characteristics of the respective loan order are valid auction order characteristics and, in the cases where the side of the transaction is lend, the digital asset computer system verifying that the respective user has sufficient amounts of the first digital asset to cover the first auction loan order if filled in full.

If step S6202 results in successful verification, the next step of step S6200 is step S6203, comprising a first step S6204 of the digital asset computer system updating each respective lender user account associated with each respective lender to set aside sufficient reserves in the first digital asset, sufficient to cover each respective auction loan order which has been successfully verified if filled in full and the step S6205, of the digital asset computer storing in the first electronic auction loan order book (on or more computer readable systems) each representative auction loan order which has been successfully verified.

In embodiments, in optional step S6206, the digital asset computer system may publish, at set time intervals starting with a third time and continuing until the second time, respective indicative results of the first auction loan order book if the auction were to close at the end of each respective time interval. The respective indicative results may comprise a respective indicative interest rate which is calculated by the digital asset computer system determining using the first auction loan order book, a respective indicative auction interest rate in terms of the first digital asset that will execute the greatest quantity of the first digital assets being transacted for the interest rate and in the case where more than one respective indicative auction interest rate is identified as having the same greatest quantity of the first digital assets being transacted, selecting as the respective indicative auction interest rate based on the midpoint of the two adjacent indicative auction interest rates identified for the fourth time. In embodiments, other tie breaking criteria may be used to select the indicative auction interest rate, exampled of which are discussed below. The respective indicative results also comprise a respective auction quantity, which is determined by the digital asset computer system, as the quantity of units of the first digital asset to be loaned at the respective indicative interest rate as of the fourth time.

In step S6207, the digital asset computer system closes the first auction loan order book, at the second time, and stops accepting new auction loan orders to be added to the first auction order book In step S6208, the digital asset computer system calculates final results of the first auction loan order book. The final results comprise a final auction price interest rate at the second time which is calculated by the digital asset computer system determining, using the first auction loan order book at the second time, a final auction interest rate in term of the first digital asset that will execute the greatest quantity of first digital assets being transacted and in the case where more than one respective final auction interest rate is identified as having the same greatest quantity of the first digital assets being transacted, selecting as the respective final auction interest rate based on the midpoint of the two adjacent indicative auction interest rates identified for the fourth time. In embodiments, when the more than one respective final auction interest rate is identified as having the same greatest quantity of the first digital assets being transacted, the final auction interest rate may be selected by some other tie breaking criteria, including lowest imbalance, the lower rate, the higher rate, the rate closest to the U.S. treasury rate for the same duration, the rate closest to a benchmark crypto asset rate at the same duration. the rate closer to LIBOR at the same duration, the rate closer to the continuous order book at the time of the auction, and the rate closer to a predetermined index rate at the time of the auction, to name a few. The final results also comprise a final auction quantity, which is determined by the digital asset computer system, as the quantity of units of the first digital asset which match the final auction interest rate as of the second time.

In embodiments, the order book data may be used to create a benchmark to be used in a financial product. In embodiments, the financial product may be, by way of illustration, an exchange traded product, a fund, an exchanged traded note, an exchange traded product, a call, a put, an option, an exchange traded derivative product, a fund, a company, an exchange traded fund, a note, an exchange traded note, a security, a debt instrument, a convertible security, an instrument comprising a basket of assets including one or more digital math-based assets and an over-the-counter product, an interest rate future, a future on swaps, an option on interest rate futures, an interest rate swap, a bond forward, a floating rate agreement (FRA), a structured, product such as a note bond or bill, a foreign exchange future, a foreign exchange forward, a foreign exchange listed option, a currency linked note and a currency swaption, to name a few.

In embodiments, the first digital asset may be a digital math-based asset. In embodiments the digital asset may be Bitcoin, Ether, Litecoin, Bitcoin Cash or Zcash. In embodiments, the digital asset may be a token, to name a few.

In embodiments, other forms of order books may be used to lend digital assets, such as block trade order books and limited order books, to name a few. In embodiments, requests for quotes (RFQs) or OTC voice transactions may be used to lend digital assets.

Total Return Swap

In embodiments, digital assets held in, e.g., a custodial account may be used in a return swap. In a return swap, a return on a first asset may be swapped or exchanged for the return on a second asset for a period of time. Conventionally, the owner of an asset with a volatile return will swap or exchange this return for a less volatile return. FIG. 63A illustrates an exemplary embodiment of a method of performing a total return swap including digital assets.

In the context of digital assets, technological challenges are created due to the nature of the digital assets, being tied to a blockchain, and having high level of volatility.

In embodiments, in a step S6300, a digital asset computer system that includes one or more computer, provides an electronic ledger that includes user account information associated with each user of a plurality of users. The user account information includes at least user identification information and user collateral information indicating a value of collateral associated with each user of the plurality of users. In embodiments, the user collateral information may include a value of digital assets in accounts associated with the user, a quantity of digital assets in accounts associated with the user, a value of fiat in accounts associated with the user and/or a value of other assets in accounts associated with the user, to name a few. In embodiments, the user account information may also include obligation information associated with each user's payment obligations to others.

As step S6301, the digital asset computer system provides to a first user device associated with a first user and a second user device associated with a second user, swap transaction information that includes details regarding the swap. In embodiments, the swap transaction information includes swap information, a swap duration, at least one fixing date, and at least one benchmark rate. In embodiments, the swap information identifies the assets involved in the swap and preferably includes at least one digital asset and may include another digital asset, fiat, or any other asset, to name a few. In embodiments, the at least one fixing date is a date on which an agreed to interest rate, discussed below, is applied to determine the payment owed on both sides of the swap. In embodiments, there may be additional fixing dates which may apply to one or both sides of the swap. In embodiments, the swap information may also include a swap quantity which identifies the quantity of assets that are involved in the swap. In embodiments, each swap may include a quantity of one with users entering into multiple swaps if they wish to swap quantities of more than one.

In step 6302, the digital asset computer system receives from a first user device, associated with the first user of the plurality of users, swap bid information including first user side information and a first interest rate. In embodiments, the first user side information indicates whether the first user is buying protection or selling protection in the swap. Users who are buying protection are generally trading the return on a digital asset such as bitcoin which is unknown, for example, for another predetermined return. In embodiments, a benchmark rate such as LIBOR may be used as a basis for the predetermined return. In embodiments, the predetermined return may be based on LIBOR plus some additional percentage. The two returns are swapped for the swap duration. In embodiments, the first interest rate is the first user's proposal for an interest rate and may be expressed in terms of a benchmark rate (LIBOR, for example) plus a predetermined percentage. This is the rate which the protection buyer would like to get. In embodiments, the first interest rate may be based on a notional value of the assets relative to each other. In embodiments, for example, where the swap is bitcoin for U.S. dollars, the notional value of a bitcoin in U.S. dollars is $10,000. The return rate may be set at a percentage that is based on the performance of bitcoin. In this case, the owner of a bitcoin may exchange the potential return on a bitcoin for the swap duration for a set return rate, for example 10% of the notional value of the bitcoin. In embodiments, as noted above, the interest rate may be set as a percentage of a benchmark rate or a benchmark rate plus a percentage. In such a case, the bitcoin owner is referred to as a buyer of protection.

In step **S6302*a***, the digital asset computer system receives, from the second user device, associated with the second user of the plurality of users a swap ask request including second user side information and a second interest rate. In embodiments, the second user side information indicates whether the second user is buying protection or selling protection. The second interest rate is the interest rate proposed by the second user for the swap. In embodiments, the second interest rate may be presented as a benchmark rate plus a predetermined percentage. In embodiments, the benchmark rate is one of the first benchmark rate and the second benchmark rate. Where the second user is a protection seller, the second interest rate is the rate which the second user is willing to pay in exchange for the potential return of the protection buyer's asset.

At step S6303, the digital asset computer system calculates margin requirements based on margin considerations. The margin requirements apply to both the first user and the second user (buyer and seller). In embodiments, an initial margin requirement is based on the margin considerations, including the swap pair information, continuous order book market data and/or one of more reference indexes. In embodiments, both the protection buyer and protection seller must provide sufficient collateral to cover at least a portion of the total value of the swap, which corresponds to the initial margin.

At step S6304, the digital asset computer system verifies that the value of collateral associated with each of the first user and the second user is equal to or greater than the initial margin requirement.

As shown in FIG. 63B, at step S6305, where the digital asset computer system verifies that the first user and the second user have sufficient collateral to meet the initial margin requirement, the digital asset computer stores the swap bid request and the swap ask request.

At step S6306, the digital asset computer system matches the first user side information with the second user side information where a match is achieved when the first user side information indicates a side opposite that of the second user side information.

At step **S6306*a***, the digital asset computer system matches the first interest rate with the second interest rate where a match is achieved when the first interest rate is the same as the second interest.

At step S6307 the digital asset computer system generates transaction instructions in accordance with the swap transaction information, the first side user information, the second side user information and the matched first interest rate and second interest rate to transact the swap.

In step 6308, the digital asset computer system, updates the electronic ledger to change the account information of the first user and second user to reflect a decrease in the amount of collateral associated with the first user and second user in an amount equal to the initial margin. The digital asset computer system also updates the electronic ledger to change the obligation information of the first user and the second user in accordance with the swap transaction information and the matched first interest rate and second interest rate.

In step S6309, the digital asset computer system transmits a confirmation of the transaction to at least the first user device associated with the first user and the second user device associated with the second user.

In step **6309*a***, the digital asset computer system may publish the matched first interest rate and second interest rate.

As shown in FIG. 63C, in step S6310, the digital asset computer system may recalculate the margin to determine a variation margin. In embodiments, this recalculation step is performed periodically. In embodiments, the recalculation step may be based on the same considerations discussed above with respect to the initial margin.

At step 6311, the digital asset computer system may determine whether the recalculated margin exceeds the collateral of the first user or the second user. If so, in embodiments, the digital asset computer system may issue an alert to the first user or second user to increase their account balance to meet the recalculate margin. In embodiments, the first user and second user are provided a set period of time to increase their collateral prior to the computer asset computer system transferring collateral from the account of the first user or second user to the account of the other of the first user and the second user.

Swap Token

In embodiments, a Swap Token tied to an underlying blockchain, such as the Ethereum Blockchain may be provided.

Figure 67A:
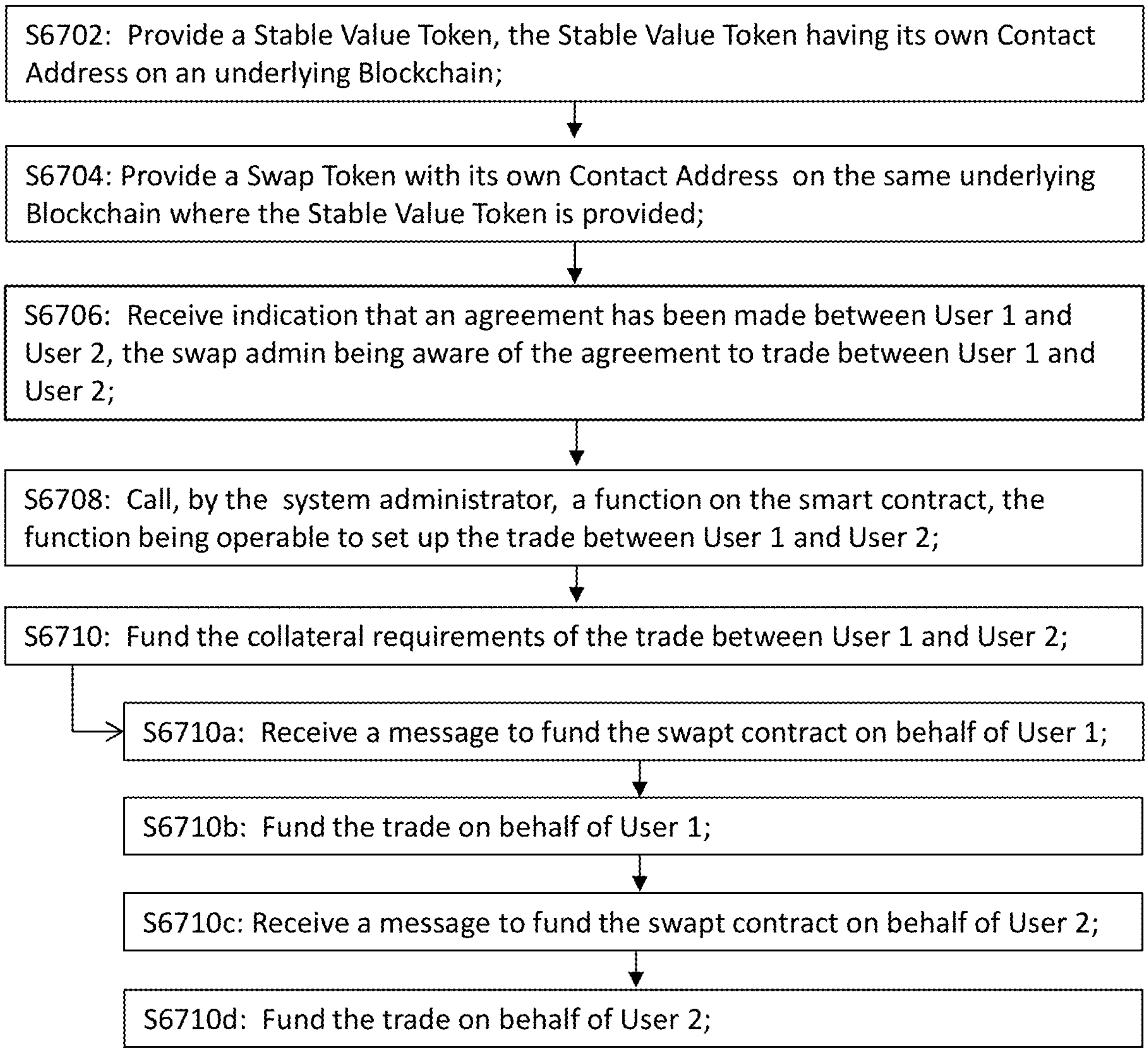
FIGS. 67A-B are an exemplary flow chart of a process and a corresponding exemplary schematic diagram for implementing a Swap Token for a swap trade between two users.
Figure 67B:
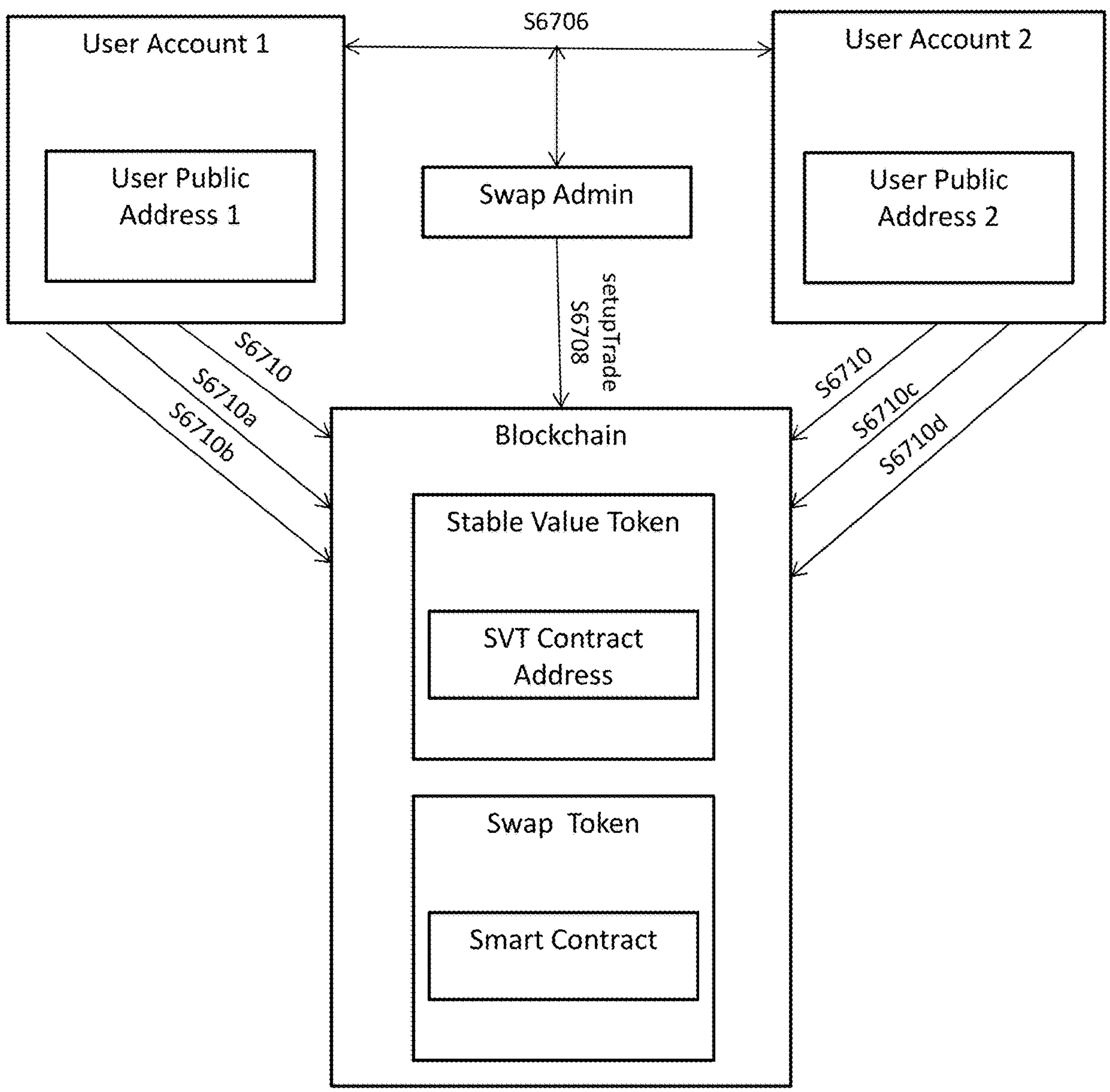

By way of illustration and referring to FIG. 67, a Swap Token may be implemented in accordance with the following steps. In this exemplary embodiment, the Swap Token may be used in conjunction with a stable value token (e.g., SVCoin), to set up a swap trade between User 1 (having a user address, User Address 1, associated with a private key User Private Key 1), and User 2 (having a user address, User Address 2, associated with a private key User Private Key 2). The user addresses, and associated private key, will typically be mathematically related to each other as used in PKI encryption. Each token may have one or more administrators associated with it, which have public addresses (e.g., admin1, admin2, etc.) and corresponding private keys (adminPriv1, adminPriv2, etc.).

In embodiments, the Swap Contract may include such terms as a duration.

In Step S6702, a Stable Value Token (such as SVCoin) is provided as discussed previously, with its own Contract Address, (e.g., svt), on an underlying Blockchain (e.g., the Ethereum Blockchain). In embodiments, the Stable Value Token will have its own smart contract (e.g., SV Coin Contract), using one or more contract addresses, consistent with embodiments otherwise described herein.

In Step S6704, a Swap Token is provided with its own Contract Address, (e.g., swapt) on the same underlying Blockchain. In embodiments, the Swap Token will have its own smart contract (e.g., Swap Contract), using one or more contract addresses, consistent with embodiments otherwise described herein. In embodiments, the Swap Contract may include instructions providing for:

- Setting up trades (e.g., "setupTrade"), which will also assign a trade number (e.g., swapt.101) to each trade when set up, as well as track parties to the trade (e.g., User Public Address 1 and User Public Address 2);
- Checking balance of a particular address for the SVCoin Token (e.g., getbalanceof ([user address]));
- Getting approval for a trade (e.g., svt.approve(swapt, 101)
- Funding the trade (e.g., swapt.fundTrade(trade001))
- Withdrawal funds (e.g., withdrawal(trade001, User Public Address 1)

In Step S6706, User 1 and User 2 agree to a trade, which the swap admin is aware of it. In embodiments, Step S6706 may be performed through an order book, such as a continuous order book or an auction order book, as discussed above.

In Step S6708, the swap admin calls a function on the smart contract 'swapt' to set up the trade, (e.g., 'setupTrade' function). The setupTrade function may include as parameters, the parties to the trade (e.g., User 1 and User 2), the addresses of the participants in the trade (e.g., User Public Address 1 and User Public Address 2), the side of each party to the contract (e.g., buy or sell), as well as the other parameters, such as how much collateral is required, (e.g., 101), to name a few. The 'setupTrade' function returns some unique identifier, (e.g., 'trade001'), to identify this particular trade and notifies User 1 and User 2 of the identifier 'trade001'. At the end of Step S6708, the trade is in an unfunded state.

In Step S6710, User 1 and User 2 will fund their collateral requirements for the trade (trade001) using the stable value token. In embodiments, this amount may be from a preexisting account (e.g., User Public Address 1 for User 1 and User Public Address 2 for User 2). In embodiments, each user's balance may be checked by using a function such as check balance function against the svt contract address (e.g., svt.balnceOf(User Public Address 1), and svt.balanceOf (User Public Address 2). In embodiments, one or more users may need to purchase new stable value tokens to fund the collateral requirement, in accordance with embodiments elsewhere discussed. Before the next step (Step S6710*a*), both users will have to have sufficient balances of stable value tokens in their respective public addresses to support the collateral requirements of the sap transaction.

In Step S6710*a*, User 1 will send to the svt contract address a message to fund the swapt contract address with the required collateral amount (e.g., 101 SVCoins). In embodiments, User 1 sends the transaction from User Public Address 1 to svt Contract Address with message instruction the transfer of the SVCoins from user's public address to the swap contract address (e.g., 'svt.approve(swapt, 101)'). This message would be signed by User 1, using User Private Key 1. Assuming User Public Address has a sufficient balance, and User Private Key 1 is authorized to sign for the transfer, the Stable Value Token Contract should approve and record the transfer.

In Step S6710*b*, User 1 makes a second transaction to fund the trade by, e.g., calling a fundTrade Function in the swap contract, including reference to the unique identifier of the trade (e.g., trade001). In this example, User 1 would send to the underlying blockchain, a transaction from User Public Address 1 to swapt Contract Address, with a message such as 'swap.fundTrade(trade001)'. In response, the swap contract, executing the 'fundTrade' function, may internally call 'svt.transferFrom(User Public Address 1, swap, 101)' to transfer the previously approved tokens to itself (otherwise failing if User Public Address 1 did not approve the required tokens to fund the trade) and, if successful, marks trade001 in its datastore as being funded by User 1's side of the trade. At this point, trade001 has been half funded by User 1.

In Steps S6710*c* and S6710*d*, User 2 will need to carry out comparable steps as S6710*a* and S6710*b* for User 2's SVCoin tokens in User Public Address 2 and to support User 2's collateral obligations for its side of the trade (e.g., trade001).

In Step S6710*c*, User 2 will send to the svt contract address a message to fund the swapt contract address with the required collateral amount (e.g., 101 SVCoins). In embodiments, User 2 sends the transaction from User Public Address 2 to svt Contract Address with message instruction the transfer of the SVCoins from user's public address to the swap contract address (e.g., 'svt.approve(swapt, 101)'). This message would be signed by User 2, using User Private Key 2. Assuming User Public Address has a sufficient balance, and User Private Key 2 is authorized to sign for the transfer, the Stable Value Token Contract should approve and record the transfer.

In Step S6710*d*, User 2 makes an additional transaction to fund the trade by, e.g., calling a fundTrade Function in the swap contract, including reference to the unique identifier of the trade (e.g., trade001). In this example, User 2 would send to the underlying blockchain, a transaction from User Public Address 2 to swapt Contract Address, with a message such as 'swap.fundTrade(trade001)'. In response, the swap contract, executing the 'fundTrade' function, may internally call 'svt.transferFrom(User Public Address 2, swap, 101)' to transfer the previously approved fiat currency to itself (otherwise failing if User Public Address 2 did not approve the required tokens to fund the trade) and, if successful, marks trade001 in its datastore as being funded by User 2's side of the trade.

At this point, trade001 has been fully funded by User 1 and User 2, and should be in a fully funded state. At a later point in time, in embodiments, either User 1 or User 2 may send a call request to the swapt contract address to collect from the posted collateral in trade001 if appropriate conditions have been met, using, e.g., a 'withdrawal' command.

Holding Collateral in a Smart Contract on an Underlying Blockchain

Figure 68:
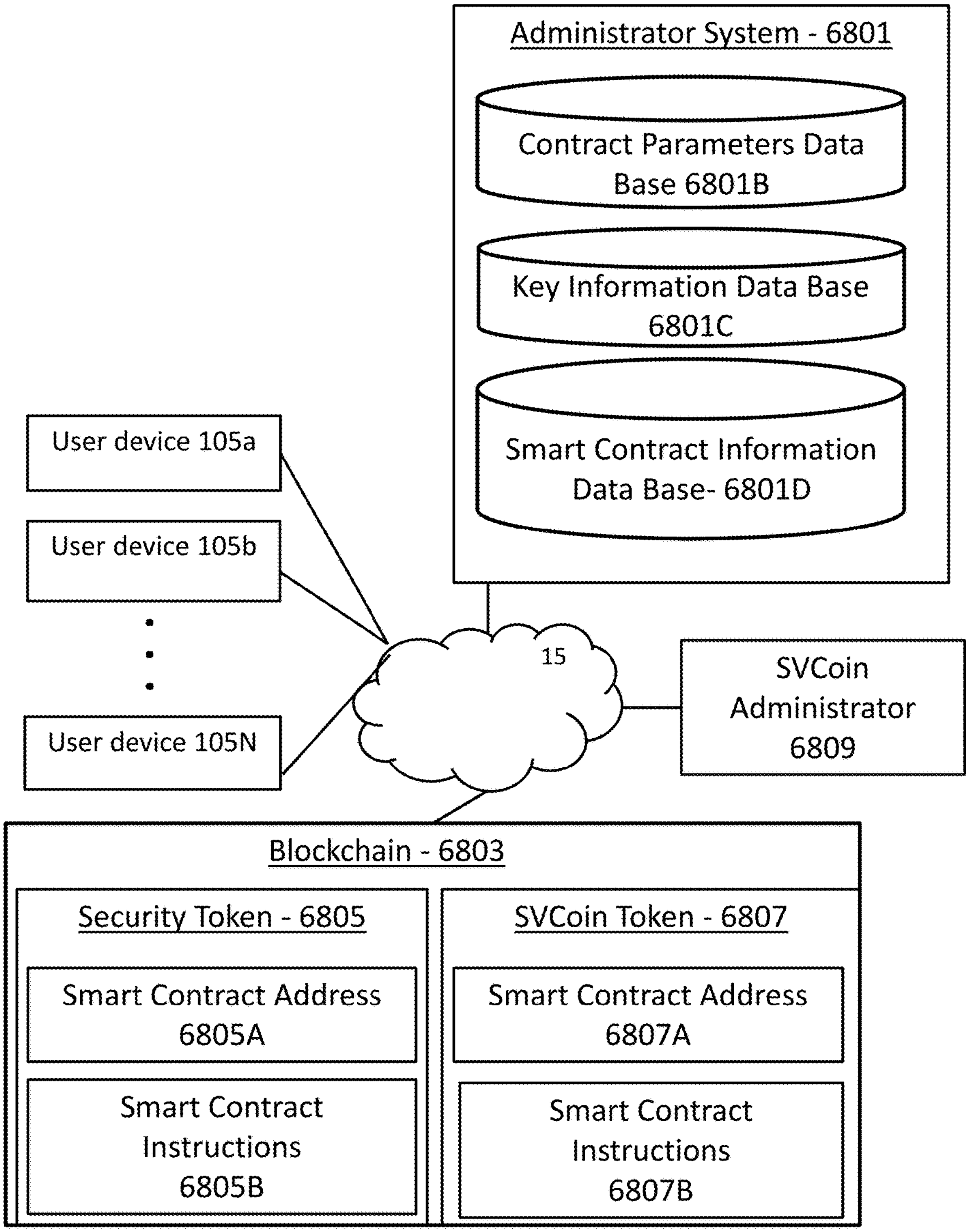
FIG. 68 is a schematic drawing of an exemplary network for holding collateral in a smart contract on an underlying blockchain in accordance with exemplary embodiments of the present invention.

FIG. 68 illustrate a schematic drawing of an exemplary network for holding collateral in a smart contract on an underlying blockchain in accordance with exemplary embodiments of the present invention. The network shown in FIG. 68 may include a security token administrator system 6801 associated with an issuer of a security token 6805 (Security Token), a stable value token administrator system 6809 associated with an issuer of a stable value token 6807 (SV Coin Token), and a plurality of end user devices 105*a*, 105*b*, . . . 105N, each associated one or more corresponding end users. In embodiments more than one end user device may be associated with the same end user.

In embodiments, each of systems 6801, 8609 and user devices 105*a*, 105*b* . . . 105N may communicated with and/or among each other directly and/or indirectly, e.g., through a data network 15, such as the Internet. In embodiments, encryption and/or other security protocols may be used. In embodiments, data network 15, may be a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 15, through wired, wireless, or other connections.

In embodiments, issuer of the security token may be one or more entities. In embodiments, the issuer of the stable value token may be one or more entities. In embodiments, the issuer of the security token and the issuer of the stable value token may be the same or different entity. In embodiments, one or more administrators may operate the security token administrator system 6801 on behalf of the issuer of the stable value token. In embodiments, the same or different administrators may operate the stable value token administrator system 6809. In embodiments, the issuers and/or administrators may be a trust company, a regulated trust company, a bank, a broker dealer, or some other form of entity, to name a few.

In embodiments, the administrator system 6801 may access one or more databases stored on non-volatile computer readable memory including contract parameters data base 6801B, key information data 6801C and smart contract information 6801D. As further illustrated in FIG. 69A, in embodiments, contract parameters database 6801B may include at least the following smart contract terms or attributes: (1) inception date data 6902; (2) inception value data 6904; (3) benchmark data 6906; (4) contract duration data 6908; (5) collateral requirements data 6910; and (6) notional value data 6912, to name a few. In embodiments, other contract parameters may be stored in the contract parameters database. Additional databases, to name a few, are discussed above in connection with FIGS. 6A, 10, 26, 29, 30E, 57, 60, 61A, 61B, and 65C-1-2. Moreover, additional databases may include the databases discussed above in connection with the descriptions of Blockchain Financial Instruments, Digital Asset Exchanges, and Digital Wallets, to name a few. In embodiments, inception date data 6902 may refer to data that indicates dates at which smart contracts actually begin. In embodiments, inception value data 6904 may refer to data that indicates a value of smart contracts at a corresponding inception date. Benchmark data 6906 may refer to data that indicates benchmark information of which smart contracts are based off. In embodiments, contract duration data 6908 may refer to durations of smart contracts. In embodiments, collateral requirements data 6910 may refer to specific collateral requirements for smart contracts. In embodiments, notional value data 6912 may refer to the total amount of a security's underlying asset at its spot price in reference to smart contract values.

As illustrated in FIG. 68, the administrator system 6801, stable value administrator 6809, and/or user devices 105*a*, 105*b* and/or 105N may communicate with a blockchain network to access and/or add blocks to blockchain 6803. The blockchain 6803 may include one or more tokens, such as Security Token 6805 and SVCoin Token 6807 as illustrated. Each token will have at least one corresponding smart contract address (e.g., smart contract address 6805A for Security Token 6805, and smart contract address 6807A for SVCoin Token 6807, to name a few) by which instructions for each token may be accessed. In embodiments, the smart contract address may be associated with a proxy smart contract which may then issue calls to one or more other smart contracts having their own smart contract addresses.

Figure 69A:
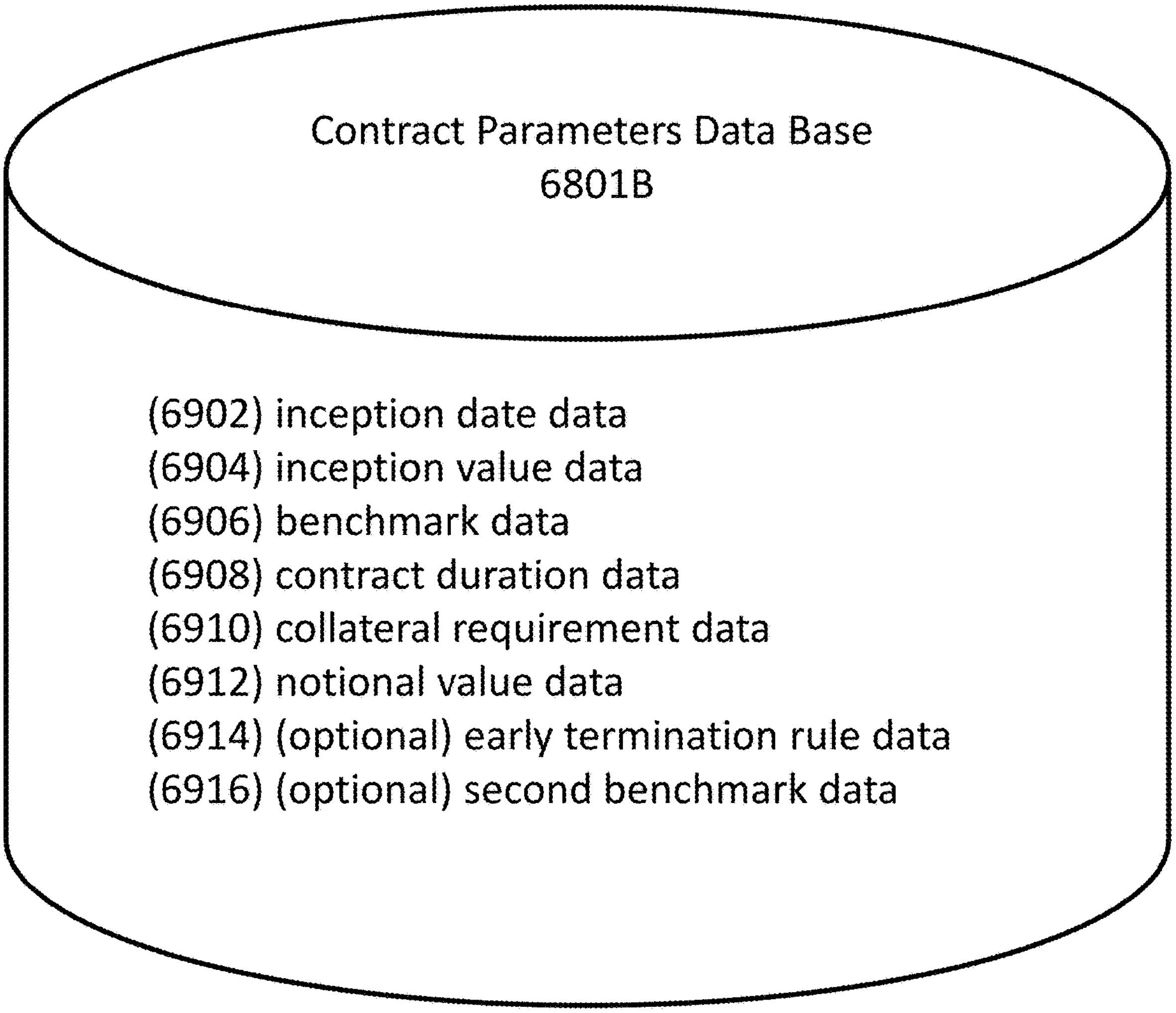
FIG. 69A is a schematic drawing of a contract parameters database of a smart contract in accordance with exemplary embodiments of the present invention.
Figure 69B:
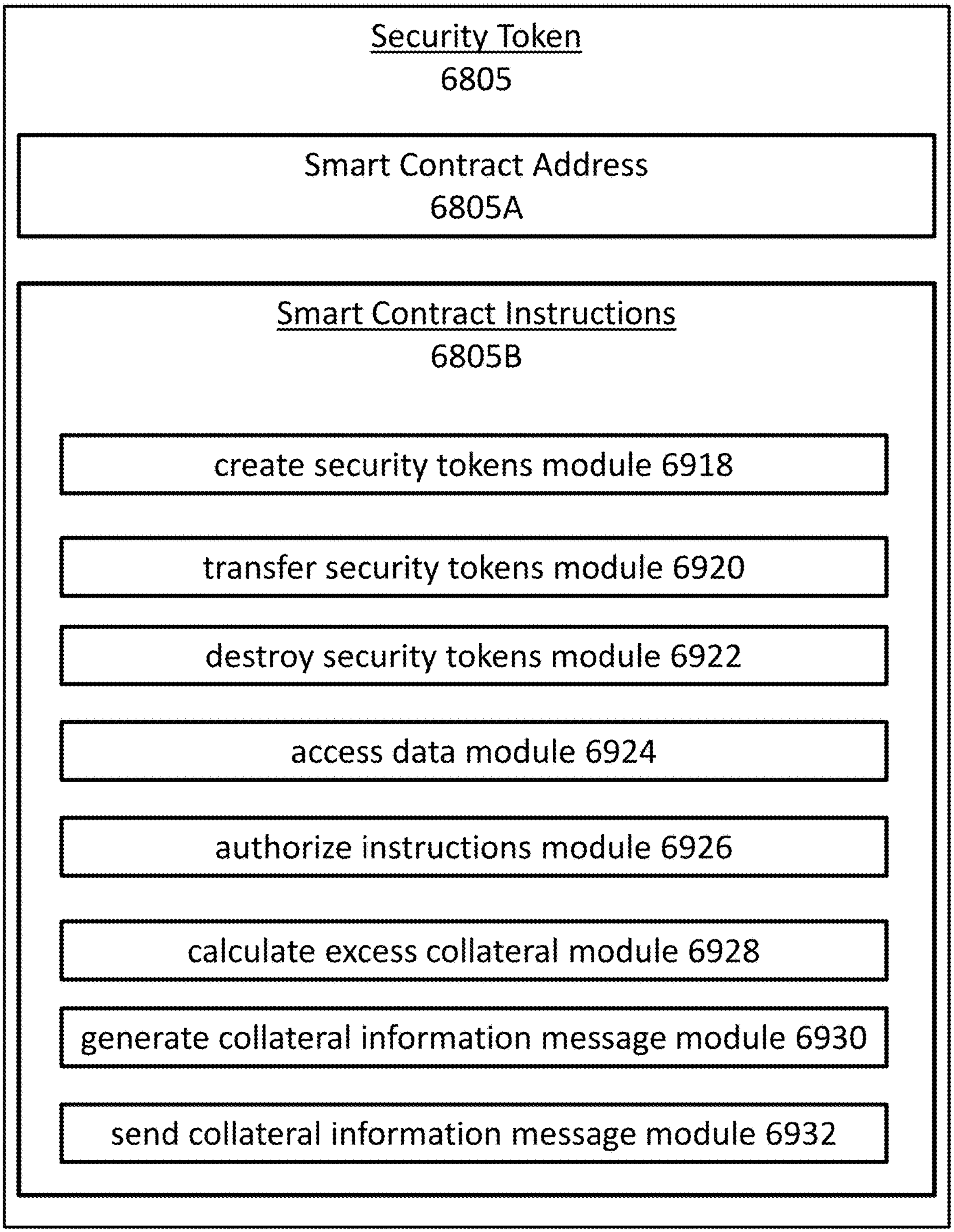
FIG. 69B is a schematic drawing of data structures associated with an exemplary security token on an underlying blockchain including smart contract instruction modules in accordance with exemplary embodiments of the present invention.

As illustrated in FIG. 69B, a security token smart contract 6805 is provided on the underlying blockchain 6803. Security token 6805 may also include a plurality of instruction modules that collectively make up the smart contract associated with the security token. By way of illustration, in embodiment, such modules may include modules of instructions such as: (1) a create security tokens module 6918; (2) a transfer security tokens module 6920; (3) a destroy security tokens module 6922; (4) an access data module 6924; (5) an authorize instructions module; (6) a calculate excess collateral module 6928; (7) a generate collateral information message module 6930; and (8) a send collateral information message module, to name a few.

In embodiments, the create security token module 6918 may include one or more instructions to create security tokens, and thus added to the token supply. Such instructions may specify one or more authorized key pairs or contract addresses that may be authorized to create security tokens under specified conditions. In embodiments, the create security module 6918 may include instructions on increasing the token supply. In embodiments, the create security token module 6918 may include instructions on how to create new tokens within pre-approved token supply limits and how to assign newly created or "minted" tokens to specific designated public addresses or contract addresses on the underlying blockchain.

In embodiment, the transfer security tokens module 6920, in embodiments, may include instructions to transfer security tokens. In embodiments, such transfer instructions may include rules by which certain transfer are allowed or blocked and may specify one or more key pair or contract addresses that may be authorized to perform one or more types of transfer operations.

In embodiments, the destroy security tokens module 6922 may include instructions on when, and with whose authority, security tokens associated with one or more specified addresses shall be destroyed or "burned", and thus removed from the security token supply.

The access data module 6924, in embodiments, may include instructions to access data supplied by a first authorized third party database, such as an oracle, as discussed in further detail elsewhere. In embodiments, the authorize instructions module 6924 may include instructions to authorize the transfer of stable value token to the second contract address 6805B.

The authorize instructions module 6926 may further include instructions to authorize the transfer of stable value tokens from the second contract address 6805B.

The generate collateral information message module 6930, in embodiments, may include instructions to generate a collateral confirmation message to the administrator system 6801 confirming receipt of at least one of a first amount of collateral and a second amount of collateral when at least one of the first amount of collateral and the second amount of collateral is received.

In embodiments, the send collateral information message module 6932 may include instructions to send the collateral confirmation message to the administrator system 6801 confirming receipt of at least on of a first amount of collateral and a second amount of collateral when at least one of the first amount of collateral and the second amount of collateral is received.

Figure 69C:
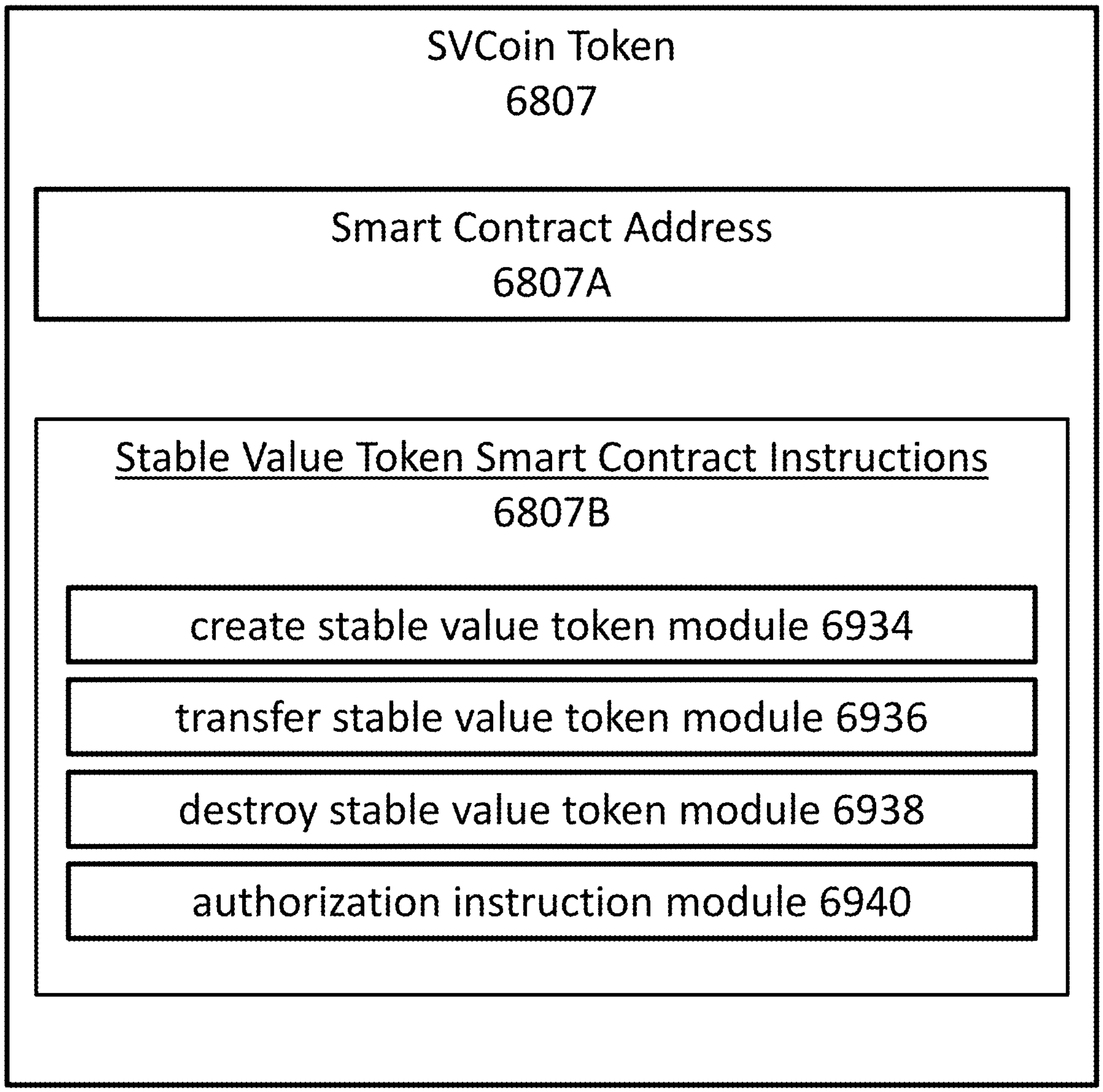
FIG. 69C is a schematic drawing of data structures associated with an exemplary stable value token (SVCoin Token) including smart contract instruction modules in accordance with exemplary embodiments of the present invention.

As illustrated in FIG. 69C, a stable value token smart contract 6807B is provided on the underlying blockchain 6803. Stable value token 6807 may also include a plurality of instruction modules that collectively make up the smart contract associated with the stable value token. By way of illustration, in embodiment, such modules may include modules of instructions such as: (1) a create stable value token module 6934; (2) a transfer stable value token module 6936: (3) a destroy stable value token module 6938; and (4) authorization instruction module.

In embodiments, the create stable value token module 6934 may include instructions to create stable value tokens.

The transfer stable value token module 6936, in embodiments, may include instructions to transfer stable value tokens.

In embodiments, the destroy stable value token module 6938 may include instructions to destroy stable value tokens.

In embodiments, the authorization instruction module 6940 may include instructions to authorize request received, the requests, in embodiments, being transaction requests from administrators, user public addresses, or other smart contracts.

While security token 6805 is described as a security token, in embodiments, the security token may reflect other types of tokens, such as tokens associated with a security, a bond, a financial instrument, a contract, and stock, to name a few. Similarly, while the SVCoin token 6807 is describe a stable value token, in embodiments, the SVCoin token 6807, may reflect other kinds of token which may not necessarily reflect a stable value, e.g., Gas tokens, and/or some other kind of token which the parties to the transaction reflect as an appropriate collateral.

Figure 70A:
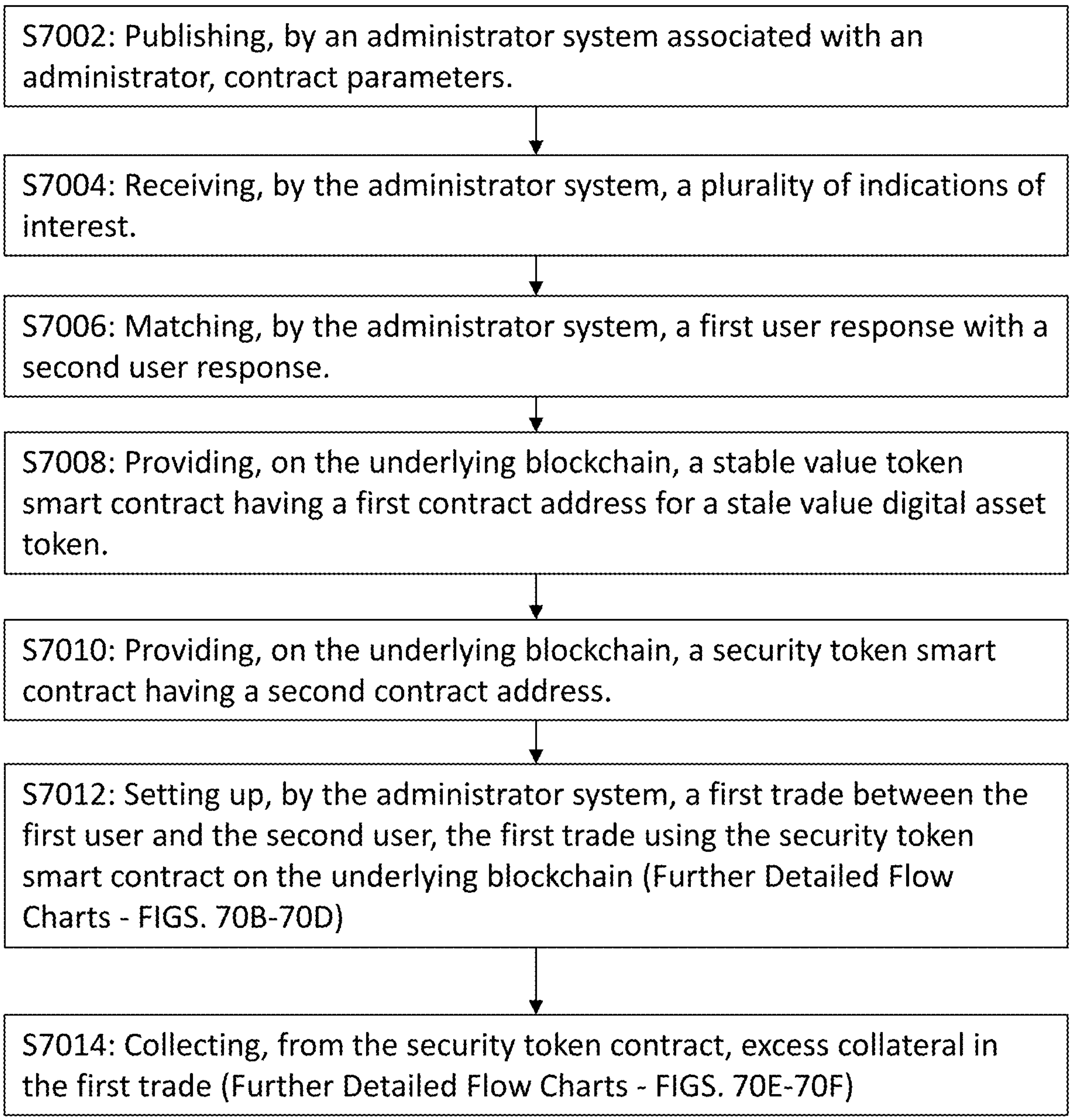
FIG. 70A is a flow chart of a processes for holding collateral for a security token in the form of a stable value token in a smart contract on an underlying blockchain in accordance with exemplary embodiments of the present invention.

Referring to FIG. 70A, in a step S7002, an administrator system 6801 may publish (via, e.g. a public or private website or mobile application) a contract having contract parameters. Contract parameters, as described in step S7002 may be retrieved from contract parameters database 6801B, as shown in FIG. 69A. The published contract, in embodiments, may have a graphical user interface (GUI), including such information as shown in connection with FIG. 71A. The published contract may show some or all of the data described earlier in connection with FIG. 69A. For example, as shown in FIG. 71A, the published contract 7102 may have (1) an inception date 7104 of Jul. 19, 2018; (2) an inception value 7106 of $10,000; (3) benchmark data 7108 from the S&P 500; (4) a contract duration 7110 of 5 days; (5) a collateral requirement 7112 of 100 Stable Value Coins; and (6) a notional value 7114 of $10,000. Other values and parameters may be included consistent with embodiments of the present invention.

In embodiments, the smart contract parameters database may further include: (7) early termination rule data 6914; and (8) second benchmark data 6916, to name a few. In embodiments, early termination rule data 6914 may include rules that charge a fee associated with a user terminating the smart contract before the contract duration is completed. Second benchmark data 6916 in some embodiments may be different than benchmark data 6906. The published contract, in embodiments, may include a GUI with such information as shown in connection with FIG. 71B. In embodiments, the published contract may show some or all of the data described earlier in connection with FIG. 69A. For example, as shown in FIG. 71B, the published contract 7116 may have (1) an inception date 7118 of Jul. 20, 2018; (2) an inception value 7120 of $1,000; (3) benchmark data 7122 from the S&P 500; (4) a contract duration 7124 of 2 days; (5) a collateral requirement 7126 of 10 Stable Value Coins; (6) a notional value 7128 of $1,000; (7) no early termination rules 7130; and (8) second benchmark data 7132 from Winkdex®. While there are no early termination rules shown in the published contract of FIG. 71B, early termination rules may include, for example, a fee for terminating the contract early. Other values and parameters may be included consistent with embodiments of the present invention.

Referring to FIG. 70A, in a step S7004, the administrator system 6801 may receive a plurality of indications of interest ("IOIs") or bids from users. Referring to FIGS. 71C-71E, the IOIs may include at least a first indication of interest (e.g. first indication of interest 7134 described in connection with FIG. 71C or first indication of interest 7140 described in connection with FIG. 71D) and a second indication of interest (e.g. second indication of interest 7150 described in connection with FIG. 71E or second indication of interest 7156 described in connection with FIG. 71F). In embodiments, the first indication of interest may be a first user response sent from a first user device 105*a* to administrator system 6801. In embodiments, the first user device 105*a* may be associated with a first user (e.g. Alice). In embodiments, as illustrated in FIGS. 71C and 71D, the first indication of interest 7134, 7140 may include at least first user identification information 7136, 7142 (e.g., a name, user number, email address, to name a few used to identify the indication of interest as coming from the first user (Alice)), and first side information 7138, 7144 (e.g., buy). First side information may include identification of a first leg of the smart contract (e.g., buy or sell). In embodiments, additional information, such as shown in FIG. 71D may also be included in an indication of interest. For example, referring to FIG. 71C, a first indication of interest 7134 may be sent by Alice (as the first user) to Gemini (as the security token administrator). Alice's indication of interest 7134 may include her user identification number 7136, ID No. 12345 (as the first user identification information), and information indicating that Alice would like to buy 7138 (as the first side information).

In embodiments, the first indication of interest may further include additional information such as, a first user public address and/or first collateral information, to name a few. In embodiments, such additional information may not be necessary to include in the indication of interest because it may be included in the contract parameters as published and thus implied. First collateral information may be in stable value digital asset tokens (SVCoins). For example, referring to FIG. 71D, a first indication of interest 7140 may be sent by Alice (as a first user) to Gemini (as the security token administrator). Alice's indication of interest may include: (1) her user identification number 7142, ID No. 12345 (as the first user identification information): (2) information indicating that Alice would like to buy 7144 (as the first side information); Alice's Public Address 7146 (as the first user public address); and (4) information indicating a collateral 7148 of 100 Stable Value Coins (as the first collateral information).

In embodiments, the second indication of interest may be a second user response sent from a second user device 105*b* to administrator system 6801. In embodiments, the second user device 105*b* may be associated with a second user (e.g. Bob). The second indication of interest (e.g. second indication of interest 7150 described in connection with FIG. 71E or second indication of interest 7156 described in connection with FIG. 71F) may include second user identification information 7152, 7158 (e.g. a name, user number, email address, to name a few used to identify the indication of interest as coming from the second user (Bob), and second side information (e.g. sell). The second side information may include identification of a second leg of the smart contract (e.g. buy or sell). In embodiments, the second leg is different from the first leg. In embodiments, additional information, such as shown in FIG. 71F, may also be included in an indication of interest. For example, referring to FIG. 71E, a second indication of interest 7150 may be sent by Bob (as the second user) to Gemini (as the security token administrator). Bob's indication of interest 7150 may include his user identification number 7152, ID No. 54321 (as the second user identification information), and information indicating 7154 that Bob would like to sell (as the first side information). In some embodiments, the second indication of interest my further include additional information such as, a second user public address 7162 and/or second collateral information 7164, to name a few. The second collateral information 7164 may be in stable value digital asset tokens ("SVCoins"). For example, referring to FIG. 71F, a second indication of interest 7156 may be sent by Bob (as the second user) to Gemini (as the security token administrator). Bob's indication of interest 7156 may include: (1) his user identification number 7158, ID No. 54321 (as the second user identification information); (2) information indicating that Bob would like to sell 7160 (as the second side information); Bob's Public Address 7162 (as the second user public address); and (4) information indicating a collateral 7164 of 100 Stable Value Coins (as the second collateral information).

Referring back to FIG. 70A, after receiving the first user response (i.e. a first indication of interest) and the second user response (i.e. a second indication of interest), in a step S7006, the administrator system 6801 matches the first user response with the second user response. For example, referring to FIGS. 71C-F, administrator 6801 may match Alice with Bob because Alice wants to buy and Bob would like to sell.

In a step S7008, a stable value digital asset token smart contract 6807B having a first contract address 6807A for a stable value digital asset token 6807 is provided on the underlying blockchain 6803. In embodiments, the stable value digital asset token 6807 may include one or more instruction modules, such as the create stable value token module 6934, transfer stable value token module 6936, destroy stable value token module 6938, and authorization instruction module 6940, to name a few, as is shown in FIG. 69C.

Referring back to FIG. 70A, in a step S7010, a security token smart contract 6805 is provided on the underlying blockchain 6803. The security token smart contract 6805 may have a second contract address 6805A. The security token smart contract 6805 may include, as shown in and discussed with respect to FIG. 69B earlier, stable value token smart contract instructions 6805B which may include one or more instruction modules, such as the create security tokens module 6918, the transfer security tokens module 6920, the destroy security tokens module 6922, the authorize instructions module 6926, the calculate excess collateral module 6928, the generate collateral information message module 6930, and the send collateral information message module 6932, to name a few, as shown in FIG. 69B.

In embodiments, step S7008 and step S7010 may be performed before step S7002, step S7004, and step S7006.

Referring back to FIG. 68B, the process may continue with step S7012, in which the administrator system 6801 sets up a first trade (e.g. trade001) between the first user (e.g. the user associated with first user device 105*a*) and the second user (e.g. the user associated with the second user device 105*b*) using the security token smart contract 6805 on the underlying blockchain 6803. Step S7012 is described in more detail in connection with FIGS. 70B-D.

Referring to FIG. 70B, in embodiments, setting up the first trade between the first user and the second user may begin at step S7016, where the administrator system 6801 generates first trade instructions for the security token smart contract 6805. The first trade instructions may include requests to execute the first trade between a first public address associated with the first user (e.g. the user associated with user device 105*a*) and a second public address associated with a second user (e.g. the user associated with user device 105*b*).

In embodiments, the first trade may be based on: (1) the smart contract parameters; (2) the first user response from step S7004A; and (3) the second user response from step S7004B.

In a step S7018, the administrator system 6801 may generate first hashed trade instructions, the first hashed trade instructions being generated by applying a hash algorithm to the first trade instructions. Examples of hash algorithms include MD 5, SHA 1, SHA 256, RIPEMD, and Keccak-256 to name a few. Hash algorithms take an input of any length and create an output of fixed length, allowing the trade instructions to be detectable and usable by administrators and users on the underlying blockchain. However, applying a hash algorithm is not always necessary if trade instructions are published ahead of time In a step S7020, the administrator system 6801 sends a first transaction request from an administrator public address associated with the administrator system 6801 to the second contract address 6805A via the underlying blockchain 6803. In embodiments, the first transaction request, includes a first message which may include: (1) the first hashed trade instructions; (2) a request to assign a first trade identification to a first trade associated with the hashed trade instructions. In embodiments, the first message may include requests to assign a first trade identification to the first trade associated with the hashed trade instructions and include the first trade identification associated with the first hashed trade instructions. In embodiments, the first transaction request may further include first transaction fee information. The first transaction fee information, in embodiments, may be for miners on the blockchain 6803 to process the first transaction request. The first transaction request is also electronically signed by an administrator private key. The administrator private key may mathematically related to the administrator public address.

The process may continue with step S7022. In step S7022, the administrator system 6801 obtains the first trade identification of the first trade. In embodiments, the administrator system 6801 may determine the first trade identification, as calculated by the security token smart contract, by monitoring transactions on the blockchain 6803 (as shown in connection with a step S7024 of FIG. 70B). In response to obtaining the first trade identification of the first trade, the administrator system 6801 may notify the first user (e.g. the user associated with user device 105*a*) and the second user (e.g. the user associated with user device 105*b*) of the first trade identification. In a step S7026, the administrator system 6801 may send the first trade identification to the first user device 105*a* associated with the first user. Similarly, in step S7028, the administrator system 6801 sends the first trade identification to the second user device 105*b* associated with the second user.

In embodiments, as shown in a step S7030, the first user device 105*a* may send a second transaction request from a first user public address (the first user public address being associated with the first user and the first user device 105*a*) to the first contract address 6807A via the underlying blockchain 6803. The second transaction request may include a second message, the second message including requests to the stable value token smart contract 6807B regarding a first transfer of a first amount of collateral. In embodiments, the second message may include the first trade information. In embodiments, the second transaction request may include second transaction fee information. The second transaction fee information may be for miners on the blockchain 6803 to process the second transaction request. In embodiments, the second message may also include a transfer request to the stable value smart contract to transfer the first amount of collateral in the form of stable value digital asset tokens 6807 from the first user public address to the second contract address 6805A. The transfer request, in embodiments, will be executed upon receipt of a first collateral request from the second contract address 6805A. In embodiments, the transfer request included in the second message may be executed upon receipt of a first collateral request from the administrator system 6801. The second transaction request is also electronically signed by a first user private key. The first user private key may be mathematically related to the first user public address.

Figure 70C:
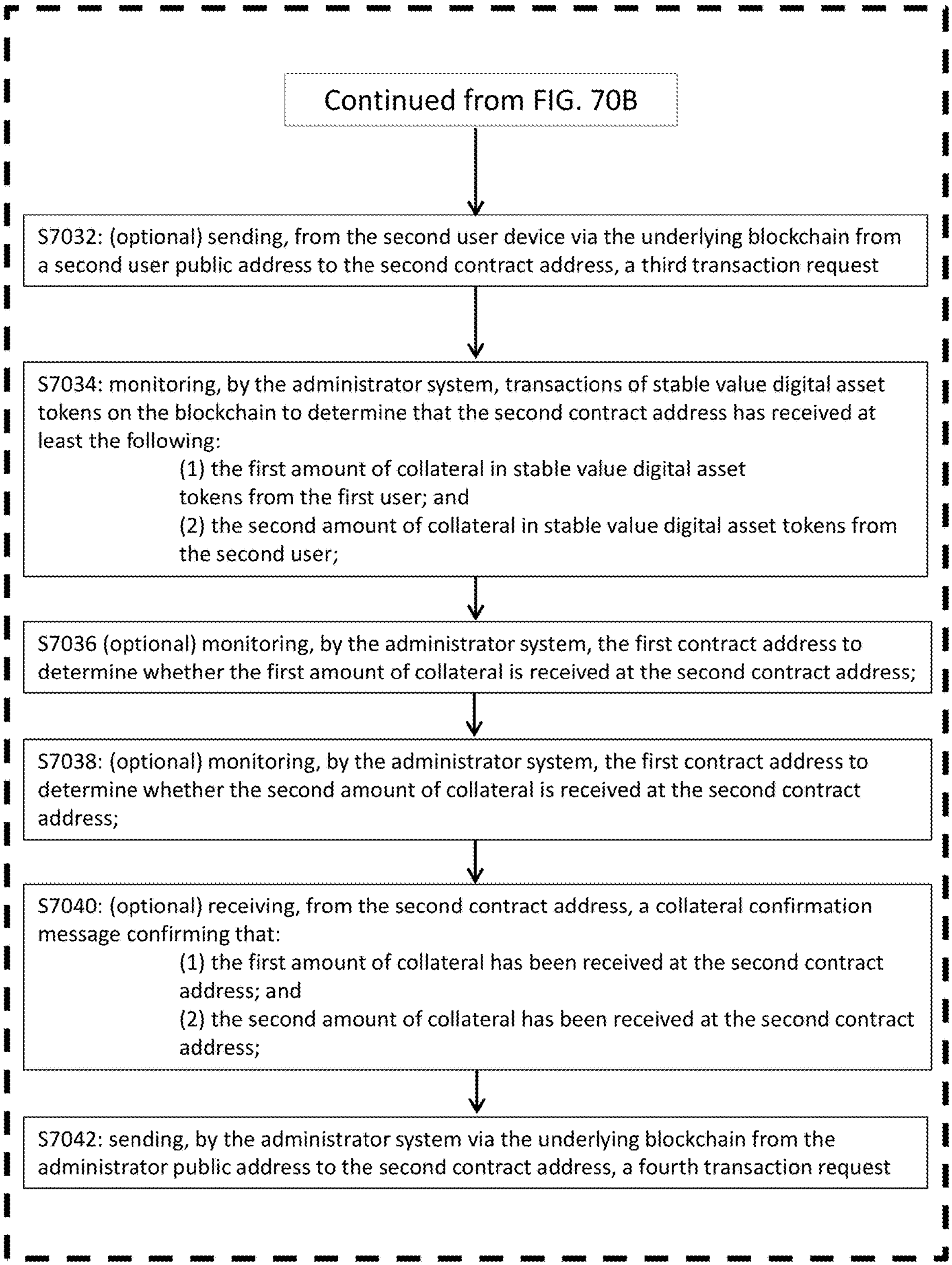

In embodiments, the process described in FIG. 70B may continue with the process shown in connection with FIG. 70C. In embodiments, as shown in a step S7032, the second user device may send a third transaction request from a second user public address (associated with the second user and the second user device 105*b*) to the second contract address 6805A via the underlying blockchain 6803. The third transaction request may include a third message including a second transfer request to the stable value token smart contract 6807B regarding a second transfer of the second amount of collateral from the second user public address to the second contract address 6807A. In embodiments, the third transaction request may further include third transaction fee information. The third transaction fee information, in embodiments, may be for miners on the blockchain 6803 to process the third transaction request. The second transfer request of the third message, in embodiments, will be executed upon receipt of a second collateral request from the second contract address 6805A. Alternatively, the second transfer request of the third message will be executed upon receipt of a second collateral request from the administrator system 6801. The third transaction request may also be electronically signed by a second user private key. The second user private key may is mathematically related to the second user public address.

The process may continue with a step S7012I. In a step S7034, the administrator system 6801 monitors transactions of the stable value digital asset tokens 6807 on the blockchain 6803 to determine that the second contract address 6805A has received at least the following: (1) the first amount of collateral in stable value digital asset tokens from the first user (e.g. the user associated with user device 105*a*); and (2) the second amount of collateral in stable value digital asset tokens from the second user (e.g. the user associated with user device 105*b*). In embodiments, the administrator system 6801 may further monitor the first contract address 6807A to determine whether the first amount of collateral is received at the second contract address 6805A and whether the second amount of collateral is received at the second contract address 6805A (as shown in connection with a step S7036 of FIG. 70C and step S7038 of FIG. 70C).

Alternatively, the administrator system 6801 may receive a collateral confirmation message confirming that the first amount of collateral and the second amount of collateral are received by the second contract address 6805A (as shown in connection with a step S7040 of FIG. 70C). In embodiments, either the first amount of collateral, the second amount of collateral, or both may not be received at the second contract address. If either or both are not received, in embodiments, the collateral confirmation message may indicate a lack of collateral, or the collateral confirmation message may not be sent.

Upon determining that the first amount of collateral from the first user (e.g. the user associated with user device 105*a*) and the second amount of collateral from the second user (e.g. the user associated with user device 105*b*) have both been received by the second contract address 6805A, in a step S7042, the administrator system 6801 may send a fourth transaction request from the administrator public address to the second contract address 6805A via the underlying blockchain 6803. The fourth transaction request may include a fourth message including the first trade instructions and the first trade identification. In embodiments, the fourth transaction request may further include fourth transaction fee information. The fourth transaction fee information, in embodiments, may be for miners on the blockchain 6803 to process the fourth transaction request. The fourth transaction request may also be electronically signed by the administrator private key.

In embodiments, the second contract address 6805A may further include modules with instructions to: (1) generate a first collateral request when the third message is received by the second contract address 6805A; (2) send the first collateral request to the first contract address 6807A associated with the stable value token smart contract; (3) generate a second collateral request when the third message is received by the first contract address 6807A; (4) send the first collateral request to the first contract address 6807A associated with the stable value digital asset token smart contract; confirming that the first amount of collateral from the first user (e.g. a user associated with user device 105*a*) and the second amount of collateral from the second user (e.g. a user associated with user device 105*b*) has been received by the second contract address; and (5) sending a collateral confirmation message to the administrator public address.

Upon receiving the confirmation message, the administrator system 6801 may send a fourth transaction request from the administrator public address to the second contract address 6805A via the underlying blockchain 6803. The fourth transaction message may include a fourth message comprising first trade instructions and the first trade identification.

Figure 70D:
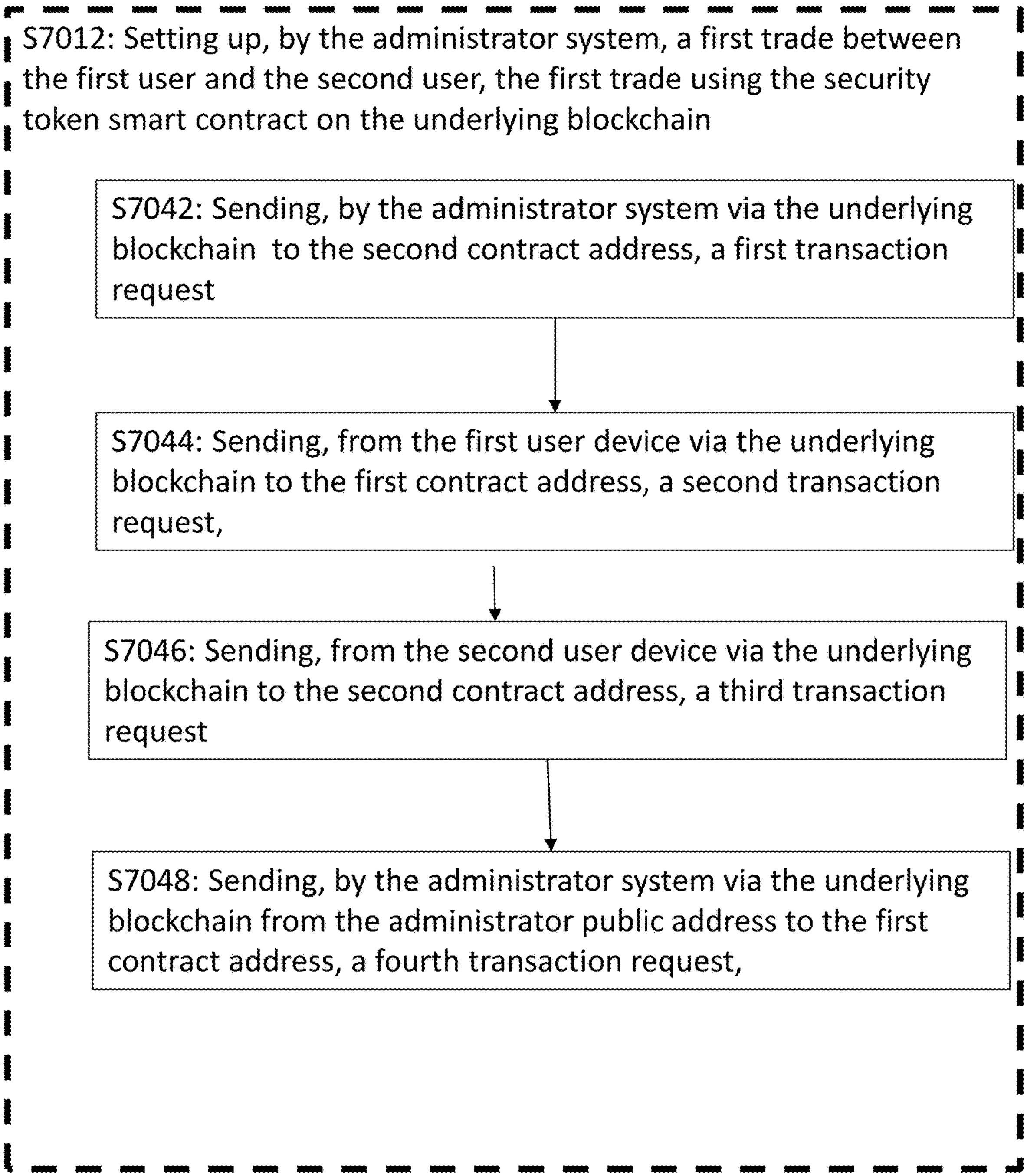
FIG. 70D is a flowchart of another exemplary sub-process of setting up a trade between a first user and a second user in accordance with another exemplary embodiment of the present invention.

Referring now to FIG. 70D, in embodiments, step S7012 may being with a step S7042. In step S7042, the administrator system 6801 may send a first transaction request from the administrator public address to the second contract address 6805A via the underlying blockchain 6803. The first transaction request, in embodiments, may include a first message comprising requests to create a first trade between the first user and the second user in accordance with the security token smart contract 6805. In embodiments, the first transaction request may further include first transaction fee information. The first transaction fee information, in embodiments, may be for miners on the blockchain 6803 to process the first transaction request. The first transaction request may also be electronically signed by the administrator private key. The administrator private key is mathematically related to the administrator public address.

In embodiments, as shown in a step S7044, the first user device 105*a* may then send a second transaction request from a first user public address (the first user public address being associated with the first user and the first user device 105*a*) to the first contract address 6807A via the underlying blockchain 6803. The second transaction request may include a second message, the second message authorizing the stable value token smart contract 6807B to accept a request to transfer a first amount of collateral from the first user public address to the second contract address 6805A. In embodiments, the second transaction request may further include second transaction fee information. The second transaction fee information, in embodiments, may be for miners on the blockchain 6803 to process the second transaction request. The second transaction request may be electronically signed by the first user private key. The first user private key is mathematically related to the first user public address.

The process may continue at step S7046. At a step S7046, the second user device may send a third transaction request from a second user public address (associated with the second user and the second user device 105*b*) to the second contract address 6805A via the underlying blockchain 6803. The third transaction request may include a third message authorizing the stable value digital asset smart contract 6807B to accept a request to transfer a second amount of collateral from the second user public address to the second contract address 6805A. In embodiments, the third transaction request may further include third transaction fee information. The third transaction fee information, in embodiments, may be for miners on the blockchain 6803 to process the third transaction request. The third transaction request may be electronically signed by the second user private key. The second user private key is mathematically related to the second user public address.

In step S7048, the administrator system 6801 may send a fourth transaction request from the administrator public address to the first contract address 6807A via the underlying blockchain 6803. The fourth transaction request may include a fourth message including requests to: (1) transfer of the first amount of collateral of stable value digital asset tokens from the first user public address to the second contract address 6805A; and (2) transfer of a second amount of collateral of stable value digital asset tokens 6807 from the second user public address to the second contract address 6805A. The fourth transaction request may also be electronically signed by the administrator private key.

Alternatively, the second contract address 6805A may send a fourth transaction request to the first contract address 6807A via the underlying blockchain 6803. The fourth transaction request may similarly include a fourth message including requests to: (1) transfer of the first amount of collateral of stable value digital asset tokens 6807 from the first user public address to the second contract address 6805A; and (2) transfer of a second amount of collateral of stable value digital asset tokens from the second user public address to the second contract address 6805A.

Referring back to FIG. 70A, the process of FIG. 70A may continue with step S7014. In a step S7014, excess collateral in the first trade may be collected from the security token contract. Step S7014 is described in more detail in connection with FIGS. 70E-F.

Figure 70E:
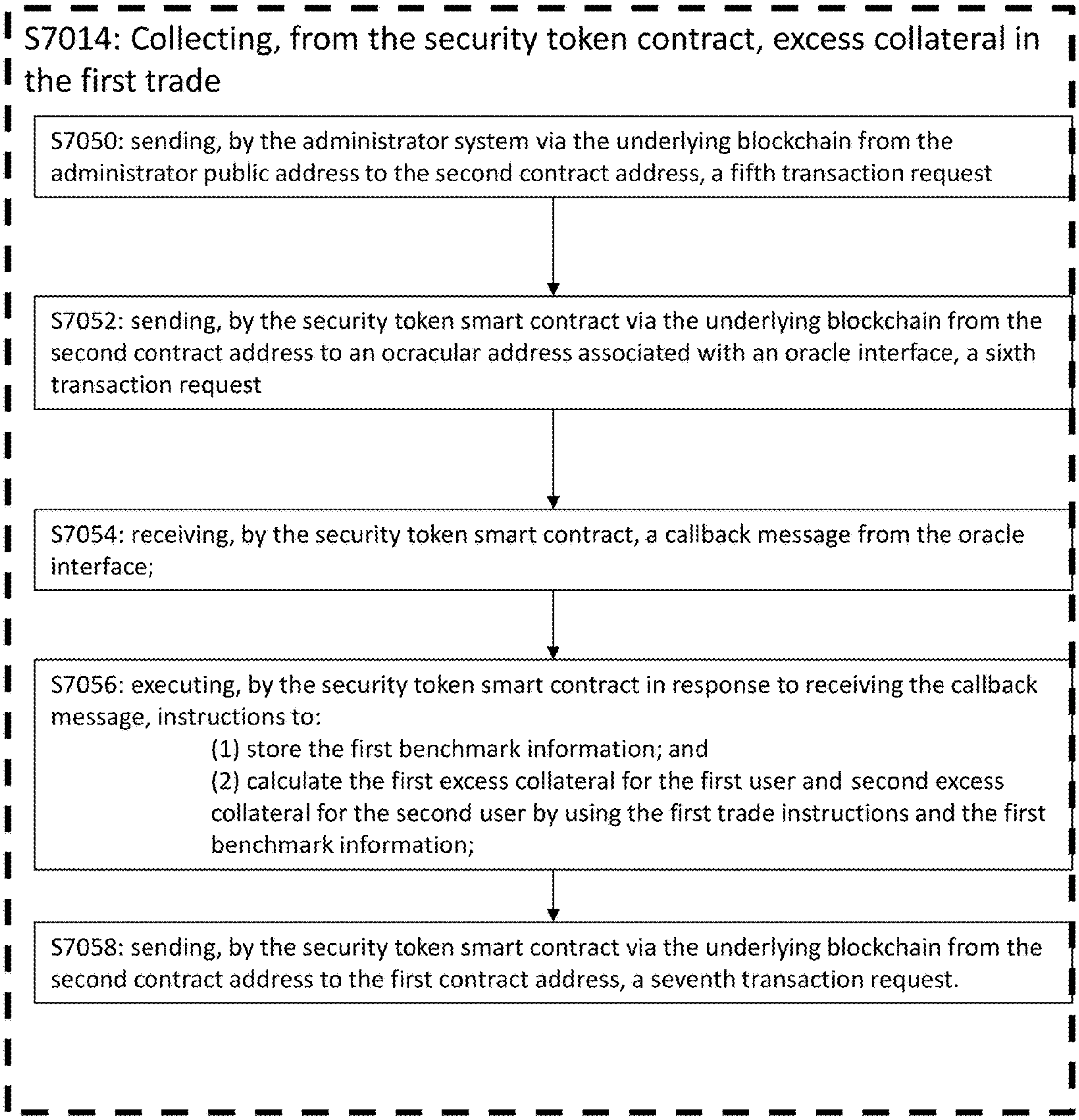
FIG. 70E is a flowchart of an exemplary sub-process of collecting excess collateral from a first user or a second user in a trade in accordance with exemplary embodiments.

Referring to FIG. 70E, in embodiments, collecting excess collateral may begin at step S7050. In a step S7050, the administrator system 6801 may send a fifth transaction request from the administrator public address to the second contract address 6805A via the underlying blockchain 6803. In embodiments, the fifth transaction request may include a fifth message comprising requests for the security token smart contract 6805 to determine and distribute excess collateral for the first trade in accordance with the security token smart contract 6805 and the first trade instructions. The fifth transaction request may be electronically signed by the administrator private key. The administrator private key is mathematically related to the administrator public address.

In response to the requests contained in the fifth message, as shown in step S7052, the security token smart contract 6805 sends a sixth transaction request from the second contract address 6805A to an oracle address associated with an oracle interface on the blockchain 6803. The sixth transaction request, in embodiments, may include a sixth message to obtain first benchmark data. In response to sending the sixth transaction request, in step S7054, the security token smart contract 6805 may receive a callback message from the oracle interface.

In response to receiving a callback message, in step S7056, the security token smart contract 6805 executes instructions to: (1) store the first benchmark information and (2) calculate the excess collateral for the first user (e.g. the user associated with user device 105*a*) and the second excess collateral for the second user (e.g. the user associated with user device 105*b*) by using the first trade instructions and the first benchmark information. In embodiments, the first excess collateral is the first amount of collateral less the difference between the first benchmark information and the inception value, to the extent it is greater than zero. In embodiments, the second excess collateral is the second amount of collateral less the difference between the inception value and the first benchmark information, to the extent it is greater than zero.

To the extent that the first excess collateral is greater than zero or the second excess collateral is greater than zero, in step S7058, the security token smart contract 6805 sends a seventh transaction request from the second contract address 6805A to the first contract address 6807A via the underlying blockchain 6803. The seventh transaction request, in embodiments, may include a seventh message requesting the stable value token smart contract 6807B to transfer. (1) the first excess collateral in stable value digital asset token from the second contract address 6805A to the first user public address (associated with the first user and user device 105*a*), to the extent the first excess collateral is greater than zero; and (2) the second excess collateral in stable value digital asset token from the second contract address 6805A to the second user public address (associated with the second user and user device 105*b*).

Figure 70F:
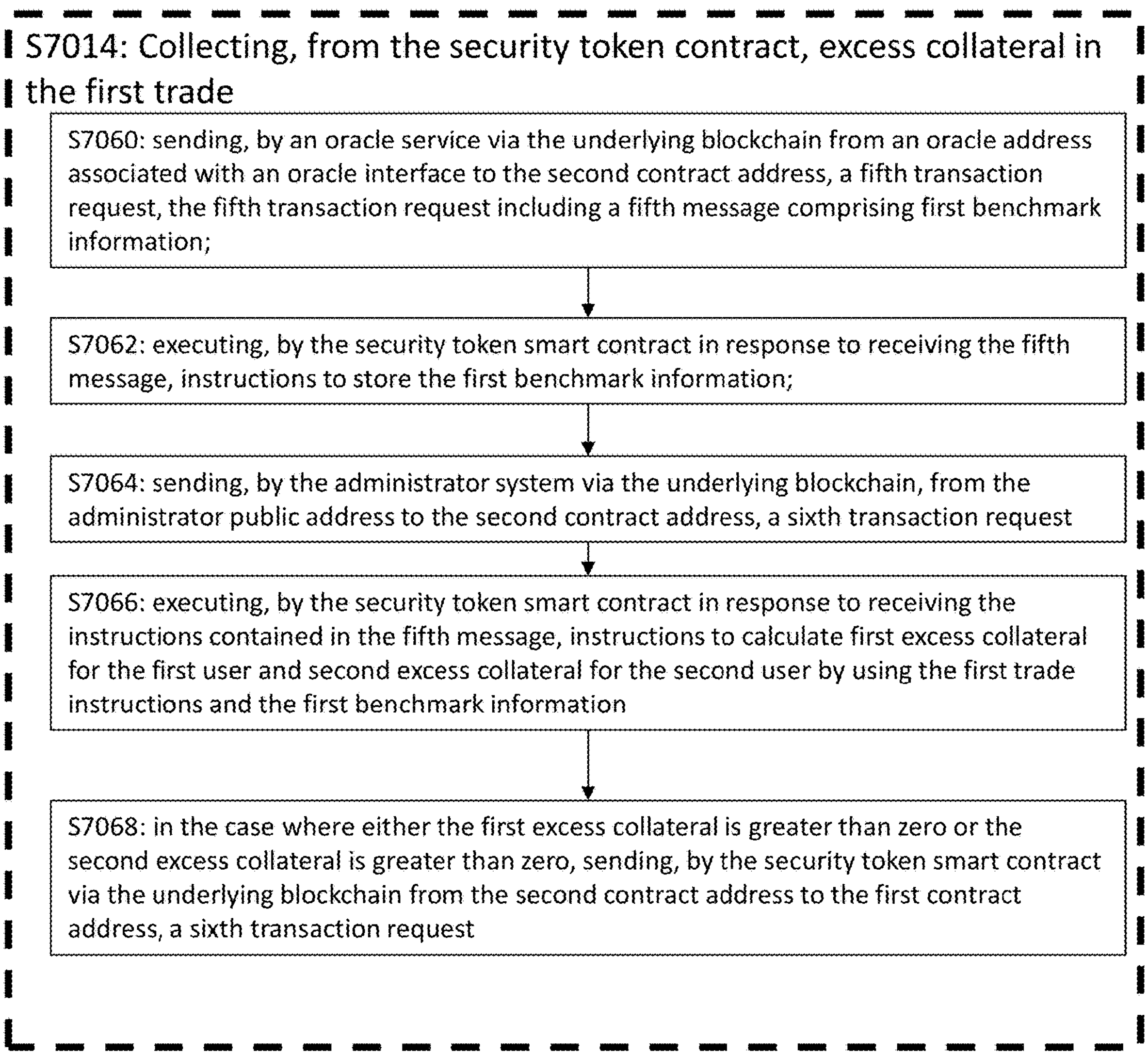
FIG. 70F is a flowchart of another exemplary sub-process of collecting excess collateral from a first user and a second user in a trade in accordance with exemplary embodiments.

Referring to FIG. 70F, in embodiments, collecting excess collateral may begin at step S7060 where an oracle service sends a fifth transaction request from an oracle address associated with an oracle interface to the second contract address 6805A via the underlying blockchain 6803. In embodiments, the fifth transaction request may include a fifth message comprising first benchmark information. In response to receiving the fifth message, in step S7062 the security token contract 6805B executes instructions to store first benchmark information.

The process in FIG. 70F may continue at step S7064. In step S7064, the administrator system 6801 may send a sixth transaction request from the administrator public address to the second contract address 6805A via the underlying blockchain 6803. The sixth transaction request, in embodiments, may include a sixth message comprising requests to the security token smart contract 6805 to determine and distribute excess collateral for the first trade in accordance with the security token smart contract 6805 and the first contract instructions. The sixth transaction request may also be electronically signed by an administrator private key (located in key information 6801C of FIG. 68A). The administrator private key is mathematically related to the administrator public address. In embodiments, the sixth transaction request may be sent by user device 105*a* from the first user public address (associated with a first user and user device 105*a*) to the second contract address 6805A. In embodiments where the sixth transaction request is sent by user device 105*a*, the sixth transaction request may also be electronically signed by a first user private key. The first user private key is mathematically related to the first user public address. Furthermore, in embodiments, the sixth transaction request may be sent by user device 105*b* from the second user public address (associated with a second user and user device 105*b*) to the second contract address 6805A. In embodiments where the sixth transaction request is sent by user device 105*b*, the sixth transaction request may also be electronically signed by a second user private key. The second user private key is mathematically related to the second user public address.

In response to the requests contained in the sixth message, in step S7014'D, the security token smart contract 6805 executes instructions via the blockchain 6803 to calculate first excess collateral for the first user (e.g. a user associated with user device 105*a*) and second excess collateral for the second user (e.g. a user associated with user device 105*b*) using the first trade instructions and the first benchmark information. In embodiments, the first excess collateral is the first amount of collateral less the difference between the first benchmark information and the inception value, to the extent it is greater than zero. In embodiments, the second excess collateral is the second amount of collateral less the difference between the inception value and the first benchmark information, to the extent it is greater than zero.

To the extent that the first excess collateral is greater than zero or the second excess collateral is greater than zero, in step S7014'E, the security token smart contract 6805 sends a seventh transaction request from the second contract address 6805A to the first contract address 6807A via the underlying blockchain 6803. The seventh transaction request, in embodiments, may include a seventh message requesting the stable value token smart contract 6807B to transfer. (1) the first excess collateral in stable value token from the second contract address 6805A to the first user public address (associated with the first user and user device 105*a*), to the extent the first excess collateral is greater than zero; and (2) the second excess collateral in stable value token from the second contract address 6805A to the second user public address (associated with the second user and user device 105*b*). As in step S7014E, if there is excess collateral, the second contract address 6805A sends the excess collateral to the user of which that excess collateral belongs.

In embodiments, the steps within the process described above in connection with FIGS. 70A-F may be rearranged or omitted.

Use of Oracles with Smart Contracts

In embodiments the smart contract may pull data from a trusted third party by using a query function, examples of which include Oracalize, etc. The query from the smart contract may include the address of the web API to be queried and the data requested. The third party service then accesses data through web APIs and provides this data to the smart contract through a callback response. The data obtained from web APIs may be parsed to provide data that is compatible with the smart contract, examples of such parsing including JSON, XML and HTML parsing, to name a few. The authenticity of the data provided by the third party may be verified by a cryptographic proofing service, examples of which can include TLSNotary Proofs, Android Proofs and Ledger Proofs, to name a few. In embodiments, the third party service may provide a pointer to an uploaded proof rather than provide the proof itself in order to limit the amount of data provided to the smart contract.

In embodiments, data may be pushed to a smart contract from an external intermediary. In embodiments, the external intermediary may be automated or manually controlled. The external intermediary may be identified in the smart contract as a trusted address. In embodiments, the external intermediary may push data to the smart contract that is representative of a value used by the smart contract. The data may be a copy of data that the external intermediary obtains through a web API. In other embodiments, the data may be derived from one or more sources of data, for example a blended price value based on data from multiple exchanges, as discussed elsewhere. In embodiments, the external intermediary may be a service that provides price information for one or more digital assets. In embodiments, the external intermediary may be hosted by an exchange or other digital asset computer system that provides price information for one or more digital assets.

In embodiments, the smart contract may pull data from a decentralized network of oracles. Queries for the same data may be sent to multiple oracles and the data returned by the oracles may be compared in order to establish the veracity of the data. In embodiments, the decentralized network of oracles may be an opinion market, examples of which include Auger and Gnosis, to name a few.

Generation of Digital Asset Exchange Graphical User Interfaces

The particular systems, methods, and program products of embodiments of the present invention that generate graphical user interface (GUI) provide a solution to electronic order book data visualization problems. The potential for large numbers of orders in an electronic order book creates a technical data visualization problem, whereby it can be difficult for a user (e.g., a trader) to determine how a particular order or prospective order will impact the market or the market within a particular digital asset exchange system or how a particular order will be fulfilled based upon pending orders in a current order book. Embodiments of the present invention provide electronic order book visualization interfaces that include a representation of a prospective order defined by order parameters, which may be edited by the user. Upon editing prospective order parameters, the prospective order graphical representation may be updated to reflect the new parameters. These interfaces can provide a user with an intuitive depiction of both the current market and the effect of the prospective order on the market. The interfaces can also show how a prospective order may be fulfilled, not fulfilled, and/or the degree to which a prospective order will likely be fulfilled based on the current electronic order book. The interfaces also provide an unconventional visualization that can facilitate faster comprehension of the bounds of order book data (e.g., order prices and corresponding order volumes).

FIGS. 35A-L are exemplary screen shots of graphical user interfaces generated and/or provided by an exchange computer system. In embodiments, the exchange computer system may transmit display data to user devices, which can comprise machine-readable instructions to render such user interfaces. User interfaces may be based at least in part upon user activity (transaction histories, order information, such as potential order parameters, actual order parameters, order fulfillment data, order dates and/or times, to name a few) and/or market activity (e.g., prices, historical prices, price movements, high and/or low prices within a time period, transaction volume, order book information, to name a few, either globally or on one or more particular digital asset exchanges). The exchange computer system may track such data, compute such data, generate such data, and/or obtain such data (e.g., via one or more application programming interfaces (APIs)). Data for generating a user interface may be stored in non-transitory computer-readable memory operatively connected to the exchange computer system. The exchange computer system may process logical rules governing user interface content and/or layout to generate display data and/or instructions for rendering an interface at a user electronic device. Such data and/or instructions may be transmitted to the user device, which may render the interface. In embodiments, the user device may executed the machine-readable instructions to render the interface, which may be a dynamic interface that changes in response to user inputs and/or receipt of updated data values.

Figure 35A:
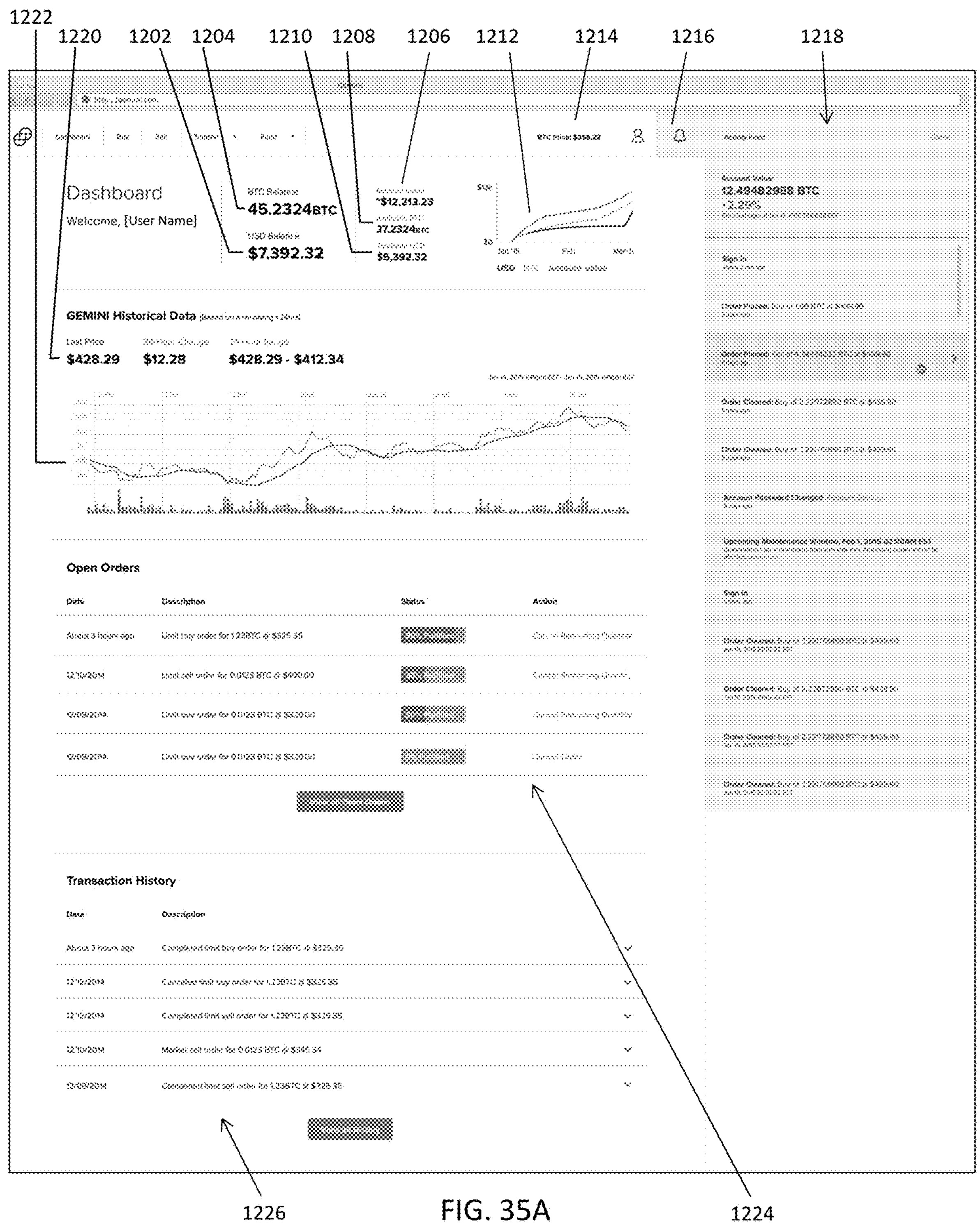
FIGS. 35A-L are exemplary screen shots of user interfaces provided by an exchange computer system in accordance with exemplary embodiments of the present invention.

Turning to FIG. 35A, a screenshot of a GUI for use with a digital asset exchange according to exemplary embodiments described herein is illustrated. The GUI may comprise a dashboard, which may present an overview of user activity (e.g., for a particular user or user account), exchange-wide activity, and/or broader market activity (e.g., based upon one or more exchanges or based upon a digital asset index, to name a few). For example, a current digital asset price 1214 may be displayed. Such price may be the market price based on the electronic order book of the digital asset exchange. In embodiments, such current digital asset price 1214 may be based upon one or more other exchanges and/or digital asset indices, which may provide a blended price (e.g., weighted by transaction volume at each price).

The dashboard GUI may present various information associated with a digital asset exchange, for example, balance information (including fiat currency balances 1202 and/or digital asset balances 1204), account value information (including present, past, and/or predicted values), historical trends, open orders, past orders, and/or user history, to name a few. Accordingly, such a dashboard interface may include account summary information, such as one or more digital asset balances 1204 and/or fiat currency (e.g., U.S. Dollar) balances 1202 associated with a particular user account or master account, which may be an umbrella account with a plurality of user sub-accounts. The dashboard interface may also include an account value 1206, which may be a sum of all digital asset balances and fiat currency balances. In embodiments, the account value may be expressed in digital asset quantities and/or in fiat currency amounts. Accordingly, the exchange computer system may estimate a conversion amount either from a digital asset balance to a fiat currency value or from a flat currency balance to a digital asset value, which conversions may be based upon order book information for the exchange and/or a digital asset index, such as a current market price. The dashboard interface may also indicate values for available digital assets 1208 and available fiat currencies 1210 associated with a user account. Amounts available may be based upon account balances and pending orders, such as by subtracting pending digital asset purchase order amounts from a fiat currency balance of a user's fiat currency account associated with (e.g., held in custody by) the exchange or subtracting pending digital asset sale order amounts from a digital asset balance of a user's digital asset account associated with (e.g., held in custody by) the exchange. One or more graphs 1212 illustrating account balances and/or total account value, in digital asset amounts or fiat currency amounts, may be provided in the interface. In embodiments, graphs showing each account balance and a total account value may be overlaid on each other.

A dashboard GUI may include options to access different data. Such options may comprise graphical buttons, hyperlinks, text, and/or icons, to name a few. The GUI can include a user account data selection option, settings selection option, and/or a notification selection option 1216, selection of any of which may cause the digital asset exchange computer system to provide respective data, menus, and/or updated GUIs. For example, a notification selection option 1216 may be used to access a notifications menu or notifications listing.

A dashboard GUI may further include exchange historical data 1220, such as a last price (e.g., price for the most recent executed transaction), a 24-hour change (e.g., a delta between the market price 24 hours prior and the current market price), price deltas over different time ranges (e.g., 30 minutes, 1 hour, 12 hours, 1 week, 1 month, 3 months, 1 year, 5 years, to name a few), a 24-hour range (e.g., showing the lowest and highest prices during the interval), and/or price ranges within other time ranges, to name a few. The dashboard GUI may also include a historical price and/or historical volume graph 1222. The graph may show exchange transaction prices over time and/or corresponding exchange transaction volumes over time. The graph may show transaction data from one or more other digital asset exchanges and/or digital asset indices. Any of this data may be overlaid on the graph. For example, digital asset index data may be overlaid on exchange transaction data.

A dashboard GUI may include an open orders listing 1224 showing open orders associated with an exchange user account. An open orders listing 1224 may indicate the date, time, and/or approximate time (e.g., about 3 hours ago) at which each order was placed. The listing 1224 may include a description of the order, e.g., order type, such as market or limit, purchase or sell, and/or order parameters, such as digital asset quantity, order price, limit order price, and/or total fiat currency amount. The listing 1224 may include an order status indicator, which may comprise a graphical indication, such as a status bar, of the degree to which each order is filled and/or text indicating the same (e.g., a percentage). The order listing 1224 may also include action options, selection of which may cause the exchange computer system to perform an action, such as canceling an order or canceling the remaining unfulfilled portion of an order. A truncated open order listing 1224 may be presented, which may include an option to view more or view all open orders.

A dashboard GUI may include a transaction history listing 1226. A transaction history may list some or all transactions associated with an exchange user account. A transaction history listing 1226 may indicate the date, time, and/or approximate time (e.g., about 3 hours ago) of each transaction and/or a description of the transaction (e.g., order type and/or order parameters, final order status, such as completed or canceled). In embodiments, the transaction history listing 1226 may include one or more options to display additional information (e.g., order details) for each transaction. A truncated transaction history listing may be provided, which may include an option to display more or all transactions (e.g., a view all history button).

A dashboard GUI may include an activity feed 1218 that displays summary information describing transactions, other actions (e.g., account funding), notifications, market activity, and/or exchange activity, to name a few. An activity feed 1218 may be accessed via a notification selection option 1216. Activity feeds are discussed herein with respect to FIGS. 12K-L.

Figure 35B:
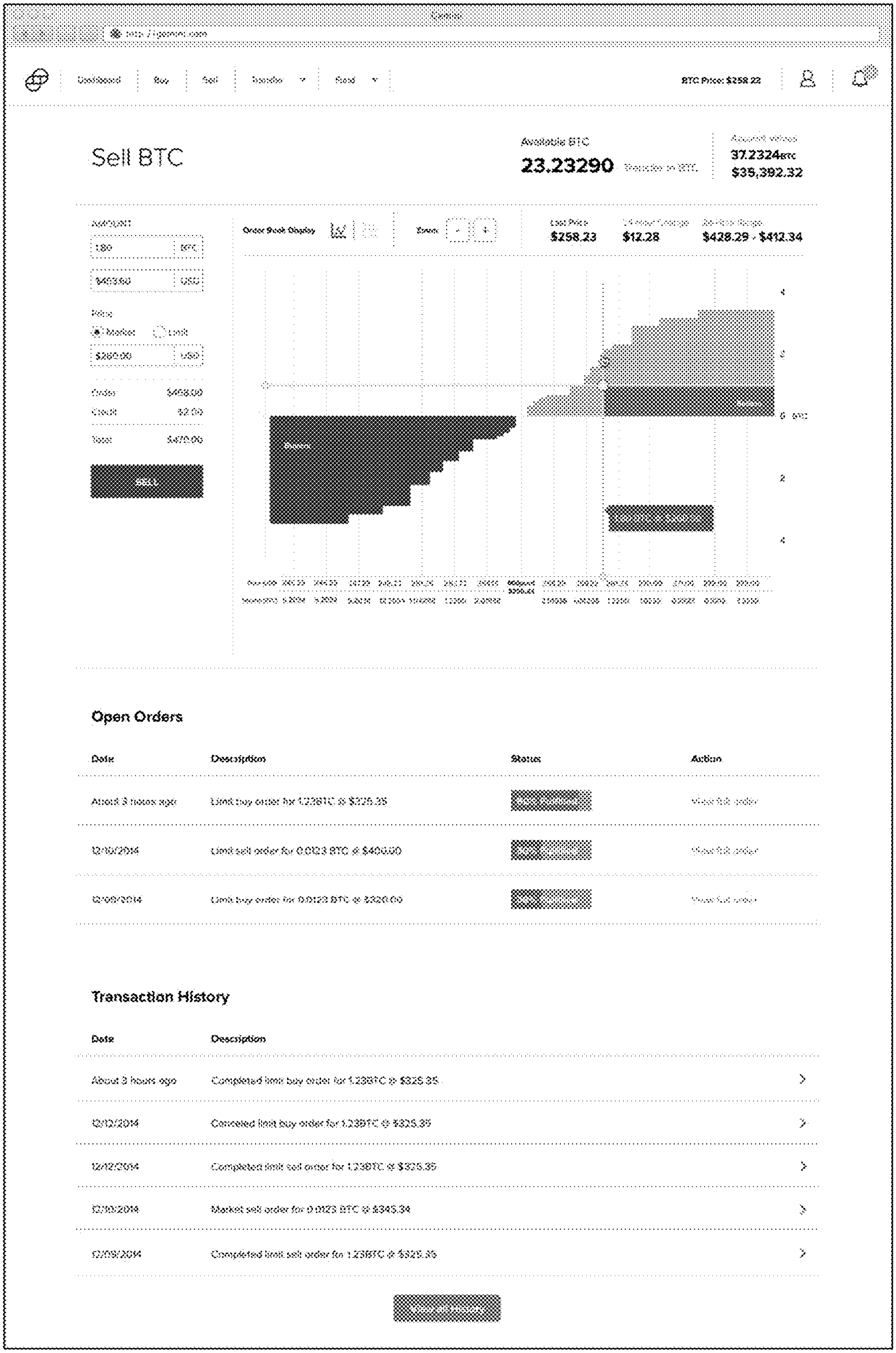

Referring to FIG. 35B, a screenshot of a GUI for use with selling a quantity of digital assets on a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input order parameters for a prospective sell order. Such order parameters can include a desired digital asset amount (e.g., a quantity of bitcoin) to sell, a total fiat amount to be sold (which may be a total digital asset value to be sold denominated in a fiat currency, such as USD), a digital asset price (e.g., a fiat currency amount corresponding to a single unit of digital assets), and/or an order type (e.g., market order, limit order). As shown, a user may designate a value of a digital asset to be sold based upon a market price determined by past and/or current sales of digital assets across a digital asset exchange.

The GUI may include a graphical representation of the order book and the prospective sell order. In embodiments, a first axis, such as the horizontal axis, may show price, and a second axis, such as a vertical axis, may show digital asset quantity. Digital asset quantity may increase in both directions moving away from the price axis. Sell orders may be shown on a first side of the price axis (e.g., above the price axis), while buy orders may be shown on a second side of the price axis (e.g., below the price axis). Accordingly, all pending digital asset sell and purchase orders from the electronic order book may be shown. In embodiments, less than all order may be shown based on the display bounds for one or both axes. A prospective sell order graphical representation may show the digital asset quantity for sale at each price at which it is for sale (e.g., the sell price and higher prices). Such a representation is evident in the dark portion in the upper right quadrant of the graph with respect to the price axis and the digital asset quantity axis taken at the spread point (this dark portion is the bottom right quadrant with respect to the prospective order crosshairs). The prospective sell order graphical representation may also show which pending buy orders from the order book will satisfy the sell order and/or how the sell order, once executed, will modify the existing order book. This can be seen as the dark portion in the lower left quadrant of the graph. A graphical indicator of one or more order parameters (e.g., digital asset quantity and price) may be overlaid on the graph, e.g., near the crosshairs. The exemplary GUI shows a prospective sell limit order with a limit order price above the market price. Accordingly, the order will not be satisfied by the pending purchase orders.

Figure 35C:
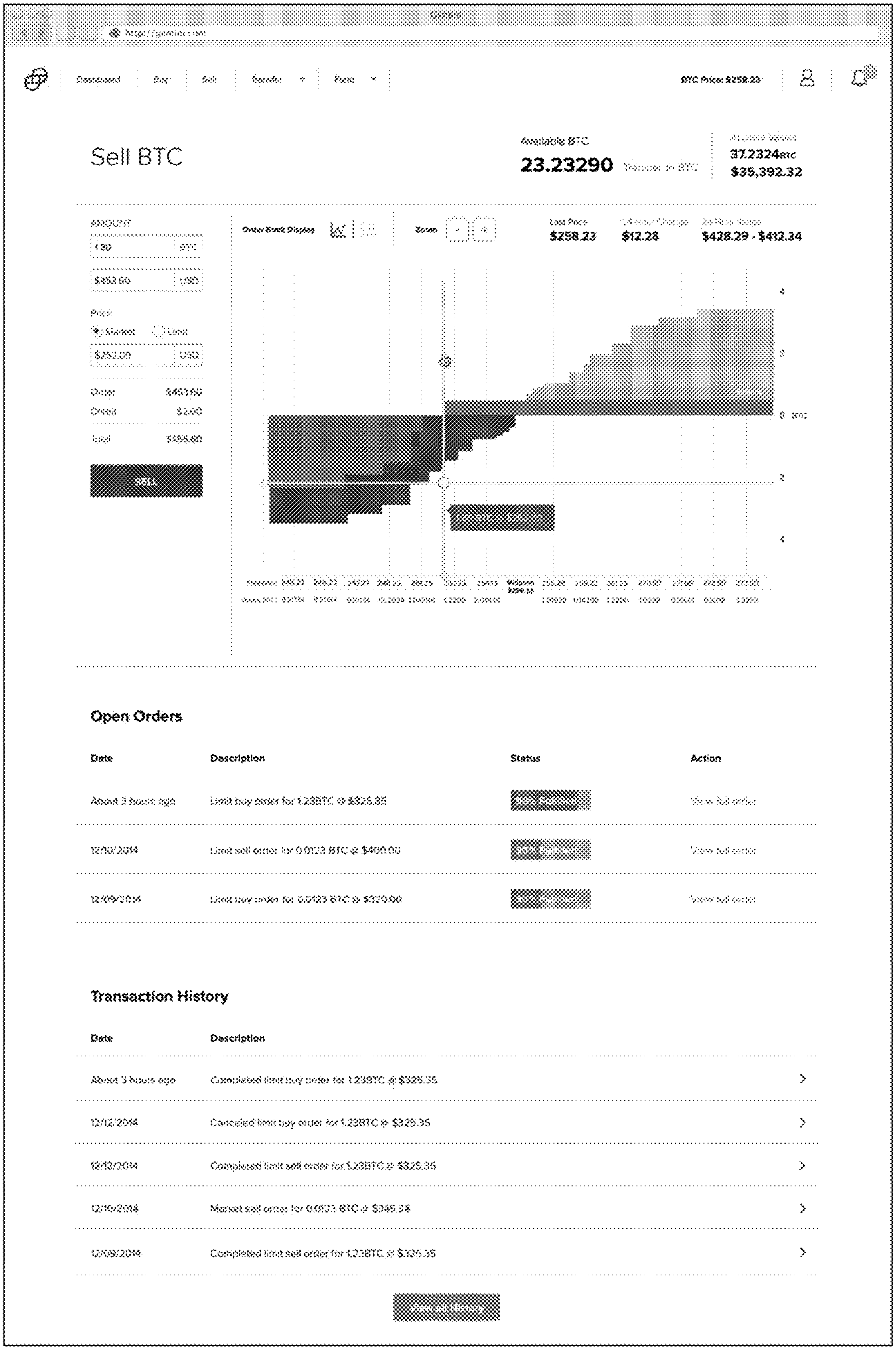

Turning to FIG. 35C, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a price determined by past and/or current purchases of digital assets across a digital asset exchange. The exemplary GUI shows a sell limit order with an order price lower than the market price. Accordingly, at least a portion of the sell limit order will be fulfilled by the pending purchase orders. The upper right quadrant of the graph shows the sell order book. The light-colored order book graphical representation may indicate the cumulative volumes at each price that are subject to pending sell orders. In embodiments, it may also include the volumes from the prospective sell order. The dark region in the upper right quadrant may indicate the order volume and order prices (e.g., the sell order limit price and any prices above it). In embodiments, the dark region may only show the portion of the prospective sell order that will be unfulfilled by the pending purchase orders.

Figure 35D:
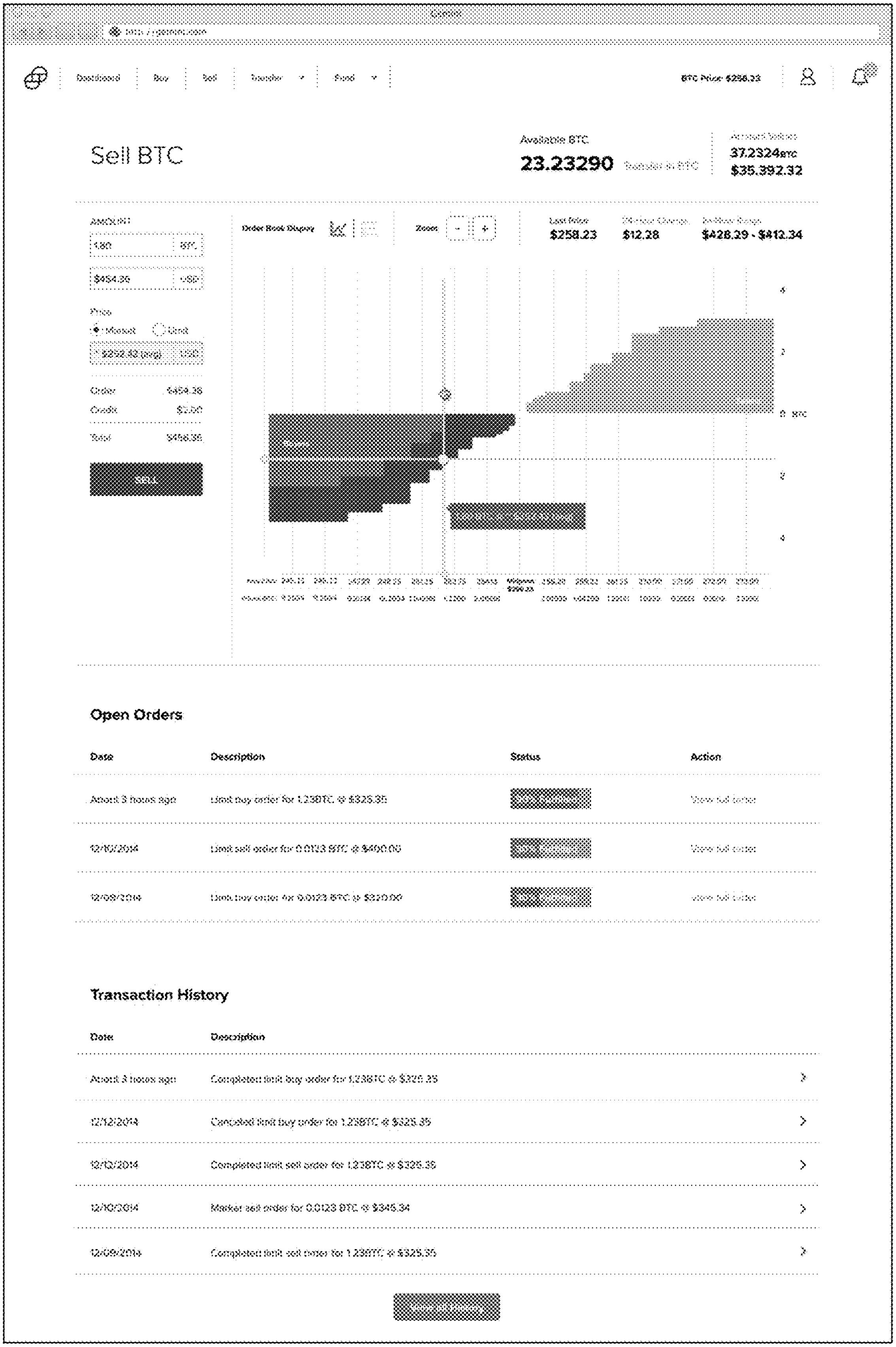
Figure 35E:
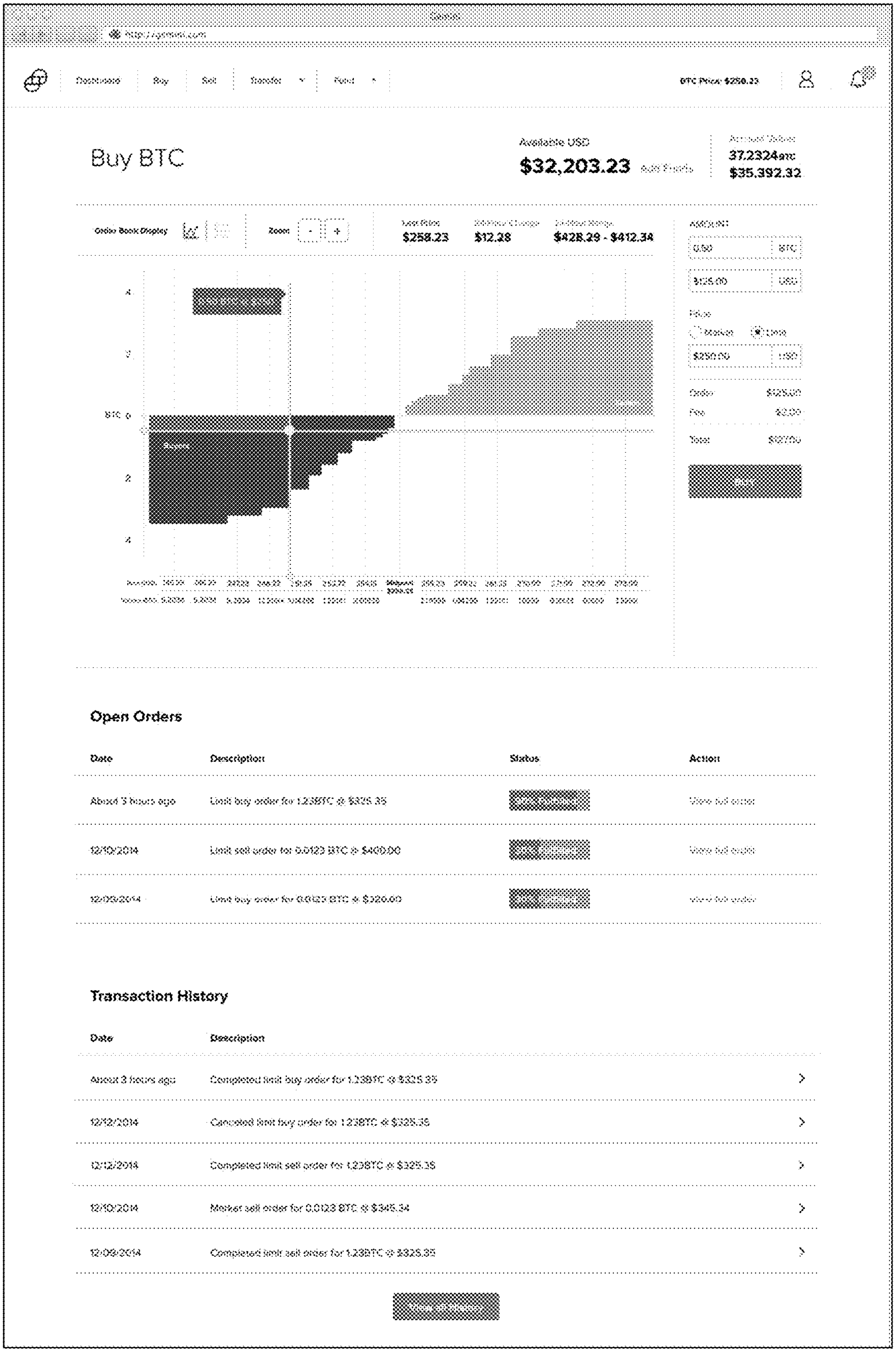

Turning to FIG. 35D, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a past and/or current averaged market value of digital assets traded across a digital asset exchange. The exemplary GUI shows a market sell order. The exchange computer system may execute the order at a current market price. In embodiments, the exchange computer system may place a plurality of market orders to satisfy the order (e.g., until the specified digital asset order quantity is reached and/or until the specified total cost is reached).

Referring to FIG. 12E, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current purchases of digital assets across a digital asset exchange. The exemplary GUI shows a prospective limit purchase order with an order price lower than the market price. Accordingly, the prospective order will not be satisfied by the existing sell orders. The sell order book graphical representation thus remains unchanged. The light region in the lower left quadrant shows the prospective purchase order.

Figure 35F:
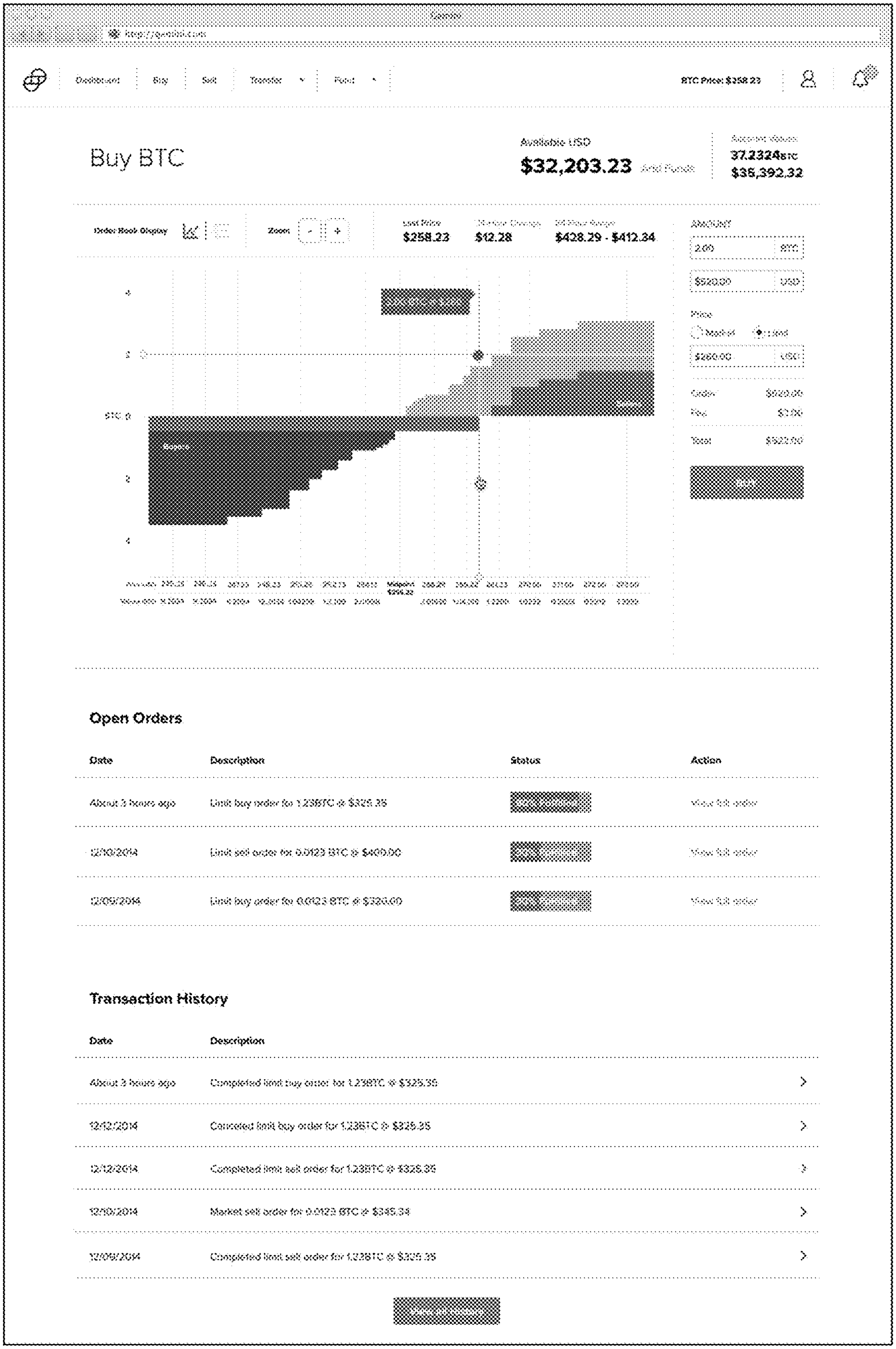

Turning to FIG. 35F, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current sales of digital assets across a digital asset exchange. The exemplary GUI shows a prospective digital asset limit purchase order with a limit order price higher than the market price. Therefore, at least a portion of the order will be satisfied by the pending sell orders. Thus the prospective purchase order graphical representation overlaps a portion of the pending sell order book graphical representation. In the upper right quadrant, the dark region shows the projected post-order graphical representation, which reflects that certain sell orders were fulfilled by the prospective purchase order, shifting the remaining sell order book to the right and decreasing the available sell order volume.

Figure 35G:
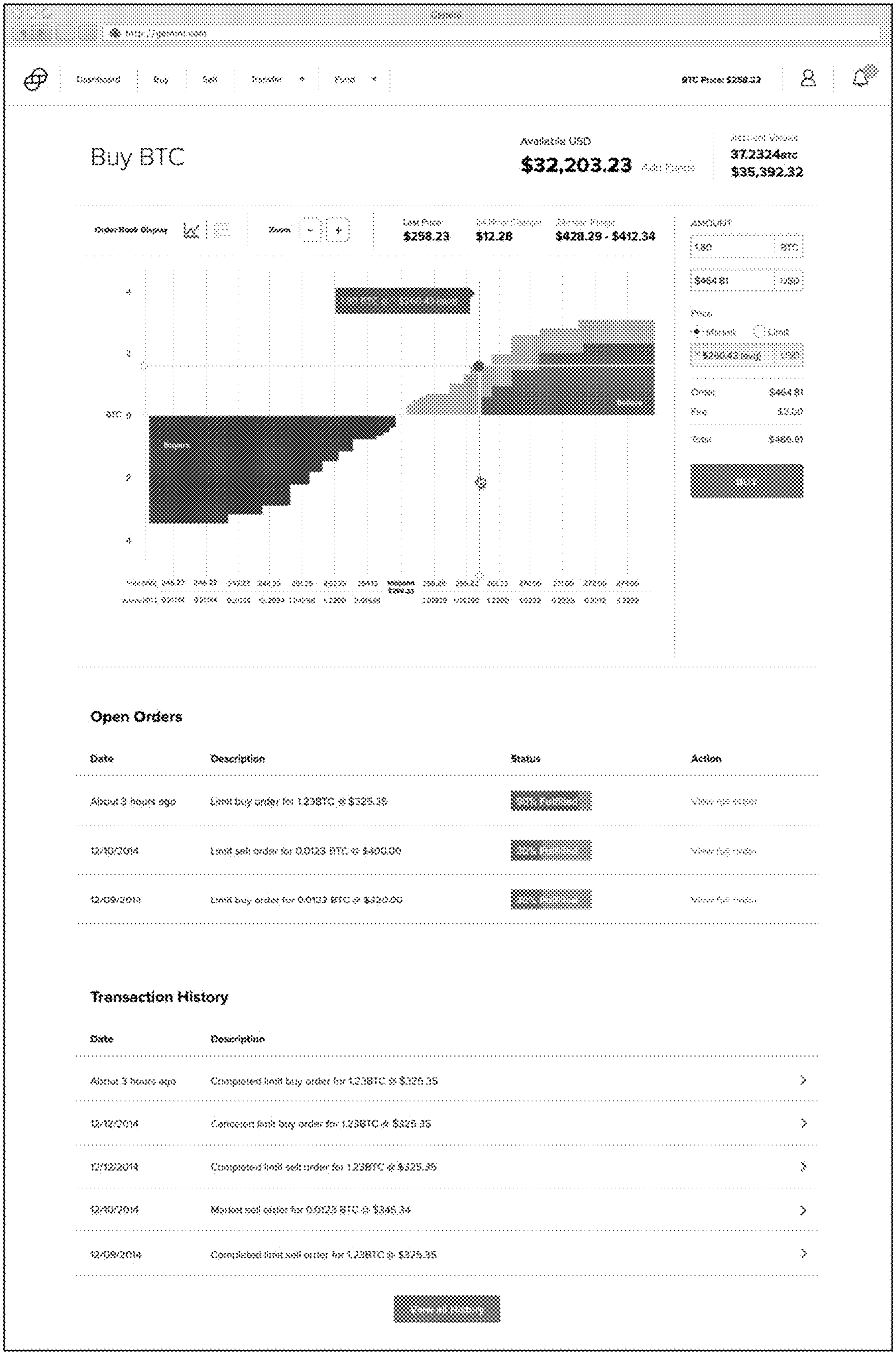

Turning to FIG. 35G, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon an averaged market value of digital assets traded across a digital asset exchange. The exemplary GUI shows a prospective market purchase order. In the upper right quadrant, the dark region shows a post-order sell order book, which provides a visualization of how the sell order book will be modified by the prospective order. In this case, fulfilling the purchase order volume will reduce the available volume in the sell order book.

Figure 35H:
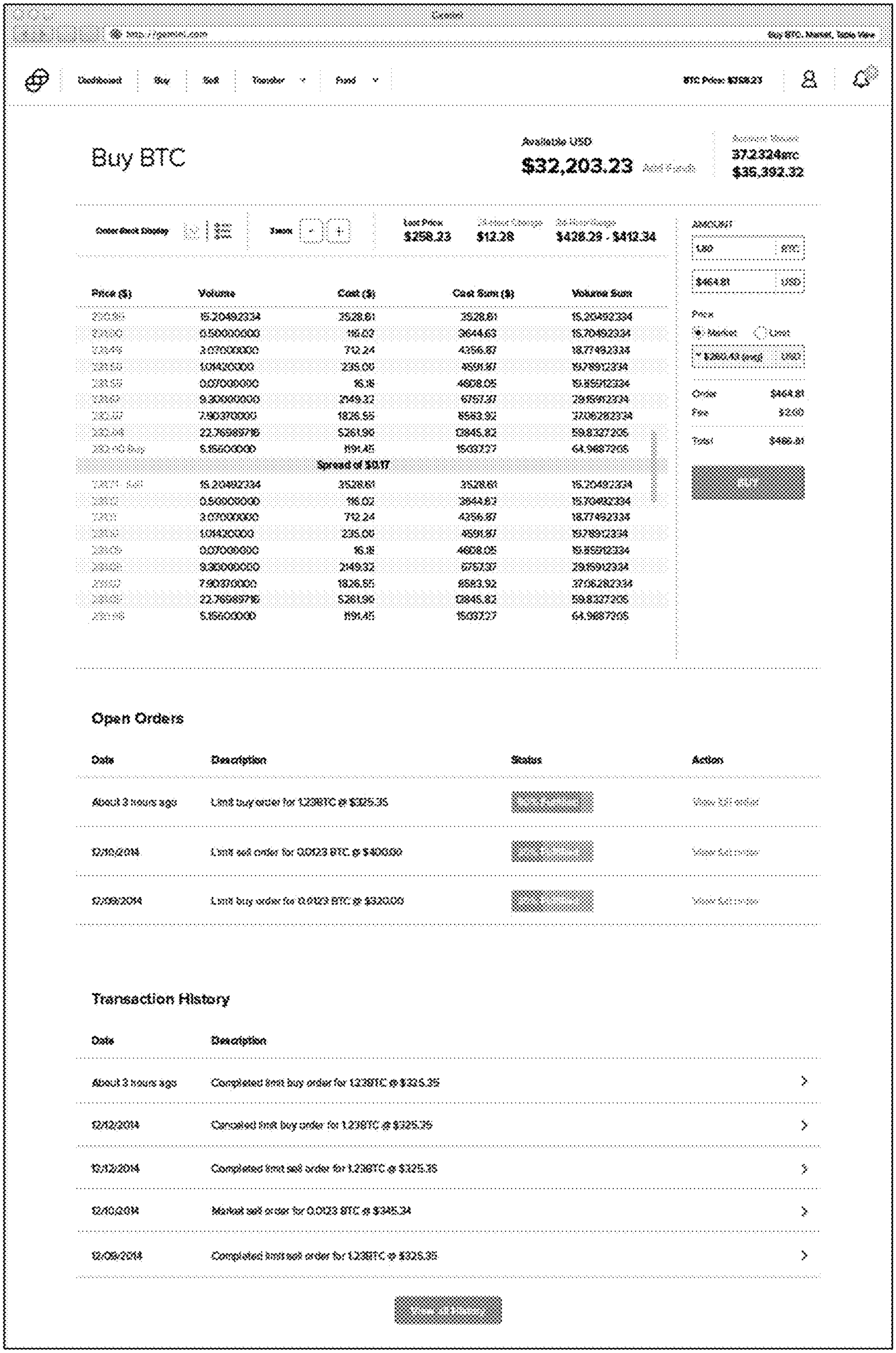
Figure 35I:
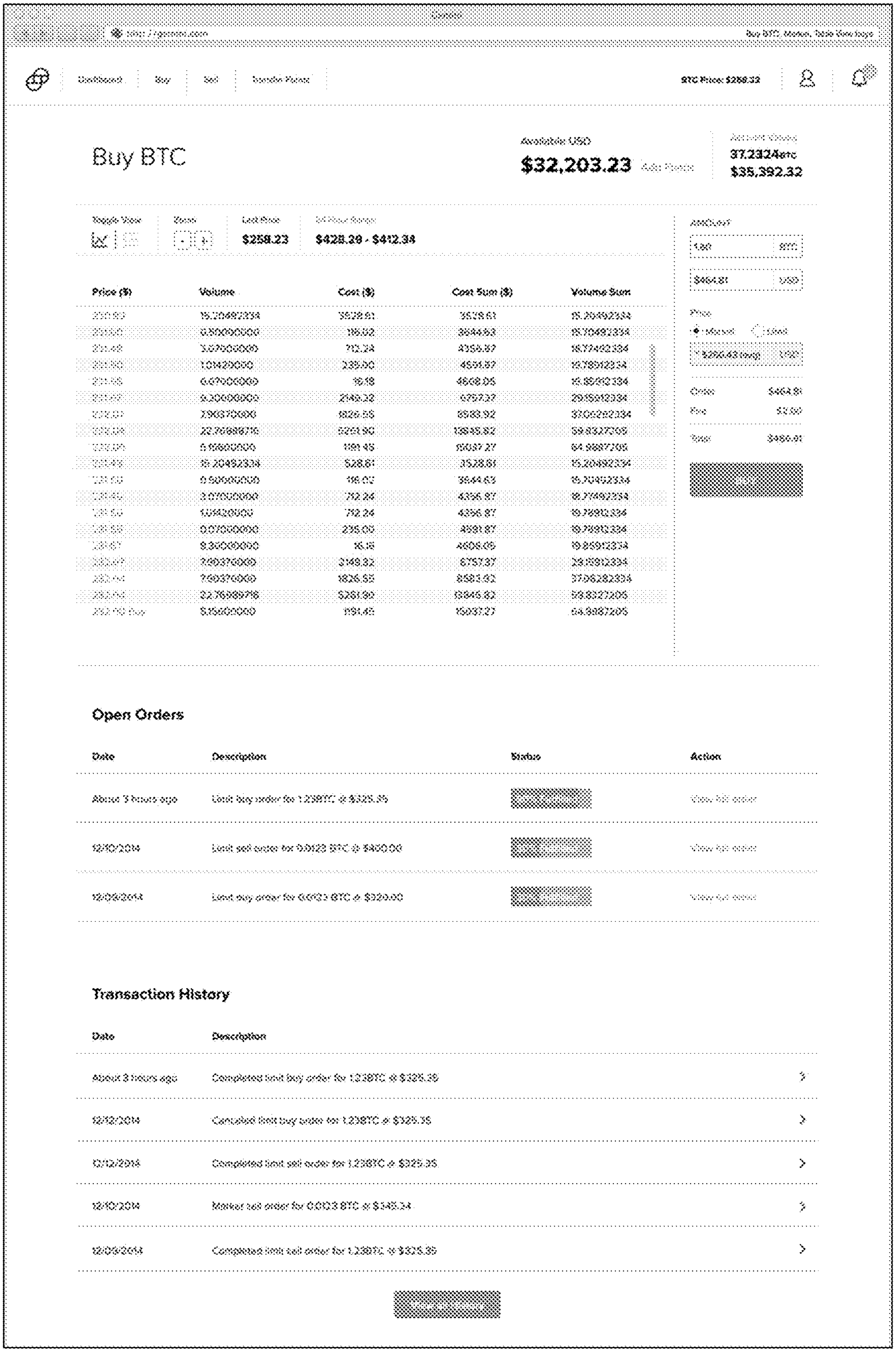
Figure 35J:
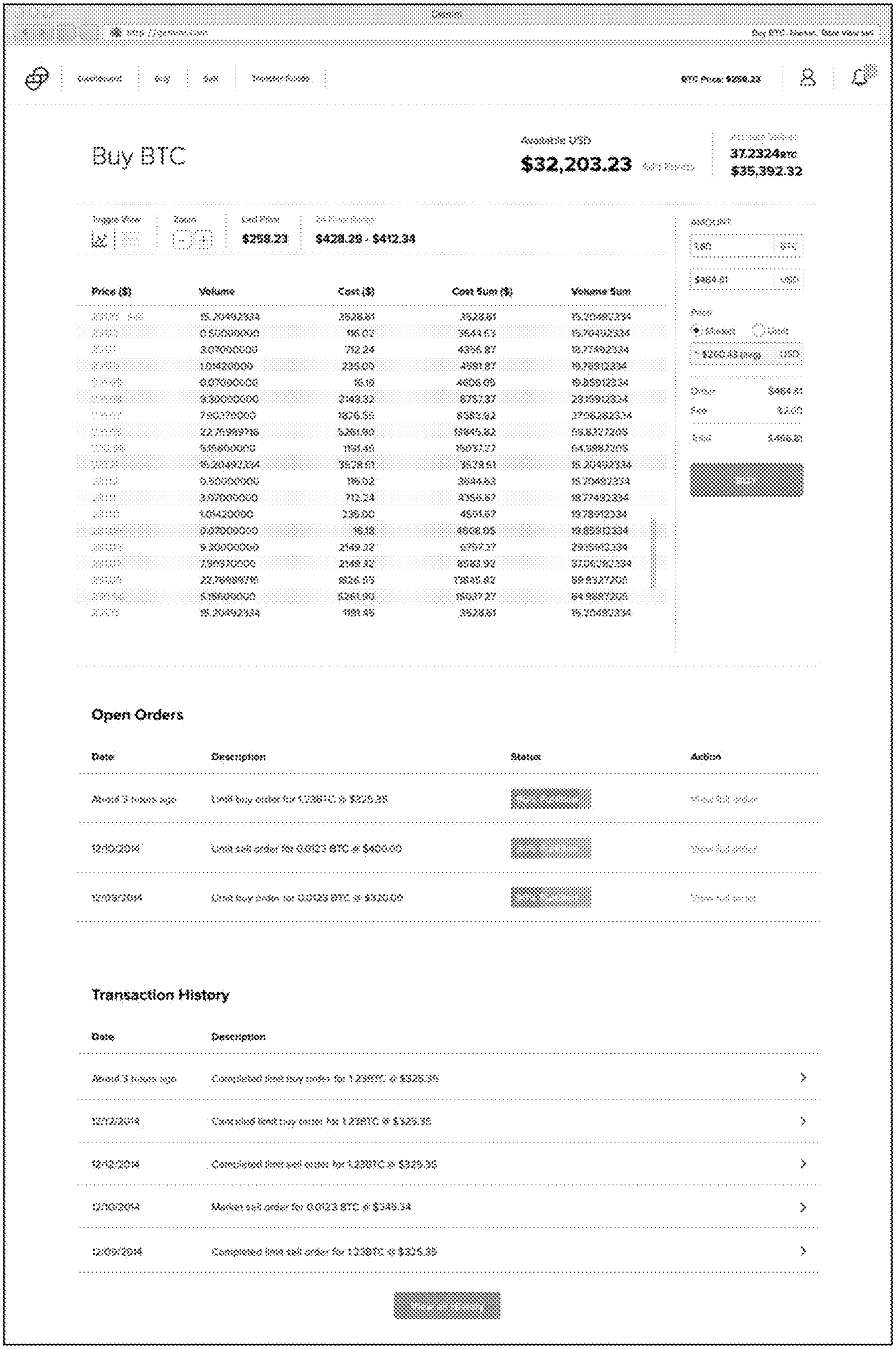

FIGS. 35H-J are screen shots of exemplary graphical user interfaces showing digital asset order listings for pending digital asset orders in an electronic order book in accordance with exemplary embodiments of the present invention. Like the dashboard and order graph GUIs described herein, an order listing GUI may display market activity data, exchange activity data, and/or user account data (e.g., account balances and/or values). An order listing GUI may provide user input fields where a user can specify order parameters, such as order types, order price (e.g., denominated in fiat currency), order amount (e.g., a quantity of digital assets), and/or order value (e.g., a total fiat amount corresponding to a price, such as a user specified price, and a quantity). An order listing GUI may include an open orders listing and/or a transaction history listing.

FIG. 35H shows a listing of pending digital asset orders from an electronic order book of the digital asset exchange, where the listing is centered at a spread value. The pending digital asset orders can include both digital asset purchase orders and digital asset sell orders. A pending order may be an order or portion of an order that is not yet fulfilled. The order listing may include for each order any of an order price (e.g., a price per unit of digital asset), order volume (e.g., a quantity of digital assets), order cost (e.g., the product of the order price and order volume), cost sum (e.g., a cumulative cost that sums the cost of the preceding orders of the same order type approaching the spread value), and a volume sum (e.g., a cumulative volume that sums the order volumes of the preceding orders of the same order type approaching the spread value).

A spread value may be displayed between the listing of pending purchase orders and the listing of pending sell orders. A graphical and/or textual indicator may indicate a current spread value, which may be determined based on the difference between the highest order price for a pending purchase order and the lowest order price for a pending sell order.

The order listings may be arranged according to price. Thus, the sell order listing may be arranged from highest price to lowest price, with the lowest price listed just before the spread value. After the spread value the purchase order listing may start with the highest purchase price and continue to list orders at each subsequent lower order price. In embodiments, the purchase orders may be listed above the spread value, and the sell orders may be listed below. In other embodiments, the sell orders may be listed first, above the spread value, and the purchase orders may be listed below the spread value. In embodiments, a subset of orders may be displayed in the graphical order listing at a given time. For example, a scroll bar may be used to navigate to additional orders towards the top and/or bottom of the list.

FIG. 35I shows an electronic order book listing where the list has been navigated (e.g., scrolled) up to display additional orders (e.g., buy orders).

FIG. 35J shows an electronic order book listing where the list has been navigated (e.g., scrolled) down to display additional orders (e.g., sell orders).

Figure 35K:
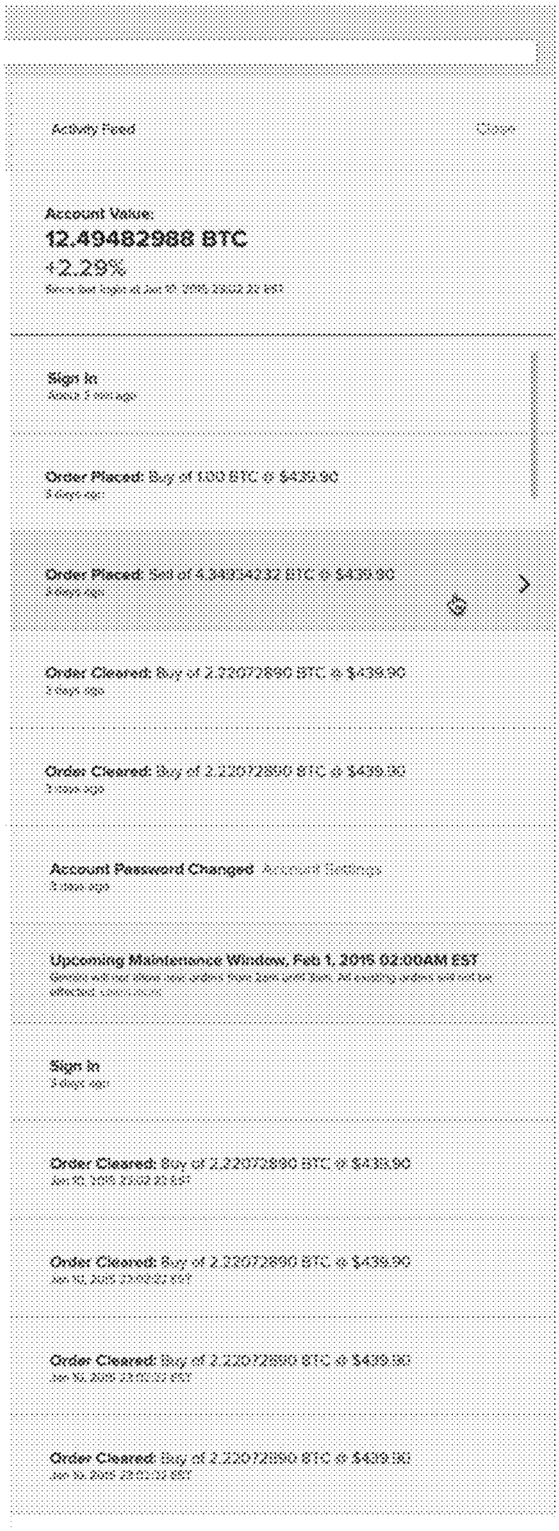
Figure 35L:
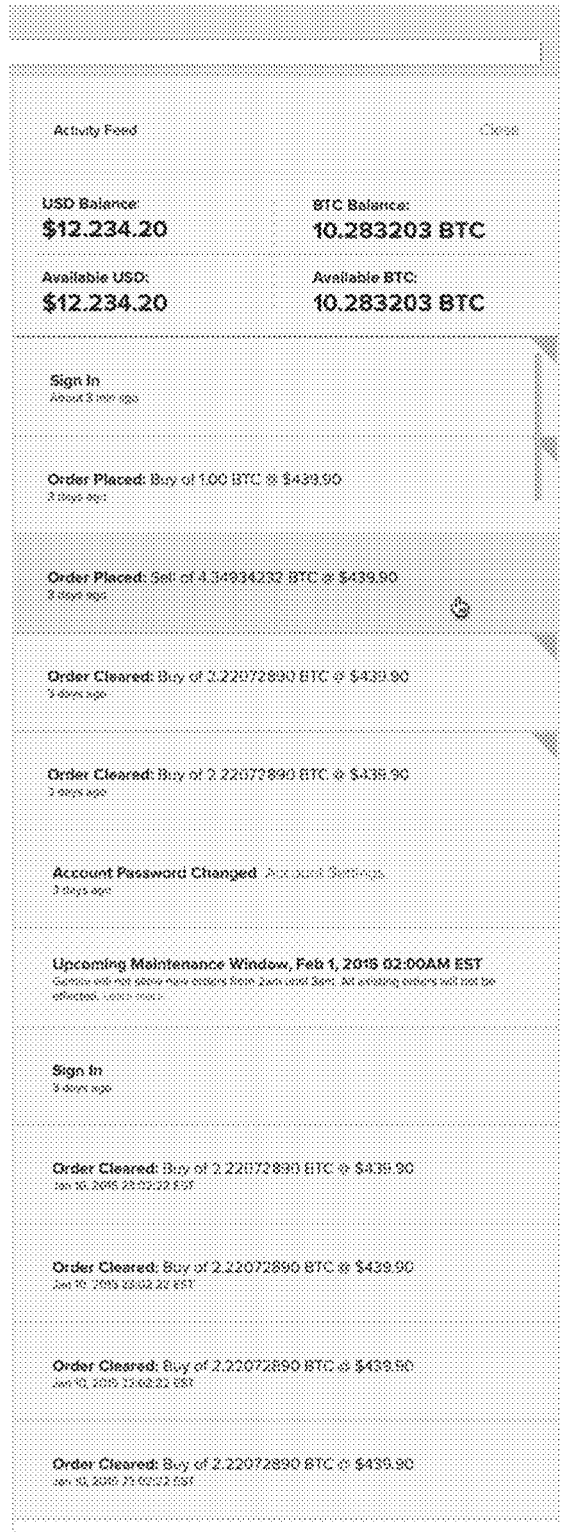

FIGS. 35K-L are screen shots of exemplary graphical user interfaces showing an activity feed related to a user account registered with a digital asset exchange. As illustrated, an activity feed may include account summary information, such as account balances, account values, and/or changes in account value (e.g., over a time period or since a particular time, such as a time of last logon to the exchange computer system). The activity feed may list events, which may be related to user actions (e.g., logging on, placing an order, canceling an order) and/or independent events (e.g., the clearing of an order). Each event may have a description (e.g., order parameters, status information) and/or an associated date and/or time indicator. The activity feed may also display digital asset news events and/or messages (e.g., schedule information for exchange computer system maintenance). Selecting (e.g., clicking, tapping, hovering) an activity feed entry may cause the GUI to display additional information related to the entry. The activity feed may be navigated (e.g., scrolling, selecting a button for additional entries) to display additional entries, which may be older activity feed entries.

FIG. 35L illustrates that unread activity feed entries may comprise an unread indicator, which may comprise a different color (e.g., background color) and/or a graphical representation (e.g., shape, triangle shape, icon, or text in the upper right corner or elsewhere within the entry). The unread indicator may be removed after a user hovers over the respective activity feed entry, selects it (e.g., clicks or taps it), and/or upon a subsequent opening of the activity feed.

FIGS. 50A-E are exemplary screen shots of user interfaces related to purchase transactions provided by an exchange computer system in accordance with exemplary embodiments of the present invention. Each graphical user interface may include navigation options for accessing other user interfaces (e.g., webpages or application GUIs). Such navigation options can include a dashboard selector 7302 (e.g., to access a dashboard GUI), a buy selector 7304 (e.g., to access a buy order GUI), a sell selector 7306 (e.g., to access a sell order GUI), and/or a transfer fund selector 7308 (e.g., to transfer funds to or from the exchange). Additional navigation options may be provided for accessing other GUIs, accessing data, and/or modifying the GUIs (e.g., displaying a menu, such as a drop-down menu, displaying an overlay or graphical panel). These additional navigation options can include a user account selector 7309 and/or an alerts or activity feed selector 7311, which may toggle display of an activity feed 7310. As illustrated, the activity feed 7310 can include user account information 7312, such as a fiat account balance, digital asset account balance, available fiat amount (e.g., not subject to pending orders), and/or available digital asset amount (e.g., not subject to pending orders). In embodiments where a digital asset exchange handles multiple fiat currencies and/or multiple digital assets, the interface may reflect such summary information for each currency and asset. In embodiments, the GUIs may also include order history listings, which may show completed orders and/or open orders.

The purchase order GUIs may include market summary information and/or exchange summary information 7318 (e.g., last price, 24-hour change, 24-hour range, and/or such values over other time periods). A time indicator may indicate a time at which the summary information was last updated.

Each purchase order GUI may also include purchase order parameter input fields, such as a digital asset quantity input field 7322, which may include a digital asset identifier (e.g., BTC). Such a digital asset identifier may be changeable by a user to select a particular digital asset type for the transaction. Purchase order parameter input fields can also include an order type selector 7324 (e.g., for choosing between market and limit orders), an order price input field 7326, and/or a total cost field 7328. In embodiments, the order price input field 7326 and/or the total cost field 7328 may comprise fiat currency identifiers, which may be changeable to specify or view a price in different fiat currencies. In embodiments, exchange transactions from one digital asset to a second digital asset may be performed, in which case the fiat currency identifiers would be replaced with digital asset identifiers.

In embodiments, the user may input one or more purchase order parameters and the exchange computer system may calculate one or more other purchase order parameters. In embodiments, only a user may change the order price. Accordingly, a user input in the total cost field 7328 may cause the exchange computer system to calculate a digital asset quantity order based at least in part upon the price parameter and/or to populate the calculated digital asset quantity in the digital asset quantity input field 7322. Similarly, a user input in the digital asset quantity input field 7322 may cause the exchange computer system to calculate, based at least in part upon the price parameter, a total cost and/or populate that total cost in the total cost field 7328. In other embodiments, the exchange computer system may be able to calculate and/or re-calculate the order price, in addition to the other order parameters. If two parameters are entered by a user the exchange computer system may calculate the last parameter and/or populate its respective field. If the user then changes one of the three parameters after those fields are each populated the exchange computer system may recalculate one of the parameters (e.g., the second to last parameter input, the third to last parameter input).

Selection of a purchase option 7336 (e.g., a purchase graphical button) may cause the exchange computer system to place a purchase and/or execute an order corresponding to the input order parameters.

Order information based at least in part upon the order parameters may be calculated and displayed in the GUIs. For example, an order sub-total 7330 may be the value from the total cost field 7328. A fees value 7332 may indicate any fees associated with the transaction (e.g., fees charged by the exchange, government fees, to name a few). An order total 7334 may indicate the sum of the order sub-total 7330 and the fees 7332.

Tables, charts, and/or graphs may provide graphical representations of exchange data, such as electronic order book data, prospective order data, and/or pending order data. An order book display type indicator 7320 may be used to toggle between different graphical representation types, such as toggling between an order book graph and an order book listing.

Figure 50A:
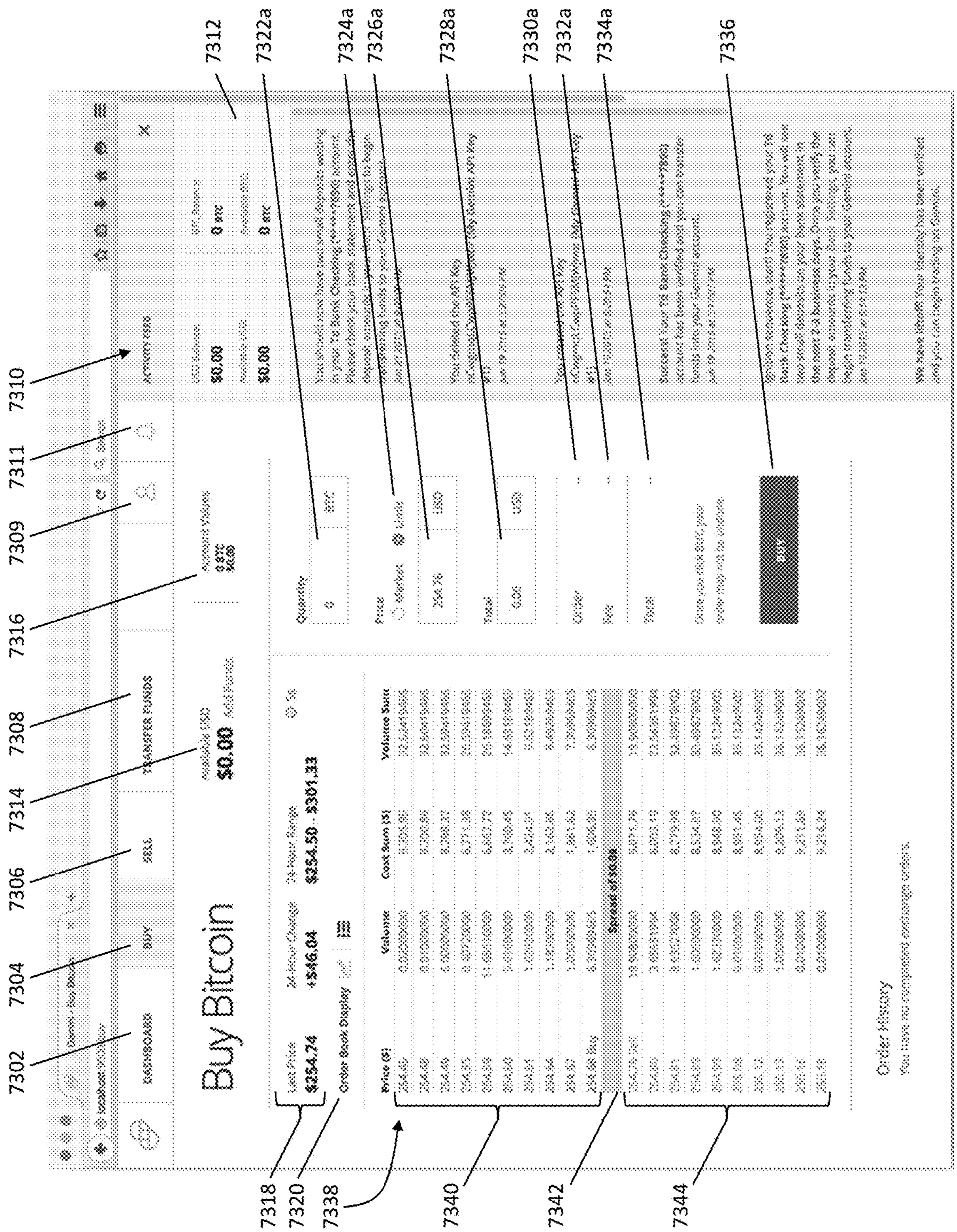
FIGS. 50A-E are exemplary screen shots of user interfaces related to purchase transactions provided by an exchange computer system in accordance with exemplary embodiments of the present invention.

FIG. 50A shows a purchase order graphical user interface comprising an order book listing 7338. The order book listing 7338 may be a table comprising respective entries for each of a plurality of pending digital asset orders. In embodiments, the listing may comprise an entry for each order in the order book. In embodiments, the order book listing can comprise a truncated listing of orders in the exchange order book. Additional entries may be accessed by scrolling through the listing and/or selecting an option to display more entries. An entry may include order parameters such as an order price and/or digital asset volume or quantity. The order book listing 7338 may be arranged according to price, e.g., increasing order price or decreasing order price. A purchase or buy order book listing 7340 may comprise entries for each pending digital asset purchase order, and a sell order book listing 7344 may comprise entries for each pending digital asset sell order. The purchase orders may be grouped together in the purchase order book listing 7340, while the sell orders may be grouped together in the sell order book listing 7344. A graphical representation of a spread value 7342 may be displayed between the purchase and sell order book listings. The spread value graphical representation 7342 may comprise text indicating the spread value, which may be the price difference between the lowest sell order price and the highest purchase order price.

An order book listing entry may also include a cost sum, which may be a sum of the costs (e.g. product of price and digital asset quantity) of all preceding orders in the listing moving away from the spread value. Accordingly, the cost sum will be calculated separately on the buy side and the sell side of the order book listing. Similarly, an entry can include a volume sum, which may comprise a sum of the volumes of the previous order entries in the listing moving away from the spread value. In embodiments, the order book listing 7338 may include an entry for the prospective purchase order, which may be positioned within the purchase order book listing 7340 according to its order price parameter. Such an entry for a prospective order may be rendered with a different color (e.g., font color, background color, border color, to name a few).

Figure 50B:
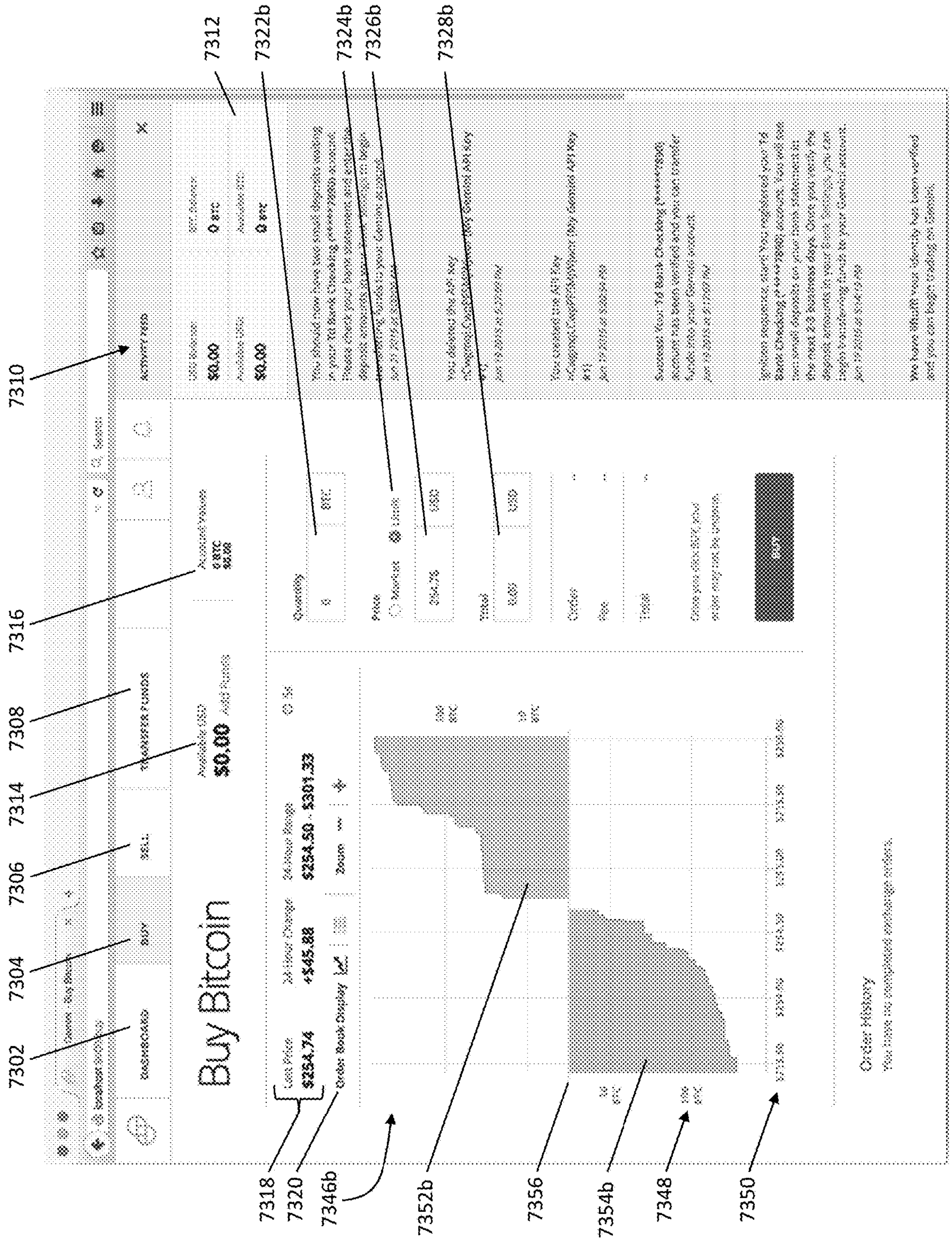

FIG. 50B shows a purchase order GUI comprising an electronic order book graphical representation 7346*b*. The order book graphical representation may have been selected using the order book display type indicator 7320. The order book graphical representation may be a graph having an order price axis 7356, which may be a first axis depicting order prices. It may be a horizontal axis. Price values 7350 may be displayed corresponding to the scaling of the order price axis 7356. The graph may also comprise a digital asset quantity axis 7348, which may extend outward from the order price axis 7356 in two directions, each direction indicating increasing digital asset quantity. In embodiments, the digital asset quantity axis 7348 may have a logarithmic scaling. A first order book graphical representation, which may be a sell order book graphical representation 7352*b*, may be depicted on a first side of (e.g., above) the order price axis 7356. The sell order book graphical representation 7352*b* may show at each order price a corresponding cumulative quantity of digital assets subject to pending digital asset sell orders. A second order book graphical representation, which may be a purchase order book graphical representation 7354*b*, may be depicted on a second side (e.g., below) the order price axis 7356. The purchase order book graphical representation 7354*b* may show at each order price a corresponding cumulative quantity of digital assets subject to pending digital asset purchase orders. A gap along the order price axis 7356 between the sell and purchase order book graphical representations may represent the spread value. In embodiments, a textual indicator of the spread value may be overlaid on the graph.

In embodiments, the order book graphical representations may only show a subset of pending digital asset purchase and/or sell orders. For example, a user may manipulate the scaling of the graph, such as by using zoom controls. A user may navigate the graph by scrolling or panning. In embodiments, the positions of the sell and buy order book graphical representations with respect to the order price axis 7356 may be flipped. The sell and buy order book graphical representations may be rendered using different colors and/or different shading or hatching techniques. For example, the sell order book graphical representation 7352*b* may be rendered as orange while the purchase order book graphical representation 7354*b* may be rendered as blue.

As can be seen, a digital asset quantity input field 7322*b* indicates a quantity of 0 digital assets. Accordingly, the graph may not show any representation corresponding to the prospective order defined by order parameters input by a user and/or calculated by the exchange computer system.

Figure 50C:
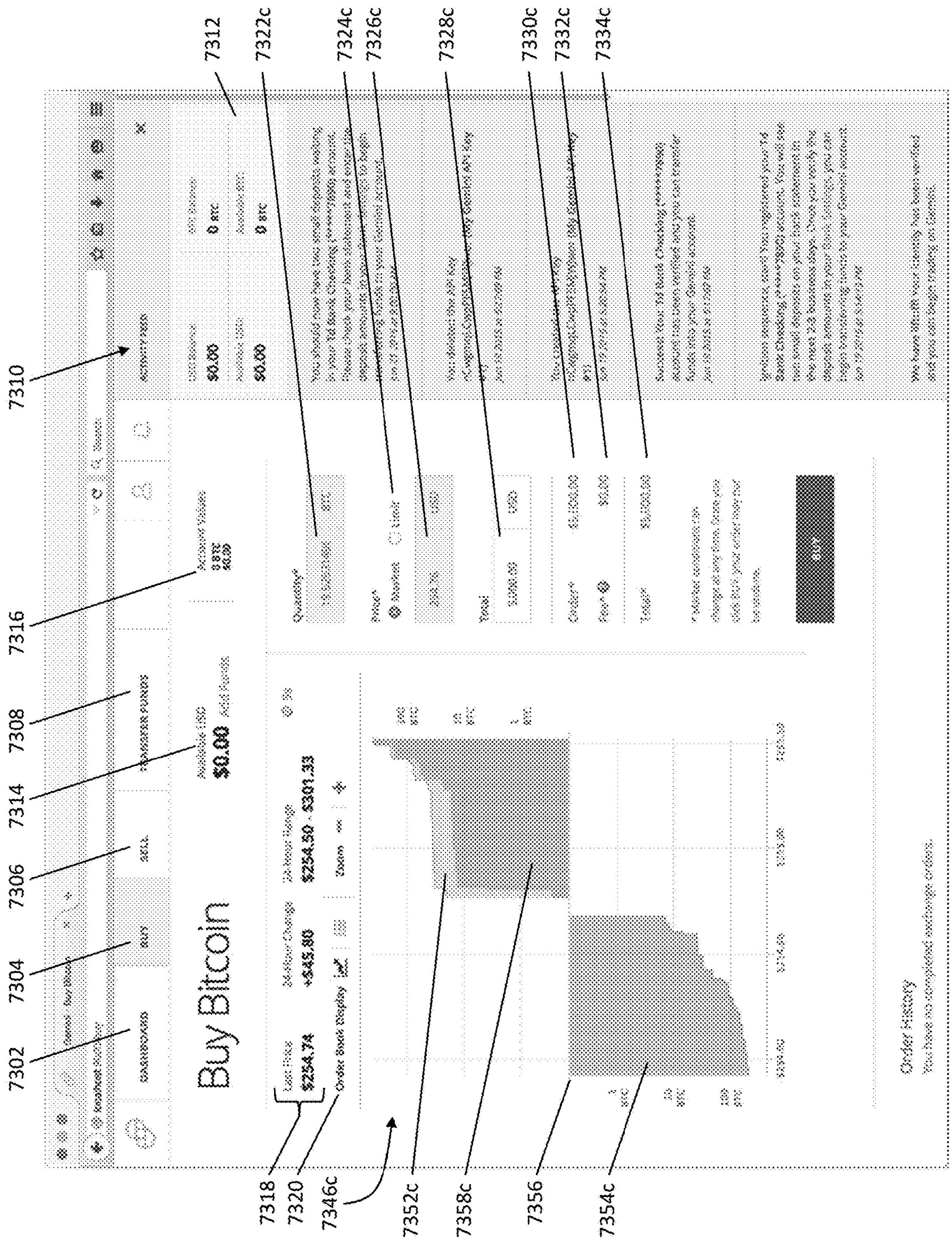

FIG. 50C shows a purchase order GUI comprising a graphical representation 7346*c* showing an electronic order book and prospective market purchase order. The order parameters define a prospective purchase order, which may be not yet submitted and therefore not yet pending on the electronic order book. The order type selector 7324*c* indicates that a market order was selected. Digital asset quantity input field 7322*c* contains a positive non-zero quantity, and accordingly a total cost field 7328*c* contains a positive non-zero quantity. The order price field 7326*c* contains an order price, which may be a current market price determined automatically by the exchange computer system upon a selection of a market order type. In embodiments, the order price for a market order may not be editable by a user. Accordingly, inputting and/or changing the value in the digital asset quantity input field 7322*c* may cause the computer system to calculate and/or re-calculate a corresponding total cost based at least in part upon the current market price. Similarly, inputting and/or changing the value in the total cost field 7328*c* may cause the computer system to calculate and/or re-calculate a corresponding digital asset order quantity based at least in part upon the current market price.

The order book and prospective order graphical representation 7346*c* comprises a sell order book graphical representation 7352*c* showing the pending digital asset sell orders and a purchase order book graphical representation 7354*c* showing the pending digital asset purchase orders. In embodiments, the purchase order book graphical representation 7354*c* may also depict the prospective purchase order data, which may be added to the pending purchase orders or overlaid as a separate graphical representation on the purchase order book graphical representation 7354*c*. In embodiments, the purchase order book graphical representation 7354*c* may show be a post-order purchase order book graphical representation showing the purchase orders that would exist after the prospective order is placed and/or executed. A post-order sell order book graphical representation 7358*c* may be overlaid on the graph to indicate how the prospective order would move the market. Such overlays may be rendered with a different color or a different shade of a color than the existing current order book graphical representations. For the exemplary market purchase order, the exchange computer system may place a series of orders starting with the lowest available price (e.g., whatever volume is available to purchase at the lowest sell order price) and increasing in price until the total cost is reached and/or until the digital asset order quantity is reached.

Figure 50D:
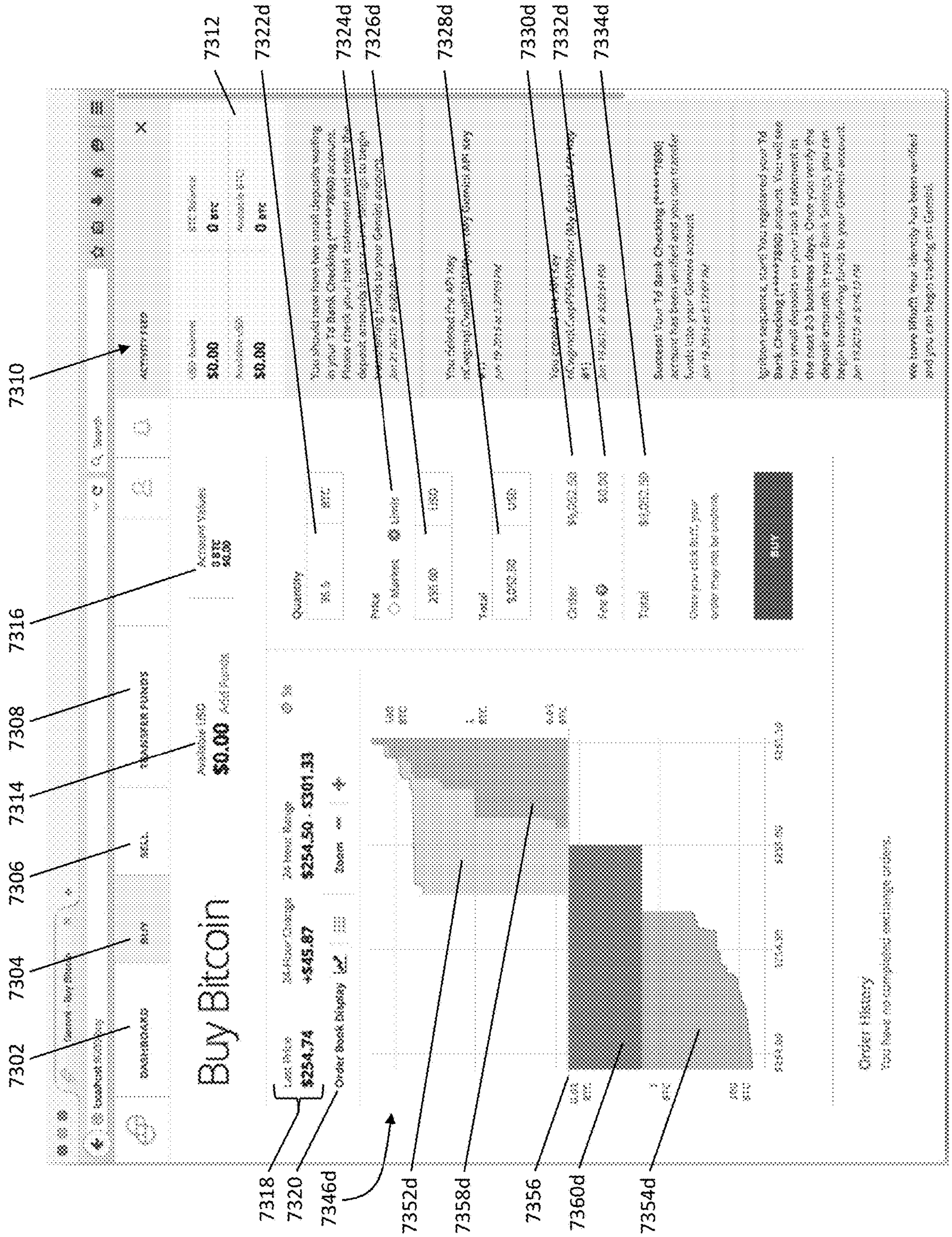

FIG. 50D shows a purchase order GUI comprising a graphical representation 7346*d* showing an electronic order book and prospective limit purchase order. The order type selector 7324*d* indicates a limit order, and the limit order price is specified in input field 7326*d*. The exemplary limit purchase order price is greater than the current market price. The order parameters define a limit order that can be characterized as in the money because at least a portion of the prospective order would be satisfied (e.g., fulfilled) by the currently pending sell orders.

The graph 7346*d* shows the current sell order book graphical representation 7352*d* and a post-order purchase order book graphical representation 7354*d*. This may show the purchase orders that would exist after the prospective limit purchase order is placed and/or executed. Accordingly, where only a portion of the prospective limit purchase order would be satisfied by the existing pending sell orders, the projected remainder of the prospective order may be added to the purchase order book graphical representation 7354*d*. That remainder of the limit purchase order (e.g., the portion that would not be satisfied by the current sell orders) may be represented on the graph by the limit purchase order graphical representation 7360*d*, which is overlaid on the purchase order book graphical representation 7354*d*. It shows the remaining (e.g., unfulfilled) prospective digital asset order quantity at the limit price and lower prices. In embodiments, the limit purchase order graphical representation 7360*d* may be rendered as a darker shade or different shade of the color used to render the current purchase order book graphical representation 7354*d*. Because the exemplary order is a limit order in the money, the remaining limit purchase order graphical representation 7360*d* makes clear that the prospective order exceeds the existing spread point (buying above the spread) and overlaps with some sell order prices, shown in the sell order book graphical representation 7352*d*. The overlapping portion would be fulfilled (e.g., fulfilled upon placement of the prospective order). The graph may include a post-order sell order book graphical representation 7358*d*, which may indicate the data that would compromise the sell order book after the prospective purchase order was placed and/or fulfilled. The remaining limit purchase order graphical representation 7360*d* does not overlap with the post-order sell order book graphical representation 7358*d*, illustrating that the remaining portion would not be fulfilled by the sell orders. Limit orders may be fulfilled by the exchange computer system matching engine in the order in which the orders were placed.

Figure 50E:
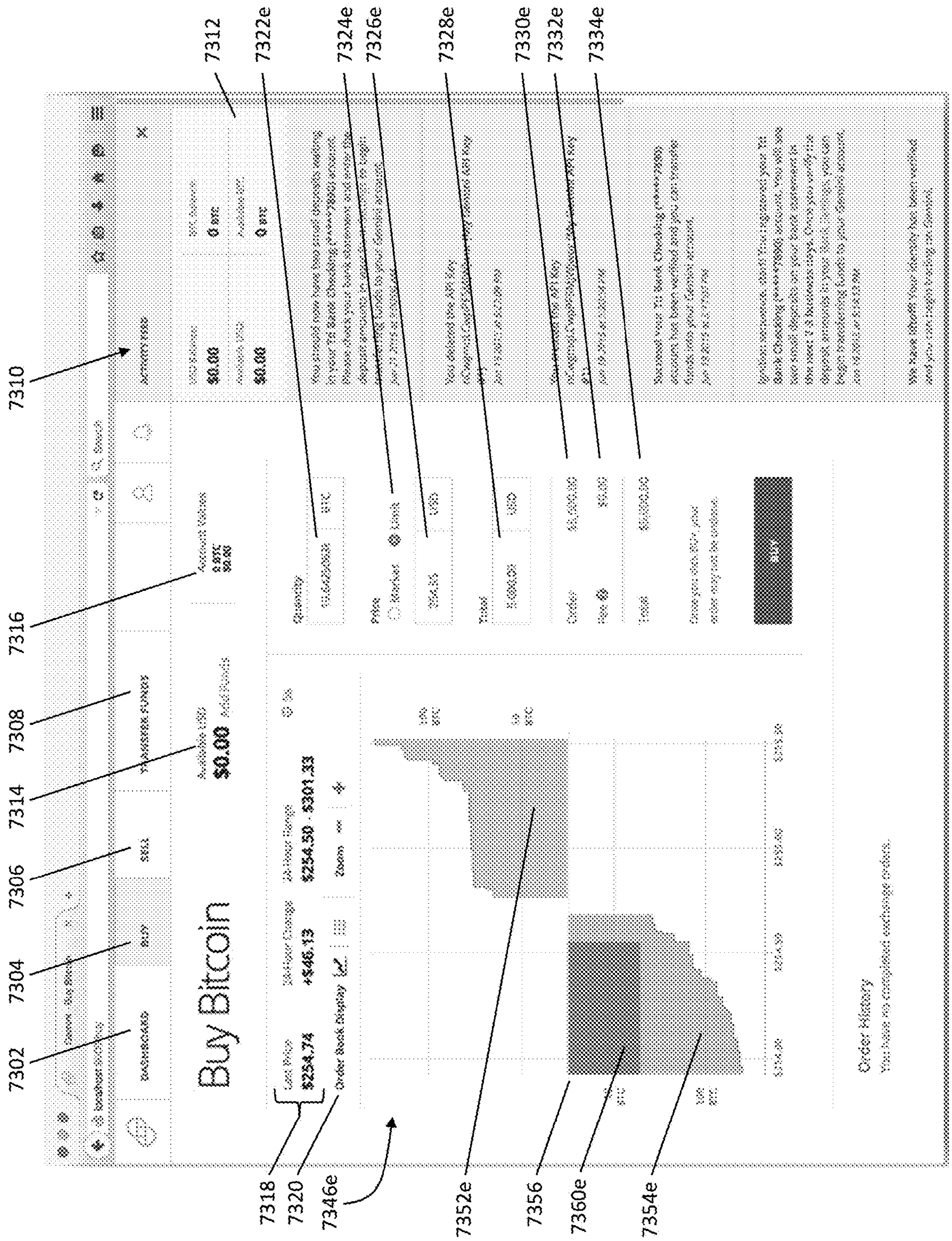

FIG. 50E shows a purchase order GUI comprising a graphical representation 7346*e* showing an electronic order book and prospective limit purchase order. The order type selector 7324*e* indicates a limit order, and the limit order price is specified in input field 7326*e*. The limit purchase order price is lower than the current market price. The order parameters define a limit order that can be characterized as out of the money because the order would not be satisfied by the currently pending sell orders.

The graph 7346*e* shows the current sell order book graphical representation 7352*e* and the purchase order book graphical representation 7354*e*. The limit purchase order is represented on the graph by the limit purchase order graphical representation 7360*e*, which is overlaid on the purchase order book graphical representation 7354*e*. In embodiments, the purchase order book graphical representation 7354*e* may be a post-order representation showing the purchase order book including the prospective purchase order. The limit purchase order graphical representation 7360*e* indicates the digital asset order quantity at the limit price and lower prices. As can be seen, there is no overlap in prices between the prospective purchase order and the sell order book. Accordingly, no portion of the prospective purchase order will be satisfied by the current sell order book. As illustrated, the sell order book will remain unchanged as a result of this purchase order. The purchase order would remain on the books until the user cancels it, until it automatically expires (e.g., in accordance with a predefined order expiry period), and/or until the market moves such that one or more sell orders are placed that satisfy the limit purchase order.

FIGS. 51A-E are exemplary screen shots of user interfaces related to sale transactions provided by an exchange computer system in accordance with exemplary embodiments of the present invention. The sell order GUIs may be rendered similar to the corresponding purchase order GUIs. In embodiments, the order parameter input fields may be located on a different side of the page (e.g., to the left of the order book graphical representation and/or listing instead of to the right).

Figure 51A:
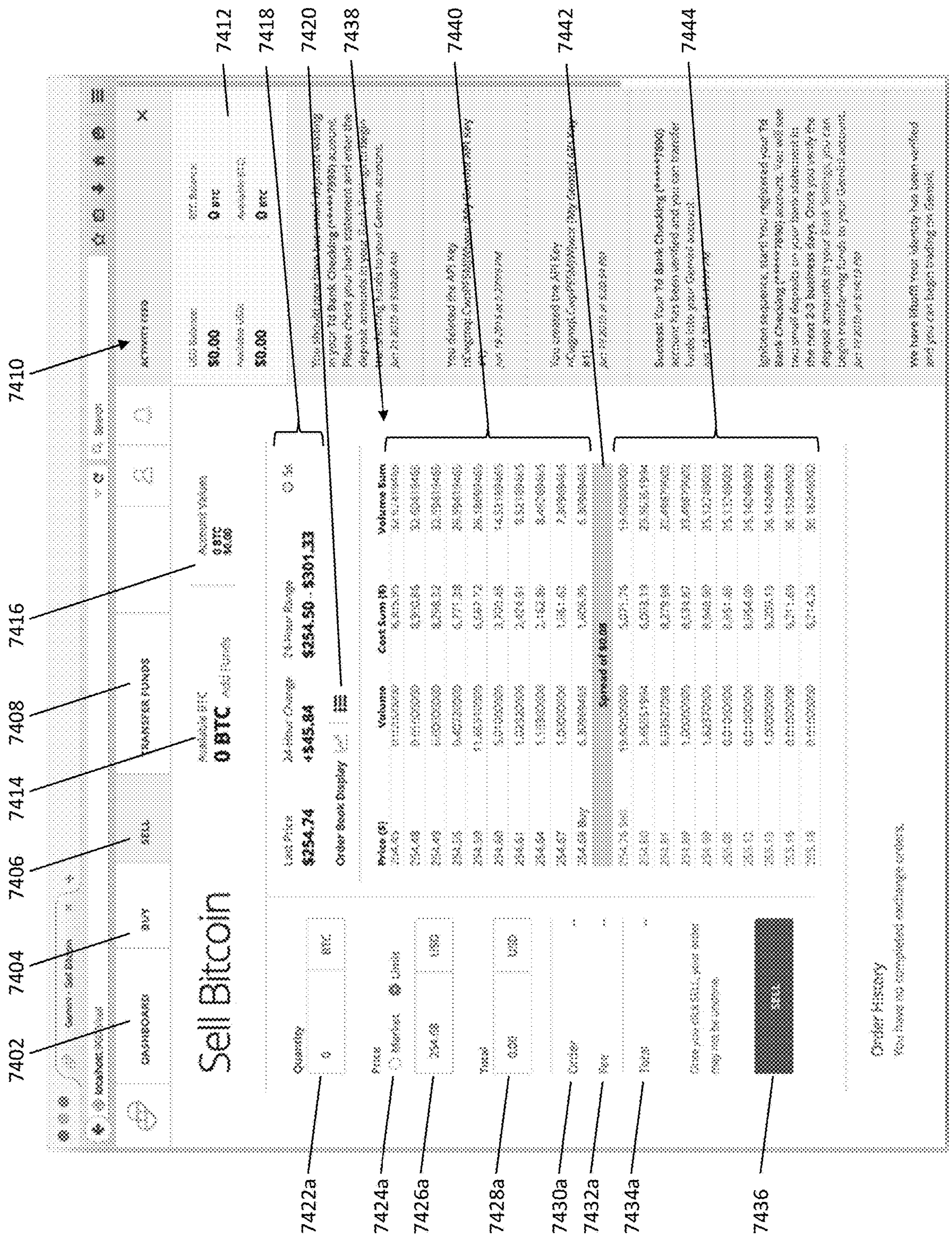
FIGS. 51A-E are exemplary screen shots of user interfaces related to sale transactions provided by an exchange computer system in accordance with exemplary embodiments of the present invention.

FIG. 51A shows a sell order graphical user interface comprising an order book listing 7438. This order book listing may be rendered similar to the order book listing 7348 for a purchase order GUI, described with respect to FIG. 50A.

Figure 51B:
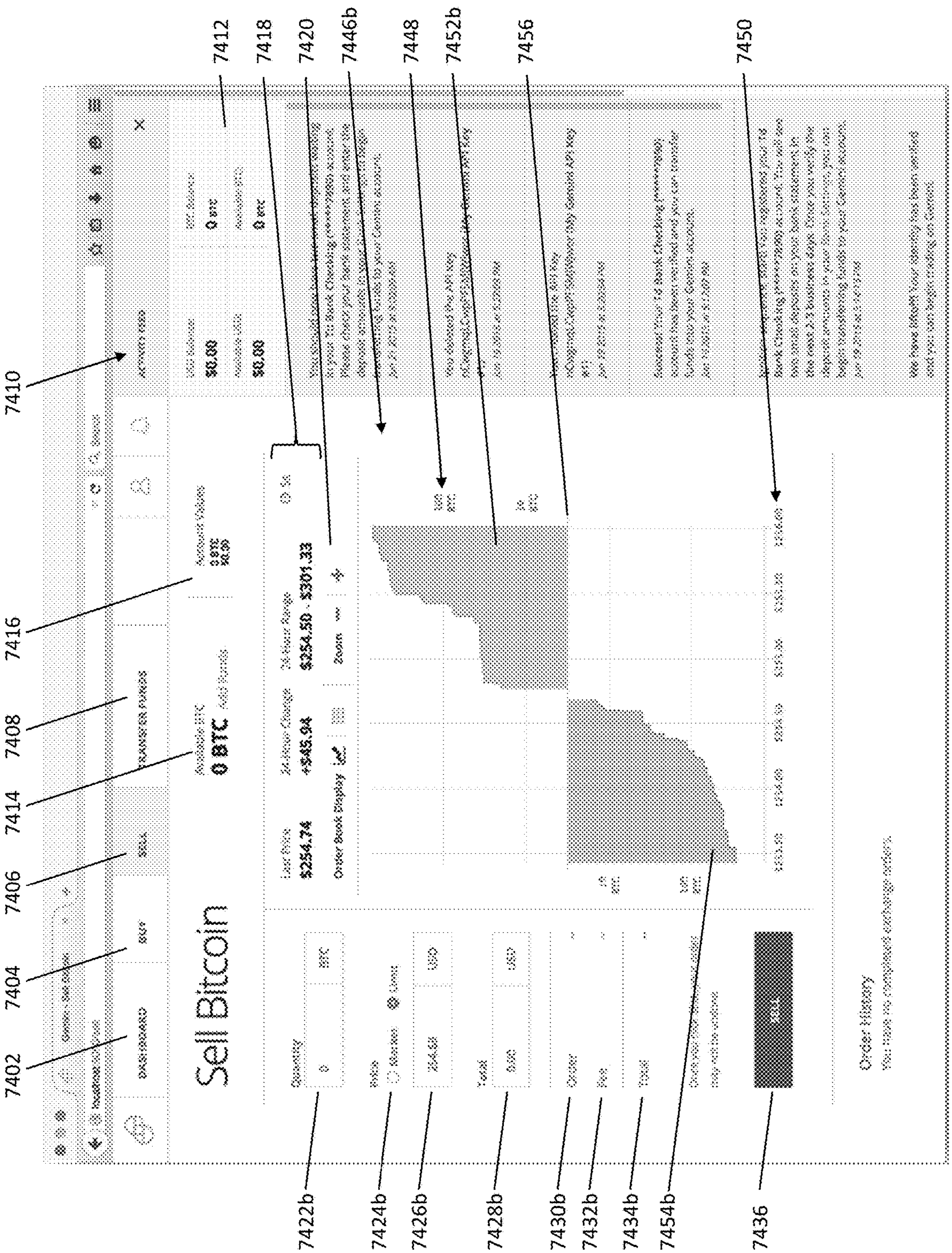

FIG. 51B shows a purchase order GUI comprising an electronic order book graphical representation 7446*b*. No prospective order is illustrated as part of the graphical representation 7446*b* because the digital asset order quantity is zero. As with FIG. 50B, the graph 7446*b* may include a sell order book graphical representation 7452*b* (e.g., above the price axis 7456) and a purchase order book graphical representation 7454*b* (e.g., below the price axis 7456).

Figure 51C:
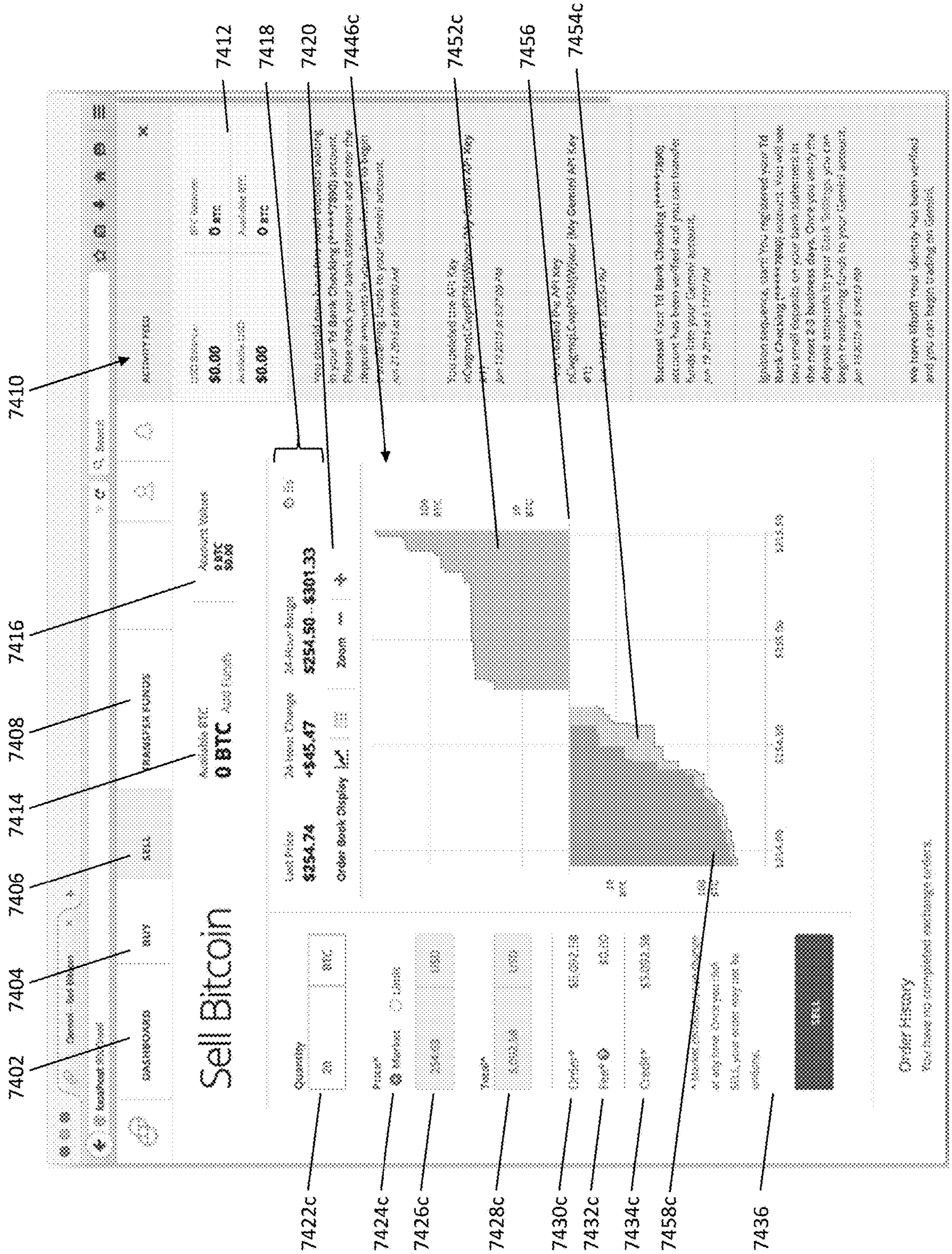

FIG. 51C shows a sell order GUI comprising a graphical representation 7446*c* showing an electronic order book and prospective market sell order. A market order is indicated by the order type selector 7424*c*. The graphical representation 7446*c* includes a sell order book graphical representation 7452*c* showing currently pending sell orders and a purchase order graphical representation 7454*c* showing currently pending purchase orders. A post-order purchase order book graphical representation 7458*c* indicates the cumulative order data that would comprise the purchase order book after placement and/or execution of the prospective sell order defined by the order parameters in the order parameter input fields. As with market purchase orders, a market sell order may cause the exchange computer system to place a plurality of sell orders until the order parameters are satisfied.

Figure 51D:
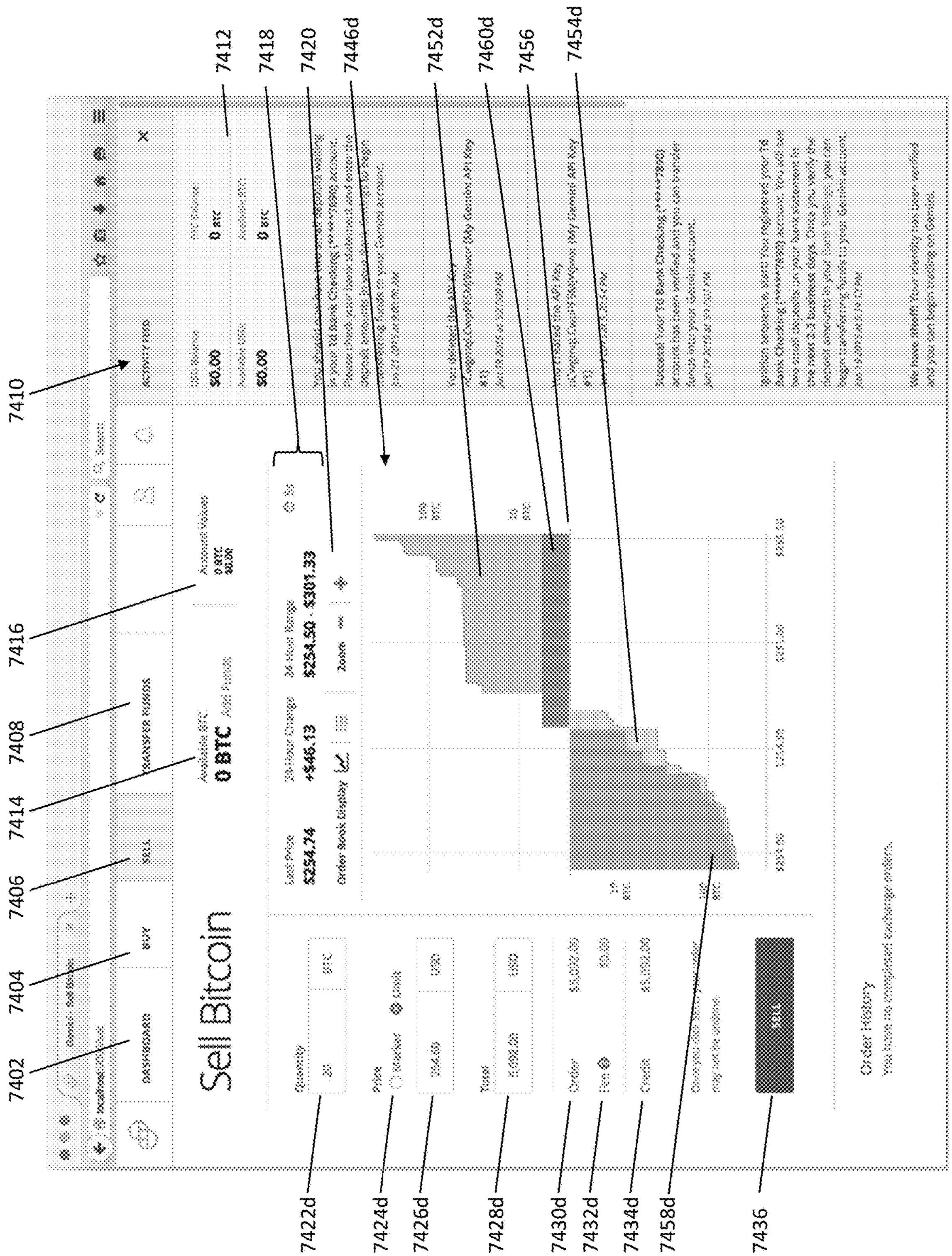

FIG. 51D shows a sell order GUI comprising a graphical representation 7446*d* showing an electronic order book and prospective limit sell order. The limit sell order price specified in field 7426*d* is less than the market price, and therefore the order will be in the money. At least a portion of the sell order will be satisfied by the currently pending purchase orders. The graph 7446*d* includes a sell order book graphical representation 7452*d* and a purchase order book graphical representation 7454*d*. The sell order book graphical representation 7452*d* may show the cumulative pending sell orders as well as the portion of the prospective sell order that would be unfulfilled by the current purchase orders and thus remain on the books. The unfulfilled portion of the prospective limit sell order may be indicated by a remaining prospective sell order graphical representation 7460*d*, which may be overlaid on the graph, e.g., on the sell order book side of the price axis 7456. The prospective sell order graphical representation 7460*d* may indicate the prospective digital asset order quantity at the sell order limit price and higher prices. Meanwhile, a post-order purchase order book graphical representation 7458*d* may be provided in the graph 7446*d*. It may be overlaid on the current purchase order book graphical representation 7454*d*. As can be seen, the prospective sell order overlaps at least some prices at which purchase orders exist shown in the current purchase order book graphical representation 7454*d*. Accordingly, at least a portion of the prospective sell order would be executed upon placement of the order.

Figure 51E:
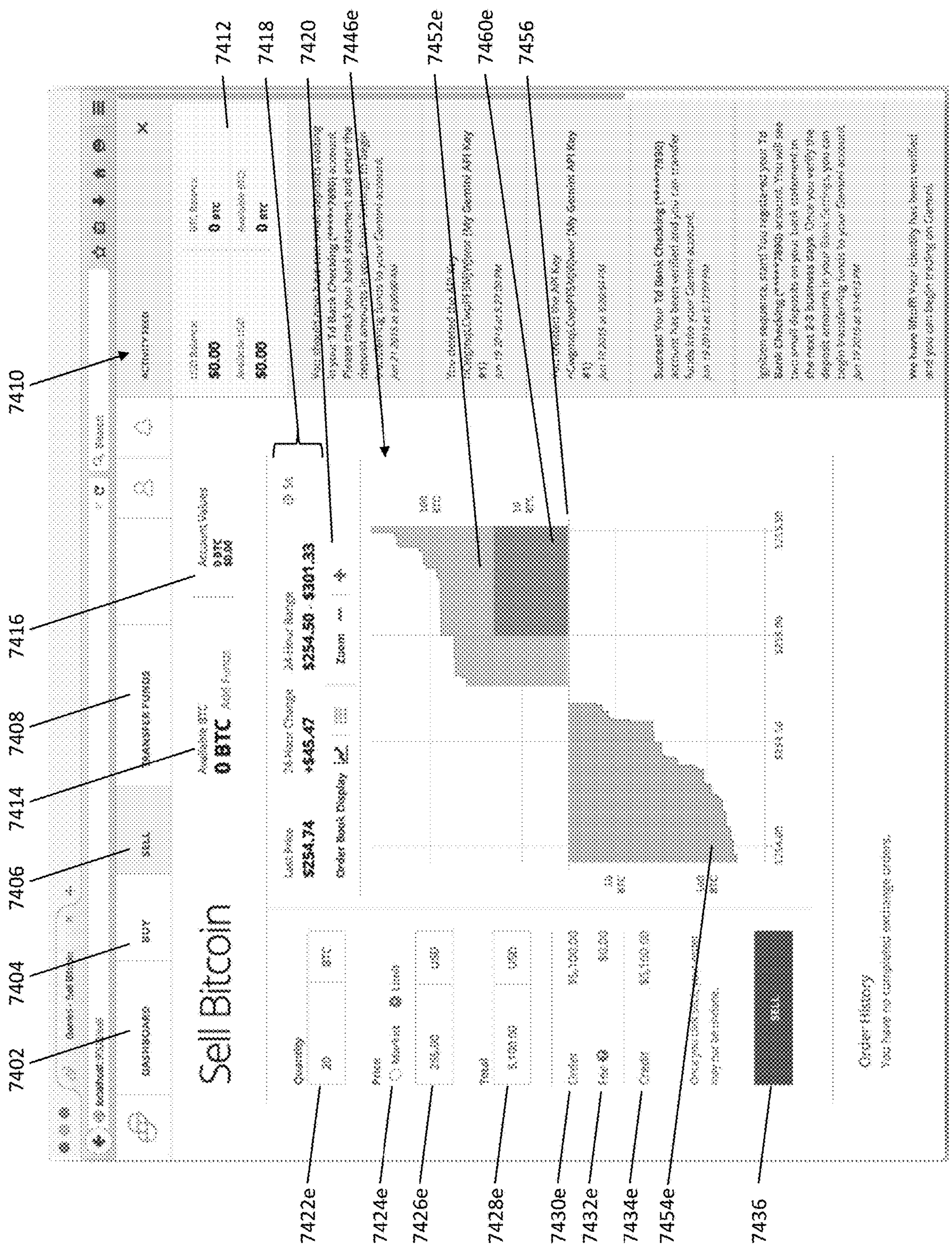

FIG. 51E shows a sell order GUI comprising a graphical representation 7446*e* showing an electronic order book and prospective limit sell order. The limit sell order price specified in field 7426*e* is greater than the market price, and therefore the order will be out of the money. The graph 7446*e* includes a sell order book graphical representation 7452*e* and a purchase order book graphical representation 7454*e*. A prospective sell order graphical representation 7460*e* may show the order parameters of the prospective limit sell order. The prospective digital asset order quantity may be shown at the sell limit price and higher prices. As illustrated there is no overlap with existing purchase orders. Accordingly, the prospective order would not be satisfied by the current purchase order book, and there is no post-order purchase book graphical representation because there would be no change to the purchase order book due to the prospective order.

It will be understood that information displayed across various exemplary embodiments of GUIs described herein may be displayed in the form of text and/or graphical representations. Such displayed information may be manipulated to a desired configuration by a user, for example, through scaling (such as minimization and maximization), highlighting, coloring, and/or rearrangement, to name a few.

FIGS. 52A-C are flow charts of exemplary processes for generating graphical user interfaces representing an electronic order book in accordance with exemplary embodiments of the present invention. These processes may enable a user of a user electronic device to view an electronic order book graphical representation. Such a representation may be updated automatically and/or dynamically, such as in response to changing data in the electronic order book (e.g., due to new orders, canceled orders, and/or filled or partially filled order), and/or in response to user input of new or changed order parameters). The electronic order book graphical representation can enable the user to view how a prospective order defined by its order parameters may move the market, the degree to which the prospective order will be filled and/or unfilled by currently pending orders, and/or a graphical comparison to the pending orders that comprise the electronic order book. An exchange computer system may interact with an application at a user electronic device (e.g., an installed and/or downloadable application, which may be a dedicated application or a general application, such as a web browser application, carrying out specific instructions provided by the exchange computer system). Interacting with the application can comprise sending and/or receiving data and/or transmitting machine-readable instructions to cause the application to render display content, such as particular graphical user interfaces or updates thereto. Transmitting such instructions to an application may activate it and/or cause it to carry out the instructions. Accordingly, the processes described in herein may dynamically generate graphical user interfaces and/or dynamically provide such graphical user interfaces (e.g., the instructions for rendering the graphical user interfaces) to one or more user electronic devices. In embodiments, the graphical user interface can be rendered by a viewer application on a remote device.

FIG. 52A shows an exemplary process for generating machine-readable instructions to render a graphical user interface comprising an electronic order book graphical representation. In a step S7502, an exchange computer system comprising one or more computers may receive from a user device, a request to access the electronic order book associated with a digital asset traded on an electronic exchange. Such a request may comprise a user selection of an order book display type indicator corresponding to a graphical representation display type.

In a step S7504, the exchange computer system may access, from non-transitory computer-readable memory, electronic order book information comprising digital asset order information for a plurality of digital asset orders. The digital asset order information may comprise respective order prices denominated in a flat currency and respective order quantities for each of the plurality of pending digital asset orders. The plurality of pending digital asset orders can include pending digital asset purchase orders and pending digital asset sell orders.

In a step S7506, the exchange computer system may calculate information for a first graphical user interface by determining at each respective order a price first cumulative quantity of digital assets subject to the pending digital asset purchase orders; and by determining at each respective order price a second cumulative quantity of digital assets subject to the pending digital asset sell orders.

In a step S7508, the exchange computer system may generate first machine-readable instructions to render the first graphical user interface including a first electronic order book graphical representation. The first electronic order book graphical representation may comprise a first axis depicting price denominated in the fiat currency; a second axis depicting digital asset quantity; a first set of graphical indicators on a first side of the first axis showing at each price visible along the first axis the first cumulative quantity of digital assets subject to the pending digital asset purchase orders; and a second set of graphical indicators on a second side of the first axis showing at each price visible along the first axis the second cumulative quantity of digital assets subject to the pending digital asset sell orders. In embodiments, the first axis may be a horizontal axis and the second axis may be a vertical axis. In embodiments, the axes may be flipped. In embodiments, the second axis may have a logarithmic scale.

In embodiments, the machine-readable instructions may comprise computer code such as Javascript, HTML, CSS to name a few. In embodiments, the machine-readable instructions may comprise data and/or layout instructions in a language associated with one or more user electronic device operating system types (e.g., iOS, Android, Windows, to name a few) and/or associated with applications (e.g., mobile applications) running on user electronic devices. In embodiments, the machine-readable instruction may comprise data such as JSON data.

In a step S7510, the exchange computer system may transmit to the first user electronic device the first machine-readable instructions so as to cause the first user electronic device (e.g., an application running on the first user electronic device, such as a dedicated downloadable application or a web browser application, which may be mobile applications) to render the first graphical user interface on a display associated with the first user electronic device. In embodiments, a web browser running one the first user electronic device may render the first graphical user interface, e.g., in a webpage. In embodiments, the exchange computer system may transmit the first machine-readable instructions to one or more other user electronic devices and/or other computer systems.

FIG. 52B shows an exemplary process for generating machine-readable instructions to render a graphical user interface for display by a viewer application comprising an electronic order book graphical representation and a prospective purchase order graphical representation. In embodiments, a viewer application may in addition to rendering a graphical user interface for display on a display device, such as an LED screen, may also accept user input of data or other information.

In a step S7512, the exchange computer system may receive from the first user electronic device, first digital asset order information corresponding to a first prospective digital asset purchase order. The first digital asset order information comprise a first order quantity of the digital asset and a first order price parameter related to a first order price of the digital asset. In embodiments, the first order price parameter may comprise a market order indicator. Accordingly, the first order price may be a market price. In embodiments, the exchange computer system may automatically determine the market price for the first order price, e.g., upon receipt of a market order indicator. In embodiments, the first order price parameter may comprise a limit order indicator. Accordingly, the first order price may be a limit price, which may be specified by the user.

In a step S7514, the exchange computer system may store in non-transitory computer-readable memory, the first digital asset order information as a prospective digital asset purchase order.

In a step S7516, the exchange computer system may calculate information for a second graphical user interface by determining at each respective order price a second order quantity of digital assets subject to the first prospective digital asset purchase order and by determining at each respective order price a third cumulative quantity of digital assets subject to the digital asset sell orders that would remain after fulfilling the first prospective digital asset purchase order. The exchange computer system may be specifically programmed to perform these non-routine calculations. They generate data values that enable the exchange computer system to generate machine-readable instructions for an unconventional GUI that provides enhanced order book visualization showing the potential impact of a prospective order. The potential impact of the order can include a visualization of how the order fits within the pending orders of the order book and/or how the order, once placed, will increase or decrease the pending cumulative sell order volumes and/or purchase order volumes available in the order book at each price. In embodiments, the second graphical user interface may be an updated version of the first graphical user interface.

In a step S7518, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective second order quantity of digital assets subject to the first prospective digital asset purchase order; and a fourth set of graphical indicators on the second side of the first axis showing at each price visible along the first axis the respective third cumulative quantity of digital assets subject to the digital asset sell orders that would remain after fulfilling the first prospective digital asset purchase order.

In embodiments, the third set of graphical indicators may not be displayed, such as for a market order. In embodiments, the first prospective digital asset purchase order may be characterized as out of the money, and the third respective cumulative quantity of digital assets at each price may be zero.

In embodiments, at least one of the first axis or the second axis of the first electronic order book graphical representation have a different scale than the corresponding first axis and the corresponding second axis of the second electronic order book graphical representation. In embodiments, the scaling may be changed upon receipt of an electronic request from the user (e.g., via selection of an element, such as a rendered button, of the graphical user interface). In embodiments, the user may navigate and/or scroll along the axes of the graph and/or zoom in and/or out.

In embodiments, the exchange computer may further determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7520, the exchange computer system may transmit to the first user electronic device, the second machine-readable instructions so as to cause the first user electronic device (e.g., an application running on the first user electronic device, e.g., on one or more processors) to render the second graphical user interface on the display. The first user electronic device (e.g., the application running thereon) may render the second electronic order book graphical representation according to the second machine-readable instructions.

FIG. 52C shows an exemplary process for generating machine-readable instructions to render a graphical user interface comprising an electronic order book graphical representation and a prospective sell order graphical representation In a step S7522, the exchange computer system may receive from the first user electronic device, first digital asset order information corresponding to a first prospective digital asset sell order. The first digital asset order information may comprise a first order quantity of the digital asset and a first order price parameter related to a first order price of the digital asset, the first order price denominated in the fiat currency.

In a step S7524, the exchange computer system may store in non-transitory computer-readable memory, the first digital asset order information as a prospective digital asset sell order.

In a step S7526, the exchange computer system may calculate information for a second graphical user interface by determining at each respective order price a second order quantity of digital assets subject to the first prospective digital asset sell order and by determining at each respective order price a third cumulative quantity of digital assets subject to the digital asset purchase orders that would remain after fulfilling the first prospective digital asset sell order. These non-routine calculations enable generation of an unconventional GUI that can show electronic order book data with a visualization that enhances rapid understanding of the bounds of the pending buy and sell orders as well as how the prospective order may interact with the existing orders (e.g., to be fulfilled, partially fulfilled, unfulfilled, and/or to move the market by changing the pending orders that remain on the electronic order book).

In a step S7528, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book graphical representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective third cumulative quantity of digital assets subject to the digital asset purchase orders that would remain after fulfilling the first prospective digital asset sell order; and a fourth set of graphical indicators on the second side of the first axis showing at each price visible along the first axis the respective second order quantity of digital assets subject to the first prospective digital asset sell order. These machine-readable instructions may provide an unconventional GUI that facilitates order book visualization, including visualization of the degree to which a prospective order may be satisfied and how it may move the market.

In embodiments, the exchange computer system may determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7530, the exchange computer system may transmit to the first user electronic device, the second machine-readable instructions so as to cause an application at the first user electronic device to render the second graphical user interface on the display. The first user electronic device may render the second electronic graphical user interface according to the second machine-readable instructions.

In embodiments, transmitting data and/or machine-readable instructions to a user electronic device and/or to an application on the user electronic device may activate the application and/or cause it to render display content on a display screen.

In embodiments, graphical user interfaces similar to those described herein may be generated to show order book and order information related to other types of exchange transactions, such as a first digital asset to a second digital asset, a first fiat currency to a second fiat currency, or a first commodity to a second commodity, to name a few.

Setup and Storage of Digital Assets and/or Digital Wallets

Digital asset accounts may be securely generated, accessed, and/or used (e.g., for transactions) from a secure administrative portal. In embodiments, the administrative portal, which may be used for key generation, parsing, and/or reassembly, may be a secure system for transacting in digital math based assets comprising a first computer system comprising one or more processors that generate one or more digital wallets and one or more respective private keys and one or more respective public keys, each of the one or more private keys being segmented into one or more private key segments; one or more writing devices operatively connected to the one or more first computer systems, each of the one or more writing devices adapted to write at least one private key segment of a corresponding one of the one or more private keys, along with information correlating the at least one private key segment to one of the one or more public keys; and at least one networked computer comprising one or more processors that access at least one of the digital wallets using a corresponding one of the one or more private keys as reassembled using the corresponding private key segments.

In embodiments, the administrative portal may further comprise a second computer system comprising one or more processors for reassembling the corresponding one of the one or more private keys based on input into the second computer system of the corresponding private key segments. In embodiments, the input device may be a scanner, a keyboard, a touchscreen, a mouse, a microphone, a camera, and/or a digital card reader, to name a few.

In embodiments, the first computer system of the administrative portal and/or the second computer system may not be associated with a network. In embodiments, the first computer system of the administrative portal and the networked computer system may be a common computer system. In embodiments, the second computer system of the administrative portal and the networked computer system may comprise a common computer system. In further embodiments, the first computer system, the second computer system, and the networked computer system may be a common computer system.

In embodiments, referring to FIGS. 4A-4D, the administrative portal may comprise an accounting computer 25 and a secure location 10, as described herein.

Figure 4A:
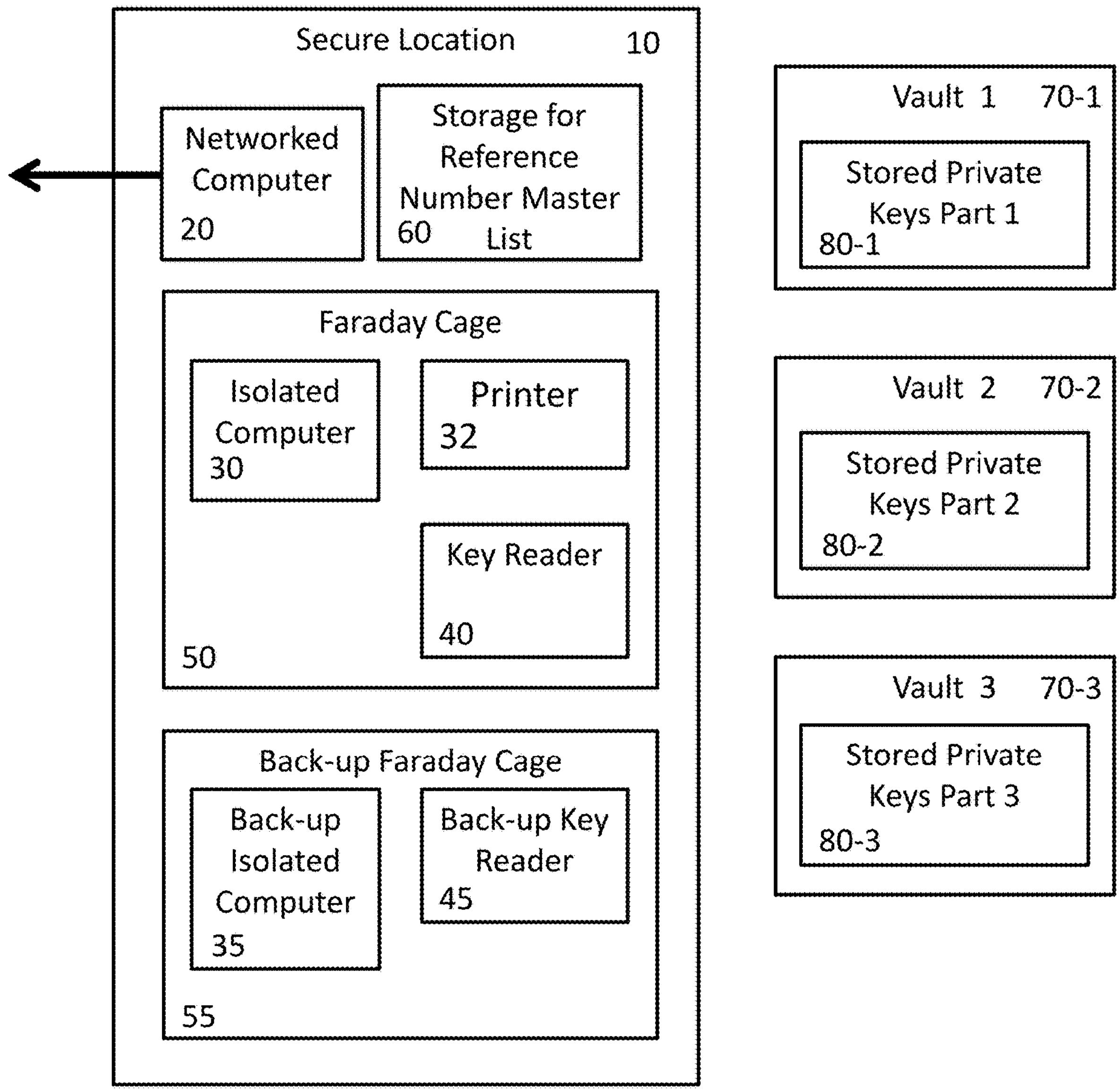
FIGS. 4A-4D are exemplary block diagrams of components of security systems for an ETP holding digital math-based assets in accordance with various exemplary embodiments of the present invention.

Referring to the exemplary embodiment illustrated in FIG. 4A, at a secure location 10, a digital asset account holder, administrator, manager, and/or custodian may maintain at least two computers. In embodiments, an administrator, manager, and/or custodian may be contracted to manage one or more digital asset accounts and/or oversee security for the accounts. In embodiments, secure location 10 may be a room with restricted entry. In embodiments, secure location 10 may have a user entry log to provide an access record for the location.

In the exemplary embodiment depicted in FIG. 4A, at secure location 10, the first computer may be a networked computer 20, which may comprise one or more computing devices. Networked computer 20 and/or other computers in the system may have the ability to cycle or otherwise change IP addresses. The second computer may be a non-networked, isolated computer 30, which may comprise one or more computing devices. In embodiments, the networked computer 20 and the isolated computer 30 may be separate aspects of one computing device. For example, a hard drive partition may be used to separate the networked and non-networked functions. In embodiments, the computers may comprise one or more processors and/or computer readable memory. Networked computer 20 and isolated computer 30 may be located in close proximity to each other, as in the same room, or may be located in separate locations within secure location 10. It will be appreciated by those in the art that secure location 10 may comprise a plurality of secure locations. In embodiments, isolated computer 30 may be located in a Faraday cage 50. The Faraday cage 50 may prevent electronic eavesdropping or interference from electromagnetic waves. In alternative embodiments, the functions ascribed above to networked computer 20 and isolated computer 30 may be performed by one or more networked and/or isolated computers at one or more locations.

In the exemplary embodiment depicted in FIG. 4A, networked computer 20 can communicate with a registry, exchange, other external entities, e.g., APs, and/or all or part of a digital asset network to send and/or receive digital assets (e.g., to create transactions), to compute balances, and/or to transmit or otherwise broadcast signed or otherwise finalized transactions. In embodiments, networked computer 20 may be used to distribute digital assets among one or more digital asset accounts and/or digital wallets. The networked computer 20 may be connected to the Internet directly (e.g., through Ethernet, Wi-Fi, Bluetooth, or any connection known in the art or hereafter developed) or indirectly (e.g., through another computer to which it is directly connected), or may be connected to a network other than the Internet.

In embodiments, the digital assets may be stored in one or more digital wallets residing on one or more computing devices, such as remote servers, personal computers, tablet devices, mobile devices, such as smart phones, or PDAs, to name a few. In the exemplary embodiment of FIG. 4A, isolated computer 30 may be used to generate electronic wallets and/or key pairs, which may include both private and public keys. In embodiments, keys comprise strings or alphanumeric characters or other characters, optionally of a pre-determined length, may comprise one or more pieces of computer code, or may comprise other formats of keys known in the art. In embodiments, digital wallets may be created on isolated computer 30 using a "clean-boot" with a bootable CD, such as a Linux Live CD. The specific version of the operating system may be maintained in secret to avoid security risks.

In embodiments, digital asset accounts and/or digital wallets may be generated by an entity upon receipt of a request to transfer digital assets to the entity and/or may be pre-generated at the time that security measures (e.g., a vault storage system) is set up, to name a few. The digital asset accounts each may be associated with unique private-public key pairs (which may include a plurality of private keys). In embodiments, the key pairs may be created as part of the digital wallet creation process. In other embodiments, the key pairs may be created before or after the creation of the one or more digital wallets and associated with the wallets as a separate step. In embodiments, the assets stored in a digital wallet may be accessed with a key pair, even if the original wallet is destroyed or otherwise unavailable. In such embodiments, only the key pair need be maintained and/or stored to retrieve the assets associated with a given digital wallet. Accordingly, in an embodiment of the present invention, digital wallets may be deleted or otherwise destroyed following the storage of their associated keys. Assets may be added to the wallet even after its destruction using the public key. Assets may thus be stored in a wallet after the wallet is destroyed. The wallet may be re-generated using its keys.

In embodiments, the private key may not be used directly with or on the networked computer 20. In embodiments, a public key (without the corresponding private key) may only be able to receive digital assets for deposit purposes. In embodiments, assets may be transferred to a wallet using its public key and without the transferor knowing the private key. Implementation of the foregoing may require customized software, e.g., software that modifies the standard digital asset protocols.

In embodiments, isolated computer 30 may also be used in conjunction with, e g., one or more printers or other writing devices, to print the key pairs or may be used otherwise to arrange for the storage of one or more aspects and/or portions (or segments or coded and/or encrypted segments) of the key pairs. A printer 32 or other writing device to write, print, or otherwise store the keys may be provided with the isolated computer 30. Such printer(s) and/or other writing device(s) may be connected, directly and/or indirectly, to the isolated computers, such as through hardwire, wireless, or other connection. That device may also be located within a Faraday cage, which may be the same Faraday cage housing isolated computer 30. Storage of the keys is described further below.

In embodiments, one or more isolated computers 30 can be used in conjunction with one or more printers or other writing devices to write, print or otherwise store keys. It will be appreciated by one of skill in the art, that in embodiments it may be desirable to limit the number or printers or other writing devices to as few as possible to reduce risk of exposure of private keys, while in embodiments it may be desirable to have a larger number of printers or other writing devices to handle the volume of wallets and/or keys that need to be generated and/or written by the system for its operation.

Private keys may be stored in the selected format along with their corresponding public keys. In embodiments, the private key may be stored with a reference number which may correlate the private key to its corresponding public key. The reference number may be (or may be stored as) a number, alphanumeric code, bar code, QR code, to name a few. A reference number master list may identify a private key, the reference number, and the corresponding public key. The reference number master list may be printed or etched on paper or some other substrate, may be stored digitally on a tape CD, DVD, computer hard drive, or other medium, or otherwise stored in a manner known in the art. The substrates or media just described may have any suitable size, including microscopic or nano scales. In embodiments, the reference number master list may be stored in a secure storage chamber 60 at secure location 10. Storage chamber 60 may be a lockbox, fireproof box, or other secure chamber. If storage is electronic or digital, chamber 60 may protect against electromagnetic waves.

The private and/or public keys and/or any reference number may be stored in a variety of formats, as described herein. The keys may be divided into separate segments for storage. For example, a 51-character key may be divided into three 17-character segments. The same reference number that correlates the private key to the public key or an additional reference number or other identifier may indicate which key segments are part of the same key. The reference identifier or another identifier may be provided and stored with the one or more segments to indicate their order in the assembled key. A numbering schema or other convention may also be used to identify the order of key segments. For example, a first segment may begin with an "A", a second segment may begin with a "B", and a third segment may begin with a "C". The key segments may be stored in one or more locations. In embodiments, the key segments may be divided among a plurality of vaults 70, as described herein.

In embodiments, keys and/or key segments may be stored digitally and/or electronically, e.g., on one or more computer hard drive, disk, tape, memory card, flash memory, CD- ROM, and/or DVD, to name a few. In embodiments, the keys and/or key segments may be printed on any substrate, including paper, *papyrus*, plastic, and/or any substrate known in the art. In embodiments, the substrate may be fireproof or fire resistant, such as a fireproof plastic. The substrate may be resistant to fluids, e.g., water resistant, or otherwise nonabsorbent. Other printing options may be holographic printing, three-dimensional printing, raised printing, such as Braille lettering, and/or invisible ink printing, such as using inks that require a special light and/or treatment, e.g., heat and/or chemicals, for viewing. In embodiments, keys may be etched, e.g., in wood, metal, glass, plastic, or other compositions known in the art, e.g., to produce a card. In embodiments, a magnetic encoding may be used to write to the card. In embodiments, etched or printed keys or key segments may take any shape, such as coin-shaped tokens or rectangular blocks, to name a few. In embodiments, keys or key segments may be printed, etched, or otherwise stored as alphanumeric strings. In embodiments, keys or key segments may be printed, etched, or otherwise stored in a form readable by programmed devices, such as scanners. Such a form may be a QR code, a bar code, another available scannable code format and/or a proprietary code format. In embodiments, quality control operations may ensure that the keys or key segments are printed accurately and/or are able to be read. In embodiments, printed or etched keys or key segments may be coated to prevent reading the key without removing or otherwise altering the coating. Such a coating may be a UV coating and/or may block X-rays or other forms of scanning or reading. The coating may be scratched off to reveal the data contained below it. The back of the substrate may also be coated to prevent reading through the substrate. Such a coating may provide an indication of whether a printed key or key segment was accessed or attempted to be accessed (e.g., it can be detected whether someone scratched the coating away).

In embodiments, security measures may be established and implemented to reduce the risk of digital wallets being compromised. Further, redundancies can be put in place to provide and/or help ensure that any information necessary to access digital math-based assets in digital wallets can be maintained and/or accessed by the account holders as appropriate, necessary, and/or desired.

Multiple private keys may be required to access a digital wallet. Multiple keys may be stored in the same manner as key segments. In embodiments, where a second private key is required, the one or more individuals or systems providing the second key may be located in different administrative portals, different rooms, and/or different geographies from the one or more individuals or systems providing the first private key. Accordingly, a plurality of administrative portals may be employed by secure digital asset storage systems in accordance with the present invention. In embodiments, a plurality of portals may be used for retrieval of stored digital assets (e.g., by requiring a signature or private key from at least two individuals located in at least two different portals). In embodiments, one portal may be used for re-assembling key segments and thus providing one private key, and an individual in a second location may be required to provide a second key or signature before a digital wallet may be accessed. The second key or signature may be encrypted and/or segmented as described herein with respect to a single private key.

In embodiments, a digital wallet may have more than one private key (e.g., multi-signature wallets). The plurality of private keys may be stored securely in the same manner as a single private key. Each private key segment pertaining to a single wallet may be stored in separate vaults, which may be electronic and/or physical vaults. By allowing for multi-signature wallets, the wallet can provide for approval/signature authority from more than one individual or entity as a further means to control access to digital assets held in such wallet. In embodiments, a signature authority may be an automated electronic signature authority, such as a computer or computer system programmed with transaction approval rules. The automated electronic signature authority may only provide a signature when a transaction satisfies the transaction approval rules. In other embodiments, required signature authorities may be individuals who may be located in different administrative portals, different rooms, and/or different geographies. Accordingly, a plurality of administrative portals may be employed by secure digital asset storage systems in accordance with the present invention. In embodiments, one portal may be used for re-assembling key segments and thus providing one private key, and an individual or system in a second location may be required to provide a second key or signature before a digital wallet may be accessed. The second location may be a second portal, a location in a different building, and/or a different geography, to name a few. The second key or signature may be encrypted and/or segmented as described herein with respect to a single private key.

Keys or key segments may be encrypted and/or ciphered, using one or more ciphers, as an additional security measure. The encryption and/or ciphers may be applied by computers running encryption software, separate encryption devices, or by the actions of one or more persons, e.g., prior to input of the encrypted and/or ciphered data into one or more computers. In embodiments, a key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing. Other encryption techniques are possible. See, e.g., David Kahn, *The Codebreakers: The Story of Secret Writing,* 1967, ISBN 0-684-83130-9. See also, Bruce Schneier, *Applied Cryptography*, John Wiley & Sons, 1994, ISBN: 0-471-59756-2. The encryption and/or ciphers may protect against use of the keys by an unauthorized entity who obtains the keys or key segments or copies thereof. The encoding and/or cipher may be maintained in secret and applied to decrypt or decode the keys only when keys must be accessed and used. In embodiments, ciphering may refer to an alphanumeric translation or reordering, while encryption may refer to higher level algorithms, including hashing algorithms. In embodiments, encryption and ciphering may refer to the same processes, in which case descriptions herein of processes involving both encryption and ciphering steps may only entail performance of one such step so as not to be repetitive.

Following storage of the key pairs, the key pairs may be erased from isolated computer 30. Erasure may occur using the computer operating system's delete features, customized software or computer code designed to remove the data from computer memory, magnets used to physically erase the data from the computer's storage drives, and/or other techniques known in the art.

A key reader 40 may be provided to assemble, read, and/or de-crypt the keys or key segments. The key reader 40 may be contained within a Faraday cage, which may be the same Faraday cage housing isolated computer 30. The key reader 40 may read keys that are printed, etched, digitally stored, or otherwise stored. Key reader 40 may be a scanner (e.g., photo scanner or bar code scanner), QR reader, laser, computer hardware, CD reader, and/or digital card reader, to name a few. Key reader 40 may include or be operationally connected to a microscope or magnifying device, such as for keys that are printed in microscopic sizes or other small sizes. In embodiments, key reader 40 may be paired with optical character recognition ("OCR") technology to create digitally recognized copies of keys that may have been printed, etched, or otherwise stored in a form not immediately readable by a computer.

In embodiments, key reader 40 may comprise an input device, such as a keyboard, touchscreen, mouse, and/or microphone, to name a few. An input device may be used for manual entry of keys and/or key segments into one or more computers so that the computer may further process the key segments. Key reader 40 may be operationally connected to isolated computer 30, which may be a direct connection (e.g., a USB cable, Ethernet cable, Bluetooth, or Wi-Fi, to name a few). In embodiments, key reader 40 may be operationally connected to networked computer 20. Key reader 40 may be operationally connected to a separate computing device.

In embodiments, reassembled keys may be input directly into a networked computer 20, which may then be used to access one or more digital wallets and/or perform one or more transactions. Key reader 40 and/or corresponding software (e.g., running on a computer operationally connected to the key reader) may be programmed or otherwise designed to assemble key segments into completed keys. Key reader 40 and/or corresponding software (e.g., running on a computer operationally connected to the key reader) may also correlate the private keys with their corresponding public keys, optionally using the reference number master list. In embodiments, one or more pieces of software may be used to retrieve, decrypt, assemble, and/or decipher keys and/or key segments. In embodiments, such software may be run on any of one or more secure storage system computers and/or user devices. In embodiments, multiple authority may be required to initiated a retrieval of stored private keys.

Figure 4B:
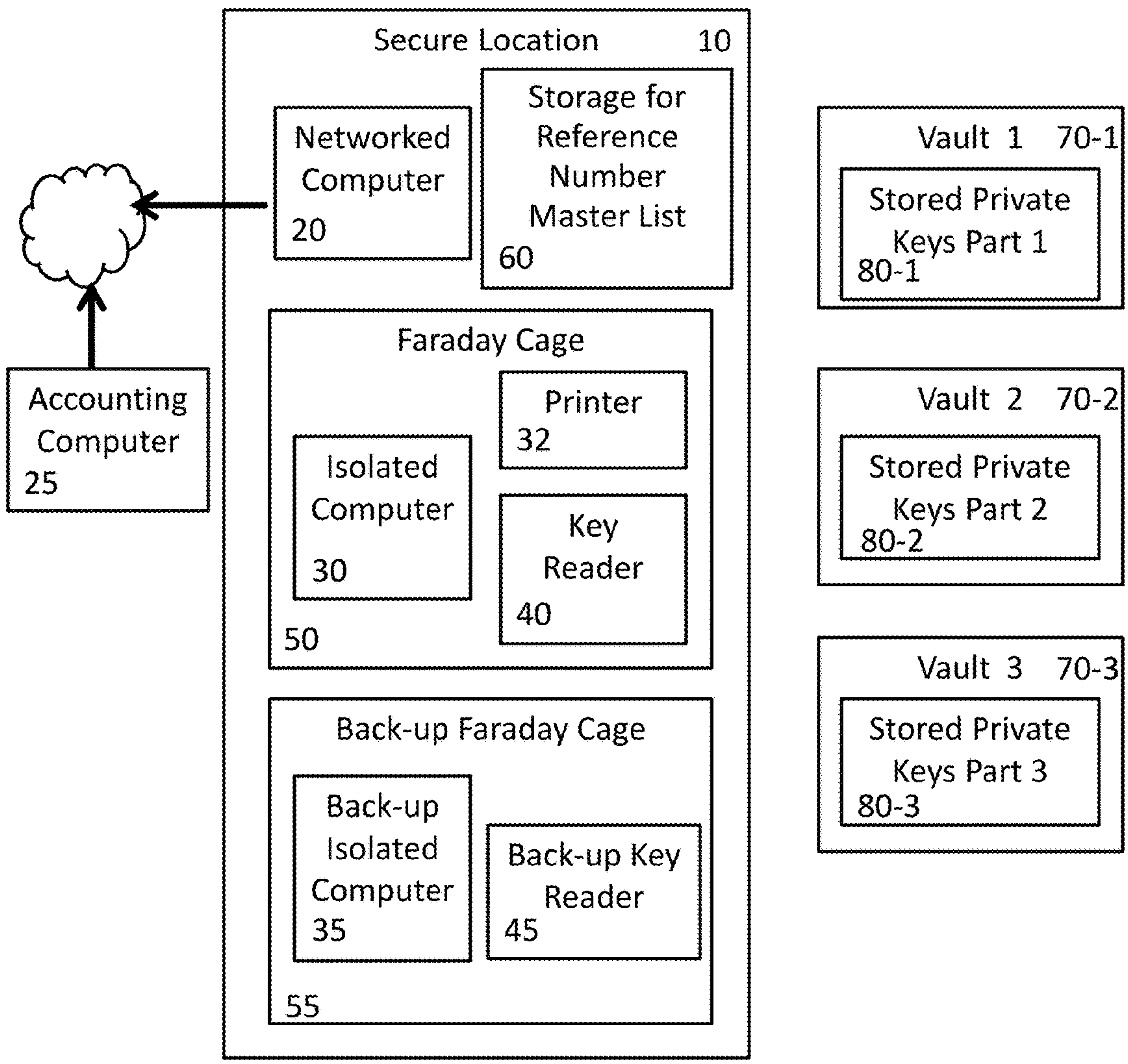
Figure 4C:
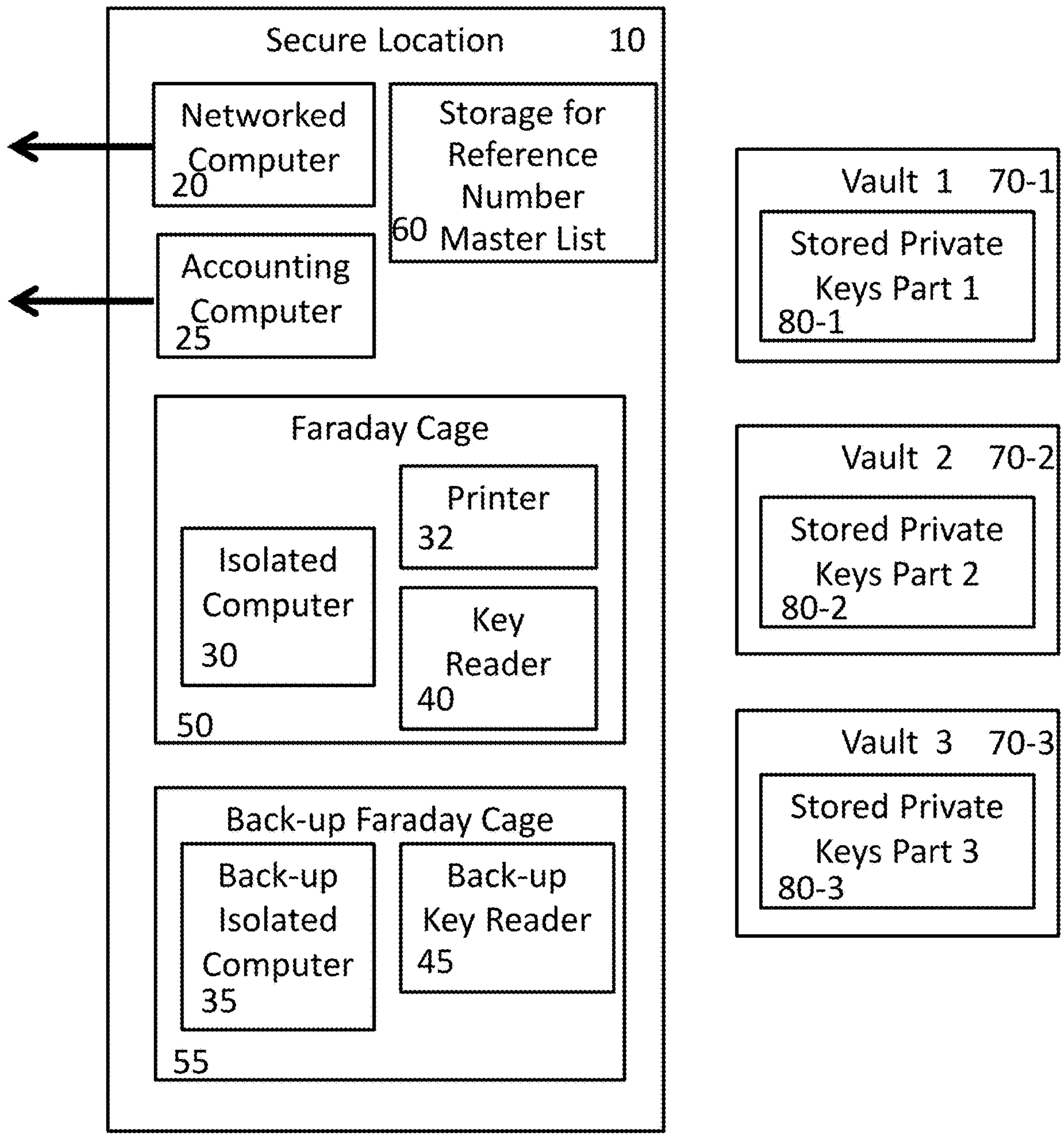

In embodiments, a back-up isolated computer 35 and/or a back-up key reader 45 may be provided at secure location 10, as illustrated in FIGS. 4A-4C. The back-up isolated computer 35 and key reader 45 may be contained in a back-up Faraday cage 55, which may be separate from main Faraday cage 50. In embodiments, all or part of the administrative portal may be duplicated and/or backed up. A duplicate administrative portal or portion thereof may be located in a separate geographic area. A duplicate portal may serve as a disaster recovery operations portal.

In embodiments, a digital math-based asset miner, such as a bitcoin miner, may be located at or within the administrative portal. The miner may be one or more computers. In embodiments, the miner may be operationally connected to any of the computers and/or devices at the administrative portal described above.

Figure 4D:
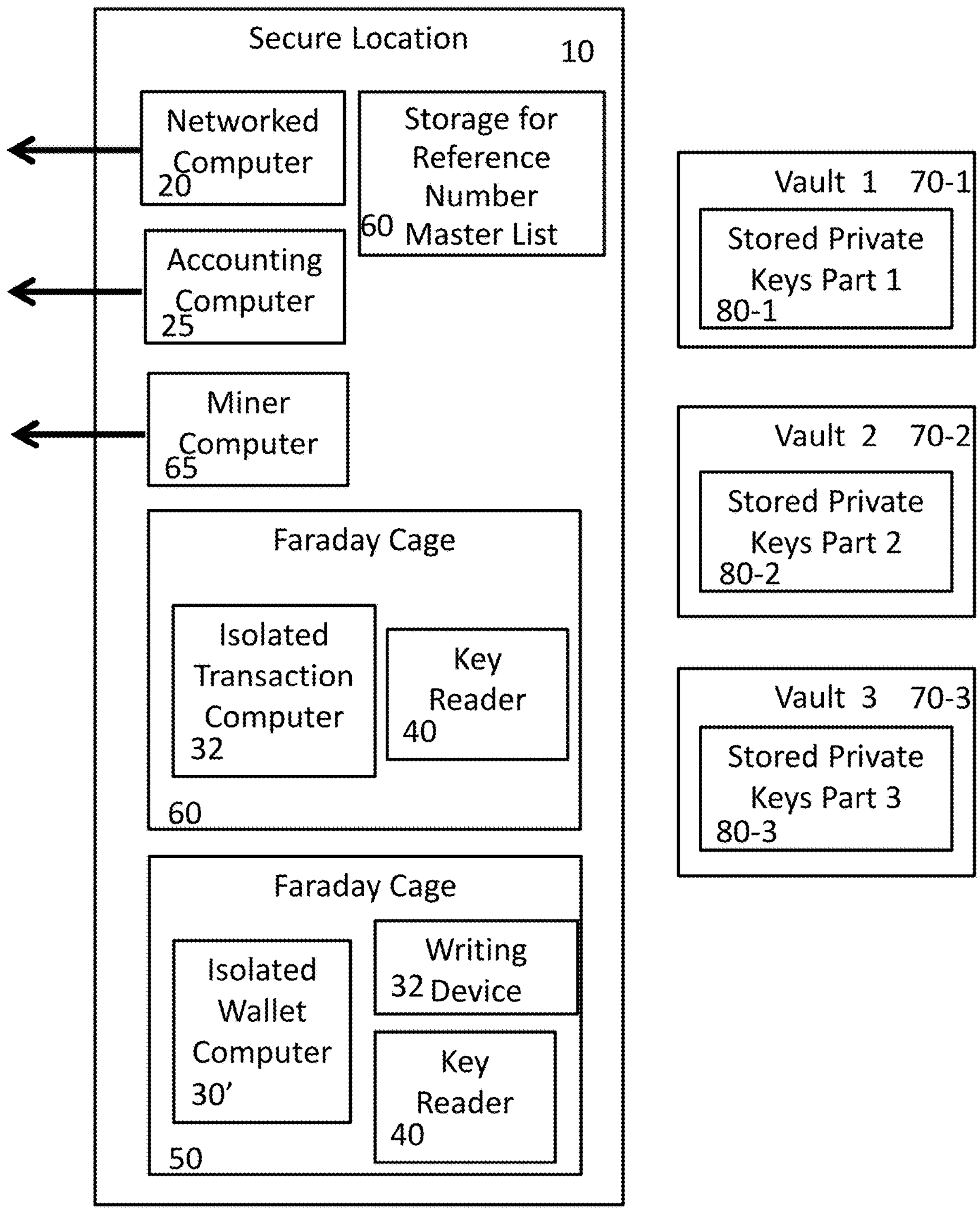

In embodiments, referring to FIG. 4D, the secure location can house one or more networked computers 20, one or more accounting computers 25, one or more digital asset miner computers 65, one or more isolated transaction computers 32 operatively connected to one or more key readers 40, and one or more isolated wallet computers 30', operatively connected to one or more writing devices 32 and, in embodiments, to one or more key readers 40. Each isolated transaction computer 60 and/or isolated wallet computer 30' may be isolated from each other and/or other computers electronically using a secure environment, such as a Faraday cage 50, 60.

One or more vaults 70, 70-1, 70-2, 70-3,70-N, may be used to hold assets. Vaults may be any secure storage facilities, structures, and/or systems. For example, a vault may be a bank vault or a safety deposit box. Vaults may have appropriately controlled environments (e.g., regulated temperature and/or humidity, to name a few) to enable long-term storage of keys and/or key segments substrates. Vaults may be operated by one or more entities, which may be separate entities. In embodiments, only bonded employees may be permitted access to the vaults. Also, vaults may be located in one or more physical (e.g., geographic) and/or digital (e.g., residing on one or more separate computer servers or hard drives) locations. In embodiments, vaults may be used in conjunction with digital wallets and/or other devices and/or systems known in the art for storing digital assets and/or data.

In the exemplary embodiments of FIGS. 4A-D, the private keys 80 may be divided into three segments, 80-1, 80-2, and 80-3 for storage. Each segment may be stored in a separate one of vaults 70-1, 70-2, and 70-3. In embodiments, two segments, four segments, five segments or another number of segments can be used in accordance with embodiments the present invention. In embodiments, each key segment may be stored in a vault operated by the same entity or by one or more different entities.

In embodiments, one or more duplicate copies of each key or key segment may be produced. Such duplicate copies may be stored in separate vaults, e.g., three sets of keys split into three segments may be stored in nine vaults, four sets of keys split into two segments may be stored in eight vaults, and/or the copies of key segments may be distributed among some other number of vaults, to name a few. See, e.g., FIGS. 9A-9D, to name a few. Duplicate copies may serve as a back-up in case one copy of a key or key segment becomes corrupted, lost, or otherwise unreadable.

In embodiments, vaults may hold the keys in an organized or categorized fashion so as to facilitate location of one or more keys or key segments. In embodiments, a sorting reference number may be used to organize the keys or key segments. The sorting reference number may be the same as the reference number that correlates private and public keys. In embodiments, etched coins or other materials or printed keys or key segments may be stacked or otherwise arranged according to the reference number. In embodiments, an index or card catalog may describe the location of the keys. In embodiments, an automated machine may store and retrieve key segments from storage slots, which machine may receive an input to indicate which keys or key segments to retrieve.

Figure 36A:
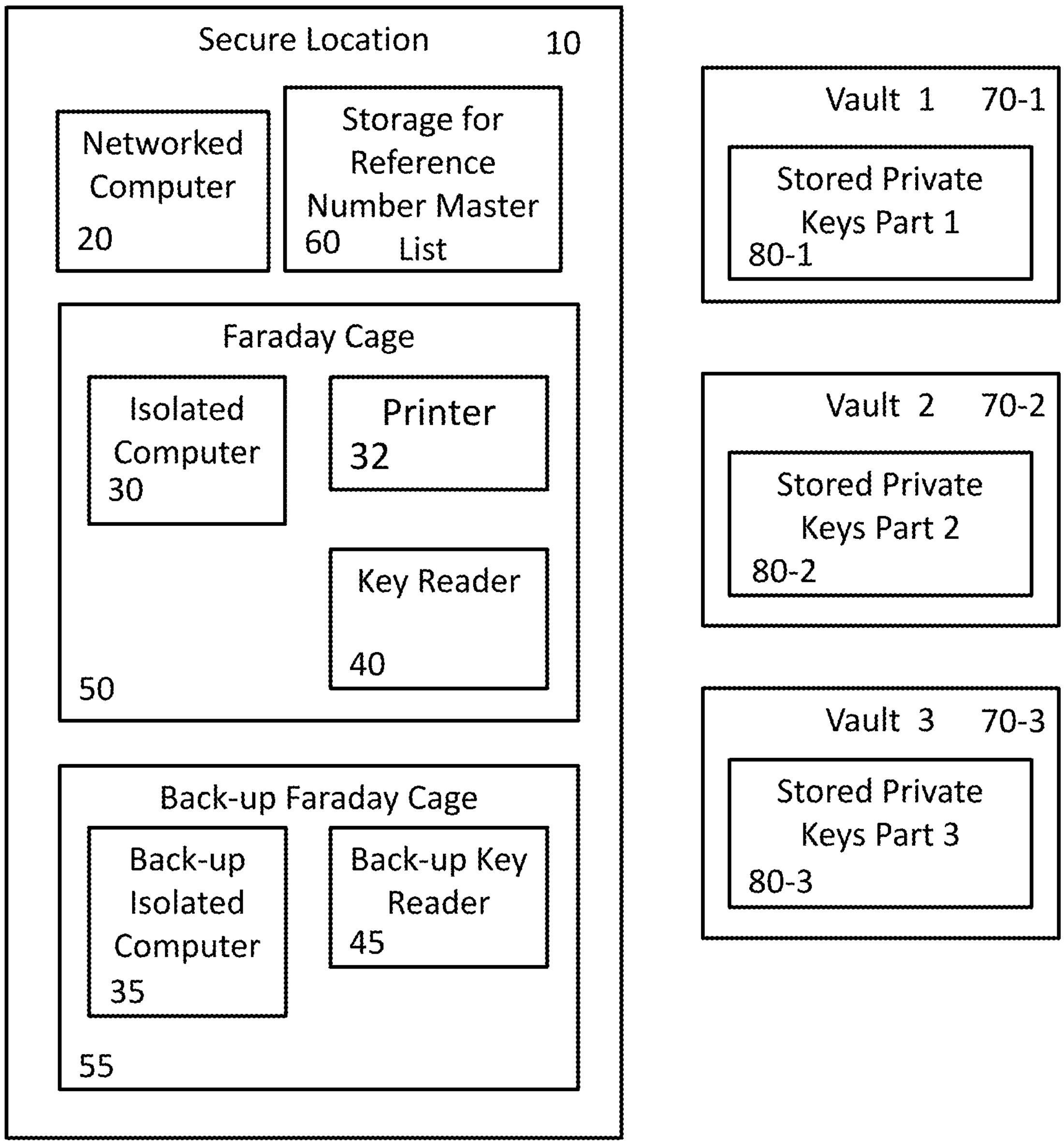
FIGS. 36A-D are exemplary block diagrams of components of security systems for an exchange holding digital math-based assets in accordance with various exemplary embodiments of the present invention.
Figure 36B:
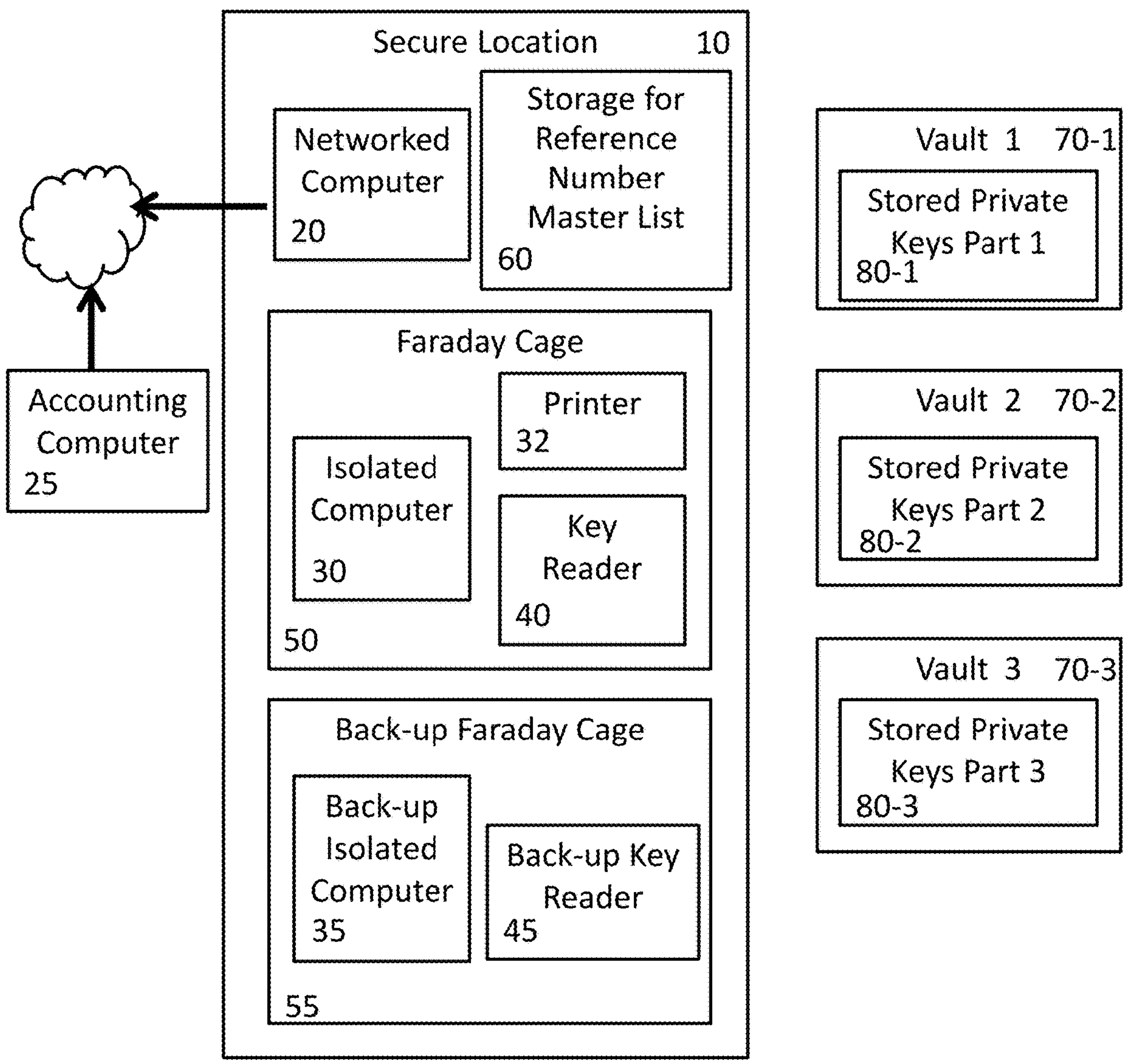
Figure 36C:
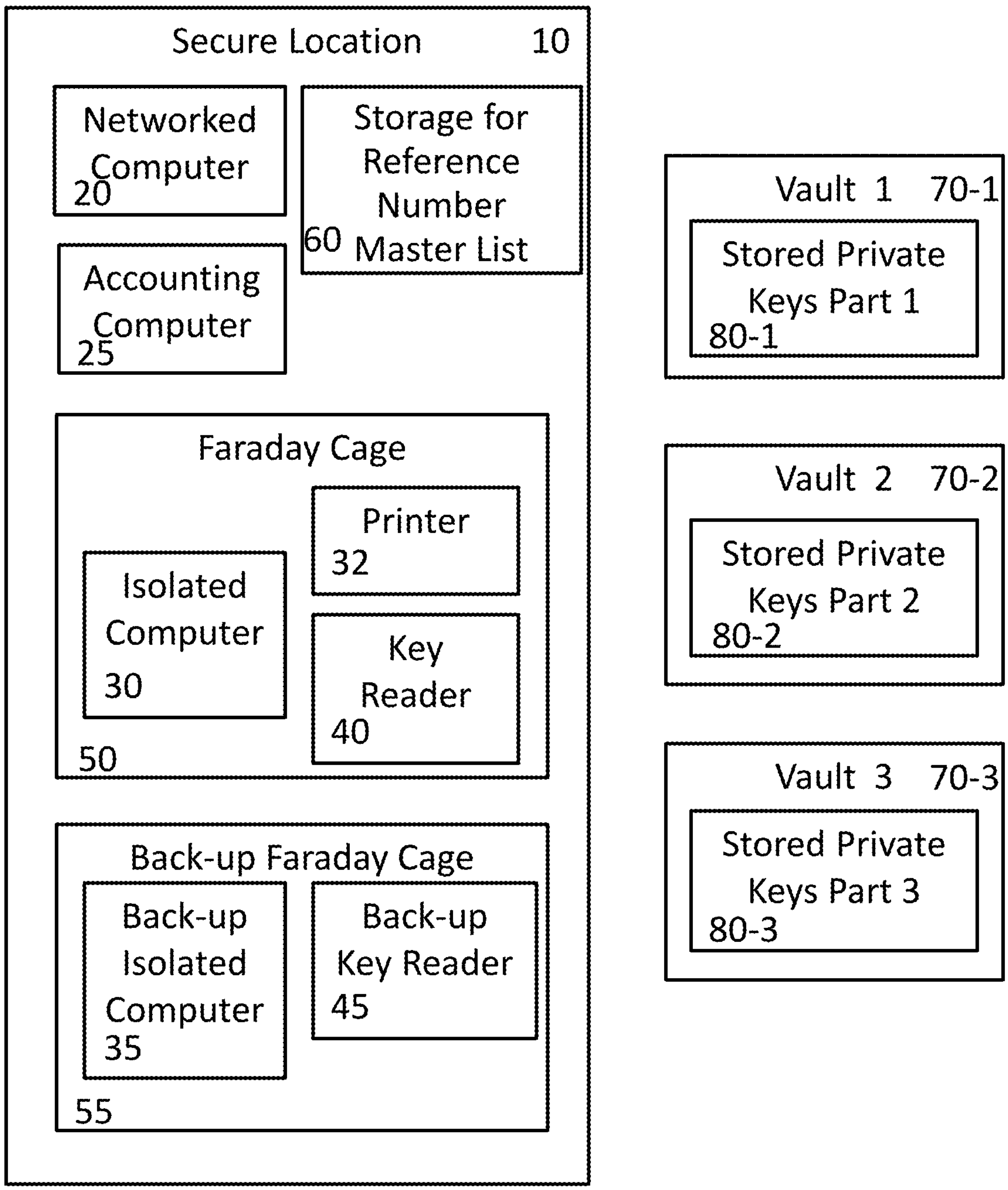

FIGS. 36B and 36C illustrate exemplary embodiments of the present invention where one or more computers 25 running accounting software to account for the assets and/or expenses of an account holder can be located either within the secure location 10 (e.g., FIG. 36B) or outside of the secure location 10 (e.g., FIG. 36C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

Figure 28C:
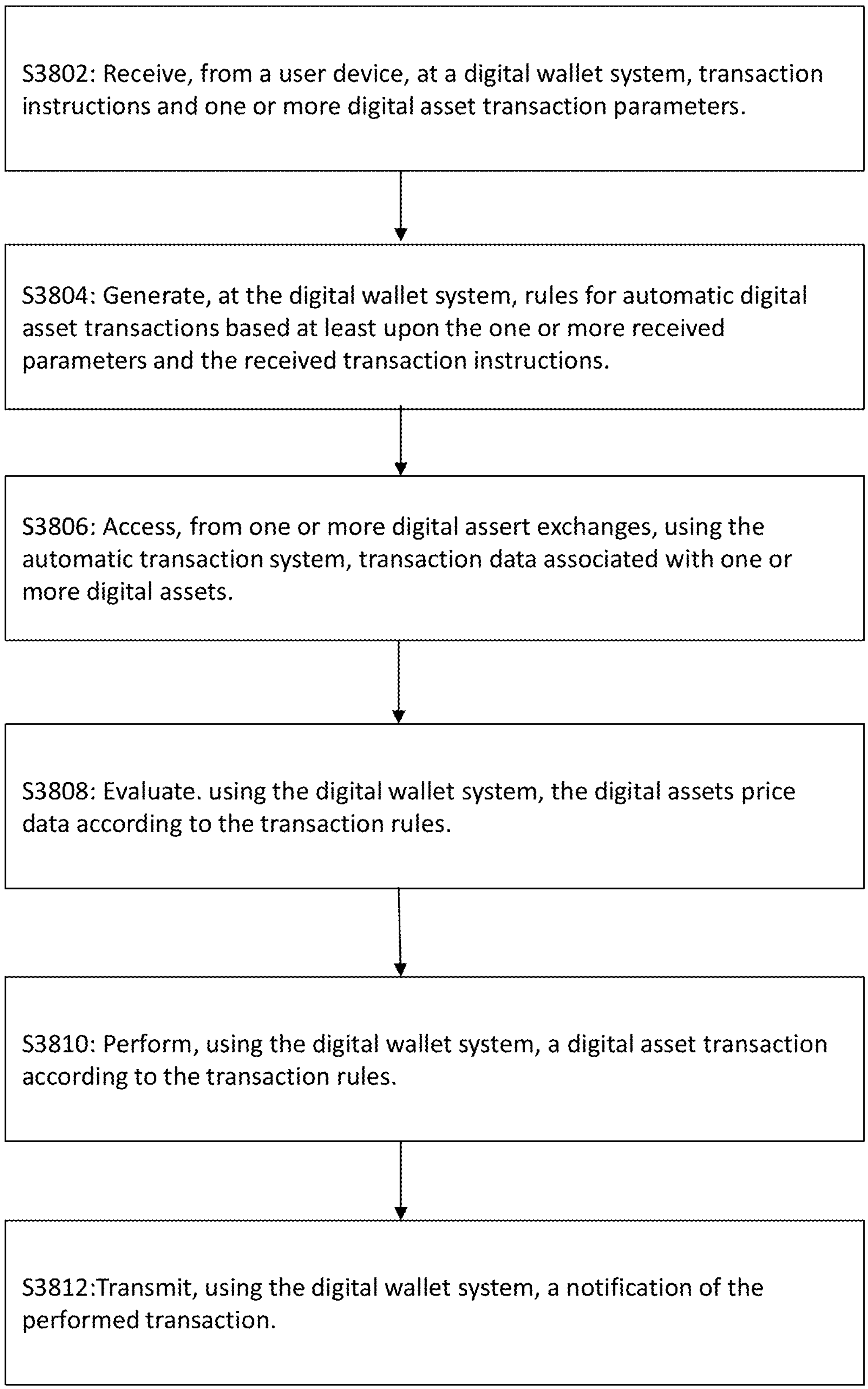
FIG. 28C is an exemplary flow chart for a process for converting from, to, or between digital assets in accordance with exemplary embodiments of the present invention.

The digital asset exchange computer system 3230 may be used to convert digital assets into fiat or other digital assets as well as to exchange fiat for digital assets. In embodiments, a digital asset exchange computer system 3230 may include one or more databases that are used to store user account authentication data, fiat account data, digital wallet data, digital asset customer account data and transaction data, including transaction parameters and transaction instructions. A digital wallet system is operatively connected to a decentralized digital asset network that uses a decentralized electronic ledger in the form of a blockchain maintained by a plurality of physically remote computer systems to track at least one of asset ownership or transactions in a digital asset exchange system. The digital wallet system includes one or more digital wallet modules. FIG. 28C illustrates an exemplary process by which the digital exchange computer system including the digital wallet system conducts transactions. The digital wallet system receives, from a user device, transaction instructions and one or more transaction parameters associated with a transaction as indicated in step S3802. In embodiments, the transactions parameters include on or more of (1) a digital asset strike price as a threshold for sale of a specified amount of digital assets when the price equals, rises above or falls below a predefined threshold, wherein the amount of digital assets to transact may be specified in a different denomination; (2) digital asset denominations; (3) digital asset amounts; (4) time periods; (5) rates of change; or (6) absolute amounts of change. The transaction instructions include at least one of the following (1) buy; (2) sell; (3) hold; or (4) convert to a different denomination of digital asset or fiat currency.

In embodiments, the digital wallet system generates transaction rules for automatic digital asset transactions based at least the one or more received transaction parameters and the received transaction instructions as indicated at step S3804. The transaction rule include computer code running on the one or more computers to perform a transaction when one or more specified conditions are met or not met, based on the rules.

In embodiments, the digital wallet system accesses transaction data including price data associated with the specified amount of digital assets and stores the transaction data in the one or more databases as indicated in step S3806. In an embodiment the digital wallet system may access the transaction data using an application programming interface of an exchange agent. At step S3808, the digital wallet system evaluates the price data according to the transaction rules and, at step S3810, performs automated transactions when pre-defined conditions are met or not met in accordance with the transaction rules and the price data. This evaluation may include testing the transaction data against one or more logical conditions embodied in the transaction rules. In embodiments, these logical conditions include determining at least one of whether the digital asset price has reached or crossed a threshold value; or whether a rate of change in price has reached or crossed a threshold value. The digital wallet system may format the transaction data to be compatible with the digital wallet system.

In embodiments, at step S3812, the digital wallet system may generate one or more notifications to one or more user devices, with the notices includes at least one of a status update on transactions; notification of at least one of incomplete, pending or failed transactions; a log of all transactions as performed by at least one of the digital wallet system or by a user and a log of all transaction opportunities, including transactions declined or not otherwise authorized and transmits the one or more notifications to the user devices.

The digital asset exchange computer system also includes a fund transfer system including a fiat account funding and redemption system, a digital asset account funding and redemption system operatively connected to the digital wallet system and operatively connected to the decentralized digital asset network and a settlement engine operatively connected to the decentralized digital asset network and configured to carry out transactions. The settlement engine may be configured to process specified customer transactions to purchase or sell digital assets according to a user's instructions, if certain user specified factors are met. The user specified factors include that at least one of digital assets are: (a) within a given price, (b) quantity, or (c) period of time. In embodiments, the settlement engine may perform steps of holding, by the digital asset exchange computer system, funds in escrow until a buyer's payment of fiat is received into a bank account; receiving, by the digital asset exchange computer system from a digital asset buyer device, a notification of received digital assets from a digital asset seller; and providing, by the digital asset exchange computer system to a bank computer system associated with a digital asset exchange bank, n instruction to release the digital asset buyer's funds to the digital asset seller. The settlement engine may include pre-program instructions to transfer an amount of digital assets from a seller wallet to at least one buyer wallet upon the occurrence of user specified conditions.

In embodiments, the transaction may be at least one of formation, buying and selling of derivative products, including call options and put options. In embodiments, the transaction may be at least one or more of digital asset lending, delayed settlements, derivative swaps, futures and forwards.

In embodiments, the digital asset account funding and redemption system is configured to process funding of a digital asset account held by the exchange from an exchange customer by receiving, by the digital asset exchange computer system, an initial transfer of digital assets; receiving, by the digital asset exchange computer system, a confirmation of clearance of the digital asset transfer; and updating, by the digital asset exchange computer system, an existing customer account in the one more or more databases with the received digital assets including making an electronic entry in an exchange digital asset electronic ledger and providing a notification that digital assets are received.

In embodiments, the digital asset account funding and redemption system is configured to process withdrawing a digital asset account held by the exchange from an exchange customer. For example, the digital asset account funding and redemption system may provide a withdrawal interface to a first customer user device associated with a first customer, receive user first withdrawal data including at least a first destination wallet address and a first request digital wallet asset withdrawal amount value from the first customer user device, verify that the first digital asset account associated with the first customer contains sufficient digital assets to cover the requested withdrawal amount by reading a digital asset electronic ledger to determine a first digital asset account balance; update the exchange digital asset electronic ledger to reflect the first withdrawal data as pending, execute a first withdrawal based on the first withdrawal data by broadcasting the first withdrawal to a digital asset network electronic ledger, monitor the network digital asset ledger to determine that a transaction based on the first withdrawal is confirmed and update the digital asset ledger to reflect confirmation of the first withdrawal. In embodiments, the digital wallet system may request authority from a user to proceed with the automated transactions before executing the automated transactions. In embodiments, the digital wallet system may require receipt of a user's authorization before performing a transaction by at least one of telephone dialing a number and entering specified digits, text message, email, or via a computer application or a user's mobile wallet. In embodiments the digital wallet system will automatically perform the transaction if no response is received within a predetermined amount of time set by a user in advance or by default.

The digital asset exchange computer system may also include a fraud analysis system configured to detect fraudulent and/or unauthorized transactions.

In embodiments, the digital math-based asset is bitcoin. In embodiments, the digital math-based asset is based on a mathematical protocol for proof of work. The mathematical protocol may be open source. In embodiments, the mathematical protocol includes a one-way cryptographic algorithm. In embodiments, the mathematical protocol includes a sequential hard memory function. The digital math-based asset may be based on a mathematical protocol for proof of stake and is open source. In embodiments, the digital math-based asset is based on a cryptographic mathematical protocol. The digital math-based asset may be based on a mathematical protocol for a hybrid of proof of work and proof of stake. The digital math-based asset may be based on a mathematical protocol for proof of stake velocity. The mathematical protocol may rely upon ownership of respective digital math-based asset as a function of duration of ownership. The digital math-based asset may be based on a mathematical protocol for proof of burn.

In embodiments, a number of digital math-based assets in the decentralized digital assert network is limited. In embodiments, a number of digital math-based assets in the decentralized digital assert network is not limited. A specified number of digital math-based assets in the decentralized digital asset network may be added into circulation during a defined time period.

In embodiments, the digital wallet is activated by a private key, which is mathematically related to a public address in a one-way function. In embodiments, the digital wallet includes a multi-signature account which requires a plurality of private keys to access the digital assets held by the multi-signature account. In embodiments, more keys are generated for the multi-signature account than are required to access and/or use an account.

Figure 36D:
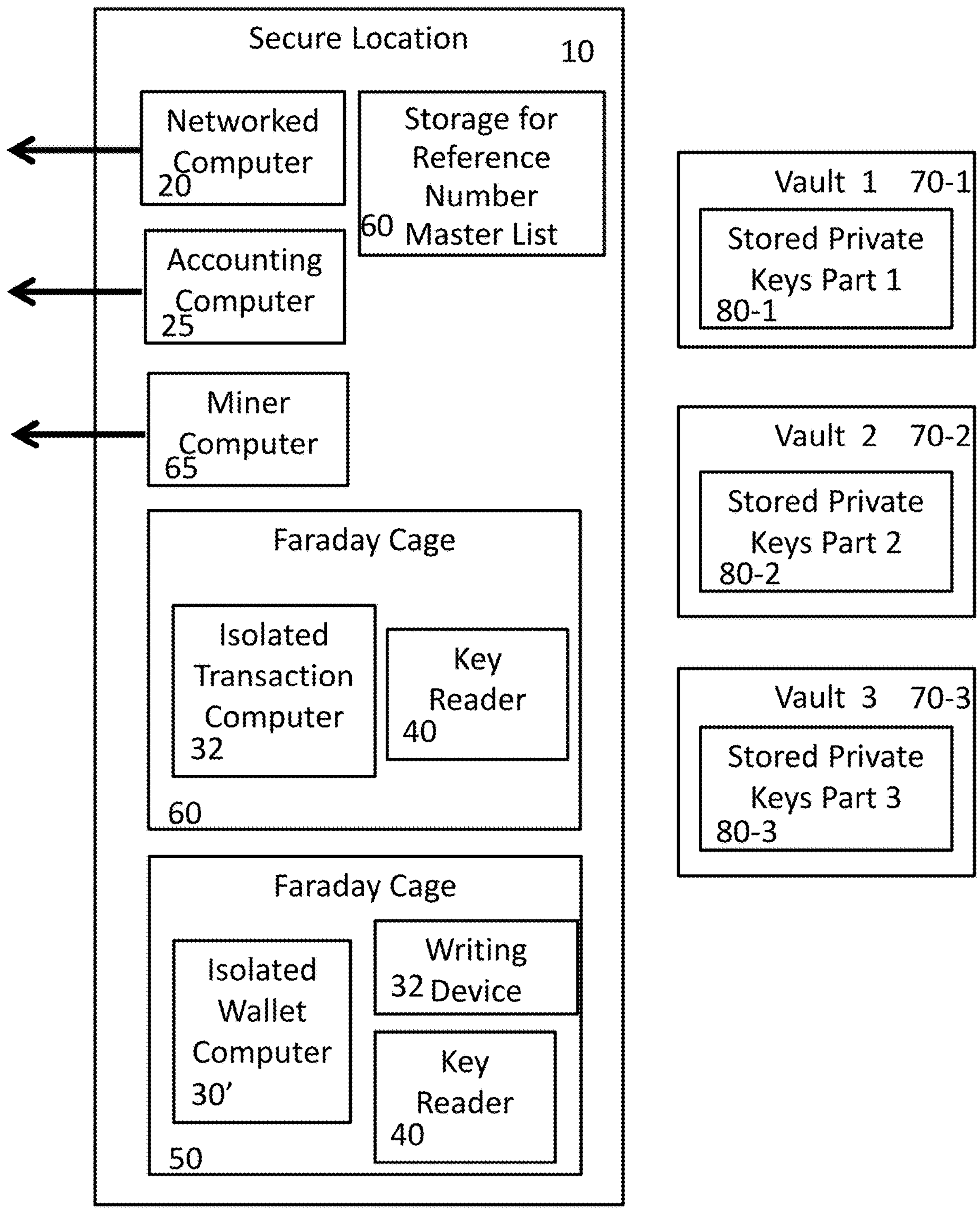

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of exchange withdrawals, deposits, exchange transactions (e.g., purchases and sales), purchase order receipts, and/or sell order receipts, to name a few) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 36D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer. "Air gap, air wall or air gapping" is a network security measure employed on one or more computers to ensure that a secure computer network is physically isolated from unsecured networks, such as the public Internet or an unsecured local area network. The name arises from the technique of creating a network that is physically separated (with a conceptual air gap) from all other networks. To prevent unauthorized data extrusion through electromagnetic or electronic exploits, there is often a specified amount of space between the air gapped system and outside walls and between its wires and the wires for other technical equipment. For a system with extremely sensitive data (such as a private key of a digital asset account), as explained previously, a Faraday cage can be used to prevent electromagnetic radiation (EMR) escaping from the air-gapped equipment.

Figure 5A:
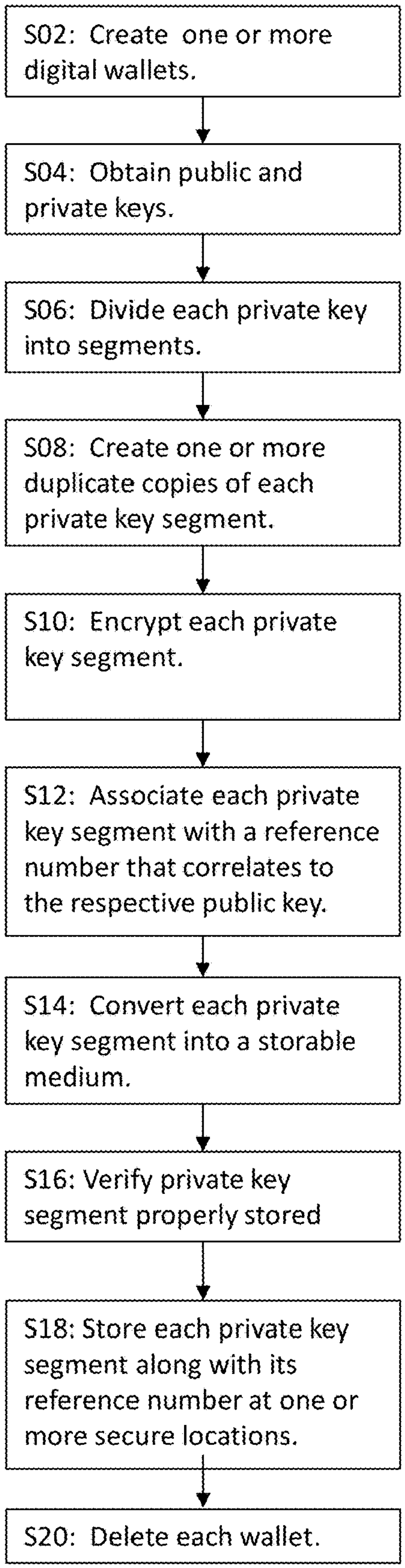
FIGS. 5A and 5B are flow charts of exemplary processes for creating and securing digital wallets in accordance with exemplary embodiments of the present invention.
Figure 5B:
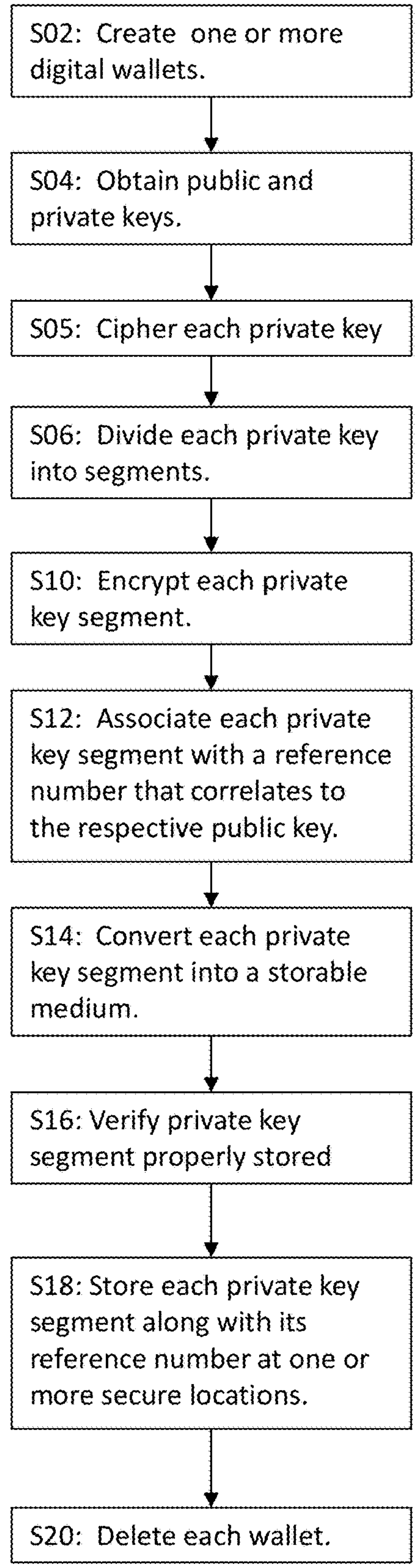

FIG. 5A illustrates an exemplary embodiment of a process for creating digital wallets and storing their keys. In a step S02 one or more digital wallets may be created using one or more isolated wallet computers 30'. In a step S04, the public and private keys associated with the created digital wallets may be obtained using one or more isolated wallet computers 30'. In embodiments, referring to FIG. 5B, in a step S05 each private key may be ciphered. In a step S06, each private key, which may be a ciphered private key following step S05, may be divided into segments. In a step S08, one or more duplicate copies of each private key segment may be created. In some embodiments, the private key may be divided into 2, 3, 4 or more segments. In embodiments, each private key segment may be encrypted or otherwise encoded in a step S10. In embodiments, steps S08 and/or S10 may be skipped. In a step S12, each private key segment may be associated with a reference number, correlating the private key segment to the respective public key and/or indicating the order of the private key segment within the complete key. In a step S14, each encrypted private key segment may be converted to a storable medium, such as by printing each private key segment on paper. In a step S16, the private key segment as converted in the storable medium (e.g., printed) is verified to confirm it was properly and retrievable stored. In embodiments, this step may be skipped. In a step S18, each private key segment is stored along with its reference number at one or more secure locations. In a step S20, each digital wallet is deleted, leaving the stored keys as a means to regenerate the wallets.

FIG. 6A is a flow chart of a process for generating digital asset accounts and securely storing the keys corresponding to each account. In embodiments, the process may be performed using one or more isolated computers not connected to any external data networks. The isolated computer may comprise a clean copy of an operating system (e.g., a clean boot) stored in computer-readable memory and running on one or more processors.

In a step S6002, a computer system comprising one or more computers may be used to generate one or more digital asset accounts capable of holding one or more digital math-based assets. In embodiments, such accounts may be associated with digital asset ownership and/or possession without physically holding a digital asset in any location. A digital asset software client, which may comprise part of a digital wallet or may be accessed using a digital wallet, may be used to generate the digital asset accounts.

In a step S6004, the computer system may be used to obtain one or more private keys corresponding to the one or more digital asset accounts. In embodiments, the private keys may be generated as part of the digital asset account creation process.

In a step S6006, the computer system may be used to divide each of the one or more private keys into a plurality of private key segments. In embodiments, such as with a multi-signature wallet, at least one private key for each digital asset account may be divided into private key segments.

In a step S6008, the one or more computers may be used to encrypt each of the plurality of private key segments. Encryption can comprise any of the techniques described herein, such as character substitution, scrambling, mapping, and/or hashing, to name a few. The computer system can apply one or more algorithms to perform the encryption. Symmetric and or asymmetric encryption algorithms may be applied.

In a step S6010, the one or more computers may be used to generate and/or associate each of the plurality of private key segments with a respective reference identifier. A reference identifier may be a number, alphanumeric sequence, or other unique sequence that can be used to identify key segments, which may be used for storage and/or retrieval of key segments. The reference identifier for each key segment may be stored on a reference identifier master list, which may be stored electronically and/or on a physical substrate. The reference identifier master list may associate with each other the reference identifiers for key segments corresponding to the same key, and/or may also associate a digital asset account identifier (e.g., a public key or public address) with the key segments.

In a step S6012, the one or more computers may be used to create one or more cards for each of the encrypted plurality of private key segments. Each card may have fixed thereon one of the encrypted plurality of private key segments along with the respective associated reference identifier. The cards may be paper, such as index cards, 8½ in.×11 in. sheets of paper, or other paper products. In other embodiments, the cards may include plastic or metal. The cards may be laminated. A writing device may fix the key segments and reference identifiers to the cards by techniques such as printing, etching, and/or magnetically encoding, to name a few. A scannable code, such as a bar code or QR code, may be used to write the keys to the cards.

In embodiments, collated sets of cards may be produced for a plurality of digital asset accounts. Each set may contain only one card per private key such that the private key segments for a single private key are divided among different sets of cards.

In embodiments, following creation of the one or more cards, quality control steps can be performed. A reading device may be used to read each of the cards to ensure readability.

In a step S6014, the one or more computers may be used to track storage of each of the one or more cards in one or more vaults. Vaults may be geographically remote. Vaults can include bank vaults and/or precious metal vaults. In embodiments, a main set of vaults and one or more sets of backup vaults may be used. A main set of vaults can be located in a geographically proximate area, such as a metropolitan area of a city, while backup sets of vaults may be located in geographically remote areas. The backup vaults may contain duplicate copies of the cards. Vault locations for each card or set of cards may be included on the reference identifier master list.

In embodiments, the process can further include receiving at the computer system a quantity of digital math-based assets, and storing those digital assets in the one or more securely stored digital asset accounts. In embodiments, storing the digital asset can comprise transferring the digital assets into accounts with securely stored private keys. Accordingly, storing can comprise generating electronic transfer instructions for an electronic transfer of the quantity of digital math-based assets to the one or more digital asset accounts and broadcasting the electronic transfer instructions to a decentralized electronic ledger maintained by a plurality of physically remote computer systems.

Figure 6B:
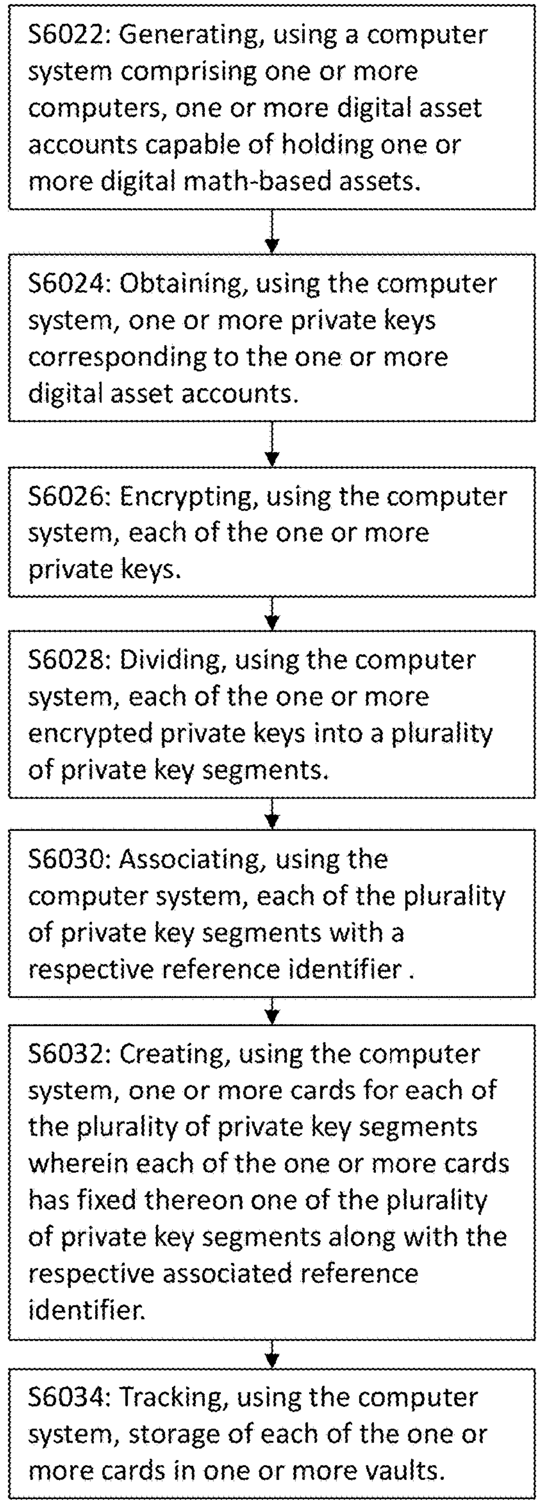

FIG. 6B is a flow chart of another exemplary process for generating digital asset accounts and securely storing the keys corresponding to each account.

In a step S6022, a computer system comprising one or more computers may be used to generate one or more digital asset accounts capable of holding one or more digital math-based assets, as described with respect to step S6002 of FIG. 6A.

In a step S6024, the computer system may be used to obtain one or more private keys corresponding to the one or more digital asset accounts, as described with respect to step S6004 of FIG. 6A.

In a step S6026, the computer system may be used to encrypt each of the one or more private keys.

After encryption, in a step S6028, the computer system may be used to divide each of the encrypted private keys into a plurality of key segments.

In a step S6030, the one or more computers may be used to generate and/or associate each of the plurality of private key segments with a respective reference identifier.

In a step S6032, the one or more computers may be used to create one or more cards for each of the plurality of private key segments.

In a step S6034, the one or more computers may be used to track storage of each of the one or more cards in one or more vaults.

FIG. 6C is a flow chart of another exemplary process for generating digital asset accounts and securely storing the keys corresponding to each account. The exemplary process may generate and store keys for, a multi-signature digital asset account, where at least one of the private keys is divided into a plurality of key segments.

In a step S6042, a computer system comprising one or more computers may be used to generate one or more digital asset accounts capable of holding one or more digital math-based assets.

In a step S6044, the computer system may be used to obtain a first plurality of private keys corresponding to each of the one or more digital asset accounts. Each first plurality of private keys can comprise the private keys of a multi-signature account.

In a step 6046, the computer system may be used to divide a first private key of the first plurality of private keys into a second plurality of first private key segments. For a multi-signature digital asset account at least one of the private keys may be divided into private key segments.

In a step S6048, the computer system may be used to encrypt each of the second plurality of first private key segments. In embodiments, the second key may be encrypted.

In a step S6050, the computer system may be used to generate and/or associate each of the second plurality of first private key segments with a respective reference identifier.

In a step S6052, the computer system may be used to create one or more one or more cards for each of the encrypted second plurality of first private key segments wherein each of the one or more cards has fixed thereon one of the encrypted second plurality of first private key segments along with the respective associated reference identifier. In embodiments, the second key may be written, e.g. using the writing device, to one or more physical substrates, such as paper, plastic, and/or metal. In other embodiments, the second key may be stored electronically.

In a step S6054, the computer system may be used to track storage of each of the cards in one or more vaults, as well as to track storage of the second private key. A reference identifier master list may identify the storage locations of each key and key segment.

Figure 6D:
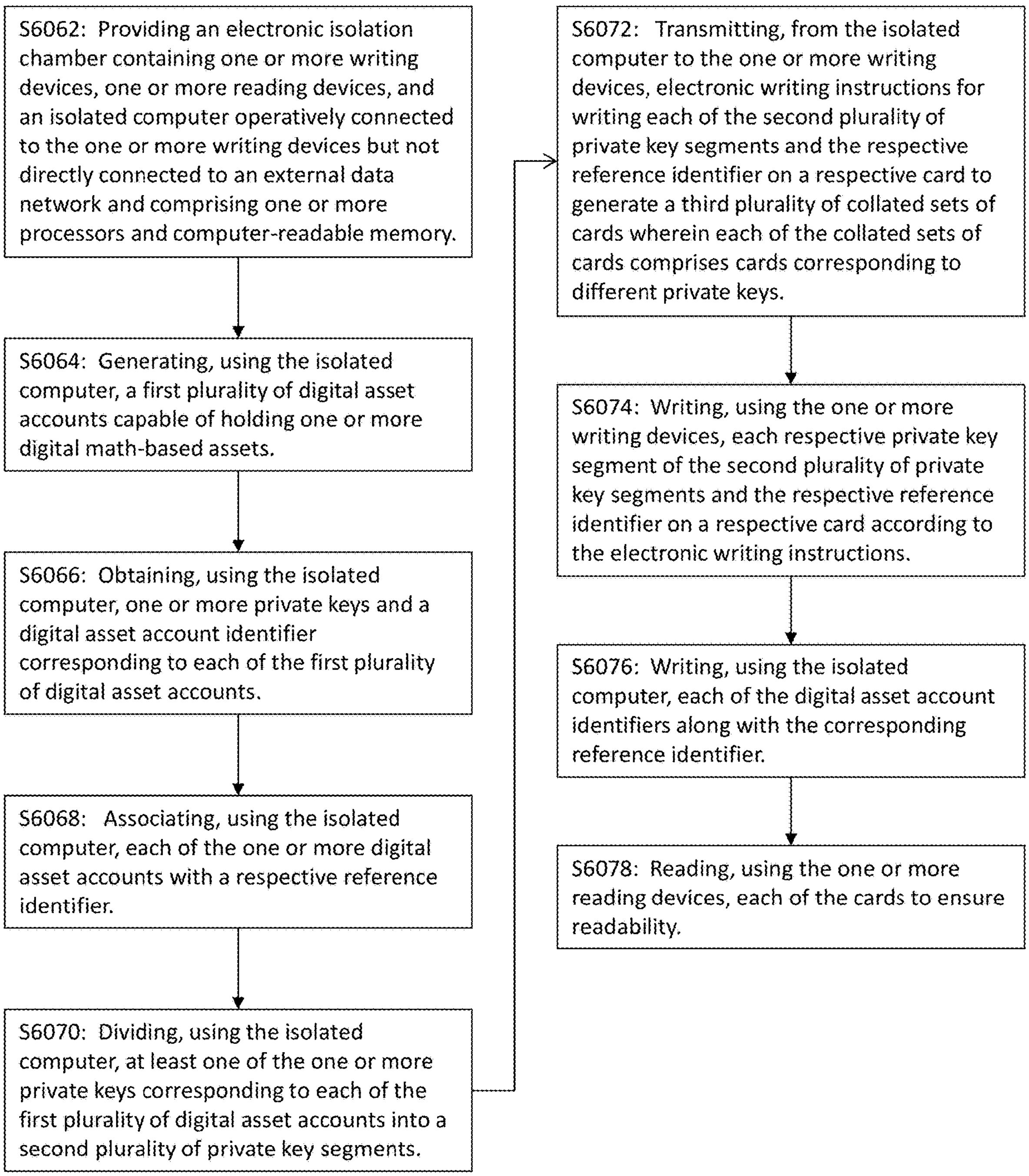

FIG. 6D is a flow chart of an exemplary process for securely generating digital asset accounts and storing associated keys using a secure portal.

In a step S6062, an electronic isolation chamber may be provided containing one or more writing devices (e.g., printers, engravers, magnetic card encoders, to name a few), one or more reading devices (e.g., scanners, bar code scanners, QR readers, magnetic card readers, to name a few), and an isolated computer operatively connected to the one or more writing devices but not directly connected to an external data network and comprising one or more processors and computer-readable memory.

In a step S6064, the isolated computer may be used to generate a first plurality of digital asset accounts capable of holding one or more digital math-based assets. In embodiments, the first plurality of digital asset accounts may comprise multi-signature digital asset accounts.

In a step S6066, the isolated computer may be used to obtain one or more private keys and a digital asset account identifier corresponding to each of the first plurality of digital asset accounts.

In a step S6068, the isolated computer may be used to associate each of the one or more digital asset accounts with a respective reference identifier. The reference identifier may comprise an alphanumeric sequence. In embodiments, respective reference identifiers may be associated with one or more keys or key segments corresponding to the respective digital asset accounts.

In a step S6070, the isolated computer may be used to divide at least one of the one or more private keys corresponding to each of the first plurality of digital asset accounts into a second plurality of private key segments. In embodiments, each private key segment may be required to regenerate the respective private key. In embodiments, a subset of the second plurality of private key segments (e.g., 3 of 5 keys) could be sufficient to regenerate the respective private key.

In a step S6072, the isolated computer may transmit to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys. In embodiments, the third plurality of collated sets can include one or more duplicate sets for each of the collated sets of cards. In embodiments, the isolated computer may be used to generate the electronic writing instructions prior to transmitting them to the one or more writing devices.

In a step S6074, the one or more writing devices may be used to write each respective private key segment of the second plurality of private key segments and the respective reference identifier on a respective card according to the electronic writing instructions. In embodiments, step S6074 can comprise printing and/or etching each respective private key segment of the plurality of private key segments and the respective reference identifier on respective separate cards. In embodiments, each respective private key segment of the plurality of private key segments may be magnetically encoded on respective separate cards. The respective reference identifiers may be printed on the respective cards, e.g., to be readable without a magnetic card reader. Each respective private key segment of the second plurality of private key segments may be written, e.g., printed, as a scannable code, such as a bar code and/or a QR code.

In a step S6076, the isolated computer may be used to write each of the digital asset account identifiers along with the corresponding reference identifier. In embodiments, step S6076 can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, the electronic storage medium could include a hardware storage module ("HSM"). In embodiments, writing according to the second writing instructions can comprise writing to a physical storage medium, such as paper.

In a step S6078, the one or more reading devices may be used to read each of the cards to ensure readability. In embodiments, step S6078 may be performed after step S6076. In embodiments, step S6078 may be performed before step S6076.

Figure 15A:
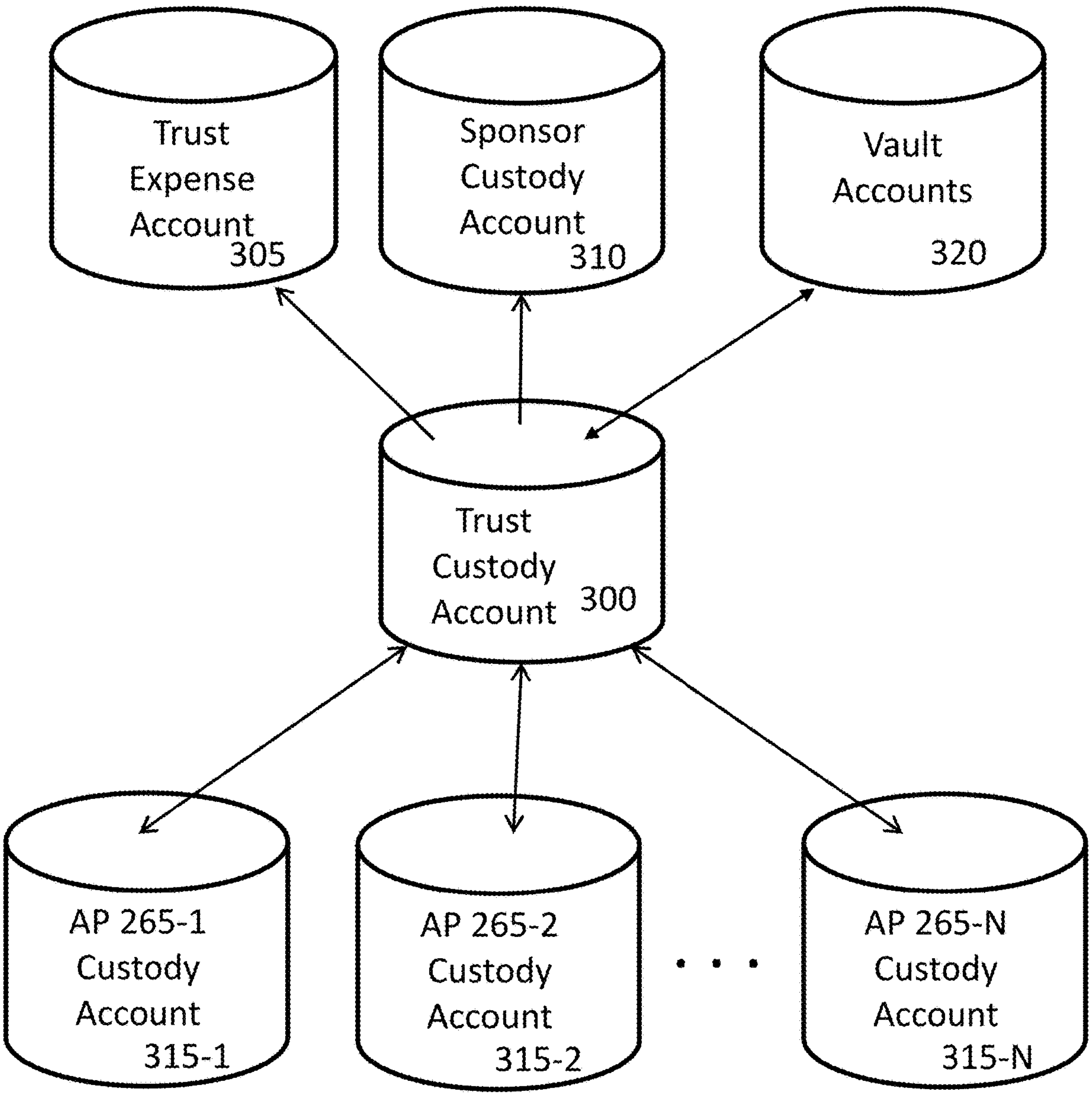
FIGS. 15A and 15B are schematic diagrams of the accounts associated with a trust in accordance with exemplary embodiments of the present invention.

In embodiments, the process illustrated by FIG. 15D can further comprise the step of writing, using the isolated computer, the respective digital asset account identifiers to a removable electronic storage medium, e.g., for transfer to an accounting computer.

In embodiments, the process can further comprise the step of destroying the isolated computer, the one or more writing devices, and the one or more reading devices, or destroying any one of those devices.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

FIGS. 4B and 4C illustrate exemplary embodiments of the present invention where one or more computers 25 running accounting software to account for the assets and/or expenses of an account holder can be located either within the secure location 10 (e.g., FIG. 4B) or outside of the secure location 10 (e.g., FIG. 4C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of ETP redemptions and/or creations) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 4D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer.

Figure 7:
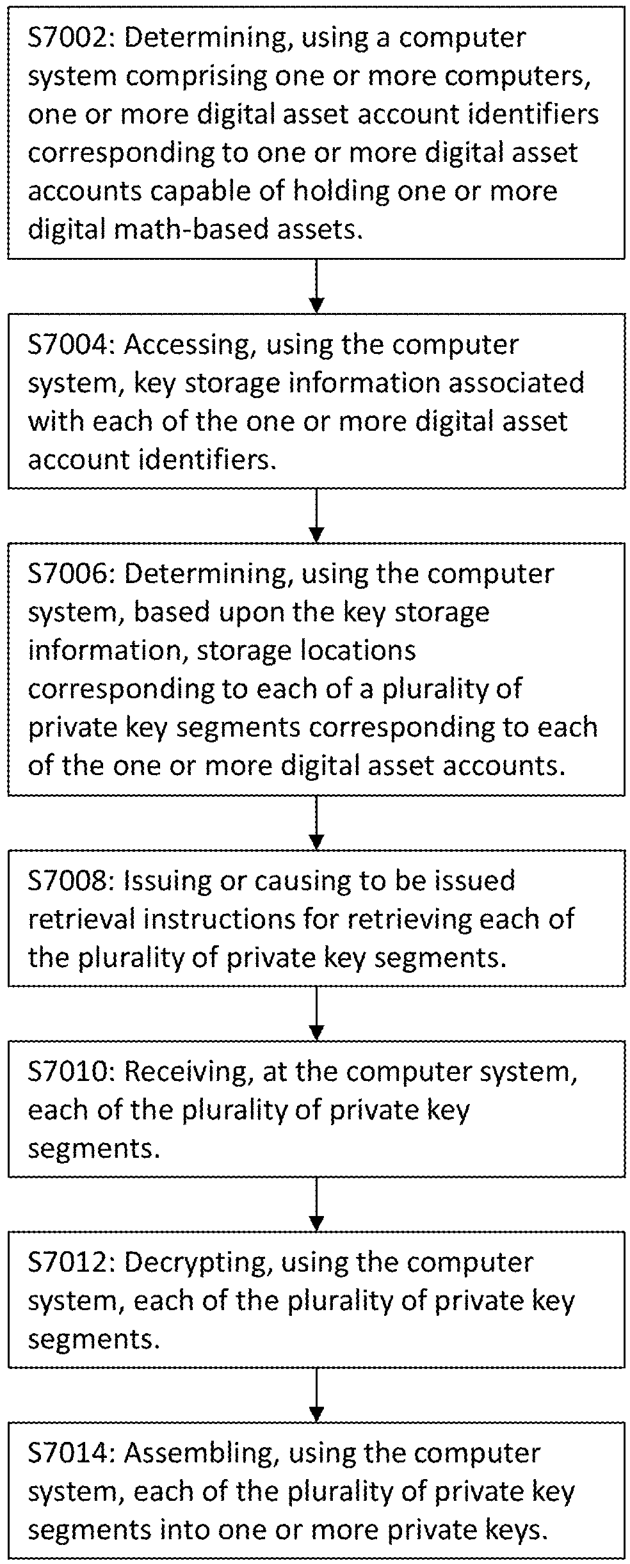
FIG. 7 is a flow chart of an exemplary process for retrieving securely stored keys associated with a digital asset account in accordance with exemplary embodiments of the present invention.

FIG. 7 is a flow chart of a process for retrieving securely stored private keys in accordance with exemplary embodiments of the present invention.

In exemplary embodiments, in step S7002, a computer system comprising one or more computers may be used to determine one or more digital asset account identifiers corresponding to one or more digital asset accounts capable of holding one or more digital math-based assets.

In a step S7004, the computer system may be used to access key storage information associated with each of the one or more digital asset account identifiers. In embodiments, the key storage information may comprise a reference identifier associated with one or more stored private key segments.

In a step 7006, the computer system may be used to determine, based upon the key storage information, storage locations corresponding to each of a plurality of private key segments corresponding to each of the one or more digital asset accounts.

In a step 7008, retrieval instructions for retrieving each of the plurality of private key segments may be issued or caused to be issued.

In a step 7010, each of the plurality of private key segments may be received at the computer system.

In a step 7012, the computer system may be used to decrypt each of the plurality of private key segments.

In a step 7014, the computer system may be used to assemble each of the plurality of private key segments into one or more private keys.

In embodiments, the process depicted in FIG. 7 may further comprise the step of accessing, using the computer system, the one or more digital asset accounts associated with the one or more private keys. In further embodiments, the process depicted in FIG. 7 may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

Figure 8:
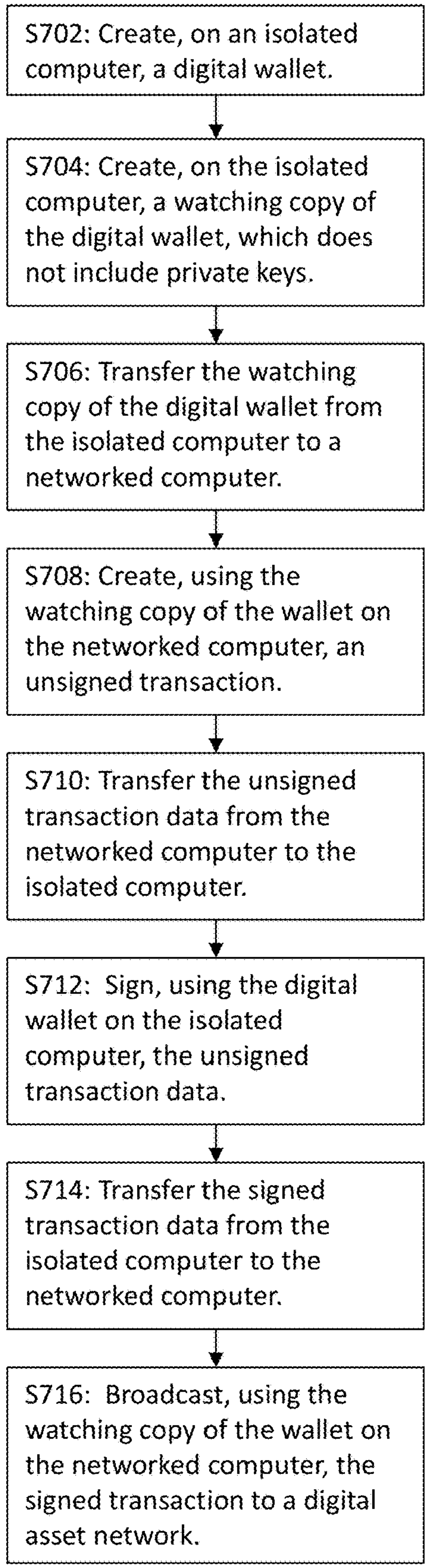
FIG. 8 is a flow chart of a method of performing a secure transaction in accordance with exemplary embodiments of the present invention.

FIG. 8 describes an exemplary method of performing secure transactions. In a step S702, a digital wallet may be created on an isolated computer. In a step S704, a watching copy of the digital wallet, which may not include any private keys, may be created on the isolated computer. In a step S706, the watching copy of the digital wallet may be transferred from the isolated computer to a networked computer. In a step S708, an unsigned transaction may be created using the watching copy of the wallet on the networked computer. In a step S710, data associated with the unsigned transaction may be transferred from the networked computer to the isolated computer. In a step S712, the unsigned transaction data may be signed using the digital wallet on the isolated computer. In a step S714, the signed transaction data may be transferred from the isolated computer to the networked computer. In a step S716, the signed transaction data may be broadcast, using the watching copy of the wallet on the networked computer, to a digital asset network. In embodiments, the broadcast of a signed transaction may complete a transaction and/or initiate a verification process that may be performed by the network.

In embodiments, processes for generating digital asset accounts and/or storing associated keys may be performed by a secure system, e.g., an administrative portal. The system can comprise an electronic isolation chamber, such as a Faraday cage. The system can further comprise one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier. The system can further comprise one or more writing devices located within the electronic isolation chamber and configured to perform the electronic writing instructions, including collating the plurality of cards into the plurality of sets. The system can also comprise one or more reading devices located within the electronic isolation chamber and configured to read the plurality of private key segments along with the respective associated reference identifier from the one or more cards. The reading devices may be used for quality control, to ensure that the cards are readable.

Cold Storage

In embodiments, a digital asset account holder may operate one or more computers to manage, process, and/or store the transactions and/or digital assets. In embodiments, a portion, consisting of some or all, of the digital assets may be stored in cold storage, which involves no outside connections. Cold storage may be a bank vault, a precious metal vault, a lockbox, or some other secure room or area. There may be no communication channels connecting to the cold storage area. In embodiments, electronic vaults may be used. Electronic vaults may comprise cloud storage, one or more hard drives, flash drives, memory cards or like storage technology, to name a few. Electronic vaults may hold one or more keys and/or key segments, which may be encrypted and/or encoded as described herein.

In embodiments, the cold storage may comprise a divided storage system. In a divided storage system, components or portions of components may be stored at multiple locations. Components may be at least digital wallets, public and/or private keys, or assets.

Figure 9A:
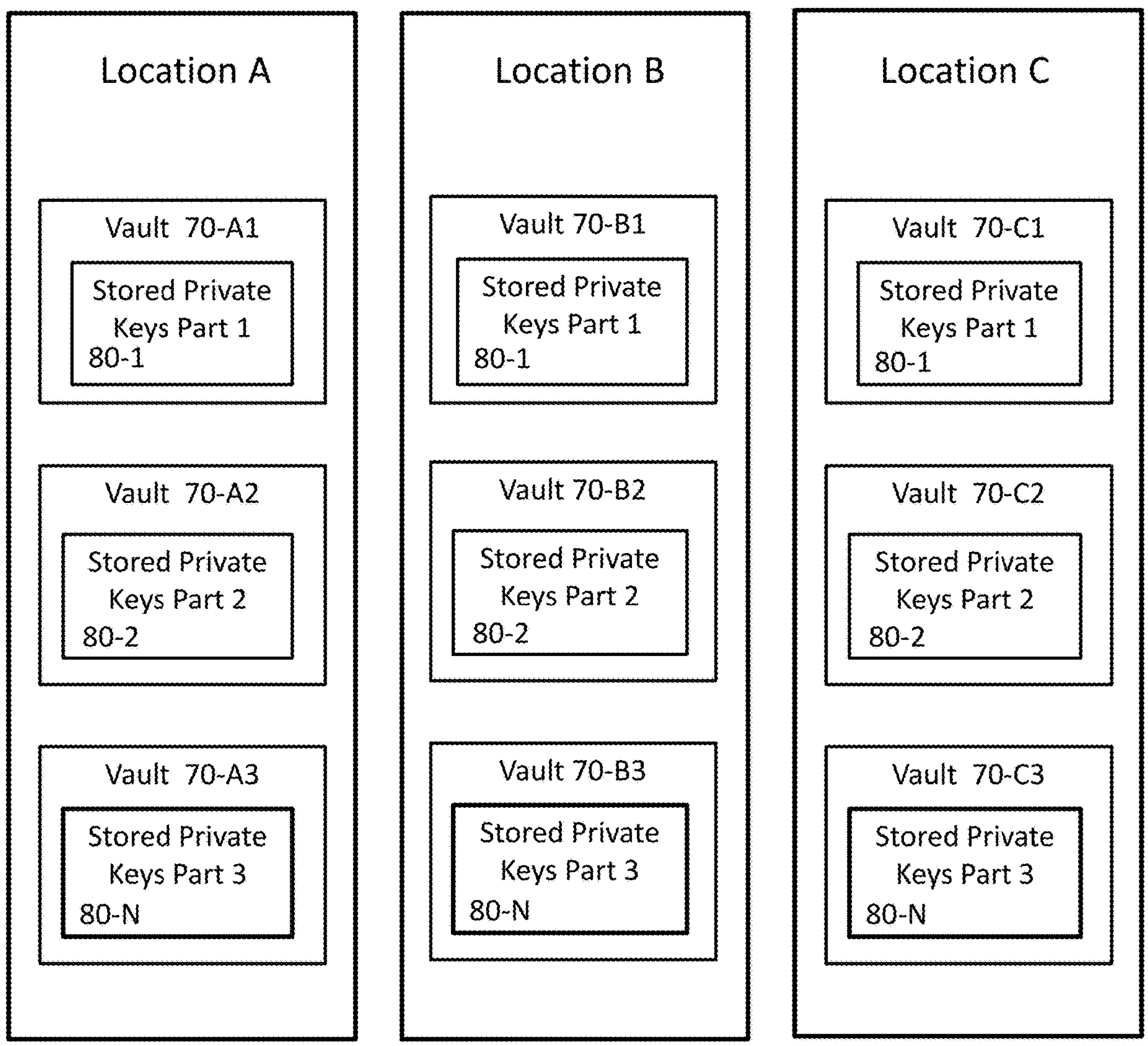
FIGS. 9A-9D are schematic diagrams of cold storage vault systems in accordance with exemplary embodiments of the present invention.

FIG. 9A is a schematic diagram of a cold storage vault system in accordance with exemplary embodiments of the present invention. In embodiments, each private key to be stored in vaults 70 for cold storage may be divided into one or more segments 80. In embodiments, each segment can be stored in a separate vault 70. In this manner, the risk of each of the segments 80 being reassembled into a complete key may be reduced due to the segregation of each piece of each key. Each vault may then be located at different locations, e.g., Locations A, B, and C. In embodiments, each vault (e.g., 70-Aa, 70-A2, 70-A3) may be located at different locations in the same general vicinity (e.g., the general vicinity of Location A, which may be New York City). Each vault may have a user entry log to provide a record of access to the vault and/or may employ security measures to ensure only authorized access.

Duplicate sets of the segmented private keys may then be made and stored in separate vaults (e.g., one duplicate copy divided between Vaults 70-B1, 70-B2, and 70-B3, and another duplicate copy divide between Vaults 70-C1, 70-C2, and 70-C3). Each set of segmented keys 80 may be located in the same general vicinity (e.g., Location B for Vaults 70-B1, 70-B2, and 70-B3 and Location C for Vaults 70-C1, 70-C2, and 70-C3), with each general vicinity being different from other general vicinities (e.g., Location B may be Philadelphia and Location C may be Indianapolis, Indiana). Locations may include domestic and/or international locations. Locations can be selected based on at least one or more of the following parameters: ease of access, level of security, diversity of geographic risk, diversity of security/terror risk, diversity of available security measures, location of suitable vaults in existence (e.g., custodian vaults for a trust associated with an ETP), space available at vaults, jurisdictional concerns, to name a few. In embodiments, three geographic locations can be used wherein Location A is within a short intraday time of transit (e.g., 1 hour), Location B is within a longer intraday time of transit (e.g., 3-4 hours), and Location C is within one or more day times of transit (e.g., 1-2 days). In embodiments, the location of the vaults may be within a distance that allows segments of key pairs to be retrieved within a redemption waiting period (e.g., 3 days). A complete key set (e.g., stored private keys parts 1-3) may be stored in each vault general location (e.g., Location A, Location B, Location C).

Figure 9B:
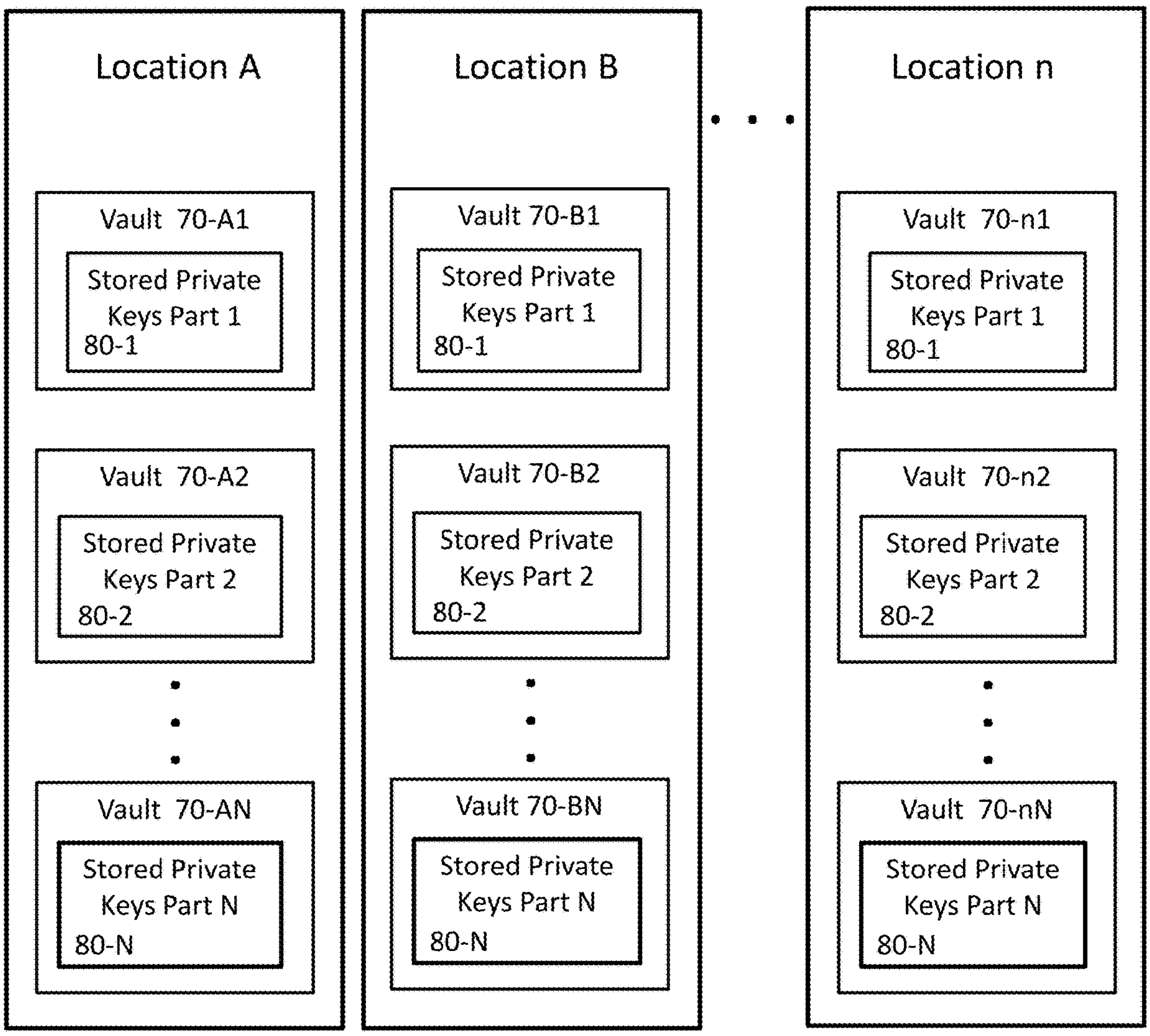

In FIG. 9A, three segments have been used, but other numbers of segments can also be used consistent with embodiments of the present inventions. FIG. 9B illustrates that any number of vault general locations (e.g., A-N) may be used, which may entail n number of complete key sets. In embodiments, the keys may be broken into any number of key segments, 1-N. In embodiments, in order to reassemble one complete key, all N segments may have to be reassembled together.

Figure 9C:
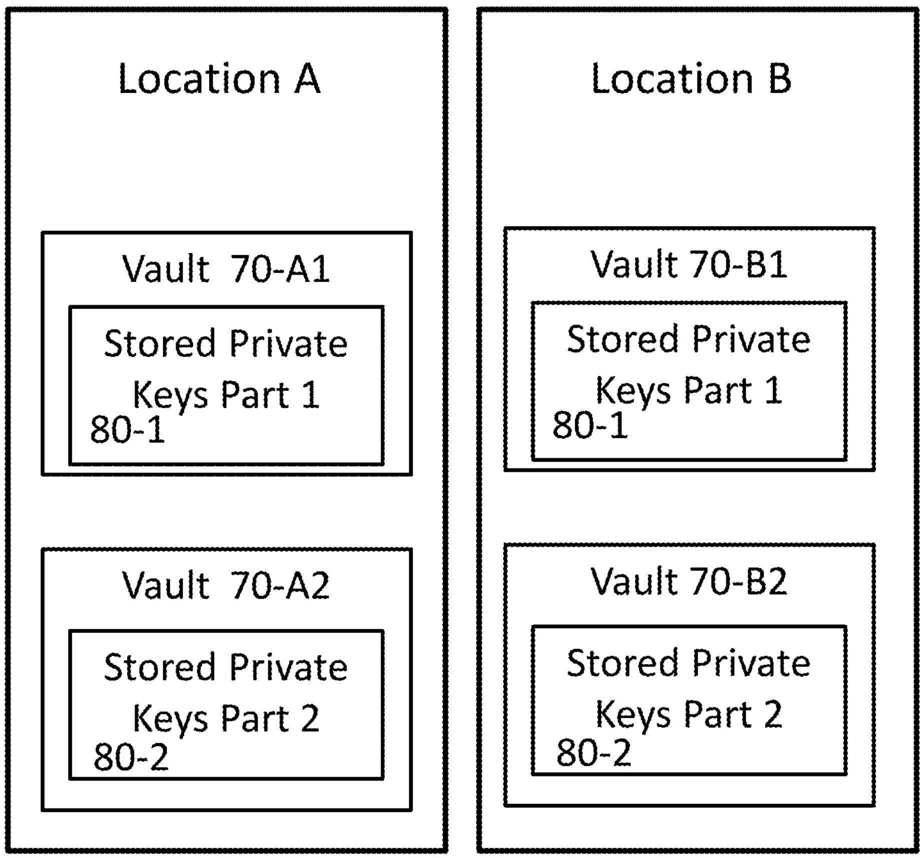

In embodiments, there may be two sets of segmented keys, as illustrated in FIG. 9C, which may be located in two general locations (e.g., A and B). In embodiments, the keys may be parsed into two segments (e.g., 80-1 and 80-2), as illustrated in FIG. 9C.

Figure 9D:
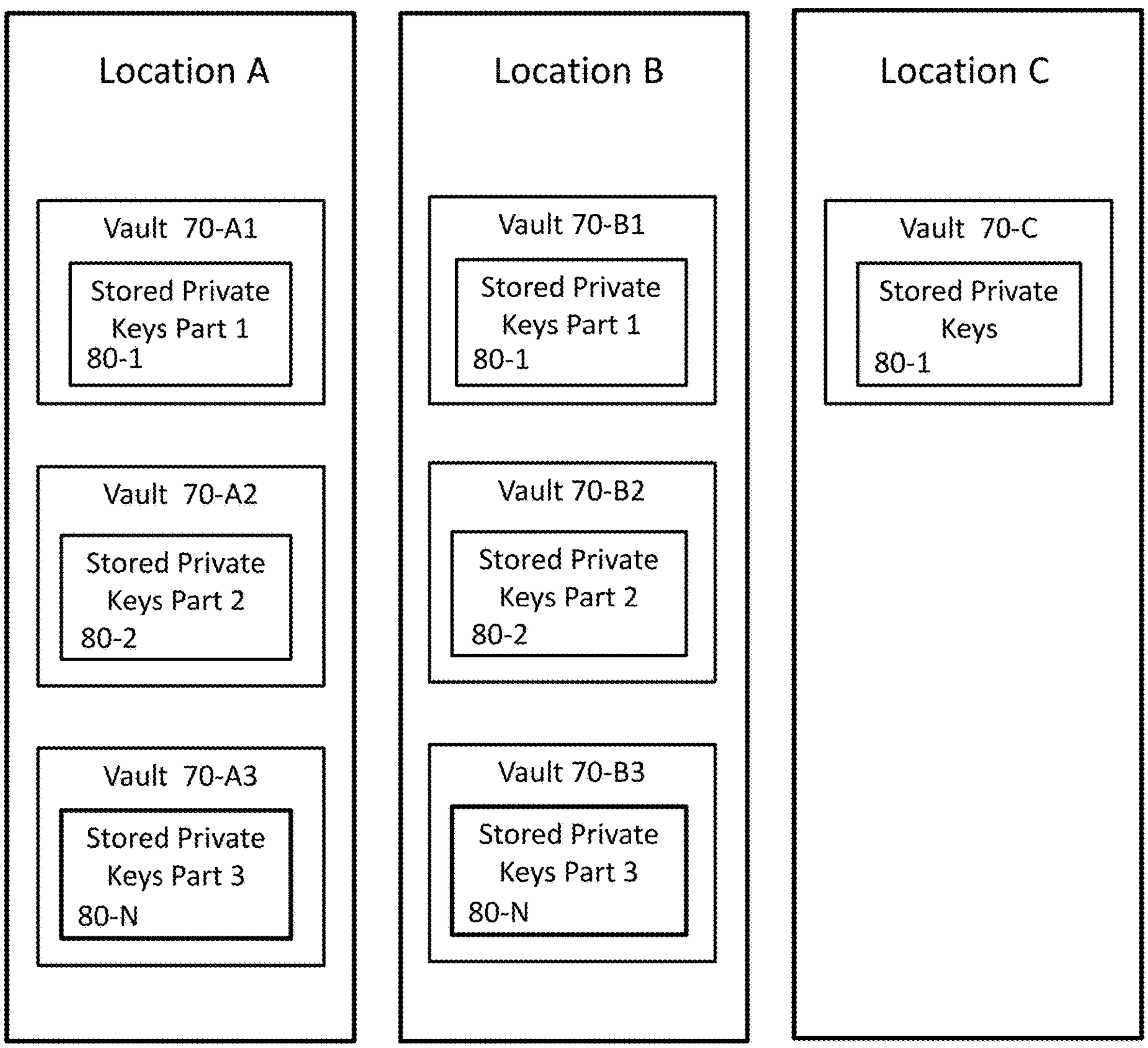

In embodiments, duplicate sets may not be embodied in same form as the original set and/or other duplicate sets. For example, two sets may be stored on paper, and a third set is stored on *papyrus*. In embodiments, at least one set of segmented keys can be stored on paper, while at least one set is stored on one or more disks, memory sticks, memory cards, tapes, hard drives, or other computer readable media. In embodiments, the same number of segments can be used for each set. In embodiments, a different number of segments can be used for at least two of the sets (e.g., 3 segments for 1 set, and 4 segments for 1 set). In embodiments, different types of coding and/or encryption can be used for at least two sets. FIG. 9D illustrates three sets of key copies, where the third copy 80 stored in vault 70-C may not be divided into segments. Such a key copy may be encrypted like any of the other key segments.

A cold storage back-up may be provided by a one-way electronic data recordation system. The system can function as a write-only ledger. Upon deposit of digital assets into cold storage, the corresponding private keys may be transmitted to the recordation system, which will store a record of the transaction. When digital assets are removed from a wallet, a record of the removal and/or wallet destruction can be sent to the system. In the event that wallet keys must be retrieved, the recordation system can be accessed to determine the wallet keys. Accessing the recordation system to retrieve keys can be designed to be a difficult operation, only to be performed in the event of an emergency need to recover wallet keys.

Key Storage Service

Digital asset storage services and/or digital asset protection may be provided in accordance with the present invention. Digital asset storage may use any of the secure storage systems and methods described herein, including those described with respect to a digital asset ETP. In embodiments, a digital asset storage service may be provided to other entities (e.g., a trust associated with an ETP, authorized participants in the trust, retailers, banks, or other digital asset users), to provide secure storage of digital assets. Such a storage service may use any of the security measures described herein. In embodiments, a digital asset storage service may comprise, form a part of, and/or be associated with a digital asset insurance system, as described herein.

Digital asset protection can be digital asset insurance and/or digital asset warranties. Digital asset insurance may be insured key storage, which may entail secure storage of one or more keys, such as private keys, where the secure storage service may guarantee the return of the stored private key and will pay out some amount if the key cannot be returned. In embodiments, a digital asset warranty can be a warranty against key loss, which may be a warranty against key loss by a digital asset storage service.

A digital asset storage service and/or a digital asset protection system may be associated with and/or accessed through one or more digital wallets. In embodiments, digital asset protection and/or storage services may only be available when using a particular digital asset wallet and/or when employing particular storage mechanisms or procedures. In embodiments, a digital wallet may provide an option to request and/or accept protection and/or an option to request and/or accept storage of one or more keys associated with the wallet. In embodiments, a wallet may prompt and/or require a user to store the private key of the wallet, e.g., using the secure digital asset storage service.

Figure 10A:
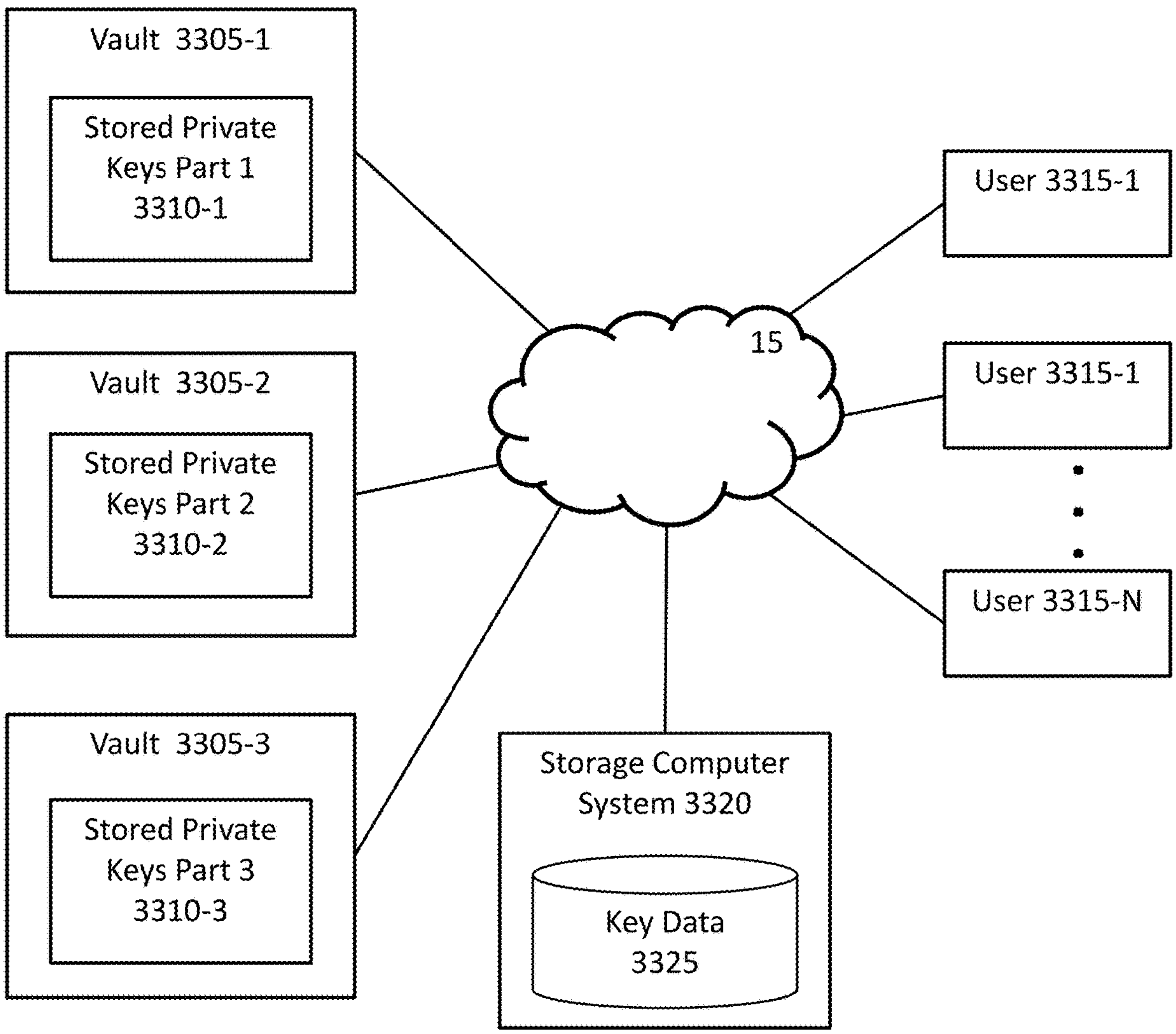
FIGS. 10A and 10B are schematic diagrams of vault arrangements for a digital asset network in accordance with exemplary embodiments of the present invention.

FIG. 10A illustrates an exemplary system for providing secure digital asset storage and/or protection. A storage computer system 3320 may store in computer-readable media or otherwise be connected to one or more databases containing data 3335 relating to one or more digital asset or key storage policies. In embodiments, data 3335 can also include information relating to a stored or insured digital wallet, such as public keys, public addresses, and/or key storage information, which may comprise identification codes or other indicators of where keys or key segments are stored. The storage computer system 3320 may store key data 3325 in internal or external computer-readable memory comprising one or more databases. Key data 3325 can include public key data, information identifying a key owner or wallet owner, information (e.g., an identifying code) identifying or correlating a wallet's keys or key segments, and/or information identifying location and/or retrieval information for stored keys or key segments, to name a few.

The exemplary system illustrated in FIG. 10A can include a plurality of secure storage locations, such as vaults 3305-1, 3305-2, and 3305-3. Private keys or key segments 3310-1, 3310-2, and 3310-3 may be stored in each vault in accordance with the secure storage systems and methods discussed herein, such as cold storage vaulting in different locations. Vaults may be connected to a network 15 at times and disconnected at other times. The network 15 may be any data network or a plurality of connected networks, internal, such as an intranet, or external, such as the Internet. A plurality of keys corresponding to a multi-key wallet may be stored in separate vaults. In embodiments, one or more keys may be divided into segments, which can be stored in separate vaults. Keys may be divided whether from single private key wallets or multi-key wallets.

One or more users 3315 may be, e.g., customers and/or claimants of a digital asset storage and/or protection system. Users 3315 may obtain key storage for one or more digital wallets containing digital assets in one or more denominations. Users 3315 may access or otherwise participate in a digital asset storage and/or protection system using one or more user device. In embodiments, the same digital wallet may be accessed from a plurality of user devices using the same key combinations (e.g., private and public keys).

Figure 10B:
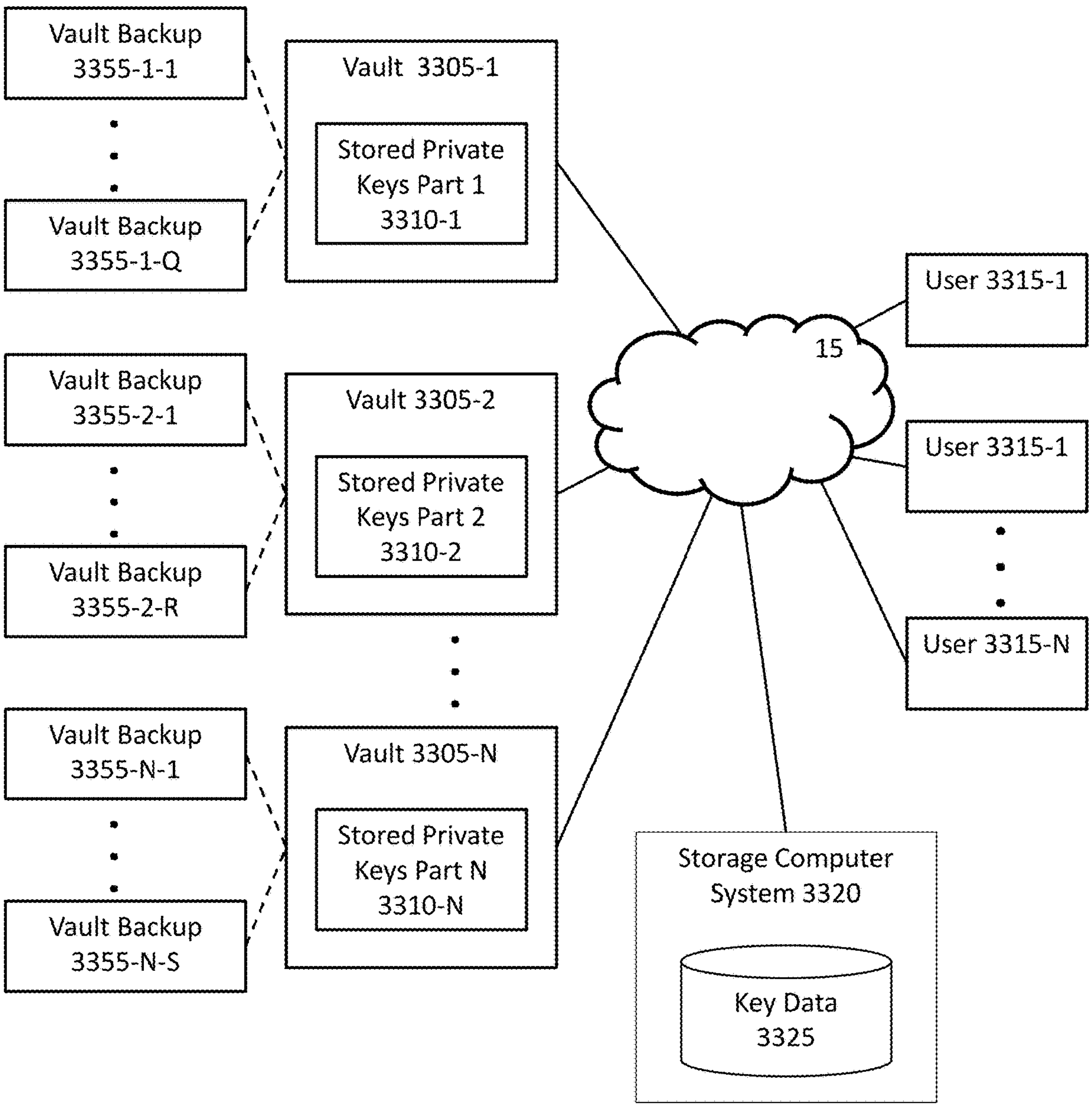

FIG. 10B shows another exemplary embodiment of a system for providing secure digital asset storage and/or protection. A plurality of vaults 3305-1 to 3305-N may be employed to store keys or key segments in segregated locations. In embodiments, vaults may be secure locations, such as safety deposit boxes, bank vaults, rooms with controlled access, to name a few. Vaults may be physical and/or electronic repositories for keys or key segments. In addition, each vault may have one or more backups 3355 (e.g., Q number of backups for vault 3305-1, R number of backups for vault 3305-2, and S number of backups for vault 3305-N). Vault backups may be other vaults or other secure storage facilities, units, or devices. Vault backups may utilize the same or different types of storage from each other and/or from the primary vault. For example, a primary vault may include printed paper copies of keys or key segments stored in a bank lockbox, while a backup may comprise an offline encrypted hard drive storing data corresponding to keys or key segments. Vault backups 3355 can be any of physical storage of printed or transcribed keys or key segments, remote cloud storage, hard drive, disk, CD, DVD, memory card, flash drive, tape drive, and/or tape library, to name a few.

Storage of Keys by a Digital Asset Storage Service

Figure 11A:
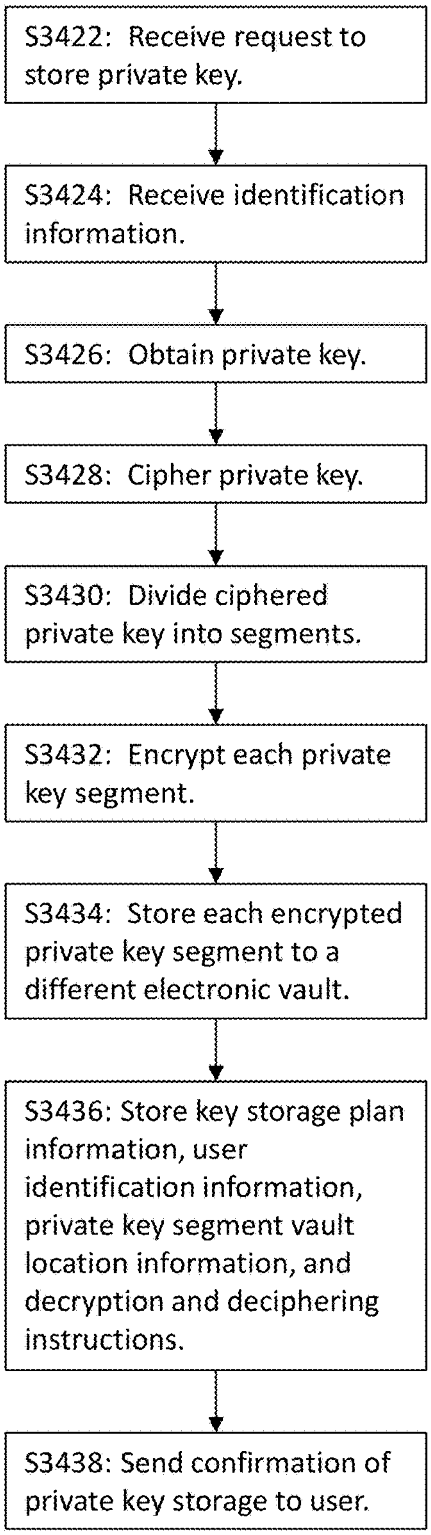
FIGS. 11A-11B are flow charts of processes for generating key storage and insurance in accordance with exemplary embodiments of the present invention.
Figure 11B:
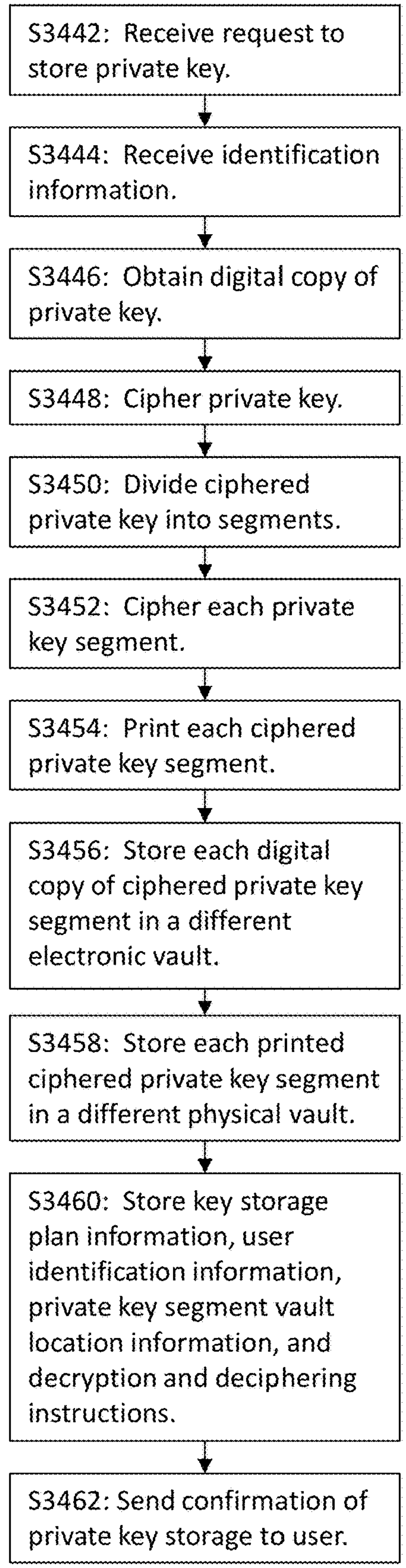

As discussed herein, a digital asset storage service may be provided to users of a digital asset network to provide secure storage of digital assets. In embodiments, the secure storage service may be used in conjunction with a digital asset protection plan, such as an insurance or warranty plan, although the storage service may also be used without insurance or warranties. FIGS. 11A-11B describe exemplary processes for storing private keys, which may be used solely as a key storage service or in conjunction with protection plans, such as insurance or warranty plans.

In embodiments, a user of a digital asset network may provide one or more keys or key segments to the key storage service for storage. Keys or key segments may be provided to the storage service via email or other electronic data transfer, any of which may be secure or otherwise encrypted. A user may use software to generate a wallet with one or more private keys and/or to divide the keys into segments. The software may include the ability to transmit, e.g., via a secure connection, the keys or key segments to the secure storage company. In embodiments, keys may be delivered to a key storage company in person, via mail, or via fax. Such keys may be stored in accordance with the secure and cold storage vault security mechanisms discussed herein, which may include dividing the keys into segments if not already divided.

Keys may also be generated at the secure storage company, e.g., at the secure storage site. Accordingly, a user may log into a website or otherwise connect to a portal for accessing wallet generation software. Such software may be running on one or more processors located at the secure storage company. The user may use the wallet generation software to create a wallet with one or more private keys. The user may also use such software to split one or more keys into key segments. Each key or key segment may then be printed, transcribed, or otherwise prepared for storage. In embodiments, the software may be programmed to transmit each key or key segment to a different printer, printing device, or electronic storage device, any of which may be located in different rooms, on different premises, in different geographies, and/or in separate vaults, to name a few. Thus, the key storage service may then store each key or key segment in separate locations, in accordance with the secure storage mechanisms discussed herein, such as the cold storage vault systems. Accordingly, the key storage company may never have access to an assembled key or to the required plurality of keys to a multi-key wallet.

Upon a user's request for retrieval of a stored key or keys, the secure key storage company may send to the user originals or copies, physically or electronically, of the keys or key segments. In embodiments, the key storage company may never reassemble keys or access a digital wallet itself. The secure key storage company may charge fees at setup and/or at retrieval, as well as recurring storage fees.

FIG. 11A describes an exemplary embodiment of a process for secure key storage and arranging for insurance or warranties against lost private keys, which process may be performed using a digital asset storage system, as discussed herein. The digital asset storage system may comprise and/or form a part of a digital asset protection system. FIG. 11A refers to the storage of private keys, but the process may apply to the storage of both private and public keys.

FIG. 11A is a flow chart of an exemplary process for securely storing private key information, which may be performed by a secure digital asset storage system. In a step S3422, a request to store a private key may be received at the secure digital asset storage system. In embodiments, such a request may comprise a request for insured private key storage. Such a request may originate from one or more other computers or electronic devices, such as a mobile phone, digital asset transaction kiosk, and/or personal computer, to name a few.

In a step S3424, a user may provide identification information, which may be received at the storage system Identification information may comprise any of a name, contact information (e.g., address, telephone number, e-mail address, to name a few), government ID information (e.g., an image of a driver's license, a driver's license ID number, a passport number, to name a few), biometric information (e.g., a voice sample, current photograph, eye scan, fingerprint, to name a few), username, password, and/or one or more security questions, to name a few. The identification information may be provided by and/or correspond to the requestor of private key storage and/or the private key owner. In embodiments, the digital asset insurance system may receive and/or store a user's identification information.

In a step S3426, the storage system may obtain a private key to be stored. The storage system may receive the key or fetch it, e.g., from a user electronic device, such as a mobile phone. In embodiments, the storage system may also obtain a public key to be stored.

In a step S3428, the storage system may cipher the private key, as described herein. In embodiments, the private key may not be ciphered before dividing it into segments. In other embodiments, the private key may be encrypted.

In a step S3430, the digital asset storage system may divide the ciphered private key into any number of segments. In the case of a multi-key wallet, the keys may not be divided into segments. However, keys to a multi-key wallet may be encrypted and/or ciphered.

In a step S3432, the storage system may encrypt each private key segment. In embodiments, encryption and/or ciphering may occur only before or only after dividing a key into segments. In embodiments, the key segments may not be encrypted after the segments are created. The key segments may be ciphered or not processed further.

In a step S3434, the storage system may transfer each encrypted private key segment to a different electronic vault for storage. In embodiments, the vaults may not be electronic, and the key segments may be printed or otherwise transcribed on a physical substrate and stored in the vaults. Any number of vaults may be used (e.g., one vault for each key segment, multiple vaults for redundant copies of each key segment, one or more vaults with two or more key segments stored together, to name a few). A code, such as a bar code or QR code, may be provided along with the key segments (e.g., printed with a physically transcribed copy of a key segment electronically saved with an electronic key segment, or appended to an electronic key segment, to name a few). The code may identify the key segments (e.g., which key segments are part of the same key) and/or the order of the key segments.

In a step S3436, the storage system may store, in one or more databases, key storage plan information (e.g., a subscription for key storage costing $1.99/month), user identification information, private key segment vault location information, and decryption and deciphering instructions. The databases may be computer-readable databases or physical (e.g., paper) databases that may be scanned and then read by one or more computers. In embodiments, the stored information may be sent to a user and/or an storage system administrative coordinator, which may be a computer that can handle retrieval of stored keys.

In a step S3438, the digital asset storage system may send confirmation of private key storage (e.g., over a data transfer network) to the user (e.g., requestor of private key storage or other person associated with the received identification information) and/or a third party. Confirmation of storage may be recorded by the storage system and/or another entity associated with the storage system.

FIG. 11B illustrates that physical back-ups of the secured private key may be employed by a secure digital asset storage system. In a step S3442, a request to store a private key may be received at the storage system.

In a step S3444, the storage system may receive user or digital wallet owner account identification information.

In a step S3446, the storage system may obtain (e.g., receive or fetch) a private key.

In a step S3448, the storage system may cipher the private key. In embodiments, no ciphering may occur before dividing the key into segments.

In a step S3450, the storage system may divide the private key (or ciphered private key) into segments.

In a step S3452, the storage system may cipher each private key segment.

In a step S3454, the storage system may print each ciphered private key segment. One or more copies of the key segments may be printed and/or otherwise transcribed onto any substrate and/or multiple substrates (e.g., paper, plastic, metal, to name a few). A code, such as a QR code or bar code, may be used to identify corresponding key segments and/or the order of the key segments. Such a code may be printed or otherwise provided with the key segments.

In a step S3456, the digital asset storage system may store each ciphered private key segment, as discussed herein. The key segments may be stored in electronic vaults (e.g., hard drives, tape drives, solid state memory, to name a few). Separate vaults may be used for each key segment, although multiple key segments corresponding to multiple different private keys may be stored in the same vault.

In a step S3458, the storage system may store each printed key segment in a physical vault, which may be separate vaults for each key segment.

In a step S3460, the storage system may store, in one or more databases, key storage plan information, user identification information, private key segment vault location information, deciphering instructions, and decryption instructions, where applicable.

In a step S3462, the storage system may send confirmation of private key storage to the user.

Recovering Stored Keys from a Digital Asset Key Storage Service

A user of a secure storage service or system may request access to a stored key, which may be a means of recovering a lost key.

Figure 12A:
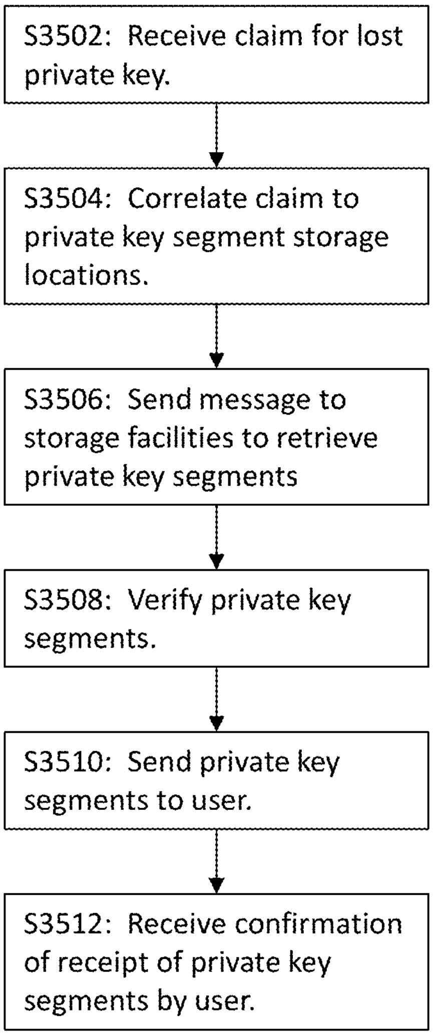
FIGS. 12A-12C are flow charts of processes for recovering key segments in accordance with exemplary embodiments of the present invention.

FIG. 12A is a flow chart describing an exemplary process for recovering a key, which may be performed by one or more computers. In embodiments, the process may entail recovering (e.g., retrieving from storage) a plurality of keys or key segments.

In a step S3502, a user may submit a claim for a lost private key, which may be received by a computer system of a secure storage service storing a copy of the user's private key. A claim may be a request for retrieval of one or more stored keys.

In a step S3504, the storage system, using the computer system, may correlate the received claim to one or more locations where private key segments are stored. For example, the computer system may access a database of policy information to determine where (e.g., in which vaults) a claimants keys or key segments are stored.

In a step S3506, a message, which may constitute instructions, may be transmitted to one or more storage facilities to retrieve the private key segments. A computer system may automatically generate such a message based upon the information pertaining to stored keys or key segments. Such a key retrieval message can include a security code or other authorization to access a secure storage location. In embodiments, the computer system may employ security measures, such as a secure code or digital signature, to provide verification and/or authentication of a retrieval message.

In a step S3508, the private key segments may be verified. Keys or key segments may be retrieved from their respective storage locations. Quality control measures may verify that the correct key segments were retrieved and/or that the keys or key segments are readable, e.g., by a specially programmed scanning device, such as a QR scanner.

In a step S3510, the private key segments may be transmitted to a device and/or account corresponding to the user. One or more secure transmissions may be used. Two-factor authentication may be required of the recipient before a transmission is sent and/or opened by the recipient. In embodiments, the system may decrypt, reassemble, and/or decipher private keys and/or key segments before returning the keys and/or key segments to a user. In embodiments, a user may be provided with the option of having the system perform the decrypting, reassembling, and/or deciphering steps. In embodiments, software may be provided to a user to enable such steps to be performed by a user or under a user's control. In embodiments, the computer system may never decrypt keys or key segments that were encrypted by a user. Accordingly, in step S3510, the user may be provided with key segments and/or reassembled keys, which may be in various states of security (e.g., ciphered, segmented, and/or encrypted).

In a step S3512, the system may receive confirmation that the user received the private keys or key segments. A user device may automatically generate and/or transmit a confirmation upon receipt of the keys or key segments, upon reassembling thereof, upon opening a corresponding digital asset wallet, or upon instruction for a user, to name a few. Such confirmation may provide an indication that the secure storage service and/or protection service met its obligation, e.g., to the customer.

Figure 12B:
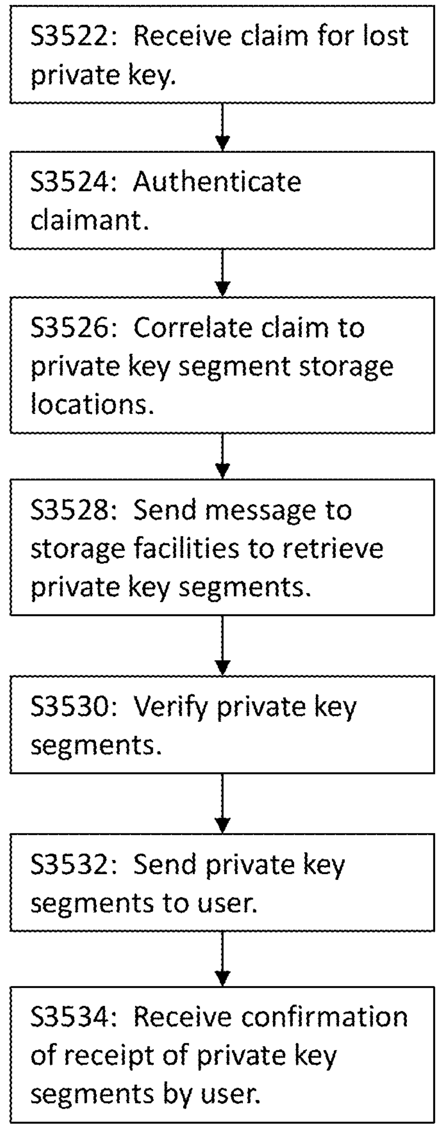

FIG. 12B illustrates another exemplary process for recovering a key. Such process may be performed by one or more computers. The process may be considered the same as the process of FIG. 12A, except with the addition of a user authentication step S3524.

Thus, in a step S3522, a user may submit a claim for a lost private key, which may be received by a secure storage service storing a copy of the user's private key.

In a step S3524, the secure storage system may authenticate the identity of the claimant. Authentication may involve any of receipt of any of a user's identification information, such as name, username, password, biometric information, or the like. In embodiments, three forms of identification information may be required. In embodiments, a claimant may receive a phone call, which may be auto-generated and auto-executed by the system, which may provide the claimant with a code to input at a user device. In embodiments, the user may be required to repeat a phrase, which may be a unique phrase. Voice analysis and/or recognition techniques may be employed. The user may be required to submit a current picture or video. The system may compare the received identification information to a database of authorized user identification information in order to authenticate the identity of the claimant.

In a step S3526, the system may correlate the received claim to one or more locations where private key segments may be stored.

In a step S3528, a message, which may constitute instructions, may be transmitted to one or more storage facilities to retrieve the private key segments.

In a step S3530, the private key segments may be verified.

In a step S3532, the private key segments may be transmitted to a device and/or account corresponding to the user. In embodiments, decryption, reassembly, and or deciphering of private keys and/or key segments may occur before or after returning the keys and/or key segments to a user and may be performed by the system or by a user, who may use software provided by the system.

In a step S3534, the system may receive confirmation that the user received the private key segments.

Figure 12C:
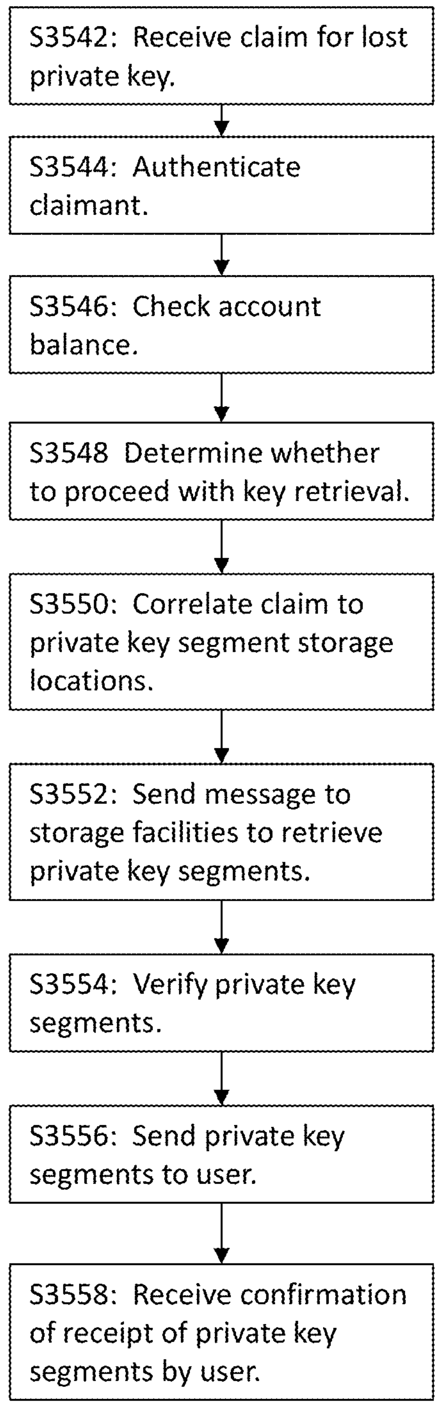

Another exemplary process for recovering a key is provided in FIG. 12C. Such process may be performed by one or more computers. The process may be considered the same as the process of FIG. 12B, except with the addition of steps to check the account balance of the account and a determination step of whether to proceed with the key retrieval.

Thus, in a step S3542, a user may submit a claim for a lost private key, which may be received by a secure storage service storing a copy of the user's private key.

In a step S3544, the secure storage system may authenticate the identity of the claimant, in manners described for step S3524 of FIG. 12B.

In a step S3546, the system may check the account balance of the account.

In a step S3548, the system may determine whether to proceed with the requested key retrieval. In embodiments, retrieval may be halted if an account balance is above a threshold or below a threshold.

In a step S3550, the system may correlate the received claim to one or more locations where private key segments may be stored.

In a step S3552, a message, which may constitute instructions, may be transmitted to one or more storage facilities to retrieve the private key segments.

In a step S3554, the private key segments may be verified.

In a step S3556, the private key segments may be transmitted to a device and/or account corresponding to the user of the account. In embodiments, decryption, reassembly, and or deciphering of private keys and/or key segments may occur before or after returning the keys and/or key segments to a user and may be performed by the system or by a user, who may use software provided by the system.

In a step S3558, the system may receive confirmation that the user received the private key segments.

In exemplary embodiments, a user of a secure storage service or system may be required to provide proof of control of an account before a lost key for that account may be recovered and provided to the user. Exemplary systems and methods for implementing such proof of control are described in further detail below.

ETP

In embodiments, an ETP can be provided using a digital math-based asset, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. An ETP may be a special purpose entity, statutory trust, business trust, or other corporate form established under the laws (e.g., of a state of the United States) that continuously issues and/or redeems its shares in exchange for a portfolio of specified assets, such as digital assets, currencies, physical commodities, securities and/or other assets. The ETP may issue equity securities which it may register with the US Securities and Exchange Commission. The ETP may list the equity securities for trading in the secondary market at intraday prices on a stock exchange. Each issued share of an ETP may represent a ratable undivided interest in its underlying portfolio of assets. In embodiments, shares of an ETP may be created only in large blocks or lot sizes, such as creation units. In embodiments, only large market participants may be authorized participants ("APs") who may obtain creation units in exchange for a deposit of a specified amount of assets into the ETP's portfolio. APs may hold or sell into the secondary market the individual shares comprising the creation units issued.

In embodiments, an AP can be a person or entity who is a registered broker-dealer or other securities market participant such as a bank or other financial institution which is not required to register as a broker-dealer to engage in securities transactions, is a participant in a third-party clearing agency, such as the DTC, has entered into an Authorized Participant Agreement with the trustee and the sponsor, and/or has established an AP custody account. In embodiments, only APs may place orders to create or redeem one or more baskets of trust shares. For example, a basket of shares can be a block of 10,000 shares, 20,000 shares, 30,000 shares, 40,000 shares, 50,000 shares, 75,000 shares, 100,000 shares, and/or some other denomination of shares.

In embodiments, an Authorized Participant Agreement can be an agreement entered into by an AP, the sponsor and/or the trustee which provides the procedures for the creation and redemption of baskets of trust shares and for the delivery of the digital math-based assets, e.g., Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, required for such creations and redemptions.

In embodiments, an AP custody account can be a segregated account for digital math-based assets, e.g., a segregated bitcoin account, owned by an AP and established with the trustee and/or custodian by an Authorized Participant Custody Account Agreement. An AP custody account can be used to facilitate the deposit and withdrawal of digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few, by an AP in creation and redemption processes, as discussed herein by way of example with respect to FIGS. 17A-B and 19A-C.

In embodiments, an Authorized Participant Custody Account Agreement can be the agreement between an AP and the trustee which can establish an AP custody account.

In embodiments, in order to initiate the issuance of shares, an AP may place a creation order with the trustee and/or administrator of the ETP. Upon the trustee's acceptance of the order, the trustee and/or administrator, using the trust computer system, may notify the AP of the exact amount or quantity of portfolio assets that is required to be deposited into the ETP's account in exchange for one or more creation baskets, which are valued at their current net asset value. In embodiments, the trustee and/or administrator may hold the ETP's portfolio assets on behalf of all shareholders. In embodiments, the trustee and/or administrator may be authorized to make transfers from the trust account to third parties only under certain specific circumstances, such as to pay for the ETP's permitted operational expenses or to redeem creation units tendered for redemption by an AP. A redemption of creation units may be the reverse of a creation; the AP may place a redemption order with the trustee. Upon the trustee's and/or administrator's acceptance of the order, the AP may tender to the trustee the stated number of creation units for redemption and in exchange may receive the pro rata amount or quantity of portfolio assets represented by such shares. The trustee and/or administrator may then cancel and/or instruct a third party clearing agency (e.g., DTC) to cancel all shares comprising the creation units so delivered. This continuous issuance and redemption feature of an ETP provides an arbitrage mechanism for APs, who may either create or redeem creation units when the current trading price of the individual shares on the secondary market deviates from the underlying net asset value of such creation units, thereby reducing such deviation between the trading price and the underlying net asset value.

In embodiments, the trust may have an investment objective for shares to reflect the performance of a blended price of digital math-based assets, e.g., a blended bitcoin price of bitcoin, less expenses of the trust's operations. The shares can be designed for investors who want a cost-effective and convenient way to invest in digital math-based assets with minimal credit risk.

In embodiments, the trust can directly hold digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, using the trust's hardware and/or software security system, which in embodiments may include storage of the trust's digital assets and/or the private keys relating to the digital wallets holding the trust's digital assets in one or more locations in, for example, high security vaults.

In embodiments, the trust may hold any combination assets, including digital math-based assets, physical commodities, securities and/or other assets. A trust agreement may specify and/or limit which assets a particular trust may hold.

ETP Participants

Figure 13:
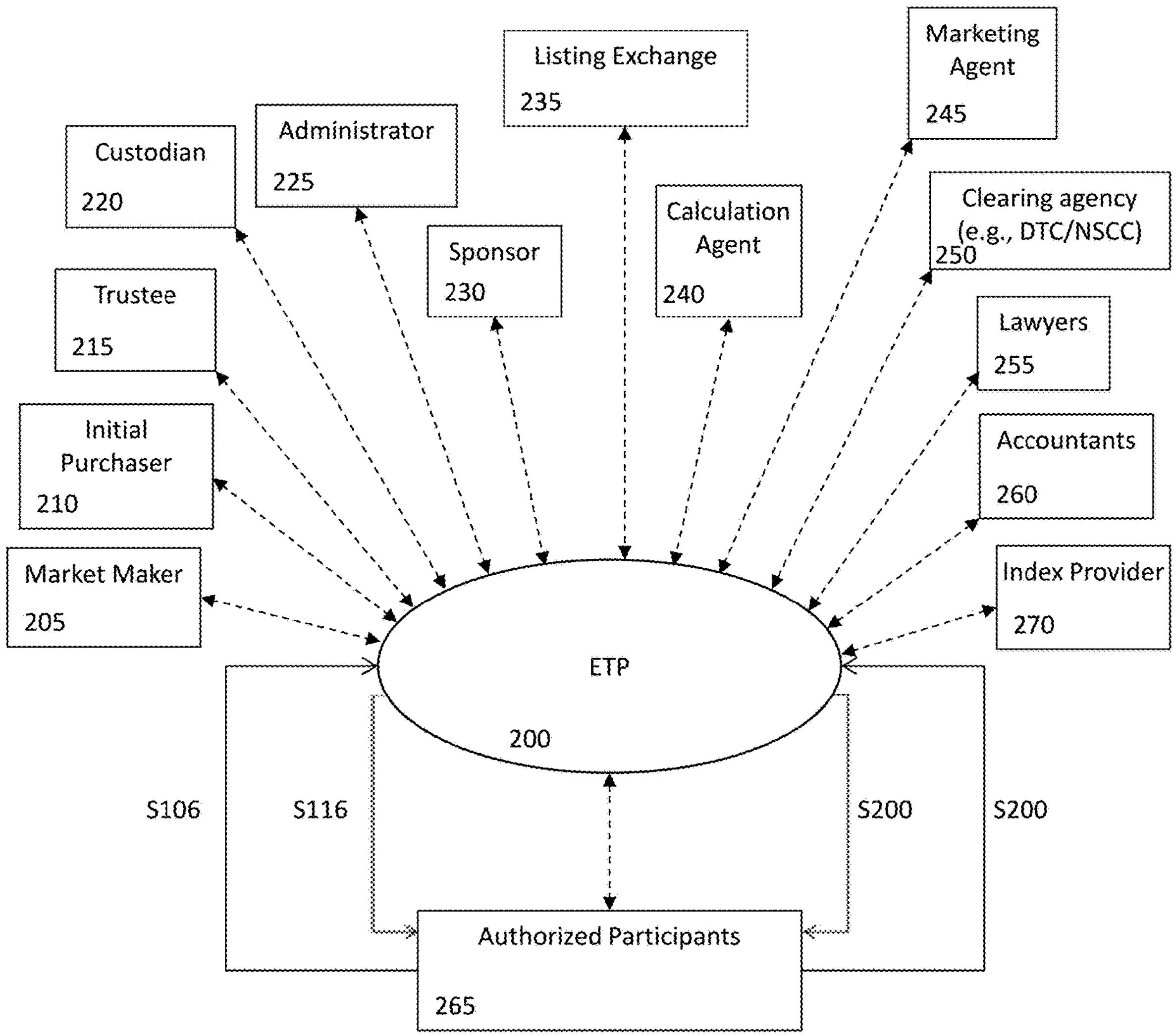
FIG. 13 is a schematic diagram of the participants in an ETP holding digital math-based assets in accordance with exemplary embodiments of the present invention.

As illustrated in FIG. 13, in exemplary embodiments, an ETP may include one or more participants, such as one or more market makers 205, purchasers 210, trustees 215, custodian 220, administrator 225, sponsor 230, listing exchange 235, calculation agent 240, marketing agent 245, third-party clearing agency 250 (e.g., the DTC or NSCC), attorneys 255, accountants 260, and/or authorized participants 265, to name a few. In embodiments, one or more of these roles may be performed by the same entity (e.g., the same entity may be the custodian and the administrator). In embodiments, more than one entity may perform the same role or part of a role, such as more than one market maker may be used for the same ETP. Various combinations of entities can be used consistent with exemplary embodiments of the present invention.

In embodiments, an ETP may involve an underlying trust and one or more of the entities discussed herein. FIG. 13 provides an overview of at least some of the possible participants in an ETP. A sponsor 230 may establish the ETP, which generally may be established as a common law or statutory trust under state law. One trust may be created or multiple trusts for different ETPs may be established at one time. A single trust established as a series trust may also create multiple series for different ETPs. The sponsor 230 may have contractual rights involving the trust. The sponsor 230 may pay SEC registration fees and may provide seed capital for the trust, to name a few. Additionally, the sponsor 230 may prepare, sign, and/or file trust registration statements and/or other formation documents, periodic SEC reports, and/or registration statement updates. The sponsor 230 may create free-writing prospectuses and other promotional materials about the trust and may file such materials with the SEC, as required by government regulation. The sponsor 230 may participate in marketing activities for the trust, such as road shows. The sponsor 230 may maintain the trust's public website for viewing by the holders of the trust's securities, prospective purchasers of its shares, and/or any entity desirous of viewing the trust's public website.

An initial purchaser 210 may provide seed capital to the trust in exchange for a set number of creation units of the same value. A market maker 205 may undertake to buy or sell creation units in the trust at specified prices at all times.

A custodian 220 can safe keep the trust's assets and can engage one or more sub-custodians to do so in different locations. In embodiments, the one or more sub-custodians may comprise different entities. In embodiments, the one or more sub-custodians may comprise different aspects of the same entity or may be affiliated entities. A custodian 220 may hold copies of segmented private keys in one or more vaults.

An administrator 225 can keep books and records for the trust, conduct other ministerial duties and/or may calculate the trust's daily net asset value, daily share price, and/or other pertinent information about the trust, the trust's assets, and/or the trust shares.

The trustee 215, the custodian 220 and/or the administrator 225 may be the same person or entity, may be different operations of the same person or entity, may be different persons or entities, or may be multiple persons or entities performing the same and/or overlapping functions.

A listing exchange 235 is a venue where shares registered with the SEC may be listed and traded during business days. The listing exchange 225 can track using one or more computers and publish electronically using one or more computers an estimated intraday indicative value ("IIV") of a trust regularly, e.g., every 15 seconds. A calculation agent 240 using one or more computers may also perform daily calculations of trust assets using methods known in the art and may provide the IIV. The trustee 215 and/or the administrator 225 may also serve as the calculation agent 240 and may be the same person and/or entity, different operations of the same person and/or entity, and/or may be different persons.

A marketing agent 245 may also be engaged to provide services to the trust relating to the public marketing of its shares for sale. The marketing agent 245 may review marketing documents for regulatory compliance, e.g., rules of the Financial Industry Regulatory Authority ("FINRA")

and/or relevant regulatory authority. The marketing agent may file the trust's marketing materials with FINRA and/or relevant regulatory authority.

The processes of clearance and settlement of trust shares may be performed by a clearing agency or a registered third-party entity 250, such as the Depository Trust Company ("DTC") and/or the National Securities Clearing Corporation ("NSCC"). Shares may be available only in book-entry form, meaning that individual certificates may not be issued for the trust's shares. Instead, shares may be evidenced by one or more global certificates that the trustee may issue to a clearing agency or a registered third-party entity 250, e.g., DTC. The global certificates may evidence all of the trust's shares outstanding at any time. As a result, in embodiments, shares may be only transferable through the book-entry system the third-party clearing agency 250. Shareholders may hold and/or transfer their shares directly through the third-party clearing agency 250, if they are participants in the clearing agency 250, or indirectly through entities that are participants in the clearing agency 250 (e.g., participants in DTC). Transfers may be made in accordance with standard securities industry practice.

An index provider 270 may license its intellectual property to the trust for pricing, portfolio selection, and/or other services, and may, using one or more computers, calculate and/or upkeep the index during the term of the license. In embodiments, for example, an index of digital asset values (such as bitcoin values) or blended digital asset prices (such as blended bitcoin prices) may be used to price the digital assets transferred to and/or from the trust and/or held by the trust. Other forms of valuation of the digital assets (such as bitcoin) can also be used as discussed herein.

Lawyers 255 and accountants 260 may provide services to the sponsor 230 and/or the trust and/or other participants in the trust.

In embodiments, transactions with the trust may be restricted to one or more APs 265. The trust may establish requirements for becoming an AP, e.g., must be an entity of a certain size, financially or otherwise, must be a large market investor, like a broker-dealer and/or a bank, must seek and obtain formal approval from the trustee, must enter into an agreement with the trustee and/or other such requirements known in the art, to name a few. In embodiments, APs may be broker-dealers and/or banks. APs may enter into an AP agreement with the trust and/or the sponsor 230, which may include rules for the issuance and/or redemption of creation units. Depending on the nature of the trust's intended assets, an AP may be required to hold and deliver specific commodities, e.g., a digital math-based asset, directly to the trust.

In embodiments, a trustee 215 may be generally responsible for the day-to-day administration of the trust. A trustee 215 (or its designee, such as the custodian 220 and/or administrator 225) may perform one or more of the following tasks associated with the trust:

establishing and/or having established, using one or more computers, wallets for digital math-based assets (e.g., Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few) to be used by the trust associated with an ETP holding such digital math-based assets (e.g., Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few);

establishing and/or having established, using one or more computers, digital wallets for custody and other accounts to be used on behalf of participants in the trust, e.g., AP custody accounts 315, sponsor custody accounts 310, trust custody accounts 300, trust expense account 305, and/or vault accounts 320, to name a few;

transferring and/or having transferred, using one or more computers, digital math-based assets from and/or to one or more digital wallets associated with one or more digital wallets associated with one or more accounts, including AP custody accounts 315, trust custody accounts 300, trust expense accounts 305, sponsor custody account 310, and/or vault accounts 320, to name a few;

determining and/or having determined, using one or more computers, expenses and fees to be paid by the trust, including, e.g., sponsor fees, legal fees, accounting fees, extraordinary expenses fees, and/or transaction fees, to name a few;

paying and/or having paid, using one or more computers, expenses and fees to be paid by the trust, including, e.g., sponsor fees, legal fees, accounting fees, extraordinary expenses, and/or transaction fees, to name a few;

calculating or having calculated, using one or more computers, an ANAV, an ANAV per share, a NAV, and/or a NAV per share;

receiving and/or processing, using one or more computers, orders from APs to create and/or redeem creation units and/or baskets and/or coordinating the processing of such orders with a clearing agency or a registered third-party entity 250;

transferring and/or having transferred and/or facilitating transfers, using one or more computers, of digital math-based assets of the trust as needed into and/or out of custody accounts and/or vault accounts to cover redemptions and/or to pay expenses and fees to be paid by the trust, including, e.g., sponsor fees, legal fees, accounting fees, extraordinary expenses fees, and/or transaction fees, to name a few;

selling and/or arranging for sale remaining digital math-based assets of the trust at termination of the trust and/or distributing the cash proceeds to the shareholders of record;

supervising and/or arranging for the supervision of the safekeeping of the digital math-based assets deposited with the trust by APs in connection with the creation of creation units and/or baskets;

administering and/or having administered and/or maintaining and/or having maintained custody accounts on behalf of the trust, APs, the sponsor and/or others;

administering and/or having administered and/or maintaining and or having maintained and/or supervising the maintenance, upkeep and/or transfer of private key information to and/or from vaults; and/or generating and/or having generated, using one or more computers, encryption, splitting, QR coding (or other bar coding) and printing the paper tokens, to name a few.

As described in greater detail herein with respect to FIGS. 5 and 17, an AP may provide assets to the trust in exchange for shares in the trust, and an AP may redeem shares in the trust for assets.

Secondary Market Activities

Figure 14:
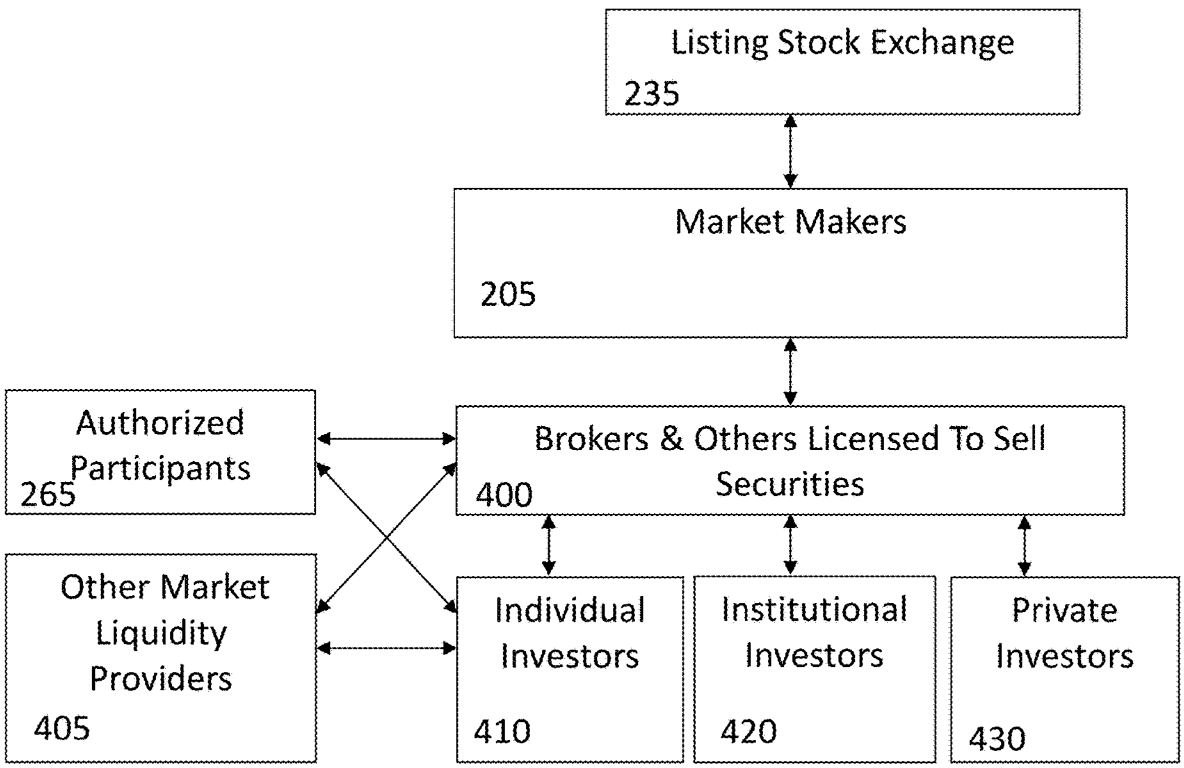
FIG. 14 is a schematic diagram of an exemplary secondary market for shares in the trust in accordance with exemplary embodiments of the present invention.

FIG. 14 is a schematic diagram of an exemplary secondary market for shares in the trust in accordance with exemplary embodiments of the present invention. In embodiments, the secondary market can include one or more listing stock exchanges 235 (e.g., NYSE, NASDAQ, AMEX, LSE, to name a few), one or more market makers 205, one or more brokers and/or other licensed to sell securities 400, authorized participants 265, other market liquidity providers 405, individual investors 410, institutional investors 420 and private investors 430, to name a few.

As described earlier, in the primary market APs 265 may obtain and/or redeem shares in the trust through the creation and redemption redeem processes. APs 265 may then sell shares in a secondary market. APs 265 may also buy shares in the secondary market. In an exemplary secondary market for shares in the trust for a digital math-based asset ETP, e.g., a Bitcoin ETP, a listing stock exchange 235 may be the primary listing venue for individual ETP shares. In embodiments, the listing stock exchange 235 may be required to file listing rules with the SEC if no applicable listing rules already exist. The listing exchange 235 may enter into a listing agreement with the sponsor 230. In embodiments, the listing exchange 235 may appoint the lead market maker and/or other market makers 205. The market makers 205 may facilitate the secondary market trading of shares in the trust underlying the ETP. Market makers 205 may facilitate creations and/or redemptions of creation units through one or more APs. In embodiments, such creations and/or redemptions may be related to market demand, e.g., to satisfy market demand.

Still referring to FIG. 14, individual investors 410, institutional investors 420, and/or private investors 430 may buy and/or sell one or more shares in the trust. In embodiments, these investors may buy and/or sell shares through brokers 400 or others licensed to sell securities. Brokers 400 and/or others licensed to sell securities may receive cash and/or other assets from investors in order to buy one or more shares in the trust. Brokers 400 and/or others licensed to sell securities may receive one or more shares from investors to sell for cash and/or other assets.

Other market liquidity providers 405 may also participate in the secondary market. In embodiments, other market liquidity providers 405 may buy and/or sell one or more shares on a list stock exchange 235. In embodiments, other market liquidity providers 405 may buy and/or sell one or more creation units through one or more APs 265. Other market liquidity providers 405 may include, by way of example, arbitragers, prop traders, "upstairs", private investors, dark pools, to name a few.

ETP Setup

In an exemplary embodiment, the ETP may be based on an ownership stake in a digital asset investors trust, such as a Bitcoin investors trust. A trust may be created as a common law trust or a statutory trust that may elect, grantor trust status. It will be appreciated by those in the art that other forms of trust are possible, including but not limited to master trusts, owner trusts, and revolving asset trusts. Such a trust may register its shares with the SEC under the Securities Act of 1933, as amended, to sell shares to the public. A trust may hold portfolio assets that may require the sponsor or administrator of the trust to register as a commodity pool operator under the Commodity Exchange Act with the U.S. Commodity Futures Trading Commission ("CFTC").

In embodiments, the trust's assets may be digital math-based assets, such as bitcoin, held in one or more digital wallets maintained by and/or for the trustee 215. Other forms of asset storage and security are discussed herein. In embodiments, the trust assets can include other forms of digital math-based assets, such as other forms of digital assets, digital math-based assets, peer-to-peer electronic cash system, digital currency, synthetic currency, or digital crypto-currency. Exemplary digital assets can include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. In embodiments, the trust's assets can include additional assets besides digital math-based assets, such as, other commodities, currencies, futures, derivatives, and/or securities, to name a few.

The trust's assets may be held in various forms of storage using any of the security systems and methods described herein. In embodiments, the trust may employ a hardware and/or software security system to protect the digital math-based assets, such as bitcoin assets. In embodiments, the trustee 215, the administrator 225, the custodian 220, and/or some other entity may perform operations related to creations and redemptions from a secure administrative portal. In embodiments, digital asset accounts and/or digital wallets may be created after a request for a deposit is made, at the time the trust's security measures are set up (e.g., 10,000 wallets created at the outset), at some intermediate point during the life of the trust, or at any other time where digital wallets are deemed necessary or desirous, e.g., to ensure that the amount of assets in any given wallet remains below some threshold.

At set up of a trust, seed baskets and/or initial baskets may be issued to one or more initial purchasers 210 in connection with the formation of the trust.

In embodiments, creations may involve the transfer of assets to the trust, and redemptions may involve the withdrawal of assets from the trust, as discussed herein. In embodiments, the trust may be passive, such as not actively managed, in which case it may be subject to the additions or reductions in the asset inventory caused by creations and/or redemptions. In embodiments, the trust may restrict issuance and/or redemption of shares to creation units. In embodiments, creation units may describe the specific number of shares that may be exchanged for digital assets of the same value. Creation units may be lot sizes of a pre-defined number of shares. In embodiments, creation units may be large lot sizes of shares. For example, in embodiments, a creation unit may be 10,000 shares, 20,000 shares, 30,000 shares, 40,000 shares, 50,000 shares, 75,000 shares, 100,000 shares, and/or some other denomination of shares. In embodiments, the creation unit may be based on some fractional amount of shares. In embodiments, a creation unit may correlate to a creation deposit (for creations) or withdrawal proceeds (for redemptions) that comprise a lot size of assets, securities, to name a few. For example, in embodiments a creation of 50,000 shares may correlate to a creation deposit of 10,000 digital assets (e.g., bitcoin). In embodiments, a creation unit may correlate to a creation deposit or withdrawal proceeds that comprise a lot size of fractional denominations of assets, e.g., 100 Satoshis, 200 Satoshis, 10,000 Satoshis, or some other denomination of Satoshi.

In embodiments, one or more creation units may be created in a process in which one or more creation deposits is transferred to the trust in exchange for issuance a specified set number of shares in the fund, e.g., 50,000 shares. For a redemption, as described herein, an AP may redeem one or more creation units in exchange for the related withdrawal proceeds and resulting in the cancellation of a corresponding set number of shares. In embodiments, an AP may only transact in whole creation units. Thus, the AP may only deposit assets equal to one or more whole creation units. Similarly, the AP may relinquish shares amounting to one or more whole creation units in order to redeem those creation units. In embodiments, transactions involving fractional amounts of a creation unit may be allowed.

Transactions may occur on a daily basis. In embodiments, transactions may occur multiple times each day. In embodiments, the frequency of transactions may be limited by rule so as to limit the number of transactions, e.g., one transaction per week, three transactions in a given month, to name a few. In embodiments, transactions may be limited by rule to occurring during certain time periods, such as only on a given day of the week (e.g., Mondays) or only on a given day of the month (e.g., the first day of the month), after 3 P.M., to name a few. In embodiments, transactions may be limited to occurring on business days.

The trust may accept only a single commodity, currency or other asset. In embodiments, multiple types of commodities, currencies or assets may be accepted, for example, like a basket currency model. Those in the art will appreciate that the asset may be a commodity, currency and/or other asset which may be physical, digital, or otherwise existing.

In embodiments, only an AP may obtain shares in the trust. Thus, in the primary market for shares only APs can participate. However, in a secondary market, APs may sell or otherwise transfer shares in whatever manner and for whatever consideration they choose. In embodiments, APs may sell shares for cash and/or other remuneration. A shareholder can own beneficial interest in shares in the trust. In embodiments, an AP's ability to transfer shares may be limited by securities laws, FINRA, and/or corporate compliance procedures, to name a few. Shares in a trust may include units of fractional undivided beneficial interest in and ownership of a trust.

Administration of the trust may involve the use of one or more accounts, including one or more custody accounts. In embodiments, referring to FIG. 15A, such accounts may include AP custody accounts 315, trust custody accounts 300, vault accounts 320, sponsor custody accounts 310, and/or trust expense accounts 305, to name a few.

Figure 15B:
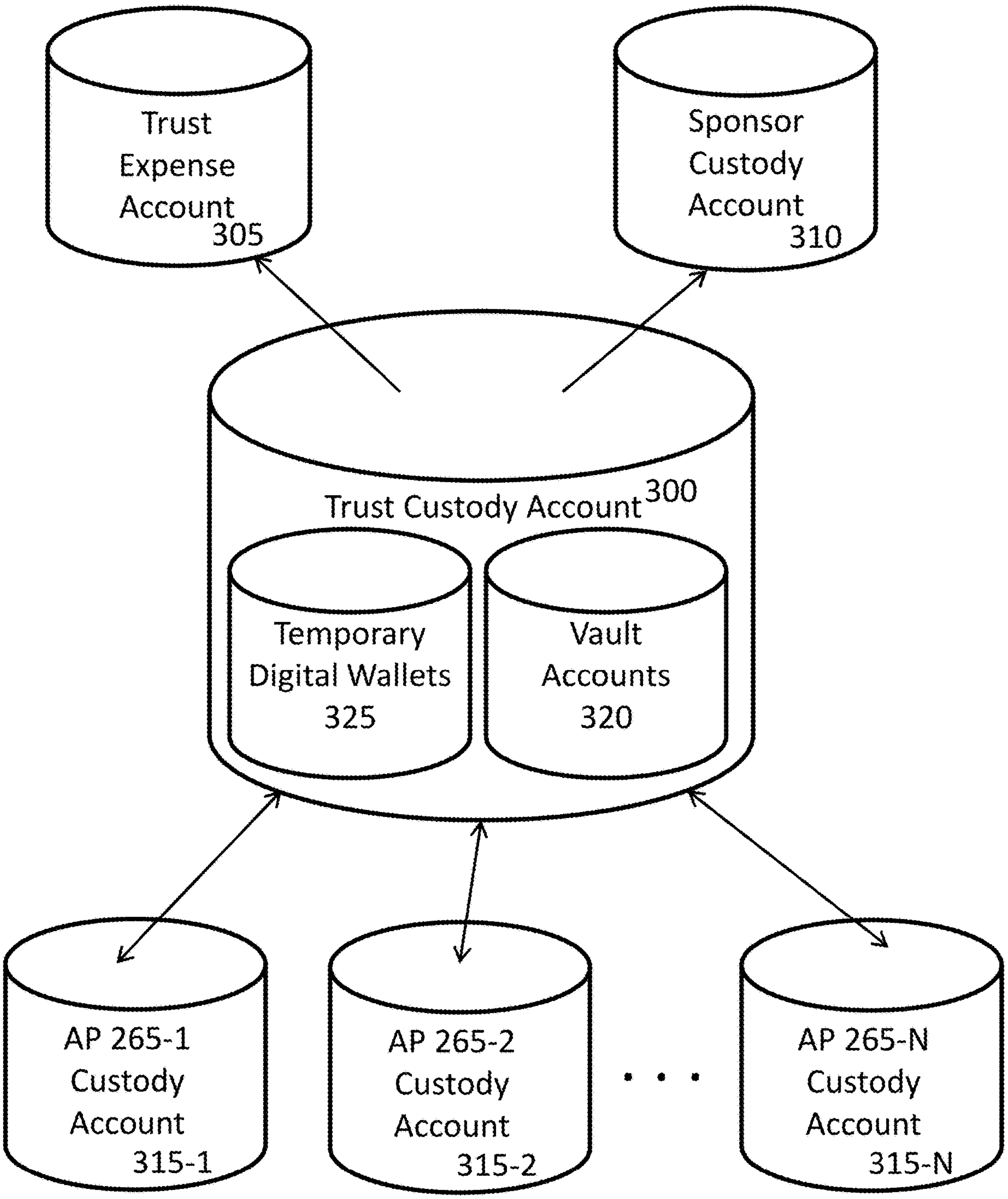

A custody account can be a segregated account operated by the trustee on behalf of another involved with the trust, e.g., sponsor or AP, to name a few. In embodiments, a custody account may be a digital wallet, a digital asset account, and/or a Bitcoin account. In embodiments, a custody account may be created, e.g., by the trustee, for each new transaction, e.g., creation, redemption, payment of sponsor's fee, to name a few. Referring to the exemplary embodiment illustrated in FIG. 15A, a trust custody account 300 may be owned by the trust. The trust custody account 300 may be the primary holder of the trust's assets, e.g., bitcoin. In an exemplary embodiment of the present invention, the trust custody account 300 may store public and private keys for one or more digital wallets holding the trust's digital assets, e.g., bitcoin. In embodiments, referring to FIG. 15B, the trust custody account 300 may comprise one or more temporary digital wallets 325 and/or one or more vault accounts 320. Vault accounts 320 may be digital wallets. Vault accounts 320 may be stored in a secure manner as discussed herein. Vault accounts 320 may be used for longer-term storage of digital assets. Temporary digital wallets 325 may be hot storage, which may be accounts and/or wallets that are accessed with greater frequency than vault accounts 320 in order to, for example, perform transactions. In embodiments, the trust custody account 300 may be a segregated account, segregating the assets it holds from all other assets held by the custodial operations of the trustee. The trust custody account 300 may facilitate the acceptance of creation deposits from an AP custody account 315, the distribution of assets, e.g., bitcoin, to an AP as part of a redemption, and/or the distribution of assets to a trust expense account 305 and/or a sponsor custody account 310. The trust expense account 305 may be owned by the trustee 215. In embodiments, a trust expense account 305 can be a segregated digital asset account, such as a segregated Bitcoin account, of the trustee 215 to which the trustee can transfer digital assets, e.g., bitcoin, from a trust custody account 300 in order to pay expenses of the trust not assumed by the sponsor 230. A trust expense account 305 can be established with the trustee 215 by a trust agreement.

In embodiments, trust expense account 305 may be used by the trustee 215 to pay extraordinary expenses that have not been assumed by the sponsor 230. Indirect payment of such expenses may occur when assets are distributed to the trustee's trust expense account 305. The trustee 215 may then sell or otherwise transfer assets from the trust expense account in order to satisfy expenses. A sponsor custody account 310 may be used to accept payments by the trust of a sponsor's fee. In embodiments, payments may be made in digital math-based assets, such as bitcoin. Payment of the sponsor's fee may be a periodic, e.g., monthly, event. One or more AP custody accounts 315-1 . . . 315-N may be owned by one or more APs, 265-1 . . . 265-N. AP custody account 315 may be used to receive deposits of assets from an AP for use in a creation, as detailed in FIGS. 17A and 17B and/or may be used to receive distributions of assets to an AP during a redemption, as detailed in FIG. 19A.

It should be appreciated by those of skill in the art that each of these accounts may be made up of one or more accounts, and/or one or more digital wallets.

Figure 16:
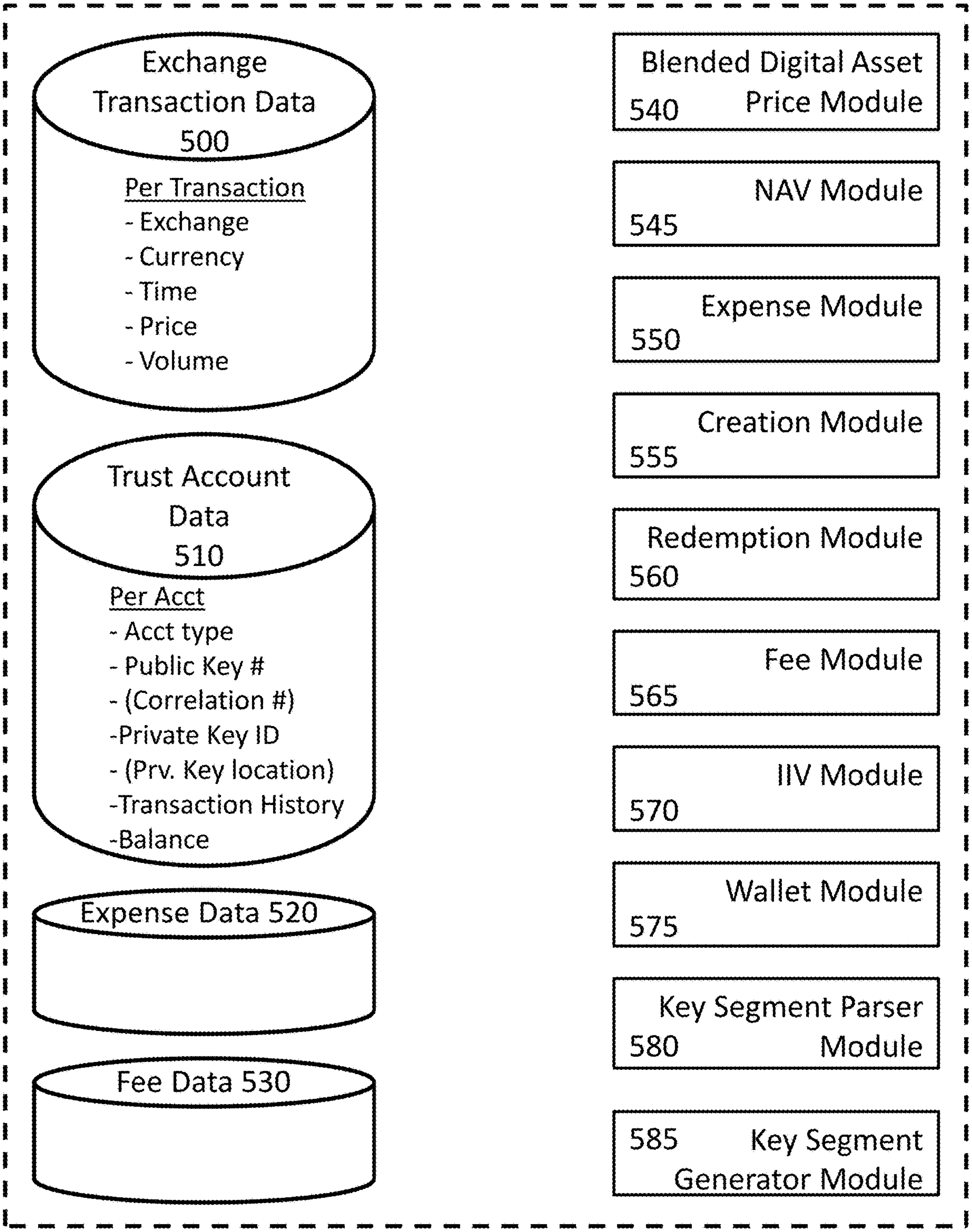
FIG. 16 is a block diagram of the data and modules in an exemplary embodiment of a trust computer system in accordance with the present invention.

The trustee and/or administrator and/or custodian may use one or more trust computers in performance of the processes and/or tasks described herein. A trust computer system may be located at an administrative portal. As illustrated in FIG. 16, a trust computer system may contain exchange transaction data 500, which may, for one or more transactions (e.g., each transaction), store exchange data, currency data, time data, price data, and/or volume data, to name a few. A trust computer system may contain trust account data 510, which may, for one or more accounts, store account types, public keys, correlation numbers, private keys and/or private key IDs (which may indicate the location of stored private keys and/or key segments), transaction history data, and/or account balance data, to name a few. A trust computer system may also contain expense data 520 and/or fee data 530.

Still referring to FIG. 16, a trust computer system may contain a blended digital asset price module 540, a NAV module 545, an expense module 550, a creation module 555, a redemption module 560, a fee module 565, an IIV module 570, a wallet module 575, a key parser module 580, and/or a key segment generator module 585, to name a few.

Investments into ETP

In embodiment, the trust for the ETP can create and/or redeem shares from time to time. In some embodiments, the creation and/or redemption must be in whole baskets, e.g., a block of a fixed number of shares, e.g., 50,000 shares. The creation and/or redemption of baskets can require, respectively, the delivery to the Trust or the distribution from the Trust of the number of bitcoin represented by the baskets being created and/or redeemed, the amount of which can be based on the combined NAV of the underlying assets relating to the number of shares included in the baskets being created and/or redeemed. In embodiments, an initial number of bitcoin required for deposit with the Trust to create Shares can be a fixed amount per basket. In embodiments, the number of bitcoin required to create a basket or to be delivered upon the redemption of a basket may change over time, due to, e.g., the accrual of trust's expenses, the transfer of the trust's bitcoin to pay sponsor's fee and/or the transfer of the trust's bitcoin to pay any trust expenses not assumed by the Sponsor, to name a few.

In embodiments, the number of whole and fractional bitcoin in the deposit required for a basket ("Creation Basket Deposit") may be determined by dividing the number of bitcoin held by the trust by the number of baskets outstanding, as adjusted for the number of whole and fractional bitcoin constituting estimated accrued but unpaid fees and expenses of the trust. Fractions of a bitcoin smaller than a Satoshi (i.e., 0.00000001 of a bitcoin) which are included in the Creation Basket Deposit amount are disregarded in the foregoing calculation. All questions as to the composition of a Creation Basket Deposit will be conclusively determined by the Trustee. The Trustee's determination of the Creation Basket Deposit shall be final and binding on all persons interested in the Trust.

In embodiments, baskets may be created and/or redeemed only by APs, such as APs who pay a transaction fee for each order to create and/or redeem Baskets and/or have the right to sell the shares included in the Baskets they create to other investors. In embodiments, the Trust may or may not issue fractional baskets.

In embodiments, a method for purchasing shares of a trust associated with an exchange traded product holding digital math-based assets may comprise receiving, at a trust computer system from an AP computer system, a request from an AP to purchase shares in the trust; providing or creating, at the trust computers system, one or more digital wallets associated with a trust custody account to hold digital math-based assets, each digital wallet have a respective public key and a respective private key; providing, from the trust computer system to the AP computer system, each respective public key; receiving, at the trust computers systems, into the one or more digital wallets a first amount of digital math-based assets, from one or more digital wallets associated with an AP; sending, from the trust computer system to a digital asset network, an asset notification to provide for the asset transfer recorded on a public transaction ledger of a digital asset network to reflect the transfer of the first amount of digital math-based assets; receiving, at the trust computer system, confirmation from the digital asset network, that the transfer is valid; and sending instructions to a third-party clearing entity to transfer a first amount of shares in the trust to the AP.

Figure 17A:
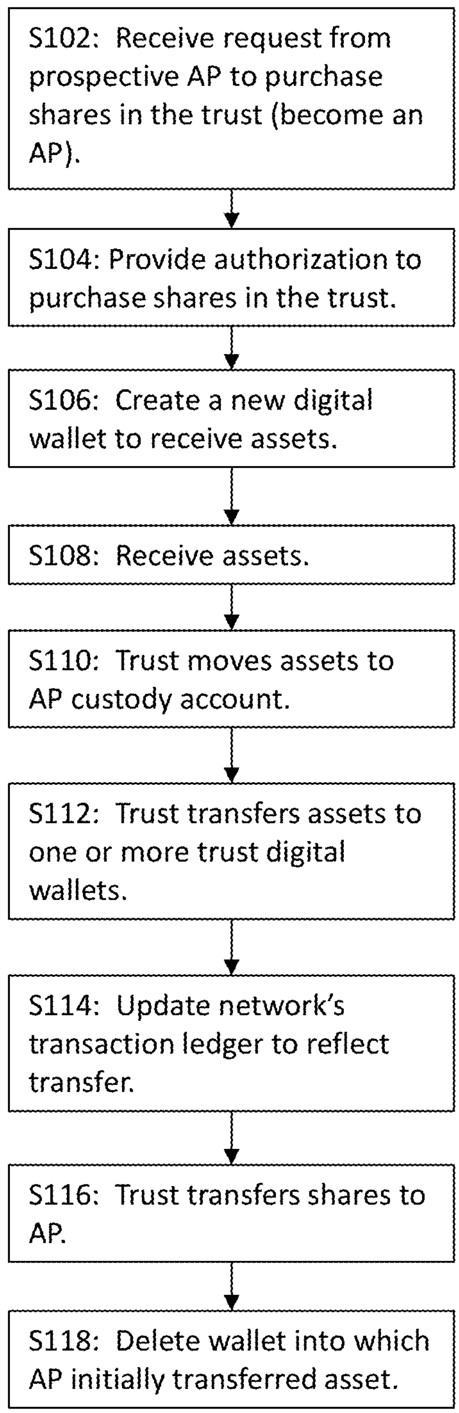

FIG. 17A is a flow chart of a process for investing in the trust in accordance with exemplary embodiments of the present invention. In embodiments, the process depicted in FIG. 17A may be performed by the trustee, the administrator, the custodian, and/or one or more computers operated by one or more of those entities or another entity. In exemplary embodiments, in step S102, a request may be received from a prospective AP to become an AP and/or to purchase shares in the trust. At this point the prospective AP may be made an AP with the trust for the ETP. In a step S104, authorization may be provided, e.g., from the trustee, to purchase shares in the trust. In embodiments, step S104 may begin a settlement process. In embodiments, the settlement process will comprise a window, e.g., a 3-day window, during which an AP may hedge its position in the market. In embodiments, the AP may obtain digital assets amounting to a creation deposit to create the creation unit. For example, the AP may purchase bitcoin required for the creation deposit, or may otherwise have sufficient bitcoin, e.g., stored in a digital wallet, to settle a creation unit order. In a step S106, the trustee may create one or more new digital wallets to receive assets from an AP. In a step S108, the trust may receive assets, e.g., from an AP. In embodiments, the assets may comprise one or more creation units. In embodiments, the assets may be deposited by the AP directly into an AP custody account. Where assets are not deposited directly into an AP custody account, in a step S110 the trustee may move the assets into an AP custody account. In a step S112, the trustee may transfer assets to one or more trust digital wallets. In embodiments, these digital wallets may be vault digital wallets which may be intended to hold assets for long term storage. In a step S114, the trustee may send an asset notification to provide for the asset transfer recorded on a network's transaction ledger or may otherwise update or cause to be updated the network's transaction ledger to reflect the transfer. In step S116, the trustee may transfer or direct the transfer, e.g., by a third-party clearing agency 250 (e.g., the DTC), of shares in the trust to the AP. In step S118, the trustee may delete the wallet or wallets into which the AP initially transferred the assets.

In an exemplary embodiment, the fund asset can be a digital asset. In exemplary embodiments, the digital asset can be a bitcoin. To obtain shares in the trust, an AP may convert cash or anything of value to one or more digital assets. This conversion may be performed independently of the ETP or may be performed through an entity or system related to the ETP or may be performed through the ETP. In an exemplary embodiment, the AP obtains digital assets through an exchange. The AP may also have stored digital assets, e.g., an inventory of assets, which it may choose to deposit with the ETP. The AP may then deposit the digital assets with the ETP in exchange for one or more creation units of shares. Deposit of digital assets may occur via a public registry. The transfer of digital assets may occur as a peer-to-peer ("P2P") transaction, also known in the art as an end-user to end user transaction.

In embodiments, the AP may first place a creation order with the trustee, e.g., by transmitting the creation order to an administrative operations division of the trustee. In embodiments, as described above, shares may only be issued in creation units and/or in exchange for digital assets of predefined amounts. For example, one creation unit may consist of 50,000 shares and may be issued by the trustee in correlation with a deposit of the requisite amount of digital assets into the trust's account.

The trustee may accept the AP's creation order, which may begin a settlement period, e.g., a 3-day settlement period, during which the AP may engage in a settlement process. The settlement process may allow an AP time to hedge, with one possible goal being to avoid or limit risk. In embodiments, no-limit risk may be applicable. In embodiments, a goal of the hedging process may be to protect, e.g., from price movements, the AP's position in the digital assets being delivered to the trust.

In embodiments, the trustee, using one or more computers, may establish one or more digital wallets for each creation. In embodiments, the one or more digital wallets may comprise an AP custody account, which may receive assets deposited by an AP. In embodiments, an AP custody account may remain open throughout the process, and new digital wallets within the account may be created as needed and/or desired to fulfill orders and allow transfers. In embodiments, the trust may provide its own digital wallet system, which may include an interface and a programmed back end, or the trust may use an existing system. In embodiments, an AP may identify the public address of the digital wallet from which it will transfer assets to the trust.

At or before the close of the settlement window, the AP may instruct the trustee to transfer the required digital assets from the AP custody account for deposit into the trust. Upon such transfer from the AP to the trust, the AP may have satisfied its obligation. The trust, through a third-party clearing agency 250 (e.g., the DTC), may then issue shares in the required number of creation units to the AP.

In an exemplary embodiment, digital assets may be transferred from the AP to the trust by transferring the assets first from the AP's one or more outside digital wallets to the AP custody account's one or more digital wallets and, second, from the AP custody account's one or more digital wallets to the trust custody account's one or more digital wallets. In embodiments, both the transferor and the transferee's digital wallets may be required to report the transaction(s) to a registry or other system or entity in order for the transaction (s) to complete. In embodiments, there may be a time window within which both wallets must report the transaction(s). In embodiments, a transaction ledger will be updated to reflect the transfer(s).

FIG. 17B is a flow chart of a process for investing in the trust in accordance with exemplary embodiments of the present invention. In embodiments, the process depicted in FIG. 17B may be performed by the trustee of the trust, the administrator of the trust on behalf of the trust, the custodian, and/or one or more computers operated by one or more of those entities or another entity. In exemplary embodiments, in step S122, a trust computer system including one or more computers may determine share price information based at least in part upon a first quantity of digital math-based assets held by a trust at a first point in time and a second quantity of shares in the trust at the first point in time. In embodiments, the share price information may then be transmitted from the trust computer system to the one or more authorized participant user devices. In embodiments, the step S122 may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares. In embodiments, the share price information, may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In a step S124, the trust computer system may receive, from one or more authorized participant user devices of an authorized participant, an electronic request to purchase a third quantity of shares.

In a step S126, the trust computer system may determine a fourth quantity of digital math-based assets based at least in part upon the share price information and the third quantity of shares.

In a step S128, the trust computer system may be used to obtain one or more destination digital asset account identifiers corresponding to one or more destination digital asset accounts for receipt of digital math-based assets from the authorized participant. In embodiments, the one or more destination digital asset account identifiers may comprise one or more digital asset account addresses and/or public keys.

In a step S130, the one or more destination digital asset account identifiers and an electronic amount indication of the fourth quantity of digital math-based assets may be transmitted from the trust computer system to the one or more authorized participant user devices.

In a step S132, an electronic transfer indication of a transfer of digital math-based assets to the destination digital asset account may be received at the trust computer system. In embodiments, the electronic transfer indication may further comprise an identification of one or more origin digital asset accounts.

In a step S134, the trust computer system may verify, using a decentralized electronic ledger maintained by a plurality of physically remote computer systems, a receipt of the fourth quantity of digital math-based assets in the one or more destination digital asset accounts. In embodiments, step S134 may further comprise the steps of accessing, using the trust computer system, a plurality of updates to the decentralized electronic ledger; analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger. In embodiments, the plurality of updates to the decentralized electronic ledger may comprise new blocks added to a bitcoin blockchain.

In a step S136, the trust computer system may be used to issue or cause to be issued the third quantity of shares to the authorized participant.

In embodiments, the process depicted in FIG. 17B may further comprise the step of transferring, using the trust computer system, the fourth quantity of digital math-based assets into one or more digital asset accounts associated with a trust custody account. In further embodiments, the process depicted in FIG. 17B may further comprise the step of transmitting, from the trust computer system to the one or more authorized participant user devices, an electronic receipt acknowledgement indicating the receipt of the fourth quantity of digital math-based assets. In still further embodiments, the process depicted in FIG. 17B may further comprise the step of transmitting or causing to be transmitted, to the one or more authorized participant user devices, an electronic share issuance indication of the issuing of the third quantity of shares.

In embodiments a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Deposit Distribution Waterfalls Among Wallets

The creation process involves the deposit of digital assets into the trust's accounts. During a creation, assets or other funds may be deposited into one or more trust accounts. In embodiments, a trust may limit the number of assets or amount of funds stored in each of its wallets, e.g., for security reasons to reduce exposure if any one wallet is compromised. In multi-wallet structures, various asset distributions among the wallets are possible, and various distribution methods or waterfalls may be employed.

In embodiments, wallets may be filled in a pre-determined order. In embodiments, wallets may be filled according to one or more desired capacities or account balances, e.g., deposit 10,000 bitcoin in each wallet before proceeding to deposit in the next wallet.

Figure 18A:
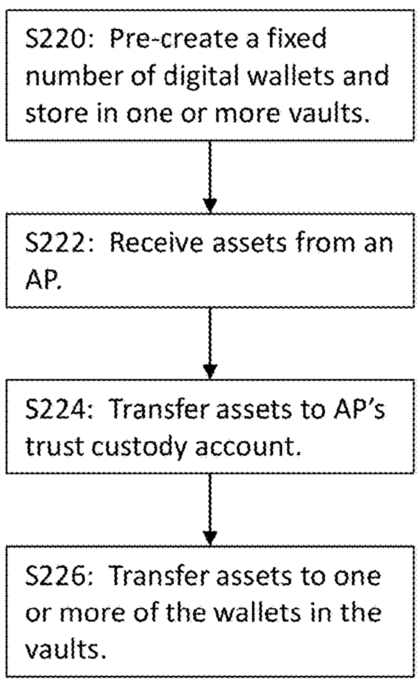
FIGS. 18A-18D are flow charts of various exemplary processes for assigning digital math-based assets, such as bitcoin, obtained during a creation and distributing them among digital wallets in accordance with embodiments of the present invention.
Figure 18B:
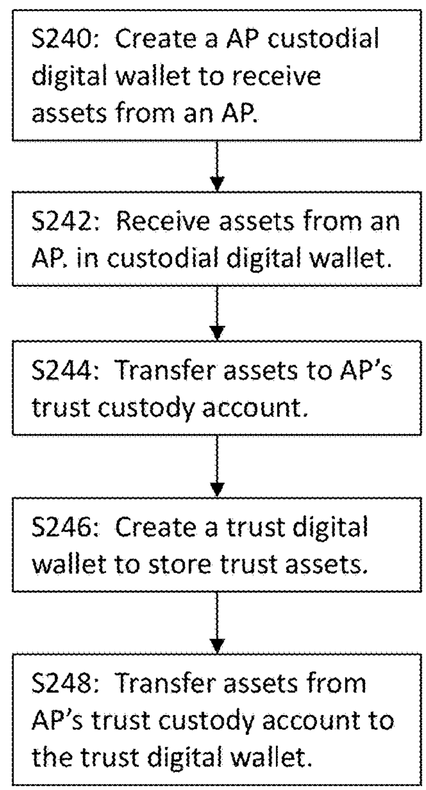

FIGS. 18A and 18B are flow charts of various exemplary processes for assigning digital assets (e.g., bitcoin) obtained at creation and distributing them among digital wallets in accordance with embodiments of the present invention.

For example, with reference to FIG. 18A, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S220, a fixed number of digital wallets to be stored in one or more vaults can be created in advance of anticipated use. In creating the digital wallets, as described herein e.g., in relation to FIG. 5A, the private key for each wallet may be parsed into two or more segments and/or encoded and stored in paper form. In embodiments, the key segments may be further encrypted before storing in paper form. The corresponding public key may be kept readily available for the administrator and/or custodian to access.

In step S222, an AP using an AP computer system can send to the trustee, custodian and/or administrator using a trust computer system, which in turn receives, assets (e.g., digital math assets such as bitcoin) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoin) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In embodiments, in step S224, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In step S226, the digital assets in the digital wallets associated with the AP trust custody account may be transferred using the trust computer system in whole or part into one or more of the previously created digital wallets whose private key segments are stored in vaults. In embodiments, the digital assets may be distributed by the trust computer system to trust wallets, such as discussed in the context of FIG. 18B herein, or according to another distribution algorithm.

With reference to FIG. 18B, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S240, an AP custodial digital wallet can be created using the trust computer system to receive assets from an AP digital wallet on an AP computer system.

In step S242, an AP using an AP computer system can send to the trustee, custodian and/or administrator using a trust computer system (which in turn receives) assets (e.g., digital math assets such as bitcoin) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoin) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In step S244, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In embodiments, the creation distribution methodology/algorithm can depend at least in part upon one or more of the following criteria or parameters:

- setting a maximum amount of digital assets stored in each wallet (e.g., limiting to 10,000 bitcoin in each wallet);
- setting a minimum amount of digital assets stored in each wallet (e.g., at least 100 bitcoin in each wallet);
- setting a maximum ratio of maximum amount to minimum amount of digital assets stored in each wallet (e.g., a 10-to-1 ratio);
- setting a random amount of digital assets to be stored in each wallet, wherein the random amount is greater than a minimum amount and less than a maximum amount;
- limiting the number of uses of each wallet (e.g., never using the same wallet more than once);
- resetting the maximum amount and the minimum amount of digital assets stored in each wallet based at least in part on increased or decreased volume of digital assets held by the trust;
- setting a maximum amount of digital assets transferred to each wallet in any given transaction (e.g., limiting to 10,000 bitcoin in each wallet);
- setting a minimum amount of digital assets transferred to each wallet in any given transaction (e.g., at least 100 bitcoin in each wallet);
- setting a maximum ratio of maximum amount to minimum amount of digital assets transferred to each wallet in any given transaction (e.g., a 10-to-1 ratio);
- setting a random amount of digital assets to be transferred to each wallet in any given transaction, wherein the random amount is greater than a minimum amount and less than a maximum amount;
- limiting the number of transfers to a given wallet (e.g., never using the same wallet more than once, never make more than two transfers to the same wallet during a year period, to name a few);
- resetting the maximum amount and the minimum amount of digital assets transferred to and/or from each wallet based at least in part on increased or decreased volumes of digital assets held by the trust; and/or
- performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

Figure 18C:
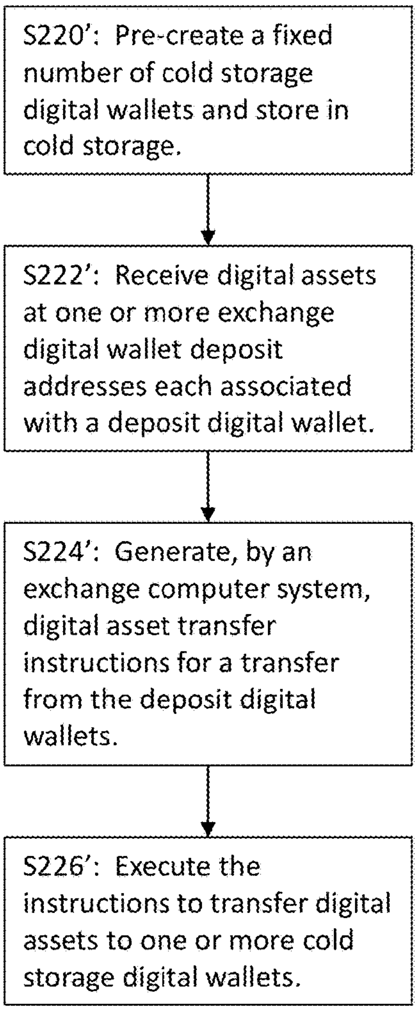

With reference to FIG. 18C, an exemplary deposit distribution waterfall is illustrated. In embodiments, these steps may be performed using an exchange computer system.

In step S220', a fixed number of digital wallets to be stored in one or more vaults can be created in advance of anticipated use. In generating the digital wallets, as described herein e.g., in relation to FIG. 5A, the private key for each wallet may be parsed into two or more segments and/or encoded and stored in paper form. In embodiments, the key segments may be further encrypted before storing in paper form. In embodiments, the private keys, which can include multiple private keys for multi-signature wallets, may be stored electronically, e.g., on non-transitory computer-readable memory. The corresponding public key may be kept readily available for an exchange employee and/or private key custodian to access. In embodiments, cold storage wallet private keys may be stored remotely, e.g., in a bank vault, bank safety deposit box, and/or precious metal vault. In embodiments, cold storage wallet private keys may be stored in a locked room and/or in a safe, which may be located at the premises of exchange employees.

In step S222', an exchange user using computer system or user device can send to a deposit address associated with a deposit digital wallet maintained by the exchange, which in turn receives, assets (e.g., digital math assets such as bitcoin) to be deposited with the exchange. For example, the exchange computer system can send electronically to the user device a public key or deposit address associated with an exchange deposit wallet to receive the digital assets. The user can then enter the public key or address into a user digital wallet on the user device to send the digital assets (e.g., bitcoin) to the exchange deposit wallet using a private key associated with the user digital wallet and the address associated with the exchange deposit wallet. The exchange computer system can then acknowledge (e.g., electronically) receipt of the transferred digital assets in the deposit wallet. In embodiments, one or more private keys associated with deposit digital wallets may be stored in cold storage.

In embodiments, in step S224', the exchange computer system may generate digital asset instructions (e.g., machine-readable instructions comprising at least a destination digital wallet address) for a transfer from the deposit digital wallet to one or more cold storage wallets.

In step S226', the digital assets in the deposit digital wallets may be transferred using the exchange computer system in whole or part into one or more of the previously created cold storage digital wallets whose private key segments are stored in cold storage. In embodiments, the digital assets may be distributed by the exchange computer system to exchange digital wallets, such as discussed in the context of FIG. 18D herein, or according to another distribution algorithm.

Figure 18D:
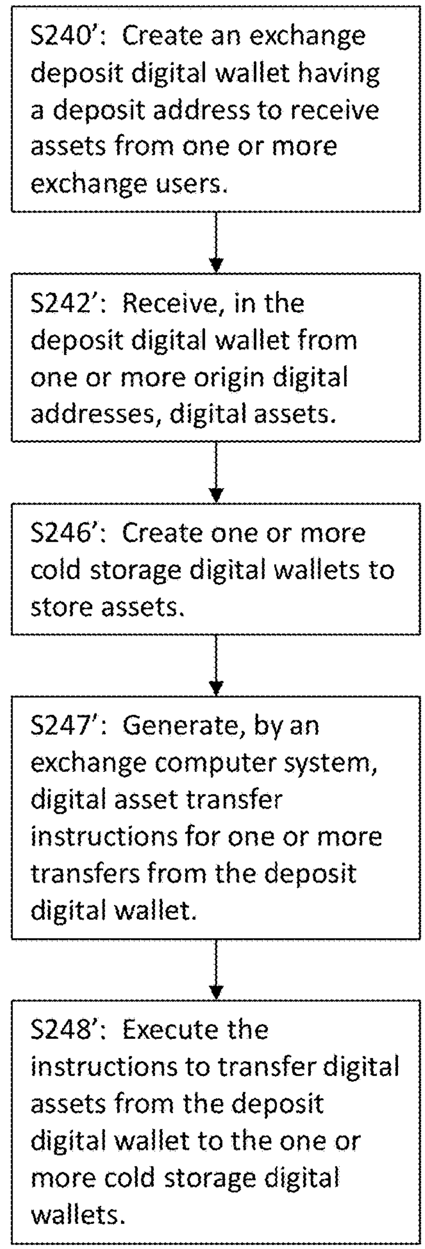

With reference to FIG. 18D, an exemplary deposit distribution waterfall is illustrated. In embodiments, these steps may be performed using an exchange computer system.

In step S240', an exchange deposit digital wallet can be created using the exchange computer system to receive assets from one or more user digital wallets.

In step S242', digital assets may be received in the deposit digital wallet from one or more origin digital addresses (e.g., corresponding to exchange user digital wallets).

In step S246', one or more cold storage digital wallets may be created to store digital assets. In embodiments, such cold storage digital wallets may already exist and be stored according to the secure storage systems and methods described herein.

In a step S247', the exchange computer system may generate digital asset transfer instructions for transfers from the deposit digital wallet. The transfer instructions may be generated based at least in part upon a distribution algorithm. In embodiments, the deposit distribution methodology/algorithm can depend at least in part upon one or more of the following criteria or parameters:

- setting a maximum amount of digital assets stored in each wallet (e.g., limiting to 10,000 bitcoin in each wallet);
- setting a minimum amount of digital assets stored in each wallet (e.g., at least 100 bitcoin in each wallet);
- setting a maximum ratio of maximum amount to minimum amount of digital assets stored in each wallet (e.g., a 10-to-1 ratio);
- setting a random amount of digital assets to be stored in each wallet, wherein the random amount is greater than a minimum amount and less than a maximum amount;
- limiting the number of uses of each wallet (e.g., never using the same wallet more than once);
- resetting the maximum amount and the minimum amount of digital assets stored in each wallet based at least in part on increased or decreased volume of digital assets held by the exchange;
- setting a maximum amount of digital assets transferred to each wallet in any given transaction (e.g., limiting to 10,000 bitcoin in each wallet);
- setting a minimum amount of digital assets transferred to each wallet in any given transaction (e.g., at least 100 bitcoin in each wallet);
- setting a maximum ratio of maximum amount to minimum amount of digital assets transferred to each wallet in any given transaction (e.g., a 10-to-1 ratio);
- setting a random amount of digital assets to be transferred to each wallet in any given transaction, wherein the random amount is greater than a minimum amount and less than a maximum amount;
- limiting the number of transfers to a given wallet (e.g., never using the same wallet more than once, never make more than two transfers to the same wallet during a year period, to name a few);
- resetting the maximum amount and the minimum amount of digital assets transferred to and/or from each wallet based at least in part on increased or decreased volumes of digital assets held by the exchange; and/or
- performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

In a step S248', the digital asset transfer instructions may be executed using the exchange computer system to transfer digital assets from the deposit digital wallet to the one or more cold storage digital wallets.

Redemptions from ETP

In embodiments a method for redeeming shares in a trust associated with an exchange traded product holding digital math-based assets may comprise receiving, at a trust computer system from an AP computer system, a redemption order from an AP to redeem a first number of shares in the trust; determining, using the trust computer system, one or more trust wallets to access to satisfy the redemption order; generating, using the trust computer system, instructions to a custodian to retrieve at least one copy of each private key segment corresponding to the one or more trust wallets; sending the instructions to the custodian; reassembling, using the trust computer system, the one or more trust wallets using the at least one copy of each private key segment; transferring, using the trust computer system, from the one or more trust wallets a first number of digital math-based assets to an AP wallet associated with the AP; generating, using the trust computer system, instructions to the third-party clearing agency to cancel the first number of shares in the trust of the AP; and sending the instructions to the third-party clearing agency. In embodiments, the trustee using the trust computer system may approve the redemption order and/or send confirmation (e.g., electronically) of the order.

In embodiments, the redemption distribution from the trust may consist of a transfer to the redeeming AP's Authorized Participant Custody Account of the number of the bitcoin held by the trust in the Trust Custody Account evidenced by the shares being redeemed. In embodiments, fractions of a bitcoin included in the redemption distribution smaller than a Satoshi (i.e., 0.00000001 of a bitcoin) may be disregarded. In embodiments, redemption distributions may be subject to the deduction of any applicable tax or other governmental charges that may be due.

Figure 19A:
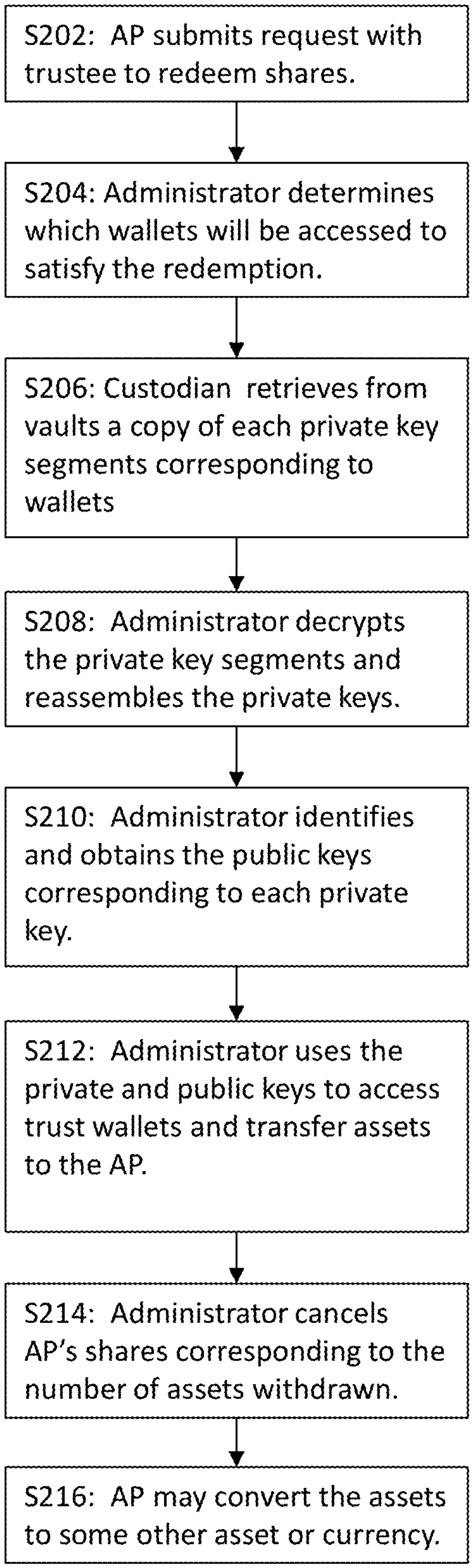
FIGS. 19A and 19B are flow charts of processes for redeeming shares in the trust in accordance with exemplary embodiments of the present invention.

FIG. 19A is a flow chart of a process for redeeming shares in the trust in accordance with exemplary embodiments of the present invention. In embodiments, the processes depicted in FIG. 19A may be performed by the trustee, the administrator, the custodian, and/or a trust computer system comprising one or more computers operated by one or more of those entities or another entity.

In step S202, the trust computer system may receive a request, e.g., a redemption order, from an AP computer system for an AP to redeem shares in the trust. In embodiments, the trustee using the trust computer system may approve the redemption order and/or send confirmation (e.g., electronically) of the order. In embodiments, a settlement process entailing, for example, a 3-day settlement window, may be triggered. Other durations of settlement periods may be used as convenient. In embodiments, the trust computer system may receive from the AP computer system one or more public keys associated with AP wallets and/or AP accounts to which redemption proceeds are designated by the AP to be distributed. For example, public key information may be sent electronically from the AP computer system to the trust computer system using, e.g., a digital wallet, e-mail, text message, a digital asset exchange, electronic communications, to name a few. In embodiments, the trustee may designate one or more existing trust custody wallets and/or create one or more new wallets using the trust computer system to be used as AP custody accounts. In embodiments, the trustee may determine the number of digital assets (e.g., bitcoin) required for the redemption, e.g., by using the trust computer system to multiply the number of shares to be redeemed by the NAV value per share less any transaction fees associated with the redemption. In embodiments, depending upon the timing of the redemption, an ANAV value per share may be used in lieu of the NAV value per share. The trust may request and/or receive, e.g., through the third-party clearing agency 250 (e.g., the DTC), shares to be redeemed.

In step S204, the trust computer system may determine one or more wallets to access to satisfy the redemption. The determination as to how many and which wallets should be used to redeem assets may be based at least in part on one or more of the parameters discussed herein (see, e.g., Redemption Distribution Waterfalls Among Wallets).

In step S206, the trustee may instruct the custodian to retrieve from one or more vaults a copy of each private key segment comprising one or more private keys corresponding to the digital wallets that will be accessed to satisfy the redemption. In embodiments, special security measures may be implemented to limit the risk of one or more key segments being lost, damaged and/or stolen in transport. For example, bonded armored cars can be used to transport key segments. The timing of key segment retrieval and transport may be spaced so that only one segment is transported at a time. The timing and/or route of retrieval may also be randomized and/or varied to avoid predictability of transport of key segments from the vault to the administrative portal.

In step S208, the trustee, administrator and/or custodian using the trust computer system may use the retrieved private key segments to reassemble the private keys. In embodiments, this may be performed by decrypting the private key segments and reassembling the segments into a complete private key. In embodiments, the retrieved private key segments may be scanned using key reader 40, and decrypted (as necessary) using decryption software on the isolated computer 30 as part of the trust computer system, and combined and associated with the corresponding public key to regenerate a trust wallet.

Figure 19B:
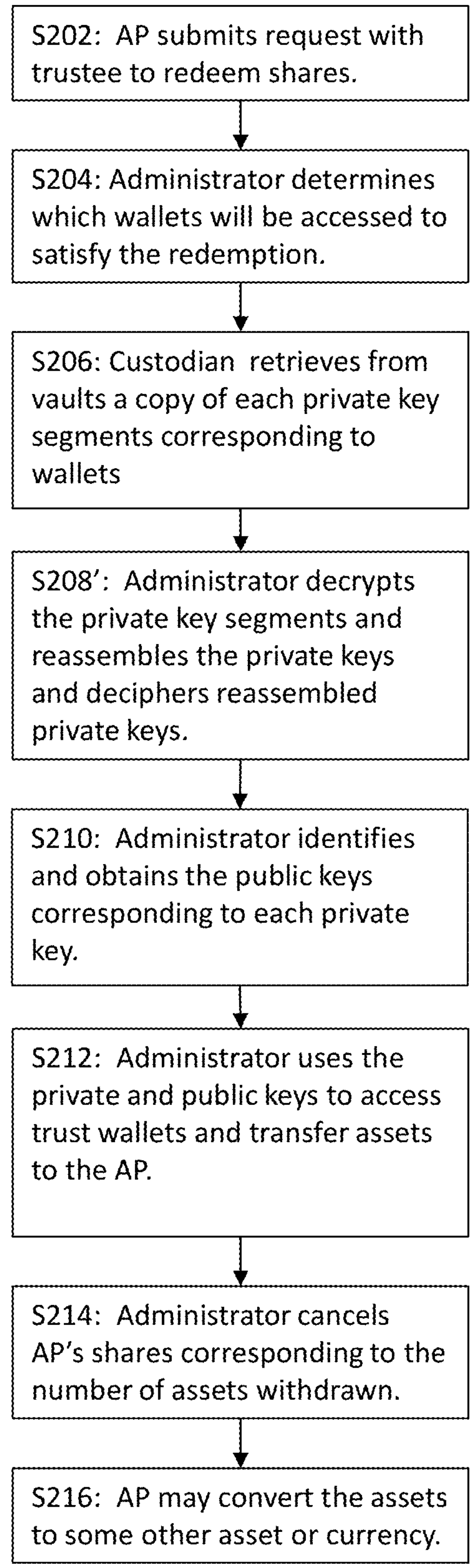

In embodiments, as described in a step S208' in FIG. 19B, the trustee, administrator, and/or custodian using the trust computer system may decrypt the private key segments, reassemble the key segments into full keys, and/or reverse any cipher that was previously applied. In embodiments, these sub-steps of step S208' may be performed in any order which will result in a properly reassembled private key. In embodiments, they are performed in the reverse order of the steps used to secure and store the keys. In embodiments, the key segments are decrypted first, then reassembled into a complete key, then deciphered. The complete deciphered key may then be used to access and/or transact using a digital wallet.

In step S210, the trust computer system may identify and/or correlate the one or more private keys with the associated public keys to create one or more digital wallets to access the digital assets. In embodiments, preassembled wallets may be generated on one or more isolated transaction computers 32 to hold public key and private key information and transfer instructions awaiting closing. In embodiments, the use of preassembled wallets may expedite the wallet generation process associated with digital math based assets. In embodiments, the trust computer system may include one or more digital asset miners (e.g., bitcoin miners) to allow for prompt transfer of ledger information to reassembled digital wallets. In embodiments, digital math-based assets earned by the digital asset miners may be added to the trust and/or paid to the administrator and/or sponsor as a fee.

In step S212, the trust computer system may reassemble, regenerate, or otherwise access the one or more trust custody account digital wallets (which may, in embodiments, be vault wallets) using the private and/or public keys. The trust computer system may transfer, from the one or more vault wallets to one or more digital wallets in the AP custody account, the assets being redeemed, and then transfer such assets being redeemed to the AP's one or more outside digital wallets. In embodiments, the AP wallet may be an AP custodial wallet. In embodiments, the trust computer system may delete or destroy one or more wallets involved in the transaction, e.g., the AP custody wallet and/or any vault wallets that were emptied, to name a few.

In step S214, the trustee may cancel and/or instruct to cancel, e.g., using the third-party clearing agency 250 (e.g., DTC), the AP's shares corresponding to the number of assets withdrawn and delivered to the AP.

In embodiments, in step S216, the AP may convert the assets to some other asset or currency or use them to conduct one or more transactions.

In embodiments, security measures, such as described with respect to FIG. 8, may be implemented. In embodiments, a wallet created on the isolated computer 30 may be copied in part to create a watching wallet that may create unsigned transactions and/or broadcast already signed transactions. In embodiments, the watching wallet may not contain private key data. The watching wallet may be loaded onto the networked computer 20. The networked computer 20 may then be used to create one or more unsigned transactions. The unsigned transaction data may be transferred from the networked computer 20 to the isolated computer 30. Such transfer may be manual, such as by downloading the unsigned transaction data to a removable storage device comprising computer readable medium (e.g., a USB flash drive, CD, CD-ROM, DVD, removable hard drive, disk, memory card, to name a few), physically disconnecting the storage device from the networked computer 20, operatively connecting the storage device to the isolated computer 30, and uploading the unsigned transaction data to the isolated computer 30. In embodiments, networked computer 20 may be connected, directly or indirectly, to isolated computer 30, which connection may comprise security measures, such as a firewall, designed to prevent unauthorized access of the isolated computer 30. After receiving the unsigned transaction data, the digital wallet on the isolated computer 30 may be used to sign the transaction. The signed transaction data may then be transferred from the isolated computer 30 to the networked computer 20 in any of the manners described herein. The networked computer 20 may then broadcast the signed transaction data to the network, which may complete the transaction.

FIG. 19C is a flow chart of another exemplary process for redemption of shares in an ETP.

In a step S2022, a trust computer system comprising one or more computers may determine share price information based at least in part upon a first quantity of digital math-based assets held by a trust at a first point in time and a second quantity of shares in the trust at the first point in time. In embodiments, the share price information may be transmitted to one or more authorized participant user devices. The share price information can comprise a net asset value per share, an adjusted net asset value per share, and/or a net asset value per a basket of shares (e.g., where the number of shares comprising the basket of shares may be associated with one creation unit of shares), to name a few. In embodiments, the basket of shares can comprise any of 5,000 shares, 10,000 shares, 15,000 shares, 25,000 shares, 50,000 shares, or 100,000 shares, to name a few.

In a step S2024, the trust computer system may receive from one or more authorized participant user devices of an authorized participant, an electronic request (e.g., a redemption order) to redeem a third quantity of shares.

In a step S2026, the trust computer system may determine a fourth quantity of digital math-based assets based at least in part upon the share price information and the third quantity of shares. Determining the fourth quantity of digital assets can comprise obtaining a net asset value per share; determining a digital math-based asset value of the third quantity of shares based upon the net asset value per share; determining transaction fees (e.g., denominated in a unit of the digital math-based asset) and/or expenses associated with the electronic request to redeem shares; and determining the fourth quantity of digital math-based assets by subtracting the transaction fees from the digital math-based asset value of the third quantity of shares.

In a step S2028, the trust computer system may obtain one or more destination digital asset account identifiers corresponding to one or more destination digital asset accounts for receipt by the authorized participant of a transfer of the fourth quantity of digital math-based assets from the trust. The destination digital asset accounts may correspond to an authorized participant custody account.

In a step S2030, the trust computer system may obtain one or more origin digital asset account identifiers corresponding to one or more origin digital asset accounts for the transfer. In embodiments, the origin digital asset accounts may be securely stored accounts, as described herein. The origin digital asset accounts may correspond to a trust custody account.

In a step S2032, the trust computer system may initiate the transfer of the fourth quantity of digital math-based assets from the one or more origin digital asset accounts to the one or more destination digital asset accounts. Initiating a transfer of assets from the trust can comprise retrieving or causing to be retrieved (e.g., issuing retrieval instructions) one or more private keys associated with the one or more origin digital asset accounts, and accessing the one or more origin digital asset accounts using at least the one or more private keys.

Retrieving keys can comprise issuing retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In other embodiments, retrieving keys can comprise issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In still other embodiments, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

For a multi-signature digital asset account, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts.

In a step S2034, the trust computer system may broadcast the transfer to a decentralized electronic ledger maintained by a plurality of physically remote computer systems.

In a step S2036, the trust computer system may verify, using the decentralized electronic ledger, a receipt of the fourth quantity of digital math-based assets at the one or more destination digital asset accounts. Transaction verification can comprise accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In a step S2038, the trust computer system may cancel or cause to be canceled (e.g., by issuing instructions to a third-party clearing agency) the third quantity of shares from the authorized participant.

In embodiments, the process can include determination of and/or institution of a settlement period associated with the electronic request to redeem shares.

In embodiments, the trust computer system may be operated by a trustee and/or an administrator of the trust.

In embodiments a system for determining and/or providing a blended digital math-based asset price can comprise one or more processors and one or more computer-readable media operatively connected to the one or more processors and having stored thereon instructions for carrying out the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

Redemption Distribution Waterfalls Among Wallets

In embodiments, a redemption distribution waterfall may be implemented using one or more computers based at least in part on one or more parameters. Retrieval distributions may be dictate the order in which digital wallets (and/or their associated private and/or public keys) are retrieved from storage (e.g., from varying levels of cold storage, such as an on-premises safe, nearby safety deposit box, and/or geographically remote bank or secure storage facility). Retrieval distributions may also dictate quantities of digital assets to transfer from each wallet. In embodiments, redemption distribution algorithms may control such retrievals, e.g., by generating retrieval instructions, indicating one or more wallets to retrieve, and/or indicating one or more amounts to transfer from each identified wallet. In embodiments, such parameters may include at least one or more of the following.

- the order in which the wallet was created (e.g., first wallet created is first wallet used, last wallet created is last wallet used, to name a few);
- the order in which the wallet was filled (e.g., first wallet filed is first wallet used, last wallet created is last walled used, to name a few);
- a random order in which the wallet was created;
- a random order in which the wallet was filled;
- a random selection of the wallet;
- the vault in which the wallet is stored;
- the custodian of a vault storing the pair segments associated with a wallet;
- the amount of digital assets needed for a redemption compared to available in the wallet;
- the relative amount of digital assets held in the wallet (e.g., use the largest wallets first, use the smallest wallets first, to name a few); and/or
- the risk that a wallet has been compromised, to name a few.

Proof of Control

It has been a widespread problem with custodial accounts for digital assets that the digital assets purportedly being held are in fact not present. Such digital custodial accounts present a series of technical issues associated with not only securely holding digital assets in a custodial nature, but also proving control over such digital assets, while minimizing security risks and depleting digital assets. Previous attempts to prove control have required that a transaction involving the custodial account be exercised, which when a transaction fee is charged reduces the overall assets within the custodial account. The transaction fee poses a problem in this case because the fees are conventionally paid from the digital wallets held in the administrative account, so that providing many proofs of control over time may ultimately lead to depletion of the digital assets held in the digital wallets.

Exemplary embodiments of the present invention address the technical challenge by providing proof of control from a custodial digital asset account, with payment of the transaction fee associated with the proof of control event from a separate operating account. Embodiments of proof of control systems can be applied to a wide variety of implementations associated with digital asset wallets, such as custodial wallets for exchange traded products, hedges funds, trusts, and other fiduciaries, or non-custodial wallets. The proof of control itself may be in the form of a message sent along with a zero net transfer of digital assets from the administrative account. The message may relate to a recent event, such as an event that occurred within a very recent time period (e.g., the previous 10 minutes, previous hour, previous 12 hours, previous 24 hours, previous day, previous week, previous month, to name a few). As noted above the message may be or include the additional information that is included in the logs displayed in FIG. 2. For example, the message may be a recent newspaper headline, blog post title, price at a given date and time from an exchange, like the Gemini Auction price on a given date, to name a few. Since the transaction fee is paid from the digital asset operating account, the digital assets held in the digital wallets of the custodial account are not depleted.

Figure 53:
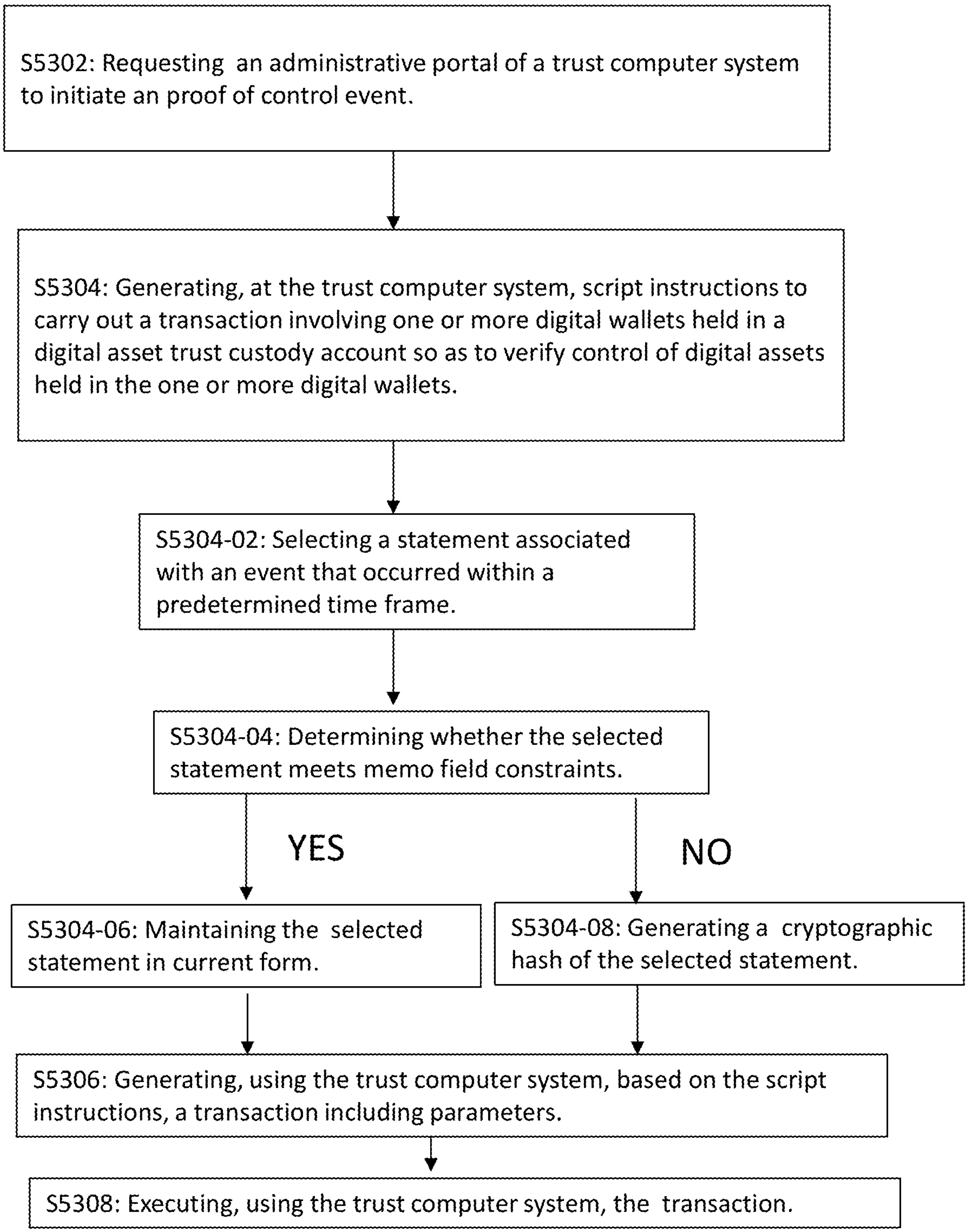
FIG. 53 is an exemplary flow chart for a method of providing proof of control from a custodial digital asset account.
Figure 54:
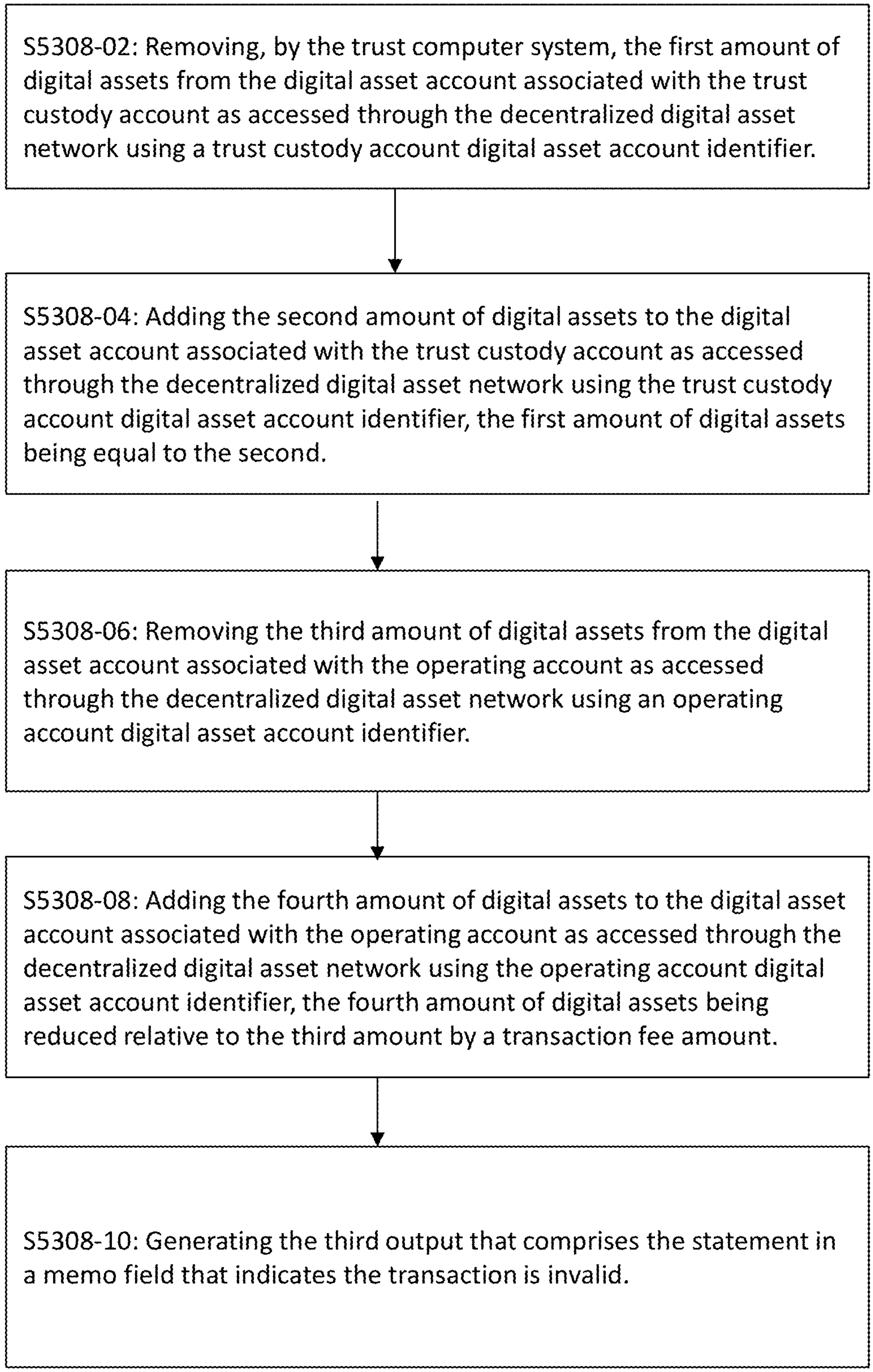
FIG. 54 is an exemplary flow chart illustrating the steps used to perform a transaction as part of the method to provide proof of control of the custodial account.

Referring to FIG. 53, the process for performing proof of control includes the following steps.

In Step S5302, an administrative portal of a trust computer system is requested to initiate an proof of control event. The trust computer system may be operatively connected to a decentralized digital asset network that uses a decentralized electronic ledger in the form of a blockchain maintained by a plurality of physically remote computer systems to track at least one of asset ownership or transactions in a digital math based asset system. Examples of a blockchain include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groestlcoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin. The request to initiate may come from, for example, an auditor and may include a statement of a recent event to use in the proof of control exercise.

In Step S5304, the trust computer system generates script instructions to carry out a transaction involving one or more digital wallets held in a digital asset trust custody account so as to verify control of digital assets held in the one or more digital wallets. Step S5304, may be performed though the following substeps. In Substep S5304-02, a statement is selected which is associated with an event that occurred within a predetermined time frame. For example, the message may relate to a recent event, such as an event that occurred within a very recent time period (e.g., the previous 10 minutes, previous hour, previous 12 hours, previous 24 hours, previous day, previous week, previous month, to name a few). For example, the message may be a recent newspaper headline, blog post title, price at a given date and time from an exchange, like the Gemini Auction price on a given date, to name a few. When a statement is provided as part of Step S5302, then the provided statement would be used.

Depending upon the length of the statement, various alternative processes may be employed. By way of example, for a short enough statement (e.g., less than 80 characters), the statement may be maintained in its original form. For example, "GeminiAuction02/08/18=8190.73". For a larger statement, like a "Express News Report on Feb. 8, 2018: Bitcoin price SURGE. Why is BTC bouncing back today? Cryptocurrency market rising, available at https://www.express.co.uk/finance/city/916246/bitcoin-price-news-why-BTC-bouncing-back-rising-today-cryptocurrency", a secure shortened version of the statement can be generated. For example, a cryptographic has of the statement can be applied.

In embodiments, where the length of the statement is not predetermined, the trust computer system can perform the following additional substeps as part of the Step S5304 process, including: SubStep S5304-04, the trust computer system may determine whether the statement fits within memo field length constraints of the script associated with the digital asset type. For example, Bitcoin uses "OP_RETURN outputs" as its mechanism for a memo field, which is limited to 80 bytes, and Ethereum uses Log Events on a pay-per-use basis. In SubStep S5304-06, if the determining SubStep S5304-04 indicates that the statement fits within the memo field length constraints, the trust computer system may maintain the statement in its original form. In SubStep S5304-08, if the determining SubStep S5304-04 indicates that the statement does not fit within the memo field length constraints, the trust system may generates a cryptographic hash of the statement to be used as a statement.

Next, in Step S5306, the trust computers system may generate, based on the script instructions, a transaction with the following parameters: (i) a first input of a first amount of digital assets to a digital asset account associated with the trust custody account as accessed through the decentralized digital asset network using a trust custody account digital asset account identifier; (ii) a first output of a second amount of digital assets from the digital asset account associated with the trust custody account as accessed through the decentralized digital asset network using the trust custody account digital asset account identifier, the first amount of digital assets being equal to the second amount of digital assets; (iii) a second input of a third amount of digital assets to a digital asset account associated with an operating account as accessed through the decentralized digital asset network using an operating account digital asset account identifier; (iv) a second output of a fourth amount of digital assets from the digital asset account associated with the operating account as accessed through the decentralized digital asset network using the operating account digital asset account identifier, the fourth amount of digital assets being reduced relative to the third amount by a transaction fee amount; (v) a third output that comprises the statement in a memo field; and (vi) applying a digital signature to the transaction using a private key associated with the trust custody account. At step S5308, the trust system will perform the transaction.

FIG. 53 illustrates an exemplary flow chart illustrating the substeps that may be performed in order to complete the transaction in step S5308. At SubStep S5308-02 the trust computed system removes the first amount of digital assets from the digital asset account associated with the trust custody account as accessed through the decentralized digital asset network using a trust custody account digital asset account identifier. At SubStep S5308-04, the trust computer system adds the second amount of digital assets to the digital asset account associated with the trust custody account as accessed through the decentralized digital asset network using the trust custody account digital asset account identifier, the first amount of digital assets being equal to the second amount of digital assets. At SubStep S5308-06, the trust computer system removes the third amount of digital assets from the digital asset account associated with the operating account as accessed through the decentralized digital asset network using an operating account digital asset account identifier. Next, at SubStep S5308-08 the trust computer system adds the fourth amount of digital assets to the digital asset account associated with the operating account as accessed through the decentralized digital asset network using the operating account digital asset account identifier, the fourth amount of digital assets being reduced relative to the third amount by a transaction fee amount. At SubStep S5308-10, the trust computer system generates a third output that comprises the statement in a memo field.

Examples of Financial Products Associated with ETPs Holding Digital Assets

In embodiments, insurance may be provided for digital assets. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoin stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

NAV Calculation

In embodiments, an ETP may use a blended digital math-based asset price as a benchmark. Accordingly, a net asset value ("NAV") of shares in a trust for an exchange traded product holding digital math-based assets may be calculated based in part upon a blended digital math-based asset price or a digital asset index, which may in turn comprise a plurality of blended digital math-based asset prices. A NAV may be determined by obtaining, using one or more computers from one or more exchange computers, a value of digital math-based assets held by the trust at a defined time; calculating or obtaining, using the one or more computers, a blended digital asset value of the digital math-based assets during the predefined period of time; calculating, using the one or more computers, the value of the digital math-based assets held by the trust at a defined time by multiplying the units of each digital math-based asset held by the trust by the price per unit of each such digital math-based asset; determining or obtaining, using the one or more computers, estimated accrued but unpaid expenses, including sponsor fees, incurred by the trust since the last payment of a sponsor fee up to, but not included, the date on which the valuation is made; calculating, using the one or more computers, the adjusted net asset value of the trust by subtracting the estimated accrued but unpaid fees and expenses since the last payment of a sponsor fee up to, and included, the last valuation date of the digital math-based assets held by the trust on such date; determining or obtaining, using the one or more computers, estimated unpaid fees and expenses incurred by the trust since the last valuation date; calculating, using the one or more computers, net asset value of the trust by subtracting estimated accrued but unpaid fees and expenses incurred since the last valuation date form the adjusted net asset value of the trust; calculating, using the one or more computers, net asset value per share of the trust by dividing the net asset value of the trust by a number of outstanding shares of the trust; storing in one or more databases on computer readable media operatively connected to the one or more computers the accrued but unpaid fees and expenses, adjusted net asset value, net asset value and the net asset value per share of the trust; and publishing, from the one or more computers to one or more publication systems, the net asset value and the net asset value per share of the trust. In embodiments a time period of 12 hours, 24 hours, or 36 hours may be used.

In embodiments, NAV of a trust or its equivalent can be calculated by a computer system comprising one or more computer. For example, in embodiments, a NAV can be calculated using one or more computers on a daily basis (for each evaluation day, e.g., a day on which the trust shares are available to be created, redeemed and/or exchanged). In embodiments, a NAV can use one or more formulas to estimate a fair market value of a unit of a digital asset and/or a share in a trust at a given point in time. In embodiments, an industry standard formula can be used to calculate a NAV. In embodiments, a proprietary formula can be used to calculate a NAV. For example, one or more computers may calculate a digital asset price using data from the largest exchanges in the digital asset exchange market. In embodiments, a blended digital asset price can be calculated by one or more computers using an averaged price.

In embodiments, a blended digital asset price can be the price for digital assets determined each valuation day at a set time, such as, e.g., 3:00 p.m. Eastern Time. In embodiments, a blended digital math-based asset price may be obtained from a blended digital math-based asset index, which may be accessed via an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at https://docs.gemini.com/rest-api/#new-order. In embodiments, the system may calculate a blended digital asset price, by obtaining transaction data from one or more exchanges selected from a list of exchanges approved by, e.g., the sponsor, to determine either the average of the high and low prices on each exchange or the weighted (based on volume of shares traded) average of the transaction prices for the prior fixed time period (e.g., 12 or 24 hours) of trading activity on such one or more exchanges. In embodiments, the system may then average the price for each exchange, using weighting based on each exchange's volume during the period. Other methodologies can be used by the system to calculated the blended digital asset prices. For example, three exchanges, four exchanges, five exchanges, ten exchanges, or any number of exchanges as may be appropriate in view of the market for the math-based assets may be selected to determine the blended digital asset price. In embodiments, a time period of other than 12 or 24 hours may also be used depending upon the volume and volatility of the math-based asset price. For example, in a low volume period the time period may be increased to, e.g., 36 hours, while in a high volatility period the time period may be decreased to, e.g., 4 hours. In embodiments, a blended digital math-based asset price may be calculated by computing a volume weighted exponential moving average of actual transactions (e.g., considering price and volume of each executed transaction) from one or more digital asset exchange. In embodiments, the moving average may be taken over a period such as 2 hours. In embodiments, other periods may be used, such as 24 hours, 1 hour, 30 minutes, and/or 15 minutes, to name a few.

Figure 20A:
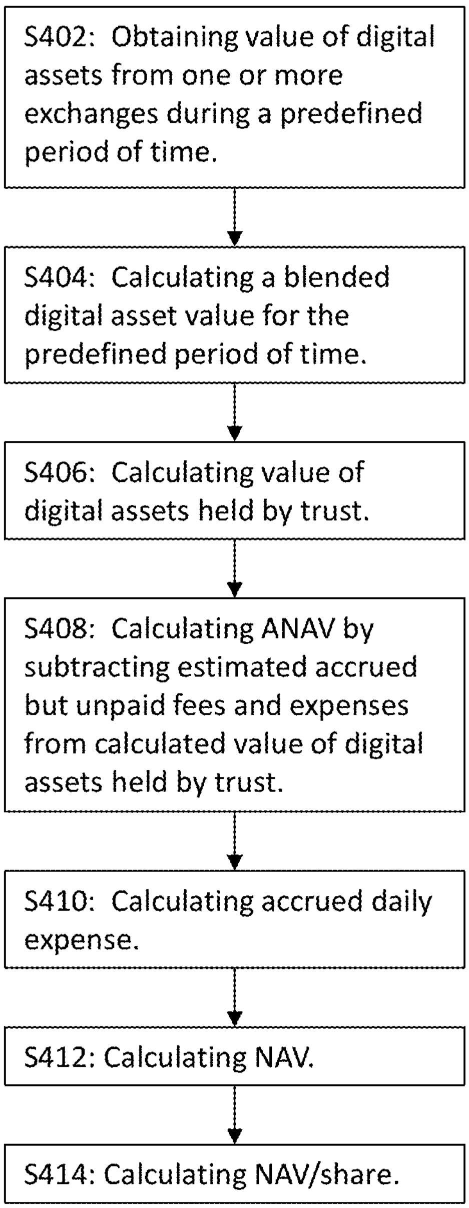
FIG. 20A is a flow chart of processes for calculating the NAV value of shares in a trust holding digital assets in accordance with embodiments of the present invention.

FIG. 20A is a flow chart of processes for calculating the NAV value of shares in a trust holding digital assets in accordance with embodiments of the present invention. In embodiments, these processes may be performed by a calculation agent 240, by one or more computers, and/or by some other entity using one or more computers. In a step S402, the one or more computers may obtain from one or more exchanges the value of digital assets during a predefined period of time. In a step S404 a blended digital asset value may be calculated for the predefined period of time. In embodiments, the blended digital asset value may also be obtained from an external computer system, such as an electronic published index system. In a step S406, the value of digital assets held by the trust may be calculated. In a step S408, the ANAV may be calculated. In embodiments, the ANAV may be calculated by subtracting estimated accrued but unpaid fees and expenses from the calculated value of digital assets held by the trust. In a step S410, the accrued daily expense may be calculated. In a step S412, the NAV may be calculated. In a step S414, the NAV per share (NAV/share) may be calculated.

Figure 20B:
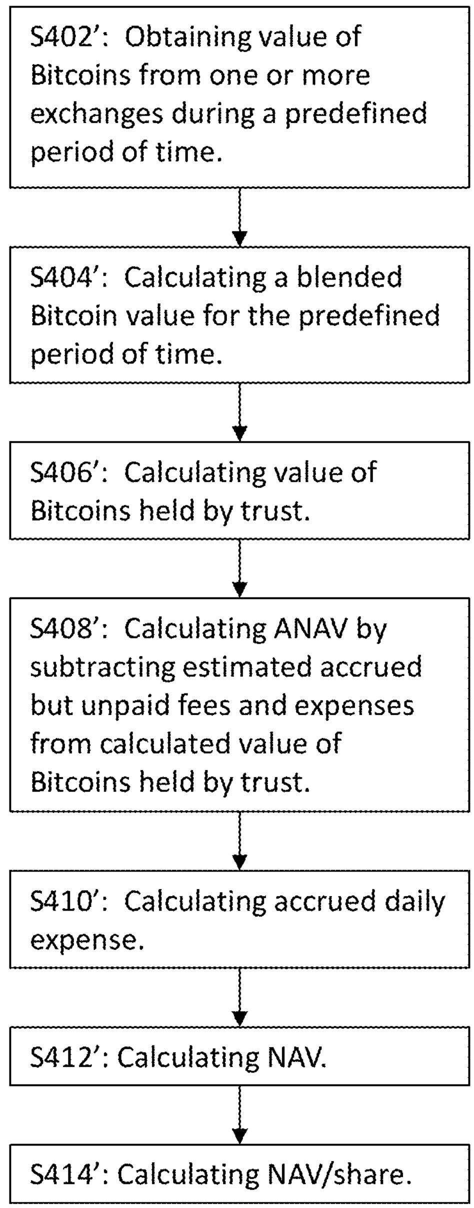
FIG. 20B is a flow chart of processes for calculating the NAV value of shares in a trust holding bitcoin in accordance with embodiments of the present invention.

FIG. 20B is a flow chart of processes for calculating the NAV value of shares in a trust holding bitcoin in accordance with embodiments of the present invention. In embodiments, these processes may be performed by a calculation agent 240, by one or more computers, and/or by some other entity using one or more computers. In a step S402', the one or more computers may obtain from one or more exchanges the value of bitcoin during a predefined period of time. In a step S404' a blended bitcoin value may be calculated for the predefined period of time. In a step S406', the value of bitcoin held by the trust may be calculated. In a step S408', the ANAV may be calculated. In embodiments, the ANAV may be calculated by subtracting estimated accrued but unpaid fees and expenses from the calculated value of bitcoin held by the trust. In a step S410', the accrued daily expense may be calculated. In a step S412', the NAV may be calculated. In a step S414', the NAV per share (NAV/share) may be calculated.

Figure 21A:
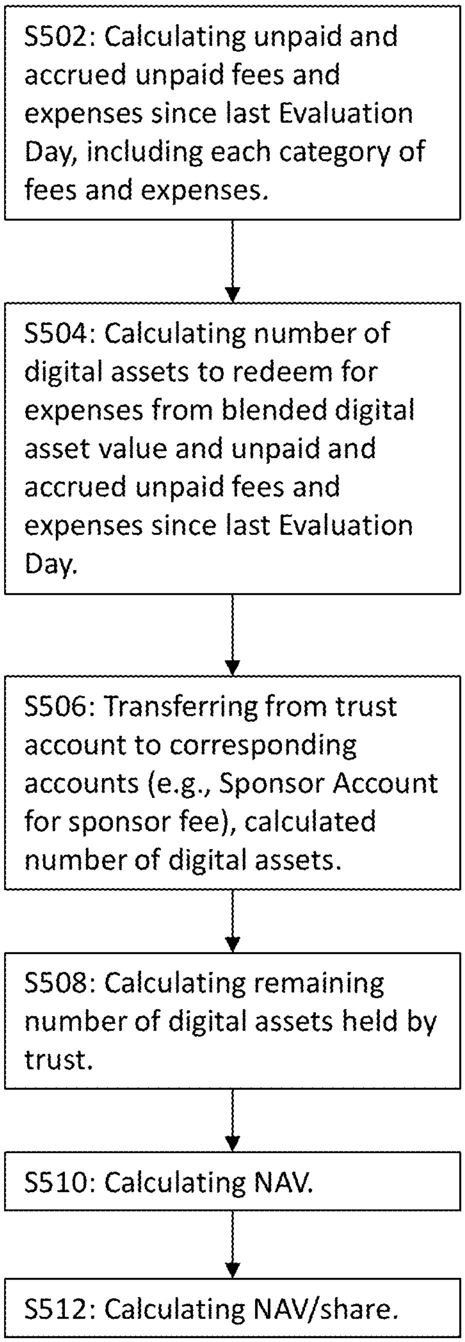
FIG. 21A is a flow chart of additional processes associated with evaluation day for calculating NAV value of shares in a trust holding digital assets in accordance with embodiments of the present invention.

FIG. 21A is a flow chart of additional processes associated with the evaluation day for calculating NAV value of shares in a trust holding digital assets in accordance with embodiments of the present invention. The processes described by FIG. 21A may be performed by one or more computers operated by one or more entities, such as a calculation agent 240. In a step S502, the unpaid and accrued unpaid fees and expenses since the last evaluation day, which may include each category of fees and/or expenses, may be calculated. In a step S504, the number of digital assets to redeem for expenses may be calculated from the blended digital asset value and the unpaid and accrued unpaid fees and expenses since the last evaluation day. In a step S506, the calculated number of digital assets may be transferred from the trust to corresponding accounts, e.g., a sponsor account for the sponsor fee. In a step S508, the remaining number of digital assets held by the trust may be calculated. In a step S510, the NAV may be calculated. In a step S512, the value of the NAV per share may be calculated.

Figure 21B:
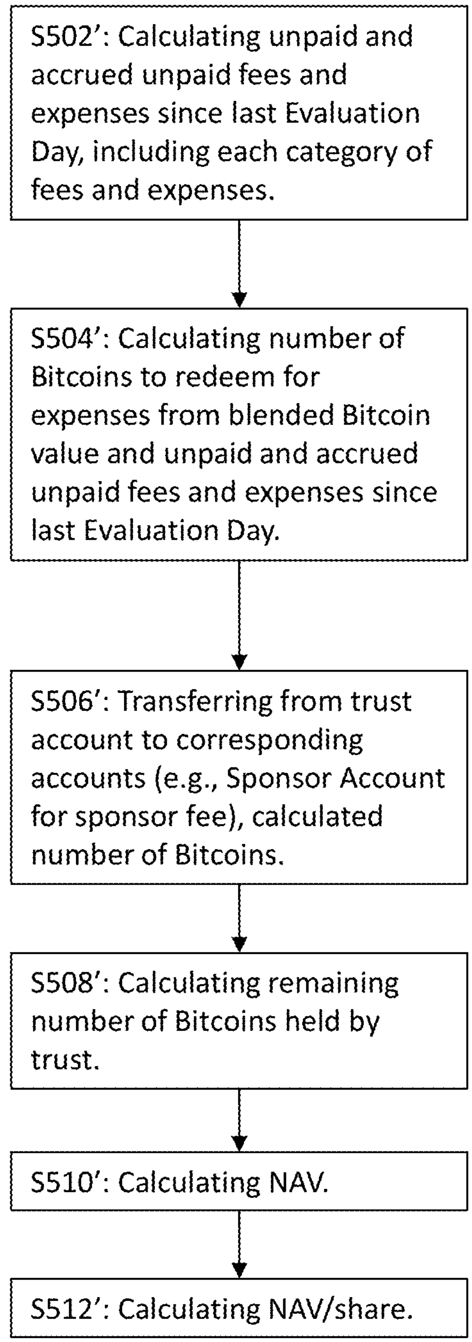
FIG. 21B is a flow chart of additional processes associated with evaluation day for calculating NAV value of shares in a trust holding bitcoin in accordance with embodiments of the present invention.

FIG. 21B is a flow chart of additional processes associated with the evaluation day for calculating NAV value of shares in a trust holding bitcoin in accordance with embodiments of the present invention. The processes described by FIG. 21B may be performed by one or more computers operated by one or more entities, such as a calculation agent 240. In a step S502', the unpaid and accrued unpaid fees and expenses since the last evaluation day, which may include each category of fees and/or expenses, may be calculated. In a step S504', the number of bitcoin to redeem for expenses may be calculated from the blended bitcoin value and the unpaid and accrued unpaid fees and expenses since the last evaluation day. In a step S506', the calculated number of bitcoin may be transferred from the trust to corresponding accounts, e.g., a sponsor account for the sponsor fee. In a step S508', the remaining number of bitcoin held by the trust may be calculated. In a step S510', the NAV may be calculated. In a step S512', the value of the NAV per share may be calculated.

The NAV and NAV per Share can be published daily after its calculation using one or more computers. A third party agent can be employed to perform the calculation and to electronically publish it. In embodiments, the following process can be used:

Step 1: Valuation of Digital Assets

In embodiments, a NAV and NAV per Share, can be struck using one or more computers each evaluation day (e.g., each day other than a Saturday or Sunday or any day on which the listing exchange 235 is not open for regular trading).

The NAV and NAV per Share striking can occur at or as soon as reasonably practicable after a predetermined time of day (e.g., 4:00 p.m. Eastern time) each evaluation day and can be conducted by the trustee.

Step 1: Calculate Value of Digital Assets

The first step for striking the NAV may be the valuation of the digital assets held by the Trust. In embodiments, the calculation methodology for valuing the Trust's digital assets can be as follows:

Value of digital assets=(# of digital assets held by trust)×(blended digital asset price)

If the blended digital asset price is unavailable on any given day, the sponsor can instruct the use of the prior day's blended digital asset price or, if the prior day's blended digital asset Price is deemed unfair/unsuitable, such other price as it deems fair.

Step 2: Calculation of ANAV

Once the value of the digital assets in the trust has been determined on an evaluation day, the trustee, using one or more computers, can subtract all estimated accrued but unpaid fees (other than the fees accruing for such day on which the valuation takes place computed by reference to the value of the Trust or its assets), expenses and other liabilities of the trust from such NAV of the trust. The resulting figure is the adjusted net asset value ("ANAV") of the trust. The ANAV can be used to calculate fees of trustee and/or sponsor.

In embodiments, the ANAV can calculated using the following methodology:

ANAV=(value of digital assets)−(estimated accrued but unpaid fees/expenses/liabilities)

Step 3: Calculation of Daily Expense

Once the NAV has been determined, any fees or expenses that accrued since the last striking of the NAV can be calculated using one or more computers based on the evaluation day ANAV.

All fees accruing for the day (and each day since the last evaluation day) on which the valuation takes place computed by reference to the value of the trust or its assets can be calculated by one or more computers using the ANAV calculated for such evaluation day.

In embodiments, in arrears using the average of the daily ANAV for the prior month, the daily expense fee (for each day since prior evaluation day) can be estimated on a daily basis using the following methodology:

Daily Expense*=(Sponsor's Fee)+(other fees)+(other expenses or liabilities accruing since the prior Evaluation Day)

Step 4: Calculation of NAV and NAV Per Share

In embodiments, the trustee can calculate using one or more computers the NAV, by subtracting from the ANAV the Daily Expense.

In embodiments, the trustee can also calculate using one or more computers the NAV per share by dividing the NAV of the trust by the number of the shares outstanding as of the close of trading. In embodiments, the number of shares outstanding as of the close of trading may be obtained from the NYSE Arca (which includes the net number of any Shares created or redeemed on such evaluation day).

Calculation Methodology:

NAV=ANAV−(Daily Expense)

NAV per Share=NAV÷(# of Shares outstanding)

The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Selection of Data Inputs for a Blended Digital Asset Price

The rules for the blended digital asset price can provide for the use in calculation of the data from the three largest exchanges (by volume) on the sponsor approved list.

In embodiments, this determination of the three exchanges for use can be done on a weekly basis, (e.g., on each Monday) based at least in part on the volume on each such exchange during the prior week. In embodiments, this determination could be done on a different periodic basis (e.g., on a daily basis or a monthly basis) or on a when needed basis (e.g., whenever some circumstances occurs requiring a change of determination).

In embodiments, so long as exchange selection is not on a daily basis, to the extent an exchange that has been selected for inclusion experiences a halt in trading for more than 24 consecutive hours (e.g., a lack of any recorded transactions during the prior 24 hours, regardless of the reason), that exchange can be replaced by the next largest exchange (by volume) on the sponsor approved list. In embodiments, this determination can be made automatically by one or more computers as part of an algorithm.

In embodiments, in the instance of a replacement, the restoration of daily volume on the halted exchange to a level more than the daily volume on the exchange that substituted for it could trigger a reversal of the substitution, if such restoration occurred prior to the next scheduled reconstitution of the included exchanges.

In embodiments, an exchange may be removed where there is a significant drop in trading on that exchange (e.g., 90% drop in trading volume) during a relevant time period (e.g., prior 24 hours, prior week, prior month, to name a few).

Figure 22:
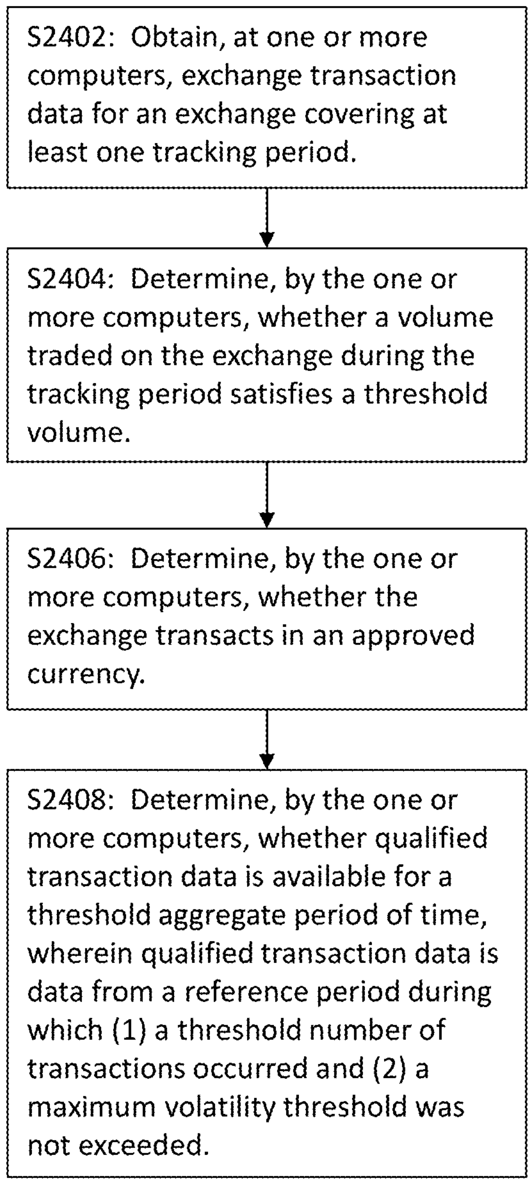
FIG. 22 is a flow chart of a process for determining qualified exchanges in accordance with exemplary embodiments of the present invention.

FIG. 22 illustrates an exemplary process for determining qualified or approved exchanges in accordance with the present invention. In embodiments, this process may be used to determine qualified money transmit businesses instead of exchanges and/or a combination thereof. The process may be programmed with computer code, which may be run on one or more processors. The process can utilize pre-defined criteria, rules, parameters, and/or thresholds to determine qualified exchanges. Such criteria can include transaction volume criteria, denomination types, geographic location, exchange data availability, exchange accessibility information (e.g., considerations of political or regulatory restrictions), regulatory compliance data, exchange customer data, and/or exchange owner data, to name a few. Thresholds can be expressed as absolute values and/or percentages.

In a step S2402, one or more computers may obtain exchange transaction data for an exchange, where the data covers at least one tracking period. The exchange data may be received via electronic transmission (e.g., over the Internet) and/or electronically accessed (e.g., using one or more APIs). The tracking period may be any period of time over which the exchange will be assessed for approval for use in the calculation of a blended digital asset price, such as 15 minutes, 1 hour, 12 hours, 24 hours, and/or 1 week, to name a few.

In a step S2404, the one or more computers may determine whether a volume traded on the exchange during the tracking period satisfies a threshold volume. In embodiments, a threshold volume may be 500 units of digital assets. In embodiments, a threshold volume may be expressed as a percent (e.g., a percent of the digital assets in circulation). The threshold may be modified periodically to help increase or decrease the number of qualified exchanges.

In a step S2406, the one or more computers may determine whether the exchange transacts in an approved currency. The computers may either test for an approved currency (e.g., by comparing to a database of approved currencies) or for an unapproved currency (e.g., by comparing to a database of unapproved currencies). In embodiments, only one currency may be approved, and the test for that currency may be hard-coded in exchange approval software. Currencies may be approved or unapproved based on considerations of reliability and/or stability, to name a few.

In a step S2408, the one or more computers may determine whether qualified transaction data is available for the exchange for a threshold aggregate period of time. Qualified transaction data may be data from a reference period during which a threshold number of transactions occurred (e.g., at least 3 transactions) and/or a maximum volatility threshold was not exceeded (e.g., the high and low price during the reference period did not fluctuate by more than 50% compared to the respective average high and low prices during that reference period of the other top (e.g., top 4) potential qualified exchanges by volume). In embodiments, transaction data may be evaluated from a plurality of reference periods to determine whether the data satisfies qualification criteria. In embodiments, transaction data to be qualified must satisfy qualification criteria for at least a specified period of time, which may be sub-divided into reference periods. For example, qualified transaction data may be determined for reference periods of 15 minutes, and to be a qualified exchange, the exchange must have qualified transaction data for an aggregate of at least 10 hours (40 reference periods) over a 24-hour tracking period. In embodiments, if an exchange satisfies each of the criteria examined in this exemplary process, it may be considered a qualified exchange for the tracking period over which it was examined. The determination of qualified exchanges may be performed at the end of each tracking period or on a rolling basis (e.g., re-evaluated at the end of each reference period).

Description of Electronic Data Pulled from Inputs

For each exchange on the approved list, the prior 24 hours of data setting forth each trade on the exchange by execution price and quantity transacted can be obtained, e.g., received and/or retrieved. Such transaction data may be obtained In embodiments, one or more digital asset prices, such as, e.g., auction price, closing price, traded value, bid price, ask price, and/or spot price, to name a few, may be obtained. In embodiments, only the highest and lowest exchange prices and their respective transaction volumes may be obtained. In embodiments, all exchange price and transaction data may be obtained. In embodiments, a shorter period of time than 24 hours may be used, e.g., 12 hours, 3 hours, to name a few, or a longer period of time such as 48 hours may be used, to insure a sufficient volume of transaction data is considered.

Application of Electronic Data

For each of the exchanges included in the calculation for any given evaluation day, an average price for such date can be used. In embodiments, using each average exchange price for such date, a blended and weighted average price for all exchanges can be extracted and used as the blended digital asset price.

In embodiments, the auction price and/or the blended price may be used as a benchmark for various financial products. As used herein, the term financial products includes, but is not limited to exchange traded notes, futures products (such as options), derivative products (such a puts and calls), other indices (such as volatility indices), swaps, currencies, fixed income products, bonds, securities and equities to name a few.

In embodiments, a blended digital asset price may be calculated by first calculating each selected exchange's daily average and then blending (e.g., averaging) the averages into a blended digital asset price. The daily average may be a time-weighted (e.g., exponential) moving mean and/or volume weighted mean. In other embodiments, a blended digital asset price may be calculated using the data from the selected exchanges (e.g., the top 3 qualified exchanges) without first determining single exchange averages.

Single Exchange Average

In embodiments, a single exchange averages may be used instead of a blended digital asset price. In other embodiments, single exchange averages may be combined into a blended digital asset price.

In embodiments, the single exchange average may be calculated by one or more computers using the unweighted mean average of the high and low trading prices for such day (the average price of each trade during the day—which could be subject to manipulation through outlier price trades).

In embodiments, the single exchange average may be calculated by one or more computers using the weighted mean average of the high and low trading prices for such day (e.g., the trading price for each share traded that day, rather than for each executed trade regardless of share size).

In embodiments, the single exchange average may be calculated by one or more computers using the median average of the high and low trading prices for such day.

In embodiments, the single exchange average may be calculated by one or more computers using the weighted median average of the high and low trading prices for such day.

In embodiments the single exchange average may be calculated by one or more computers using any of a median, weighted median, average, and/or weighted average (by volume, time, or otherwise), any of which may be taken of high and low trading prices for a time period (e.g., 1 day, 1 hour, 15 minutes, to name a few), of the second highest and second lowest trading prices for a time period, and/or of all trades during a time period. For example, all transaction price data for a time period may be weighted by the volume transacted at the prices and/or by time (e.g., linearly or exponentially) in order to give greater weight to the more recent price data. Coefficients or other factors may be used to adjust the weighting so as to dampen or exacerbate any price fluctuations. For example, in embodiments, a coefficient for exponential weighting may be 0.69. In other embodiments, such a coefficient may be approximately 0.5, approximately 0.6, approximately 0.7, approximately 0.8, approximately 0.9, to name a few. Accordingly, in embodiments, a coefficient of exponential weighting can fall with a range 0.5-0.9, within a range 0.6-0.8, or within a range 0.7-0.8, to name a few.

In embodiments, as discussed above, digital asset price may be determined via auction conducted either periodically or aperiodically.

Blended Digital Asset Price

In embodiments, the blended digital asset price can be calculated by the average of the single exchange averages. In embodiments, the average may be weighted by volume. An average may weight different exchanges differently in order to account for differences in ease of access of funds from an exchange and/or ease of transacting on the exchange. As described herein, a blended digital asset price may be calculated as part of providing a generated digital asset index.

In embodiments, a collar may be placed on a single exchange auction price as a benchmark. The collar may be based on a benchmark such as the spot price at a particular time, plus or minus a defined range, such as a percentage of the benchmark price. In embodiments, the collar could be set using percentages such as 1%, 2%, 3%, 5%, 10% of the benchmark price, to name a few. By way of illustration, the collar may be based on a 5% variation from a benchmark of 1 BTC=USD$10,000, such that the collar is between USD$9,500 and USD$10,500. The spot price may be based on the last transaction immediately prior to the auction. A spot price may be based on an average of the most recent bid/ask price for the digital asset. In embodiments, a collar may be set based on a blended digital asset price. For example, a single exchange digital asset price could be determined based on a volume weighted average and/or time weighted average of recent digital asset pricing. In embodiments, a blended digital asset price may be based on a pricing from digital assets taken from a plurality of exchanges. In embodiments, the collar price may be based on a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed.

For example, a collar may be placed on the auction price, by using fixed percentage (e.g., 1 percent, 5 percent, 10 percent) of an benchmark against the continuous book price at given time period or set of time period. In embodiments, the benchmark could be a midpoint of the spot price of the continuous book price at the given time period, (e.g., auction price), In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, the collar may be a blended digital asset price as discussed elsewhere herein.

In embodiments, if the final auction price falls outside the collar, the auction may fail.

Figure 23A:
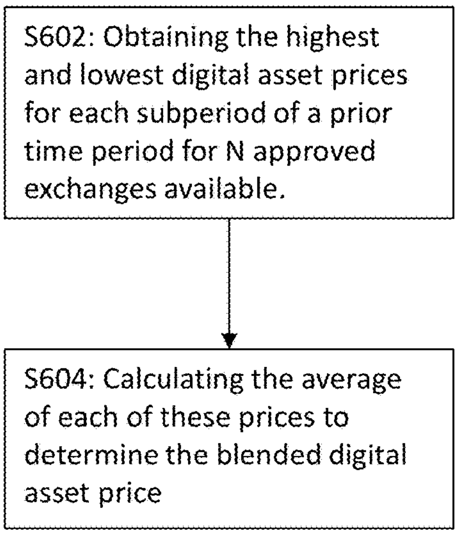
FIGS. 23A-23H are flow charts showing methods for calculating a blended digital asset price in accordance with exemplary embodiments of the present invention.

In embodiments, the blended digital asset price may be calculated as illustrated in FIG. 23A. In step S602, one or more computers may obtain the highest and lowest digital asset prices for each sub-period of a prior time period for N approved exchanges available. In embodiments, N may be the 3 largest approved exchanges. In step S604, each of these values may be averaged, using one or more computers, to determine a blended digital asset price for the prior sub-period. In embodiments, the blended digital asset price may be calculated for a 12-hour period or for a 24-hour period. In embodiments, the blended digital asset price may be calculated using a mean average transaction price weighted by volume.

Figure 23B:
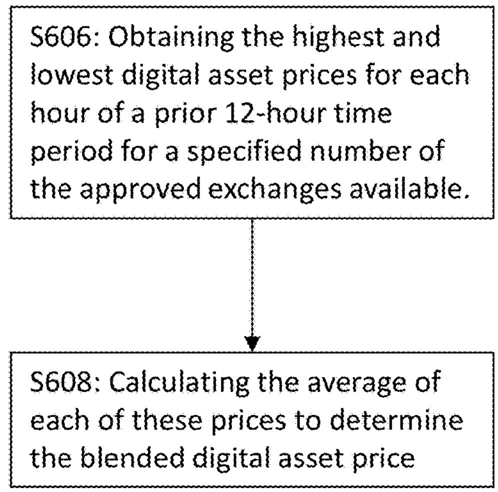

FIG. 23B illustrates a process for calculating the blended digital asset price using a 12-hour sub-period. In a step S606, one or more computers may obtain the highest and lowest digital asset prices for each hour of a prior 12-hour time period for a specified number N of the approved exchanges available. In a step S608, each of the values may be averaged, using one or more computers, to determine a blended digital asset price for the 12-hour period.

Figure 23C:
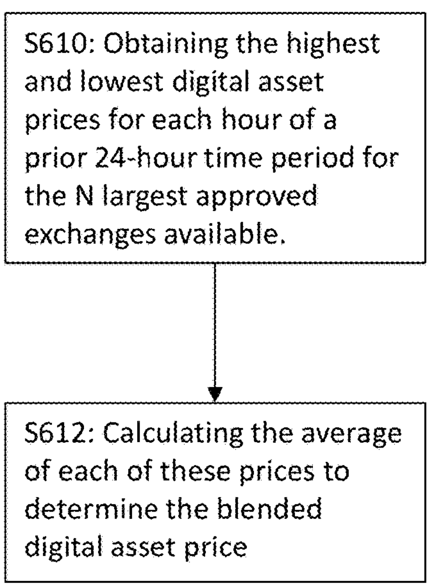

FIG. 23C illustrates a process for calculating the blended digital asset price using a 24-hour sub-period. In a step S610, one or more computers may obtain the highest and lowest digital asset prices for each hour of a prior 24-hour time period for a specified number N of the approved exchanges available. In a step S612, each of the values may be averaged, using one or more computers, to determine a blended digital asset price for the 24-hour period.

Figure 23D:
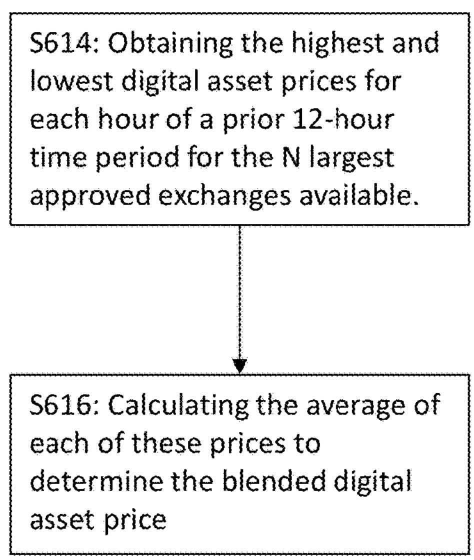

FIG. 23D illustrates a process for calculating the blended digital asset price using a 12-hour sub-period. In a step S614, one or more computers may obtain the highest and lowest digital asset prices for each hour of a prior 12-hour time period for the three largest of the approved exchanges available. In a step S616, each of the values may be averaged, using one or more computers, to determine a blended digital asset price for the 12-hour period.

Figure 23E:
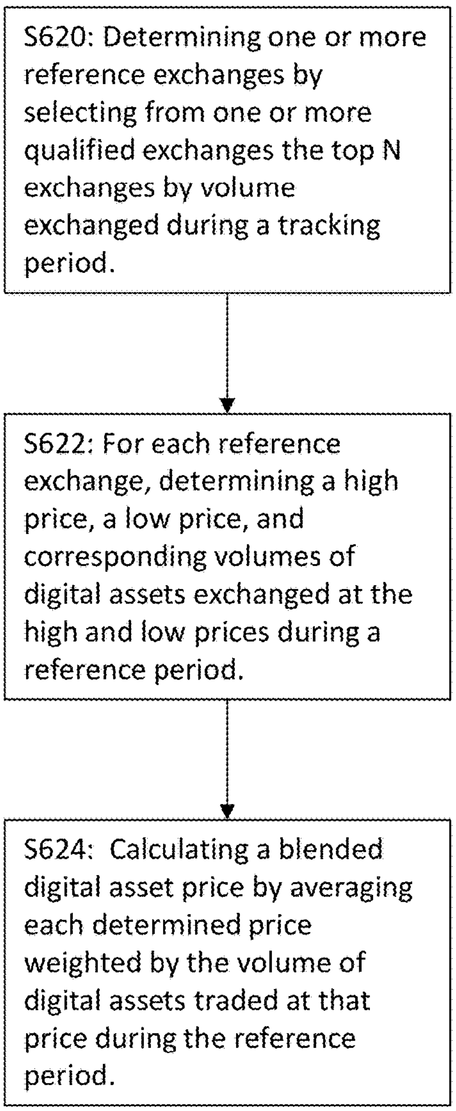

FIG. 23E illustrates another process for calculating a blended digital asset price. In a step S620, one or more computers may determine one or more reference exchanges. The reference exchanges may be the top N (e.g., 3) qualified exchanges by volume exchanged during a tracking period. A tracking period may be any period of time, such as 15 minutes, 30 minutes, 1 hour, 6 hours, or 12 hours, to name a few. Reference exchanges may be selected from a list of approved or qualified exchanges (e.g., approved by the sponsor). An exemplary process for approving exchanges to determine qualified exchanges is described herein with respect to FIG. 22. Reference exchanges may be determined each tracking period or may be determined over longer periods. For example, the reference exchanges may be determined at a fixed time each day. In a step S622, for each reference exchange, the one or more computers can determine highest and lowest exchange prices, as well as the corresponding volumes of digital assets exchanged at those high and low prices during a reference period. In embodiments, the reference period may be a different amount of time than the tracking period during which the reference exchanges are determined. In a step S624, one or more computers may calculate a blended digital asset price by averaging the high and low prices from each reference exchange, weighted by the respective volume of digital assets traded at each high and low price during the reference period.

Figure 23F:
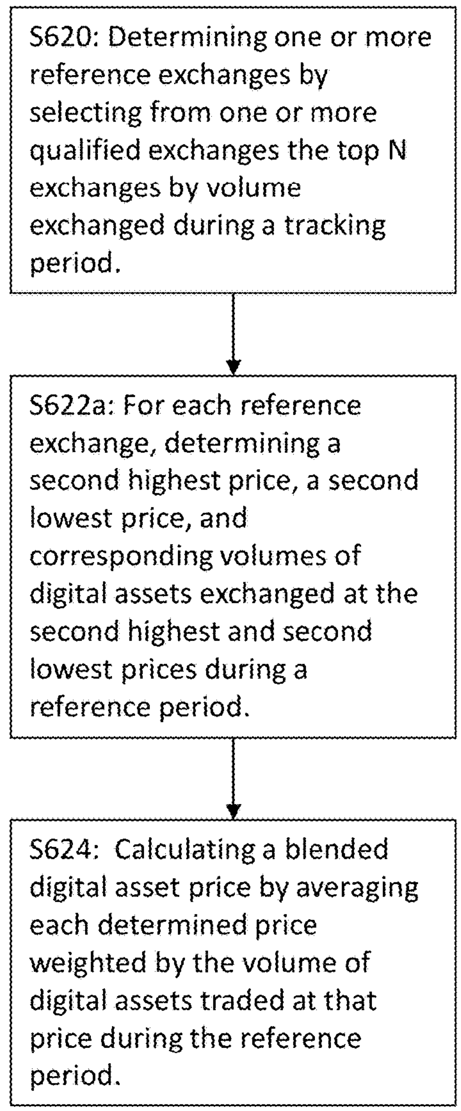

FIG. 23F illustrates another exemplary process for calculating a blended digital asset price. In a step S620, one or more reference exchanges may be determined, as described with respect to FIG. 23E. In a step S622*a*, for each reference exchange, the one or more computers can determine second highest and second lowest exchange prices, as well as the corresponding volumes of digital assets exchanged at those second highest and second lowest prices during a reference period. In a step S624, one or more computers may determine a weighted average of the determined second highest and second lowest prices from each reference exchange, where the weighted average is weighted by volume exchanged at each price, as discussed with respect to FIG. 23E.

Figure 23G:
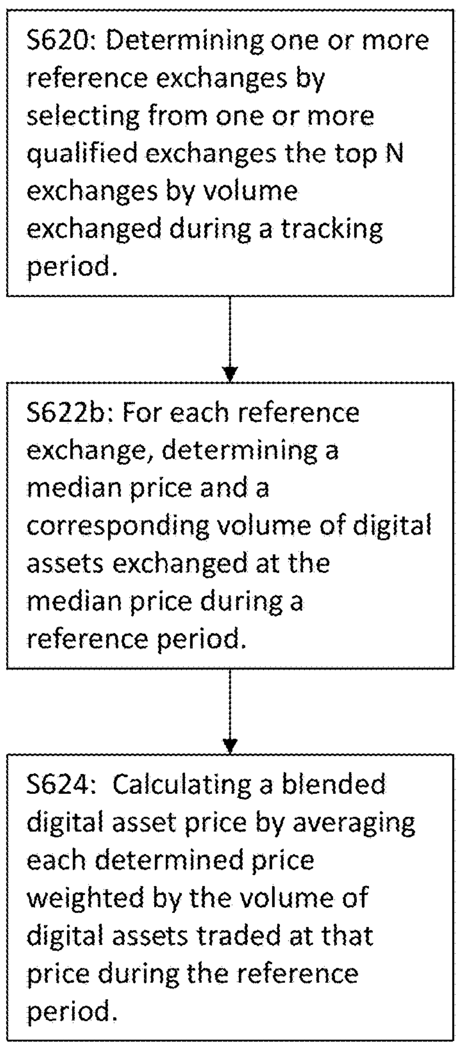

FIG. 23G illustrates another exemplary process for calculating a blended digital asset price. In a step S620, one or more reference exchanges may be determined, as described with respect to FIG. 23E. In a step S622*b*, for each reference exchange, the one or more computers can determine a median price and corresponding volumes of digital assets exchanged at that price during a reference period. In a step S624, one or more computers may determine a volume weighted average of the determined median prices from each reference exchange, as discussed with respect to FIG. 23E.

Figure 23H:
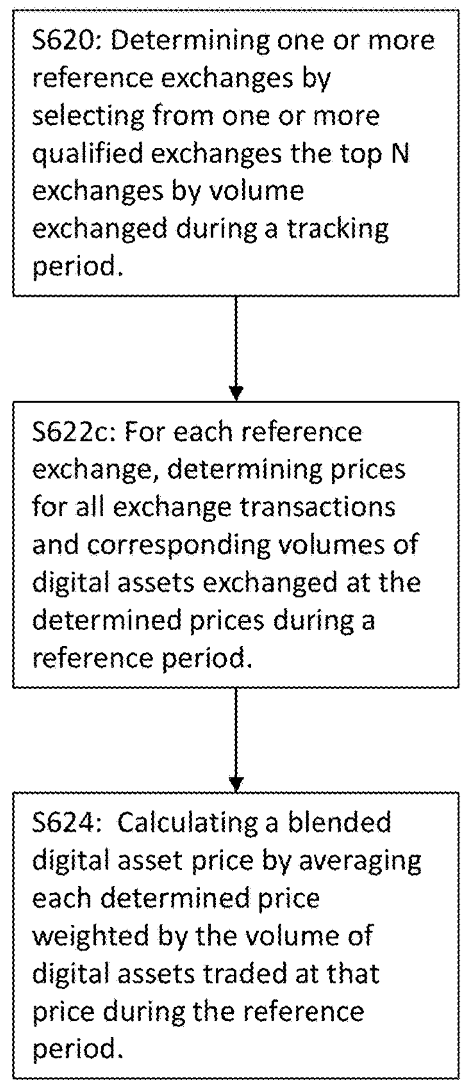

FIG. 23H illustrates another exemplary process for calculating a blended digital asset price. In a step S620, one or more reference exchanges may be determined, as described with respect to FIG. 23E. In a step S622*c*, for each reference exchange, the one or more computers can determine prices for all exchange transactions and corresponding volumes of digital assets exchanged at those prices during a reference period. In a step S624, one or more computers may determine a volume weighted average of the determined exchange prices from the one or more reference exchanges, as discussed with respect to FIG. 23E. In embodiments, the digital asset prices from each reference period may be weighted by time, e.g., so as to preference more recent reference periods. Such weighting may be exponential weighting, such as an exponentially time-weighted moving average. Other moving averages may be employed, with or without weighting, such as a simple moving average, a cumulative moving average, a weighted moving average, and/or a volume weighted moving average, to name a few. Transaction data may be weighted by both volume and time, for example, by applying a volume weighted average as well as an exponential time-weighted moving average. Accordingly, an exponential volume-weighted moving average may be employed, applying an exponential weighting to transaction volumes over shifting period of time (e.g., a trailing 2-hour window).

Figure 24:
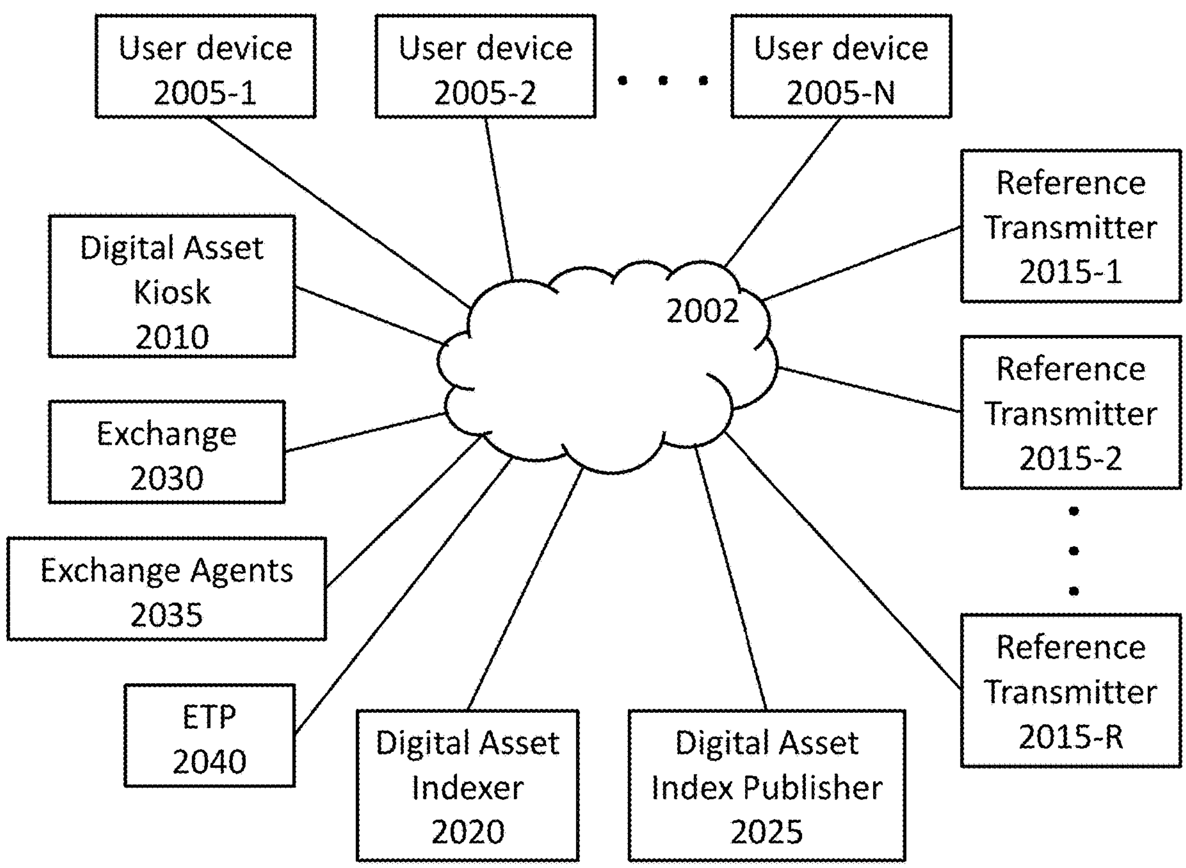
FIG. 24 is a schematic diagram of participants in a system for providing a digital asset index and a digital asset exchange in accordance with exemplary embodiments of the present invention.

FIG. 24 illustrates an exemplary system for providing a digital asset index in accordance with the present invention. A digital asset index system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025 (e.g., Winkdex, Bloomberg, Google, Yahoo, to name a few), one or more exchanges 2030, one or more exchange agents 2035, and/or an exchange traded product computer system 2040, to name a few. Any of the components involved in a digital asset index system may be connected directly (e.g., through wired or wireless connections) or indirectly, such as through a data network 2002. Any of the components of a digital asset index system can comprise or include a computer system comprising one or more computers. Accordingly, any of the components may have at least one or more processors, computer-readable memory, and communications portals for communicating with other components of the system and/or outside entities.

Still referring to FIG. 24, a user device 2005 may be a mobile phone, smart phone, PDA, computer, tablet computer, and/or other electronic device that can receive communications. A user device 2005 may run software, such as a digital wallet, for accessing a digital asset index or may access a digital asset index through a general Internet browser. A digital asset kiosk 2010 may also access a published digital asset index, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An application programming interface ("API") may be used to provide access to a digital asset index from one or more third-party devices or computer systems. An embeddable widget may be provided to enable display on a third-party website of digital asset index data and/or index visualizations (e.g., graphs, charts, and/or accompanying visualization options, such as time range).

Still referring to FIG. 24, data from one or more reference transmitters 2015 may be used to generate an index, as discussed herein. Transmitters may be money service businesses or money transmit businesses in the United States. Transmitters 2015 may be part of a digital asset exchange 2030. Exchanges 2030 outside the United States may function like transmitters, e.g., performing all or part of the roles ascribed herein to transmitters 2015, but without the same money transmit licenses as required in the United States.

Figure 25A:
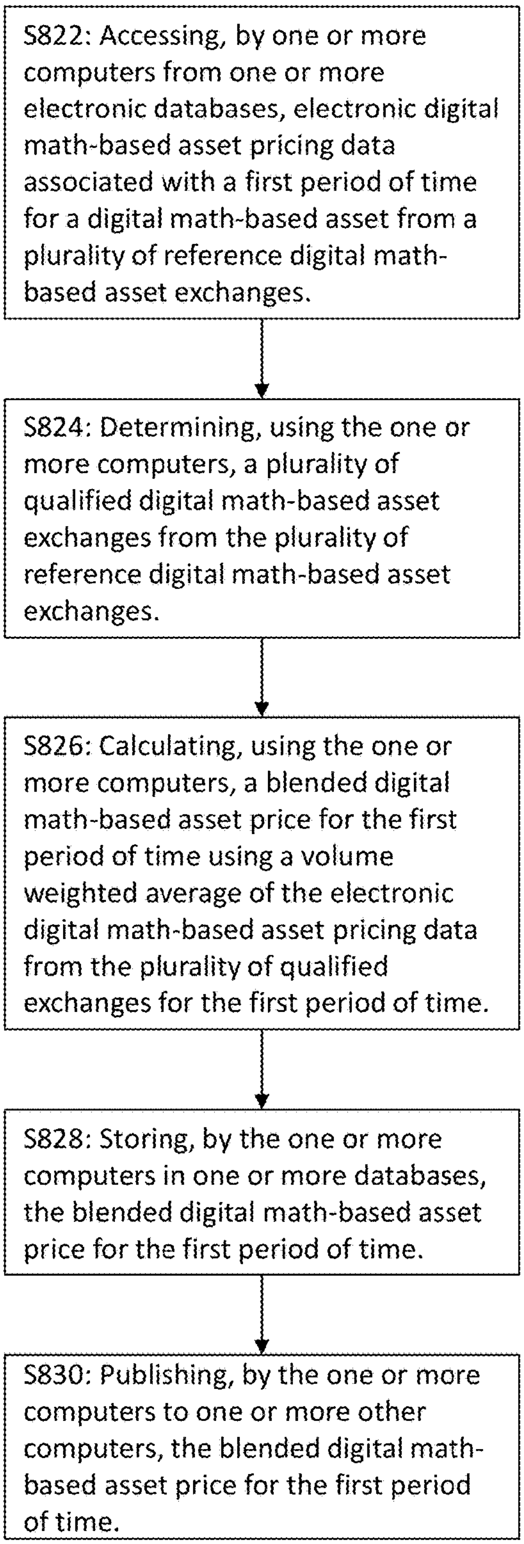
FIGS. 25A and 25B are flow charts of a method for creating an index of digital asset prices in accordance with exemplary embodiments of the present invention.

FIG. 25A is another flow chart of an exemplary process for providing a blended digital math-based asset price in accordance with the present invention.

In a step S822, one or more computers may access from one or more electronic databases stored on computer-readable memory, electronic digital math-based asset pricing data associated with a first period of time for a digital math-based asset from a plurality of reference digital math-based asset exchanges (e.g., four exchanges). In embodiments, the electronic pricing data can include transaction prices and/or bid and ask prices, to name a few. In embodiments, the one or more computers may access transaction data, including transaction volume data.

In a step S824, the one or more computers may determine a plurality of qualified digital math-based asset exchanges (e.g., three exchanges) from the plurality of reference digital math-based asset exchanges. In embodiments, the plurality of qualified exchanges may be determined by evaluating, by the one or more computers, electronic exchange selection criteria, which may comprise one or more electronic exchange selection rules.

In a step S826, a blended digital math-based asset price for the first period of time may be calculated, using the one or more computers, using a volume weighted average of the electronic digital math-based asset pricing data from the plurality of qualified exchanges for the first period of time.

In a step S828, the one or more computers may store in one or more databases the blended digital math-based asset price for the first period of time. In embodiments, the databases may be remotely located, e.g., in a cloud computing architecture. In embodiments, the databases may store one or more other blended digital math-based asset prices corresponding to one or more other periods of time.

In a step S830, the one or more computers may publish to one or more other computers the blended digital math-based asset price for the first period of time. As described herein, publishing can comprise transmitting the price to one or more computer, transmitting the price to one or more user electronic device (e.g., a mobile phone), providing the price to an electronic display (e.g., a scrolling display), and/or providing the price to a website, to name a few. In embodiments, the price may be published from the database of blended digital math-based asset prices. In other embodiments, the price may be published by the calculating computer directly, e.g., from working memory.

Figure 25B:
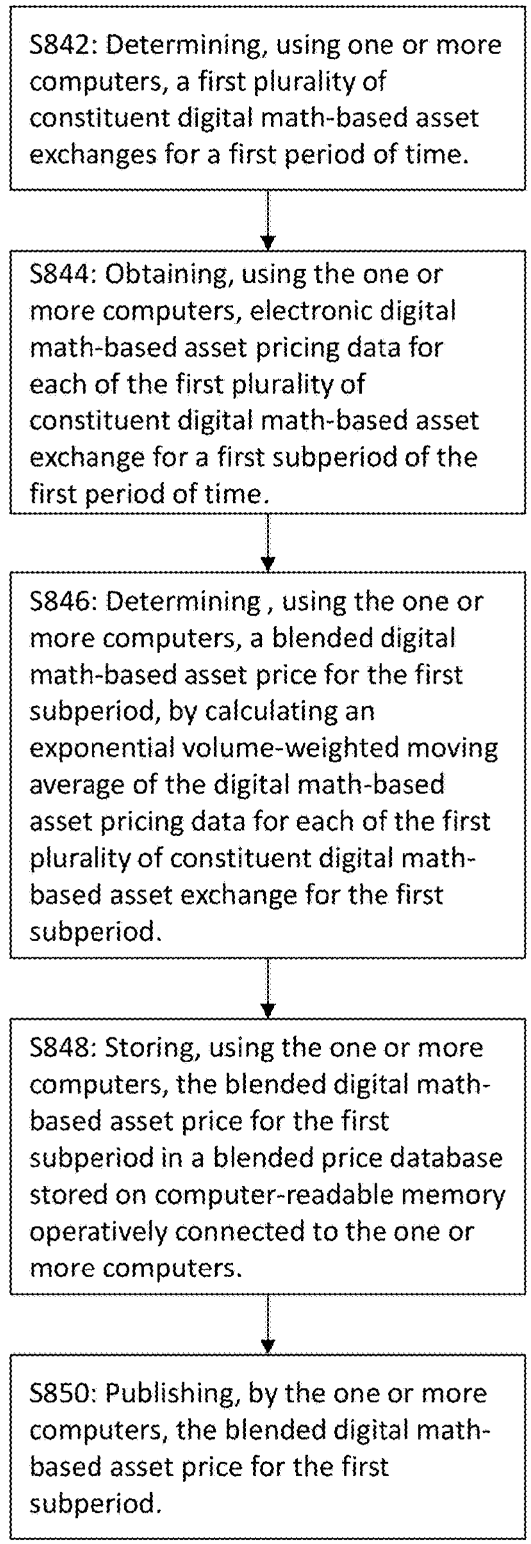

FIG. 25B is a flow chart of another exemplary process for electronically generating an index of digital asset prices.

In a step S842, a first plurality of constituent digital math-based asset exchanges may be determined, using the one or more computers, for a first period of time (e.g., a 24-hour period). In embodiments, electronic digital math-based asset pricing data and associated volume data may be obtained, at the one or more computers, for a first tracking period for each of a plurality of reference digital math-based asset exchanges. In embodiments, the total volume of transactions made on the respective exchange during the tracking period may be calculated, by the one or more computers, for each of the plurality of reference digital math-based asset exchanges. In embodiments, a first plurality of constituent digital math-based asset exchanges may be determined, by the one or more computers, by ranking the plurality of reference digital math-based asset exchanges by total volume for the tracking period and selecting a second plurality of the reference digital math-based asset exchanges (e.g., three) according to the largest total volumes, wherein the second plurality is less than the first plurality.

In embodiments, the process for determining the first plurality of constituent digital math-based asset exchanges can further comprise determining, by the one or more computers, for each of the plurality of reference digital math-based asset exchanges whether the total volume of transactions made on the respective exchange during the tracking period satisfies a threshold volume: determining, by the one or more computers, whether the digital math-based asset exchange transacts in an approved currency; and determining, by the one or more computers, for each of the plurality of reference digital math-based asset exchanges whether qualified transaction data is available from the respective digital math-based asset exchange for a threshold aggregate period of time, wherein qualified transaction data is data from a calculation period during which (1) a threshold number of transactions occurred and (2) a maximum volatility threshold was not exceeded, and wherein a calculation period is a subperiod of the tracking period.

In a step S844, electronic digital math-based asset pricing data may be obtained, using the one or more computers, for each of the first plurality of constituent digital math-based asset exchange for a first subperiod of the first period of time (e.g., a 2-hour period within the first period of time). In embodiments, electronic digital math-based asset pricing data (e.g., transaction prices, bid and ask prices, transaction volume data, to name a few) may be obtained, using the one or more computers, for each of the first plurality of constituent digital math-based asset exchange for a second subperiod of the first period of time.

In a step S846, a blended digital math-based asset price may be determined, using the one or more computers, for the first subperiod, by calculating an exponential volume-weighted moving average of the digital math-based asset pricing data for each of the first plurality of constituent digital math-based asset exchange for the first subperiod. In embodiments, a blended digital math-based asset price may be determined, using the one or more computers, for the second subperiod, by calculating an exponential volume-weighted moving average of the digital math-based asset pricing data for each of the first plurality of constituent digital math-based asset exchange for the second subperiod. In embodiments, the exponential moving average utilizes a coefficient between 0.6 and 0.8.

In a step S848, the blended digital math-based asset price may be stored, using the one or more computers, for the first subperiod in a blended price database stored on computer-readable memory operatively connected to the one or more computers. In embodiments, the blended digital math-based asset price may be stored, using the one or more computers, for the second subperiod in the blended price database. In embodiments, the blended price database may comprise at least blended digital math-based asset prices at a specified interval, e.g., prices every 15 seconds, every minute, and/or once per day, such as at a specified time each day, to name a few. Accordingly, prices at the intervals may be interpolated from the blended digital asset prices closest in time.

In a step S850, blended digital math-based asset price for the first subperiod may be published, by the one or more computers. In embodiments, blended digital math-based asset prices may be published, by the one or more computers, for a plurality of consecutive subperiods during the first period of time. In embodiments, the blended digital math-based asset price for the first subperiod or for the plurality of consecutive subperiods may be published from the blended price database. In embodiments, the blended digital math-based asset price may be published to one or more user devices. In embodiments, the blended digital math-based asset price may be electronically published through a dedicated website and/or through one or more electronic access points. The blended digital asset price can be published, using one or more computers, on the trust's website and distributed to APs. The blended digital asset price may form the basis of a digital asset index, as discussed herein. In embodiments, no intraday blended digital asset price may be required to be published throughout the day.

Still referring to step S850, a graphical representation of blended digital math-based asset prices may be generated, by the one or more computers. The graphical representation may include the blended digital math-based asset prices for the plurality of consecutive subperiods during the second period of time. The graphical representation may be provided from the one or more computers to the one or more second computers. In embodiments, the graphical representation includes a graphical representation of the digital math-based asset pricing data for each of the first plurality of constituent digital math-based asset exchanges for the plurality of consecutive subperiods during the second period of time. In embodiments, the graphical representation further includes a second graphical representation of volume data for each of the first plurality of constituent digital math-based asset exchanges for the plurality of consecutive subperiods during the second period of time.

In still other embodiments, an API for accessing the blended digital math-based asset price may be provided, by the one or more computers to one or more third computers. An electronic API request to access a blended digital math-based asset price for a subperiod may be received, by the one or more computers from the one or more third computers, and the blended digital math-based asset price for the first subperiod may be provided by the one or more computers to the one or more third computers.

In embodiments, generating a blended digital asset price and/or a blended digital asset price index can comprise accessing transaction data from a plurality of exchanges, as described herein. Such processes can include data normalization, which can convert data to a consistent and/or uniform format. For example, digital asset price data from one exchange may be provided in units of bitcoin, while price data from another exchange may be provided in units of milli-bitcoin, and data from another exchange may be provided in satoshis. Upon accessing the data from the different exchanges, the data may be converted to a common format, such as milli-bitcoin. In embodiments, time data may also be converted to a common format, e.g., 24-hour time, and/or a common time zone, e.g., GMT.

In an exemplary embodiment, a blended digital asset price may be calculated by blending the trading prices in U.S. dollars for the top three (by volume) qualified exchanges during the previous two-hour period using a volume-weighted exponential moving average. Constituent exchanges of the index can be selected according to rules, such as requiring that the exchanges have electronic trading platforms on which users may buy or sell digital assets with other users in exchange for U.S. dollars. The value of the index (including a daily spot price) can be determined using exchange transaction data on a moving average basis over a trailing two-hour period. The computer code used to generate the index may weight exchange transactions by volume on a proportional basis. In order to reflect the latest in pricing information, the most recent transactions may be weighted exponentially greater than earlier transactions in the two-hour period.

Example of ETP Process

Without meaning to limit the scope of the present invention, the following examples illustrate exemplary embodiments in accordance with the present invention and set forth the basic operation of the trust on a day-to-day basis by reflecting exemplary creations, redemptions, payments of the sponsor's fee, netting of transfers, trustee instructions and actions, and the creation and activation of cold storage digital wallets from the cold storage vault security system.

Each of these examples assume the following facts:

There are two authorized participants (AP1 and AP2).

The Trust is comprised of 5,000,000 outstanding shares, represented by underlying assets totaling 999,370.51327457 bitcoin. Assuming a blended bitcoin price of $200.00, the trust NAV is $199,728,984.50 as of the open of business on Day 1. For the purpose of this example, the blended bitcoin price does not change.

Each creation unit is represented by 9,986.44922498 bitcoin. While the trust will be formed at 10,000 bitcoin per 50,000 share creation units on the purchase of the seed baskets, the operation of the trust and accumulation of accrued expenses will reduce the bitcoin per creation unit rate over time.

Of the 10,000 cold storage digital wallets generated by the trustee in the formation of the trust, the following is a breakdown of their use status:

1,000 wallets are in use in cold storage, with 999 wallets holding 1,000 bitcoin and one partially filled wallet holding 370.51327457 bitcoin;

422 cold storage wallets have expired due to use for spot checking or activation by recall of paper tokens; and 8579 wallets remain inactive in cold storage.

The partially filled cold storage digital wallets has index number 02814 and holds 370.51327457 bitcoin.

The sponsor's fee is 1.00% per annum.

In the exemplary embodiments described in the following examples, the trust operates by rounding only to the nearest Satoshi, which is one hundred-millionth of a bitcoin. As a result, transactions in bitcoin will be reflected to eight decimal places. To assist in the orderly netting and administration of the administrative portal and the cold storage security system, a three business day settlement period is used. The sponsor's fee represents the trust's only expected regular charge. These examples do not include extraordinary expenses, meaning that the sponsor's fee will be the only expense accruing on a daily basis. This will be reflected in the reduction of the bitcoin represented by a creation unit on each of the three days of the example.

Example 1

In Example 1, the following particular facts are assumed: AP1 places a creation order for three creation unit. AP2 places a redemption order for one creation unit. No Sponsor's Fee or extraordinary expenses payable on settlement date. The trust composition is: 5,000,000 outstanding Shares, representing 999,370.51327457 bitcoin. bitcoin per creation unit: 9,986.44922498. Amount of bitcoin in only partially-filled cold storage digital wallets (Index Number 02814): 370.51327457.

On day T, AP1 and AP2 place their orders for three creation units and one redemption, respectively. Trustee accepts the creation and redemption orders and confirms such receipt to AP1 and AP2.

On day T+1, trustee calculates expected netting to be 1 creation unit (i.e., 3 creation units created less 1 creation unit redeemed; no expected Sponsor's Fee or extraordinary expense payments). Trustee determines that no paper tokens need to be retrieved for withdrawals or distributions of bitcoin on the settlement date. The trustee determines and identifies 20 cold storage digital wallets from the Index Number-Public Key list for deposit activation for settlement date creations.

On day T+2, AP1 submits a creation wallet address supplement identifying the public key from which AP1 can deposit its creation deposit of 29,959.34767494 bitcoin. Using the administrative portal, trustee generates a wallet for the AP1 custody account and provides such wallet's public key to AP1 to receive the creation deposit. AP2 submits a redemption wallet address supplement identifying the public key to which AP2 can receive its redemption proceeds of 9,986.44922498 bitcoin. Using the administrative portal, trustee generates a wallet for the AP2 custody account and provides such wallet's public key to AP2 as the account distributing bitcoin. AP1 delivers 29,959.34767494 bitcoin to the public key identified for its AP1 custody account. Trustee acknowledges receipt of such creation deposit. AP2 delivers 50,000 shares to the trust through the third-party clearing agency (e.g., DTC) clearance process. Trustee acknowledges receipt of such share tender.

On day T+3 (Settlement Date), for netting purposes and using the administrative portal, trustee generates a wallet for the trust custody account and transfers 9,986.44922498 bitcoin from the AP1 custody account to such wallet in the trust custody account. Using the administrative portal, the trustee transfers 9,986.44922498 bitcoin from a trust custody account to the newly created wallet in the AP2 custody account; transfers such bitcoin from the AP2 custody account to wallet associated with the Public Key identified by AP2 as its outside account; and instructs the third-party clearing agency (e.g., the DTC) to cancel the 50,000 shares tendered by AP2, in settlement of the redemption. Using the administrative portal, trustee transfers 629.48672543 bitcoin from the AP1 custody account to partially-filled cold storage digital wallets (Index Number 02814) in cold storage; transfers 1,000 bitcoin each from AP1 custody account to 19 additional newly-activated cold storage digital wallets in cold storage; transfers 343.41172453 bitcoin from AP1 custody account to the newly activated cold storage digital wallets (Index Number 08649) in cold storage; and instructs the third-party clearing agency (e.g., the DTC) to transfer 150,000 newly issued shares to AP1 and to cancel the 50,000 shares tendered by AP2, in settlement of the creation.

At the end of this process, there is a net gain of 100,000 shares (2 creation units) issued and 19,972.89844996 bitcoin deposited into the trust; 20 cold storage digital wallets activated, no cold storage digital wallets expired. All temporary wallets are discarded after use. Amount of bitcoin in only partially-filled cold storage digital wallets (Index Number 08649): 343.41172453.

Example 2

Example 2 is treated as the next business day after settlement of Example 1. In Example 2, the following additional particular facts are assumed: AP1 places a creation order for two creation units. AP2 places a redemption order for two creation units. Sponsor's Fee of 837.22012681 bitcoin is due. The trustee can have calculated the sponsor's fee and the sponsor can have confirmed this calculation and provided a Public Key for its outside account prior to Day T. No extraordinary expenses are due payable on settlement date. The trust composition is: 5,100,000 outstanding shares, representing 1,019,343.41172453 bitcoin. The bitcoin per creation unit is: 9,985.35481959 (reduced because of four days of accrued but unpaid Sponsor's Fee). Amount of bitcoin in only partially-filled cold storage digital wallet (Index Number 08649): 343.41172453.

On day T, AP1 and AP2 place their orders for two creation units and two redemption units, respectively. Trustee accepts the creation and redemption orders and confirms such receipt to AP1 and AP2.

On day T+1, trustee calculates expected netting of 19,970.70963918 (i.e., 2 creation units created less 2 creation units redeemed less expected sponsor's fee, with no expected extraordinary expense payments). Trustee determines that one public key must be retrieved through paper tokens for sponsor's fee distributions on the settlement date and requests that the custodian deliver the paper token for the selected Index Number (cold storage digital wallet 00185) from sets A1, A2 and A3. The Trustee determines that only partially-filled cold storage digital wallet Index Number 08649 can be required for deposit activation for remainder bitcoin from the sponsor's fee distribution.

On day T+2, AP1 submits a creation wallet address supplement identifying the public key from which it can deposit its creation deposit of 19,970.70963917 bitcoin. Using the administrative portal, trustee generates a wallet for the AP1 custody account and provides such wallet's public key to AP1 to receive the creation deposit. AP2 submits a redemption wallet address supplement identifying the public key to which it can received its redemption proceeds of 19,970.70963917 bitcoin. Using the administrative portal, trustee generates a wallet for the AP2 custody account and provides such wallet's public key to AP2 as the account distributing bitcoin. Custodian delivers to trustee (or trustee collects from custodian's premises) the paper tokens for the selected Index Number (cold storage digital wallet 00185) from sets A 1, A2 and A3. Trustee scans the QR codes, decrypts and reassembles the Private key and decrypts the public key for cold storage digital wallet 00185. AP1 delivers 19,970.70963917 bitcoin to the public key identified for its AP1 custody account. Trustee acknowledges receipt of such creation deposit. AP2 delivers 50,000 shares to the trust through the third-party clearing agency 250 (e.g., the DTC) clearance process. Trustee acknowledges receipt of such share tender.

On day T+3, settlement occurs. For netting purposes and using the administrative portal, Trustee generates a Wallet for the trust custody account and transfers 19,970.70963917 bitcoin from the AP1 Custody Account to such Wallet in the trust custody account. Using the administrative portal, the trustee transfers 19,970.70963917 bitcoin from the trust custody account to the newly created wallet in the AP2 custody account; transfers such bitcoin from the AP2 custody account to wallet associated with the public key identified by AP2 as its outside account; and instructs the third-party clearing agency (e.g., the DTC) to transfer 100,000 newly issued shares to API, in settlement of the creation, and to cancel the 100,000 shares tendered by AP2, in settlement of the redemption. Using the administrative portal, trustee generates a wallet in the sponsor custody account and transfers 837.22012681 bitcoin from Index Number cold storage digital wallets 00185 to the newly created sponsor custody account wallet. Trustee also transfers such bitcoin from the sponsor custody account to the public key identified by sponsor as its outside account; and transfers 162.77987319 bitcoin from Index Number cold storage digital wallet 00185 to the partially filled index number cold storage digital wallet 08649 in cold storage.

At the end of this process, there is no net change of shares issued. bitcoin deposited with the Trust is reduced by 837.22012681. No new cold storage digital wallets activated by deposit; one cold storage digital wallets expired after recall from cold storage and use. All temporary wallets discarded after use. Amount of bitcoin in only partially-filled cold storage digital wallet (Index Number 08649): 506.19159772.

Example 3

Example 3 is treated as the next business day after settlement of Example 2. In Example 3, the following additional particular facts are assumed: AP2 places a redemption order for four creation units. AP1 does not place any order. No Sponsor's Fee or extraordinary expenses payable on settlement date. The trust composition is: 5,100,000 outstanding shares, representing 1,018,506.19159772 bitcoin. bitcoin per creation unit is: 9,985.08121824 (reduced because of four days of accrued but unpaid Sponsor's Fee). Amount of bitcoin in only partially-filled cold storage digital wallet (index Number 08649): 506.19159772.

On day T, AP2 place its redemption order for four creation units. Trustee accepts the redemption order and confirms such receipt to AP2.

On day T+1, trustee calculates expected netting (none). Trustee determines that 40 public keys need to be retrieved through paper tokens for redemption distributions on the settlement date and requests that the custodian deliver the paper tokens for the selected Index Numbers from sets A1, A2 and A3. The trustee determines that only partially-filled cold storage digital wallets Index Number 08649 can be required for deposit activation for remainder bitcoin from the redemption proceeds withdrawal.

On day T+2, AP submits "redemption wallet address supplement" identifying the public key to which it can received its redemption proceeds of 39,940.32487295 bitcoin. Using the administrative portal, trustee generates a wallet for the AP2 custody account and provides such wallet's public key to AP2 as the account distributing bitcoin. Custodian delivers to trustee (or trustee collects from custodian's premises) the paper tokens for the selected 40 cold storage digital wallets by Index Number from Sets A1, A2 and A3. Trustee scans the QR codes, decrypts and reassembles the Private Keys and decrypts the Public Keys for the 40 cold storage digital wallets by Index Number. AP2 delivers 200,000 shares to the Trust through the third-party clearing agency (e.g., the DTC) clearance process. Trustee acknowledges receipt of such share tender.

On day T+3 (Settlement Date), using the administrative portal, the trustee transfers 1,000 bitcoin from each of 39 of the cold storage digital wallets pulled from cold storage to the newly created wallet in the AP2 custody account, totaling 39,000 bitcoin; transfers 940.32487295 bitcoin from the remaining cold storage digital wallet pulled from cold storage to the newly created wallet in the AP2 custody account; transfers 59.67512705 bitcoin from the remaining cold storage digital wallet to partially-filled cold storage digital wallet (Index Number 08649); transfers the total of 39,940.32487295 such bitcoin from the wallet in AP2 custody account to the public key identified by AP2 as its outside account; and instructs the third-party clearing agency (e.g., the DTC) to cancel the 200,000 shares tendered by AP2, in settlement of the redemption.

At the end of this process, there is a reduction of 20,000 shares issued by the trust and a reduction of 39,940.32487295 bitcoin deposited with the trust. No new cold storage digital wallets activated by deposit; forty cold storage digital wallets expired after recall from cold storage and use. All temporary wallets discarded after use. Amount of bitcoin in only partially-filled cold storage digital wallet (Index Number 08649): 565.86672477.

Digital Asset Transaction Kiosk

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

Figure 37:
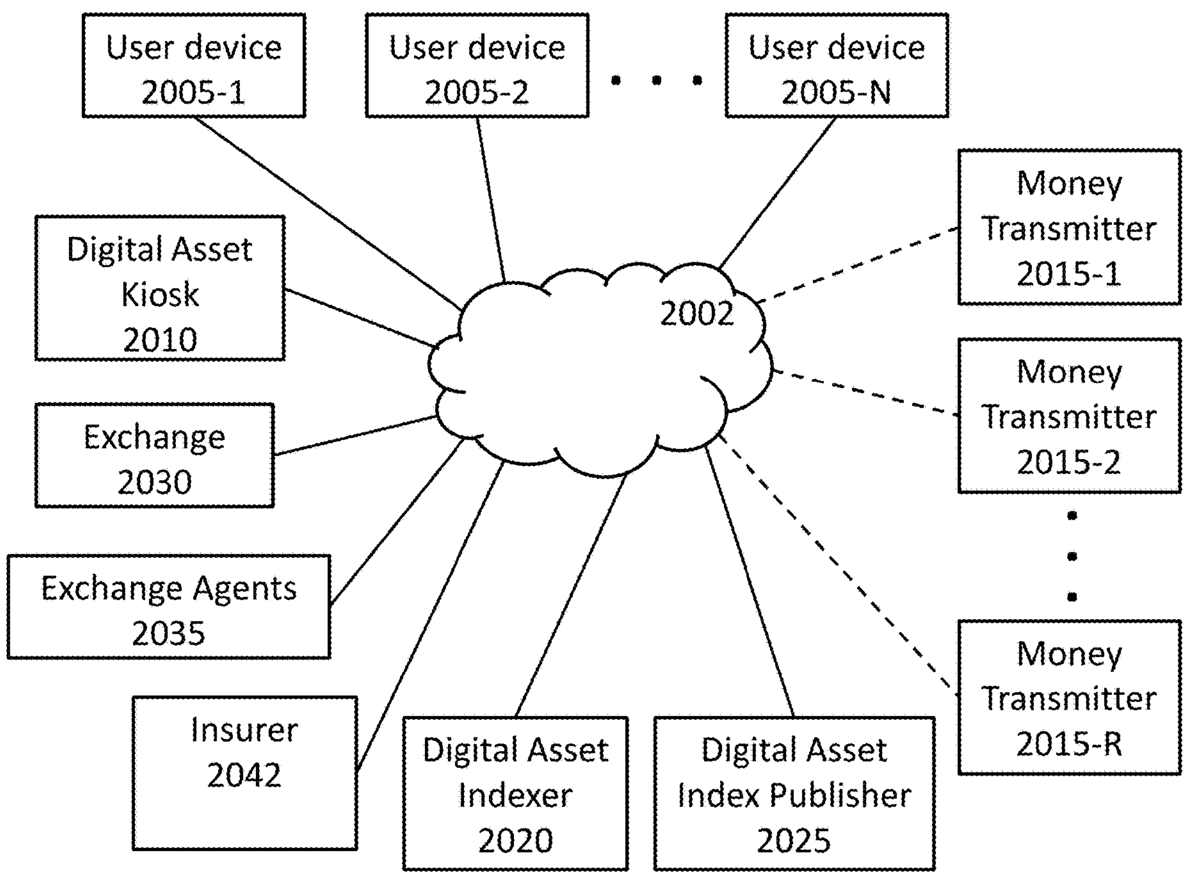
FIG. 37 is a schematic diagram of participants in a system including a digital asset kiosk and a digital asset exchange in accordance with exemplary embodiments of the present invention.

FIG. 37 illustrates an exemplary system including a digital asset kiosk for accessing a digital asset exchange in accordance with embodiments of the present invention. A digital asset kiosk system may include one or more user devices 2005 (e.g., 2005-1 to 2005-N), one or more digital asset kiosks 2010, one or more reference money transmitters 2015 (e.g., 2015-1 to 2015-R), a digital asset indexer 2020, a digital asset index publisher 2025, one or more exchanges 2030, one or more exchange agents 2035, and/or one or more insurers 2042, to name a few. Any of the components involved in a digital asset kiosk system may be connected directly (e.g., through wired or wireless connections) or indirectly, such as through a data network 2002. Any of the components of a digital asset kiosk system can comprise or include a computer system comprising one or more computers. Accordingly, any of the components may have at least one or more processors, computer-readable memory, and communications portals for communicating with other components of the system and/or outside entities.

Still referring to FIG. 37, a user device 2005 may be a mobile phone, smart phone, PDA, computer, tablet computer, and/or other electronic device that can receive communications. A user device 2005 may run software, such as a digital wallet, for accessing a digital asset exchange or may access a digital asset exchange through a general Internet browser. A digital asset kiosk 2010 may also access a digital asset exchange, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2020 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An API may be used to provide access to a digital asset exchange from one or more third-party devices or computer systems. An embeddable widget may be provided to enable display on a third-party website of digital asset exchange data and/or exchange data visualizations (e.g., graphs, charts, and/or accompanying visualization options, such as time range).

One or more insurers 2042 may provide insurance for flat accounts, such as fiat exchange accounts. In embodiments, flat exchange accounts may be held at an exchange partner bank. Such accounts may be insured by the Federal Deposit Insurance Corporation (FDIC). In embodiments, insurers 2042 may be private insurance companies. Insurers 2042 may also provide digital asset insurance, which may cover private key loss and/or theft and/or digital asset losses or thefts.

Still referring to FIG. 37, data from one or more money transmitters 2015 may be used to authorize users for access to an exchange, such as by performing anti-money laundering compliance processes, as described herein. Transmitters may be money service businesses or money transmit businesses in the United States. Money transmitters 2015 may be part of a digital asset exchange 2030. In embodiments, exchanges 2030 that are located outside the United States may function like transmitters, e.g., performing all or part of the roles ascribed herein to transmitters 2015, but without the same money transmit licenses as required in the United States.

Figure 38A:
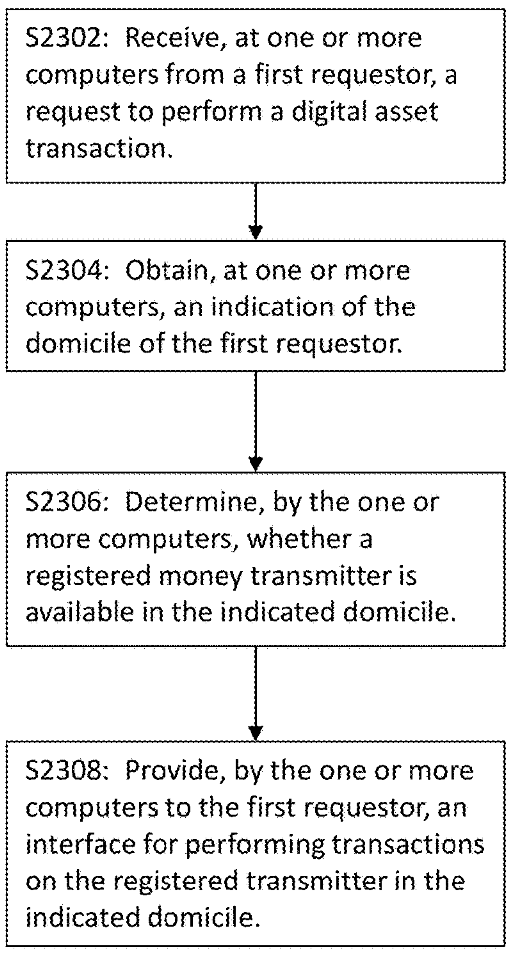
FIGS. 38A-B are flow charts of processes for determining a money transmit business to process transactions in accordance with exemplary embodiments of the present invention.
Figure 38B:
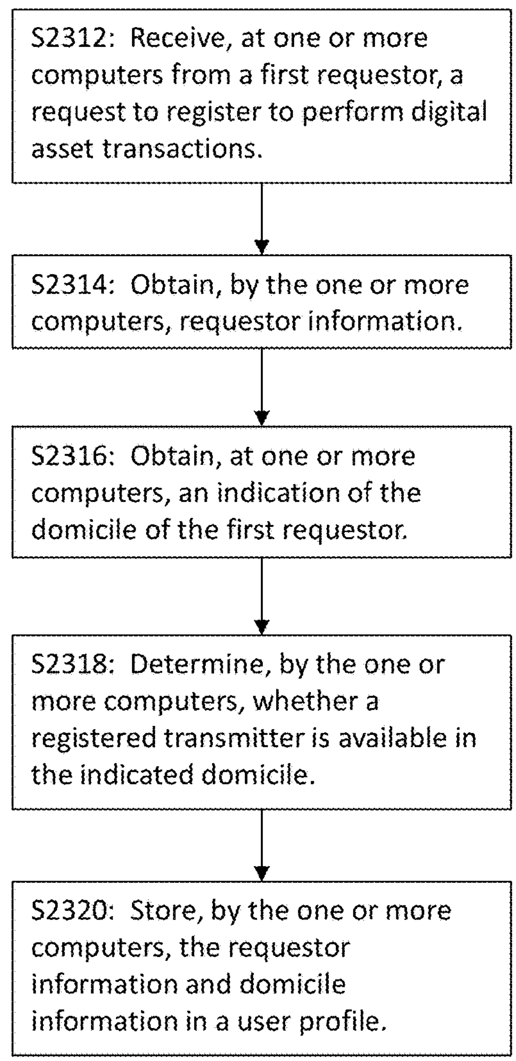

FIGS. 38A-B provide exemplary processes for determining the appropriate money transmit business for performing transactions, such as at a digital asset kiosk, even where the kiosk is located in a state other than the user's domicile. In embodiments, such processes may be performed for any potential user of an exchange seeking to create an exchange account, regardless of the user device used to access the exchange computer system. In embodiments, the processes described by FIGS. 38A-B may underlie any transactions performed at a digital asset kiosk. The processes may be performed when a user registers to use a digital asset kiosk or network of kiosks. Referring to FIG. 38A, in a step S2302, one or more computers may receive a request to perform a digital asset transaction. Digital asset transactions can include sending digital assets, transferring digital assets to accounts of different denominations (e.g., accounts denominated in different digital assets or in fiat currencies), transferring fiat currencies to digital asset accounts, depositing a fiat currency into a digital asset account, and/or withdrawing a fiat currency from a digital asset account, to name a few. In a step S2304, the one or more computers may obtain an indication of the domicile of the first requestor. In embodiments, the domicile may be a state in the United States. An indication of the domicile may be provided by scanning a government-issued ID, such as a driver's license, which may be used to search a database. Election registration may also be used to determine domicile. For corporations, the state in which they are registered may be their domicile. In embodiments, there may be a waiting period (e.g., one week) before the domicile is confirmed. Transactions may not be permitted until the domicile is confirmed and registration is completed. In a step S2306, the one or more computers may determine whether a state-registered money transmitter is available in the indicated state of domicile. A state-registered transmitter may be a money transmitter business. In embodiments, a domicile may not be a state, such as in the case of United States territories, and an appropriately registered transmitter may be required to proceed. In a step 2308, the one or more computers may provide to the requestor an interface for performing transactions using a transmitter registered in the indicated domicile. Any transaction performed by the requestor may be processed or otherwise handled by that transmitter.

FIG. 38B illustrates another exemplary process for determining the appropriate money transmit business for performing transactions involving digital assets. In a step S2312, one or more computers may receive a request from a requestor to register with a system and/or network for performing digital asset transactions. The requestor may be a natural person or a business. In a step S2314, the one or more computers may obtain requestor information, such as first and last name, address, contact information (e.g., telephone number, email address, to name a few), social security number, bank account information, digital asset wallet information, security information, requestor photograph, biometric information (e.g., handprint, fingerprint, retinal scan, facial analysis) and/or password information, to name a few. In a step S2316, the one or more computers may obtain an indication of the domicile of the requestor, as described with respect to step S2304 of FIG. 21A. In a step S2318, the one or more computers may determine whether a registered (e.g., state-registered) money transmitter is available in the indicated domicile. In a step S2320, the one or more computers may store the requestor information and the requestor domicile information in a user profile, which may use the password information and/or biometric information to provide secure access to a digital asset transaction system or network. A digital asset transaction card may be used (e.g., in conjunction with password or other security information) to provide access to a digital asset transaction system or network, such as through a digital asset kiosk.

Features of a Digital Asset Kiosk

Figure 39:
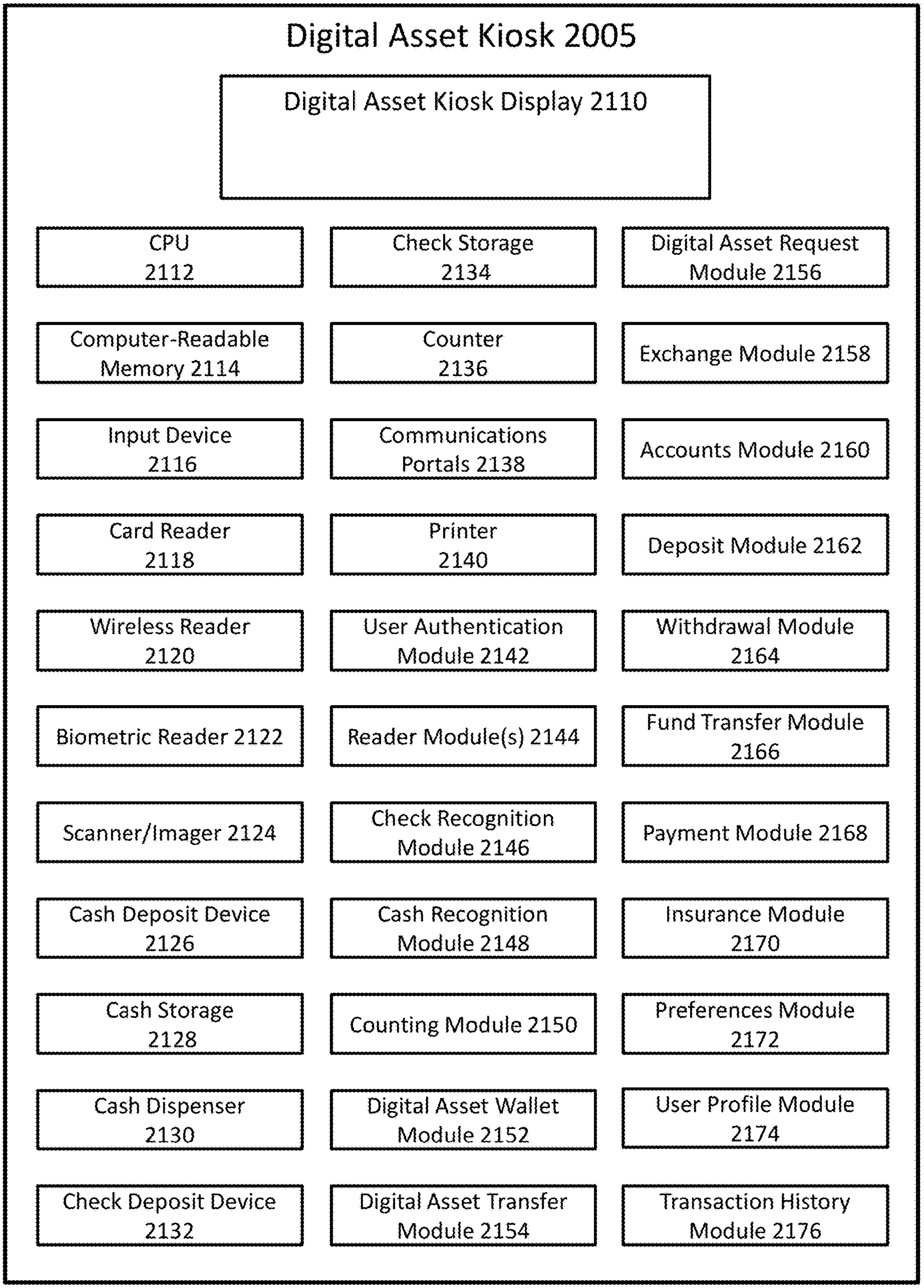
FIG. 39 is a schematic diagram of a digital asset kiosk in accordance with exemplary embodiments of the present invention.

FIG. 39 illustrates an exemplary digital asset kiosk in accordance with embodiments of the present invention. A digital asset kiosk 2005 may have one or more display device 2110, CPU 2112, computer-readable memory 2114, input device 2116, card reader 2118, wireless reader 2120, biometric reader 2122, scanner/imager 2124, cash deposit device 2126, cash storage 2128, cash dispenser 2130, check deposit device 2132, check storage 2134, counter 2136, communications portal 2138, and/or printer 2140. A digital asset kiosk 2005 may run one or more software applications, which may include one or more user authentication module 2142, reader module 2144, check recognition module 2146, cash recognition module 2148, counting module 2150, digital asset wallet module 2152, digital asset transfer module 2154, digital asset request module 2156, exchange module 2158, accounts module 2160, deposit module 2162, withdrawal module 2164, fund transfer module 2166, payment module 2168, insurance module 2170, preferences module 2172, user profile module 2174, and/or transaction history module 2176.

Still referring to FIG. 39, an input device 2116 may be a scanner, keyboard, touchscreen, mouse, microphone, and/or camera, to name a few. A card reader 2118 may be a device that can read magnetically encoded data on cards (e.g., magnetic strips on cards), RFID chips, and/or other cards with data storage, to name a few. A wireless reader 2120 may read data from one or more devices (e.g., smart phones) using wireless communication signals, such as Bluetooth or Wi-Fi. A biometric reader 2122 may be any of a palm scanner, fingerprint reader, retina scanner, facial recognizer, and/or voice recognizer, to name a few. In embodiments, a biometric reader 2122 may include a scanner (e.g., laser scanner), microphone, and/or camera. A scanner/imager 2124 may be used to scan identification cards (e.g., driver's licenses), documents (e.g., electric bills), money, checks, and/or other financial instruments (e.g., negotiable instruments).

Still referring to FIG. 39, a cash deposit device 2126 may receive paper money. In embodiments, coin may also be received by a digital asset kiosk 2005. A cash deposit device 2126 may comprise and/or operatively communicate with a scanner/imager 2124, which may be used to perform recognition of received cash. A cash deposit device 2126 need not be used to perform deposit transactions. Cash storage 2128 may store one or more monetary bills and/or coins. In embodiments, cash storage 2128 may store cash of different denominations. Cash storage 2128 may comprise a storage vault for secure storage of cash. A cash dispenser 2130 may dispense one or more monetary bills. In embodiments, it may dispense coins. A check deposit device 2132 may receive checks (e.g., personal checks, bearer checks, certified checks, cashier's checks, travelers checks, money orders and/or other negotiable instruments. In embodiments, a digital asset kiosk may receive other financial instruments or certificates thereof, such as stock certificates and/or bond certificates, to name a few.

FIG. 39 further illustrates a check deposit device 2132, which may comprise and/or operatively communicate with a scanner/imager 2124 and/or magnetic ink character recognition ("MICR") reader, which may be used to perform recognition of checks and/or other deposited financial instruments or certificates thereof. Those skilled in the art will appreciate that a check deposit device 2132 may be a check receipt device and need not be used in conjunction with deposit transactions. A check storage device 2134 may store one or more checks and/or other financial instruments or certificates thereof. A check storage device 2134 may comprise a vault for secure storage. A counter 2136 may determine an aggregate value of cash (e.g., monetary bills and/or coins), which can entail reading the value one or more bills and/or coins (e.g., upon receipt via cash deposit device 2126 and/or upon retrieval or other accessing of the contents of cash storage 2128). A communications portal 2138 may provide communications with one or more systems (e.g., a digital asset insurance system), devices (e.g., user electronic devices), and/or networks (e.g., a digital asset network, an ACH network), to name a few. A communications portal 2138 may comprise wired and/or wireless communications components, such as cable ports, cable, and/or wireless antennas, to name a few. A printer 2140 may print on one or more media of one or more sizes. A printer 2140 may print receipts (e.g., transaction receipts), transaction history reports, and/or account balance reports, to name a few.

Still referring to FIG. 39, software comprising one or more modules may run on the one or more CPUs 2112. A user authentication module 2142 can authenticate a user, which may entail identifying a user, confirming the identity of a user, and/or validating a user's authorization to use a digital asset kiosk and/or perform one or more transactions. A user authentication module 2142 may interact at least with an input device 2116, card reader 2118, wireless reader 2120, and/or biometric reader 2122, in order to confirm a user's identity. A card reader 2118 may read a user access card, and an input device 2116 may receive a user's passcode. Biometric readers 2122 may provide biometric confirmation of a user's identity. A reader module 2144 may interact with one or more card readers 2118, wireless readers 2120, and/or scanners/imagers 2124 to read card (e.g., with magnetic strips), QR codes, bar codes, RFID chips, and/or text, to name a few. A check recognition module 2146 may recognize one or more fields (e.g., drawer, drawee, account number, date, amount, to name a few) of a check or other financial instrument or certificate thereof. In embodiments, a check recognition module 2146 may comprise optical character recognition ("OCR") technology to read written fields (e.g., typewritten and/or handwritten). A check recognition module may interact with a scanner/imager 2124 and/or a MICR reader. A cash recognition module 2148 may interact with a scanner/imager 2124, a cash deposit device 2126, cash storage 2128, and/or a cash dispenser 2130 to determine denominations and/or values of cash, which may be paper bills and/or coins. A counting module 2150 may interact with a counter 2136 and/or other components of a digital asset kiosk to count and provide an aggregate value of cash (e.g., determine an amount of cash deposited or determine an amount of cash to retrieve for withdrawal) and/or checks (e.g., determine an aggregate value of checks deposited).

A digital asset wallet module 2152 may handle the creation of one or more digital asset wallets and/or the accessing of one or more existing digital asset wallets of one or more denomination. For example, a digital asset wallet module 2152 may handle wallets associated with a single digital asset, such as Bitcoin wallets, or handle wallets associated with a plurality of digital assets, such as Litecoin wallets, and/or Namecoin wallets, in addition to Bitcoin wallets, to name a few. In embodiments, a digital asset kiosk may provide a unified wallet or an umbrella wallet, which may hold assets of different denominations. Such a wallet may use one or more exchange rates to show (e.g., in a single denomination) an aggregate value of assets contained in the wallet. Such exchange rates may be associated with a specific exchange, or a blended exchange rate as discussed herein. The wallet may comprise sub-wallets to hold separately each differently denominated asset. In embodiments, the digital asset wallet module 2152 may also be linked to a fiat currency digital wallet module, which transacts in a fiat currency, such as dollars, euro, yen, to name a few.

The wallet may show a breakdown of the value or number of assets of each denomination that is stored in the wallet. A digital asset wallet module 2152 may otherwise show account balances for one or more digital asset wallets. A digital asset transfer module 2154 may process one or more types of transactions involving the sending of digital assets. Digital assets may be sent to one or more other accounts and/or digital wallets, which may be associated with the user, other people, and/or other institutions. A digital asset request module 2156 may handle the requesting of digital asset transfers. For example, a digital asset request module 2156 may provide an interface by which a user can designate an amount of digital assets to request as well as another user, account, or digital wallet address from which to request the digital assets.

An exchange module 2158 may process exchange and/or conversion transactions involving digital assets. Exchange transactions may involve the conversion of digital assets of one denomination to digital assets of a different denomination, digital assets to fiat currencies, and/or fiat currencies to digital assets. In embodiments, exchange and/or conversion transactions may entail the use of a money transmit business, which may be selected by an exchange module 2158 based on the domicile of a user (e.g., a user performing an exchange transaction, a user sending funds that require an exchange transaction, a user paying a bill that requires an exchange transaction, to name a few). Accordingly, an exchange module 2158 may be used in conjunction with one or more other modules to process any transactions requiring an exchange transaction. In embodiments, an exchange module 2158 may allow a user to select an exchange (e.g., from a list of exchanges) to be used for the transaction. Such an option may enable a user to choose select exchanges located in different geographic regions, such as other countries. An exchange module 2158 may display and/or otherwise communicate one or more exchange rates corresponding to one or more exchanges and/or money service businesses.

Still referring to FIG. 39, an accounts module 2160 may access one or more fiat currency accounts for use in transactions at a digital asset kiosk 2005. For example, an accounts module 2160 may access a fiat currency account denominated in USD to convert USD from the account to bitcoin. An accounts module 2160 may be used to create one or more fiat currency accounts. In embodiments, an accounts module 2160 may be used to store mixed denominations, which may include one or more fiat currencies and/or one or more digital assets of different denominations. An accounts module 2160 may access and/or create an umbrella account and/or a partitioned account to store different denominations. An accounts module 2160 may also provide balances for one or more accounts.

A deposit module 2160 may handle the physical deposit of money of one or more fiat currency and/or one or more checks or other financial instruments into a digital asset kiosk 2005. In embodiments, tokens and/or other physical embodiments of digital assets may be deposited, subject to applicable government regulations. A deposit module 2160 may control, interface with, and/or receive data from any of a cash deposit device 2126, check deposit device 2132, and/or counter 2136, to name a few. In embodiments, a deposit module 2162 may handle the deposit of funds of any denomination (e.g., funds from money and/or financial instruments inserted into a digital asset kiosk 2005) into one or more accounts of any denomination.

A withdrawal module 2164 may process withdrawals of money in any denomination using a digital asset kiosk 2005. Withdrawals may be made from any fiat currency account, investment account, and/or digital asset account. In embodiments, physical embodiments of one or more digital assets may be withdrawn, in conformance with applicable laws.

A fund transfer module 2166 can handle transactions involving the transfer of funds between accounts and/or between people and/or entities. Transfers of funds between accounts can entail moving digital assets from one account to another, which may be denominated differently, moving fiat currency from one account to another, which may be denominated differently, moving digital assets to an account denominated in a fiat currency, and/or moving funds from a fiat currency account to a digital asset account, to name a few. Transfers between differently denominated accounts, including transfers between digital asset and fiat currency accounts, may entail one or more exchange transactions. A fund transfer module 2166 may access (e.g., through one or more API) price and/or exchange data from one or more exchanges and/or may show one or more exchange rates associated with one or more exchanges. A fund transfer module 2166 may provide an interface for selecting options related to a fund transfer transaction and/or may implement commands to carry out a fund transfer transaction. Fund transfers can be between accounts with a common owner. Fund transfers can also be from one person or entity to another person or entity.

A payment module 2168 may handle payments using a digital asset kiosk 2005. A payment module 2168 may enable the paying of one or more bills (e.g., electric bill, gas bill, Internet bill, credit card bill, to name a few). A payment module 2168 may process automatic bill pay using digital assets, which may be converted to a fiat currency prior to payment.

An insurance module 2170 may handle the insuring of one or more digital asset accounts and/or transactions. An insurance module 2170 may communicate with one or more insurers to provide insurance options with users, such as basic insurance plans, premium plans, and/or custom coverage plans. Insurance options may comprise different coverage amounts, different premiums, and/or different asset storage policies, to name a few.

A preferences module 2172 may provide an interface for receiving user preferences and/or may implement those preferences. Preferences can include the language that is used, a default account to use for fund transfers, and/or a default exchange, to name a few. One or more preferences may be stored as part of a user profile such that the preferences may be loaded when a user logs into a digital asset kiosk 2005.

A user profile module 2174 can store user data (e.g., name, contact information, address, telephone number, email address, social security number, government ID information, biometric information, photograph, username, password, security questions, and/or membership data associated with a digital asset kiosk network, to name a few). A user profile module 2174 may store information associated with one or more fiat currency accounts and/or digital asset accounts (e.g., digital asset wallets), so that a user may access and/or use those accounts via a digital asset kiosk 2005.

A transaction history module 2176 may track and/or display account activity for one or more accounts. A transaction history module 2176 may show destinations, recipients, amounts, and/or dates of fund transfers and/or payments and/or may show withdrawals, deposits, exchange transactions, and/or insurance transactions.

Figure 40A:
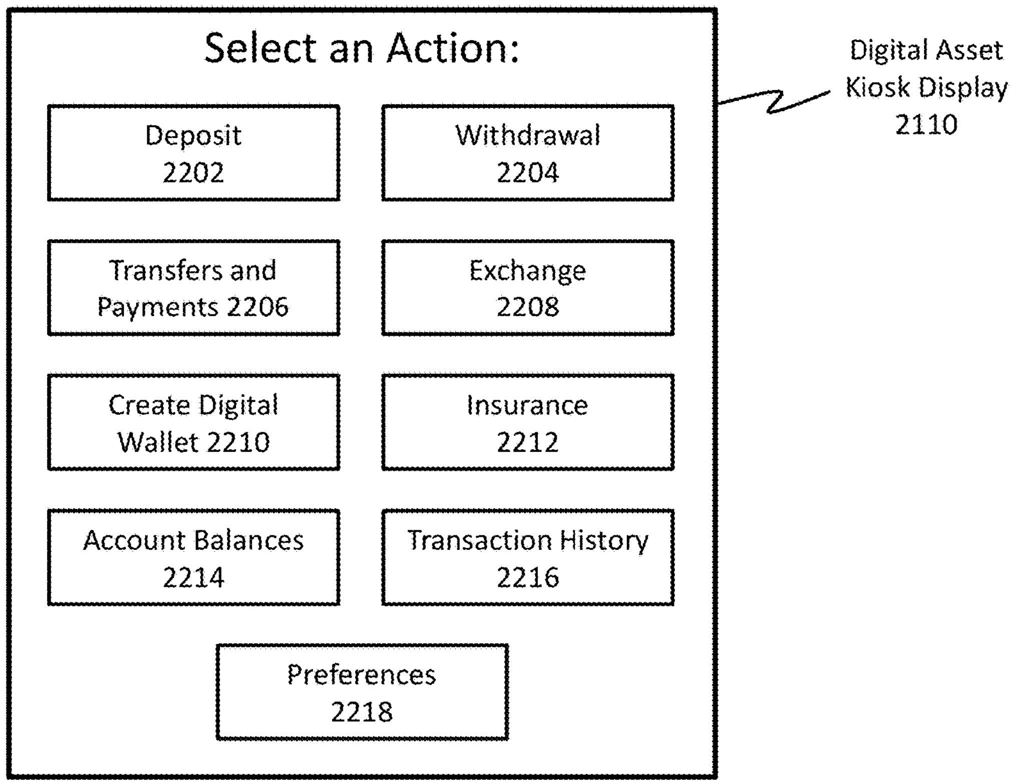
FIGS. 40A-Q are schematic diagrams of a digital asset kiosk display showing exemplary interfaces for various transactions and functions involving digital assets in accordance with exemplary embodiments of the present invention.
Figure 40B:
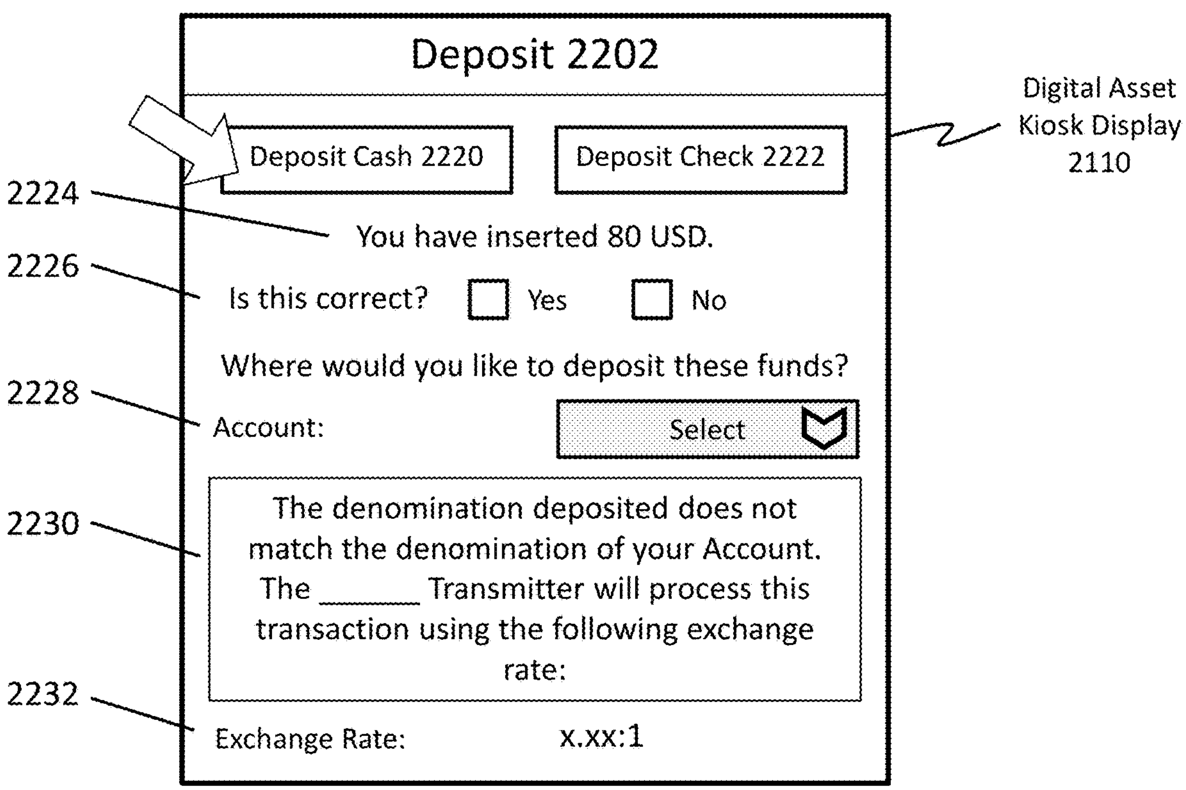
Figure 40C:
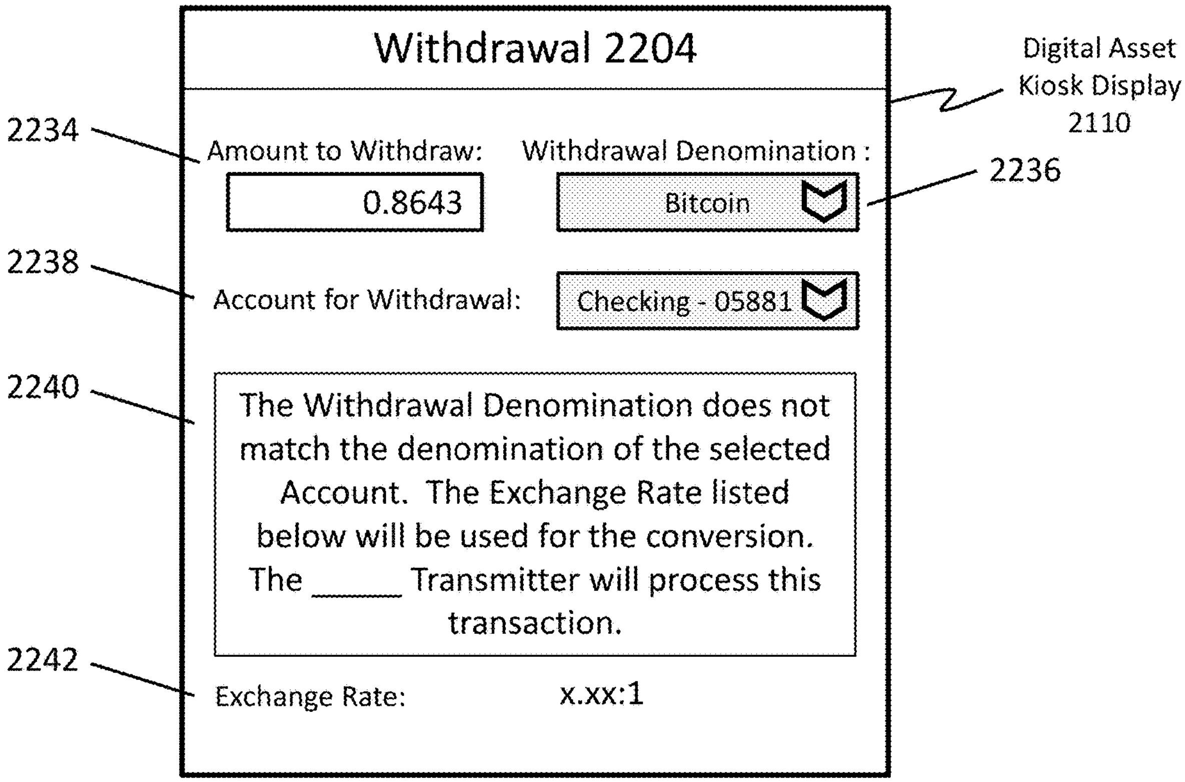
Figure 40D:
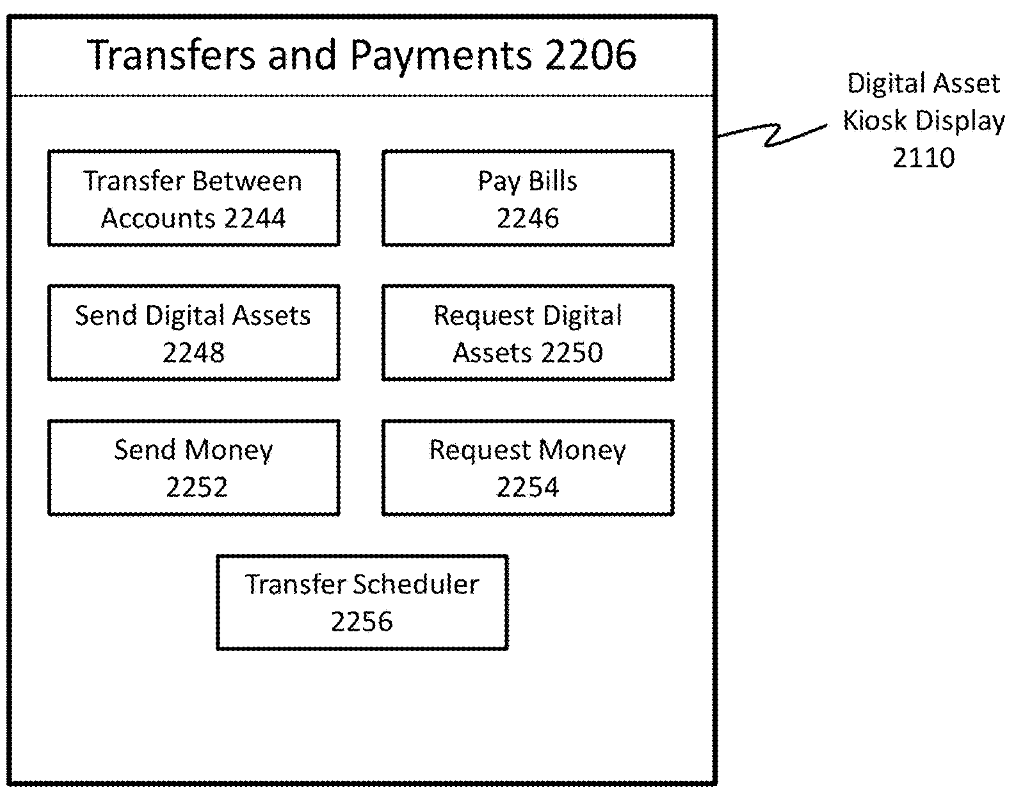
Figure 40E:
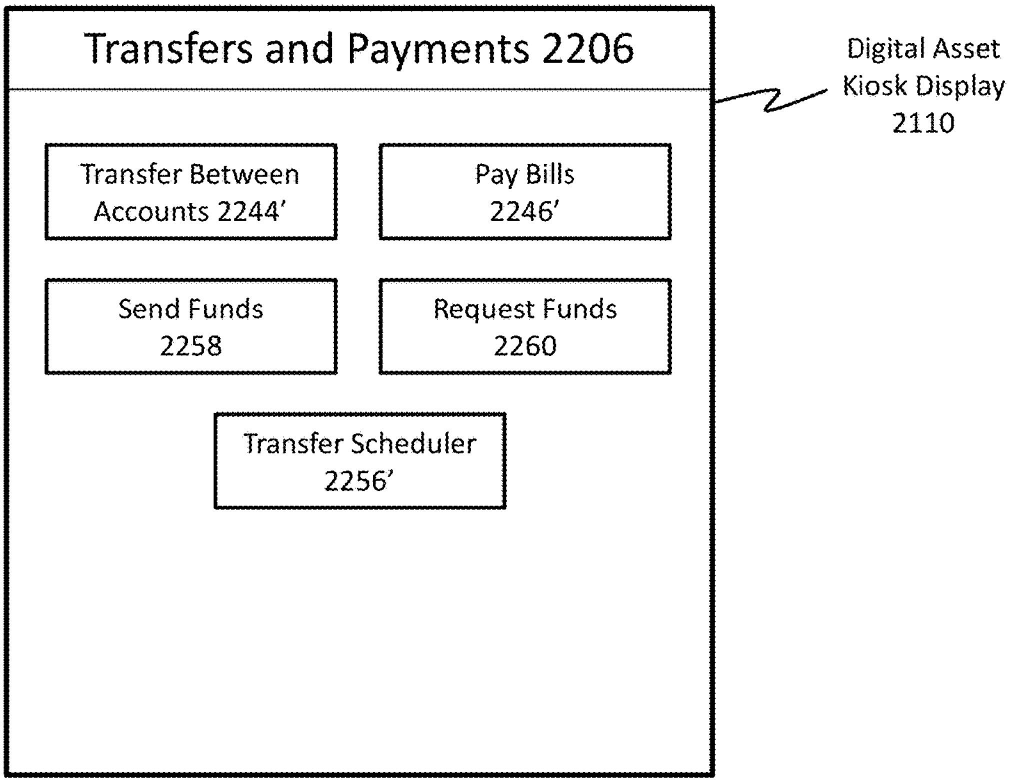
Figure 40F:
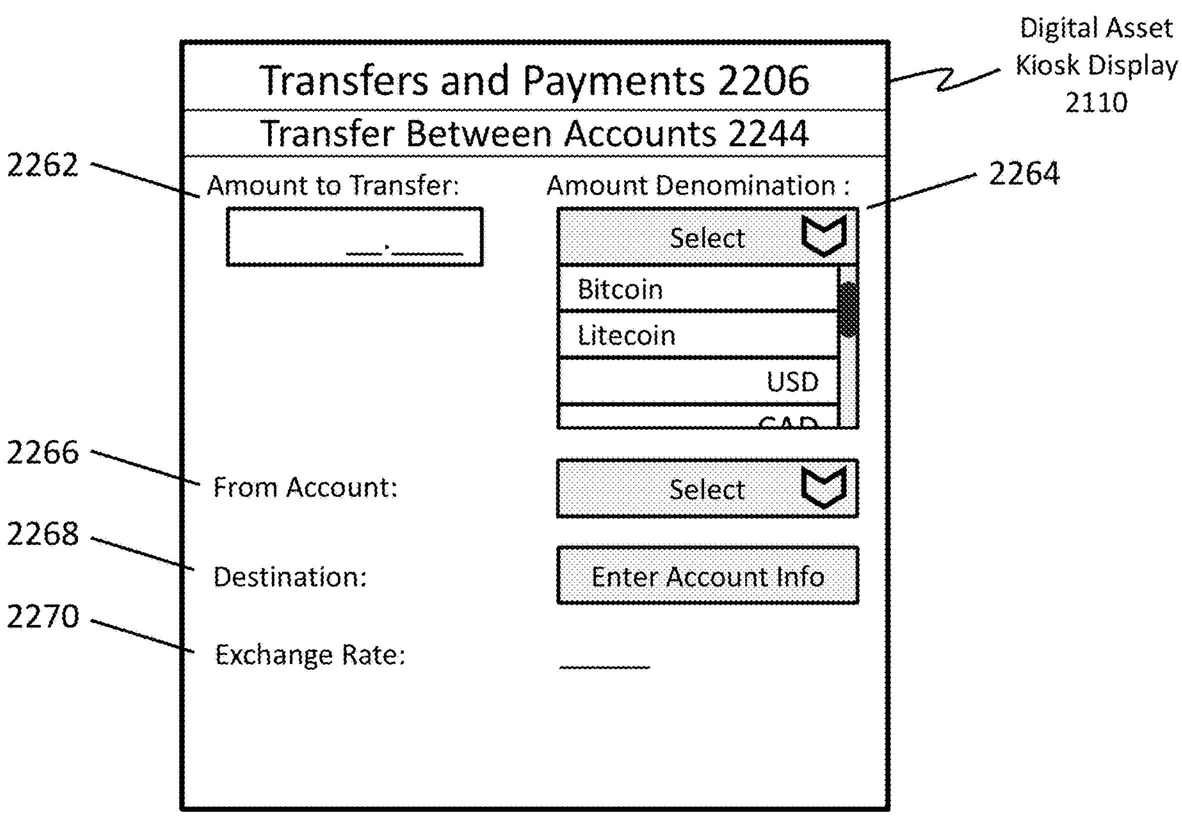
Figure 40G:
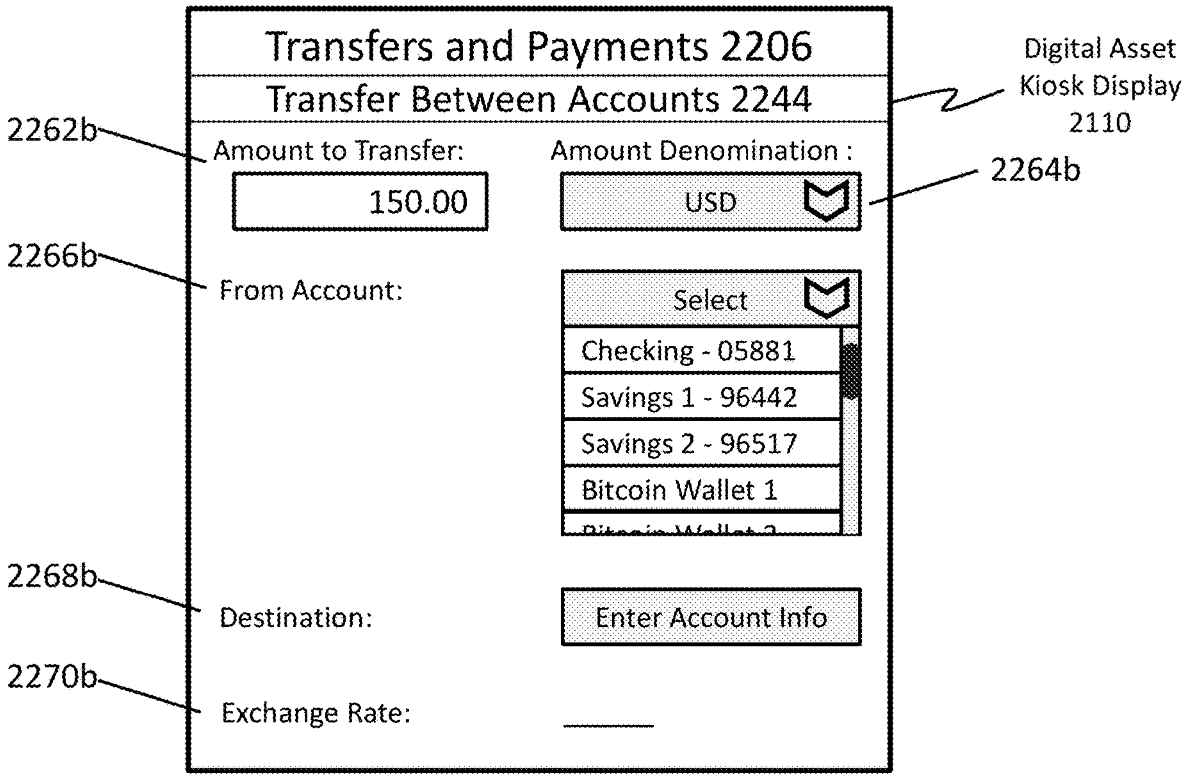
Figure 40H:
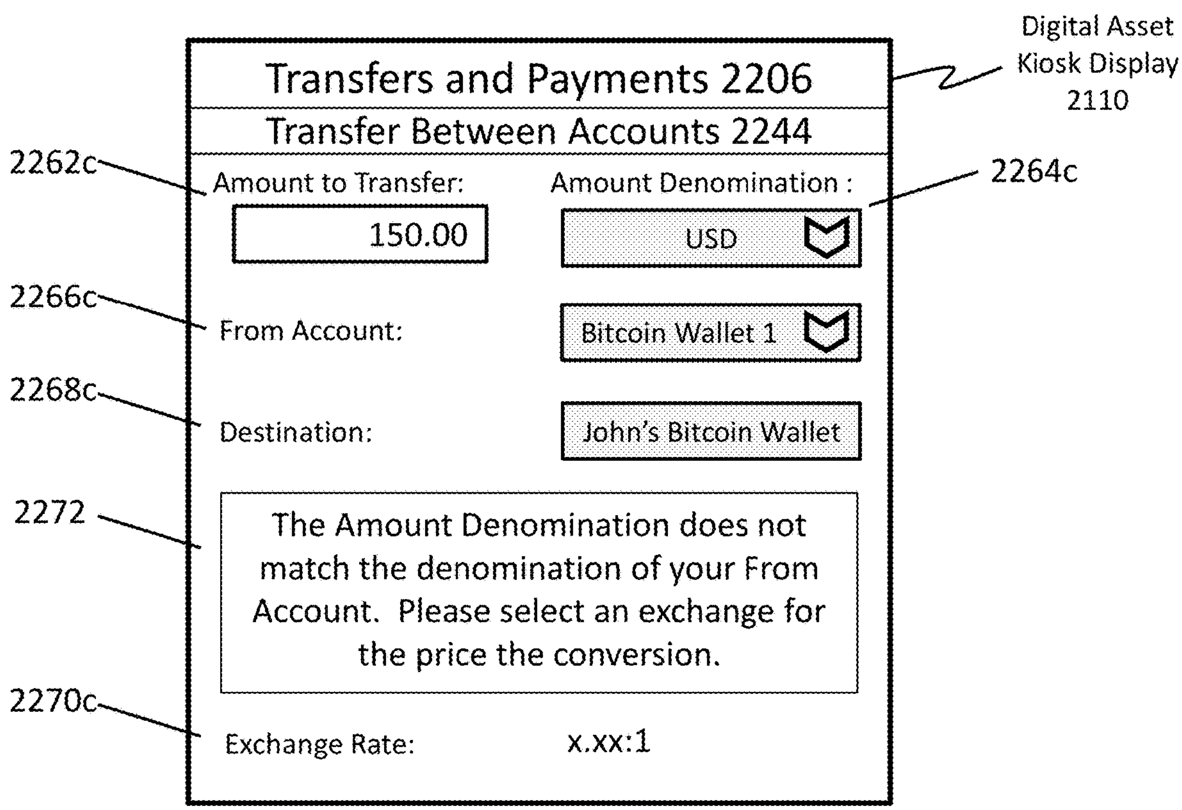
Figure 40I:
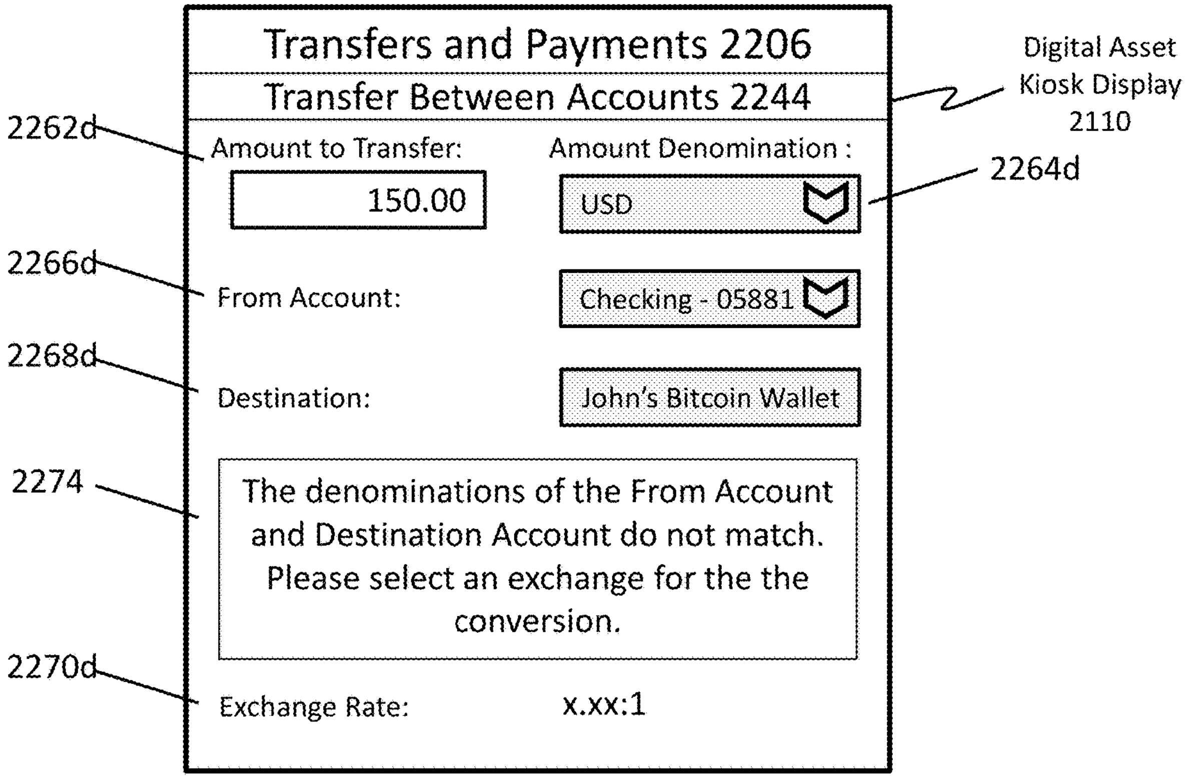
Figure 40J:
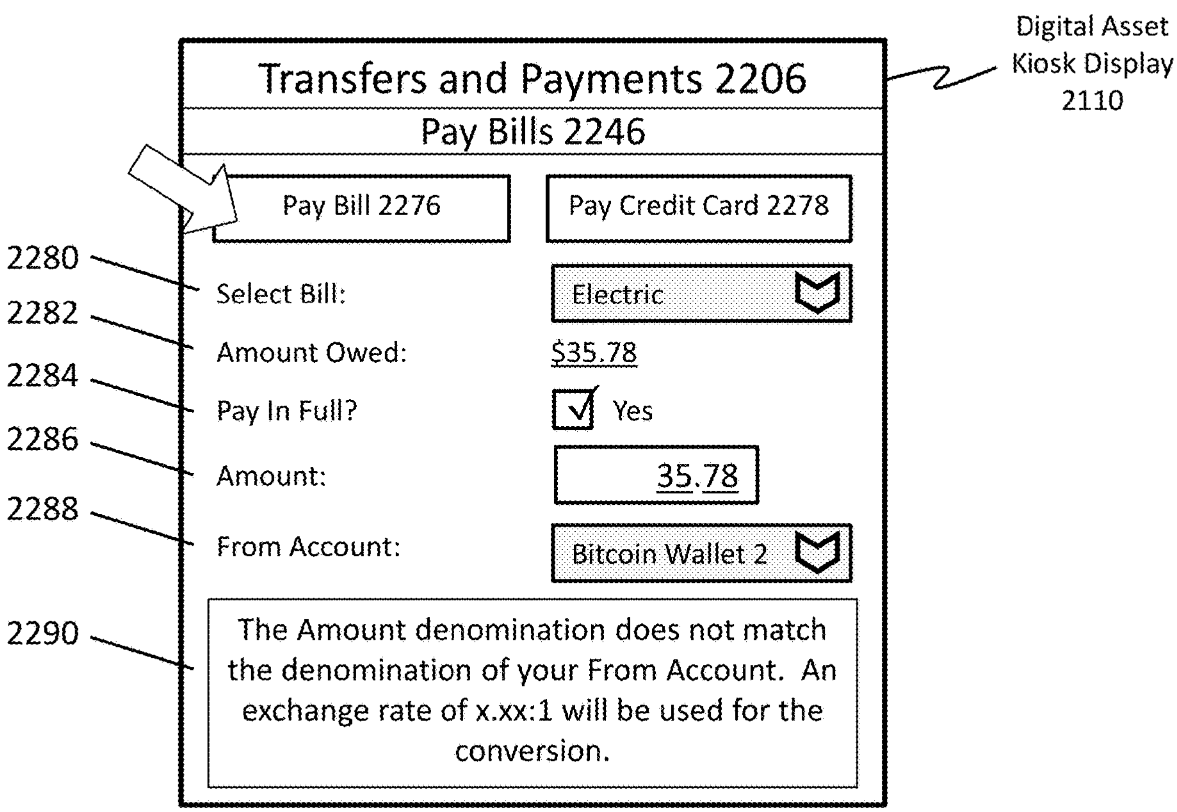
Figure 40K:
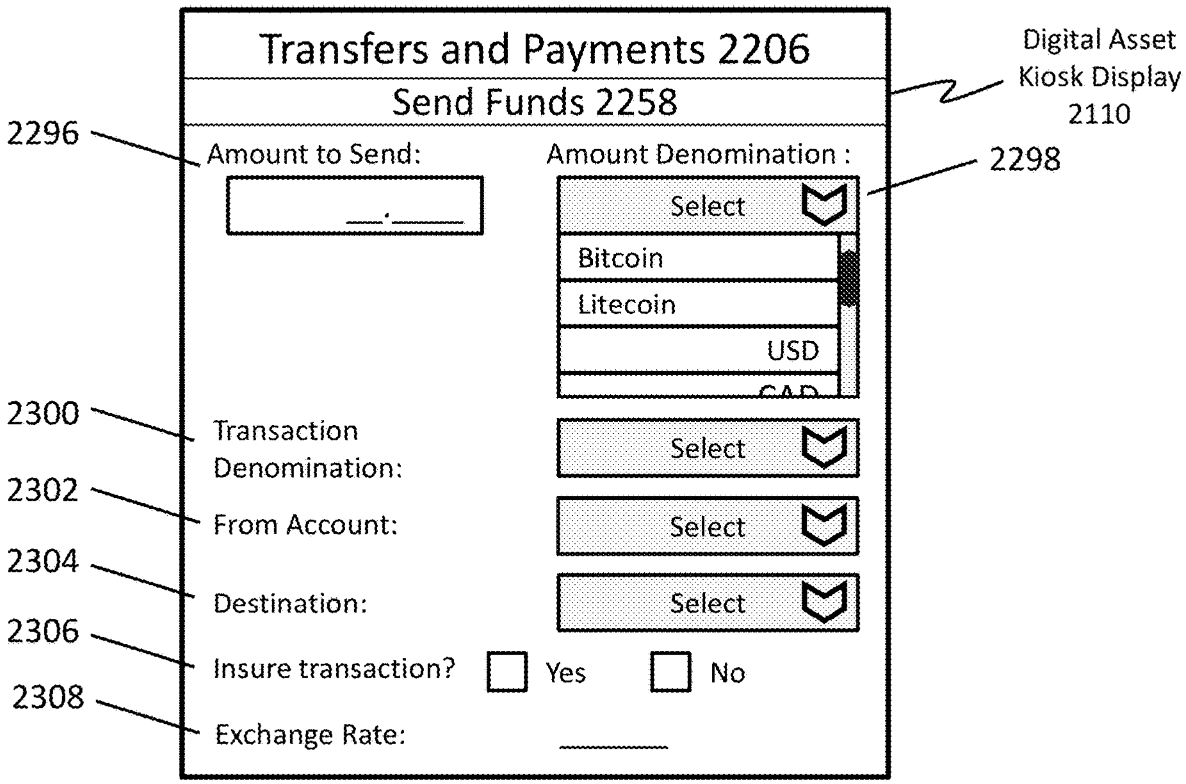
Figure 40L:
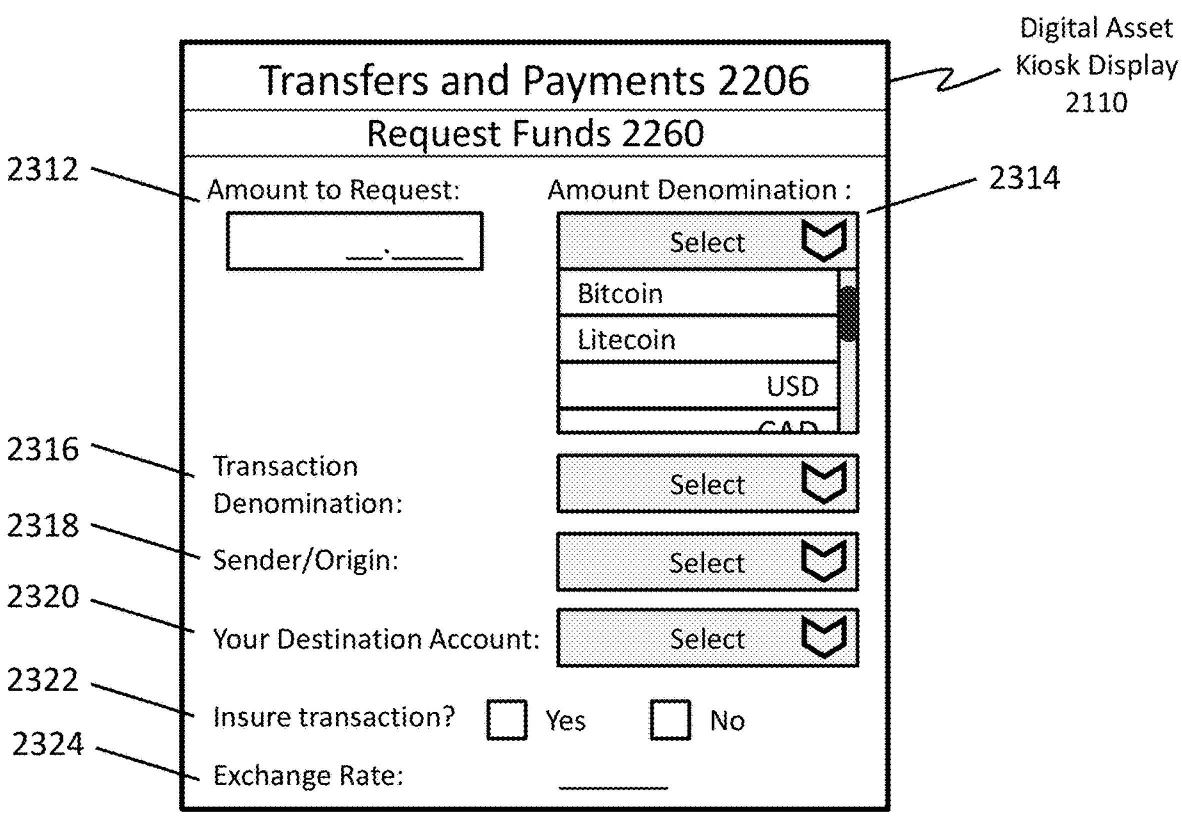
Figure 40M:
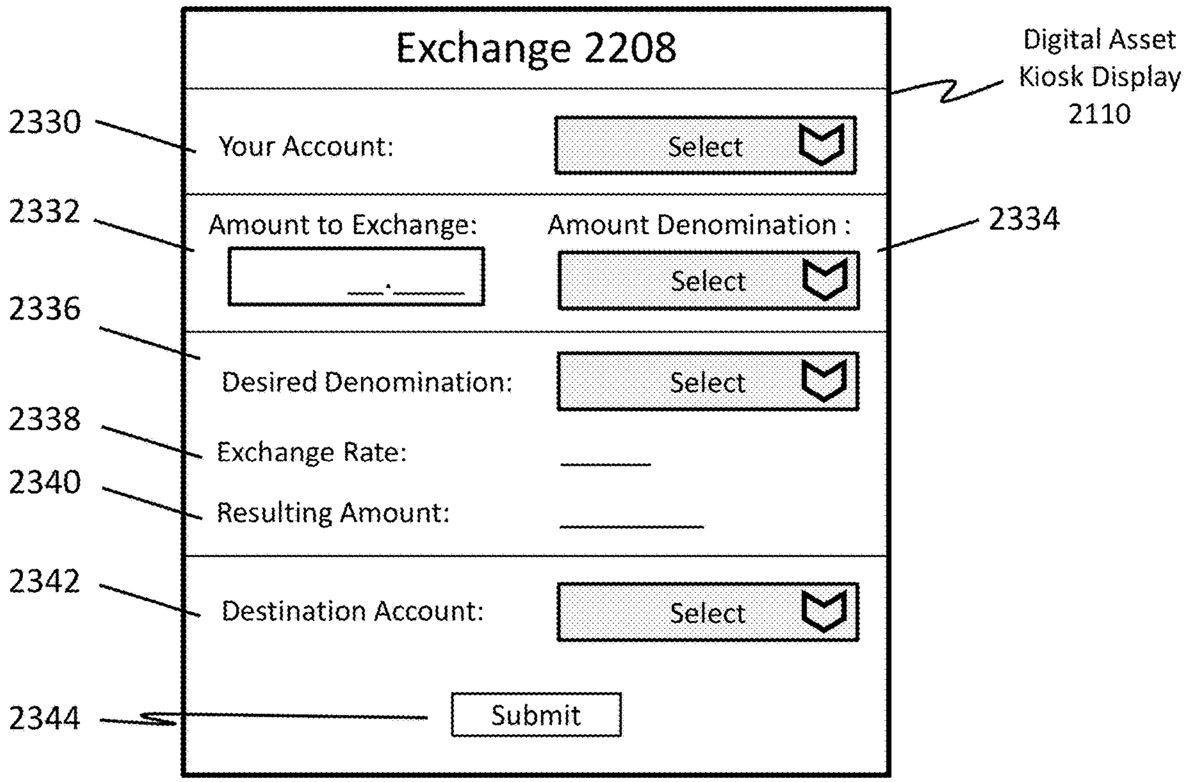
Figure 40N:
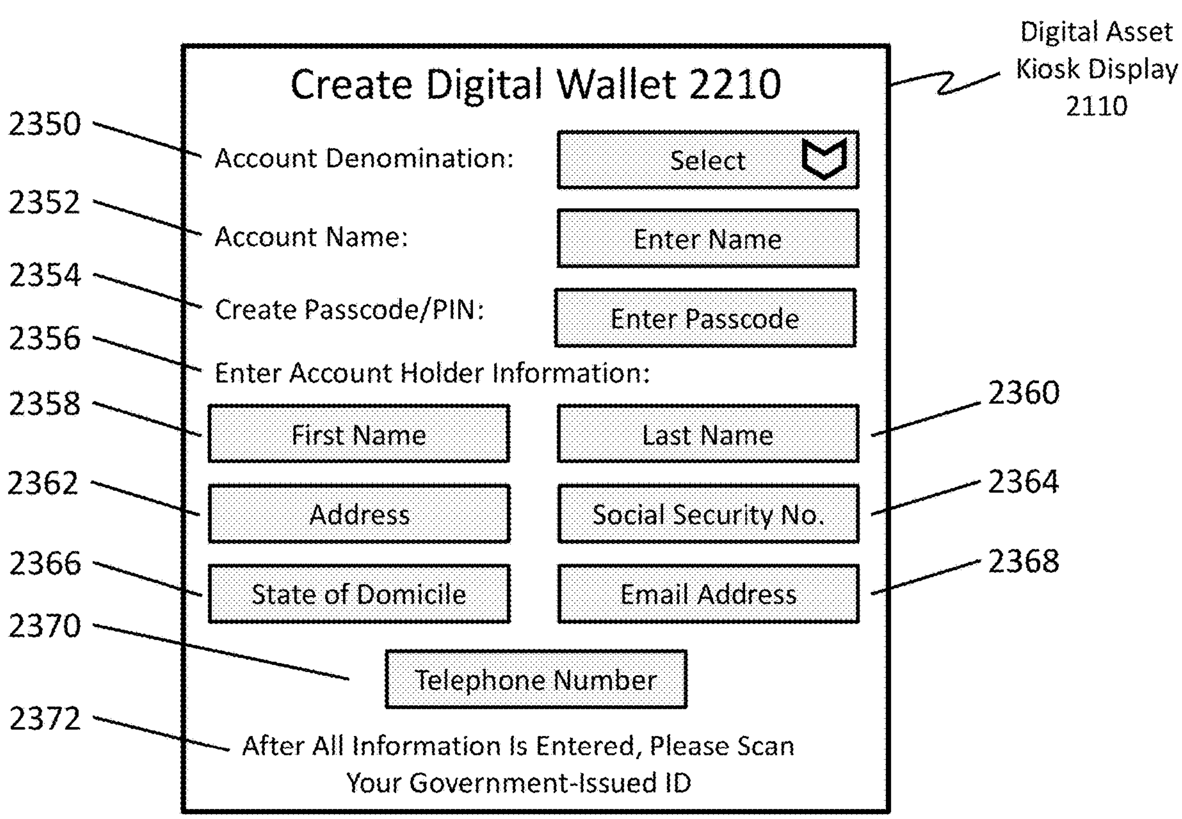
Figure 40O:
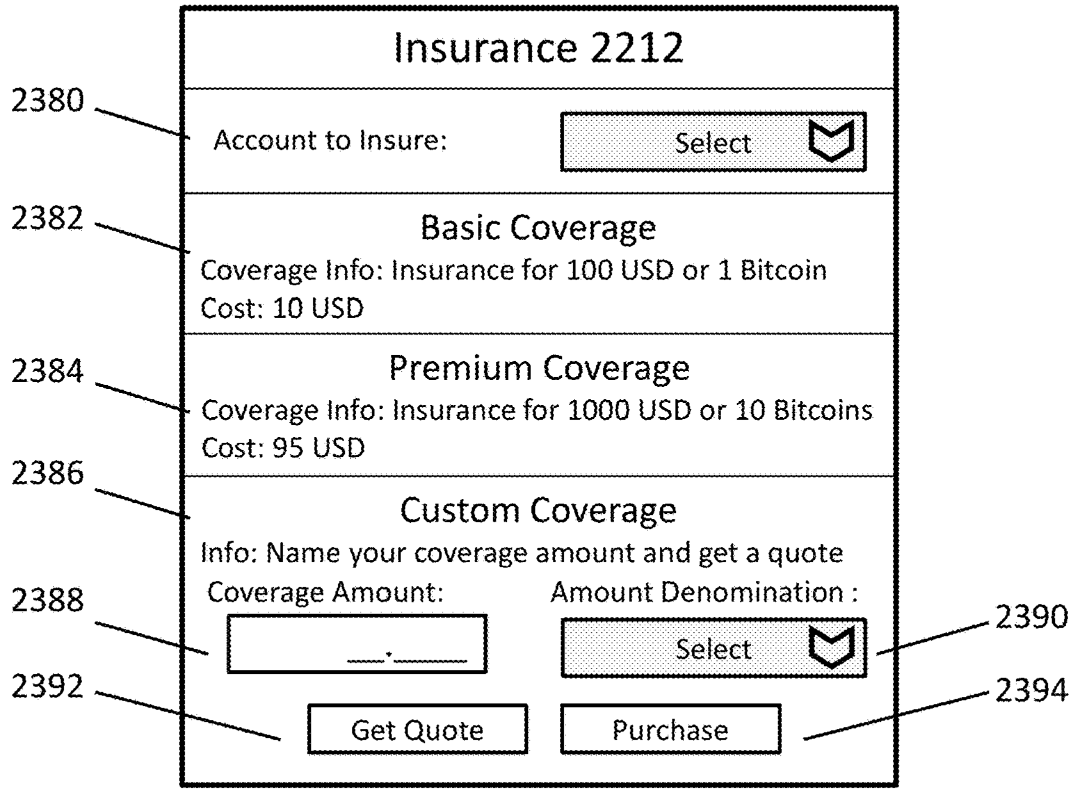
Figure 40P:
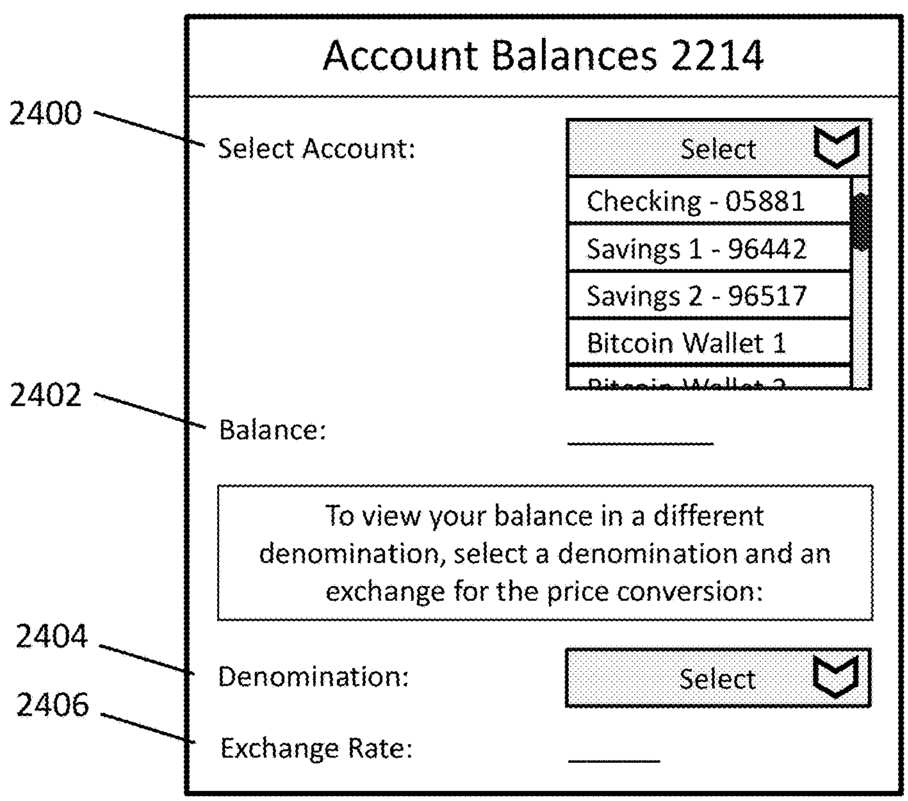
Figure 40Q:
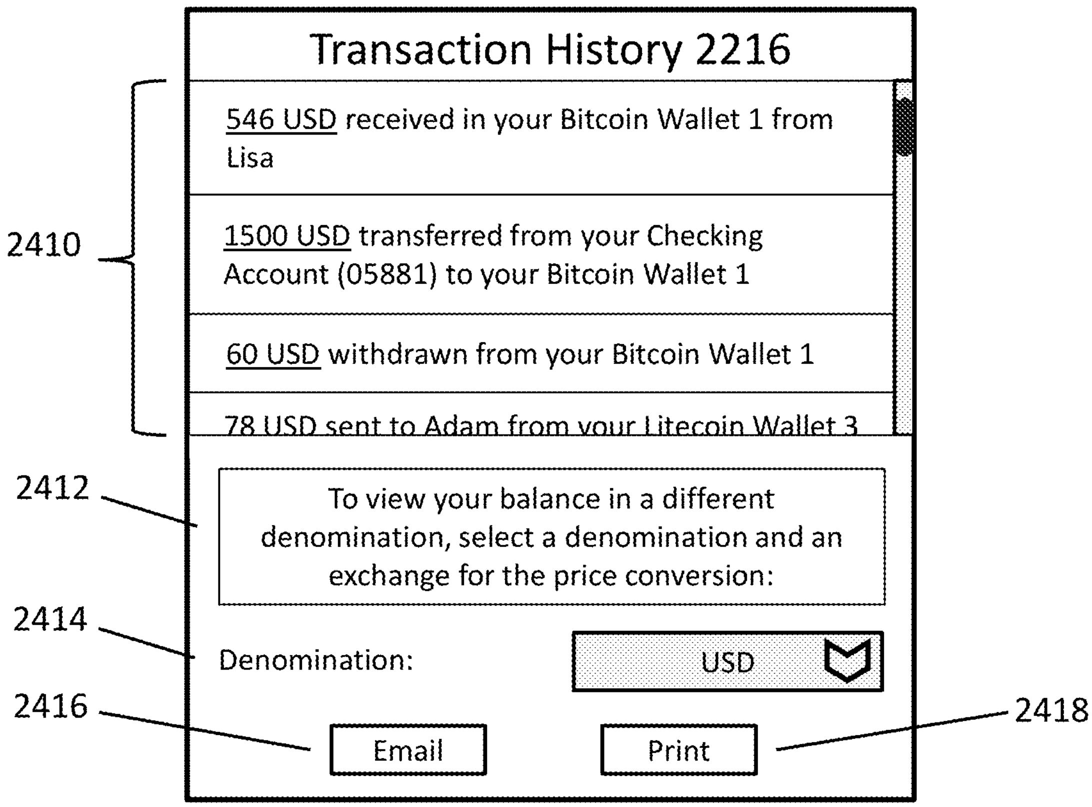

FIGS. 40A-Q illustrate exemplary screen shots of a digital asset kiosk performing transactions in accordance with embodiments of the present invention. In embodiments, certain transactions illustrated in FIGS. 40A-Q (e.g., transactions that do not involve deposits or withdrawals or fiat currency) may be performed from a digital wallet or other digital asset client (e.g., a website or downloadable software on a computer, tablet computer, and/or mobile device, to name a few).

FIG. 40A illustrates an exemplary digital asset kiosk menu, which identifies actions that may be performed using an exemplary kiosk.

FIG. 40B illustrates an exemplary deposit 2202 being performed using an exemplary kiosk.

FIG. 40C illustrates an exemplary withdrawal 2204 being performed using an exemplary kiosk.

FIG. 40D illustrates an exemplary digital asset kiosk transfers and payments 2206 menu, which identifies fund transfer and payment transactions that may be performed using an exemplary kiosk.

FIG. 40E illustrates another exemplary digital asset kiosk transfers and payments 2206 menu.

FIGS. 40F-H illustrate an exemplary transfer between accounts 2244 being performed using an exemplary kiosk.

FIG. 40I illustrates another exemplary transfer between accounts 2244 being performed using an exemplary kiosk.

FIG. 40J illustrates an exemplary bill payment 2246 being performed using an exemplary kiosk.

FIG. 40K illustrates an exemplary transaction to send funds 2258 being performed using an exemplary kiosk. The user can be prompted or otherwise provided with an interface to enter or select a transaction amount 2296, which is the amount to send. A denomination option 2298 may allow the user to select the denomination for the transaction amount 2296. For example, a user may specify 1 unit of a digital asset (e.g., 1.00 bitcoin), 100.00 USD, 50.00 CAD, and/or any amount of any supported currency that complies with any transaction rules or limits in effect. The software may provide a transaction denomination option 2300, which may allow a user to select the denomination of assets in which to transmit the funds. An origin account option 2302 may allow a user to select the account from which fund will be sent. In embodiments, an account may be a digital wallet. A destination option 2304 may allow a user to select a destination for the funds, which may be another user, an account (e.g., an account number or other identifier), and/or a digital wallet (e.g., a public address corresponding to a digital wallet). Where the amount denomination 2298 does not match the transaction denomination 2300, the software may access one or more digital asset exchanges to obtain and/or display an exchange rate 2308 and/or to compute the value in the desired transaction denomination and/or display that value. Accordingly, in embodiments, the software may show the exchange rate 2308 (e.g., 104.00 USD to 1 unit of a digital asset) and/or may compute the exchange value or approximate value before the transaction is processed. For example, upon a user's input of 2 units of a digital asset, the software may display "208.00 USD" or vice versa. Where the transaction denomination 2300 does not match the denomination of assets in the origin account 2302, the software may obtain an exchange rate and compute the corresponding amount of assets to send from the origin account 2302. This exchange information may be displayed or otherwise provided to the user. The software may also provide an interface or prompt the user for selection of transaction insurance options 2306. The user may select a yes option to insure the transaction or a no option to decline insurance. If insurance is selected, a user may enter a coverage amount. By default, the coverage amount may be the transaction amount 2296. The software may provide pre-determined coverage amount options and may indicate the cost of each. If the user enters a different coverage amount, the software may then determine the cost of insurance (e.g., recurring premiums or an up-front cost) or may provide the user with a get quote option, which can calculate, fetch, and/or otherwise obtain and display the associated cost of the selected coverage amount. In embodiments, limits may be placed on the coverage amount.

FIG. 40L illustrates an exemplary request of funds 2260 being performed using an exemplary kiosk.

FIG. 40M illustrates an exemplary exchange transaction 2208 being performed using an exemplary kiosk in accordance with embodiments of the present invention.

FIG. 40N illustrates an exemplary creation of a digital wallet 2210 being performed using an exemplary kiosk.

FIG. 40O illustrates an exemplary action to obtain account insurance 2212 being performed using an exemplary kiosk. In embodiments, insurance may involve secure storage of one or more keys to access an account.

FIG. 40P illustrates an exemplary action to check account balances 2214 being performed using an exemplary kiosk. Account balances may be emailed and/or printed by the kiosk. In embodiments, alerts may notify a user (e.g., by phone, email, text message) when there is account activity for one or more accounts, when balances reach a certain level, and/or when transactions of a certain size are performed.

FIG. 40Q illustrates an exemplary action to check a transaction history 2216 being performed using an exemplary kiosk. A digital asset kiosk may be used to view a transaction history of one or more accounts, which may include any fiat currency accounts and digital asset accounts that have been used in digital asset transactions. The transaction history may be printed by the kiosk and/or emailed or otherwise communicated to a user.

In embodiments, an external application (e.g., mobile application, desktop downloadable software, or a website, to name a few) may integrate with a digital asset kiosk. A user may initiate a kiosk transaction using the external application. For example, a user may send, using the external application, transaction instructions to sell digital assets. When the sending of digital assets to from the user to the buyer is confirmed (e.g., by a digital asset network or by an exchange), an electronic notification may be provided to the user to notify the user that the transfer was confirmed and/or that fiat currency is available for withdrawal. In embodiments, the fiat currency received from a buyer, which may be the exchange itself, may be stored in an exchange fiat currency account associated with the user. As described herein, the exchange fiat currency account may be a pooled account for a plurality of exchange users. In embodiments, the pooled account may provide insurance, such as FDIC insurance or insurance from another governmental body. The user may then log in at a digital asset kiosk and select an option to withdraw fiat currency. The kiosk may then provide the currency to the user. This integration of an external application to an exchange and kiosk system can eliminate the need for a user to log into a kiosk, initiate a transaction, and wait for the transaction to occur and clear before funds are available for withdrawal.

Figure 41:
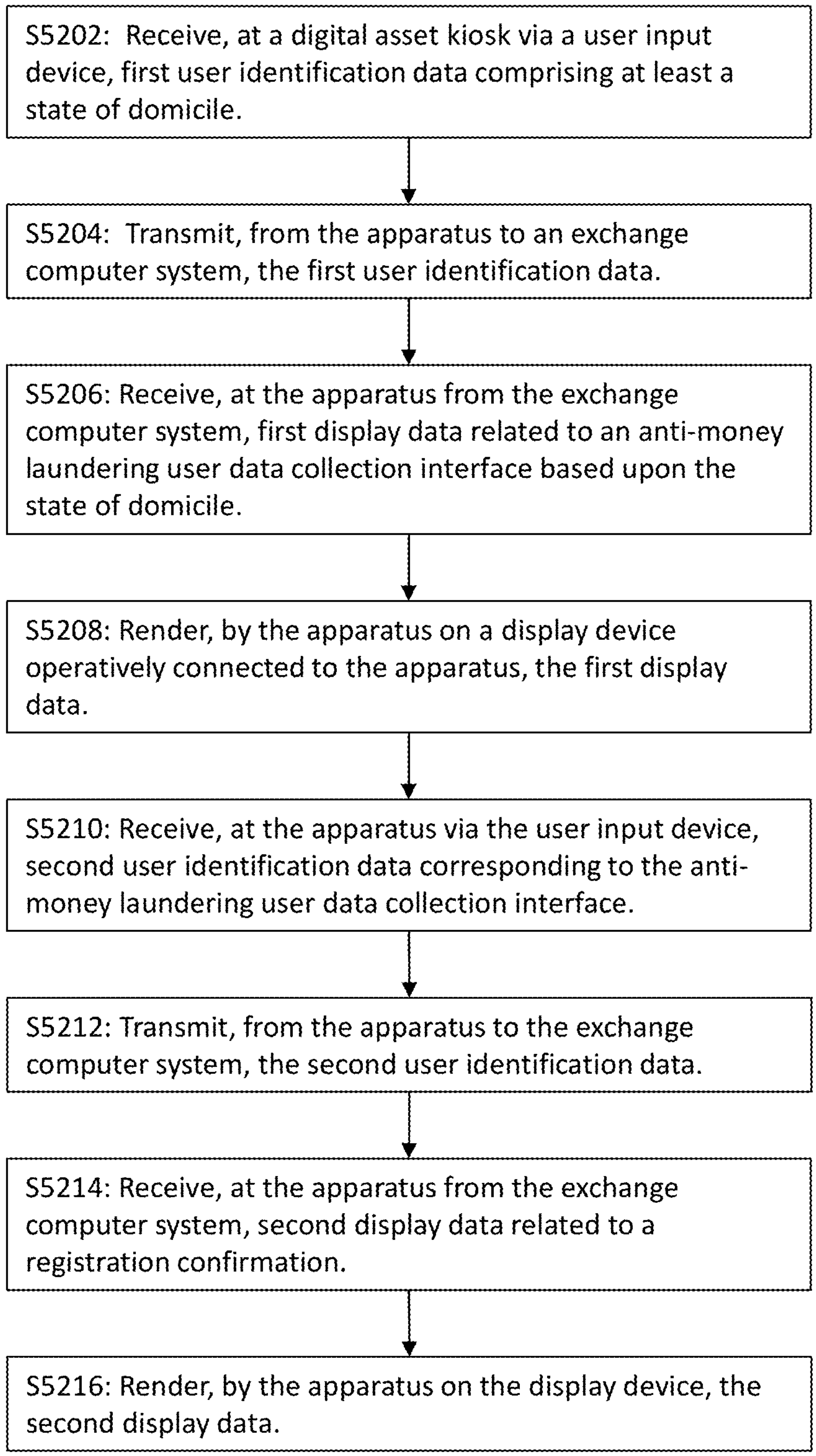
FIG. 41 is a flow chart of an exemplary process for performing an exchange transaction from an electronic kiosk in accordance with exemplary embodiments of the present invention.

FIG. 41 is a flow chart of an exemplary process for performing an exchange transaction from an electronic kiosk.

In a step S5202, a digital asset kiosk may receive via a user input device first user identification data comprising at least a state of domicile.

In a step S5204, the digital asset kiosk may transmit to an exchange computer system, the first user identification data.

In a step S5206, the digital asset kiosk may receive from the exchange computer system, first display data related to an anti-money laundering user data collection interface based upon the state of domicile.

In a step S5208, the digital asset kiosk may render on a display device operatively connected to the apparatus, the first display data.

In a step S5210, the digital asset kiosk may receive via the user input device, second user identification data corresponding to the anti-money laundering user data collection interface.

In a step S5212, the digital asset kiosk may transmit to the exchange computer system, the second user identification data.

In a step S5214, the digital asset kiosk may receive from the exchange computer system, second display data related to a registration confirmation.

In a step S5216, the digital asset kiosk may render on the display device, the second display data.

Accordingly, in embodiments, an apparatus, which may be an electronic kiosk, may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

Digital Asset Notification System

Figure 42A:
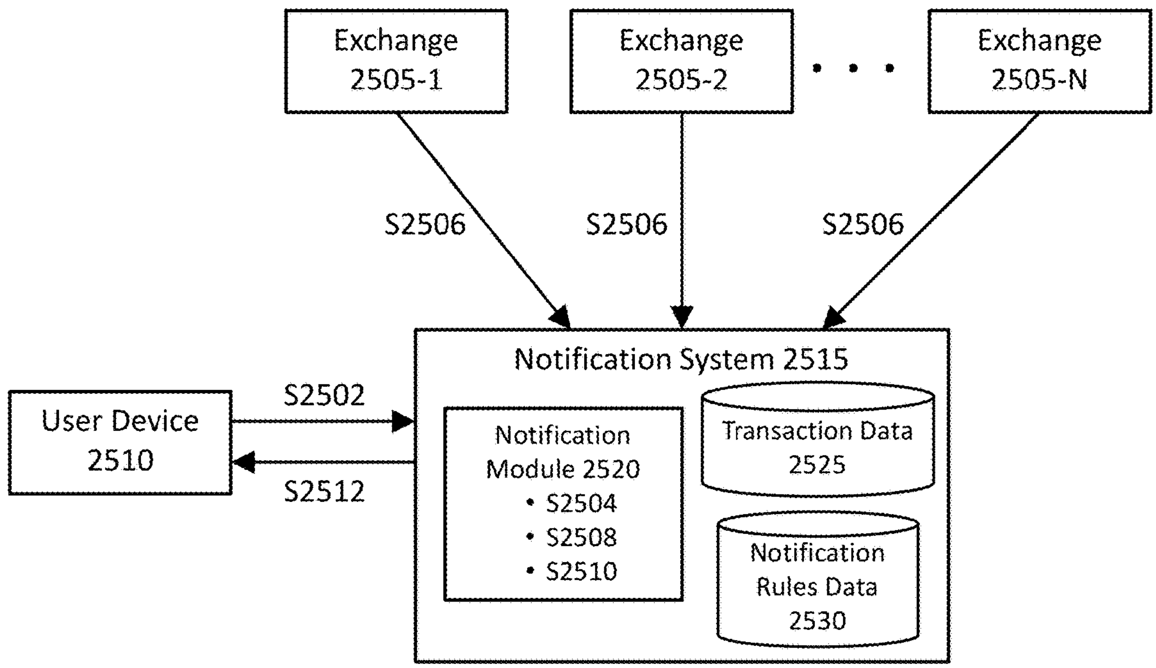
FIGS. 42A-B are a schematic diagram and corresponding flow chart showing participants in and processes for digital asset notifications in accordance with exemplary embodiments of the present invention.
Figure 42B:
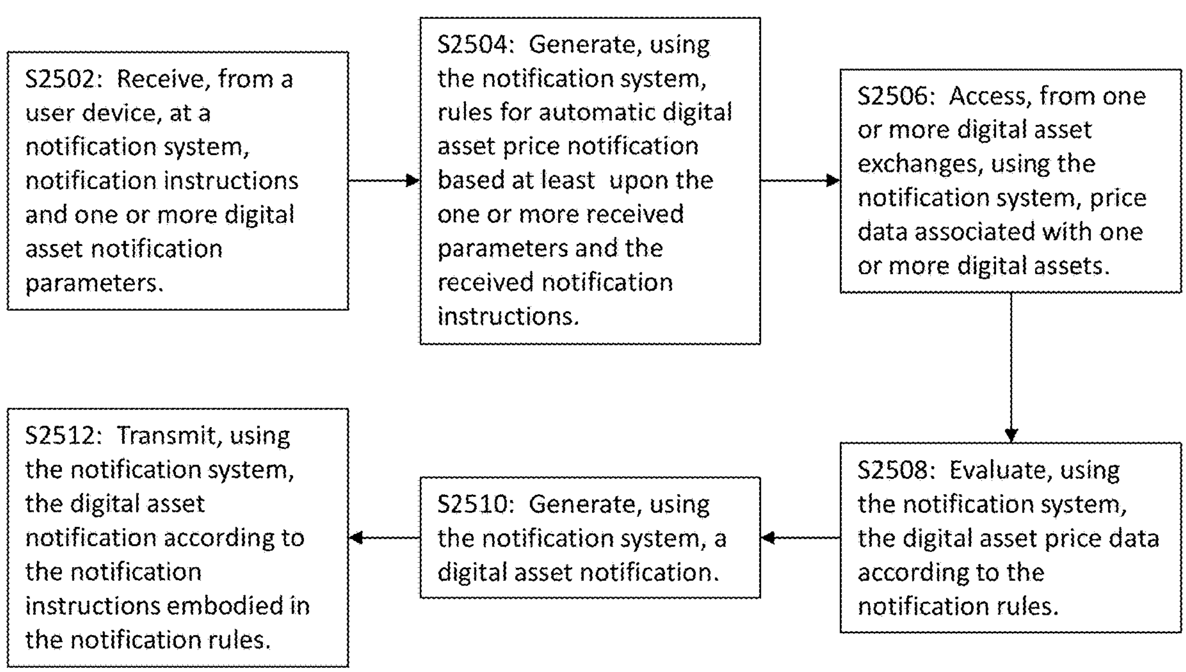

FIGS. 42A-B are a schematic diagram and corresponding flow chart showing an exemplary system and an exemplary process for providing digital asset notifications. Notifications may be provided as a feature of a digital wallet application and/or as a stand-alone service.

As shown in FIG. 42A, a user may subscribe for one or more notifications from a user device 2510, which may be a phone, smart phone, PDA, computer, tablet computer, to name a few. Notifications may also be received by a user device 2510. A notification system 2515 may receive digital asset price data from one or more digital asset exchange 2505 (e.g., 2505-1, 2505-2, . . . 2505-N). FIG. 25A illustrates the flow of steps and participants involved in performing the steps in an exemplary process for providing digital asset notifications, as described in greater detail herein with respect to FIG. 25B.

Referring again to FIG. 42A, a notification system 2515 can include a notification module 2520, price data 2525, and notification rules data 2530. A notification system 2515 can comprise one or more computers or computer systems having at least one or more processors, computer-readable memory comprising one or more databases, one or more communications portals for communicating with one or more other computers or computer systems, and/or one or more input devices. A notification module 2520 may be software that can process received notification instructions, generate notification rules, access digital asset price data, perform calculations and determinations using the price data and the notification rules, generate notifications, and/or transmit notifications, to name a few, as discussed herein with respect to FIG. 25B. In embodiments, the processes attributed to a notification module 2520 may be performed by one or more other software modules. In embodiments, one or more steps in a digital asset notification process may be decentralized, e.g., performed by a user device. Price data 2525 can include prices for one or more digital assets from one or more digital asset exchanges 2505. Transaction data 2525 can span any time period (e.g., the past 10 minutes, the past 24-hours, the past week, the past 3 months, all historical data, to name a few). Notification rules data 2530 may include user account data associated with notification settings, notification requests from users, generated notification rules, notifications, and notification history data, to name a few. Notification requests may comprise one or more notification instructions, and/or one or more digital asset notification parameters. Notification instructions may specify the frequency of notifications (e.g., real-time, once a day, once a week, to name a few), the notification alert types (e.g., SMS, email, mobile application push notifications, to name a few), and/or notification recipient information (e.g., email address, telephone number, mobile device ID, digital wallet ID, to name a few). Notification parameters may vary by notification type. For example, notification parameters may identify digital assets, digital asset exchanges, price thresholds (including price difference thresholds), time thresholds, rate thresholds (e.g., rate of increase, rate of decrease), exchange availability thresholds (e.g., whether a particular exchange is open for trading), to name a few, as required to set notifications as discussed herein.

FIG. 42B shows steps for providing digital asset notifications in accordance with exemplary embodiments of the present invention. In a step S2502, a notification system 2515 may receive from a user device 2510 notification instructions and one or more digital asset notification parameters. The received notification instructions and notification parameters may be stored by the notification system 2515. In embodiments, a user device 2510 may request notifications or otherwise activate or edit notifications by toggling notification settings through a software application (e.g., a mobile application or computer software) and/or through a website, to name a few. A user may also transmit a request for notifications, as through email, which request may indicate notification instructions and/or parameters or may trigger default or pre-programmed notification instructions and/or parameters.

In a step S2504, the notification system 2515 may generate one or more rules for automatic digital asset price notification based at least upon the one or more received parameters and the received notification instructions. For example, a notification rule may be a logical rule comprising a condition and an action. When the condition is satisfied, the action may be performed. Conditions may relate to the type of notification (e.g., price of a particular digital asset drops below a threshold, price exceeds a threshold, exchange is unavailable), and actions may relate to the type of notification (e.g., send an SMS to a particular mobile telephone number). The generated notification rules may be stored by the notification system 2515 and/or incorporated into price monitoring and comparison operations performed by a notification module 2520.

In a step S2506, the notification system 2515 may access, from one or more digital asset exchanges 2505, price data associated with one or more digital assets. A notification module 2520 may perform the step of accessing digital price data, e.g., by interfacing through one or more exchanges 2505 through one or more exchange APIs or by otherwise receiving or fetching the price data, as from a price feed. Price data may be normalized or otherwise formatted to be compatible with the notification system 2515.

In a step S2508, the notification system 2515 may evaluate the digital asset price data according to the notification rules. A notification module 2520 may perform step S2508. In embodiments, evaluation of digital asset price data may comprise comparing the price data to a price threshold to determine whether the threshold was reached and/or crossed.

In a step S2510, the notification system 2515 may generate one or more digital asset notifications. Notification generation may be performed by the notification module 2520. Digital asset notifications may be emails, SMS messages, push notifications, or other notifications, messages, or alerts, and they may indicate that notification criteria have been satisfied (e.g., price thresholds exceeded). Digital asset notifications may be price notifications, indicating the price of one or more digital assets.

In a step S2512, the notification system 2515 may transmit to one or more user devices 2510 the digital asset notification according to the notification instructions embodied in the notification rules. For example, notifications may be transmitted both to a cell phone, to an email account, and to a digital wallet client running on a computer. In embodiments, the user device 2510 that requests notifications (e.g., by setting notification settings) in a step S2502 may be a different user device from the user device that receives notifications in a step S2512. In embodiments, the users associated with the user devices that request notifications and receive notifications may be different users.

Figure 43A:
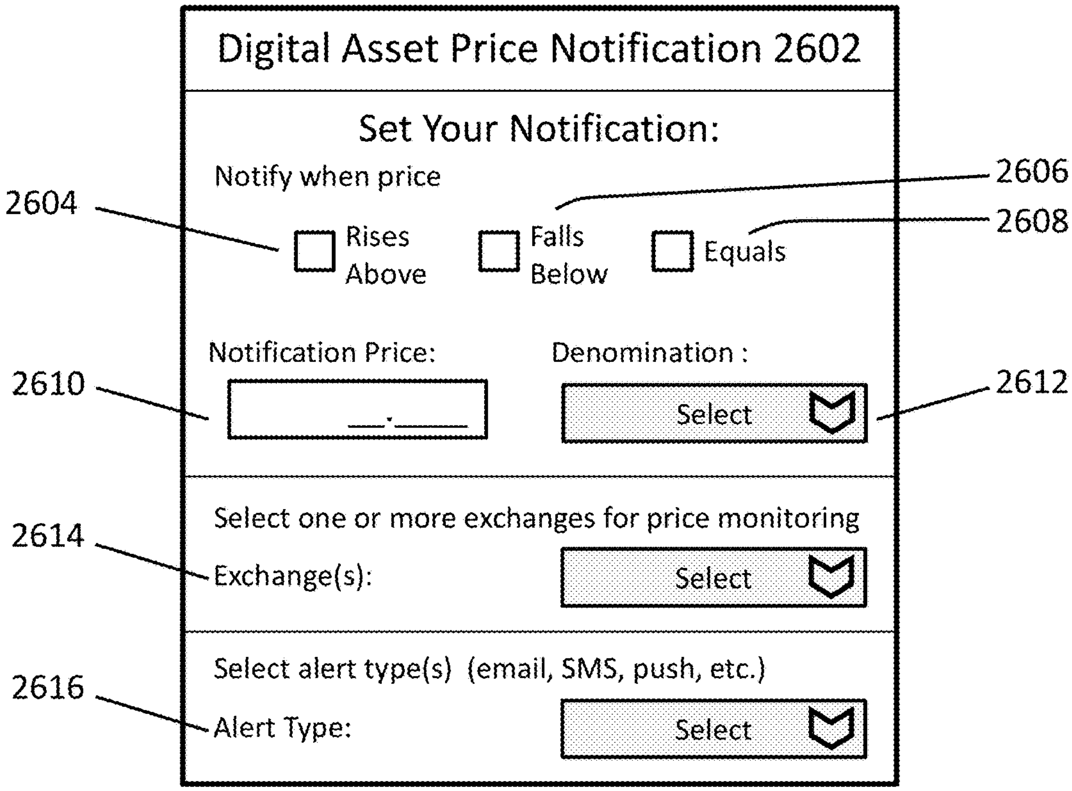
FIGS. 43A-B are exemplary screen shots associated with setting digital asset notification in accordance with exemplary embodiments of the present invention.
Figure 43B:
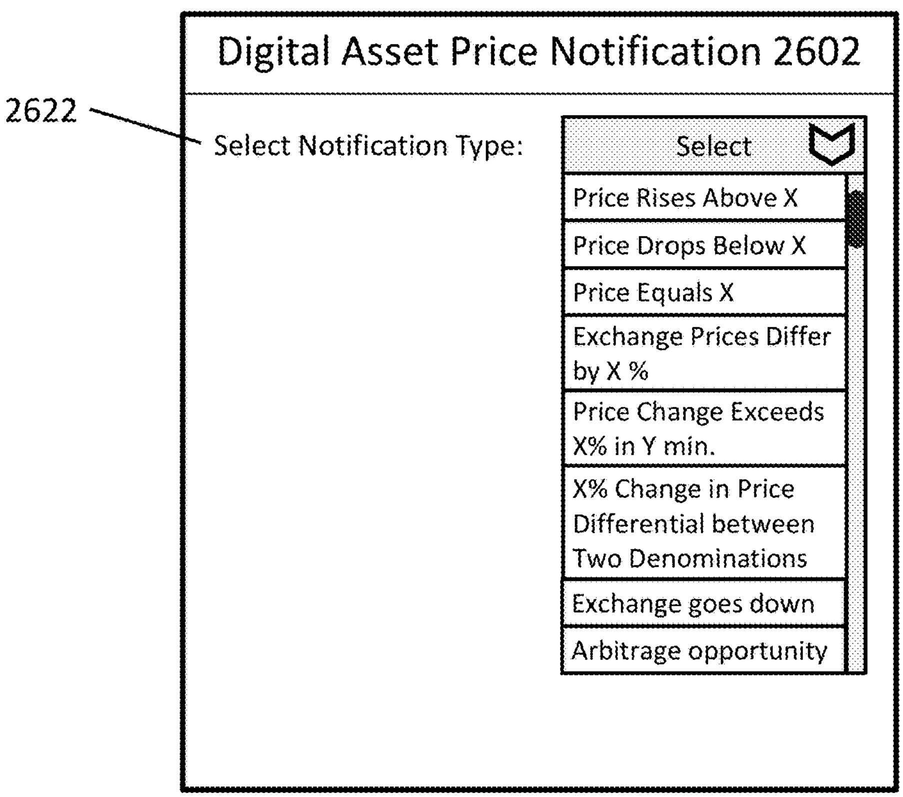

FIGS. 43A-B are exemplary screen shots for setting digital asset notifications in exemplary embodiments of the present invention. FIG. 26A shows a digital asset price notification setup menu 2602. A user can select from various options related to a price threshold, including a rises above option 2604, a falls below option 2602, or an equals option 2608. A user can set a notification price 2610 and the corresponding denomination 2612, which comprise the price threshold. In embodiments, a user can set a notification price 2610 for a particular digital asset, but express the price in a different denomination (e.g., set a notification for when the price of one bitcoin rises above 500 USD). A user may select one or more exchanges 2614 from which to monitor digital asset prices. A user may also select an alert type 2616, which can be used to set notification instructions. Alert types can include email, SMS, push notifications, to name a few.

FIG. 43B shows an exemplary interface for selecting a notification type 2622 in accordance with embodiments of the present invention. Notification types can indicate when a digital asset price rises above a threshold value, when a digital asset price drops below a threshold value, when a digital asset price equals a threshold value, when digital asset prices from two or more exchanges differ by a threshold amount (e.g., a percentage price difference), when a rate of digital asset price change meets or exceeds a threshold (e.g., the bitcoin price in USD changes 5% in 2 minutes, the Litecoin price rises by 10 Litecoin in 1 hour, to name a few), when the price differential between two denominations meets or exceeds a threshold (e.g., the ratio of bitcoin price to USD changes by 2%), when an exchange is unavailable (e.g., a particular exchange is not processing trades, an exchange from a list of exchanges to monitor is not available for trading, an exchange having an typical average daily volume exceeding some threshold is unavailable for trading), when volume of one or more exchanges satisfies (e.g., exceeds, reaches, or falls below) a threshold volume, when a difference in price between two exchanges satisfies a threshold (e.g., when prices from two predefined exchanges exceed a specified amount, or when the price differential of some threshold amount or percentage exists between any two of a plurality of exchanges being monitored), when a difference in transaction volume between two exchanges satisfies a threshold, and/or when an arbitrage opportunity exists (e.g., the conversion from USD to EUR to bitcoin yields more bitcoin than the conversion from USD to bitcoin directly), to name a few. In embodiments, a notification type may comprise a digital wallet activity monitor, which may alert a user when any transactions or other activity is performed using a specified digital wallet. Such monitoring may entail monitoring a public ledger or transaction log, such as the Bitcoin blockchain. A user may input a wallet address or public key in order to request monitoring of the wallet. A user may input or select rules for wallet monitoring notifications, such as to receive notifications for any transactions involving the wallet, when assets are sent from the wallet, when assets exceeding a threshold amount are sent from the wallet, and/or when assets are sent to an address not on an approved list, to name a few. The notification system may generate and perform electronic monitoring instructions corresponding to the rules received from the user. A notification system may operate a digital asset network node in order to monitor an electronic transaction ledger. After a notification type 2622 is selected, a user may be required to input or otherwise set corresponding parameters, such as digital asset denominations to monitor, price thresholds, rates of price change, time periods for monitoring, and/or exchanges to monitor, to name a few.

Figure 44A:
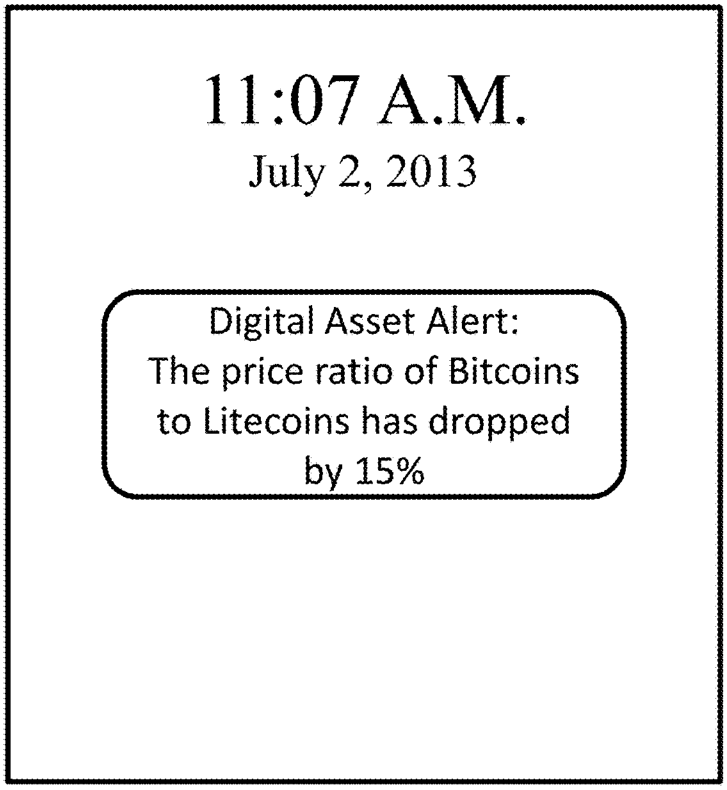
FIGS. 44A-C are exemplary screen shots of digital asset notifications in accordance with exemplary embodiments of the present invention.
Figure 44B:
Figure 44C:
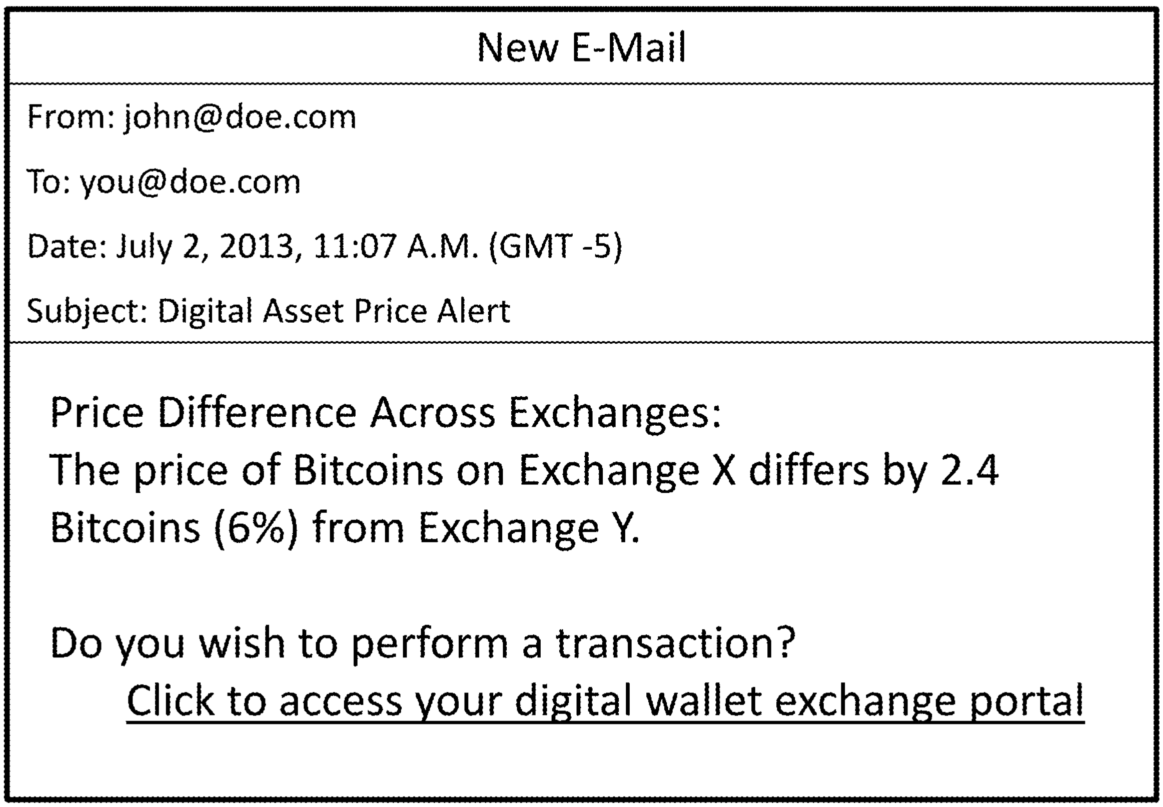

FIGS. 44A-C are exemplary automated digital asset transactions in accordance with exemplary embodiments of the present invention. FIG. 44A illustrates an exemplary push notification, which may be received and/or displayed on a smart phone. The exemplary notification indicates that the price ratio of bitcoin to Litecoin has dropped by 15%. FIG. 44B illustrates an exemplary SMS notification. It indicates that the price of bitcoin is dropping at a rate of 22% per hour. FIG. 44C is an exemplary email notification. It indicates that there is a digital asset price difference across exchanges (e.g., Exchange X and Exchange Y) and shows an absolute value of the price difference (e.g., 2.4 bitcoin) as well as a percentage difference (e.g., 6%). The email notification also provides a user with a link (e.g., a hyperlink to a website or to a software application) to access an exchange function of a digital wallet in order to perform one or more exchange transactions. Notifications can also include an option (e.g., a button, link, and/or other navigational tool or interface) to manage alerts, which can include setting notification types, alert types, and/or settings therefor. In other embodiments, alerts may be provided within applications, such as within a digital wallet client.

Digital Asset Automated Transaction System

Figure 45A:
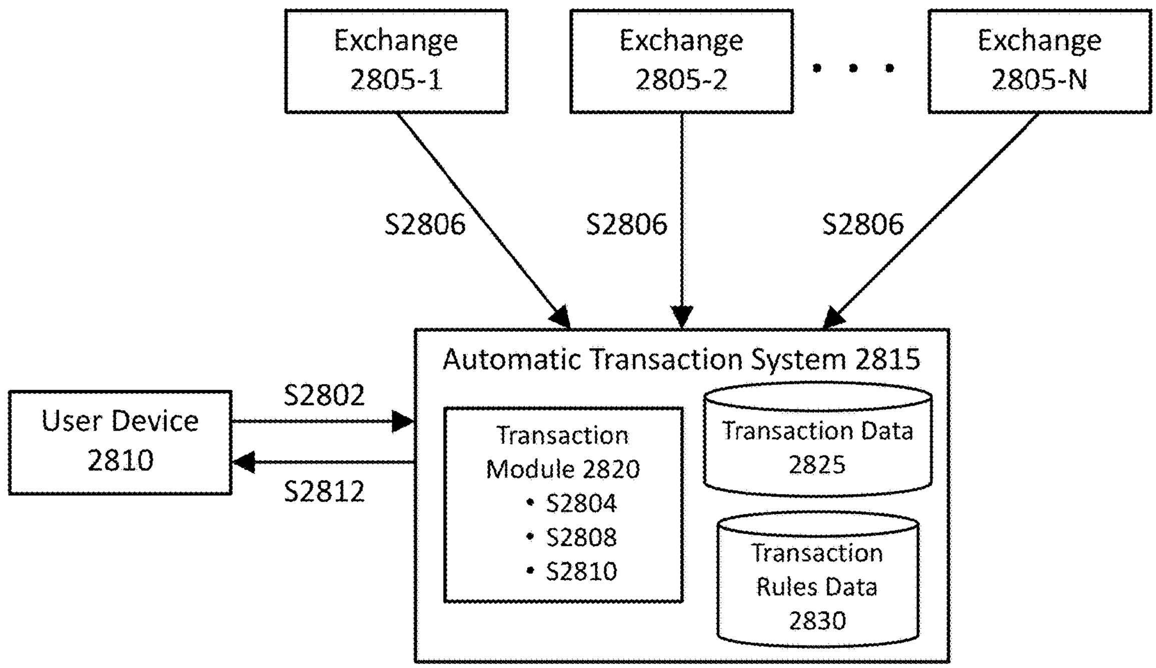
FIGS. 45A-B are a schematic diagram and corresponding flow chart showing participants in and processes for automated digital asset transactions in accordance with exemplary embodiments of the present invention.
Figure 45B:
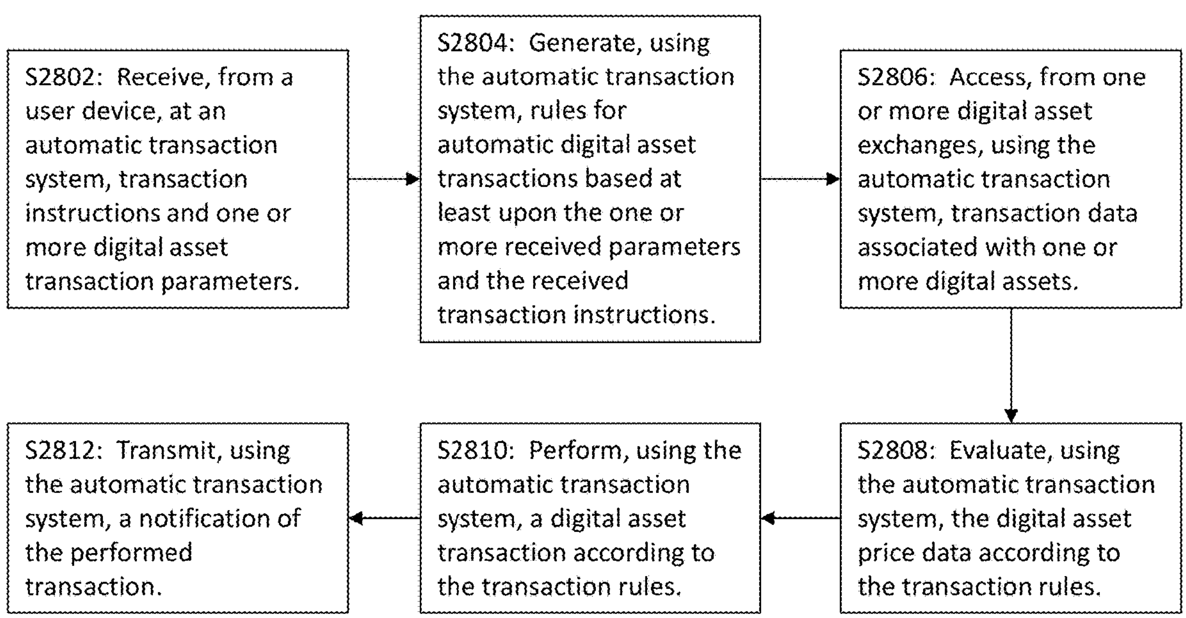

FIGS. 45A-B are a schematic diagram and corresponding flow chart showing an exemplary system and an exemplary process for performing automated digital asset transactions. Automated transactions may be provided as a feature of a digital wallet application and/or as a stand-alone service. A stand-alone service may require a link to a digital wallet, bank account, credit card, and/or a deposit of funds with the stand-alone service.

FIG. 45A is a schematic diagram of an exemplary automatic digital asset transaction system and the entities involved in such a system. A user can arrange, from a user device 2810, for automated digital asset transactions. A user device 2810 can include a phone, smart phone, PDA, computer, and/or tablet computer, to name a few. A user may use a plurality of user devices 2810 in connection with the automatic digital asset transaction system of embodiments of the present invention.

An automatic digital asset transaction system 2815 can receive data, such as digital asset transaction data and/or digital asset price data, from one or more exchange 2805 (e.g., 2805-1, 2805-2, . . . , 2805-N), which may be digital asset exchanges. In embodiments, data may be received from one or more exchange agents.

Still referring to FIG. 45A, an automatic digital asset transaction system 2815 can comprise one or more computers or computer systems having at least one or more processors, computer-readable memory comprising one or more databases, one or more communications portals for communicating with one or more other computers or computer systems, and/or one or more input devices. An automatic digital asset transaction system 2815 can include a transaction module 2820, price data 2825, and/or transaction rules data 2830, to name a few. Price data 2585 can include prices for one or more digital assets from one or more digital asset exchanges 2805, which may also comprise exchange rate data. Price data 2825 can span any time period. In embodiments, one or more databases may store the data described herein. In embodiments, one or more software modules may perform the functions attributed herein to a transaction module 2820.

A transaction module 2820 may be software that can receive transaction instructions and transaction parameters, generate transaction rules, access data from one or more exchanges 2805, evaluate digital asset price data according to transaction rules, perform automated transactions (e.g., when pre-defined conditions are met), request authority (e.g., from a user) to proceed with an automatically generated transaction, and/or provide notifications of completed transactions, to name a few. In embodiments, one or more steps in a digital asset notification process may be decentralized, e.g., performed by a user device.

FIG. 45B shows steps for performing automated digital asset transactions in accordance with exemplary embodiments of the present invention. In a step S2802, an automatic transaction system 2815 may receive, from a user device 2810, transaction instructions and one or more transaction parameters. In embodiments, transaction parameters may include a digital asset strike price, e.g., to sell a specified amount of digital assets when the price equals, rises above, or falls below a predefined threshold, wherein the amount of digital assets to transact may be specified in a different denomination, such as USD. Transaction parameters thus may indicate digital asset denominations, digital asset amounts (expressed in any denomination, including fiat currency denominations), digital asset exchanges, time periods, rates of change, and/or absolute amounts of change, to name a few. Transaction instructions may indicate actions regarding digital assets, such as whether to buy, sell, hold, and/or convert to a different denomination of digital asset or fiat currency, to name a few.

In a step S2804, the automatic transaction system 2815 may generate one or more rules for automatic digital asset transactions based at least upon the one or more received transaction parameters and the received transaction instructions. The generated rules may be logical rules comprising one or more conditions and one or more actions to perform when the conditions are met or not met. Such logical rules may be implemented by computer code running on one or more computers associated with the automatic transaction system 2815. The generation of transaction rules may be performed by a transaction module 2820.

In a step S2806, the automatic transaction system 2815 may access, from one or more digital asset exchanges 2805, transaction data, which may include price data, associated with one or more digital assets. The automatic transaction system 2815 may store transaction data 2825 in one or more databases. The transaction data may be fetched or otherwise received, e.g., using APIs or data feeds from one or more exchanges 2805 or exchange agents. Transaction data may be normalized or otherwise formatted to be compatible with an automatic transaction system 2815, which formatting may be performed by a transaction module 2820.

In a step S2808, the automatic transaction system 2815 may evaluate the digital asset transaction data according to the generated transaction rules. In embodiments, evaluation of the digital asset transaction data may involve testing the transaction data against one or more logical conditions embodied in the transaction rules. For example, the transaction data may be evaluated to determine whether the digital asset price has reached or crossed a threshold value or whether a rate of change in the price has met or crossed a threshold value. A transaction module 2820 may perform the evaluation of the transaction data.

In a step S2810, the automatic transaction system 2815 may perform one or more digital asset transactions according to the transaction rules. Transactions may be performed, initiated, and/or verified by a transaction module 2820. The digital asset transactions may only be performed when one or more conditions are satisfied. In embodiments, an alert of a potential transaction and/or a request for authorization may be sent to a user before automatically performing a transaction. Receipt of a user's authorization by the automatic transaction system 2815 may be required before the system will perform a transaction. Authorization may be provided through telephone (e.g., dialing a number and entering certain digits), SMS (e.g., replying to a text message, sending a code, and/or sending another message authorizing a transaction), email (e.g., replying to an email and/or sending a certain message in the body and/or subject line), website (e.g., clicking an "Authorize" button), and/or within a software application, such as a digital wallet, to name a few. In embodiments, a request for authorization may be sent, and the transaction may be performed automatically if no response is received within a predetermined amount of time, settings for which may be set in advance by a user and/or set by default.

In a step S2812, the automatic transaction system 2815 may transmit one or more notifications of the performed transaction to one or more user devices 2810. Notifications may be generated by a transaction module 2820. In embodiments, notifications of incomplete, pending, and/or failed transactions may be transmitted. In embodiments, the automatic transaction system 2815 may provide a portal or other mechanism for a user to monitor and/or receive updates regarding transaction statuses. The automatic transaction system 2815 may provide a log of all transactions and/or automatic transactions performed by the system and/or by a user. In embodiments, the automatic transaction system 2815 may provide a log of all transaction opportunities, including declined transactions (e.g., not authorized by a user).

Digital Asset Automated Arbitrage System

Figure 46A:
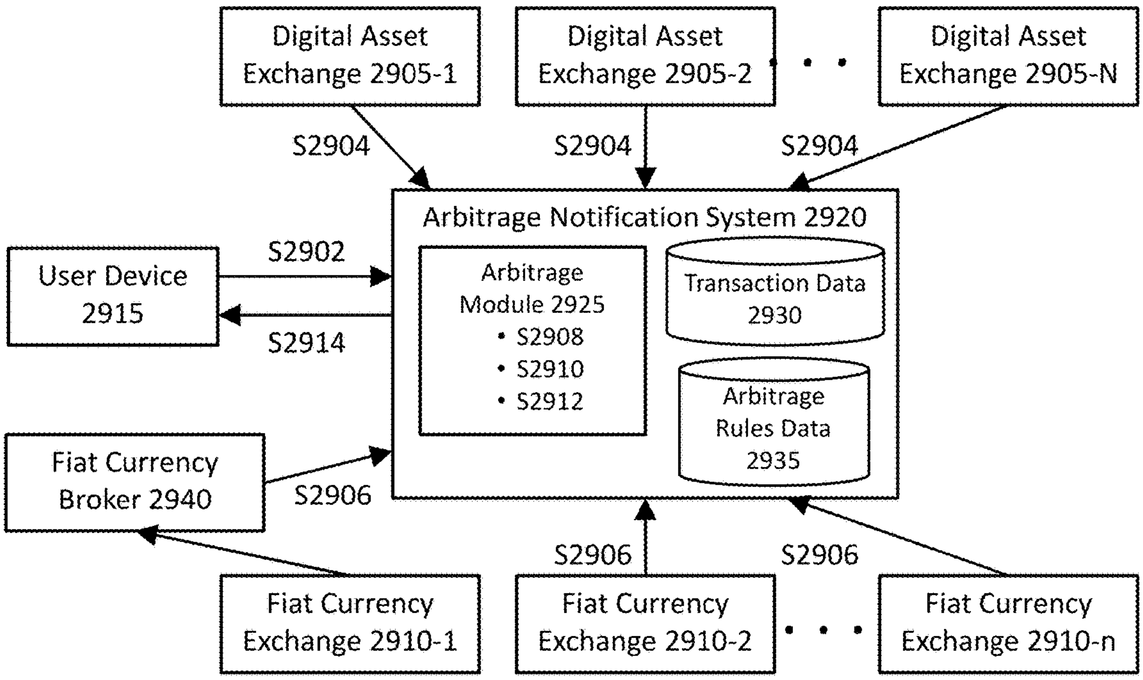
FIGS. 46A-B are a schematic diagram and corresponding flow chart showing participants in and processes for providing digital asset arbitrage opportunity notifications in accordance with exemplary embodiments of the present invention.
Figure 46B:
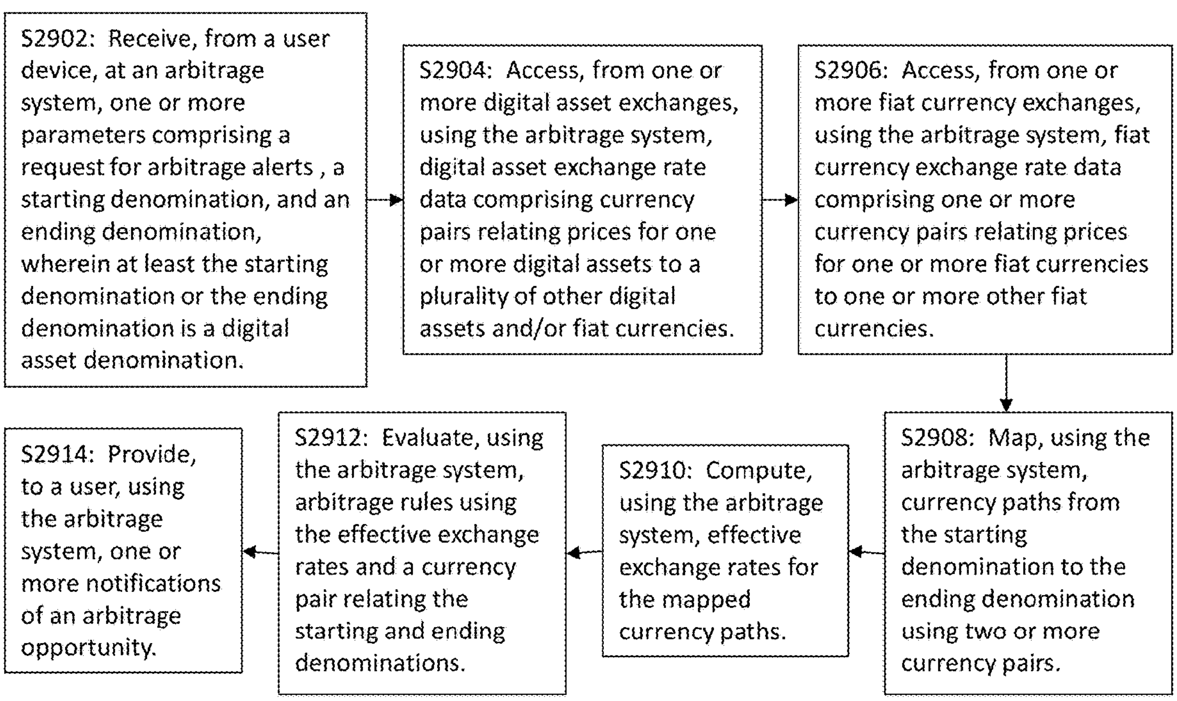

FIGS. 46A-B are a schematic diagram and corresponding flow chart showing an exemplary system and an exemplary process for providing notifications of digital asset arbitrage opportunities. Arbitrage opportunities can arise due to exchange rate differences between different currency pairs. Embodiments of the present invention provide an automated system to map exchange rate transactions involving a plurality of exchanges and at least one digital asset and to compare the corresponding effective exchange rate to an exchange rate for a single currency pair. If the mapped plurality of exchange transactions has a different exchange rate from the rate for the single currency pair, an arbitrage notification system may provide notifications of the corresponding arbitrage opportunity. A transaction may be mapped from a digital asset to a fiat currency with any number of intermediate fiat currency and/or digital asset exchange transactions, from a fiat currency to a digital asset with any number of intermediate fiat currency and/or digital asset exchange transactions, and/or from a fiat currency to a fiat currency with at least one intermediate digital asset exchange and any number of other intermediate exchanges. Accordingly, one or more foreign exchange transactions may be performed, as described herein.

FIG. 46A is a schematic diagram of an exemplary arbitrage notification system and the entities involved in such a system. A user can arrange, from a user device 2915, for arbitrage notifications. A user device 2915 can include a phone, smart phone, PDA, computer, and/or tablet computer, to name a few. A user may use a plurality of user devices 2915 in connection with the arbitrage notification system of embodiments of the present invention.

An arbitrage notification system 2920 can receive data, such as digital asset transaction data, from one or more digital asset exchange 2905 (e.g., 2905-1, 2905-2, . . . , 2905-N). In embodiments, data may be received from one or more digital asset exchange agents. An arbitrage notification system 2920 can also receive data, such as fiat currency price data, from one or more fiat currency exchanges 2910 (e.g., 2910-1, 2910-2, . . . 2910-*n*). In embodiments, fiat currency price data may be received from one or more fiat currency brokers 2940. In embodiments, receiving data may entail fetching data, such as by using an API to access data from one or more exchange.

Still referring to FIG. 29A, an arbitrage notification system 2920 can comprise one or more computers or computer systems having at least one or more processors, computer-readable memory comprising one or more databases, one or more communications portals for communicating with one or more other computers or computer systems, and/or one or more input devices. An arbitrage notification system 2920 can include an arbitrage module 2925, price data 2930, and/or arbitrage rules data 2935, to name a few. Transaction data 2930 can include prices for one or more digital assets, which may come from one or more digital asset exchanges 2905, as well as prices for one or more fiat currencies, which may come from one or more fiat currency exchanges 2910. Transaction data 2930 can also include volume transacted. Transaction data may comprise exchange rate data, such as currency pairs, which relate the exchange rate between two differently denominated currencies or assets. Transaction data 2930 can span any time period. In embodiments, one or more databases may store the data described herein. In embodiments, one or more software modules may perform the functions attributed herein to an arbitrage module 2925.

An arbitrage module 2925 may be software that receives and/or processes requests for arbitrage alerts, generates arbitrage notification rules, stores arbitrage notification rules, executes operations to access data from digital asset and fiat currency exchanges, maps exchange transactions, computes effective exchange rates for mapped transactions, evaluates effective exchange rates and direct exchange rates in accordance with arbitrage notification rules, and/or provides notifications of arbitrage opportunities, to name a few. In embodiments, one or more steps in an arbitrage notification process may be decentralized, e.g., performed by a user device.

FIG. 46B is a flow chart showing steps in an exemplary process for providing arbitrage alerts in exemplary embodiments of the present invention. In a step S2902, an arbitrage notification system 2920 may receive, from a user device 2915, one or more parameters comprising a request for arbitrage alerts, a starting denomination, and/or an ending denomination, where the starting and/or ending denomination is a digital asset denomination. In embodiments, both the starting and ending denominations may be fiat currency denominations. Parameters may identify digital assets, fiat currencies, threshold amounts (e.g., specifying notifications for arbitrage opportunities with 2% returns or higher), alert types, notification frequencies, and/or notification recipients, to name a few. The arbitrage notification system 2920 may generate and/or store arbitrage notification rules based upon the received parameters. Arbitrage notification rules may comprise notification criteria. Arbitrage notification rules may be logical rules comprising conditions (e.g., to test for the presence of arbitrage opportunities satisfying the received parameters) and/or corresponding notification actions. In embodiments of the present invention, arbitrage opportunities may relate to a futures market and/or futures prices including at least one digital asset.

In a step S2904, the arbitrage notification system 2920 may access, from one or more digital asset exchanges 2905, digital asset exchange rate data, which may comprise currency pairs relating prices for one or more digital assets to a plurality of other digital assets and/or fiat currencies. In embodiments, other digital asset data may be accessed. For example, a USD/BTC currency pair would provide a ratio of U.S. dollars to bitcoin, which would comprise an exchange rate. Such a currency pair may be used to compute transactions from USD to bitcoin and from bitcoin to USD (using the reciprocal of the exchange rate). Accessing digital asset exchange rate data may entail using one or more APIs for one or more digital asset exchanges 2905 to fetch the price data and/or receiving a data stream of price data. In embodiments, digital asset exchange rate data may be obtained from one or more broker or exchange agent.

In a step S2906, the arbitrage notification system 2920 may access, from one or more fiat currency exchanges 2910, flat currency exchange rate data, which may comprise one or more currency pairs relating prices for one or more fiat currencies to one or more other fiat currencies. An example of a fiat currency pair is EUR/USD, which relates Euros to U.S. dollars. Fiat currency exchange rate data may be accessed using one or more APIs for one or more flat currency exchanges and/or by reading a data feed from one or more exchanges, to name a few. In embodiments, a fiat currency exchange 2910 may be an exchange in the foreign exchange market. In embodiments, exchange rate data may be obtained from one or more exchange agent or broker, such as a fiat currency broker 2940.

In a step S2908, the arbitrage notification system 2920 may map currency paths from a starting denomination to an ending denomination using at least two currency pairs or at least three denominations, since two currency pairs may share a common base. In embodiments, the arbitrage notification system 2920 may calculate arbitrage opportunities from the starting denomination to the ending denomination and/or from the ending denomination to the starting denomination. For the path from the starting to the ending denomination, the first currency pair in the currency path should include the starting denomination, while the last pair in the currency path should include the ending denomination. A currency path can include any number of intermediate currency pairs, which may or may not be cross currency pairs. For example, a currency path from USD to BTC may involve 1/(EUR/USD)*(EUR/JPY)*(JPY/BTC), where EUR/JPY is an intermediate cross currency pair. In embodiments, no starting or ending denominations may be received in a step S2902, and the arbitrage notification system 2920 may determine one or more currency paths relating a variety of denominations to detect the presence of any arbitrage opportunity among denominations supported by the arbitrage notification system 2920. In embodiments, only a starting or an ending denomination may be received, in which case the arbitrage notification system 2920 may determine a plurality of currency paths that start and/or end with the received denomination.

In a step S2910, the arbitrage notification system 2920 may compute effective exchange rates for the mapped currency paths. An effective exchange rate may relate the prices of two endpoints of a currency path. The effective exchange rate may be computed by multiplying the exchange rate for each currency pair in the currency path.

In a step S2912, the arbitrage notification system 2920 may evaluate (e.g., by processing on a computer system) arbitrage notification rules to determine the presence of an arbitrage opportunity meeting notification criteria and to determine actions to perform (e.g., notifications to transmit) based thereupon. In embodiments, evaluating arbitrage notification rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist. An arbitrage opportunity can exist where the effective exchange rate is either greater than or less than the direct exchange rate.

The arbitrage notification system 2920 can formulate one or more transactions to take advantage of the arbitrage opportunity. The transactions required and the order in which they should be performed will depend, at least in part, on whether the effective exchange rate is greater than or less than the direct exchange rate. In embodiments, transactions may be structured to convert from one denomination to a different denomination. In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination). Notifications may be provided to alert one or more users of the existence and/or details of such formulated transactions.

Accordingly, in a step S2914, the arbitrage notification system 2920 may provide to one or more user devices 2915 one or more notifications of one or more arbitrage opportunities. Notifications may indicate the existence of an arbitrage opportunity. Notifications may indicate a projected return on a series of transactions (e.g., 5% increase in bitcoin holdings, 23 BTC increase, 800 USD increase, to name a few). Notifications may also indicate a currency path and/or a plurality of formulated transactions. Notifications can be provided to a plurality of devices associated with a user and via a plurality of media (e.g., SMS, email, automated telephone call, push notification, to name a few).

Figure 47A:
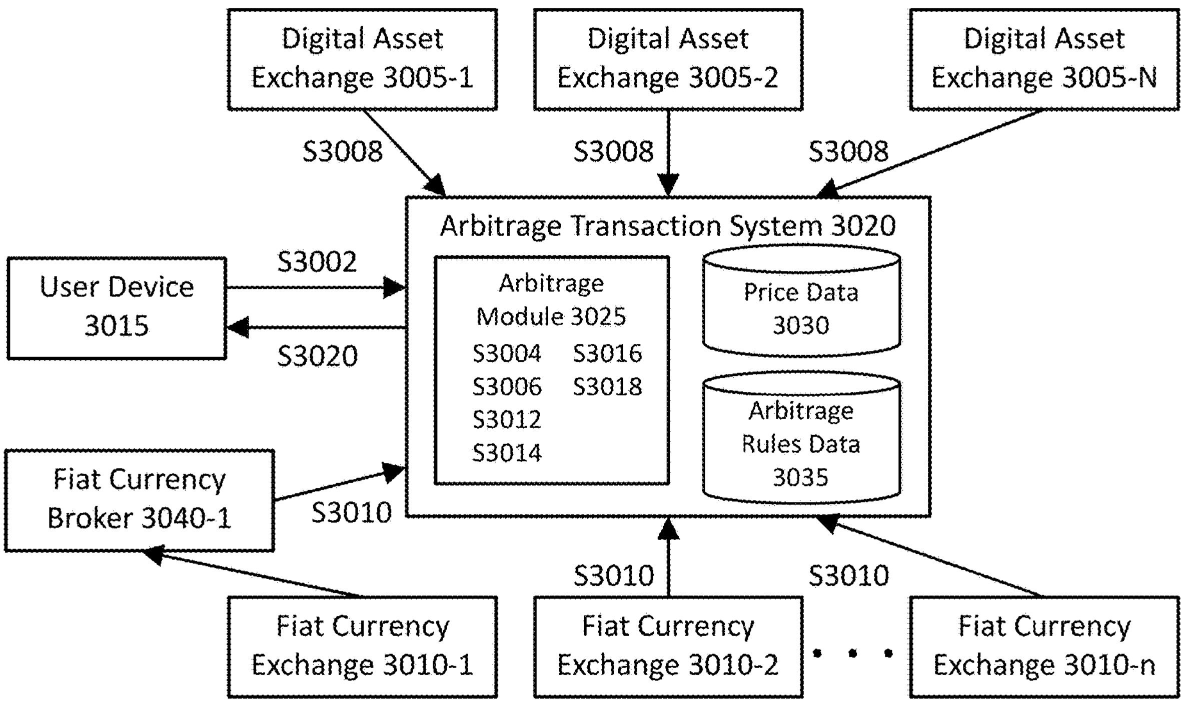
FIGS. 47A-B are a schematic diagram and corresponding flow chart showing participants in and processes for performing automated digital asset arbitrage transactions in accordance with exemplary embodiments of the present invention.
Figure 47B:
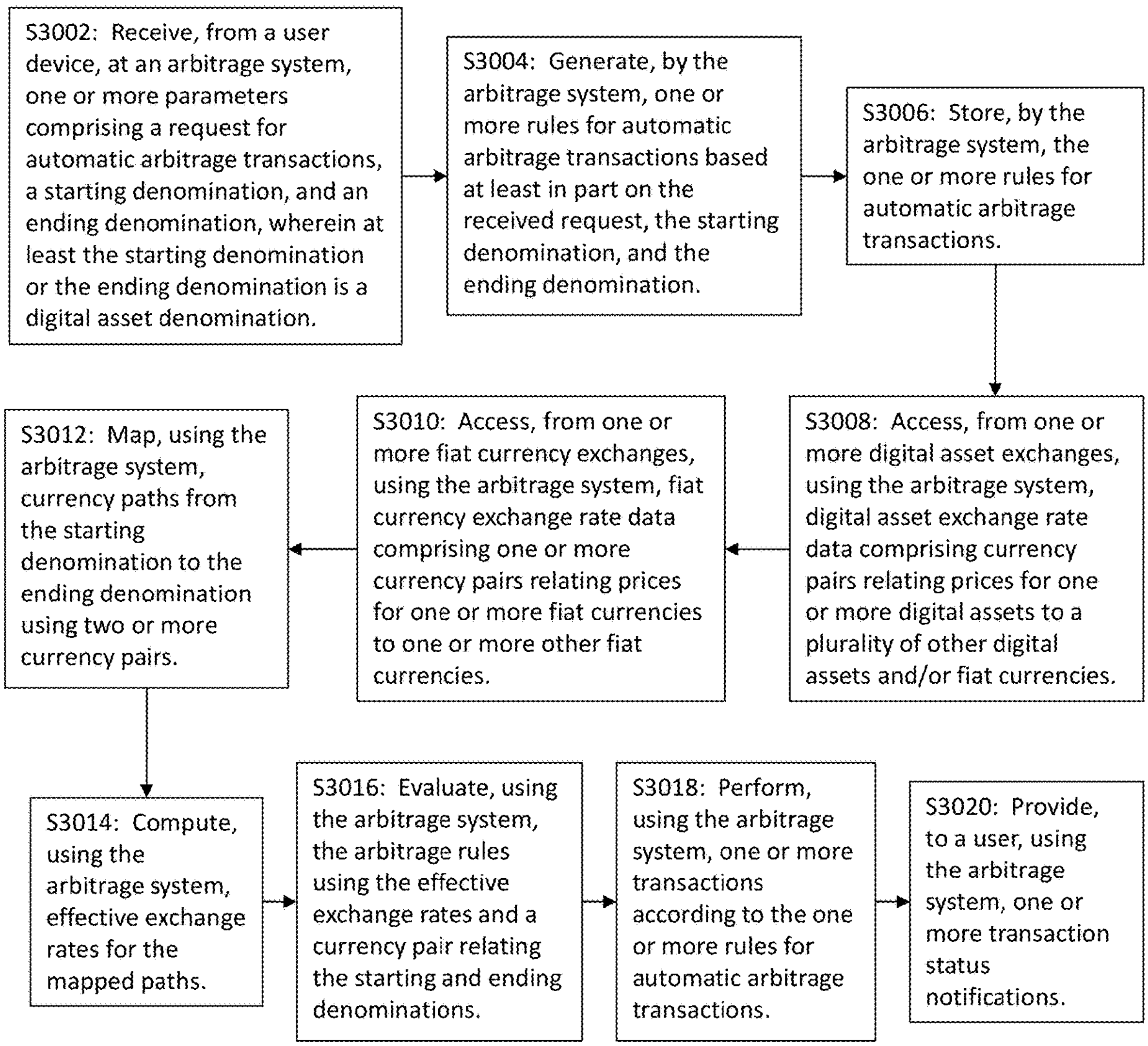

FIGS. 47A-B are a schematic diagram and corresponding flow chart showing an exemplary system and an exemplary process for performing digital foreign exchange systems opportunities in accordance with embodiments of the present invention. The exemplary system and processes described with respect to FIGS. 47A-B are similar to the exemplary arbitrage notification system discussed with respect to FIGS. 46A-B, with the added capability to execute formulated transactions to take advantage of determined arbitrage opportunities. Transactions may be performed to exchange digital assets to fiat currencies, digital assets to other digital assets, fiat currencies to digital assets, and/or fiat currencies to other fiat currencies involving intermediate digital asset exchange transactions. In embodiments, circular transactions may be performed to convert a starting digital asset to one or more intermediate denominations and then back to the starting digital asset. Circular transactions may also be performed to convert a starting fiat currency to one or more intermediate denominations involving at least one digital asset and then back to the starting fiat currency.

FIG. 47A is a schematic diagram of an exemplary arbitrage transaction system and the entities involved in such a system. A user can arrange, from a user device 3015, for automated arbitrage transactions. A user device 3015 can include a phone, smart phone, PDA, computer, and/or tablet computer, to name a few. A user may use a plurality of user devices 3015 in connection with the arbitrage transaction system of embodiments of the present invention (e.g., to set transaction settings, to confirm or authorize transactions, and/or to receive transaction status notifications).

An arbitrage transaction system 3020 can receive data, such as digital asset price data, from one or more digital asset exchange 3005 (e.g., 3005-1, 3005-2, . . . , 3005-N). In embodiments, data may be received from one or more digital asset exchange agents or brokers. An arbitrage transaction system 3020 can also receive data, such as fiat currency price data, from one or more fiat currency exchanges 3010 (e.g., 3010-1, 3010-2, . . . 3010-*n*). In embodiments, fiat currency price data may be received from one or more fiat currency brokers 3040. In embodiments, receiving data may entail fetching data, such as by using an API to access data from one or more exchange.

Still referring to FIG. 47A, an arbitrage transaction system 3020 can comprise one or more computers or computer systems having at least one or more processors, computer-readable memory comprising one or more databases, one or more communications portals for communicating with one or more other computers or computer systems, and/or one or more input devices. An arbitrage transaction system 3020 can include an arbitrage module 3025, price data 3030, and/or arbitrage rules data 3035, to name a few. Price data 3030 can include prices for one or more digital assets, which may come from one or more digital asset exchanges 3005, as well as prices for one or more fiat currencies, which may come from one or more fiat currency exchanges 3010. Price data 3030 may comprise exchange rate data, such as currency pairs, which relate the exchange rate between two differently denominated currencies or assets. Price data 3030 can span any time period. Price data 3030 may be converted into any form necessary for processing or normalizing against other price data (e.g., price data may be stored in 15-second increments). In embodiments, one or more databases may store the data described herein. In embodiments, one or more software modules may perform the functions attributed herein to an arbitrage module 3025.

An arbitrage module 3025 may be software that receives and/or processes requests for automated arbitrage transactions, generates arbitrage transaction rules, stores arbitrage transaction rules, executes operations to access data from digital asset and fiat currency exchanges, maps exchange transactions, computes effective exchange rates for mapped transactions, evaluates effective exchange rates and direct exchange rates according to arbitrage transaction rules, requests and/or processes transaction confirmation, performs transactions, and/or provides notifications of arbitrage transaction statuses, to name a few. In embodiments, one or more steps in an arbitrage notification process may be decentralized, e.g., performed by a user device.

FIG. 47B is a flow chart showing steps in an exemplary process for providing arbitrage alerts in exemplary embodiments of the present invention. In a step S3002, an arbitrage transaction system 3020 may receive, from a user device 3015, one or more parameters comprising a request for automated arbitrage transactions, a starting denomination, and an ending denomination. In embodiments, the starting denomination or the ending denomination may be a digital asset denomination, or the starting and ending denomination may be a fiat currency denomination and at least one intermediate digital transaction will be performed. In embodiments, the system may not receive a starting or an ending denomination or may not receive either. In such cases, the system may identify all possible transactions using whatever denomination is received or using any denominations supported by the arbitrage transaction system 3020. The parameters may be transaction criteria to determine when to perform transactions and/or parameters to govern how to perform transactions. Parameters may identify digital assets, fiat currencies, threshold amounts (e.g., specifying notifications for arbitrage opportunities with 2% returns or higher), amount of assets or currencies approved for automatic trading, transaction authorization settings, digital wallet information, transaction status alert types, notification frequencies, and/or notification recipients, to name a few.

In a step S3004, the arbitrage transaction system 3020 may generate one or more rules for automatic arbitrage transactions based at least in part on the received request for automatic arbitrage transactions and the starting and ending denominations, as may be determined by the system if not specified by a user.

In a step S3006, the arbitrage transaction system 3020 may store one or more rules for automatic arbitrage transactions. The rules may be stored in a database (e.g., for retrieval and use by arbitrage opportunity evaluation software or devices programmed to perform such operations) or integrated directly into a program for testing and evaluating exchange rate data, to name a few.

In a step S3008, the arbitrage transaction system 3020 may access, from one or more digital asset exchanges 3005, digital asset exchange rate data, which may comprise currency pairs relating prices for one or more digital assets to a plurality of other digital assets and/or fiat currencies. Accessing digital asset exchange rate data may entail using one or more APIs for one or more digital asset exchanges 3005 to fetch the price data and/or receiving a data stream of price data. In embodiments, digital asset exchange rate data may be obtained from one or more broker or exchange agent.

In a step S3010, the arbitrage transaction system 3020 may access, from one or more fiat currency exchanges 3010, flat currency exchange rate data, which may comprise one or more currency pairs relating prices for one or more fiat currencies to one or more other fiat currencies. Fiat currency exchange rate data may be accessed using one or more APIs for one or more fiat currency exchanges and/or by reading a data feed from one or more exchanges, to name a few. In embodiments, a fiat currency exchange 3010 may be an exchange in the foreign exchange market. In embodiments, exchange rate data may be obtained from one or more exchange agent or broker, such as a fiat currency broker 3040.

In a step S3012, the arbitrage transaction system 3020 may map currency paths from a starting denomination to an ending denomination using at least two currency pairs or at least three denominations, since two currency pairs may share a common base. The mapping of currency paths is described herein with respect to step S2908.

In a step S3014, the arbitrage transaction system 3020 may compute effective exchange rates for the mapped currency paths. An effective exchange rate may relate the prices of two endpoints of a currency path. The effective exchange rate may be computed by multiplying the exchange rate for each currency pair in the currency path.

In a step S3016, the arbitrage transaction system 3020 may evaluate (e.g., by processing on a computer system) arbitrage transaction rules to determine the presence of an arbitrage opportunity meeting transaction criteria and to determine actions to perform (e.g., seeking authorization to perform a transaction and/or performing a transaction, to name a few) based thereupon. In embodiments, evaluating arbitrage transaction rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist, and transactions may be formulated accordingly. Transactions may be structured to convert from one denomination to a different denomination (e.g., following one or more mapped currency paths). In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination).

In embodiments, requests for authorization to proceed with a transaction may be sent to a user. In embodiments, if a response is not received from a user within a set period of time, the transaction may proceed.

In a step S3018, the arbitrage transaction system 3020 may perform one or more transactions according to the one or more rules for automatic arbitrage transactions. In embodiments, the performed transactions may follow the mapped currency paths.

In a step S3020, the arbitrage transaction system 3020 may provide one or more transaction status notifications. Transaction status notifications may indicate that one or more transactions were executed automatically, and/or the details of the transactions. Transaction status notifications may also indicate failed and/or pending transactions.

Digital Asset Foreign Exchange System

As previously described with respect to FIGS. 46A-B and 47A-B, foreign exchange transactions may be performed using one or more digital asset exchanges. In embodiments, a digital asset exchange may comprise a foreign exchange module configured to handle foreign exchange transactions. In embodiments, a separate foreign exchange system may interact with one or more digital asset exchanges to perform foreign exchange transactions.

Figure 48A:
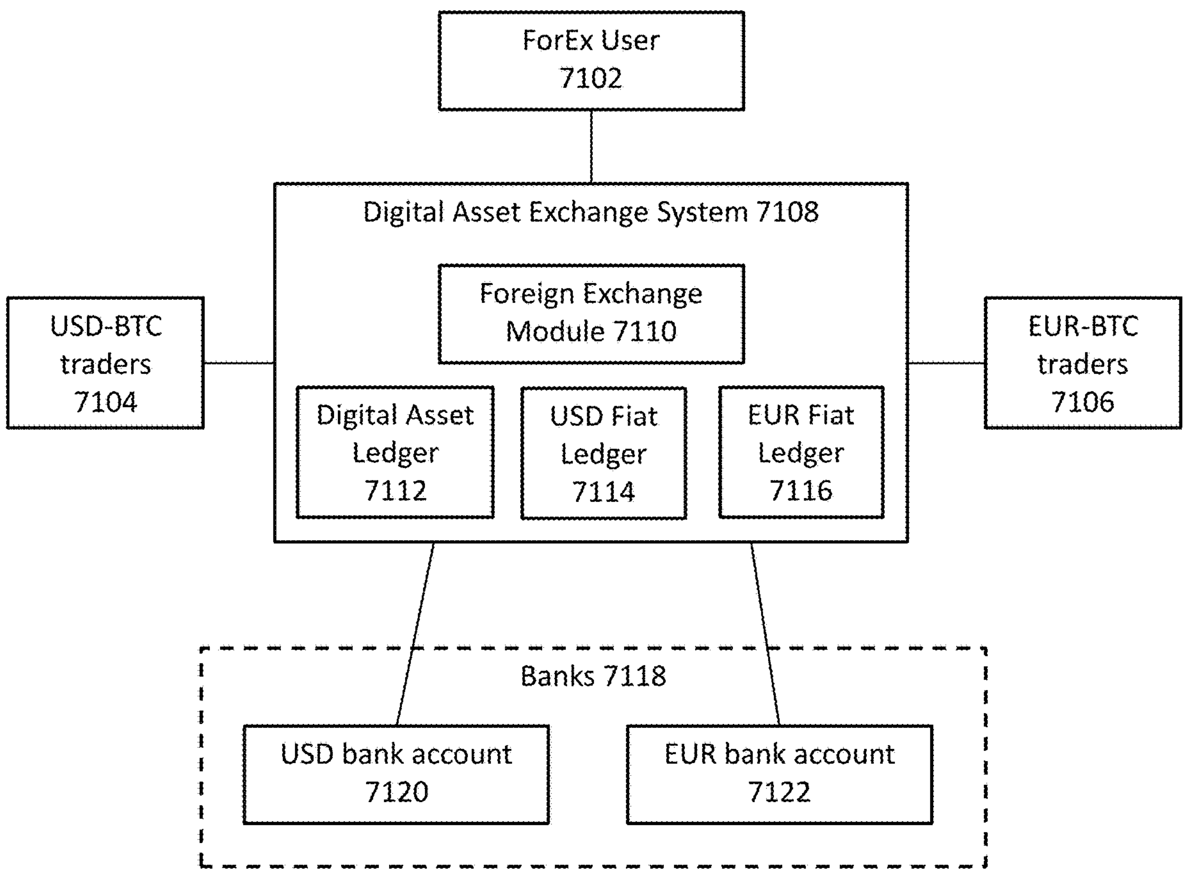
FIGS. 48A-C are schematic diagrams of foreign exchange systems in accordance with exemplary embodiments of the present invention.
Figure 48B:
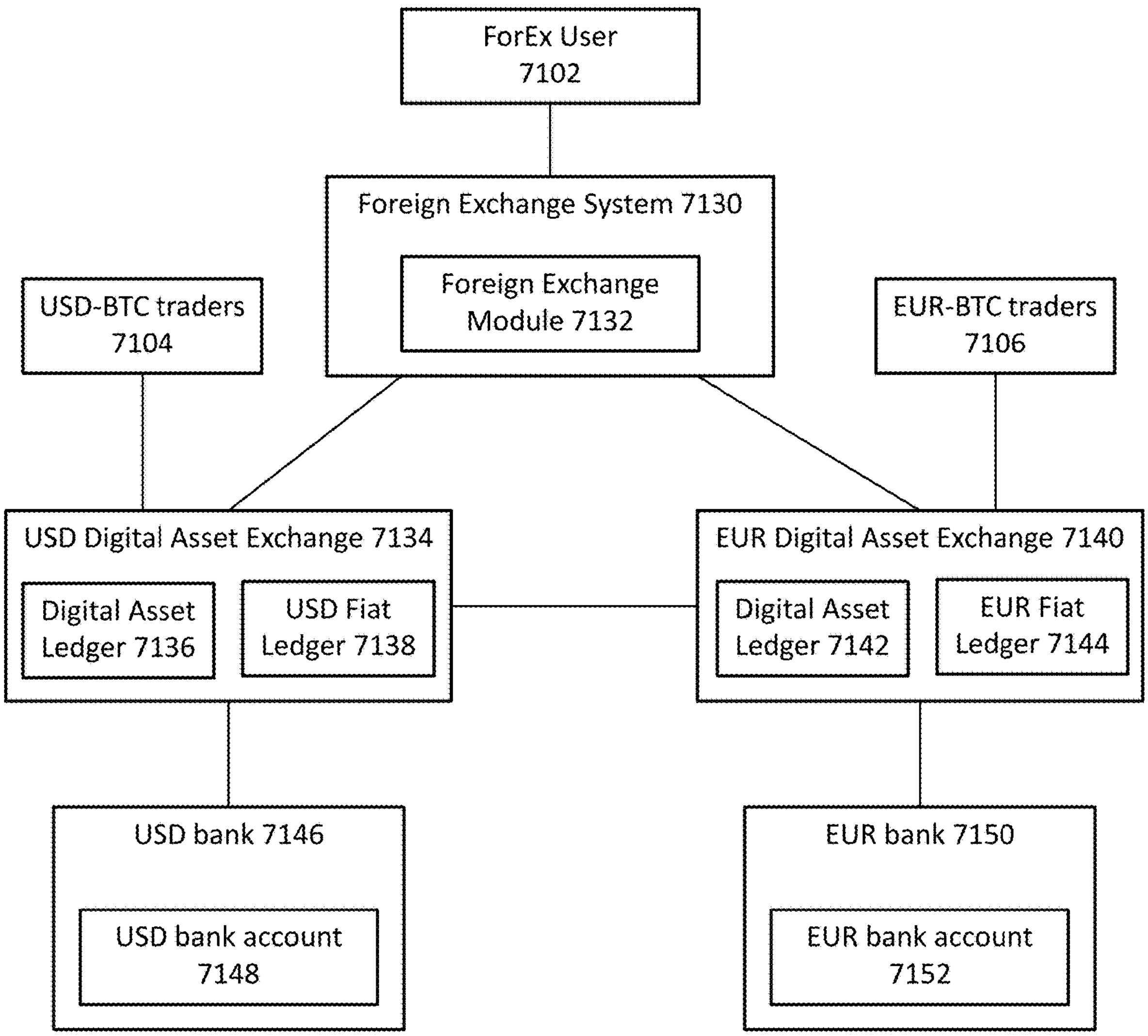
Figure 48C:
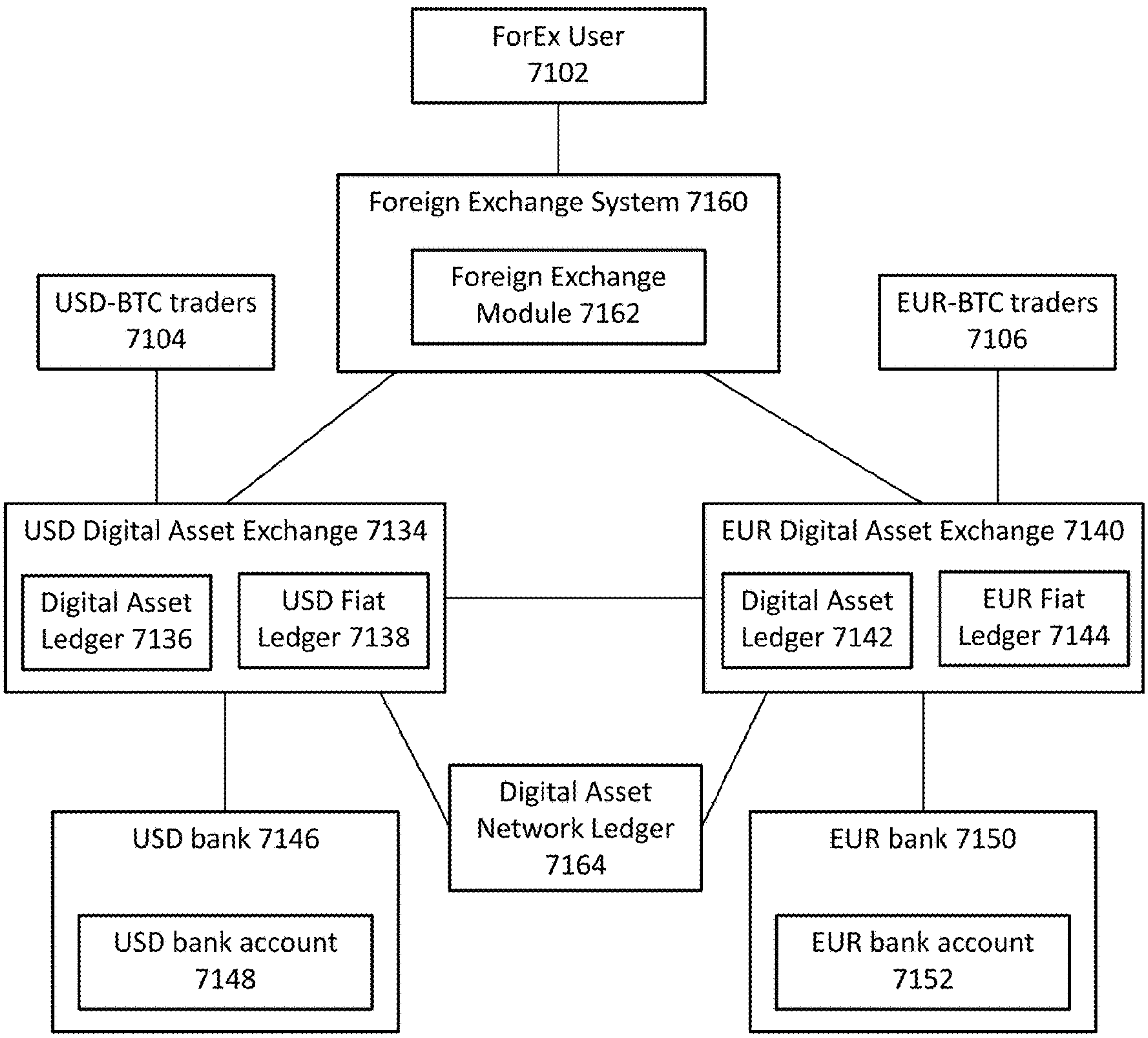

FIGS. 48A-C are schematic diagrams of foreign exchange systems in accordance with exemplary embodiments of the present invention.

FIG. 48A shows exemplary participants in an embodiment of a digital asset-based foreign exchange system. A digital asset exchange computer system 7108 can include a foreign exchange module 7110, which may be stored in non-transitory computer-readable memory operatively connected to the computer system and which may be configured to run on one or more processors of the computer system. The foreign exchange module 7110 can process foreign exchange transactions. The digital asset exchange computer system 7108 can include a digital asset electronic ledger 7112, a first fiat currency electronic ledger 7114, and a second fiat currency electronic ledger 7116. In embodiments, the exchange computer system 7108 may be operatively connected to one or more banks 7118 comprising at least a first fiat currency bank account 7120, denominated in the first fiat currency, and a second fiat currency bank account 7122, denominated in the second fiat currency. In embodiments, account 7120 may be associated with a first bank, and account 7122 may be associated with a second bank. In embodiments, they may be associated with the same bank. In embodiments, the foreign exchange system may handle a plurality of fiat currencies. The system may be connected to a bank account for each fiat currency and may have a fiat currency ledger for each currency. In embodiments, the foreign exchange system may handle a plurality of digital asset types, and the system may have a respective digital asset ledger for each digital asset type.

FIG. 48B shows exemplary participants in another embodiment of a foreign exchange system. A foreign exchange system 7130 may be independent of one or more digital asset exchanges and/or fiat currency exchanges but may be operatively connected to them. For example, it may be operatively connected to a first digital asset exchange 7134 configured to exchange a first digital asset with a first fiat currency. The system may also be operatively connected to a second digital assert exchange 7140 configured to exchange the first digital asset with a second fiat currency. In embodiments, a single digital asset exchange may be configured to perform exchange transactions between a digital asset and multiple fiat currencies. Each digital asset exchange may be operatively connected to a bank with one or more bank accounts denominated in the respective flat currency. In embodiments, the foreign exchange system 7130 may be affiliated with a particular digital asset exchange.

FIG. 48C shows another embodiment of a foreign exchange system. The system is similar to that described in FIG. 48B, but it includes a digital asset network ledger 7164. Exchange transactions at the one or more exchanges may be broadcast to a network ledger, such as the Bitcoin blockchain. The digital asset exchanges may transfer digital assets among each other using the network ledger 7164.

Figure 49A:
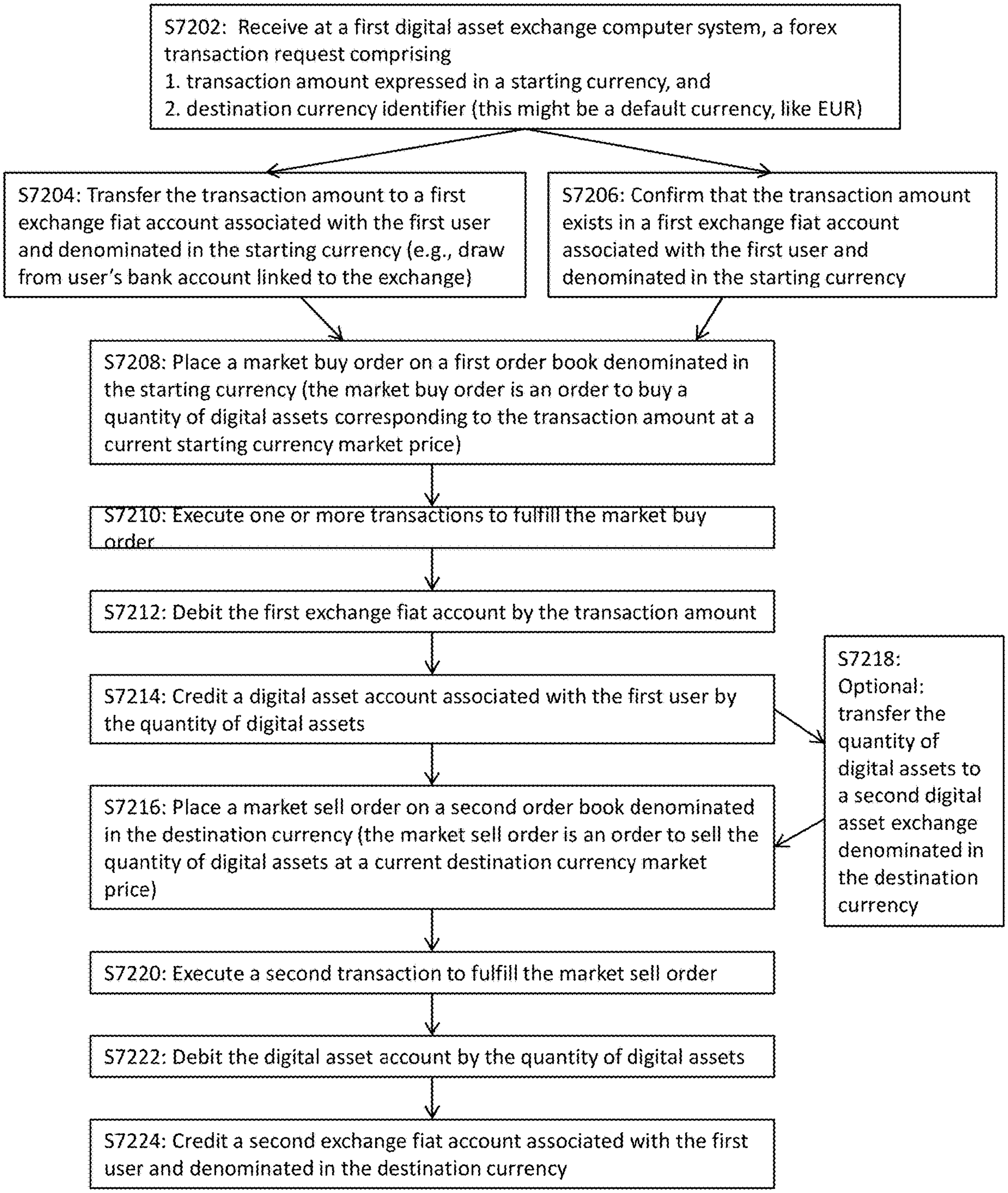
FIGS. 49A-B are flow charts of exemplary processes for performing foreign exchange transactions in accordance with exemplary embodiments of the present invention.
Figure 49B:
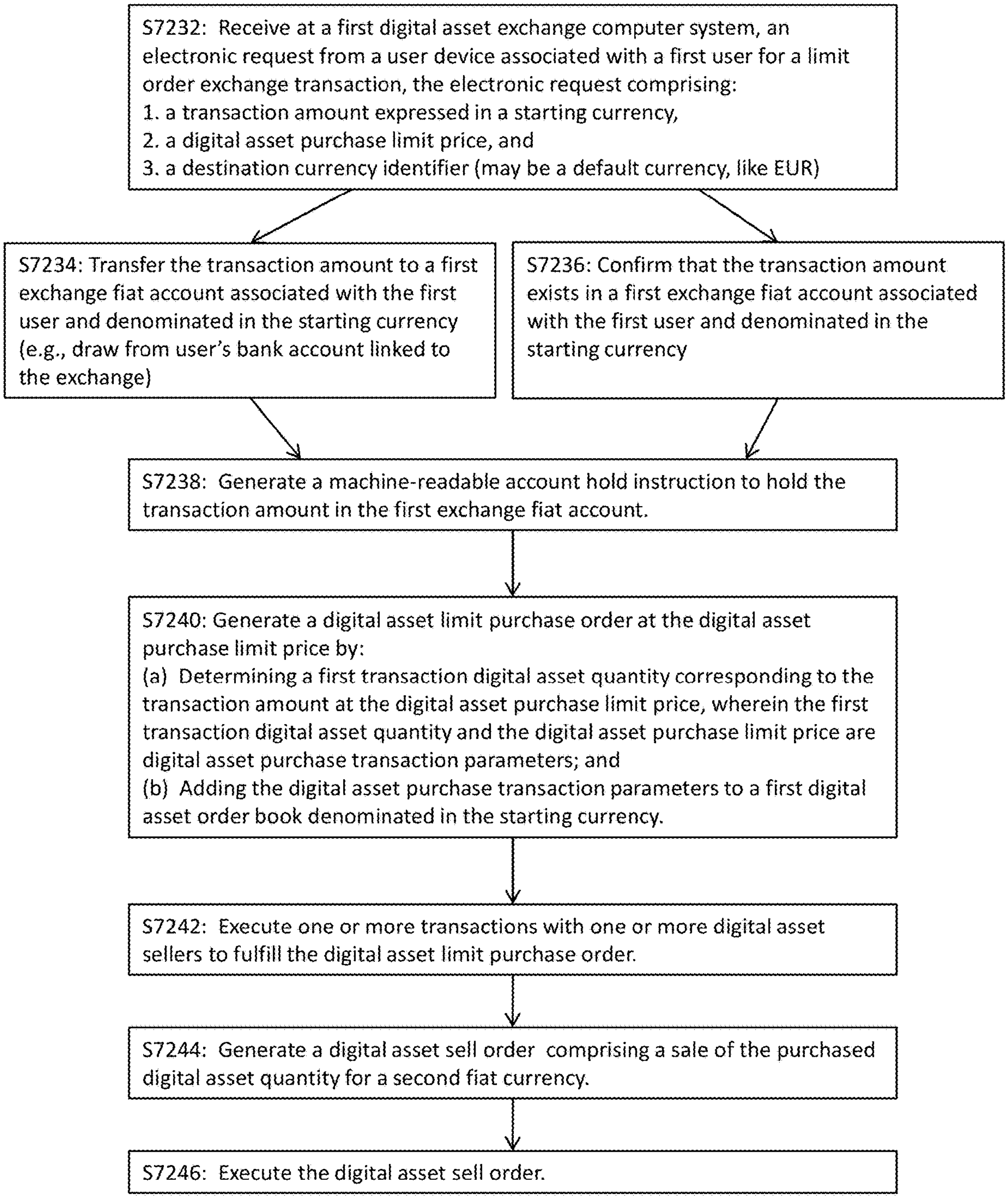

FIGS. 49A-B are flow charts of exemplary processes for performing foreign exchange transactions.

Referring to FIG. 49A, at a step S7202, a first digital asset exchange computer system may receive a foreign exchange transaction request. The request may comprise a transaction amount expressed in a starting currency, and a destination currency identifier, which may be a default currency identifier, such as EUR.

In a step S7204, the computer system may transfer or have transferred the transaction amount to a first exchange fiat account associated with the first user and denominated in the starting currency (e.g., draw from user's bank account linked to the exchange but unaffiliated with the exchange and deposit in the first exchange fiat account, which may be affiliated with the exchange). As an alternative, in a step S7206, the computer system may confirm that the transaction amount exists in the first exchange fiat account associated with the first user and denominated in the starting currency.

In a step S7208, the computer system may place a market buy order on a first order book denominated in the starting currency. The market buy order may be an order to buy a quantity of digital assets corresponding to the transaction amount at a current starting currency market price.

In a step S7210, the computer system may execute one or more transactions to fulfill the market buy order. In embodiments, the first digital asset exchange may execute these transactions, e.g., upon receiving a transaction request from the computer system.

In a step S7212, the computer system may debit (e.g., using a fiat currency electronic ledger) the first exchange fiat account by the transaction amount.

In a step S7214, the computer system may credit (e.g., using a digital asset electronic ledger) a digital asset account associated with the first user by the quantity of digital assets. Optionally, where the first exchange handles transactions in the starting currency and a second exchange handles transaction in the destination currency, in a step S7218, the computer system may transfer the quantity of digital assets to a second digital asset exchange denominated in the destination currency.

In a step S7216, the computer system may place a market sell order on a second order book denominated in the destination currency. The market sell order may be an order to sell the quantity of digital assets at a current destination currency market price.

In a step S7220, the computer system may execute one or more second transactions to fulfill the market sell order. In embodiments, the second digital asset exchange may execute these transactions, e.g., upon receiving a transaction request from the computer system.

In a step S7222, the computer system may debit the digital asset account by the quantity of digital assets.

In a step S7224, the computer system may credit a second exchange fiat account associated with the first user and denominated in the destination currency.

FIG. 49B shows another exemplary process for performing a foreign exchange transaction.

In a step S7232, a first digital asset exchange computer system may receive an electronic request from a user device associated with a first user for a limit order exchange transaction. The electronic request may comprise a transaction amount expressed in a starting currency, a digital asset purchase limit price, and a destination currency.

In a step S7234, the first digital asset exchange computer system may transfer the transaction amount to a first exchange fiat account associated with the first user and denominated in the starting currency. Alternatively, in a step S7236, the first digital asset exchange computer system may confirm that the transaction amount exists in a first exchange fiat account associated with the first user and denominated in the starting currency.

In a step S7238, the first digital asset exchange computer system may generate a machine-readable account hold instruction to hold the transaction amount in the first exchange fiat account.

In a step S7240, the first digital asset exchange computer system may generate a digital asset limit purchase order at the digital asset purchase limit price by determining a first transaction digital asset quantity corresponding to the transaction amount at the digital asset purchase limit price, wherein the first transaction digital asset quantity and the digital asset purchase limit price are digital asset purchase transaction parameters; and adding the digital asset purchase transaction parameters to a first digital asset order book denominated in the starting currency.

In a step S7242, the first digital asset exchange computer system may execute one or more transactions with one or more digital asset sellers to fulfill the digital asset limit purchase order.

In a step S7244, the first digital asset exchange computer system may generate a digital asset sell order comprising a sale of the purchased digital asset quantity for a second fiat currency.

In a step S7246, the first digital asset exchange computer system may execute the digital asset sell order.

In embodiments, a foreign exchange system may perform this process by interacting with one or more digital asset exchanges.

Examples of Financial Products Associated with a Digital Asset Exchange

In embodiments, insurance may be provided for digital assets, e.g., held by a digital asset exchange. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoin stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

In embodiments, a digital asset exchange may provide and/or support transactions (e.g., formation, buying, and/or selling) of derivate products. Such exchange traded derivatives can include options such as calls and/or puts. A digital asset exchange may also support digital asset lending, delayed settlements, derivative swaps, futures, and/or forwards, to name a few.

Additional Embodiments

In embodiments, a computer-implemented method may comprise the steps of (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

In embodiments, the computer-implemented method may further comprise the step of, after the determining step (i) above, transmitting, from the trust computer system to the one or more authorized participant user devices, the share price information. In embodiments, the determining step (i) above may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares.

In embodiments, the verifying step (vii) above may further comprise the steps of accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In embodiments, the computer-implemented method may further comprise the step of transferring, using the trust computer system, the fourth quantity of digital math-based assets into one or more digital asset accounts associated with a trust custody account.

In embodiments, the computer-implemented method may further comprise the step of transmitting, from the trust computer system to the one or more authorized participant user devices, an electronic receipt acknowledgement indicating the receipt of the fourth quantity of digital math-based assets.

In embodiments, the computer-implemented method may further comprise the step of transmitting or causing to be transmitted, to the one or more authorized participant user devices, an electronic share issuance indication of the issuing of the third quantity of shares.

In embodiments, the share price information may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In embodiments, the electronic transfer indication may further comprise an identification of one or more origin digital asset accounts.

In embodiments, the trust computer system may be operated by a trustee of the trust and/or an administrator of the trust on behalf of the trust.

In embodiments, a computer-implemented method may comprise the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

In embodiments, the computer-implemented method may further comprise the step of transmitting, from the trust computer system to the one or more authorized participant user devices, the share price information.

In embodiments, the computer-implemented method may further comprise the steps of obtaining, using the trust computer system, a net asset value per share; determining, using the trust computer system, a digital math-based asset value of the third quantity of shares based upon the net asset value per share; determining, using the trust computer system, transaction fees associated with the electronic request; and determining, using the trust computer system, the fourth quantity of digital math-based assets by subtracting the transaction fees from the digital math-based asset value of the third quantity of shares.

In embodiments, the computer-implemented method may further comprise the step of determining, by the trust computer system, a settlement period associated with the electronic request.

In embodiments, the computer-implemented method may further comprise the step of retrieving or causing to be retrieved, using the trust computer system, one or more private keys associated with the one or more origin digital asset accounts; and accessing the one or more origin digital asset accounts using at least the one or more private keys.

In embodiments, the computer-implemented method may further comprise the steps of issuing, using the trust computer system, retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In embodiments, the computer-implemented method may further comprise the steps of issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In embodiments, the computer-implemented method may further comprise the steps of issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

In embodiments, the computer-implemented method may further comprise the steps of issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts. In embodiments, the one or more first private keys and the at least one second private key may be keys for one or more multi-signature digital asset accounts.

In embodiments, the computer-implemented method may further comprise the steps of accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In embodiments, the transaction fees may be denominated in a unit of the digital math-based asset. In embodiments, the share price information may comprise a net asset value per share, an adjusted net asset value per share, and/or a net asset value per a basket of shares corresponding to a number of shares associated with one creation unit of shares.

In embodiments, the basket of shares may comprise one or more quantities of shares selected from the group consisting of: 5,000 shares, 10,000 shares, 15,000 shares, 25,000 shares, 50,000 shares, and 100,000 shares.

In embodiments, the electronic request may comprise a redemption order.

In embodiments, the trust computer system may be operated by a trustee of the trust and/or an administrator of the trust on behalf of the trust.

In embodiments, the one or more origin digital asset accounts may correspond to a trust custody account.

In embodiments, the one or more destination digital asset accounts may correspond to an authorized participant custody account.

In embodiments, a computer-implemented method may comprise the steps of (i) generating, using a computer system comprising one or more computers, one or more digital asset accounts capable of holding one or more digital math-based assets; (ii) obtaining, using the computer system, one or more private keys corresponding to the one or more digital asset accounts; (iii) dividing, using the computer system, each of the one or more private keys into a plurality of private key segments; (iv) encrypting, using the computer system, each of the plurality of private key segments; (v) associating, using the computer system, each of the plurality of private key segments with a respective reference identifier; (vi) creating, using the computer system, one or more cards for each of the encrypted plurality of private key segments wherein each of the one or more cards has fixed thereon one of the encrypted plurality of private key segments along with the respective associated reference identifier; and (vii) tracking, using the computer system, storage of each of the one or more cards in one or more vaults.

In embodiments, the computer-implemented method may further comprise the steps of generating, using the computer system, electronic transfer instructions for an electronic transfer of the quantity of digital math-based assets to the one or more digital asset accounts; and broadcasting, using the computer system, the electronic transfer instructions to a decentralized electronic ledger maintained by a plurality of physically remote computer systems.

In embodiments, the computer system includes at least one isolated computer that is not directly connected to an external data network.

In embodiments, the encryption step (iv) above, may further comprise implementing, using the computer system, a symmetric-key and/or asymmetric-key encryption algorithm.

In embodiments, the one or more cards may be plastic, a paper product, index cards, sheets of paper, metal, and/or laminated.

In embodiments, each of the encrypted plurality of private key segments along with the respective associated reference identifier may be fixed on the one or more cards via printing, etching. In embodiments, each of the encrypted plurality of private key segments may be fixed on the one or more cards via a magnetic encoding and/or scannable code. In embodiments, the scannable code may be a bar code and/or a QR code.

In embodiments, the one or more vaults may be geographically remote from each other. In embodiments, the one or more vaults may include a bank vault and/or a precious metal vault. In embodiments, the one or more vaults may comprise a main set of vaults and one or more sets of backup vaults. In embodiments, the main set of vaults may be located in a geographically proximate area and at least one of the one or more sets of backup vaults are located in a geographically remote area. In embodiments, the geographically proximate area may be a metropolitan area of a first city.

In embodiments, each of the plurality of private key segments corresponding to a first private key may be stored in separate vaults.

In embodiments, the computer-implemented method may further comprise the steps of receiving, at the computer system, a quantity of digital math-based assets; and storing, using the computer system, the quantity of digital math-based assets in the one or more digital asset accounts.

In embodiments, a computer-implemented method may comprise the steps of (i) generating, using a computer system comprising one or more computers, one or more digital asset accounts capable of holding one or more digital math-based assets; (ii) obtaining, using the computer system, a first plurality of private keys corresponding to each of the one or more digital asset accounts; (iii) dividing, using the computer system, a first private key of the first plurality of private keys into a second plurality of first private key segments; (iv) encrypting, using the computer system, each of the second plurality of first private key segments; (v) associating, using the computer system, each of the second plurality of first private key segments and a second private key with a respective reference identifier; (vi) creating, using the computer system, one or more cards for each of the encrypted second plurality of first private key segments wherein each of the one or more cards has fixed thereon one of the encrypted second plurality of first private key segments along with the respective associated reference identifier; and (vii) tracking, using the computer system, storage of each of the one or more cards in one or more vaults and storage of the second private key.

In embodiments, the computer-implemented method may further comprise the step of encrypting, using the computer system, the second private key.

In embodiments, the computer-implemented method may further comprise the step of electronically storing the second private key on a computer-readable substrate.

In embodiments, the computer-implemented method may further comprise the steps of generating, using a computer system comprising one or more computers, one or more digital asset accounts capable of holding one or more digital math-based assets; obtaining, using the computer system, one or more private keys corresponding to the one or more digital asset accounts; encrypting, using the computer system, each of the one or more private keys; dividing, using the computer system, each of the one or more encrypted private keys into a plurality of private key segments; associating, using the computer system, each of the plurality of private key segments with a respective reference identifier; creating, using the computer system, one or more cards for each of the plurality of private key segments wherein each of the one or more cards has fixed thereon one of the plurality of private key segments along with the respective associated reference identifier; and tracking, using the computer system, storage of each of the one or more cards in one or more vaults.

In embodiments, the one or more digital asset accounts may comprise multi-signature digital asset accounts.

In embodiments, a computer-implemented method may comprise the steps of (i) determining, using a computer system comprising one or more computers, one or more digital asset account identifiers corresponding to one or more digital asset accounts capable of holding one or more digital math-based assets; (ii) accessing, using the computer system, key storage information associated with each of the one or more digital asset account identifiers; (iii) determining, using the computer system, based upon the key storage information, storage locations corresponding to each of a plurality of private key segments corresponding to each of the one or more digital asset accounts; (iv) issuing or causing to be issued, retrieval instructions for retrieving each of the plurality of private key segments; (v) receiving, at the computer system, each of the plurality of private key segments; (vi) decrypting, using the computer system, each of the plurality of private key segments; (vii) assembling, using the computer system, each of the plurality of private key segments into one or more private keys.

In embodiments, the computer-implemented method may further comprise the step of accessing, using the computer system, the one or more digital asset accounts associated with the one or more private keys.

In embodiments, the computer-implemented method may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

In embodiments, the key storage information may comprise a reference identifier associated with one or more stored private key segments.

In embodiments, a system may comprise (i) one or more networked computers comprising one or more processors and computer-readable memory; (ii) one or more isolated computers comprising one or more processors and computer-readable memory and configured to generate digital asset accounts and generate transaction instructions for digital math-based asset transactions: (iii) a writing device configured to write digital asset account keys; and (iv) a reading device configured to read digital asset account keys.

In embodiments, the system may further comprise an accounting computer comprising one or more processors and computer-readable memory and configured to track digital math-based asset transactions involving one or more specified digital asset accounts.

In embodiments, the one or more isolated computers, the writing device, and the reading device may be located within a Faraday cage.

In embodiments, the isolated computer may not be physically connected to an external data network.

In embodiments, the writing device may be a printer and/or an engraver.

In embodiments, the reading device may be a disk drive, an electronic card reader. a QR reader, and/or a scanner. In embodiments, the scanner may be a bar code scanner.

In embodiments, the writing and/or device may be operationally connected to the one or more isolated computers.

In embodiments, a secure system for storing digital math-based assets may comprise (a) an electronic isolation chamber; (b) one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier; (c) the one or more writing devices located within the electronic isolation chamber and configured to perform the electronic writing instructions, including collating the plurality of cards into the plurality of sets; and (d) one or more reading devices located within the electronic isolation chamber and configured to read the plurality of private key segments along with the respective associated reference identifier from the one or more cards.

In embodiments, a computer-implemented method may comprise the steps of (i) receiving, at a computer system comprising one or more computers, an electronic request to transfer first respective quantities of digital math-based assets from each of a first plurality of digital asset accounts; (ii) accessing, using the computer system, each of the first plurality of digital asset accounts; (iii) generating, using the computer system, transaction instructions comprising one or more transfers of the first respective quantities from each of the first plurality of digital asset accounts; and (iv) broadcasting, using the computer system, the transaction instructions to a decentralized electronic ledger maintained by a plurality of physically remote computer systems.

In embodiments, the first respective quantities of digital math-based assets comprise different quantities for different digital asset accounts.

In embodiments, a computer-implemented method for dynamically providing a graphical user interface for an electronic order book may comprise receiving, by an exchange computer system comprising one or more computers from non-transitory computer-readable memory operatively connected to the one or more computers, from a user device, a request to access the electronic order book associated with a digital asset traded on an electronic exchange, and accessing, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders. The method may further comprise calculating, by the exchange computer system, information for a first graphical user interface by determining, by the exchange computer system, at each respective order a price first cumulative quantity of digital assets subject to the pending digital asset purchase orders; and determining, by the exchange computer system, at each respective order price a second cumulative quantity of digital assets subject to the pending digital asset sell orders. The method may also comprise generating, by the exchange computer system, first machine-readable instructions to render the first graphical user interface including a first electronic order book graphical representation, the first electronic order book graphical representation comprising: (i) a first axis depicting price denominated in the flat currency; (ii) a second axis depicting digital asset quantity; (iii) a first set of graphical indicators on a first side of the first axis showing at each price visible along the first axis the first cumulative quantity of digital assets subject to the pending digital asset purchase orders; and (iv) a second set of graphical indicators on a second side of the first axis showing at each price visible along the first axis the second cumulative quantity of digital assets subject to the pending digital asset sell orders. The method may comprise transmitting, by the exchange computer system to the first user electronic device, the first machine-readable instructions so as to cause an application (e.g., downloadable dedicated application, such as a mobile application, or a web browser application) at the first user electronic device to render the first graphical user interface on a display associated with the first user electronic device.

In embodiments, the method may further comprise receiving, at the exchange computer system from the first user electronic device, first digital asset order information corresponding to a first prospective digital asset purchase order, the first digital asset order information comprising a first order quantity of the digital asset and a first order price parameter related to a first order price of the digital asset, the first order price denominated in the fiat currency. The method may comprise storing, by the exchange computer system in the non-transitory computer-readable memory, the first digital asset order information as a prospective digital asset purchase order. The method may comprise calculating, by the exchange computer system, information for a second graphical user interface (e.g., a new interface or an updated version of the prior graphical user interface) by determining, by the exchange computer system, at each respective order price a second order quantity of digital assets subject to the first prospective digital asset purchase order and determining, by the exchange computer system, at each respective order price a third cumulative quantity of digital assets subject to the digital asset sell orders that would remain after fulfilling the first prospective digital asset purchase order. The method may comprise generating, by the exchange computer system, second machine-readable instructions to render the second electronic graphical user interface including a second electronic order book graphical representation comprising a graphical representation of the first prospective digital asset purchase order superimposed on a modified first electronic order book graphical representation, the second electronic order book graphical representation comprising (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective second order quantity of digital assets subject to the first prospective digital asset purchase order; and (vi) a fourth set of graphical indicators on the second side of the first axis showing at each price visible along the first axis the respective third cumulative quantity of digital assets subject to the digital asset sell orders that would remain after fulfilling the first prospective digital asset purchase order. The method may comprise transmitting, by the exchange computer system to the first user electronic device, the second machine-readable instructions so as to cause the application at the first user electronic device to render the second graphical user interface on the display.

In embodiments, the machine-readable instructions may be rendered in a webpage by a web browser. In embodiments, the machine-readable instructions may be rendered by a downloadable application, such as a mobile application running on the user electronic device.

In embodiments, the first axis may be a horizontal axis.

In embodiments, the second axis may have a logarithmic scale. In embodiments, at least one of the first axis or the second axis of the first electronic order book graphical representation have a different scale than the corresponding first axis and the corresponding second axis of the second electronic order book graphical representation.

In embodiments, the first order price parameter may comprise a market order indicator and the first order price is a market price. In embodiments, the third set of graphical indicators may not be displayed.

In embodiments, the first order price parameter may comprise a limit order indicator and the first order price may be a limit price specified by the user. In embodiments, the first prospective digital asset purchase order may be characterized as out of the money and the third respective cumulative quantity of digital assets at each price may be zero.

In embodiments, the step of calculating information for a second electronic order book graphical representation may further comprise determining, by the exchange computer system, at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. In the second electronic order book graphical representation, the first set of graphical indicators may show at each price visible along the first axis the fourth cumulative quantity of digital assets.

In embodiments, the method may comprise receiving, at the exchange computer system from the first user electronic device, first digital asset order information corresponding to a first prospective digital asset sell order, the first digital asset order information comprising a first order quantity of the digital asset and a first order price parameter related to a first order price of the digital asset, the first order price denominated in the fiat currency. The method may comprise storing, by the exchange computer system in the non-transitory computer-readable memory, the first digital asset order information as a prospective digital asset sell order. The method may comprise calculating, by the exchange computer system, information for a second graphical user interface (e.g., a new graphical user interface or an updated version of the prior graphical user interface) by determining, by the exchange computer system, at each respective order price a second order quantity of digital assets subject to the first prospective digital asset sell order; and determining, by the exchange computer system, at each respective order price a third cumulative quantity of digital assets subject to the digital asset purchase orders that would remain after fulfilling the first prospective digital asset sell order. The method may comprise generating, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective third cumulative quantity of digital assets subject to the digital asset purchase orders that would remain after fulfilling the first prospective digital asset sell order; and (vi) a fourth set of graphical indicators on the second side of the first axis showing at each price visible along the first axis the respective second order quantity of digital assets subject to the first prospective digital asset sell order. The method may comprise transmitting, by the exchange computer system to the first user electronic device, the second machine-readable instructions so as to cause the application at the first user electronic device to render the second graphical user interface on the display.

In embodiments, the step of calculating information for a second electronic order book graphical representation may further comprise determining, by the exchange computer system, at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. In the step of generating machine-readable instructions for the second electronic order book graphical representation, the first set of graphical indicators may show at each price visible along the first axis the fourth cumulative quantity of digital assets.

In embodiments, the present invention generally relates to systems, methods, and program products for use with custodial electronics wallets for an ETPs or other financial products holding digital assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. For purposes of discussion, without limiting the scope of the invention, embodiments involving bitcoin may be discussed to illustrate the present invention. The disclosure can encompass other forms of digital assets, digital math-based assets, peer-to-peer electronic cash system, digital currency, synthetic currency, or digital crypto-currency.

In embodiments, the present invention generally relates to systems, methods, and program products providing particular applications of an electronic digital asset exchange facilitating the purchase and sale of digital math-based assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. For purposes of discussion, without limiting the scope of the invention, embodiments involving bitcoin may be discussed to illustrate embodiments of the present invention. The disclosure can encompass other forms of digital assets, digital math-based assets, peer-to-peer electronic cash system, digital currency, synthetic currency, or digital crypto-currency. The disclosure may also encompass assets or utilities, in the forms of "tokens," that may reside on top of a blockchain. For example, a token may in the form of a digital asset that exists on another digital asset's platform. A more specific example is Ethereum's ERC20 token, implemented by the ERC20 protocol that defines a set of rules which need to be met in order for the token to be accepted on the Ethereum platform.

In embodiments, systems and methods of the present invention may take into account blockchain forks, such as a "hardfork." A fork or hardfork may be a radical change to the blockchain protocol that makes previously invalid blocks/transactions valid (or vice-versa), and as such requires all nodes or users to upgrade to the latest version of the protocol software. Put differently, a hard fork is a permanent divergence from the previous version of the blockchain, and nodes running previous versions will no longer be accepted by the newest version. This essentially creates a fork in the blockchain, one path which follows the new, upgraded blockchain, and one path which continues along the old path. Generally, after a short period of time, those on the old chain will realize that their version of the blockchain is outdated or irrelevant and quickly upgrade to the latest version. In regards to bitcoin, examples of forks include Bitcoin Cash and Bitcoin Gold.

In embodiments, the present invention may be used in connection with products or services other than ETPs, which can include digital asset price calculators, digital asset indices, digital asset account monitoring systems, correlation of news events to digital asset prices, exchanges for converting from, to, or between digital assets, such as digital math-based assets, automated notification, transaction, and/or arbitrage systems involving digital assets, including digital math-based assets, kiosk systems for transacting or interacting with digital math-based assets, digital asset insurance systems, digital asset secure storage systems, and/or other financial products based on the same.

A digital asset exchange computer system may provide a technological platform to convert between digital assets and fiat currencies and/or between digital assets and other digital assets. Exchanges known in the art have suffered from security breaches, money-laundering risk, and an inability to authenticate customer's using their real-world identities, and inefficiencies. The systems, methods, and program products of the present invention provide technological solutions to these problems.

In embodiments, the present invention may be used in connection with other products or services related to digital assets and digital asset exchanges, which can include automated notification, transaction, and/or arbitrage systems involving digital assets, including digital math-based assets, and/or kiosk systems for transacting or interacting with digital math-based assets.

In embodiments, the present invention generally relates to systems, methods, and program products providing an electronic digital asset exchange facilitating the purchase and sale of digital math-based assets, including digital math-based assets. The electronic digital asset exchange provides a technological solution to user identity verification, anti-money laundering verification, and secure storage of digital math-based assets and fiat currency associated with customer accounts.

In embodiments, a method may comprise the steps of (i) providing, by a digital math-based asset computer system comprising one or more computers, one or more exchange account databases stored on non-transitory computer-readable memory and comprising for a plurality of exchange accounts fiat account information for an associated insured fiat account associated with an exchange; digital math-based asset account information for an associated digital math-based asset account associated with the exchange; and user authentication data (e.g., a username and password, multi-factor authentication data, to name a few); and further comprising for a subset of exchange accounts institutional account information associating each of one or more exchange institutional accounts with one or more institutional user access accounts each having respective user authentication data; (ii) providing, by the digital math-based asset computer system, an orders database stored on the non-transitory computer-readable memory comprising at least digital math-based asset purchase order information comprising purchase order digital math-based asset quantities and corresponding purchase order fiat amounts; and digital math-based asset sell order information comprising sell order digital math-based asset quantities and corresponding sell order fiat amounts; (iii) providing, by the digital math-based asset computer system, an electronic ledger comprising, for each of the plurality of exchange accounts, fiat account balance data and digital math-based asset account balance data; (iv) receiving, at the digital math-based asset computer system from a first user electronic device associated with a first user access account associated with an institutional exchange account, a first electronic digital math-based asset purchase order comprising first purchase order information comprising a purchase order digital math-based asset quantity and a corresponding purchase order fiat amount; (v) verifying, by the digital math-based asset computer system, that first fiat account balance data indicating a first fiat account balance of a purchaser insured fiat account associated with the institutional exchange account at least equals the purchase order fiat amount; (vi) storing, by the digital math-based asset computer system in the orders database, the first purchase order information; (vii) receiving, at the digital math-based asset computer system, from a second user electronic device associated with a second exchange account, a first electronic digital math-based asset sell order comprising first sell order information comprising a sell order digital math-based asset quantity and a corresponding sell order fiat amount; (viii) verifying, by the digital math-based asset computer system, that first digital math-based asset account balance data indicating a first digital math-based asset account balance of a seller digital math-based asset account associated with the second exchange account at least equals the sell order quantity; (ix) storing, by the digital math-based asset computer system in the orders database, the first sell order information; (x) matching, by the digital math-based asset computer system, the first electronic digital math-based asset purchase order with the first electronic digital math-based asset sell order; (xi) generating, by the digital math-based asset computer system, machine-readable transaction instructions for an exchange transaction having a transaction digital math-based asset quantity satisfying the first electronic digital math-based asset purchase order and the first electronic digital math-based asset sell order; and a transaction fiat amount satisfying the first electronic digital math-based asset purchase order and the first electronic digital math-based asset sell order; and (xii) executing, by the digital math-based asset computer system, the machine-readable transaction instructions by updating the electronic ledger by decreasing, by the transaction fiat amount, the first fiat account balance data corresponding to the purchaser insured fiat account; increasing, by the transaction fiat amount, second fiat account balance data corresponding to a seller insured flat account associated with the second exchange account; decreasing, by the transaction digital math-based asset quantity, the first digital math-based asset account balance data corresponding to the seller digital math-based asset account; and increasing, by the transaction digital math-based asset quantity, second digital math-based asset account balance data corresponding to a purchaser digital math-based asset account associated with the institutional exchange account.

In embodiments, an insured omnibus fiat account may comprise a plurality of the associated insured fiat accounts. In embodiments, at least one insured fiat account may be insured by the Federal Deposit Insurance Corporation. In embodiments, a digital wallet may hold digital math-based assets corresponding to a plurality of the digital math-based asset accounts.

In embodiments, the method may further comprise the step of transmitting, from the digital math-based asset computer system, an electronic transaction confirmation. In embodiments, an electronic transaction confirmation may be transmitted to the first user electronic device. In further embodiments, an electronic transaction confirmation may be transmitted to the second user electronic device. In still further embodiments, an electronic transaction confirmation may be transmitted to the second user electronic device to a computer system associated with an institution associated with the exchange institutional account.

In embodiments, the security systems and methods described herein may be used, e.g., as security protocols, associated with various financial products, such as a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product.

In embodiments, an apparatus may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

A technical challenge of many digital asset exchanges is how to allow authorized users to exchange large blocks of digital assets without causing unwelcome price movements due to the pending transaction. For example, if a large order (e.g., bid or ask) for a large number of digital asset units (e.g., 10 BTC, which at a USD$10,000 per BTC price could be USD$100,000, or 100 BTC, to name a few) is identified on a public order book, the public posting of such an offer may cause the price of the digital asset to spike or drop disproportionate to the spot price that might otherwise be available in the market if it was not on the public order book.

In embodiments, the digital asset exchange computer system may include block trading options, which can overcome these technical problems. By way of illustration, a separate block trading order book can be set up for a specific digital asset class or pair (e.g., BTC-USD) in which only certain designated users may participate. For example, the separate block trading order book may only be available for customers who have a sufficient quantity of digital assets to meet minimum block requirement such as those discussed below, such as institutional customers, such that they can buy or sell in large volume transactions, as a block taker, and a plurality of qualified market makers who are qualified to act as a counter party, maker(s), responding to a proposed request or indication of interest with a response. In embodiments, a separate block trading order book for each taker request may be maintained separately from other order books, such as a continuous trading order book, an auction trading order book, or other block trading order books, to name a few.

Figure 57:
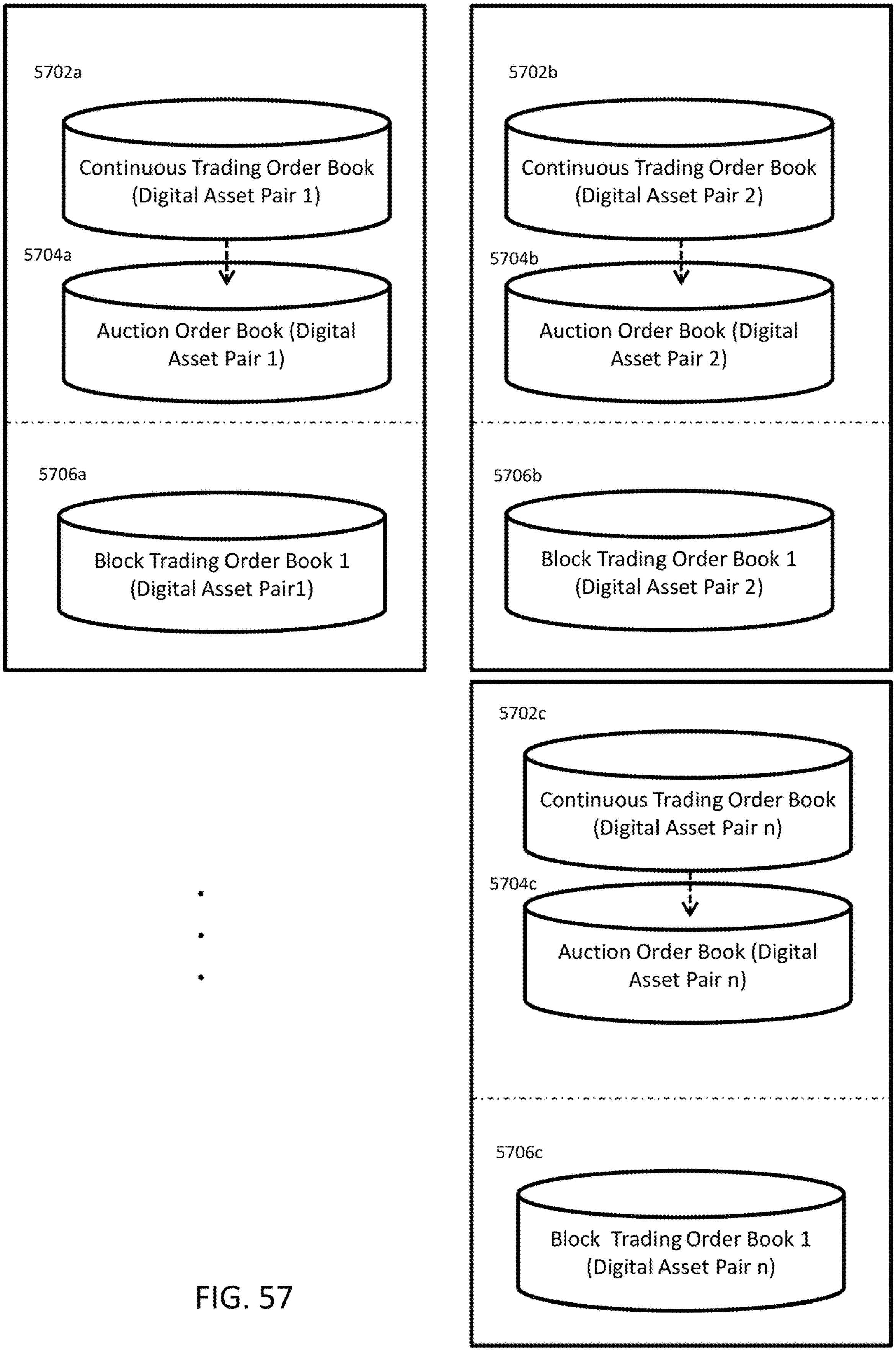
FIG. 57 is an exemplary database structure for order book databases on a digital asset exchange in accordance with exemplary embodiments of the present invention.

FIG. 57 illustrates exemplary database structures in accordance with exemplary embodiments. A method for conducting a block trade order of a digital asset (e.g., BTC) on a digital asset exchange computer system is disclosed. In general, order books are maintained based on pairs, such as a digital asset to fiat pairing (e.g., BTC-USD) or digital asset to digital asset pairing (e.g., BTC-ETH). In embodiments, order books associated with each pairing may be maintained separately, as illustrated in FIG. 57. In embodiments, order books for a given pairing may include a continuous trading order book (see 5702*a*, 5702*b*, 5702*c*, for example), auction order books (see 5704*a*, 5704*b*, 5704*c*, for example) and/or block trading order books (see 5706*a*, 5706*b*, 5706*c* for example), to name a few. In embodiments, each auction will be maintained in a separate auction order book. As discussed elsewhere herein, in embodiments, a continuous trading order book may be used to fill an auction order, but does not necessarily have to be used. In embodiments, each block trading order request by a taker will be maintained in its own block trading order book. In embodiments, each block trading order book is also segregated and maintained separately from the continuous trading order book and/or the auction order books as is indicated in FIG. 57. In such embodiments, block trading orders may not be filled by crossing orders with continuous trading order books and/or auction order books. In embodiments, block trading orders may not be filled by crossing orders between block trading order books generated based on different block order requests. In embodiments, block trading order books may be suspended during a defined period (e.g., 25 minutes) based on the timing of an auction in the same pairing.

By way of illustration, a block trading order book for a pairing including a digital asset may be set up in which blocks of a designated digital asset size and/or fiat value may be traded. In embodiments, a minimum block size may be established for participation in a block order book. By way of example, for bitcoin, a minimum block size may include amounts such as 5 BTC, 10 BTC, 15 BTC, 20 BTC, 50 BTC, 100 BTC, to name a few. In embodiments, the minimum block size may be specified based on notional value associated with a respective fiat. For example, in a digital asset to fiat block order trading book, such as bitcoin to USD (BTC-USD), when the notional value of BTC to USD is set at 1 BTC=USD$10,000, a block size of USD$100,000 may be set or 10 BTC. By further example, if the notional value of BTC to USD is set at 1 BTC=USD$20,000, a block size of USD$100,000 may be set at 5 BTC. In embodiments, the block size may be pegged exactly to a notional fiat value, e.g., $100,000. In embodiments, the block size may be pegged to the nearest significant digit of a digital asset value. For example, in the above example, if the notional value of BTC to USD is set at 1 BTC=USD$11,535, the block size may be set at 10 BTC, instead of 8.66926 BTC. In embodiments, under the same example, the block size could be set at 8.7 BTC, choosing the first decimal place as the relevant significant digit. In embodiments, the block sizes could be modified to reflect changing market conditions. In embodiments, block sizes may also be designated in different amounts and/or different digital assets (e.g., ether, litecoin, bitcoin cash, to name a few) consistent with exemplary embodiments. In embodiments, block trading order books may be set up using digital asset to fiat pairings (e.g., BTC-USD) and/or digital asset to digital asset pairings (e.g., BTC-ETH).

In embodiments, block sizes may be set up in multiples of minimum block sizes. For example, if the minimum block size is set at 10 BTC, then blocks sizes could be set up as 10 BTC, 20 BTC, 30 BTC, etc. to name a few. In embodiments, block sizes may be set up in values that are at fixed intervals, but not necessarily at multiples of minimum block sizes. For example, if the minimum block size is set at 10 BTC, then block sizes could be set up at 5 BTC intervals, starting with the minimum block size, e.g., 10 BTC, 15 BTC, 20 BTC, 25 BTC, 30 BTC, etc., to name a few. In embodiments, block sizes may be set up in values that are not in fixed intervals, such as, by way of example, any block sizes that are above a minimum block size, e.g., any order of over 10 BTC, such as 10.2 BTC or 11 BTC, or 28 BTC to name a few. Other examples of block sizes may be implemented consistent with exemplary embodiments.

Figure 58:
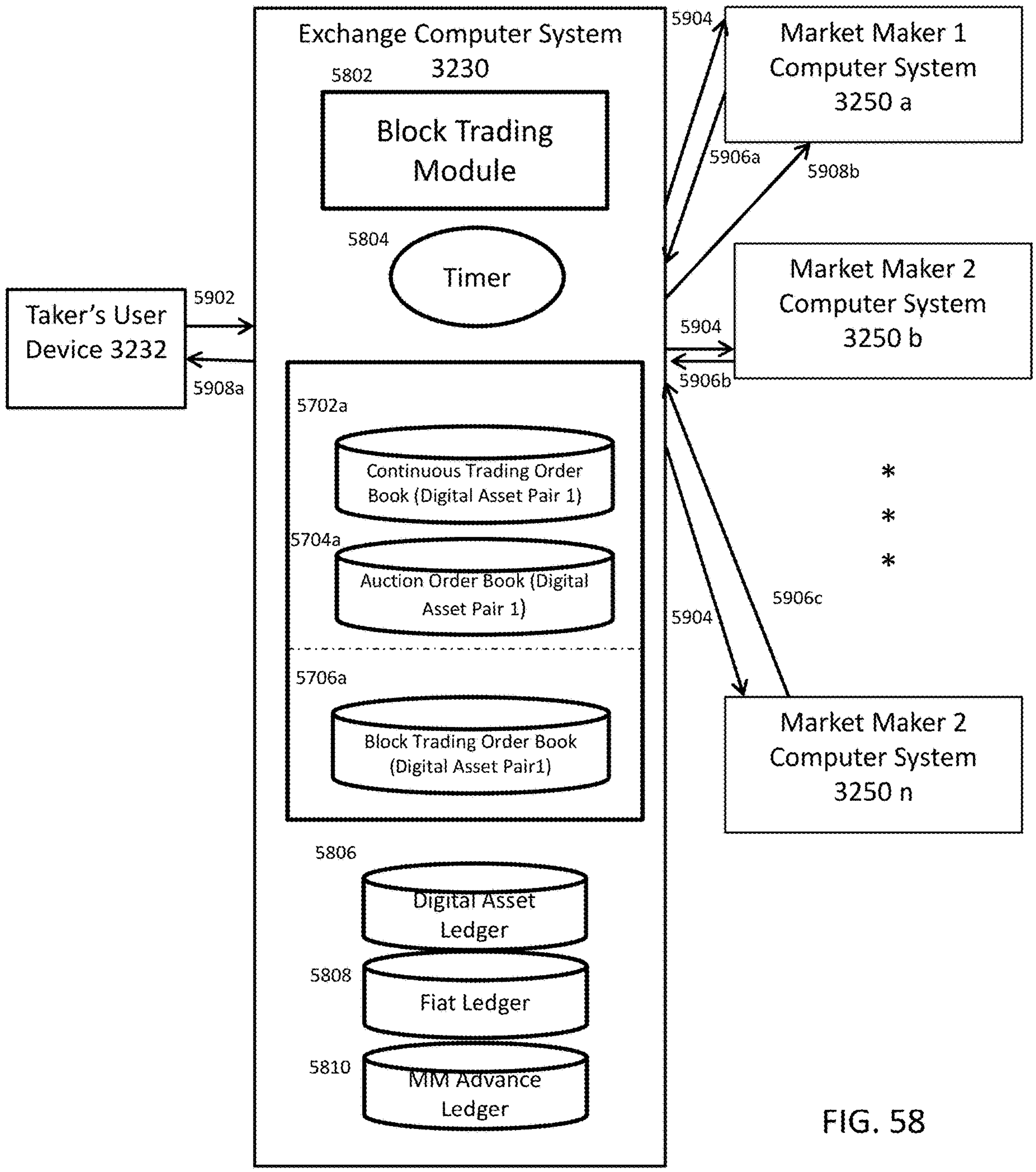
FIG. 58 is a schematic diagram of exemplary structures of a digital asset exchange system for performing block trades in accordance with exemplary embodiments of the present invention.

With reference to FIG. 58, in embodiments, a block trading system may include a taker's user device 3232 which is in communication with the digital asset exchange computer system 3230. The digital asset exchange computer system 3230 preferably includes a block trading module 5802 including computer executable code for performing block trades as described herein. In embodiments, the digital asset exchange computer system 3230 may also include at least one timer 5804, which can be used to calculate one or more time-out periods associated with at least block trading periods. In embodiments, the digital asset exchange computer system 3230 may include one or more databases stored on non-volatile computer readable memory. In exemplary embodiments, such databases may include for a first digital asset pairing, at least a continuous trading order book 5702*a*, auction order book 5704*a* and block trading order book 5706*a*, to name a few. The first digital asset pair may be a pairing of a digital asset with a fiat (e.g., BTC-USD) or a digital asset with another digital asset (e.g., BTC-ETH), to name a few. In embodiments, a continuous trading order book 5702*a* for the first digital asset pair is generally maintained on an on-going basis, except for periods which are designated as black-out periods. In embodiments, for each auction period for a the first digital asset pair, an auction order book 5704*a* may also be provided. In embodiments, a separate and segregated block trading order book 5706*a* is maintained. In embodiments, a new segregated block trading order book may be provided for each digital asset pair each time a block order related to the digital asset pair is placed such that each block trading order book relates to a single block order. Thus, for a first block trade order request by a taker, a first block trading order book 5706*a* is maintained, and for a second block trade order request by the same or another taker, a second block trading order book 5706*a'* is maintained, to name a few.

In embodiments, the digital asset exchange computer system 3230 also includes or at least is operationally connected to a digital asset ledger 5806 for each digital asset, a fiat asset ledger 5808 for each fiat. In embodiments, a digital asset ledger 5806 will maintain a list of the beneficial ownership of all the digital assets held by the digital asset exchange. In embodiments, each separate digital asset (e.g., BTC, ETH, etc.) may be maintained in a separate digital asset ledger 5806, or in an aggregated digital asset ledger. In embodiments, a fiat asset ledger 5808 will maintain a list of the beneficial ownership of all the fiat held by the digital asset exchange. In embodiments, each separate fiat (e.g., USD, euro, yet, etc.) may be maintained in a separate fiat ledger 5806, or in an aggregated fiat ledger. In embodiments, where the digital asset exchange allows market makers to obtain operational advances, a market maker advance ledger 5810 may be maintained. In embodiments, the market maker advance ledger 5810 will maintain a list of market makers, advance limits, amounts advanced and/or available advance amounts.

In embodiments, the digital asset exchange computer system 3230 may communicate with a plurality of n market maker computer systems including at least Market Maker 1 Computer System 3250 *a*, Market Maker 2 Computer System 3250 *b* and Market Maker n Computer System 3250 *n*. In embodiments, the digital asset exchange computer system 3230 may communicate with one or more market maker computer systems 3250 using an advanced programming interface (API), such as the kind used in an automated trading system. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at https://docs.gemini.com/rest-api/#new-order.

Figure 56:
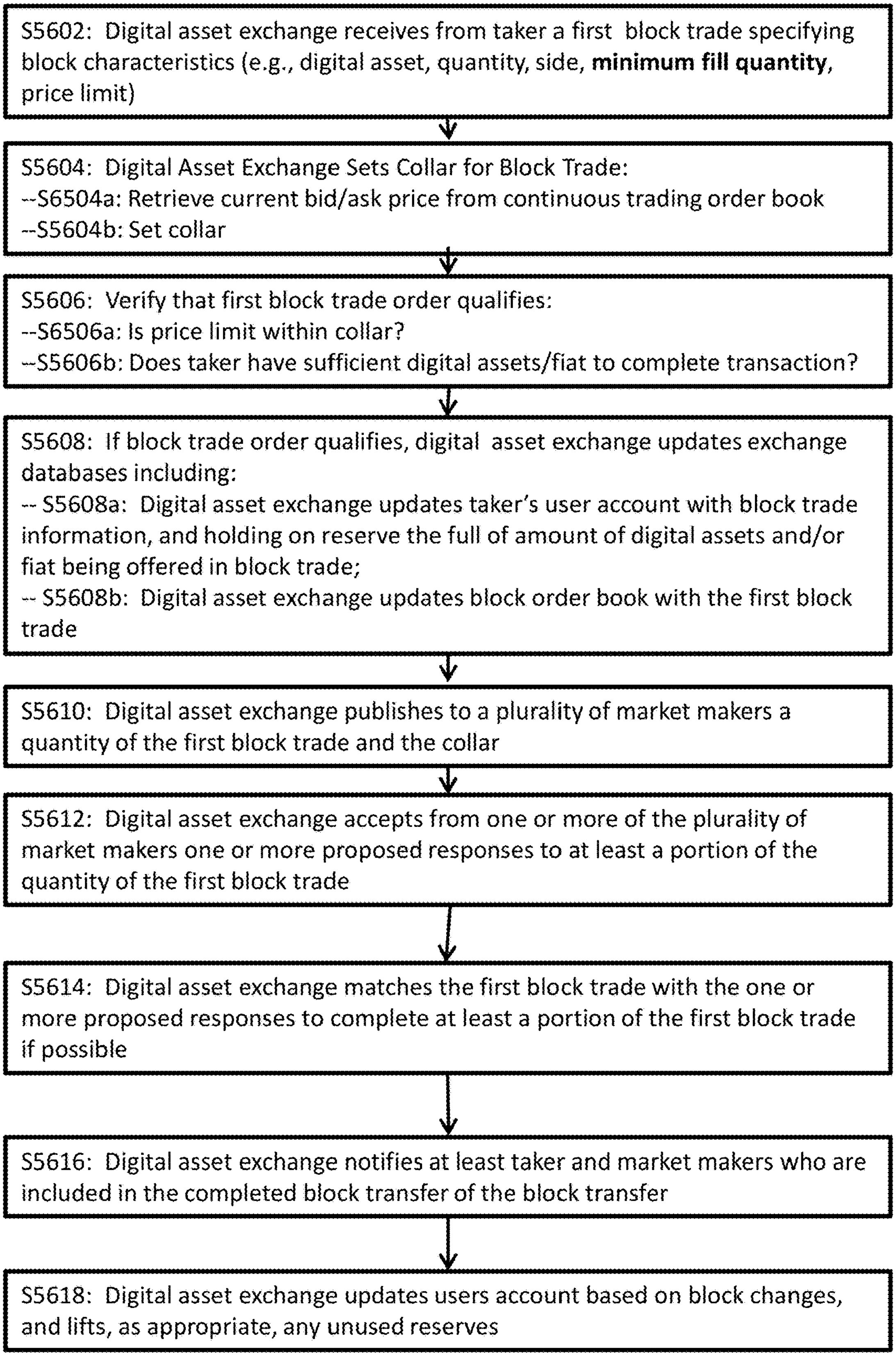
FIGS. 56 and 56A are exemplary flow charts for a block trade process in accordance with exemplary embodiments of the present invention.

Referring to FIG. 56, an exemplary flow chart for a block trading process in accordance with exemplary embodiments of the present system is illustrated.

Figure 59:
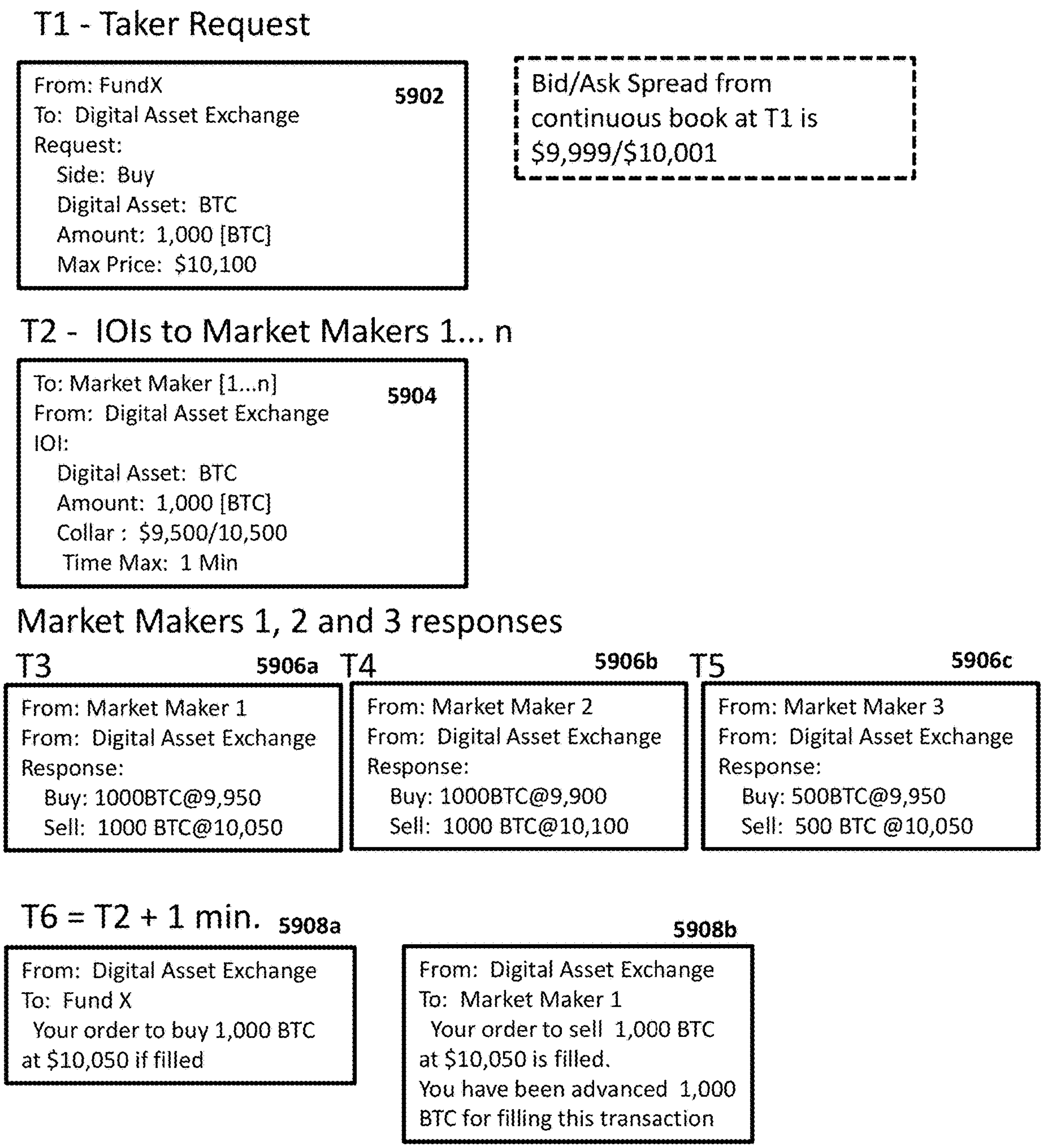

In step S5602, digital asset exchange computer system 3230 receives from a taker user device 3232 associated with a taker (customer), a first block trade order associated with a first pair of a first digital asset and either a first fiat or a second digital asset. The first block trade order specifies block characteristics (e.g. digital asset type, quantity of the digital asset, side of the transaction, minimum fill quantity/price limit). An exemplary block order 5902 is illustrated in FIG. 59. In embodiments, the first block trade order may be submitted in the form of a request via a dashboard display, email, an order placing API or other electronic submission, to name a few.

In step S5604, digital asset exchange computer system 3230 may set a collar for the block trade, including a collar minimum and a collar maximum. First, the digital asset exchange computer system 3230 may access, from at least a first database stored on a computer readable medium operatively connected to the digital asset computer system, pricing data associated with the first digital asset pair at a predefined time associated with a time of the first block trade order. In embodiments, pricing data can include a spot price. In embodiments, pricing data may be based on the last transaction immediately prior to the block trade. In embodiments, pricing data may be based on an average of the most recent bid/ask price for the digital asset. In embodiments, the pricing data may be set based on a blended digital asset price as discussed elsewhere herein. For example, a single exchange digital asset price could be determined based on a volume weighted average and/or time weighted average of recent digital asset pricing. In embodiments, a blended digital asset price may be based on pricing from digital assets taken from a plurality of exchanges (such as qualified exchanges). In embodiments, pricing data may be a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed. The digital asset exchange computer system 3230 may calculate a collar minimum for the first block trade order based on the pricing data less an amount equal to a first percentage of the pricing data, and a collar maximum for the first block trade order based on the pricing data plus an amount equal to the first percentage of the pricing data. Thus, a collar may be based on a spot price at the time for the first block trade order, plus or minus a defined range, such as a percentage of the spot price or other pricing data. In embodiments, the collar could be set using percentages such as 1%, 2%, 3%, 5%, 10% of the spot price or other pricing data, to name a few. By way of illustration, if a 5% collar is used with a spot price of 1 BTC=USD$10,000, the collar would be set at between USD$9,500 and USD$10,500.

Accordingly, in embodiments, in substep S5604*a*, the digital asset exchange computer system 3230 may retrieve a current pricing information (e.g., bid/ask price) from continuous trading order book 5702*a* associated with a first digital asset pairing and establish a spot price for the first digital asset pairing. As noted above, in embodiments, the spot price may be the average of the current bid/ask price or may be the price used in the last transaction in the continuous trading book, to name a few. In embodiments, the spot price may be a blended digital asset price, in which one or more different order books from one or more digital asset exchanges or index databases may be required to be access to obtain such price. In embodiments, the blended digital asset price may be obtained by being calculated and/or by accessing a blended digital asset price database (not shown). In substep S5604*b*, the digital asset exchange computer system may establish the collar, for example, based on adding and/subtracting a fixed percentage of the spot price to the spot price as discussed above, for example.

At step S5606, the digital asset exchange computer system 3230 may verify that the first block trade order qualifies as a legitimate transaction. In embodiments, at substep S5606*a*, the digital asset exchange computer system 3230 may determine whether the price in the block trade order is within the limits of the collar determined in step S5604*b* (e.g., at or above the collar minimum and at or below the collar maximum). At step S606*b*, the digital asset exchange computer system 3230 may determine whether the taker has sufficient digital assets and/or fiat to complete the transaction based on information provided in the digital asset ledger 5806 and/or flat ledger 5808. In embodiments, takers are always required to maintain full-reserve for block trading.

In embodiments, in step S5606, the digital asset exchange computer system 3230 may verify the block characteristics of the first block trade order to confirm that the block characteristics are valid block characteristics. In the case where the side of the transaction is buy, the digital asset exchange computer system 3230 may verify the taker has sufficient amounts of the first fiat or second digital asset as appropriate, to cover the first block trade order if filled in full. In the case where the side of the transaction is sell, the digital asset exchange computer system 3230 may verify the taker has sufficient amounts of the first digital asset to cover the first block trade order if filled in full.

Assuming that the first block trade order qualifies, in step S5608, the digital asset exchange computer system 3230 updates exchange databases, including e.g., a block trading order book 5706*a*, 5706*b*, 5706*c* associated with the digital asset of the order, a digital asset ledger 5806, and/or a fiat ledger 5808 of the taker, as appropriate. In embodiments, the updating process may include substep S5608*a* in which the digital asset exchange computer system 3230 updates taker's user account in the digital asset ledger 5806 and/or the fiat ledger 5808 as appropriate with block trade order information, and places holds on reserve the full of amount of digital assets and/or flat being offered in the block trade. As noted above, in embodiments, block trading may require a full reserve on the taker side. In embodiments, the updating process may include substep 55608*b* in which the digital asset exchange computer system 3230 updates the block trading order book 5706*a*, 5706*b*, 5706*c* with the first block trade.

Thus, in embodiments, upon successful verification of the first block trade order in step S5608, the digital asset exchange computer system 3230 may update a user account associated with the taker to set aside sufficient reserves in the first digital asset, the first fiat and/or the second digital asset sufficient to cover the first block trade order if filled in full. Thereafter, the digital asset exchange computer system 3230 may store on one or more computer readable mediums, a first block order trading book including the first block trade.

In step S5610, the digital asset exchange computer system 3230 publishes to a plurality of n market maker computer systems 3250*a*, 3250*b*, . . . 3250 *n*, a quantity and digital asset of the first block trade. An example of a publication of such an indication of interest (IOI) 5904 is shown in FIG. 59. It is noted that the market makers are not informed the side of the transaction in which the taker is participating, i.e., as to whether the block trade order is an offer to buy or an offer to sell. Similarly, the market makers are not informed of other information regarding the block trade, such as identification information regarding the taker.

In embodiments, in step S5610, the digital asset exchange computer system 3230 may generate a first indication of interest associated with the first block trade including: (i) the first digital asset as digital asset type; (ii) the digital asset quantity of the first digital asset; (iii) the collar minimum; and (iv) the collar maximum. Thereafter, the digital asset exchange computer system 3230 may publish the first indication of interest to a first plurality of market maker computer systems 3250*a*, 3250*b* . . . 3250*n*, wherein each market maker computer system is associated with a respective market maker.

In step S5612, the digital asset exchange computer system 3230 receives from one or more of the plurality of market maker computer systems 3250*a*, 3250*b* . . . 3250*n* associated with respective market makers, one or more responses relating to at least a portion of the quantity of the first block trade. If no responses are received within a pre-set time period, the block trade order will fail. In FIG. 59, representative response 5906*a* from Market Maker 1, representative response 5906*b* from Market Maker 2 and representative response 5906*c* from Market Maker 3 are illustrated. In embodiments, market maker responses must include both proposed buy and sell prices that are within the collar to be considered and placed in the block trading order book.

In embodiments, a limited time window (e.g., 1 minute, 5 minute, 10 minute to name a few) may be set in which the digital asset exchange computer system 3230 may accept responses to the indication of interest. In such embodiments, the timer 5804 may be set at the time step S5610 is executed to determine a time-out period. At the end of the limited time window (e.g., when the time-out period expires), the digital asset exchange computer system 3230 will stop accepting responses from market maker computer systems and close the block trading window.

In embodiments, market makers may not be required to maintain full-reserve, and may be granted operational advances. Operational advance limits are preferably fixed, and generally made on a customer-by-customer basis, and can be adjusted from time to time. In embodiments, other operational advance limits may be set. As discussed above, in embodiments, an operational advance ledger 5810 may be maintained by the digital asset exchange computer system 3230 to track, for each market maker, available operational advances.

In embodiments, the digital asset exchange computer system 3230 may verify the validity of each response by each market maker received during the available time period, and only validated responses may be considered. In embodiments, a response which offers a bid that is outside the collar may be rejected. In embodiments, a response which offers an amount outside of the authorized amount for the respective market maker may also be rejected. In embodiments, a response which is not for a least an acceptable minimum amount may also be rejected. In embodiments, a response for an amount of digital assets greater than the indication of interest may also be rejected, and/or applied as if it were for the amount of digital assets included in the indication of interest. In embodiments, other validation criteria may also be applied.

Thus, during a first time period after step S5610, the digital asset exchange computer system 3230 may receive from one or more market maker computer systems of the first plurality of market maker computer systems 3250*a*, 3250*b* . . . 3250*n*, one or more first responses to the first indication of interest. In embodiments, for each response received, the digital asset exchange computer system 3230 further verifies that the respective response is a valid response, coming within the parameters of the first indication of interest. In embodiments, upon verification of the respective response, the digital asset exchange computer system 3230 may update the first block trading order book to including the respective response.

In embodiments, each market maker may be limited to a single response to each indication of interest. In embodiments, each market maker may be authorized to submit more than one response for each indication of interest.

In step S5614, after the block trading window is closed, the digital asset exchange computer system 3230 crosses the first block trade order with the one or more validated responses to complete at least a portion of the first block trade, if possible. In embodiments, only complete block trades may be filled. In embodiments, partial block trades may be filled. In embodiments, matching is accomplished via a set of predetermined matching rules. In embodiments, price is given preference over all other parameters in the market maker responses such that where the block trade order is a "sell" side transaction by the taker, matching will give preference to those responses including a maximum "buy" price. Conversely, in embodiments, where the block trade order is a "buy" side transaction by the taker, matching will give preference to those responses including a minimum "sell" price. Generally, in embodiments, where two or more market makers propose the same matching price, preference may be given to the response received by the digital asset exchange computer system 3230 first. In embodiments, each matching trade will be applied in the designated priority order (e.g., price-time priority) until the order is filled, or the matching responses are exhausted.

In embodiments, upon closing of the block trading window, the digital asset exchange computer system 3230 may identify one or more matching market maker responses associated with respective market makers, by crossing the first block trade order with each of the respective responses in the first order book, to identify based on price-time priority, each of the matching responses to the first block trade order until the earliest of: (i) the first block trade order being filled by matching responses; (ii) no more matching responses are present while less than all of the first block trade order is filled; or (iii) there are no matching responses before the block trading window closes in which case the block trade fails.

In step S5616, the digital asset exchange computer system 3230 notifies at least the taker computer system 3232 and market maker computer systems 3250*a*, 3250*b* . . . 3250*n* associated with market maker(s) who are included in the completed block transfer of the block transfer. In embodiments, neither the taker nor the market makers are informed of the identity of any other party (or parties) to the completed block trade. In embodiments, once the digital asset exchange computer system completes the matching in step S5614, no further action is required by either party to the transaction.

Figure 56A:
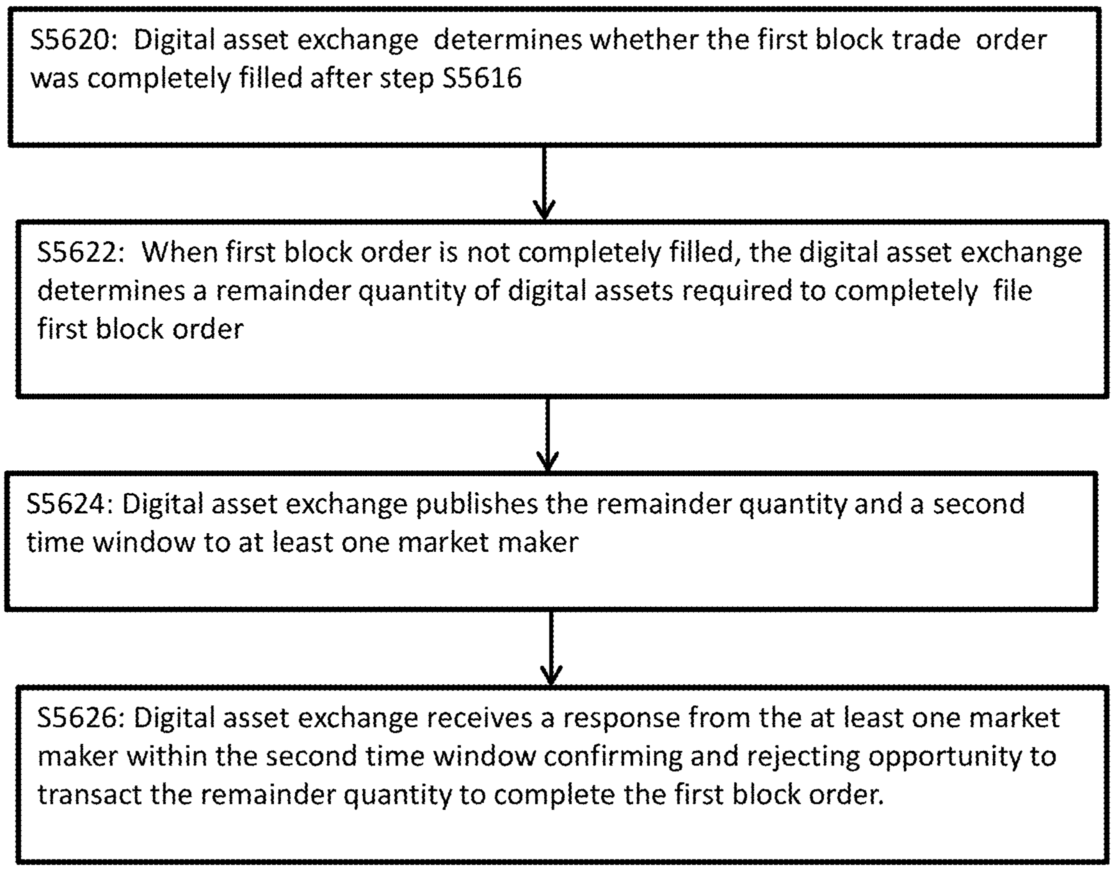

In embodiments, if a block trade order does not result in the order being completely filled as may be determined at step S5620 of FIG. 56A, an optional second indication of interest may be sent to one or more market makers to fill the remaining block trade order, at the worst successful price. Specifically, where it is determined that the first block trade order has not been completely filled at step S5620, the digital asset exchange computer system 3230 may determine a remainder quantity of the digital asset, which is the quantity of digital assets necessary to completely fulfill the first block trade offer at step S5622. In embodiments, the digital asset exchange computer system 3230 will then publish this remainder quantity to at least one market maker and offer the market maker the opportunity to purchase/sell the remainder quantity such that the first block trade offer can be completely fulfilled at step S5624. In embodiments, such a second indication of interest may be sent in price-time priority to the market makers included in the partially filed block order with a second time window to accept or reject the offer. The at least one market maker must transmit the response to accept or reject the offer in the second time window as is indicated in step S5626. By way of example, if the first time window is set at 1 minute for the block order book, the second time window could be set at 5 seconds for the optional second indication of interest. In embodiments, this optional second indication of interest may be sent to each market maker included in the partially filled block trade order, in second time window increments (e.g., every 5 seconds) until the order is completely filled or each of the market makers are exhausted. In embodiments, market makers whose responses were not included in the block order book may receive the optional second indication of interest, if the order is not filled by the market makers included in the order book. In embodiments, the second indication of interest may only be completely filled. In embodiments, the second indication of interest may be partially filled. It is noted that the steps of FIG. 56A are optional since the first block order may remain only partially filled.

In step S5618, the digital asset exchange computer system updates user accounts (including takers and successful market makers in the block trade order book) based on block changes, and lifts, as appropriate, any unused reserves. This update may include any transactions made with respect to the steps of FIG. 56A as well. In embodiments, completed block trade information may be published as part of a public distribution feed. In embodiments, such publication may be time delayed, e.g., for 10 minutes.

EXAMPLES

The following example illustrates embodiments of the present invention. It is not intended to be limiting. It will be appreciated by those of skill in the art that embodiments may be applied to other use cases not specifically called out herein without departing from the present invention.

Example 1

FIG. 59 illustrates an exemplary process flow of messages sent in a block trade order in an exemplary embodiment of present invention.

At time T1 (the initiation of the process), a taker (Fund X) places an order message 5902 to the digital asset exchange computer system 3230 for a block trade order on the buy side of 1,000 BTC at a maximum price of $10,100. At the time T1, the bid/ask spread from the continuous book is $9,999/$10,001.

In response to receipt of the order message 5902, the digital asset exchange computer system 3230 determines the collar to be $9,500 to $10,500 per BTC based on the bid/ask spread at T1, and verifies the request including that taker (FundX) has sufficient funds to perform the transaction. A fund hold is placed on taker's (FundX's) fiat account until the block trade order process is completed based on the amount of the maximum price of $10,100 (e.g., $10,100× 1000 units=$1,010,000, in Example 1).

Thereafter, once the block trade order has been verified, and sufficient fiat to cover taker FundX's maximum price has been reserved, the digital asset exchange computer system 3230 publishes message 5904 (the indication of interest message) to each of the n qualified Market Makers Market Maker 1, Market Maker 2 . . . Market Maker n as also shown in FIG. 59. In embodiments, such publication may be made via an automated programming interface (API) connection, such as used by electronic trading programs. As illustrated, the market makers are only shown the quantity and digital asset (e.g., 1,000 BTC in Example 1) to be traded and the collar (e.g., $9,500/10,500 in Example 1) and are not informed of side or price information (e.g., taker is buying and the maximum price set). A time maximum (e.g., 1 minute in Example 1) may be shown as illustrated in message 5904. Market makers are not required to maintain full-reserve, and may be granted operational advances. Operational advance limits are preferably fixed, and generally made on a customer-by-customer basis, and can be adjusted from time to time. In Example 1, the collar is set at plus or minus 5% of the spot price at time T1 as determined by the bid/ask spread of the continuous order book for the digital asset (e.g., BTC). Thus, all trades must execute within this collar.

Market makers may be required to meet a minimum bid requirement (e.g., $50,000 notional in Example 1). In embodiments, market makers can submit multiple price levels on each side.

Once the block order is initiated and published, market makers have a fixed time period (e.g., 1 minute in Example 1) to respond. A timer 5804 (described in connection with FIG. 58) may be used to track the time-out period for this block trade order book for request 5902. FIG. 59 illustrates exemplary responses 5906*a*, 55906*b*, 5906*c* provided by Market Maker 1, Market Maker 2 and Market Maker 3 at times T3, T4 and T5 respectively. All of these responses must be received during the time out period (i.e., by time T6=T2 plus 1 minute in Example 1) in order to be considered in the block trade order book for request 5902.

Once these responses are received and the time limit to respond has expired at time T6, the responses 5906*a*, 5906*b* and 5906*c* are crossed with the request 5902 and the block trade order is completed automatically based on the winning matches with no further input from either taker or makers.

In Example 1, trades are filled based on price-time priority only and partial fills are permitted. In other words, the best price wins, and if there is a tie, the earliest of the tied prices wins. In embodiments, trades may be filled on other priorities too. The minimum fill size is always at least one block size minimum (e.g., 10 BTC in Example 1) and market makers must quote at least the minimum block size. In Example 1, the trade is completed between Market Maker 1 and taker since Market Maker 1 submitted the best price at the earliest time T3 and that request fills the order.

At time T6, the digital asset exchange computer system 3230 notifies taker that the block trade order is completed in full, via exemplary message 5908*a*. Separately, the digital asset exchange computer system 3230 notifies Market Maker 1, as the winner, via exemplary message 5908*b*, that the order has been filled and the amount and price of the transaction and the amount of digital assets that have been advanced. In embodiments, the market makers that made bids which were not accepted, may optionally be notified that their respective bids failed (not shown). In embodiments, only successful market makers will be notified. In Example 1, the continuous book is not crossed for block trades. Trade information for the block trade order in response to request 5902 may be published on a delayed basis, such as a fixed period (e.g., 10 minutes in Example 1) after the block trade order is completed (time T6 in Example 1).

Example 2

FIG. 59A illustrates another exemplary process flow of messages sent in a block trade order in accordance with exemplary embodiments of present invention.

As in FIG. 59, at the initiation of the process (time T1 in Example 2), the taker (Fund X in Example 2) places an order message 5902 to the digital asset exchange computer system 3230 for a block trade order on the buy side of 1,000 BTC at a maximum price of $10,100. As in FIG. 59, at the time T1, the bid/ask spread from the continuous order book for the digital asset (BTC in Example 2) is $9,999/$10,001.

In response to receiving the order message 5902, the digital asset exchange computer system 3230 determines the collar to be $9,500 to $10,500 per BTC based on the bid/ask spread at T1, and verifies the request as noted above. A fund hold is placed on taker FundX's fiat account until the block trade order process is completed based on the amount of the maximum price of $10,100 (e.g., $10,000×1000 units=$1, 010,000, in Example 2).

Thereafter, once the block order has been verified, and sufficient fiat to cover taker's (FundX's) maximum price has been reserved, the digital asset exchange computer system 3230 publishes message 5904 including the indication of interest message to each of the n qualified market makers, Market Maker 1, Market Maker 2 . . . Market Maker n, as also shown in FIG. 59. In embodiments, as discussed with Example 1, such publication may be made via an API connection, such as used by electronic trading programs. As illustrated in FIG. 59A, the market makers are only shown the quantity and digital asset (e.g., 1,000 BTC in Example 2) to be traded and the collar prices (e.g., $9,500/10,500 per BTC unit in Example 2) and are not informed of side or price information (e.g., taker seeks to buy and taker's maximum price). A time maximum (e.g., 1 minute in Example 2) may be shown as illustrated in message 5904. In Example 2, the collar is also plus or minus 5% of the spot price at time T1 as determined by the bid/ask spread of the continuous order book for the digital asset pair. All trades must execute within this collar.

As with Example 1, market makers may be required to meet a minimum bid requirement (e.g., $50,000 notional in Example 2). In embodiments, market makers are submitting multiple price levels on each side.

Once the block order is initiated and published to the market makers, they have a fixed time period (e.g., 1 minute in Example 2) in which to respond. Timer 5804 may be set to track this time-out period. In Example 2, as illustrated in FIG. 59A, exemplary responses 5906*a*' and 5906*d*' are provided by Market Maker 1 at times T3' and T6', respectively. Market Maker 2 sends exemplary responses 5906*b*' and 5906*e*' at times T4' and T7', respectively. Market Maker 3 sends exemplary responses 5906*c*' and 5906*e*' are sent at times T5' and T8', respectively. Only responses received by the end of the time-out period (Time T9' which is T2 plus 1 minute, in Example 2) will be considered in the block trade order book for request 5902.

Once these responses are received and the time limit has expired at time T9', the responses 5906*a*', 55906*b*', 5906*c*', 5906*d*', 5906*e*', 5906*f*' are crossed with the request 5902 and the block trade order is completed automatically as noted above. The trade in Example 2 is partially filled by Market Maker 1 and Market Maker 3, as the matches that meet the price-time priority within the parameters of the block trade order book for request 5902. In particular, Market Maker 1 sells 300 BTC to taker at a price of $10,020, 300 BTC to taker at a price of $10,050 while Market Maker 3 sells 100 BTC to taker at a price of $10,050.

At time T9, the digital asset exchange computer system 3230 notifies taker that the block trade order is partially filled and the prices at which partial fulfilment took place in the exemplary message 5908*a*'. The digital asset exchange computer system 3230 also notifies Market Maker 3 of that that one of their offers has been accepted and the terms of the accepted offer via exemplary message 5908*c*'. Separately, the digital asset exchange computer system 3230 notifies Market Maker 1, as another partial winner, via exemplary message 5908*b*', that the their offers have been accepted and filled and the amount and prices of these transactions.

Since taker's order is only partially fulfilled, the digital asset exchange computer system 3230 may offer one or more successful market makers the opportunity to fulfill the remainder of taker's order. In embodiments, the successful market makers may be offered the opportunity to fulfill the remainder of taker's order. In embodiments, the market maker offering the best price, Market Maker 1 in Example 2, is offered the opportunity to fulfill the remainder of the order at the best price in message 5908*b*'. In embodiments, market makers must respond to the opportunity to fulfill the remainder of the order within a second time limit (e.g. 5 seconds, 10 second or 15 seconds to name a few). In embodiments, Market Maker 3, may be offered an opportunity to fulfill the remainder of the taker's order in message 5908*c*', if Market Maker 1 does not accept this opportunity within the time limit. In other embodiments, Market Maker 1 and Market Maker 3 may each be offered the opportunity to fulfill a portion of the remainder of the order in the messages 5908*b*' and 5908*c*'. In embodiments, all of the market makers may be offered the opportunity to fulfill the remainder of the order with the market maker first to respond with the best price being awarded the remainder of the order. In embodiments, the remainder may run as a new order book, with either the same time limits, or shorter time limits. In any event, as in FIG. 59, trade information to the extent completed, whether it be for the entire order or a portion thereof, may be published on a delayed basis, such as, after a fixed period (e.g., 10 minutes in Example 2) after time T9, when the block trade order is completed.

While the present application primarily discusses digital currency, the proof of custody method discussed herein may be used in conjunction with other products as well. Proof of custody systems and methods discussed herein, may be implemented for any type of financial product or service in which custodial wallets are used. Other embodiments of the present invention may also be used in conjunction with other financial products, such as using pricing discussions involving indices created with blended digital asset prices and/or auctions as benchmarks for financial products, such as an exchange traded product, a fund, an exchanged traded note, an exchange traded product, a call, a put, an option, an exchange traded derivative product, a fund, a company, an exchange traded fund, a note, an exchange traded note, a security, a debt instrument, a convertible security, an instrument comprising a basket of assets including one or more digital math-based assets and an over-the-counter product, an interest rate future, a future on swaps, an option on interest rate futures, an interest rate swap, a bond forward, a floating rate agreement (FRA), a structured, product such as a note bond or bill, a foreign exchange future, a foreign exchange forward, a foreign exchange listed option, a currency linked note and a currency swaption, to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:

publishing, by an administrator system, a contract proposal including first contract information comprising:
(i) at least one collateral requirement,
(ii) a first leg identifier of the contract proposal, and
(iii) a second leg identifier of the contract proposal;

receiving, by the administrator system from a first user device associated with a first user, a first user response to the contract proposal comprising:
(i) first user information associated with the first user, and
(ii) first side information comprising the first leg identifier;

receiving, by the administrator system from a second user device associated with a second user, a second user response to the contract proposal comprising:
(i) second user information associated with the second user, and
(ii) second side information comprising the second leg identifier;

in response to receiving the first and second user responses, matching, by the administrator system, the first contract information with the first and second user responses;

generating, by the administrator system, a first smart contract that associates the contract proposal and the second user response to the contract proposal, the first smart contract associated with a first smart contract address, wherein generating the first smart contract includes generating a computer program having computer-executable instructions configured to be executed automatically upon determination, by at least one of the administrator system or one or more other devices, that a condition indicated by the first smart contract has been satisfied;

generating, by the administrator system, a first message to the first smart contract address associated with a distributed public transaction ledger maintained by a plurality of geographically distributed computer systems in a peer-to-peer network including the computer-executable instructions of the first smart contract associated with: (i) the contract proposal, (ii) the first user response, and (iii) the second user response, wherein the computer-executable instructions include:
(1) first authorization instructions regarding transferring a first digital asset from the first smart contract address, and
(2) calculating instructions regarding calculating collateral in excess of a nominal value associated with the contract proposal;

publishing, by the administrator system, the first message to the distributed public transaction ledger;

confirming, by the administrator system, that the computer-executable instructions are saved to the first smart contract address associated with the distributed public transaction ledger;

confirming, by the administrator system, receipt of a first amount of the first digital asset at the first smart contract address from a first user public address associated with the first user and associated with the distributed public transaction ledger in accordance with the at least one collateral requirement;

confirming, by the administrator system, receipt of a second amount of the first digital asset at the first smart contract address associated with blockchain from a second user public address associated with the second user and associated with the distributed public transaction ledger in accordance with the at least one collateral requirement;

generating trade instructions associated with the first smart contract;

generating, by the administrator system, a second message to the first smart contract address associated with the distributed public transaction ledger including the trade instructions associated with the first smart contract, wherein the trade instructions include execution instructions to execute a first trade between the first user and the second user based on:
(i) the first contract information,
(ii) the first user response, and
(iii) the second user response; and publishing, by the administrator system, the second message to the distributed public transaction ledger, wherein the trade instructions, as generated by the administrator system, are configured to cause at least one of the computer systems of the plurality of geographically distributed computer systems in the peer-to-peer network to executed the first trade in accordance with the computer-executable instructions of the first smart contract associated with the first smart contract address.

2. The method of claim 1, wherein the first user information further comprises a first user public address associated with the distributed public transaction ledger, and wherein the first user public address corresponds to a first user private key that is mathematically related to the first user public address.

3. The method of claim 2, wherein the second user information further comprises a second user public address associated with the distributed public transaction ledger, and wherein the second user public address corresponds to a second user private key that is mathematically related to the second user public address.

4. The method of claim 1, further comprising sending, by the administrator system to the first user device, a third message including instructions to transfer the first amount of the first digital asset to the first smart contract address.

5. The method of claim 4, further comprising sending, by the administrator system to the second user device, a fourth message including instructions to transfer the second amount of the first digital asset to the first smart contract address.

6. The method of claim 1, further comprising:

recalculating the first amount of the first digital asset based on the at least one collateral requirement and current benchmark information; and determining a first additional amount of the first digital asset based on a difference between the recalculated first amount of the first digital asset and the first amount of the first digital asset.

7. The method of claim 6, further comprising:

generating, by the administrator system, in response to a determination of the first additional amount, an alert including the first additional amount; and sending, by the administrator system, to the first user device, the alert.

8. The method of claim 7, further comprising:

monitoring, by the administrator system, the first smart contract address associated with the distributed public transaction ledger;

determining, by the administrator system, whether the first additional amount of the first digital asset is received by the first smart contract address;

generating, by the administrator system, a default notification in response to a determination that the first additional amount of the first digital asset is not received by the first smart contract address;

sending, by the administrator system, the default notification to the first user device, the second user device, and the first smart contract address;

generating, by the administrator system, a third message including instructions to transfer the first amount of the first digital asset and the second amount of the first digital asset in accordance with the computer-executable instructions of the first smart contract; and publishing, by the administrator system, the third message to the distributed public transaction ledger.

9. The method of claim 1, further comprising:

recalculating the second amount of the first digital asset based on the at least one collateral requirement and current benchmark information; and determining a second additional amount of the first digital asset based on a difference between the recalculated second collateral amount and the second collateral amount.

10. The method of claim 9, further comprising:

generating, by the administrator system, in response to a determination of the second additional amount, an alert including the second additional amount; and sending, by the administrator system, to the second user device, the alert.

11. The method of claim 10, further comprising:

monitoring, by the administrator system, the first smart contract address associated with the distributed public transaction ledger;

determining, by the administrator system, whether the second additional amount of the first digital asset is received by the first smart contract address;

generating, by the administrator system, a default notification in response to a determination that the second additional amount of the first digital asset is not received by the first smart contract address;

sending, by the administrator system, the default notification to the first user device, the second user device, and the first smart contract address;

generating, by the administrator system, a third message including instructions to transfer the first amount of the first digital asset and the second amount of the first digital asset in accordance with the first contract instructions; and publishing, by the administrator system, the third message to the distributed public transaction ledger.

12. The method of claim 1, wherein the contract proposal includes a contract duration, and the method further comprises:

determining, by the administrator system, at an end of the contract duration, a payout amount of the first digital asset based on at least the computer-executable instructions of the first smart contract;

generating, by the administrator system, a third message including payout instructions based at least on the first side information and the second side information; and publishing, by the administrator system, the third message to the blockchain.

13. The method of claim 1, further comprising:

generating, by the administrator system, a third message including excess collateral instructions;

publishing, by the administrator system, the third message to the blockchain, wherein the excess collateral instructions are executed by computer systems of the plurality of geographically distributed computer systems in the peer-to-peer network to:

(A) determine a first excess collateral amount of the first digital asset associated with the first user for the first trade in accordance with the computer-executable instructions of the first smart contract;

(B) determine a second excess collateral amount of the first digital asset associated with the second user for the first trade in accordance with the computer-executable instructions of the first smart contract;

(C) distribute the first excess collateral amount of the first digital asset in accordance with the trade instructions to the first user public address; and (D) distribute the second excess collateral amount of the first digital asset in accordance with the trade instructions to the second user public address.

14. The method of claim 1, further comprising:

generating, by the administrator system, a third message including remaining collateral instructions, wherein the remaining collateral instructions include (1) determining a first remaining collateral amount of the first digital asset for the first trade in accordance with the computer-executable instructions of the first smart contract;

(2) determining a second remaining collateral amount of the first digital asset for the first trade in accordance with the computer-executable instructions of the first smart contract;

(3) distributing the first remaining collateral amount of the first digital asset for the first trade in accordance with the computer-executable instructions of the first smart contract; and (4) distributing the second remaining collateral amount of the first digital asset for the first trade in accordance with the computer-executable instructions of the first smart contract.

15. The method of claim 1, further comprising:

generating, by the administrator system, a third message including benchmark instructions to send a benchmark value to the first smart contract address; and sending, by the administrator system to an oracle administrator system associated with an oracle, the third message.

16. The method of claim 1, wherein publishing the contract proposal further comprises:

(A) generating, by the administrator system, graphical user interface information including at least one prompt for the first user to provide the contract proposal;

(B) sending, by the administrator system to the first user device, the graphical user interface information; and (C) receiving, by the administrator system from the first user device in response to the at least one prompt, the contract proposal.

17. The method of claim 1, wherein the contract information further comprises at least one of:

(iv) an inception date;

(v) an inception value;

(vi) benchmark identification information;

(vii) a contract duration;

(viii) derivative type information;

(ix) benchmark information;

(x) early termination information;

(xi) asset identification information;

(xii) pricing model information; or (xiii) volatility information.

18. The method of claim 1, wherein the distributed public transaction ledger is an Ethereum blockchain.

19. The method of claim 1, wherein the first digital asset is a cryptographic token.

20. The method of claim 1, wherein the contract information includes first transaction fee information.

* * * * *